(12) United States Patent
Popeil et al.

(10) Patent No.: US 8,309,151 B2
(45) Date of Patent: Nov. 13, 2012

(54) DEVICE TO EFFICIENTLY COOK FOOD

(75) Inventors: Ronald M. Popeil, Beverly Hills, CA (US); Alan L. Backus, Los Angeles, CA (US)

(73) Assignee: Ron's Enterprises, Inc., Beverly Hills, CA (US)

( * ) Notice: Subject to any disclaimer, the term of this patent is extended or adjusted under 35 U.S.C. 154(b) by 0 days.

(21) Appl. No.: 12/856,230

(22) Filed: Aug. 13, 2010

(65) Prior Publication Data
US 2010/0303973 A1 Dec. 2, 2010

Related U.S. Application Data

(63) Continuation of application No. 12/775,725, filed on May 7, 2010, now Pat. No. 8,186,265, which is a continuation-in-part of application No. 12/251,019, filed on Oct. 14, 2008, which is a continuation-in-part of application No. 11/345,187, filed on Feb. 1, 2006, said application No. 12/251,019 is a continuation-in-part of application No. 11/425,317, filed on Jun. 20, 2006, which is a continuation-in-part of application No. 11/345,187, filed on Feb. 1, 2006, said application No. 12/251,019 is a continuation-in-part of application No. 11/539,655, filed on Oct. 9, 2006, which is a continuation-in-part of application No. PCT/US2006/030946, filed on Aug. 8, 2006.

(60) Provisional application No. 60/706,859, filed on Aug. 8, 2005.

(51) Int. Cl.
*A23L 1/01* (2006.01)

(52) U.S. Cl. ............ 426/438; 426/233; 99/407; 99/410; 99/411; 99/412; 99/413; 99/414; 99/415

(58) Field of Classification Search .................... 99/407, 99/410, 411, 412, 413, 414, 415; 426/233, 426/438
See application file for complete search history.

(56) References Cited

U.S. PATENT DOCUMENTS 91,899 A 6/1869 Beaumont
(Continued)

FOREIGN PATENT DOCUMENTS
EP 0 513 817 A2 11/1992
(Continued)

OTHER PUBLICATIONS allrecipes.com, Southern Fried Chicken, [on line] Jul. 2004, retrieved on Aug. 2, 2011. Retrieved from the Internet: URL:<http://allrecipes.com/Recipe/southern-fried-chicken/detail.aspx>.*

(Continued)

*Primary Examiner* — Rena Dye
*Assistant Examiner* — Chaim Smith
(74) *Attorney, Agent, or Firm* — Tucker Ellis LLP

(57) ABSTRACT

Deep fryers and associated accessories providing increased efficiency and convenience in the production of deep-fried, steamed and boiled foods. Multiple cooking cycles and versatile food support means to fully cook foods are provided. Special advantages for larger unitary foods, such as for example, a large turkey, are provided. Advantages include without limitation minimizing countertop usage; reduction in the use of frying oil; compact storage; reduced shipping costs; reduced warehousing and manufacturing costs; and being lighter and more easy to handle in the kitchen. Accessory items simplify and facilitate production of deep fried foods, including cutting foods into shapes appropriate to produce French fries and blooming onions. Other accessories facilitate the transference and maintenance of frying oil including: returning frying oil to original containers for storage and disposal; and filtering frying oil to prolong its useful life. Methods are disclosed which help purify oil for extended life without use of filtration.

15 Claims, 171 Drawing Sheets

U.S. PATENT DOCUMENTS

| | | |
|---|---|---|
| 92,791 A | 7/1869 | Burwell |
| 213,244 A | 3/1879 | Pettibone |
| 274,208 A | 3/1883 | Mayo |
| 300,691 A | 6/1884 | Brown |
| 474,036 A | 5/1892 | Wood |
| 475,840 A | 5/1892 | Woods |
| 475,874 A | 5/1892 | Leggett |
| 498,992 A | 6/1893 | Schilling |
| 499,615 A | 6/1893 | Walker |
| 502,622 A | 8/1893 | Goldsmith |
| 633,423 A | 9/1899 | Burns |
| 641,267 A | 1/1900 | Cahill |
| 661,681 A | 11/1900 | Ashbaugh et al. |
| 703,331 A | 6/1902 | Acree |
| 895,856 A | 8/1908 | Harton |
| 900,396 A | 10/1908 | Lange |
| 910,812 A | 1/1909 | Harton |
| 951,241 A | 3/1910 | Hampel |
| 959,715 A | 5/1910 | Carson |
| 1,012,877 A | 12/1911 | Mahan |
| 1,199,211 A | 9/1916 | Simons |
| 1,205,026 A | 11/1916 | Rodgers |
| 1,214,992 A | 3/1917 | Boleratz |
| 1,263,151 A | 4/1918 | Topalian |
| 1,264,348 A | 4/1918 | Toth |
| 1,302,086 A | 4/1919 | Pitlick |
| 1,315,665 A | 9/1919 | Hamilton |
| 1,368,640 A | 2/1921 | Melchior |
| 1,371,718 A | 3/1921 | Zimmermann |
| 1,462,275 A | 5/1921 | Gammel |
| 1,396,606 A | 11/1921 | Vincent |
| 1,430,691 A | 10/1922 | Self et al. |
| 1,461,654 A | 7/1923 | Haessler |
| 1,487,824 A | 3/1924 | Vincent |
| 1,538,171 A | 5/1925 | Dailey |
| 1,563,005 A | 11/1925 | Allee |
| 1,577,856 A | 3/1926 | Wingert |
| 1,635,563 A | 7/1927 | Sanford |
| 1,638,446 A | 8/1927 | Bel |
| 1,662,147 A | 3/1928 | Farden |
| 1,733,261 A | 10/1929 | Higby et al. |
| 1,842,101 A | 1/1932 | Kaufmann |
| 1,881,549 A | 10/1932 | Hatch |
| 2,061,533 A | 12/1934 | Anetsberger |
| 2,081,751 A | 10/1935 | Lendrum |
| 2,112,990 A | 11/1936 | Hunter |
| 2,247,650 A | 9/1940 | Carlson |
| 2,250,910 A | 7/1941 | Hiett |
| 2,315,473 A | 3/1943 | Wolcott |
| 2,509,533 A | 5/1950 | Schoen, Jr. |
| 2,517,759 A | 8/1950 | Bentzen |
| 2,560,229 A | 7/1951 | Leavens |
| 2,563,237 A | 8/1951 | Grocoff |
| 2,577,433 A | 12/1951 | Robb |
| 2,625,972 A | 1/1953 | Torres |
| 2,645,262 A | 7/1953 | Marasco |
| 2,915,000 A | 1/1954 | Hetzel et al. |
| 2,703,522 A | 3/1955 | Smith |
| 2,703,670 A | 3/1955 | Voight |
| 2,751,120 A | 6/1956 | Bond et al. |
| 2,786,502 A | 3/1957 | Turner |
| 2,811,181 A | 10/1957 | Correll |
| 2,835,191 A | 5/1958 | Clurman |
| 2,836,212 A | 5/1958 | Shaw |
| 2,855,893 A | 10/1958 | Greer et al. |
| 2,897,776 A | 8/1959 | Black et al. |
| 2,902,062 A | 9/1959 | Smekal |
| D19,375 S | 10/1962 | Popeil |
| 3,063,843 A | 11/1962 | Hashimoto |
| 3,095,326 A | 6/1963 | Green et al. |
| 3,112,781 A | 12/1963 | Popeil |
| 3,116,770 A | 1/1964 | Tanuma |
| 3,128,810 A | 4/1964 | Whipp |
| 3,145,743 A | 8/1964 | Cronheim |
| 3,201,015 A | 8/1965 | Wagaman |
| 3,211,195 A | 10/1965 | Porter |
| 3,216,474 A | 11/1965 | Popeil |
| 3,225,735 A | 12/1965 | Arcabasso |
| 3,283,730 A | 11/1966 | Mohler |
| 3,327,621 A | 6/1967 | Zysset |
| 3,354,546 A | 11/1967 | Pagliuca |
| 3,394,677 A | 7/1968 | Taylor et al. |
| 3,404,659 A | 10/1968 | Croston |
| 3,438,353 A | 4/1969 | Pellegrini |
| 3,463,077 A | 8/1969 | Lescure |
| 3,468,355 A | 9/1969 | Hall |
| 3,469,561 A | 9/1969 | Gordon |
| 3,547,075 A | 12/1970 | Johnson |
| 3,554,253 A | 1/1971 | Vasile |
| 3,561,511 A | 2/1971 | Kummer |
| 3,626,840 A | 12/1971 | Day |
| 3,641,923 A | 2/1972 | Wilkinson |
| 3,667,374 A | 6/1972 | Holmes |
| 3,696,778 A | 10/1972 | Moore |
| 3,714,889 A | 2/1973 | Mazzola et al. |
| D226,940 S | 5/1973 | Lax |
| 3,735,726 A | 5/1973 | Butler |
| 3,739,743 A | 6/1973 | McKee, Jr. |
| 3,800,649 A | 4/1974 | Chinn |
| 3,800,692 A | 4/1974 | Simens |
| 3,808,963 A | 5/1974 | Ludena |
| 3,816,703 A | 6/1974 | Binks |
| 3,830,151 A | 8/1974 | Gerson |
| 3,869,972 A | 3/1975 | Chase |
| 3,874,429 A | 4/1975 | LaFarge |
| 3,885,519 A | 5/1975 | Orlowski |
| 3,939,884 A | 2/1976 | Mader |
| 3,971,307 A | 7/1976 | Graham |
| 4,062,260 A | 12/1977 | Steinhogl |
| 4,062,387 A | 12/1977 | Peniche |
| 4,095,518 A | 6/1978 | Jones |
| 4,108,222 A | 8/1978 | Kaufman |
| 4,140,160 A | 2/1979 | Glackin |
| 4,143,690 A | 3/1979 | Dunicz |
| 4,157,707 A | 6/1979 | Schwind et al. |
| 4,164,174 A | 8/1979 | Wallsten |
| 4,170,252 A | 10/1979 | Peterson |
| 4,189,993 A | 2/1980 | Kaufman |
| 4,202,386 A | 5/1980 | Orr |
| 4,230,238 A | 10/1980 | Wilson |
| 4,256,154 A | 3/1981 | Black |
| 4,266,813 A | 5/1981 | Oliver |
| 4,317,017 A | 2/1982 | Bowen |
| 4,397,299 A | 8/1983 | Taylor et al. |
| 4,397,879 A | 8/1983 | Wilson |
| 4,399,743 A | 8/1983 | Izzi, Sr. |
| 4,401,017 A | 8/1983 | Feld |
| 4,436,025 A | 3/1984 | Jones |
| 4,462,308 A | 7/1984 | Wang |
| 4,485,831 A | 12/1984 | Ungerleider |
| 4,509,412 A | 4/1985 | Whittenburg et al. |
| 4,557,378 A | 12/1985 | Klebold |
| 4,569,280 A | 2/1986 | D'Ambro et al. |
| 4,573,384 A | 3/1986 | Jones |
| 4,580,549 A | 4/1986 | Sato |
| 4,602,612 A | 7/1986 | Schwizer |
| 4,604,989 A | 8/1986 | Kita |
| 4,623,544 A | 11/1986 | Highnote |
| 4,668,390 A | 5/1987 | Hurley et al. |
| 4,688,475 A | 8/1987 | Witt et al. |
| 4,691,096 A | 9/1987 | Knauss |
| 4,698,861 A | 10/1987 | Bogusz |
| 4,706,719 A | 11/1987 | Eversdijk |
| 4,738,246 A | 4/1988 | Aylott et al. |
| 4,739,698 A | 4/1988 | Allaire |
| 4,789,017 A | 12/1988 | Panasewicz et al. |
| 4,804,026 A | 2/1989 | Bailey |
| 4,823,848 A | 4/1989 | Sentmore, Sr. et al. |
| 4,832,095 A | 5/1989 | Bonnell |
| 4,838,244 A | 6/1989 | Giles, Sr. et al. |
| 4,850,403 A | 7/1989 | Wiese |
| 4,852,256 A | 8/1989 | Schoettler |
| 4,854,227 A | 8/1989 | Koopman |
| 4,896,707 A | 1/1990 | Cowles |
| 4,911,068 A | 3/1990 | Koether et al. |
| 4,955,271 A | 9/1990 | Boutin-Lester |
| 4,957,039 A | 9/1990 | Reyes |

| | | | | | | |
|---|---|---|---|---|---|---|
| 4,995,312 | A | 2/1991 | Leiros | 6,330,855 B2 | 12/2001 | Backus et al. |
| 5,022,773 | A | 6/1991 | Waldinger et al. | 6,341,631 B1 | 1/2002 | Hobbs |
| 5,027,697 | A * | 7/1991 | De Longhi ............... 99/409 | 6,371,014 B1 | 4/2002 | Ismail et al. |
| 5,033,453 | A | 7/1991 | Loyd et al. | 6,393,972 B1 | 5/2002 | Backus et al. |
| 5,078,189 | A | 1/1992 | Ronsonet | 6,398,066 B1 | 6/2002 | Mullins |
| 5,097,753 | A | 3/1992 | Naft | 6,405,765 B1 | 6/2002 | Handrick |
| 5,134,956 | A | 8/1992 | Stewart | 6,408,742 B1 | 6/2002 | Backus et al. |
| 5,140,711 | A | 8/1992 | Johnson | 6,422,136 B1 | 7/2002 | Backus et al. |
| 5,142,973 | A | 9/1992 | Tur et al. | 6,450,219 B1 | 9/2002 | Ingram |
| 5,148,655 | A | 9/1992 | Salinas | 6,478,614 B1 | 11/2002 | De'Longhi |
| 5,168,908 | A | 12/1992 | Boyum | RE3,795 E | 1/2003 | Kiczko et al. |
| 5,172,328 | A | 12/1992 | Cahlander et al. | 6,513,668 B1 | 2/2003 | Masterton |
| 5,230,279 | A | 7/1993 | McFadden et al. | 6,527,570 B1 | 3/2003 | Hartman et al. |
| 5,245,902 | A | 9/1993 | Pereira | 6,536,334 B2 | 3/2003 | Backus et al. |
| 5,271,317 | A | 12/1993 | Aguerrevere et al. | 6,539,838 B1 | 4/2003 | Bengtsson et al. |
| 5,277,233 | A | 1/1994 | Fleming | 6,568,315 B1 | 5/2003 | Backus et al. |
| 5,287,798 | A | 2/1994 | Takeda | 6,568,942 B2 | 5/2003 | Lau et al. |
| 5,373,781 | A | 12/1994 | Knasel | 6,619,191 B2 | 9/2003 | Mariotti |
| 5,375,512 | A | 12/1994 | Ertmer | 6,688,347 B1 | 2/2004 | Selby |
| 5,385,180 | A | 1/1995 | Wittman | 6,708,738 B2 | 3/2004 | Olsen |
| 5,421,249 | A | 6/1995 | Repisky et al. | 6,719,576 B2 | 4/2004 | Hartman et al. |
| 5,431,092 | A | 7/1995 | Guillory | 6,736,130 B2 | 5/2004 | Takahashi |
| 5,458,168 | A | 10/1995 | Lindgren | 6,739,363 B2 | 5/2004 | Walter et al. |
| 5,463,943 | A | 11/1995 | Knasel | 6,742,445 B2 | 6/2004 | Backus et al. |
| 5,515,892 | A | 5/1996 | Najafi et al. | 6,758,209 B2 | 7/2004 | Takeda et al. |
| 5,535,793 | A | 7/1996 | Tantre | 6,758,308 B1 | 7/2004 | Hearting et al. |
| 5,542,347 | A | 8/1996 | Joseph | 6,776,201 B2 | 8/2004 | Willis |
| 5,584,235 | A | 12/1996 | DuBois et al. | 6,782,805 B2 | 8/2004 | Backus et al. |
| 5,586,486 | A | 12/1996 | Nitschke et al. | 6,782,806 B2 | 8/2004 | Backus et al. |
| 5,607,004 | A | 3/1997 | Cope | 6,783,276 B2 | 8/2004 | Machacek et al. |
| 5,638,873 | A | 6/1997 | Burns | 6,783,685 B2 | 8/2004 | Hwang |
| 5,655,580 | A | 8/1997 | Schrock | 6,786,139 B2 | 9/2004 | Ponting et al. |
| D38,866 | S | 1/1998 | So | 6,786,215 B1 | 9/2004 | Moravec et al. |
| 5,718,934 | A | 2/1998 | Hayakawa | 6,831,185 B2 | 12/2004 | Ikuina et al. |
| 5,762,120 | A | 6/1998 | Smith | 6,837,150 B2 | 1/2005 | Backus et al. |
| 5,770,252 | A | 6/1998 | McEwen et al. | 6,865,983 B2 | 3/2005 | McNamee |
| 5,787,944 | A | 8/1998 | Sarkis et al. | 6,921,480 B2 | 7/2005 | Post |
| 5,816,139 | A | 10/1998 | Scorta Paci | 6,935,389 B1 | 8/2005 | Rinaldi |
| 5,826,494 | A | 10/1998 | Wang | 6,941,857 B2 | 9/2005 | McLemore |
| 5,836,238 | A | 11/1998 | Kobayashi | 6,976,882 B2 | 12/2005 | Kernan |
| 5,857,504 | A | 1/1999 | Tremblay | 6,988,445 B1 | 1/2006 | Backus et al. |
| 5,899,246 | A | 5/1999 | Cummins et al. | 6,998,581 B2 | 2/2006 | Currie |
| 5,920,916 | A | 7/1999 | Norton | 7,013,934 B1 | 3/2006 | Hicok |
| 5,927,353 | A | 7/1999 | Persson et al. | 7,019,271 B2 | 3/2006 | Wnek et al. |
| 5,947,016 | A | 9/1999 | Repac et al. | 7,036,425 B2 | 5/2006 | Chang |
| 5,950,697 | A | 9/1999 | Hobbs | 7,044,049 B2 | 5/2006 | Johnston, Sr. et al. |
| 5,971,690 | A | 10/1999 | Whitten | 7,053,338 B1 | 5/2006 | Tesfagaber |
| D41,593 | S | 11/1999 | Robinson | 7,065,883 B2 | 6/2006 | Popeil et al. |
| 5,979,516 | A | 11/1999 | Grant | 7,074,046 B2 | 7/2006 | Kernan |
| 5,988,046 | A | 11/1999 | Noll | 7,086,155 B2 | 8/2006 | Chan et al. |
| 5,988,048 | A | 11/1999 | Hunter et al. | 7,114,536 B2 | 10/2006 | Guthrie |
| 5,994,672 | A | 11/1999 | Mestnik | 7,138,609 B2 | 11/2006 | Popeil et al. |
| 6,029,566 | A | 2/2000 | McLemore | 7,141,764 B2 | 11/2006 | Shumate |
| 6,035,907 | A | 3/2000 | DeCoster | 7,153,120 B2 | 12/2006 | Backus et al. |
| 6,079,319 | A | 6/2000 | Doria | D53,516 S | 1/2007 | St. Germain et al. |
| 6,082,249 | A | 7/2000 | Su | 7,211,770 B2 | 5/2007 | Wilson |
| 6,092,547 | A | 7/2000 | Komiya et al. | 7,225,729 B2 | 6/2007 | Backus et al. |
| 6,116,299 | A | 9/2000 | Cummins et al. | 7,225,730 B2 | 6/2007 | Backus et al. |
| 6,119,739 | A | 9/2000 | McGee et al. | 7,229,656 B2 | 6/2007 | Paumen et al. |
| 6,131,564 | A | 10/2000 | Song | 7,237,476 B1 | 7/2007 | Bourgeois et al. |
| 6,142,064 | A | 11/2000 | Backus et al. | 7,237,582 B1 | 7/2007 | Harvey |
| 6,142,193 | A | 11/2000 | Sanders | 7,237,583 B1 | 7/2007 | Salani et al. |
| 6,152,198 | A | 11/2000 | Nguyen | 7,240,701 B2 | 7/2007 | Salani et al. |
| 6,162,481 | A | 12/2000 | Bernacchi et al. | D55,292 S | 10/2007 | Garman et al. |
| 6,167,799 | B1 | 1/2001 | Macias | D55,343 S | 10/2007 | Lin |
| 6,170,390 | B1 | 1/2001 | Backus et al. | 7,284,581 B2 | 10/2007 | Steinweg |
| 6,173,645 | B1 | 1/2001 | Backus et al. | 7,302,976 B2 | 12/2007 | Bultman |
| 6,180,934 | B1 | 1/2001 | Ishizaki et al. | 7,309,422 B2 | 12/2007 | Mullaney, Jr. |
| 6,187,355 | B1 | 2/2001 | Akoh et al. | D56,042 S | 1/2008 | McLemore |
| 6,223,792 | B1 | 5/2001 | Slagle | 7,322,386 B2 | 1/2008 | Holm |
| 6,240,838 | B1 | 6/2001 | Backus et al. | D56,371 S | 3/2008 | Fitzgerald |
| 6,244,170 | B1 | 6/2001 | Whited et al. | 7,412,922 B2 | 8/2008 | McLemore |
| 6,250,214 | B1 | 6/2001 | Backus et al. | D57,645 S | 9/2008 | Repac |
| 6,253,665 | B1 | 7/2001 | Backus et al. | 7,424,849 B2 | 9/2008 | Backus et al. |
| 6,254,790 | B1 | 7/2001 | King et al. | 7,626,142 B2 | 12/2009 | Backus et al. |
| 6,255,636 | B1 | 7/2001 | Cochran, II et al. | 7,739,948 B2 | 6/2010 | Backus et al. |
| 6,260,590 | B1 | 7/2001 | Ziegmann | 2002/0050212 A1 | 5/2002 | Backus et al. |
| 6,269,737 | B1 | 8/2001 | Rigney et al. | 2004/0103795 A1 | 6/2004 | McLemore |
| 6,289,795 | B1 | 9/2001 | McLemore et al. | 2004/0187702 A1 | 9/2004 | Xu |

| | | | | | | |
|---|---|---|---|---|---|---|
| 2005/0051034 A1 | 3/2005 | Cheng | | 2007/0145061 A1 | 6/2007 | Backus et al. |
| 2005/0055130 A1 | 3/2005 | Carlson et al. | | 2007/0221651 A1 | 9/2007 | Kristina et al. |
| 2005/0055533 A1 | 3/2005 | Kadambi et al. | | 2007/0251517 A1 | 11/2007 | Sus et al. |
| 2005/0091050 A1 | 4/2005 | Surendran et al. | | 2007/0256571 A1 | 11/2007 | Popeil et al. |
| 2005/0144248 A1 | 6/2005 | Doganowski et al. | | 2008/0041238 A1 | 2/2008 | Usui et al. |
| 2005/0144250 A1 | 6/2005 | Banatwala et al. | | 2008/0102181 A1 | 5/2008 | Rao et al. |
| 2005/0151464 A1 | 7/2005 | Sung | | 2008/0124438 A1 | 5/2008 | Forte et al. |
| 2005/0194372 A1 | 9/2005 | Lau et al. | | 2008/0153281 A1 | 6/2008 | Knollenberg et al. |
| 2005/0204929 A1 | 9/2005 | Rosenzweig | | 2008/0159281 A1 | 7/2008 | Jesseph |
| 2005/0207438 A1 | 9/2005 | Horiguchi et al. | | 2008/0169281 A1 | 7/2008 | Borovicka et al. |
| 2005/0217662 A1 | 10/2005 | McDuffie | | 2008/0196596 A1 | 8/2008 | Forrest et al. |
| 2005/0229760 A1 | 10/2005 | Chang | | 2008/0202349 A1 | 8/2008 | Peng |
| 2005/0235838 A1 | 10/2005 | Cohn | | 2008/0210100 A1 | 9/2008 | Fraij et al. |
| 2005/0241492 A1 | 11/2005 | Kooyker et al. | | 2008/0265594 A1 | 10/2008 | Popeil et al. |
| 2005/0247454 A1 | 11/2005 | Domann et al. | | | | |
| 2005/0259309 A1 | 11/2005 | Blank | | | | |
| 2005/0266228 A1 | 12/2005 | Jain et al. | | | | |
| 2005/0268791 A1 | 12/2005 | Svabek et al. | | | | |
| 2005/0268792 A1 | 12/2005 | Wu Chang | | | | |
| 2005/0269332 A1 | 12/2005 | Svabeck et al. | | | | |
| 2005/0272513 A1 | 12/2005 | Bissonnette et al. | | | | |
| 2005/0283335 A1 | 12/2005 | Banke et al. | | | | |
| 2005/0284306 A1 | 12/2005 | Backus et al. | | | | |
| 2005/0289443 A1 | 12/2005 | Kuznetsov | | | | |
| 2006/0272514 A1 | 12/2006 | Curtis | | | | |
| 2006/0272633 A1 | 12/2006 | Osias, Jr. | | | | |
| 2007/0028780 A1 | 2/2007 | Popeil et al. | | | | |
| 2007/0028781 A1 | 2/2007 | Popeil et al. | | | | |
| 2007/0040559 A1 | 2/2007 | Klun | | | | |
| 2007/0054018 A1 | 3/2007 | Yuan | | | | |

FOREIGN PATENT DOCUMENTS

| | | |
|---|---|---|
| GB | 668 613 A | 3/1952 |
| WO | WO 03/009730 A1 | 2/2003 |

OTHER PUBLICATIONS

International Search Report and Written Opinion for Application No. PCT/US2009/42676 dated Aug. 12, 2009.

European Search Report and Written Opinion for Application No. 06800998.4 dated Jul. 8, 2010.

PCT/2009/042676 International Preliminary Report on Patentability and Written Opinion of the International Search Authority dated Apr. 28, 2011.

\* cited by examiner

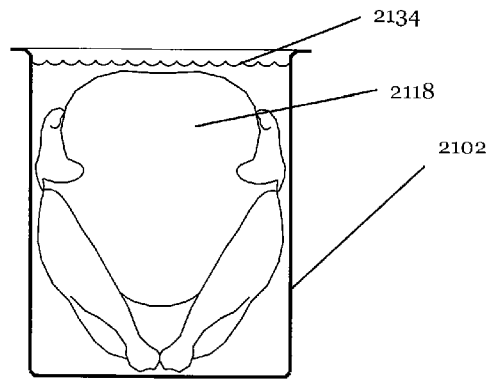
Fig 141 - prior art
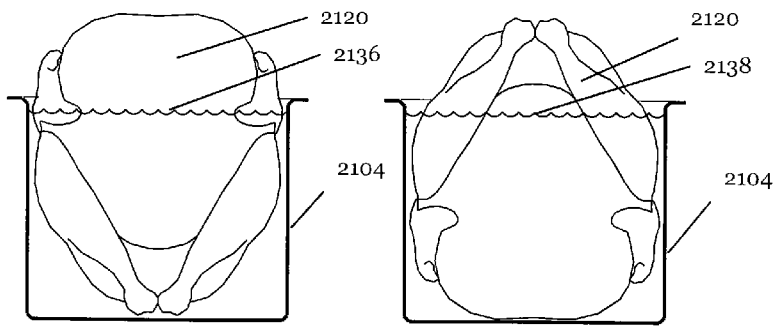
Fig 142        Fig 143
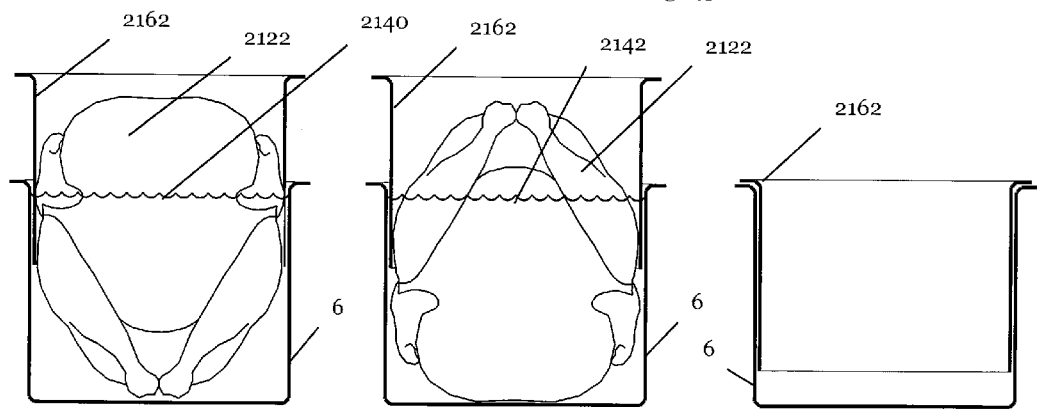
Fig 144        Fig 145        Fig 146

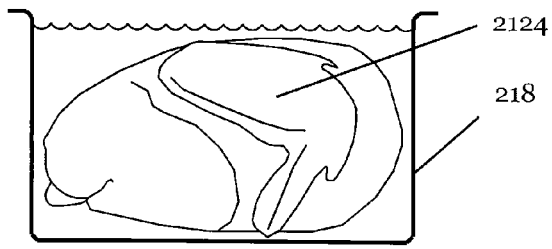
Fig 147 - prior art
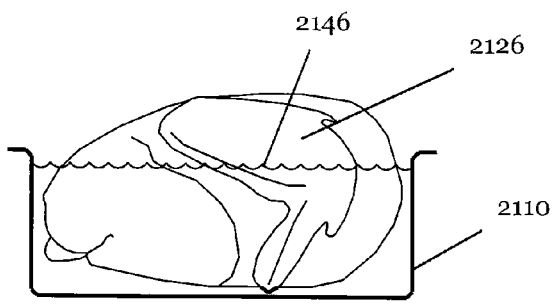 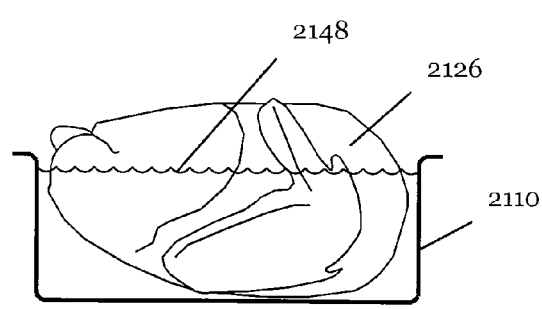
Fig 148　　　　　　　　　　　　Fig 149
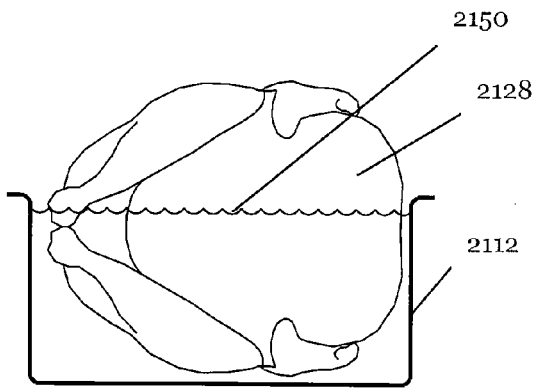 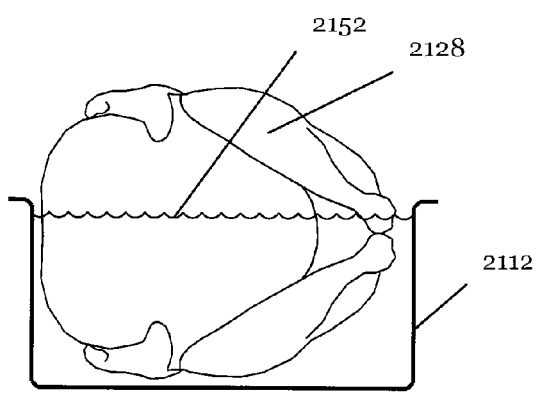
Fig 150　　　　　　　　　　　　Fig 151

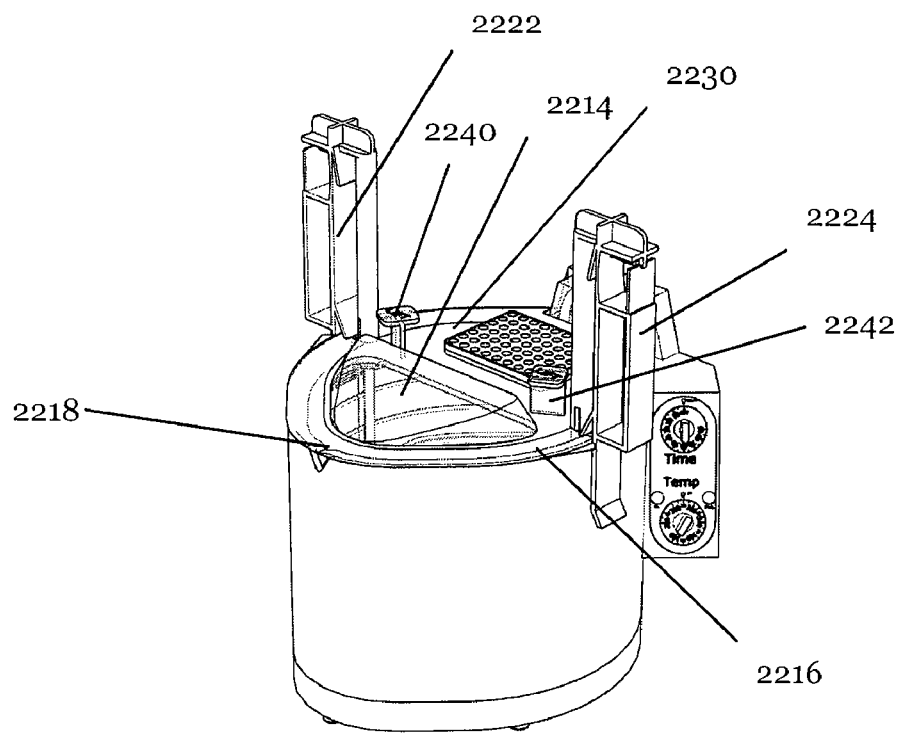
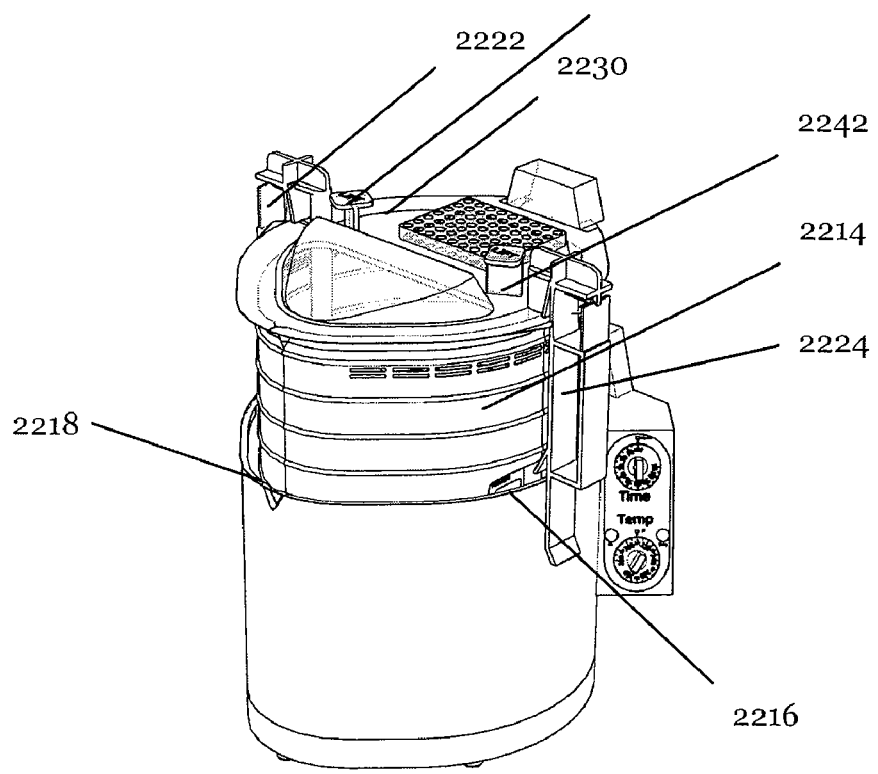
Fig 161

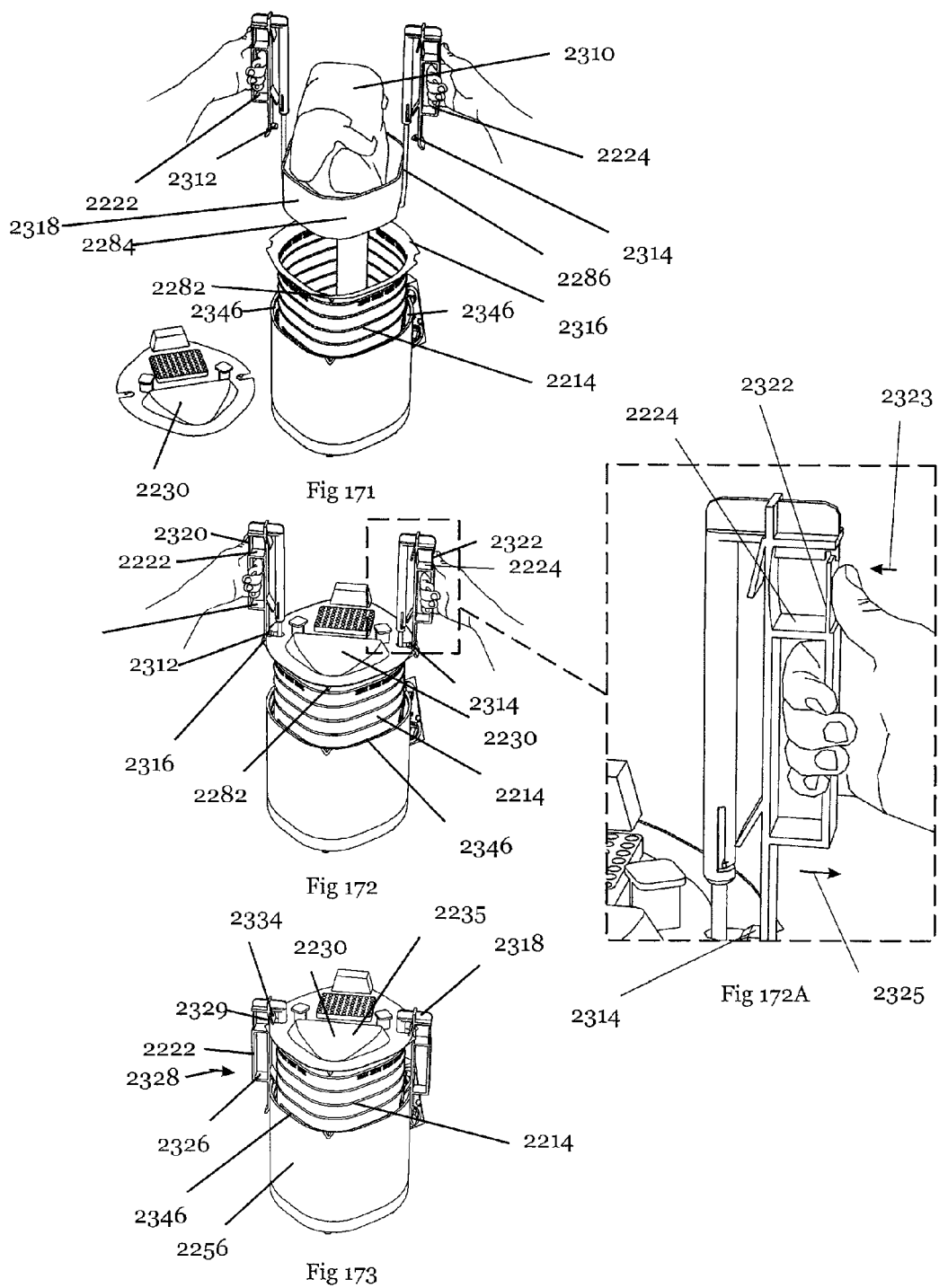

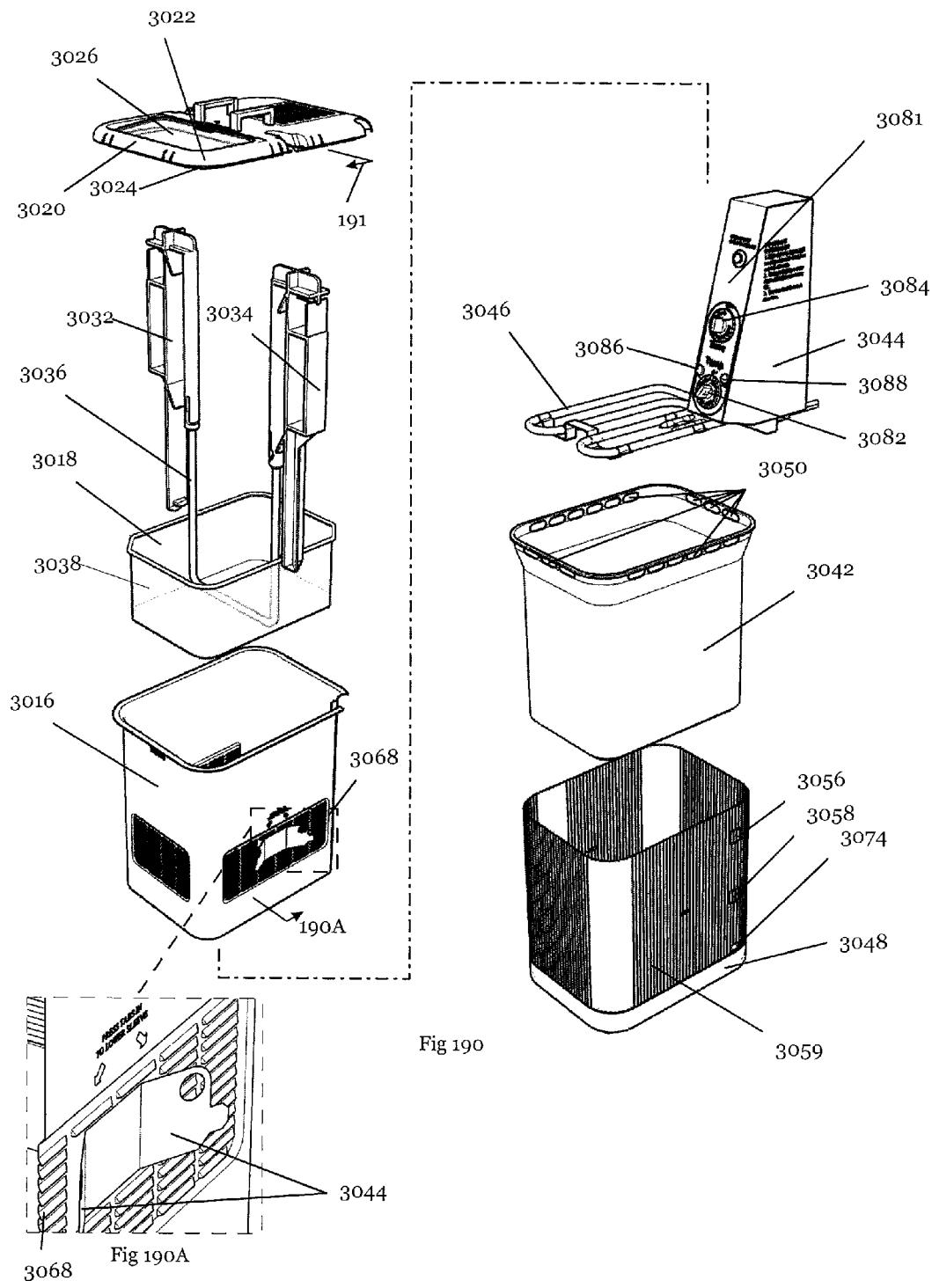

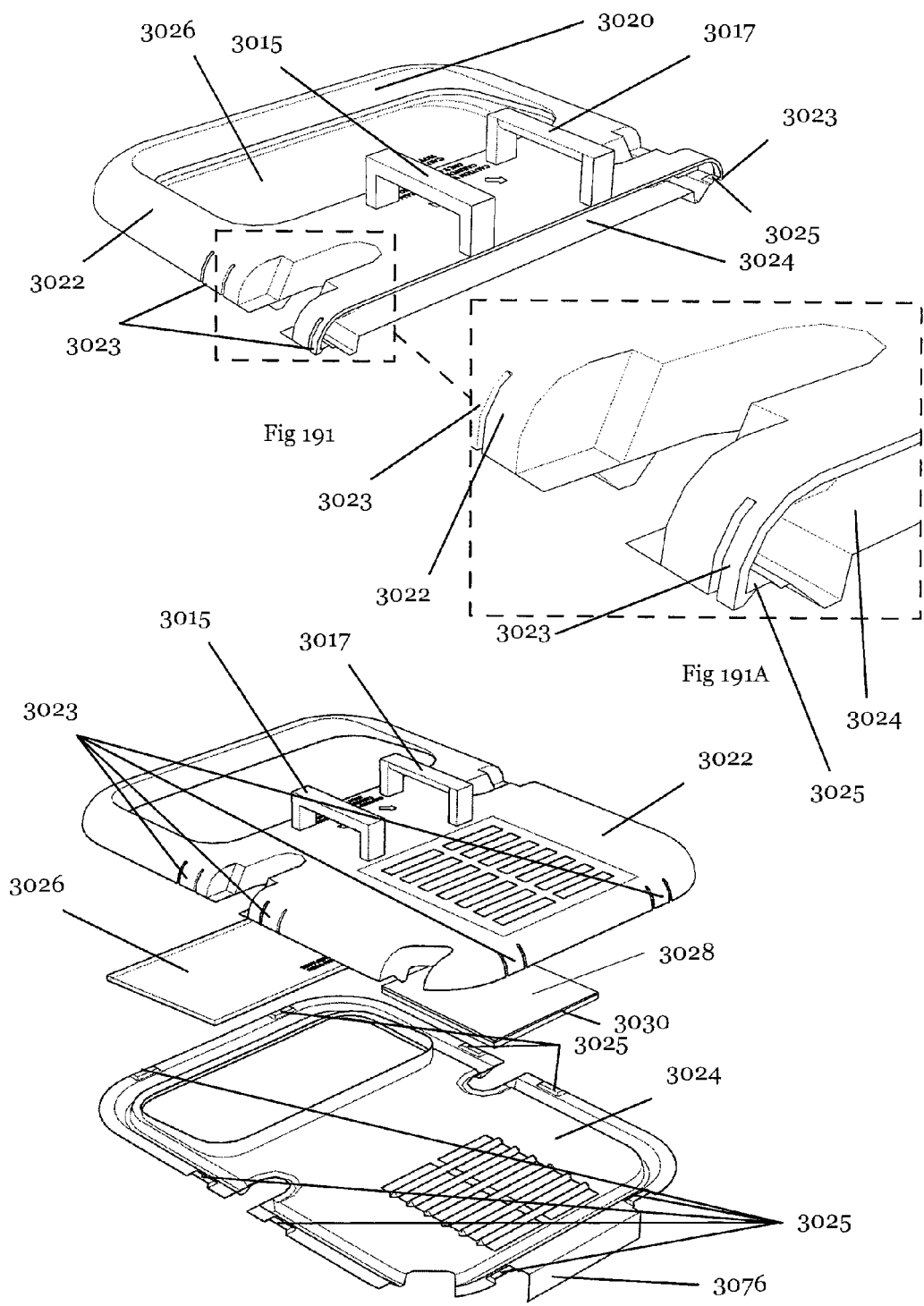

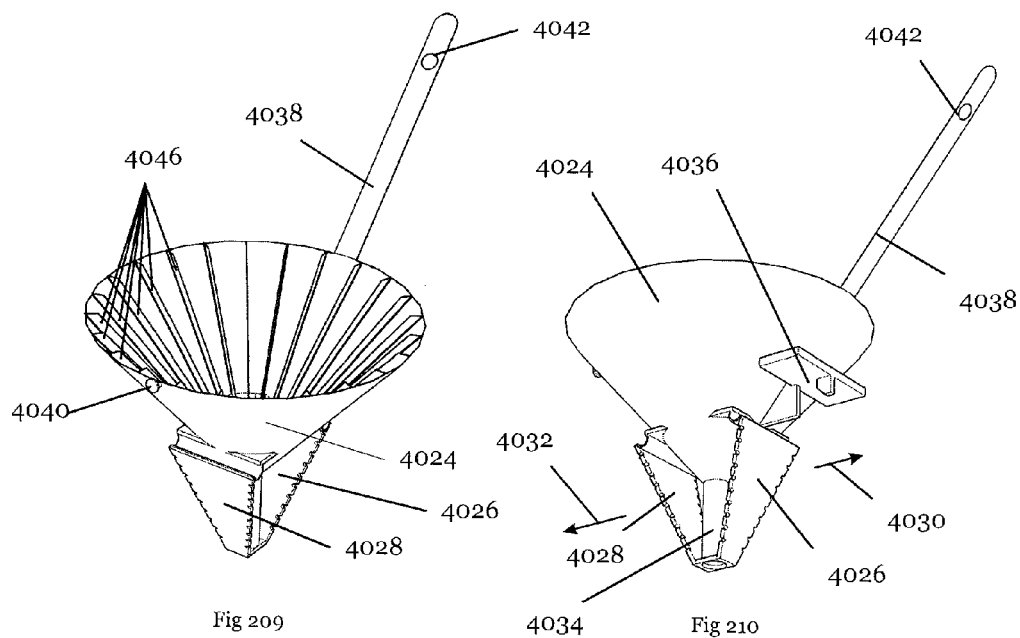
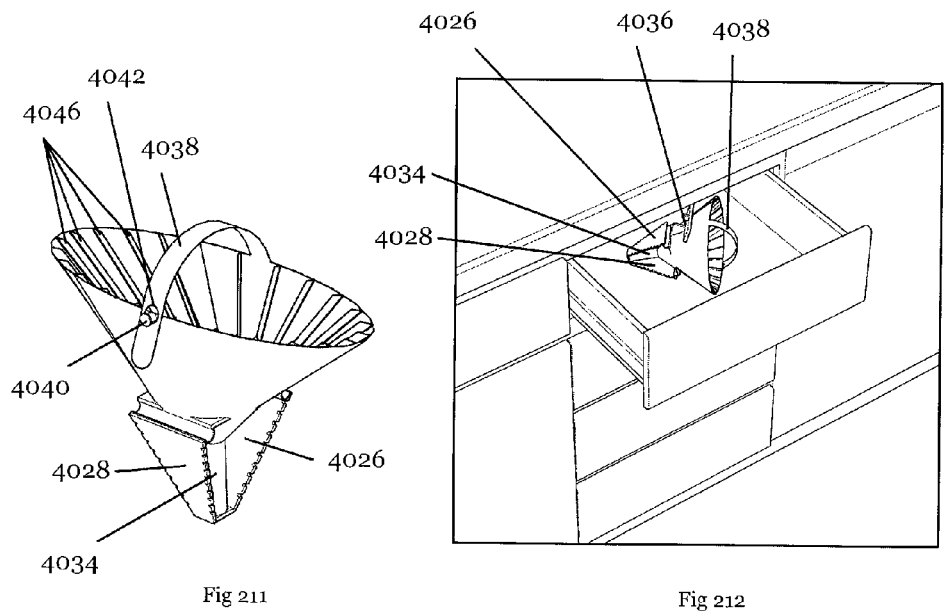

DEVICE TO EFFICIENTLY COOK FOOD

CROSS-REFERENCE TO RELATED APPLICATIONS

This application is a Continuation of U.S. patent application Ser. No. 12/775,725 filed May 7, 2010 now U.S. Pat. No. 8,186,265 which is a Continuation-in-Part of U.S. patent application Ser. No. 12/251,019 filed Oct. 14, 2008 which is a Continuation-in-Part of 1) U.S. patent application Ser. No. 11/345,187, filed Feb. 1, 2006, which claims the benefit of U.S. Provisional Application No. 60/706,859, filed Aug. 8, 2005; 2) U.S. patent application Ser. No. 11/425,317, filed Jun. 20, 2006, which is a Continuation-in-Part of U.S. patent application Ser. No. 11/345,187, filed on Feb. 1, 2006, which claims the benefit of U.S. Provisional Application No. 60/706,859, filed Aug. 8, 2005; and 3) U.S. patent application Ser. No. 11/539,655, filed Oct. 9, 2006, which is a Continuation-in-Part of PCT Patent Application No. PCT/US2006/30946, filed Aug. 8, 2006, which claims the benefit as a PCT application filing of U.S. patent application Ser. No. 11/425,317, filed Jun. 20, 2006, which is a Continuation-in-Part of U.S. patent application Ser. No. 11/345,187, filed Feb. 1, 2006, which claims the benefit of U.S. Provisional Application No. 60/706,859, filed Aug. 8, 2005, all of which are incorporated herein by reference.

FIELD OF INVENTION

The present inventions are directed to devices which deep fry and otherwise cook food in hot liquid.

BACKGROUND OF INVENTIONS

Although devices to deep fry foods are very common, they have few basic design changes since their inception. Generally these machines in simplest terms have a pot containing enough oil to fully immerse foods to be fried, along with a heat source to bring the oil to frying temperature.

What is known today in the art of home use deep fat fryers are small countertop devices. Such home use countertop devices have a very limited capacity, such as the ability to cook only a few ounces of French fries or the like in up to about 8 quarts of cooking oil. Besides lacking capacity, such conventional devices are inconvenient to use. Typically, a user must first pour cooking oil into the device and preheat the cooking oil before cooking can commence. Preheating the oil can take from a few minutes to more than half-an-hour, after which time the user must then return to immerse the food into the hot oil. If the user returns too soon, the oil is not fully heated, resulting further waiting by the user before using the device.

After oil preheating, the food must be immersed into the oil. Immersing food into the extremely hot cooking oil can be a dangerous process. For example, a user might be holding onto a short handle just a few inches away from the exposed surface of the hot cooking oil while trying to gently lower a basket full of food at the end of the handle. Upon placing the basket and the food contents into the hot oil, the oil can erupt with boiling, and/or sputtering that could burn the user, and that could possibly result in the basket being dropped and splashing into the hot oil should the user become burned during the process and let go of the basket to avoid further harm. Dropping the basket into the hot oil, however, could result in a more violet result that could cause further harm to the user. In many devices, the surface of the hot cooking oil may be fully exposed when the food is being lowered into the oil, thus presenting other safety hazards of accidental contact with the extremely hot oil.

Once the desired food content is immersed in the hot oil, the cooking process can take anywhere from a few minutes to more than an hour. At the end of the cooking process, the user must be present at a precise time to remove the food from the hot cooking oil. If the user arrives too late, the food may be overcooked. If the user arrived too soon, they may have to wait until the food is fully cooked, or have undercooked food.

Next, drainage of the oil from the food is required. This again can take anywhere from a few minutes to over half-an-hour. After the food has been drained, the user must again return to serve the food.

Deep frying in these devices whole pieces of food which cannot be subdivided has several disadvantages. First, there must be sufficient oil heated in the oil containing cooking pot to fully immerse and fry the non-dividable food to be cooked. Cooking oil can be expensive and difficult to dispose of. Common deep fryers, by fully immersing the food they fry, generally use substantial quantities of cooking oil.

Hot cooking oil can also present substantial safety hazards, both from the dangers of the hot oil being spilled, and from the danger of sputtering and splattering of hot oil. There is also the danger of food being accidentally lowered too quickly or dropped into the hot oil causing splashing and spraying of hot oil. Generally, the more oil there is, the more danger.

The cooking oil that is used in such conventional countertop devices may only last for one to about four uses, after which the oil must be changed. Filtering the cooking oil between uses generally helps to increase its useful life. While some commercial units have pumps and filters to periodically cleanse their cooking oil during and/or between uses, such countertop home units generally have no means for such oil filtration. Thus, the cooking oil in these devices must either be changed as noted above, or filtered by a manual method that involves a multi-step task of physically removing the oil from the device, filtering it outside of the device, and then reintroducing the oil into the device.

The oil from such countertop device is removed by pouring the oil from the device into a disposal container, and then discarding the oil by pouring it down the kitchen drain. The practice of discarding used oil down the drain may clog the drain pipes. Disposing of used oil is generally also a cumbersome process, as the heavy, greasy, oil must be carefully poured directly from its cooking pot, which generally has no pour spout, into the narrow neck of a containment bottle or the like for further handling.

Besides imparting a bad taste to foods being cooked, using the cooking oil too many times may result in the oil foaming like a bubble bath either when food is lowered into it, or spontaneously upon the oil being heated, with or without food. Such foaming vastly increases the amount of space required to contain the oil and food, and may result in the fryer being overflowed and hot oil potentially destructively dripping down to the countertop or other surface upon which the device is resting.

These small, countertop home use deep frying device also generally have no easy way of being cleaned. While the internal portion of the cook pots are typically cleaned by soap and water like any other cooking pan, because these devices also include electrical components for heating the device, it is important that such electrical components does not get wet or be exposed to water during the cleaning process. Thus, when cleaning such devices, it is important to avoid having water overflow into the electrical components particularly when the water is dumped out of the pans.

Large cooking pots required to fully immerse unitary pieces of food also means the devices may occupy substantial amount of valuable counter or floor space.

In recent years, large deep fryers, referred to as turkey fryers, have been successfully introduced into the United States market. Commonly these have very large cooking pots which are able to contain between 4 and 8 gallons of heated cooking oil while fully immersing and frying a medium to large sized turkey. These units have the capacity to hold from 2½ gallons to over 10 gallons of cooking oil, and the capacity to cook foods ranging from a few pounds, to well over a 20 pound turkey. Typically, such turkey fryers comprise a large metal bucket about a foot in diameter and a-foot-and-a-half high, which sits atop an open-frame support that contains a bottle gas fired burner. Some turkey fryers have metal lids similar to those found on saucepans, which are held in place only by gravity. These have gained a reputation of being unsafe.

Cooking turkeys or other large integral pieces of food, such as large cuts of meat, or large fish, vegetables, pastries, or fowl presents some significant problems.

Except for typically having no electronics to complicate cleanup, such conventional turkey fryers have most or all of the same problems described above, except on a larger scale due to their increased size. For example, instead of, in a small home countertop deep fat fryer, lowering a few ounces of French fries contained in a small basket into a few quarts of cooking oil, such turkey fryers may present their users with the task of with slowly lowering a 15 pound or larger turkey into over 5 gallons of hot, sputtering cooking oil. The cooking oil in such turkey fryers are contained in a tall, top-heavy, open bucket that rests precariously on an unstable platform which houses an open flame for heating the bucket contents. Thus, the act of accidentally dropping the food into the hot oil of such turkey fryer can have a result of a larger magnitude than splashes causes from dropping French fries into a few quarts of hot oil. Accidentally dropping a 15 pound turkey into the turkey fryer can cause the displacement of 5 gallons of hot oil, which could contact the user and/or which could come into contact the open flame burner and ignite, potentially resulting in further injury and/or property damage.

Safety issues may also arise from where and when turkey fryers are used. Generally, they must be used outdoors due to the open flame cooking element. The two most common times during the year that such turkey fryers are used in the United States are during Thanksgiving and Christmas. Cold and/or inclement weather are generally the rule in many parts of the United States during these times. A user may typically be in his or her driveway, under these weather conditions while trying to cook a large turkey. Additionally, there may be ice and/or snow on the ground. The task of slowly lowering a heavy turkey away from the user's body into a large, top-heavy, bucket containing hot oil precariously resting atop an unstable platform with an open flame may be dangerous under the best of circumstances, but being outdoors with cold and inclement weather, possibly combined with slippery footing, may make it especially hazardous.

Cleanliness may also be a problem with deep fat frying. During the deep fat frying cooking process, fats and oils may vaporize, and be disbursed into the air. Filtering air before it leaves a deep fat fryer may help to reduce contaminants in room air including cooking odors.

Viewing items being cooked may be a problem for both countertop home deep fat fryers as well as turkey fryers. Many home deep fat fryers have small horizontal windows in their lids to view the cooking progress. These windows, however, are virtually useless as steam condenses on their horizontal window surfaces and obfuscates the view. Also, construction of these small viewing windows includes many pieces, which are both expensive and time consuming to fabricate and assemble. In contrast, the food being cooked in a turkey fryers may be viewed by either looking into directly into the cooking bucket, in devices that are constructed without having a lid, or by removing any such lid that the turkey fryer may have. Both these situations present a hazard of directly exposing the user to the cooking oil with no intervening safety barrier.

Turkey fryers have at least one other typical hazard, that of overheating the oil due to lack of thermostatic control. Such fryers are typically heated by bottled gas-fired burners that generally have no thermostats or temperature control to shut the flame down when the oil has reached cooking temperature. By simply failing to turn down or off the flame at the appropriate time, cooking oils can be accidentally overheated to a point where they may produce smoke and possibly spontaneously combust into flame.

Recently, indoor use electric turkey fryers have made it into the marketplace. These units are primarily used on a kitchen countertop. The food to be cooked is hand lowered into the hot cooking oil at the end of a coat hanger like handle hooked onto a bucket-like bail handle, which is attached to a perforated pot which holds the food. Adding even a minimal 36 inch countertop height, and the 14 inch turkey fryer height, and the 8 inch high perforated bucket, and the 14 inches of handle above it, this may require the user to lift a 14 pound or larger turkey, away from their body, a distance of about 72 inches into the air just to load it. As noted above, the task of lowering the turkey into the hot cooking oil must slowly avoid splashing the hot oil. This is difficult for a six foot tall man, but may be nearly impossible for those of smaller stature.

In addition, the presence of an electrical cord introduces the opportunity for these new units to be accidentally pulled off the countertop by their cords, thus presenting new potential safety hazards associated with spilled hot cooking oil.

In addition, where wall powered electric heat is used to heat the oil, there may not be adequate power from residential wall plugs to heat large amounts of oil and food and keep them at desired frying temperatures.

Another issue in deep frying large foods is the cost of oil used in the cooking process. Cooking oils may be very expensive, particularly for higher quality oils. Large amounts of oil may also be difficult to store, and may be hard to dispose of once they are no longer of use.

In addition, large oil pots are needed in the frying process to fully immerse the large foods. This translates to expensive manufacturing costs, as well as costly shipping and large amounts of storage both before and after sale. It also means requirements for large amounts of valuable either countertop or floor space in order to use each of the full immersion devices.

BRIEF DESCRIPTION OF PREFERRED EMBODIMENTS

Examples given herein are intended to help increase the understanding of the reader regarding the present inventions, and are not intended to be exhaustive or intended in any way to be limiting to the scope of the actual inventions themselves which shall be limited only by the legally interpreted scope of the claims which may be granted by the patent office.

Inventions described herein may be incorporated independently from one another and/or may be used in any combination from solitary use to any combination or permutation feasible with one another.

Preferred embodiments of the present inventions may have cooking pots which have capacities enough to immerse a portion of the food to be cooked, but have insufficient capacity to fully immerse the food while cooking.

One or more of the following advantages may be achieved by doing this. This may reduce manufacturing as well as storage and transportation costs, and may reduce the need for valuable countertop or floor space while in use due to a smaller cooking pot footprint when compared to devices which fully immerse the food to be cooked.

This may also reduce the amount of oil needed to cook food, which can result in fewer and less dangerous safety hazards, lower operating costs, reduced disposal problems.

This may also reduce the amount of unitary food being cooked at any moment in time which can desirably increase cooking temperatures, and it may desirably hasten oil heat recovery time after initial food immersion.

Other advantages of partially immersed cooking may include, but are not limited to: a smaller, easier to use, appliance; and a more versatile appliance which can be used in locations formally unsuitable for full immersion cooking devices.

A method of cooking which may be incorporated by these preferred embodiments is to first cook up to a given point and including the given point of being fully cooked, a portion, but less than all of the unitary food being cooked in a first cook cycle where the unitary food remains stationary and partially submerged in hot cooking liquid during the cooking. And then, after the first cook cycle is complete, reposition the food, typically by hand, so that portion or portions of unitary food not cooked in the first cook cycle are then cooked up to a given point and including the given point of being fully cooked, in a second cook cycle, again where the unitary food being cooked remains stationary and partially submerged in hot cooking liquid. This method may be terminated after the second cook cycle providing all portions of the food are cooked at least once. FIGS. 142 to 145 and 148 to 155, show oil levels 2136, 2138, 2140, 2142, 2146, 2148, 2150, and 2152 which submerge more than half, but less than all, of the unitary food being cooked and thus only have need for a first and a second cook cycle.

Typically, portions of the unitary food are redundantly cooked during multiple (two or more) cook cycles. If, portions of the unitary food remain uncooked after the second cook cycle, the second cook cycle may be repeated again and again as necessary to cook all portions of the unitary food at least once.

Unlike devices which fully immerse and cook unitary foods all at once, preferred embodiments of the present inventions may cook in hot cooking liquid only a portion of the food at any given time.

Contrary to common sense, it has been observed that typically any portion or portions of the foods which may be repetitively or redundantly cooked in hot liquid during multiple cook cycles can appear and taste virtually identical to those adjacent portions of the unitary food which were cooked only once. This also appears to be true for non-unitary divisible food as well, such as a basket full of French fries, where the food is not rearranged between cook cycles. Likewise, contrary to what might be expected, generally portion or portions of unitary food which are cooked in a first cook cycle can appear and tastes virtually identical to those portion or portions of unitary food which are cooked in subsequent cook cycles.

This method of cooking also may reduce safety hazards, because of the use of less oil when compared to devices which fully immerse foods.

This method also may increase the efficiency of cooking by reducing the amount of food being cooked at any moment in time.

Less heating energy may be required to properly cook only a portion of food at a time versus cooking all of the food at once, because at any moment in time less food is being cooked. This may translate into higher, more desirable cooking temperatures. This may be particularly true where large unitary foods, such as a medium to large sized turkey, are being cooked using residential standard outlet power which may provide only limited amounts of energy.

This apparatus and method may result in a substantially higher ratio between the size of the food being cooked and the size of the apparatus needed to cook it.

A higher ratio of heating power to food mass being cooked can also mean that hot oil temperature drops occurring when the food is first introduced into cooking oil can be overcome more quickly to bring the oil back to desired cooking temperatures.

Less cooking oil can also translate to lower operating costs, and reduced oil disposal problems.

FIGS. 142-145 and 148-155 show several less than full immersion preferred embodiments in cross-section with fowls 2120, 2122, 2126, 2128, 2130, and 2132 used to represent unitary pieces of food in various advantageous cooking positions.

Unitary pieces or articles of food herein mean any food which is innately not subdivided. This may include whole fowl such as, by way of nonlimiting example, turkeys, chickens, ducks, and geese. It may also include meats such as, by way of nonlimiting example; roasts and leg of lamb. It may also include any other food which is a single piece.

FIGS. 141 and 147 show examples of prior art devices which fully immerse unitary foods, as represented by fowls 2118 and 2124, being cooked. When FIG. 141 showing prior art, as an example, is compared against FIGS. 142 through 146 which incorporate some of the present inventions and have fowls 2120 and 2122 placed in analogous positions to fowl 2118 in FIG. 1, it can be seen that cooking pot 2102 in FIG. 141 is at least taller than cooking pots 2104 through 2106 shown in FIGS. 142 through 146, due to FIG. 141's device requirement that it fully immerse fowl 2118.

Cooking pot 2102 in FIG. 141 may also be larger at its base than cooking pots 2104 and 2106 in FIGS. 142 through 146 at least because taller cooking pot 2102 may require a larger base for stability. This may mean that the prior art device shown in FIG. 141 may require more countertop or floor space while it is in use than the devices incorporating present inventions shown in FIGS. 2102 through 2106.

Further, the most common way used by prior art to position the unitary food is shown in FIG. 147. Preferred embodiments one through three contained herein may position the unitary food as shown in FIGS. 142 through 145. As can be readily seen by comparing FIG. 147 with FIGS. 142 through 145, less counter space is generally taken by preferred embodiments one through three than is taken by. It can also be readily seen by the same comparison that the most common prior art generally needed more cooking liquid.

It may also be apparent through inspection of FIGS. 141 through 146 that less frying oil is used in the preferred embodiments in FIGS. 142 through 146 which incorporate present inventions, as evidenced by oil levels 2136, 2138, 2140, and 2142, than are used in the full immersion prior art device of FIG. 141, as shown by oil level 2134.

FIGS. 144 through 146 show sleeve 2162 which is an annular sleeve open at its top and bottom which may be extended upwards as shown in FIGS. 144 and 145 to at least safely accommodate foam, bubbling, and sputtering which may be associated with the frying foods such as fowl 2122. Annular herein is defined as any ring shape or member having a ring shaped cross-section including, but not necessarily limited to: regular or irregular curved ring shapes, and/or regular or irregular polyhedron ring shapes, any regular or irregular ring shape, or any combination of the above.

FIG. 146 shows sleeve 2162 in its lower retracted position, which may assist in efficiently shipping and storing a preferred embodiment, and using such a preferred embodiment with smaller foods. Sleeve 2162 need not seal liquid tight against cooking pot 6 in order to provide advantages.

A preferred embodiment of the present inventions may have one, or a combination of the following features and advantages.

It may deep fat fry small and large foods up to, as an example, a large 20 pound turkey.

It may also be used as a food steamer for steaming items such as vegetables, clams, crabs, and many other foods.

A preferred embodiment may be used as a roaster, similar to roasters marketed today under the Nesco brand-name. Such a device may roast food, or be used to prepare soups and stews.

A preferred embodiment may be used to boil foods in water, such as eggs, lobsters and vegetables.

A preferred embodiment may be electrically powered.

A preferred embodiment may be used indoors.

A preferred embodiment may be used on a countertop.

A preferred embodiment may have its cooking functions controlled using only a simple, single, user-set timer.

A preferred embodiment may use its mounted food support as an intervening safety barrier between a user and hot cooking liquid contained within the embodiment.

A preferred embodiment may have a lid that can be latched down as a barrier between a user and hot cooking liquid.

A preferred embodiment may comprise means for lowing food into hot cooking liquid under motor power.

A preferred embodiment may have a compact food lifting and lowering mechanism that fits within the cooking enclosure. Such a mechanism may use a flexible tension member. Alternatively, such a mechanism might use a rotating screw threaded rod. Such a mechanism may be removable to facilitate embodiment cleaning.

A preferred embodiment may have a control box enclosure that can be removed from the rest of the device for cleaning or other purposes. When removed, such an enclosure may automatically disconnect internal electrical components from electrical power by separating a plug and receptacle connecting the enclosure with the rest of the device. Such an enclosure may house the food lifting and lowering mechanism. Such an enclosure may also solidly connect to a heating coil.

A preferred embodiment may be vented to cool its outer enclosure. The outer enclosure may also be constructed from materials, such as plastics and the like, to reduce the potential of a user getting a burn from touching the outer enclosure.

A preferred embodiment may comprise means for lowering food into the hot cooking liquid immediately upon the cooking liquid becoming hot enough to cook.

As a safety and a convenience feature, a preferred embodiment may not require a user to be present when food is being lowered into the hot cooking liquid.

Also as a safety and a convenience feature, a preferred embodiment may not require a user to be present when food is raised from the hot cooking liquid.

A preferred embodiment may comprise means for lifting the food out of the hot cooking liquid under motor power.

A preferred embodiment may comprise means for lifting food out of hot cooking liquid at a user predetermined time.

A preferred embodiment may comprise means for automatically draining excess cooking liquid from foods after cooking is complete. It may also incline foods to facilitate this draining.

A preferred embodiment may be easily emptied of cooking liquid using an inexpensive, simple drain tube, hose or conduit that may be flexible to facilitate the draining process.

Likewise, wash and rinse water may also be emptied using the same simple, inexpensive, simple drain tube, hose or conduit.

A preferred embodiment may use such a drain hose as both a means for transporting drained liquids, and as a valve having no moving parts. It may also have a redundant, inexpensive, simple plug or pinch valve for safety.

A preferred embodiment may use a single, accurate, inexpensive preset thermostat instead of an expensive relatively inaccurate adjustable thermostat. Likewise, it may use two or more such inexpensive preset thermostats where two or more specific cooking temperatures are needed, such as cooking with hot oil and cooking with boiling water.

A preferred embodiment may use an inexpensive external heating element.

A preferred embodiment may have a lid whose area is over 90% transparent to facilitate viewing of foods being cooked, and thus stimulate appetite appeal, and aid in gauging of food cooking progress. The transparent portions of the lid may be inclined to minimize build up of vision obscuring moisture.

To accommodate larger foods, a preferred embodiment may have a concave lid which is over 20% deeper than it is wide moving radially from right to left across the lid surface. Such a concave lid may be transparent to provide an even more expansive viewing area of foods being cooked. Such a concave lid may be inverted and nested into an embodiment base to provide compact storage. Such a concave lid may be positioned close to the cooking oil level through use of a flexible, heat resistant gasket, which prevents any foam formed during the cooking process from escaping. Such a concave lid can be monolithic in construction. As an example, it might be injection mold to simplify construction, ease cleaning, reduce cost, and increase durability.

A preferred embodiment may have a lid that can be easily detached from the rest of the device for food insertion or removal, and/or for cleaning. Alternatively, the lid may be configured to be rotated back and rested in a stable open position for food insertion and removal.

A preferred embodiment may have a lid that can be latched down to prevent rapid egress of hot cooking liquid in the event the cooking device is tipped over, or it falls off a countertop or other supporting surface.

A preferred embodiment may be scaled to a height of not more than 16 inches to cook on a kitchen countertop having adjacent over-countertop cabinets.

A preferred embodiment may have side vents to minimize or eliminate damage to such over-counter cabinets.

A preferred embodiment may have handles on its side to facilitate movement and storage of the cooking device.

A preferred embodiment may have a spring loaded lid with a single latch to facilitate opening and latching the lid using only one hand.

A preferred embodiment may have handles at its foreword right and left hand corners to allow a user to open the device without putting their hands or arms in the direct path of hot vapors escaping from the cooking device's cooking cavity.

A preferred embodiment may attach an electrical cord using a magnetically coupled plug.

A preferred embodiment may use inexpensive low-temperature materials by insulating them from high temperature components using small insulation barriers.

A preferred embodiment may have a food support that is open without vertical walls on three of its sides, thus reducing construction costs, and minimizing embodiment countertop footprint.

A preferred embodiment may only need two user interventions to deep fat fry foods, as compared to conventional fryers which require four user interventions as described above.

A preferred embodiment may have a filter to condense and reduce cooking contaminants and odors from mixing with the room air.

A preferred embodiment may have a cooking oil filter disposed within its cooking cavity to strain cooking oil, and thus extend the oil's cooking life. In conjunction with this, or as an alternative, a preferred embodiment may have a filter assembly to strain cooking oil when it is being drained from the cooking cavity for storage or other purposes.

The following additional exemplary embodiment addresses real world marketing and cost considerations. This means, as in earlier exemplary embodiments, that not all desired features are provided.

DESCRIPTION OF FIGURES

These and other features and advantages of the present inventions will be appreciated as the same becomes better understood by reference to the following detailed description when considered in connection with the accompanying drawings wherein:

FIG. 114 is a forward perspective view of two food containment baskets 911, 911A stacked on top of one another in a first widely spaced stacking arrangement.

FIG. 115 is similar to FIG. 114 except food containment baskets 911, 911A stacked on top of one another in a second closely spaced stacking arrangement.

FIG. 116 is a forward exploded perspective view of three food containment baskets 911, 911A, 911B and including food support assembly 910.

FIG. 117 is a forward perspective view including control box 912 and enclosed heatsink 914.

Figure 91:
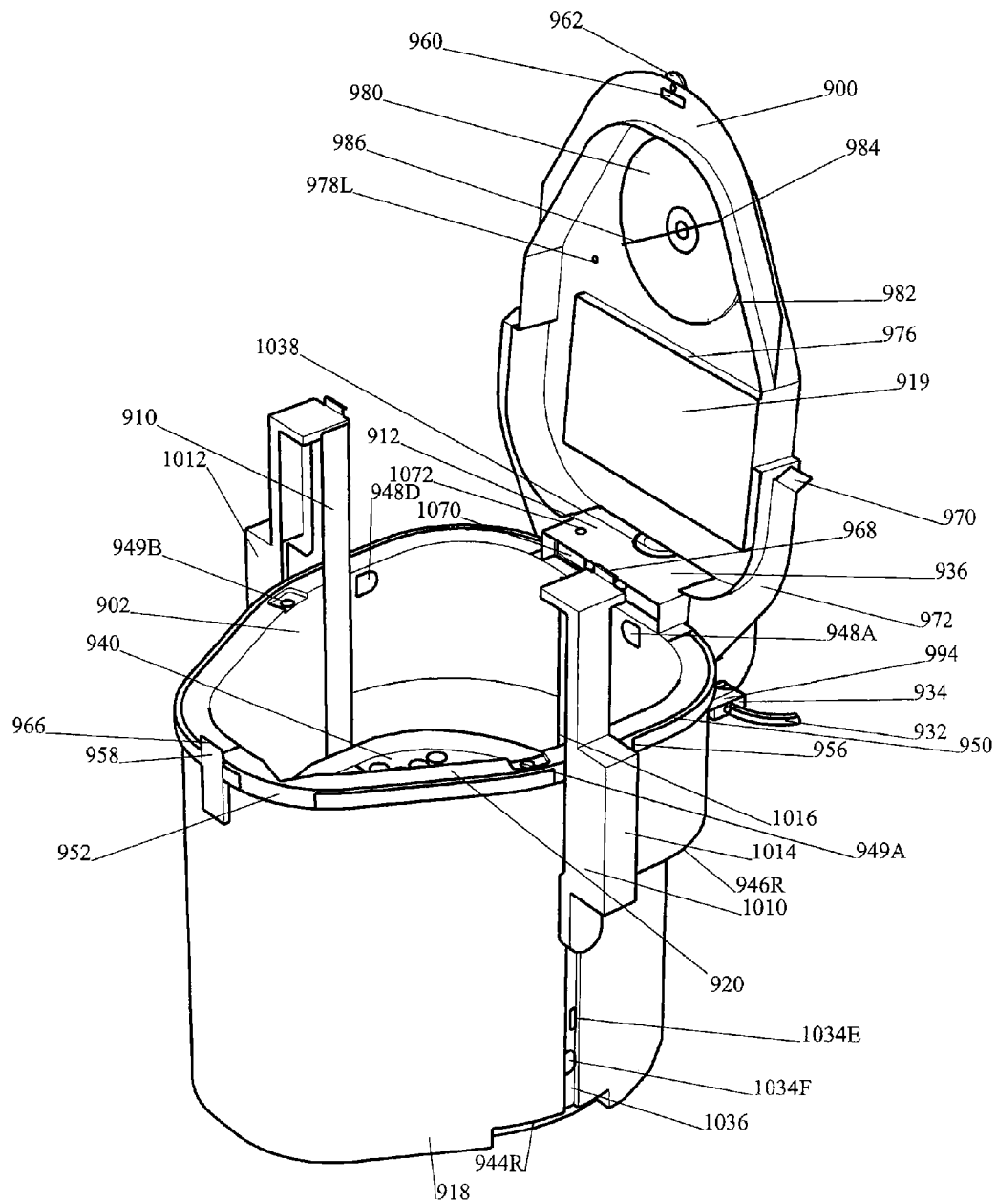
FIG. 91 is a forward perspective view of the exemplary embodiment shown in FIG. 90 with its lid 900 raised and its food support assembly 910 in place in its intermediate raised position.
Figure 118:
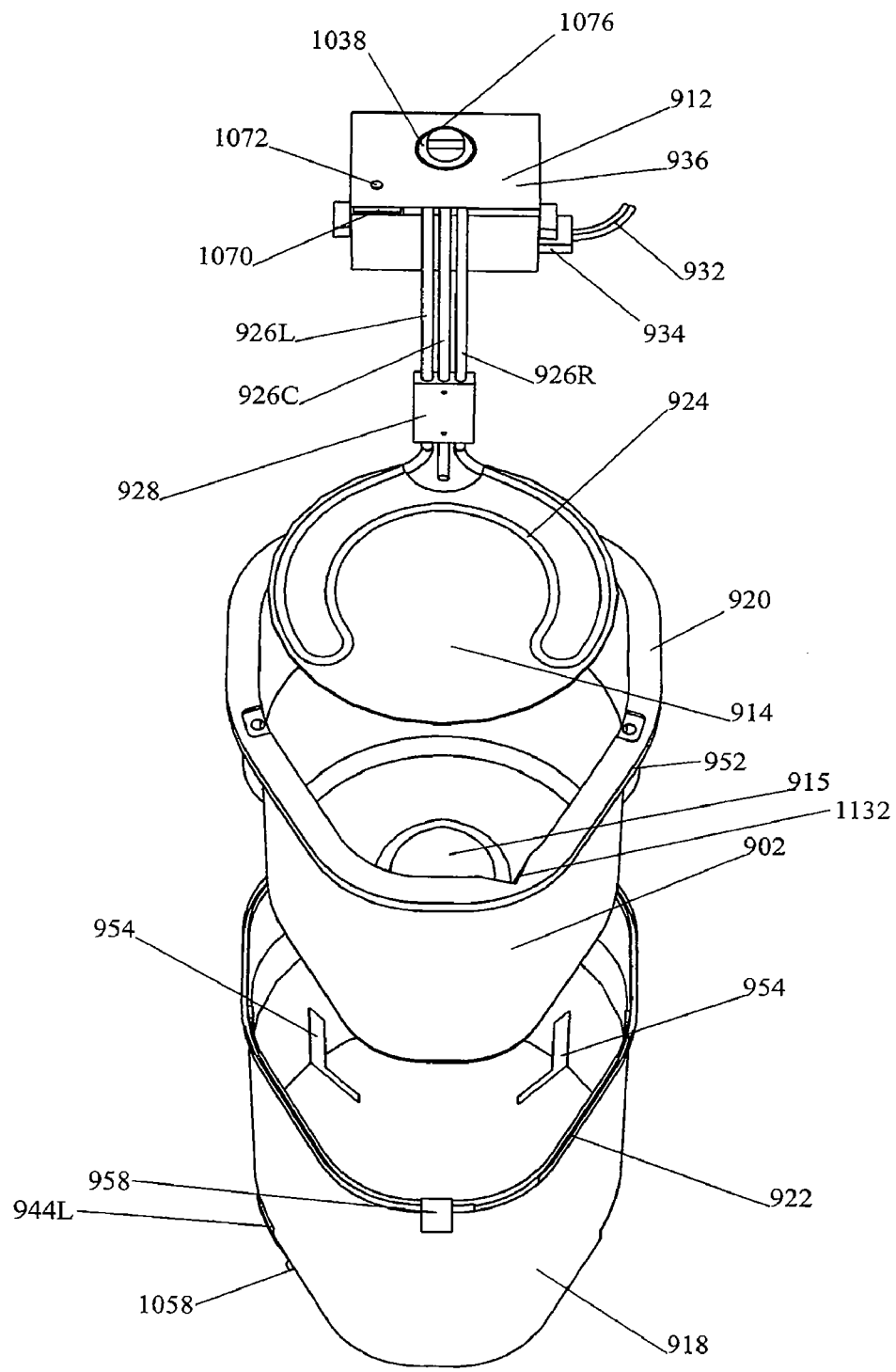

FIG. 118 is an upper perspective exploded view of the device shown in FIG. 91, but only showing control/heating assembly 936, cooking vessel 902, and outer enclosure 918.

Figure 119:
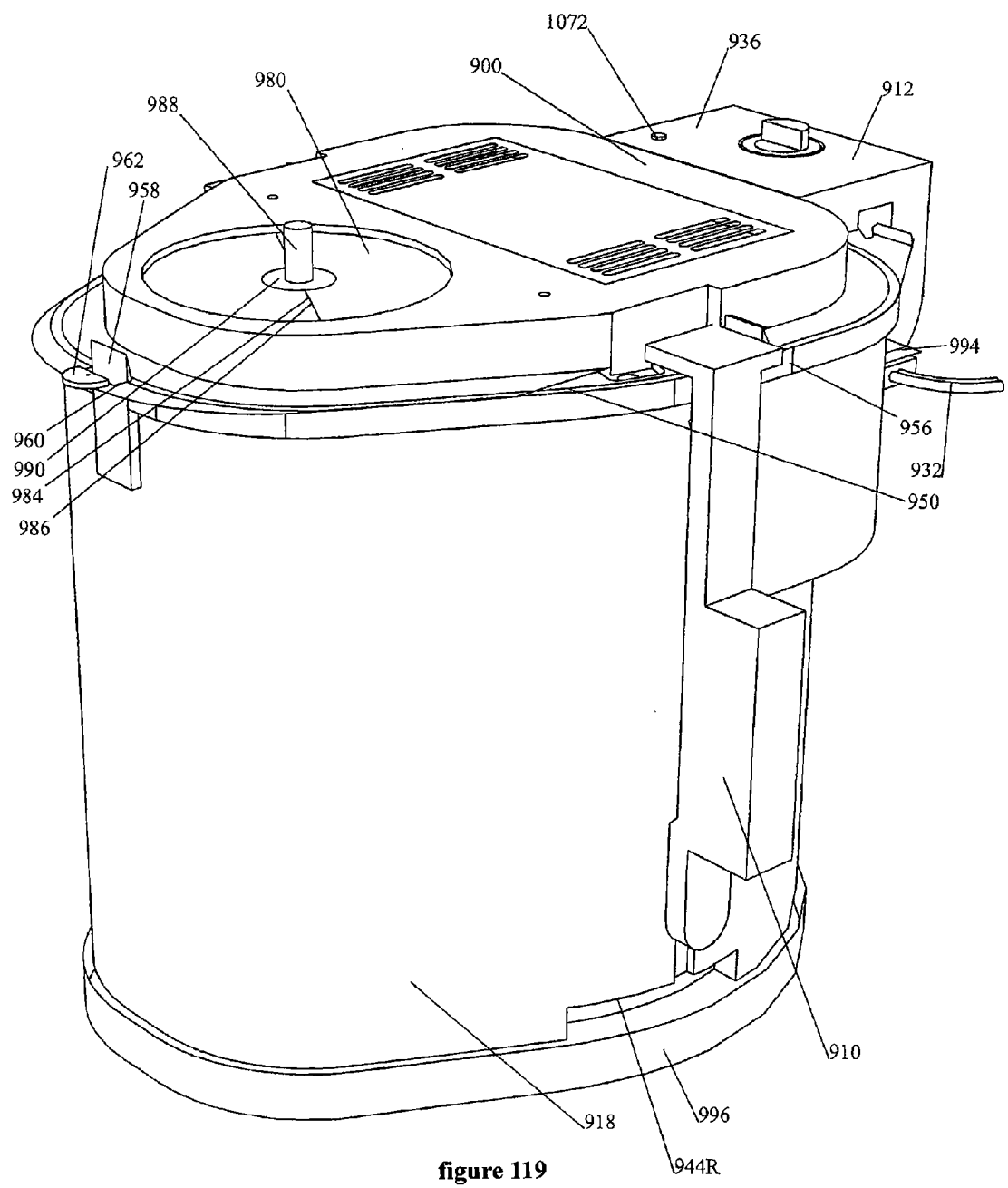
Figures 119A, 119B:
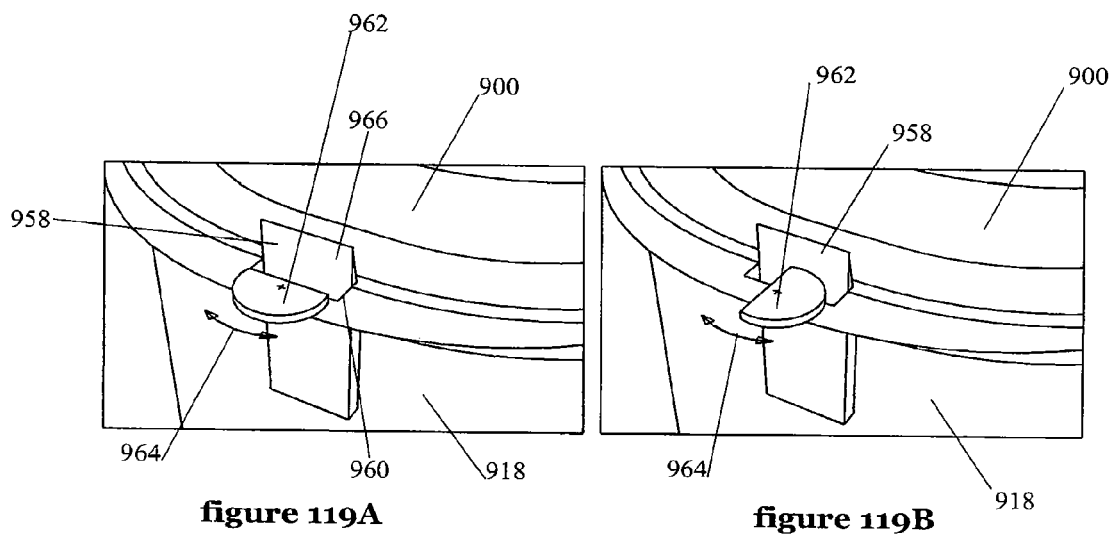

FIG. 119A and FIG. 119B are forward perspective views showing how latch lock 962 operates.

Figure 120:
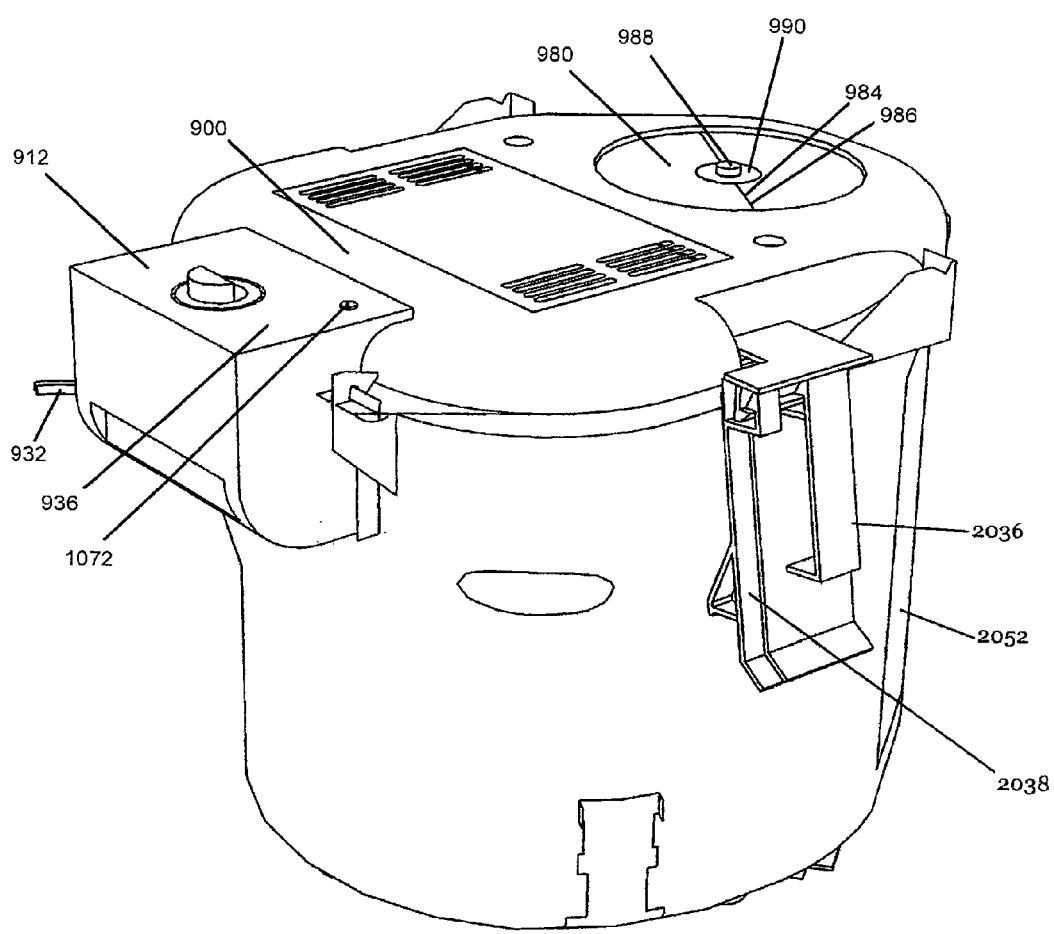
Figure 136:
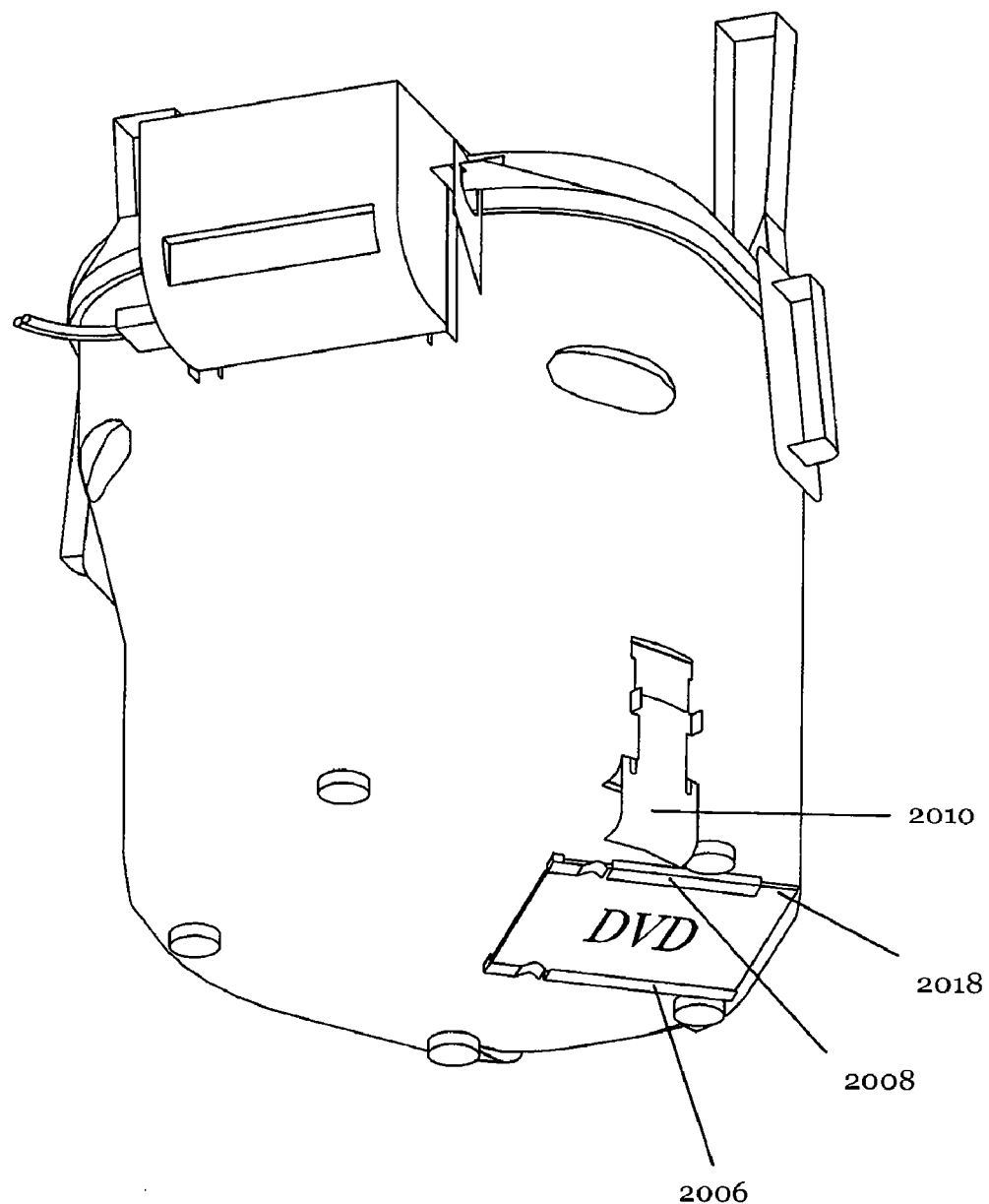
Figure 137:
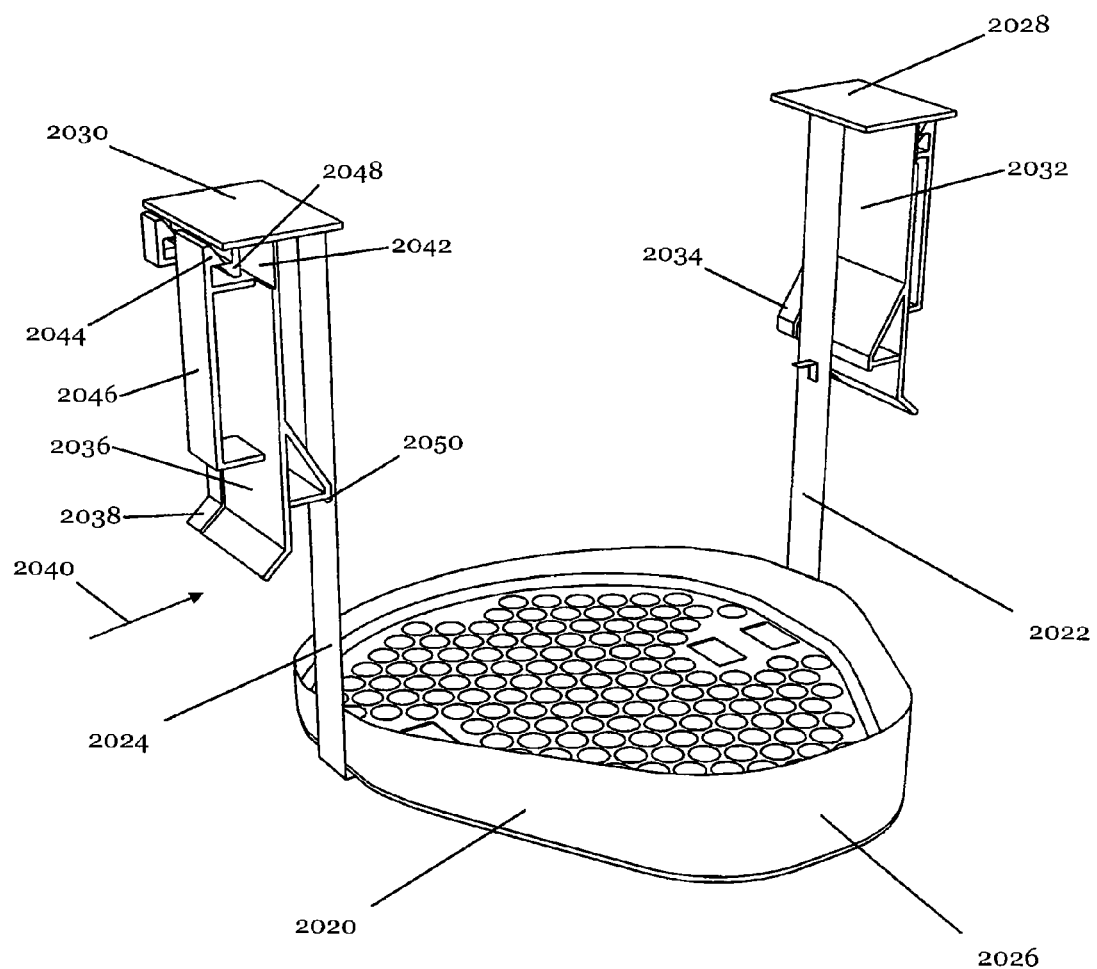
Figure 138:
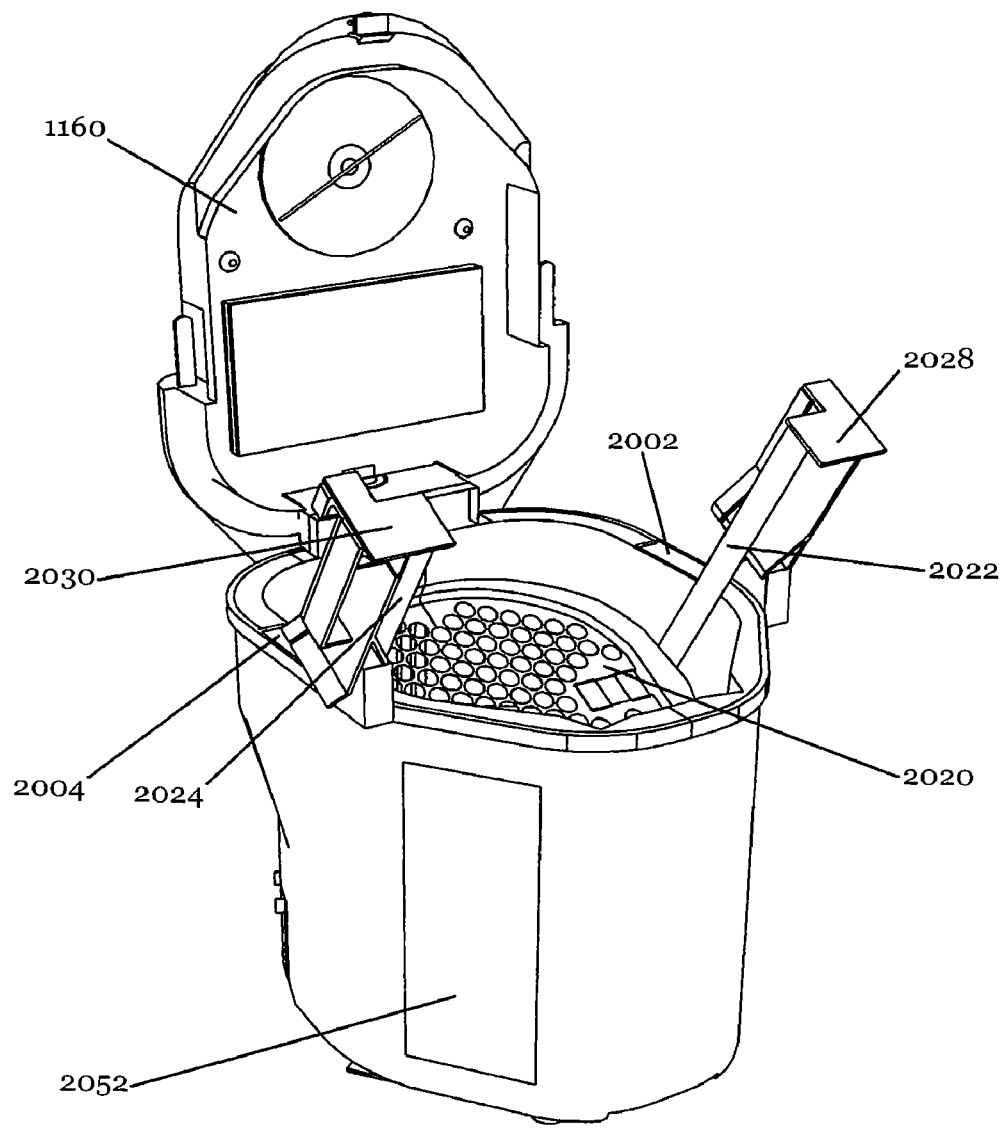
Figure 139:
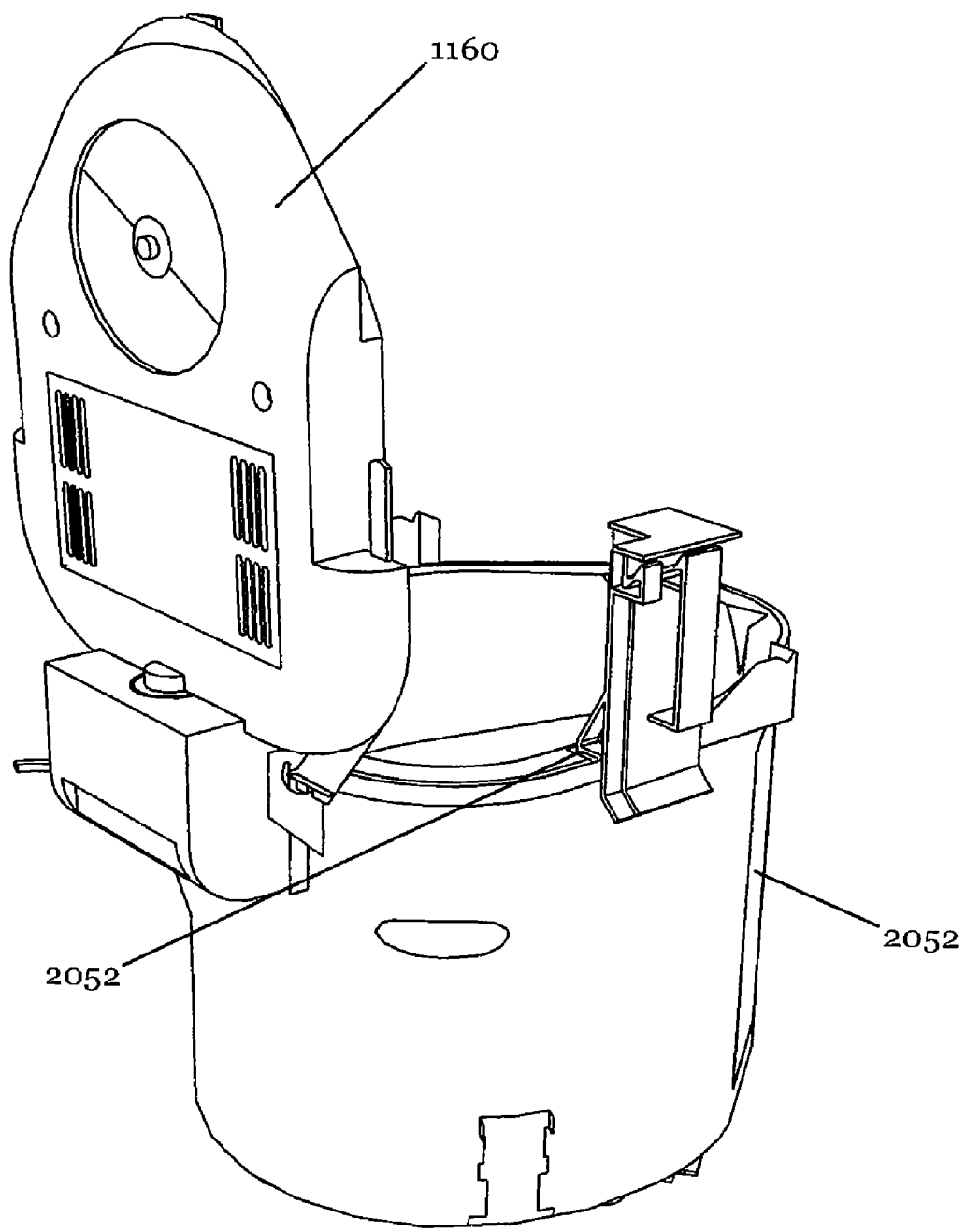
Figure 140:
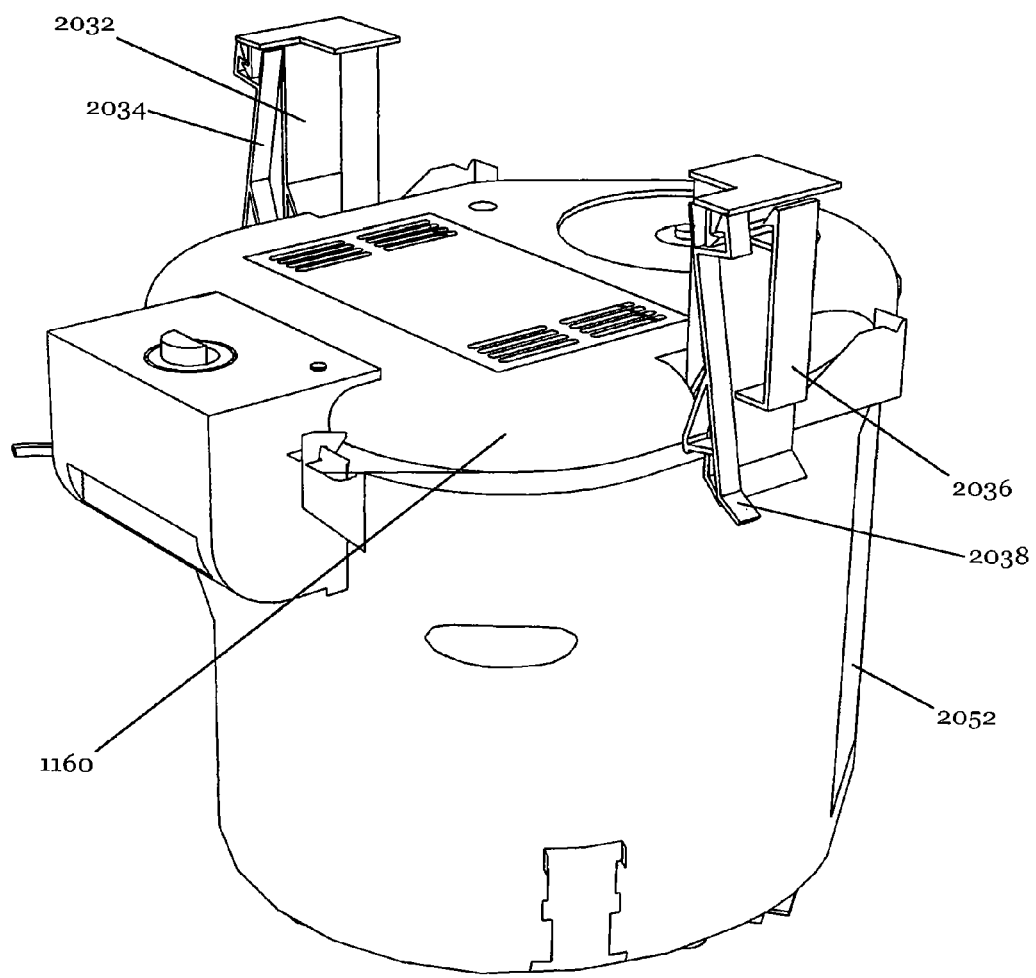
Figure 152:
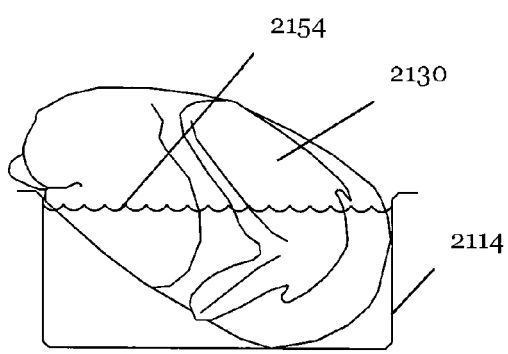
Figure 153:
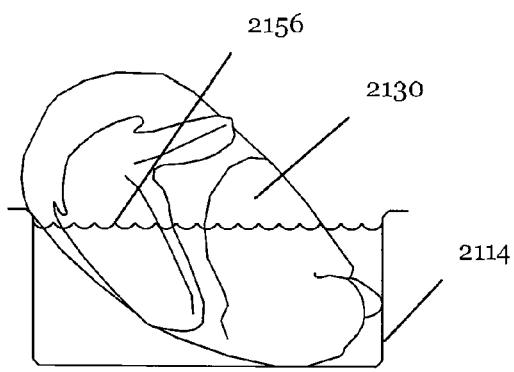
Figure 154:
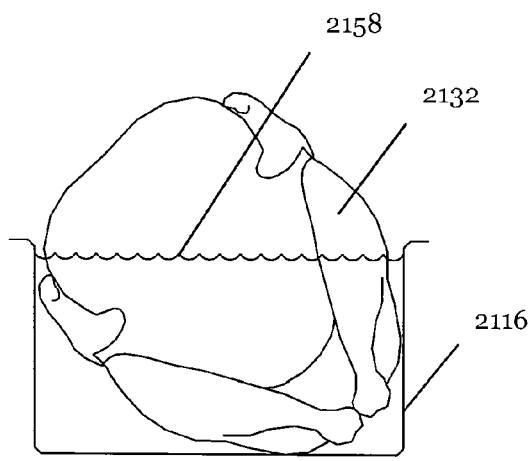
Figure 155:
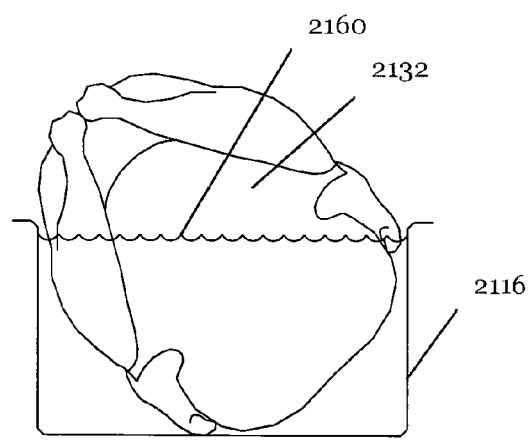

FIG. 120 shows another preferred embodiment which is different from the preferred embodiment shown in FIG. 136 and earlier. To show this embodiment, a forward perspective of its food support 2020 is illustrated in FIG. 137, a forward perspective of the assembled unit is shown in FIG. 138, and three rear perspectives are illustrated in FIGS. 120, 139 and 140.

Figure 121:
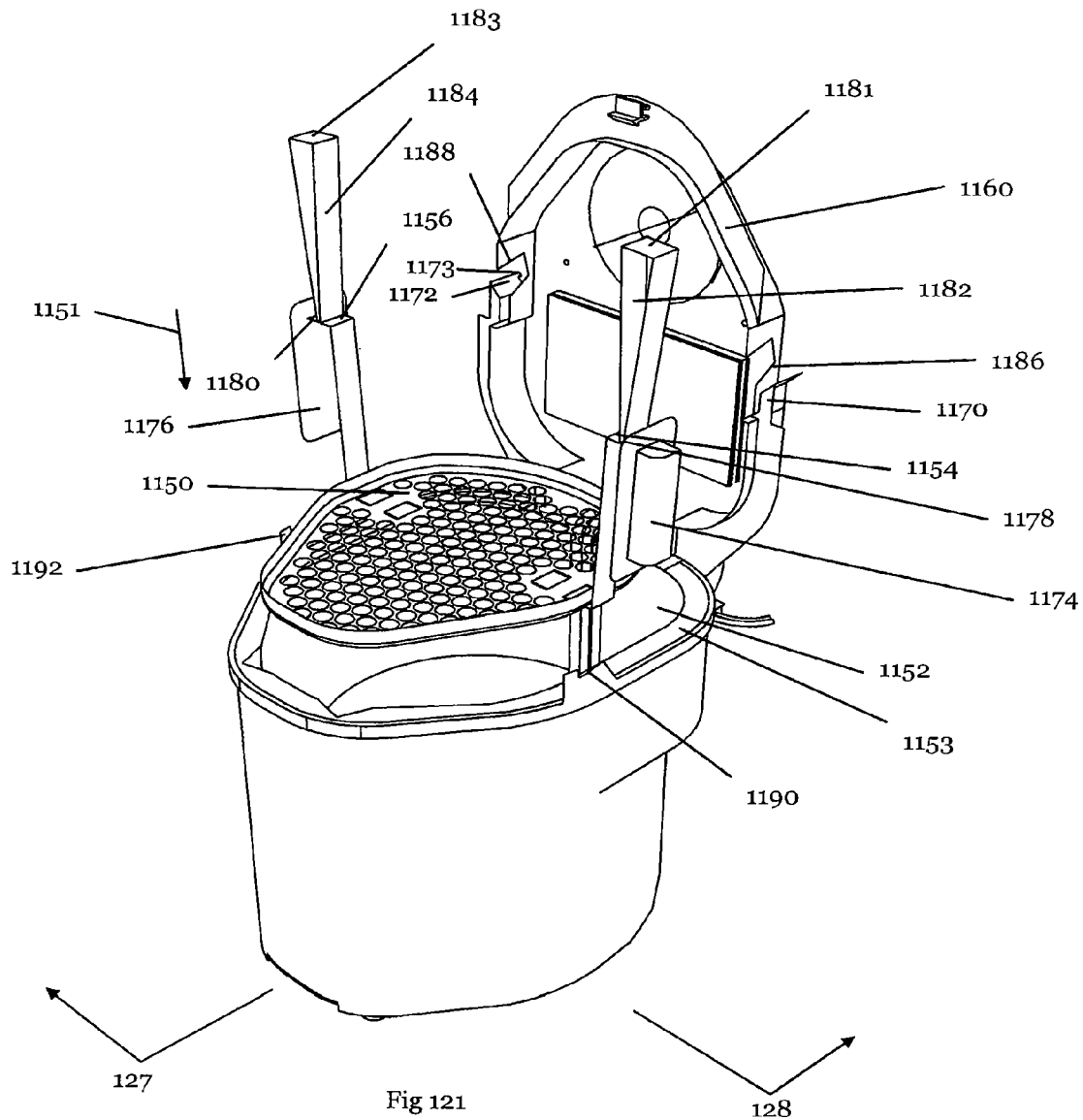

FIG. 121 is a forward perspective view of an exemplary embodiment of the present inventions.

Figure 126:
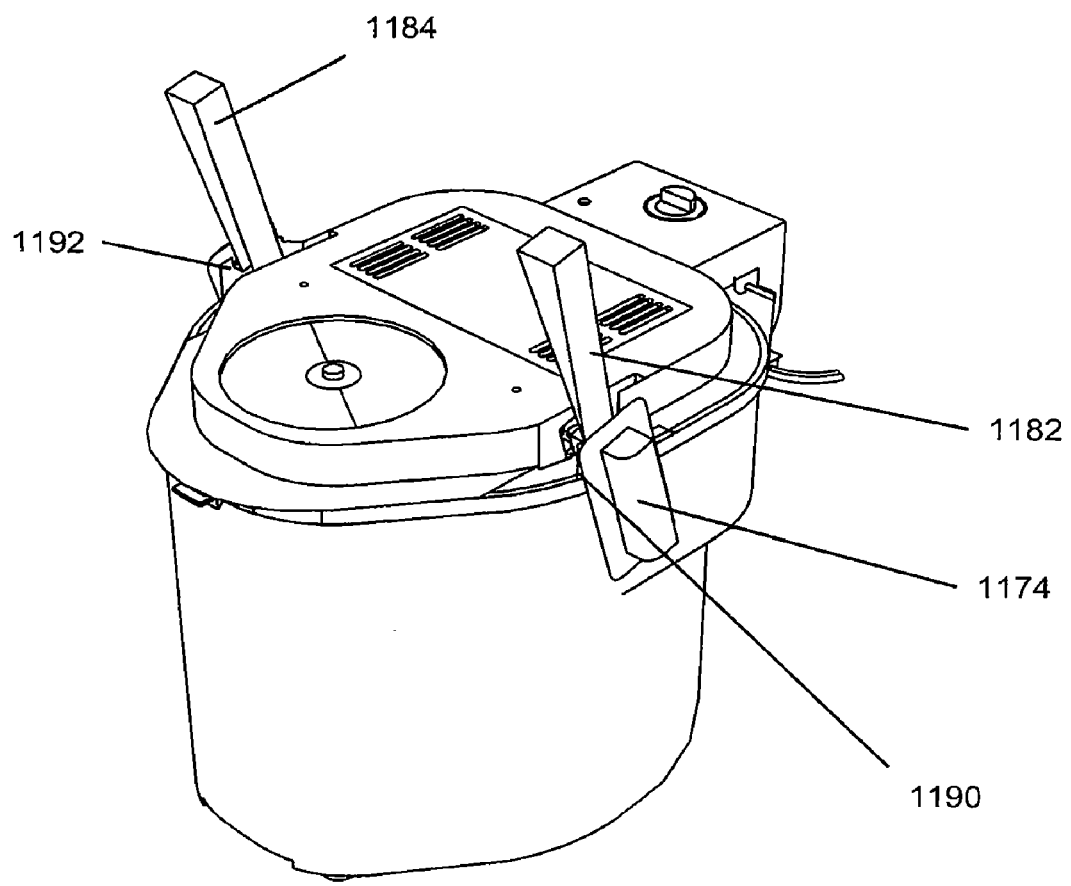

FIGS. 122 through 126 show the same exemplary embodiment illustrated in FIG. 121 in different use positions including: with its food support 1150 partially lowered into cooking vessel 1152 with lid 1160 in its raised position (FIG. 122); with its lid 1160 partially lowered (FIG. 123); with its lid 1160 fully lowered, but with its food support still raised above the cooking liquid in cooking vessel 1152 (FIG. 124); with its lid 1160 fully lowered, but with its food support in its lower most position where food resting on food support 1150 is immersed in cooking liquid (FIG. 125); with its lid 1160 fully lowered, but with its food support in its upper and tilted position for draining cooking liquid from food resting on the food support (FIG. 126).

Figure 127:
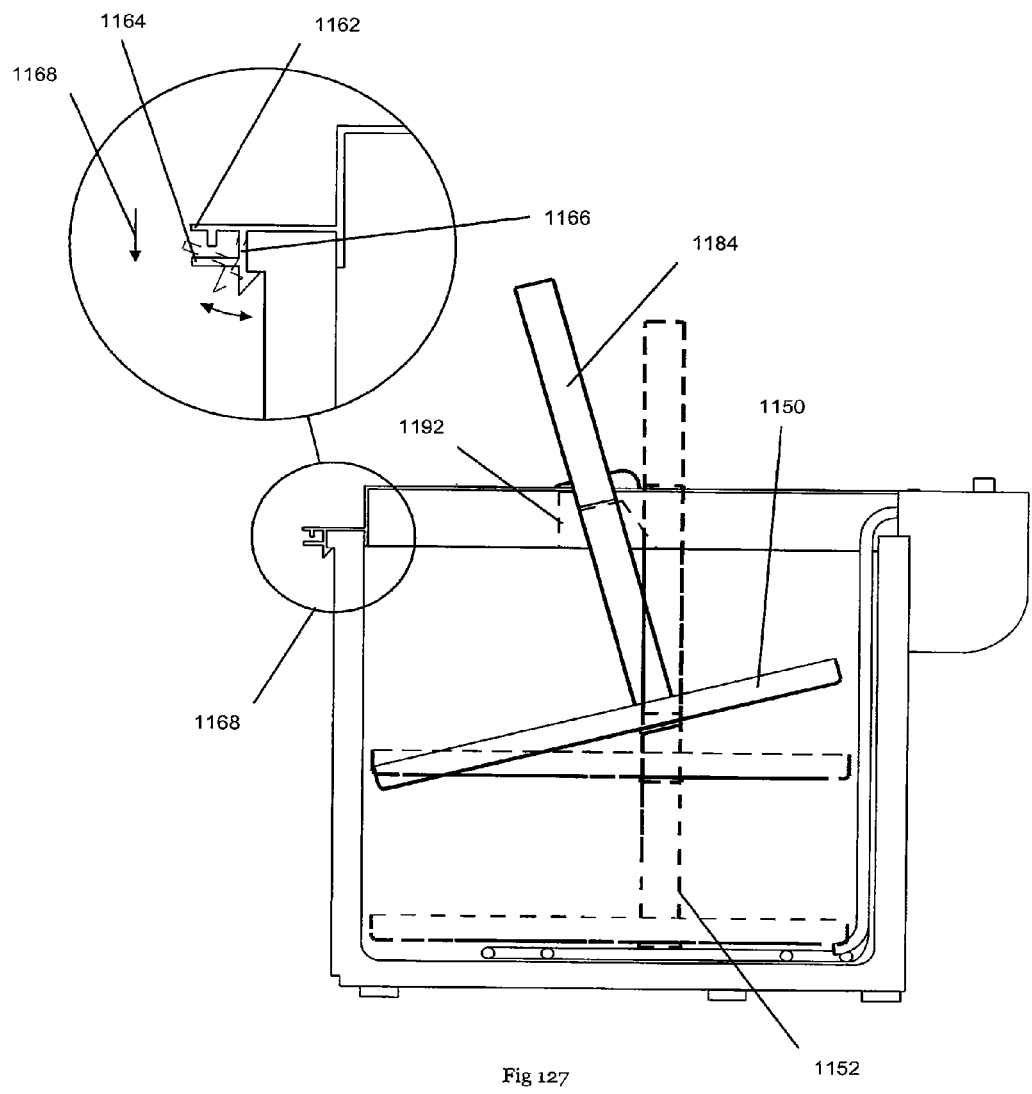

FIG. 127 shows a section view through the embodiment shown in FIG. 121 as indicated in FIG. 121. FIG. 127 also shows a detail view of an alternative lid latch and shows food support 1150 in its tilted forward drainage position, and in its partially raised position which is clear of the cooking liquid, and in its fully lowered position.

Figure 128:
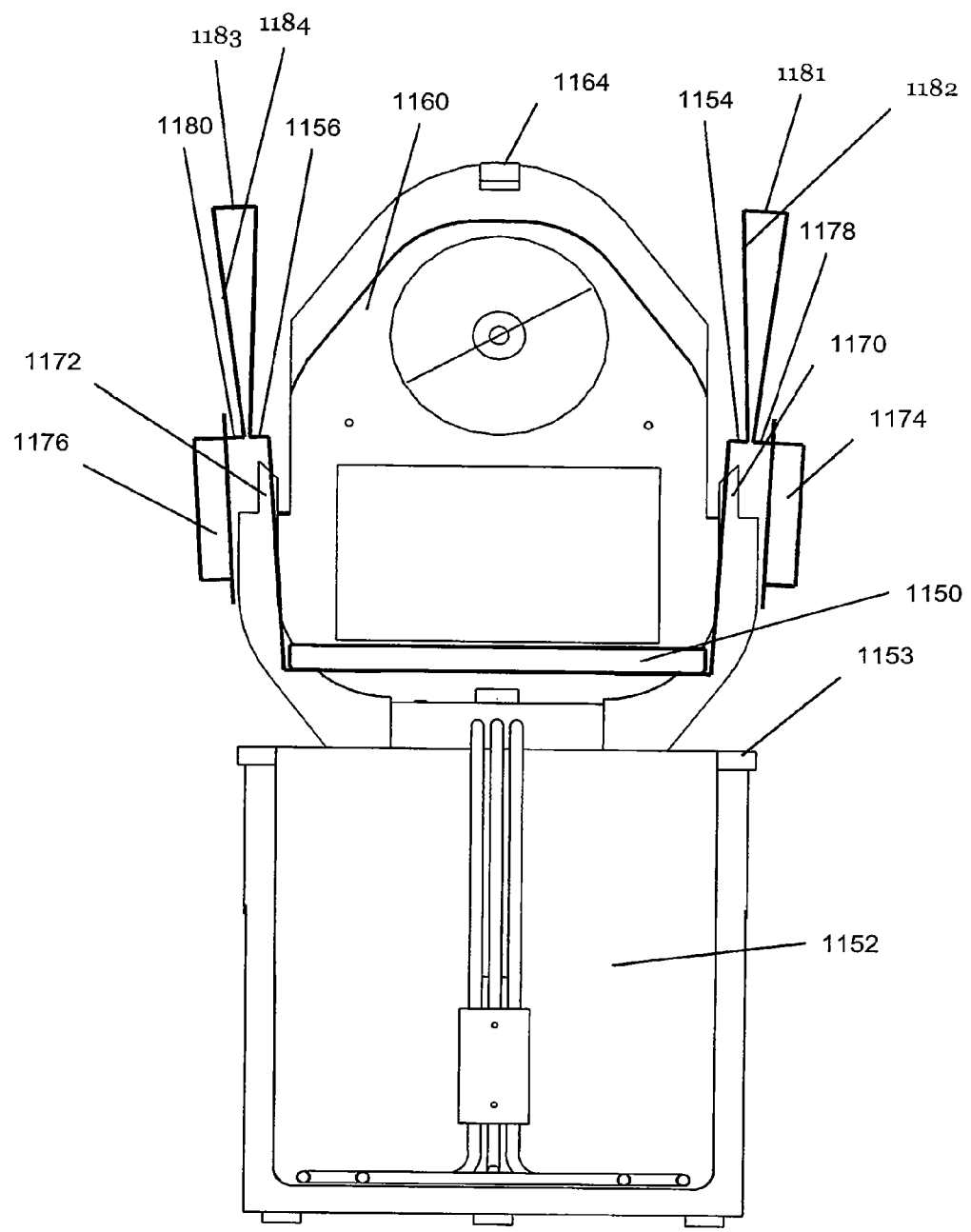
Figure 129:
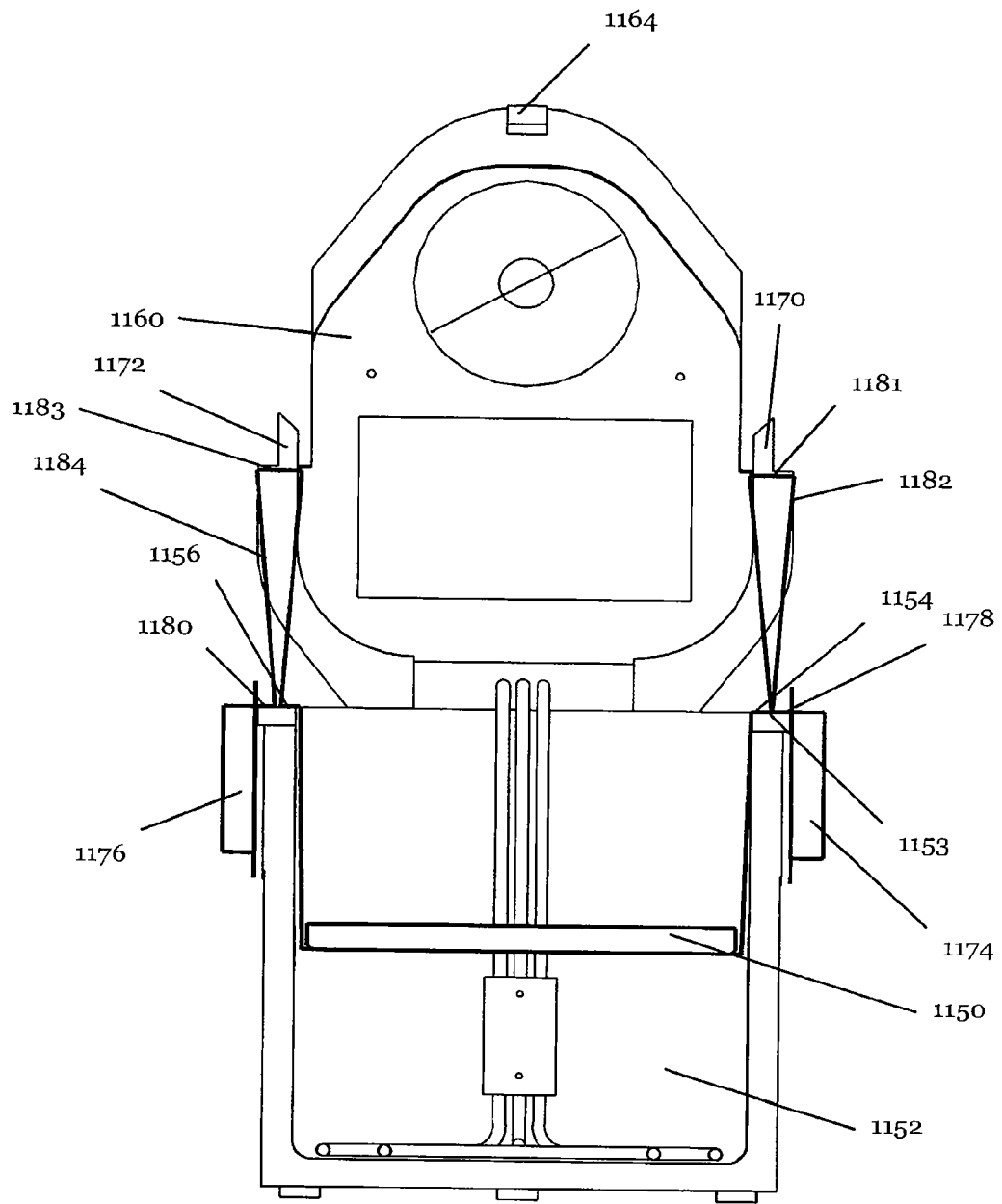
Figure 130:
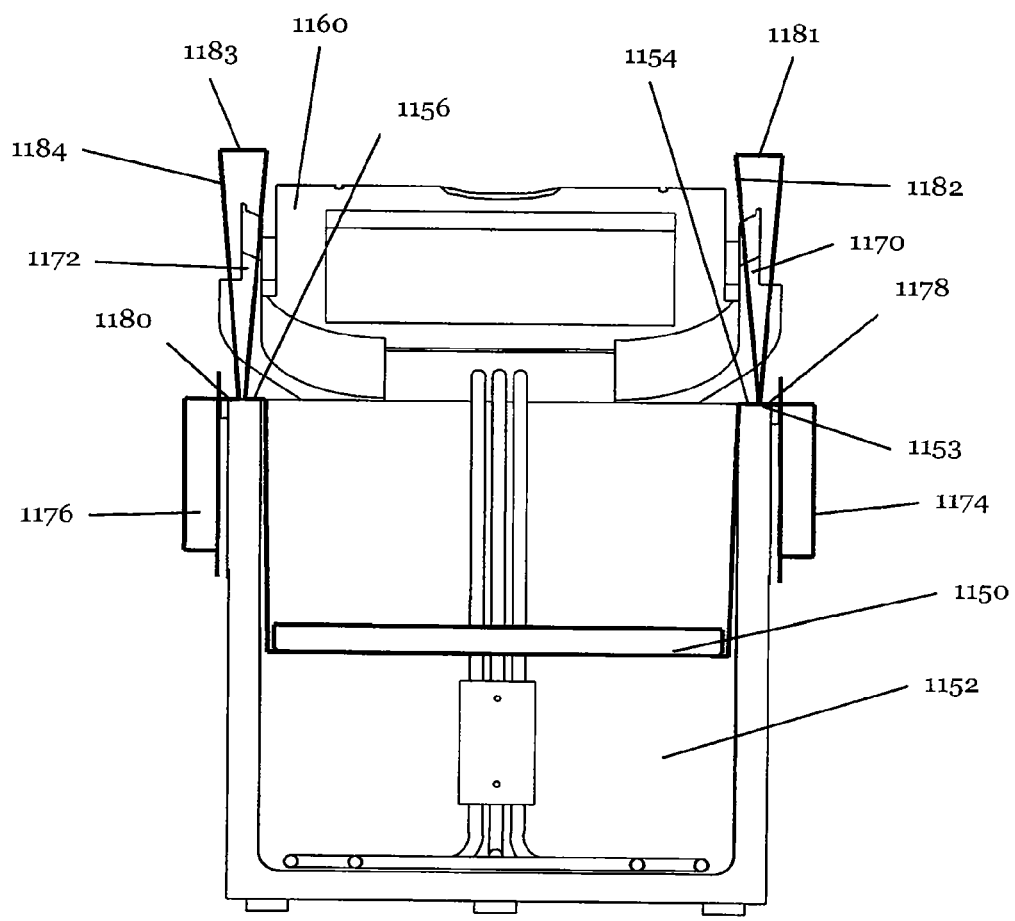
Figure 131:
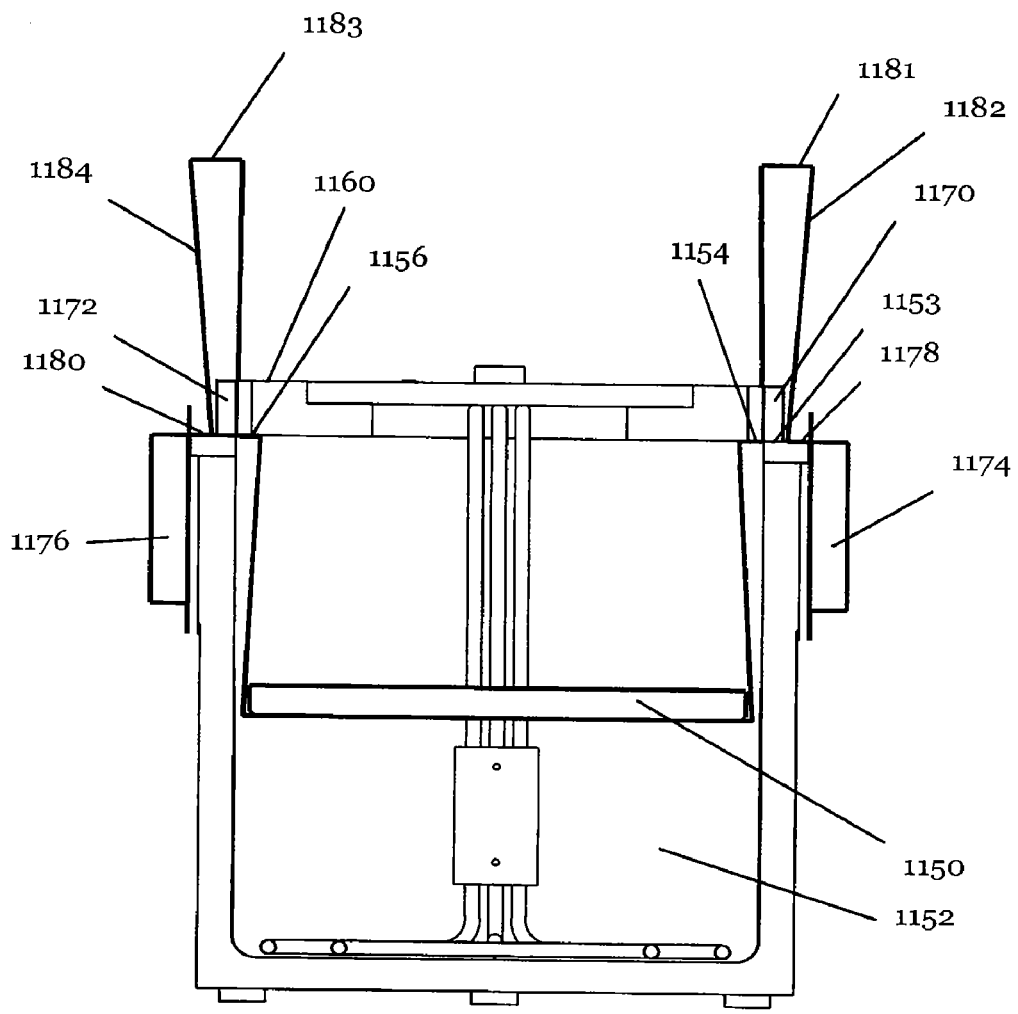
Figure 132:
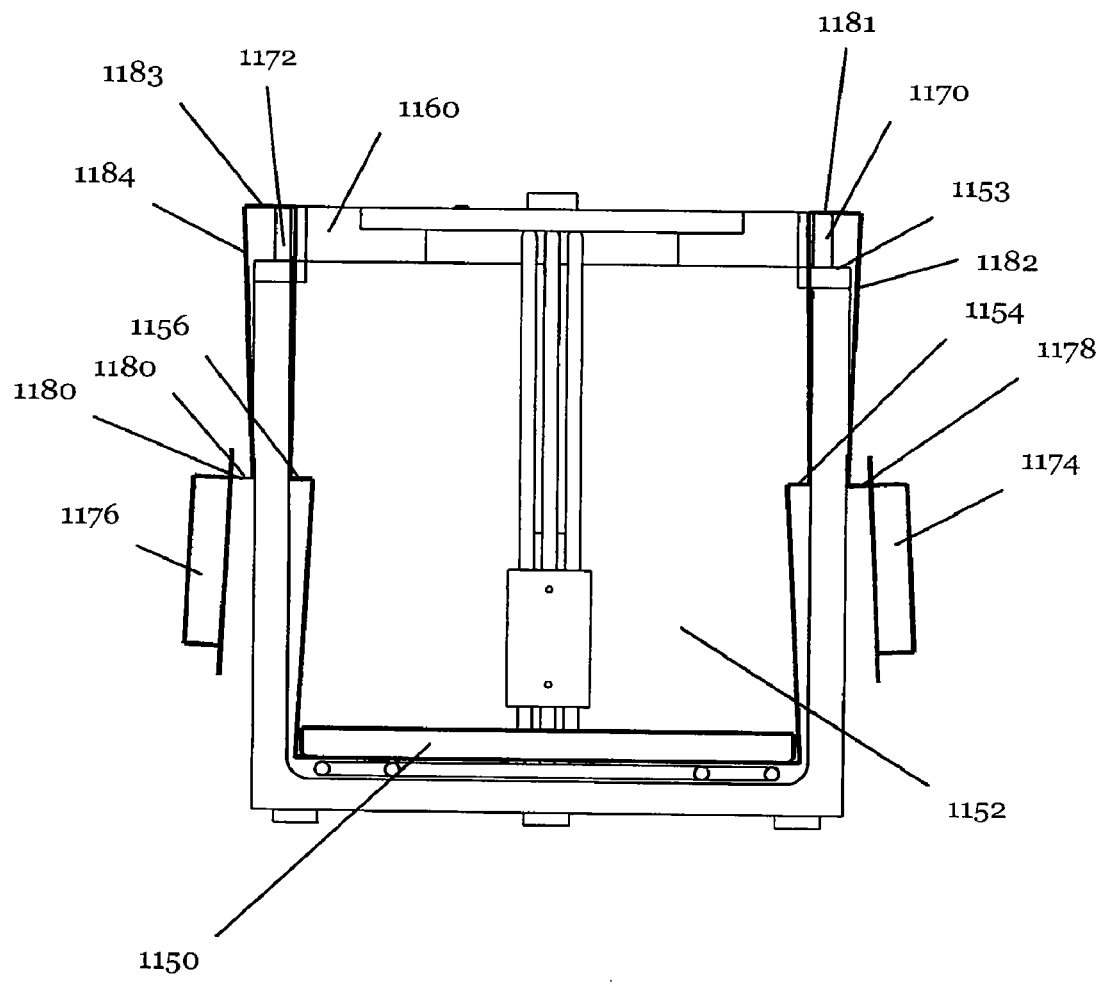

FIGS. 128 through 132 show sections through the exemplary embodiment illustrated in FIG. 121, as indicated in FIG. 121. Each section shows a different use position. FIG. 128 shows the embodiment with food support 1150 removed and lid 1160 in its open position. FIG. 129 is identical to FIG. 128 except that food support 1150 has been partially lowered into cooking vessel 1152. FIG. 130 is identical to FIG. 129 except lid 1160 has been partially lowered. FIG. 131 is identical to FIG. 129 except lid 1160 is fully lowered. FIG. 132 is identical to FIG. 131 except food support 1150 is in its lower most position.

Figure 133:
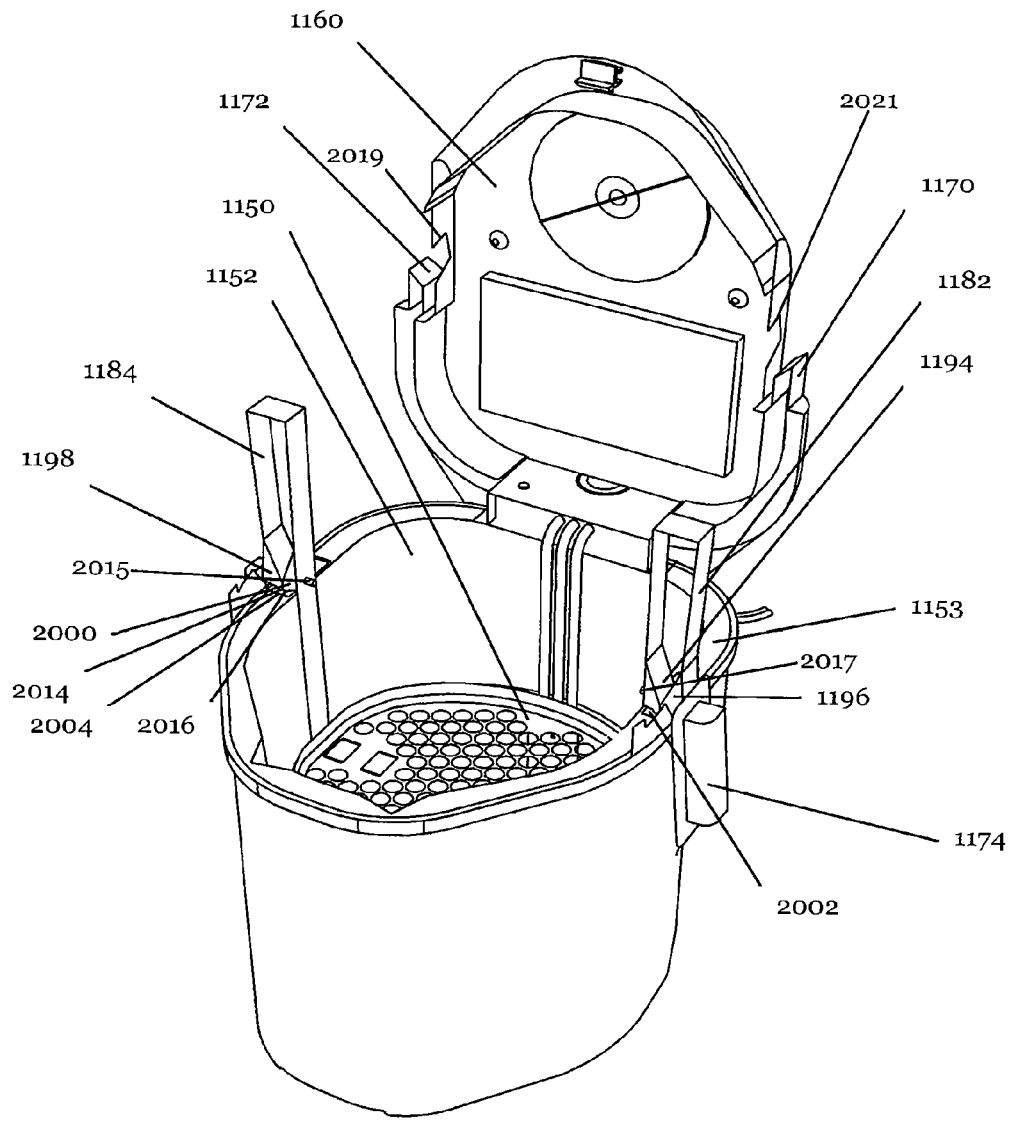
Figure 134:
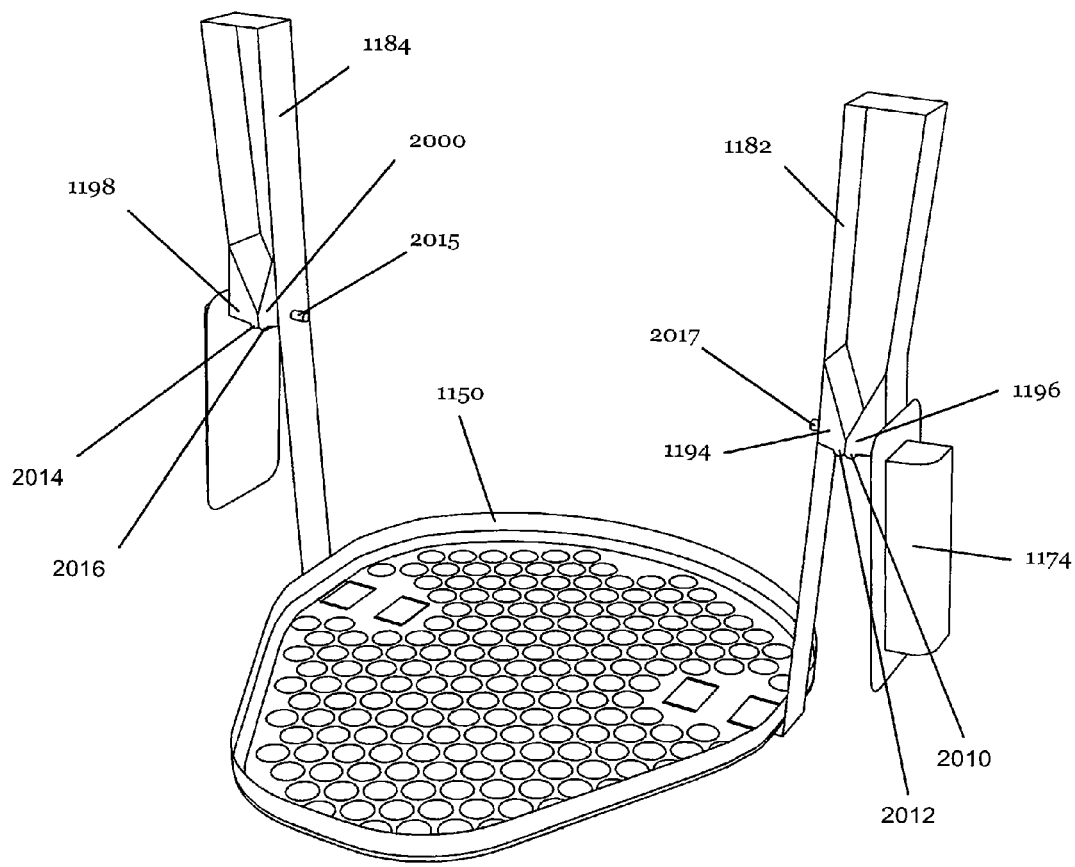
Figure 135:
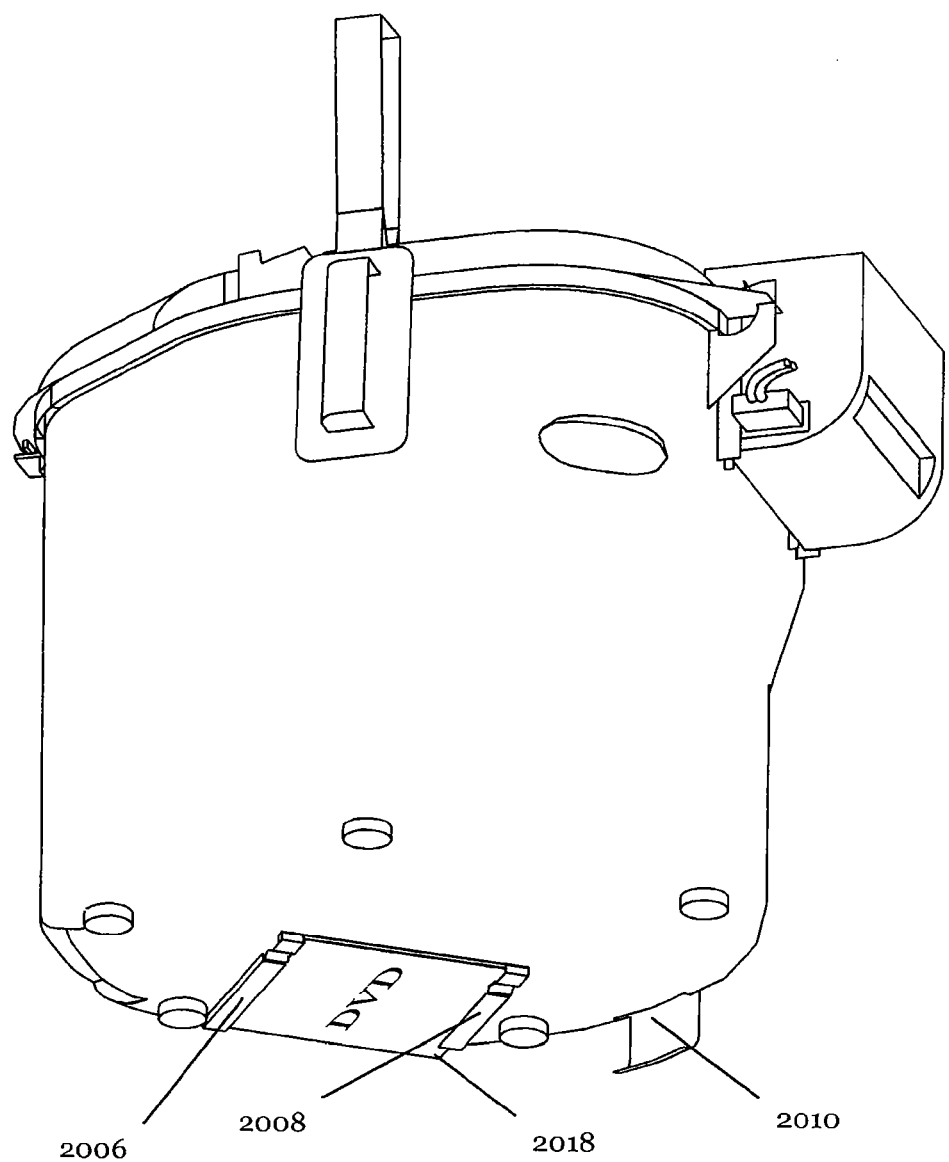

FIGS. 133 through 136 illustrate yet another exemplary embodiment which is different from those described in earlier figures. FIGS. 133, 135 and 136 show the assembled exemplary embodiment respectively in a forward perspective (FIG. 133), and in two lower rear perspectives (FIGS. 135 and 136).

FIG. 134 shows a forward perspective of just the food support assembly used in the embodiment illustrated in FIGS. 133, 135, and 136.

FIGS. 137 through 140 show another preferred embodiment which is different from the preferred embodiment shown in FIG. 136 and earlier. To show this embodiment, a forward perspective of its food support 2020 is illustrated in FIG. 137, a forward perspective of the assembled unit is shown in FIG. 138, and three rear perspectives are illustrated in FIGS. 120, 139 and 140.

FIG. 141 is a cross-section of prior art.

FIGS. 142 through 145 are cross-sections of embodiments of the present inventions with unitary food placed within them.

FIG. 146 is a cross-section of an embodiment incorporating present inventions.

FIG. 147 is a cross-section through an example of prior art.

FIGS. 148 through 155 are cross-sections of embodiments incorporating present inventions with unitary food placed within them.

Figure 156:
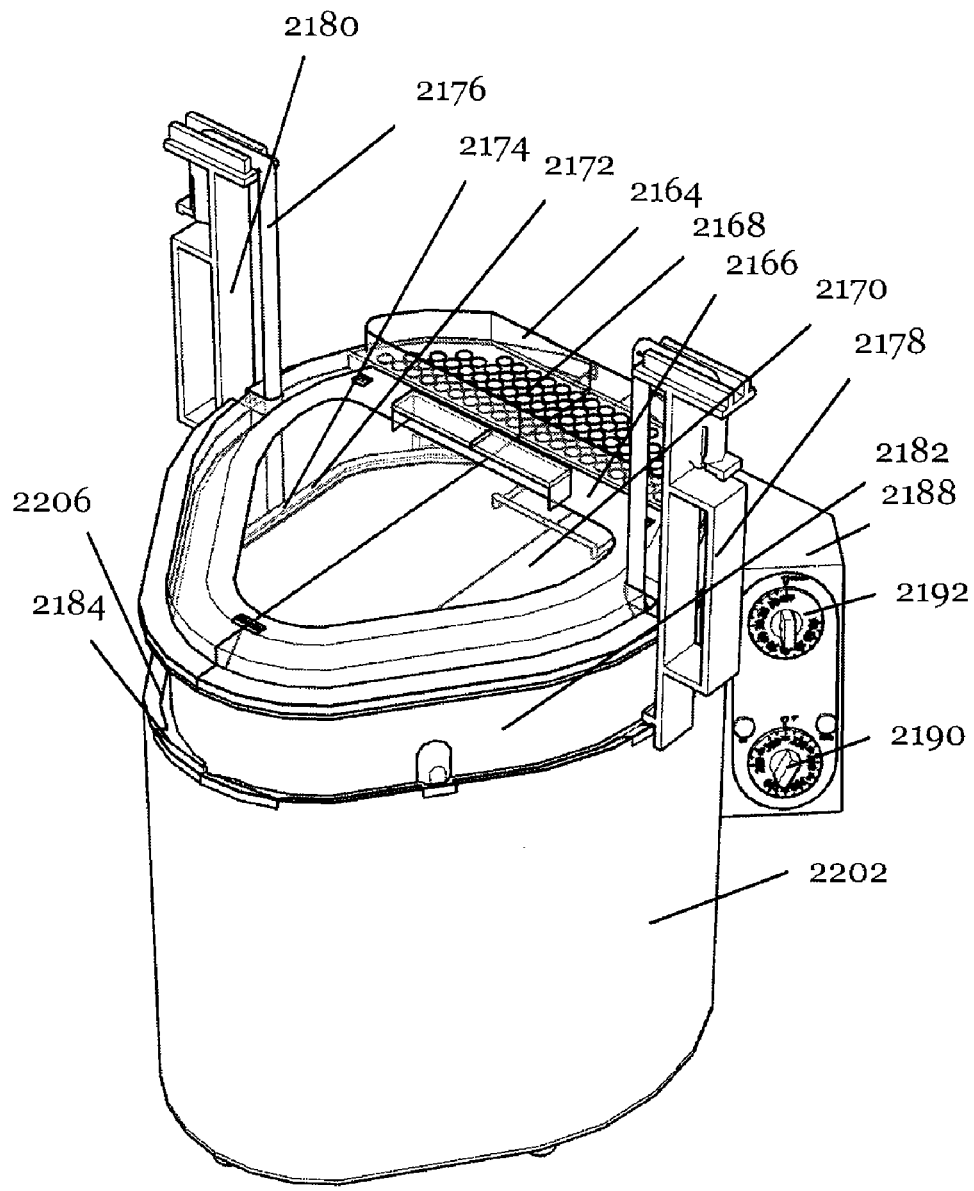

FIG. 156 is a forward perspective view of a first preferred embodiment of the present inventions.

Figure 157:
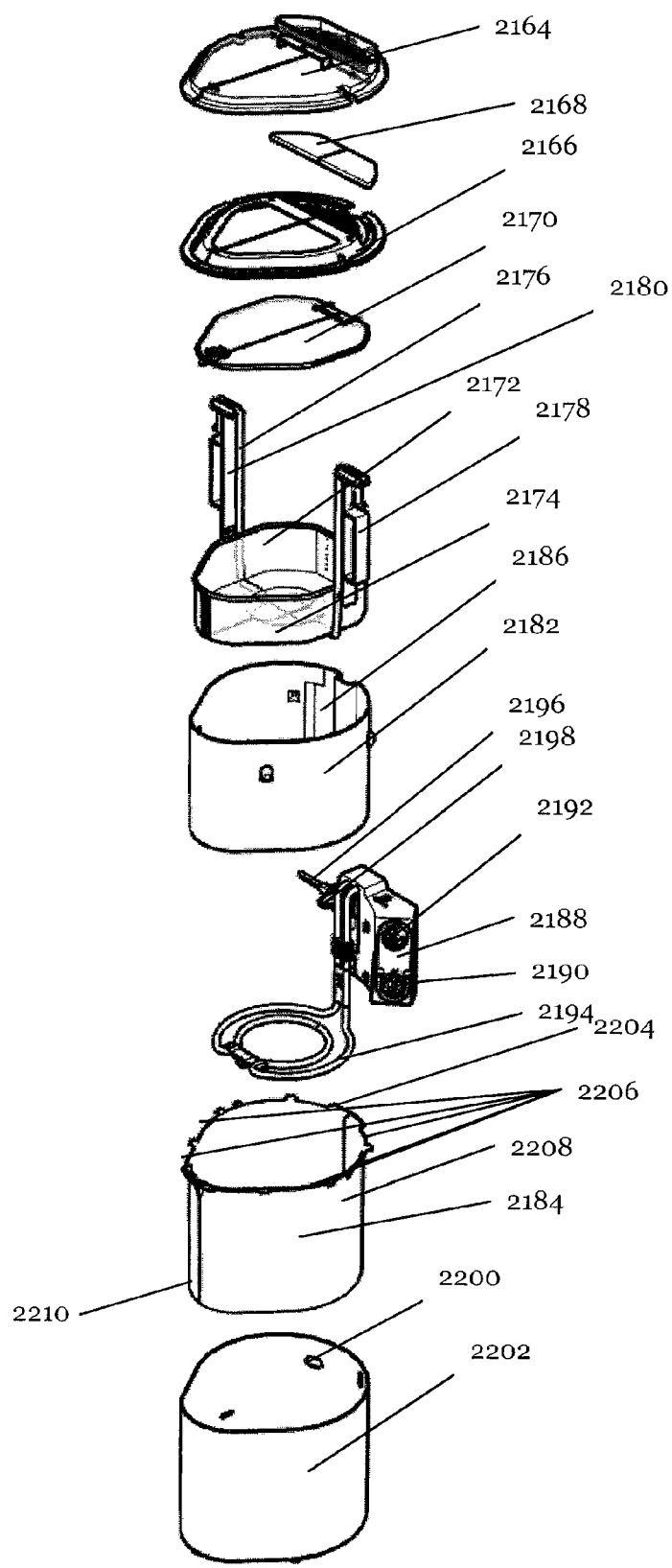

FIG. 157 is a perspective exploded view of the first preferred embodiment shown in FIG. 156.

Figure 158:
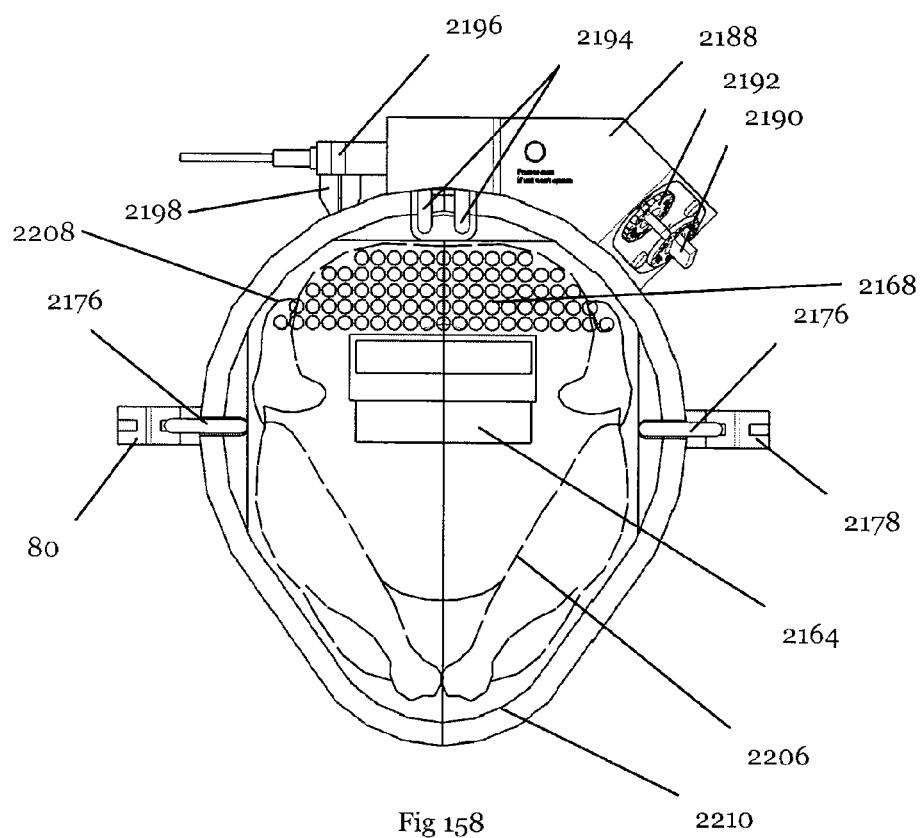
Figure 159:
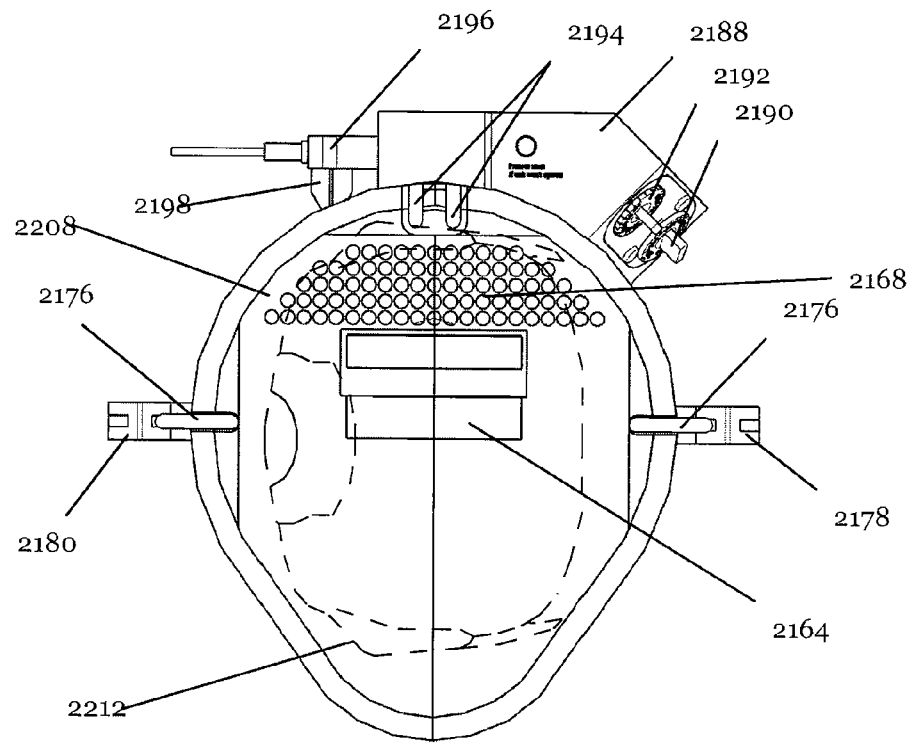

FIGS. 158 and 159 are plan views of the first preferred embodiment.

FIGS. 160 and 161 are forward perspective views of a second preferred embodiment of the present inventions.

Figure 162:
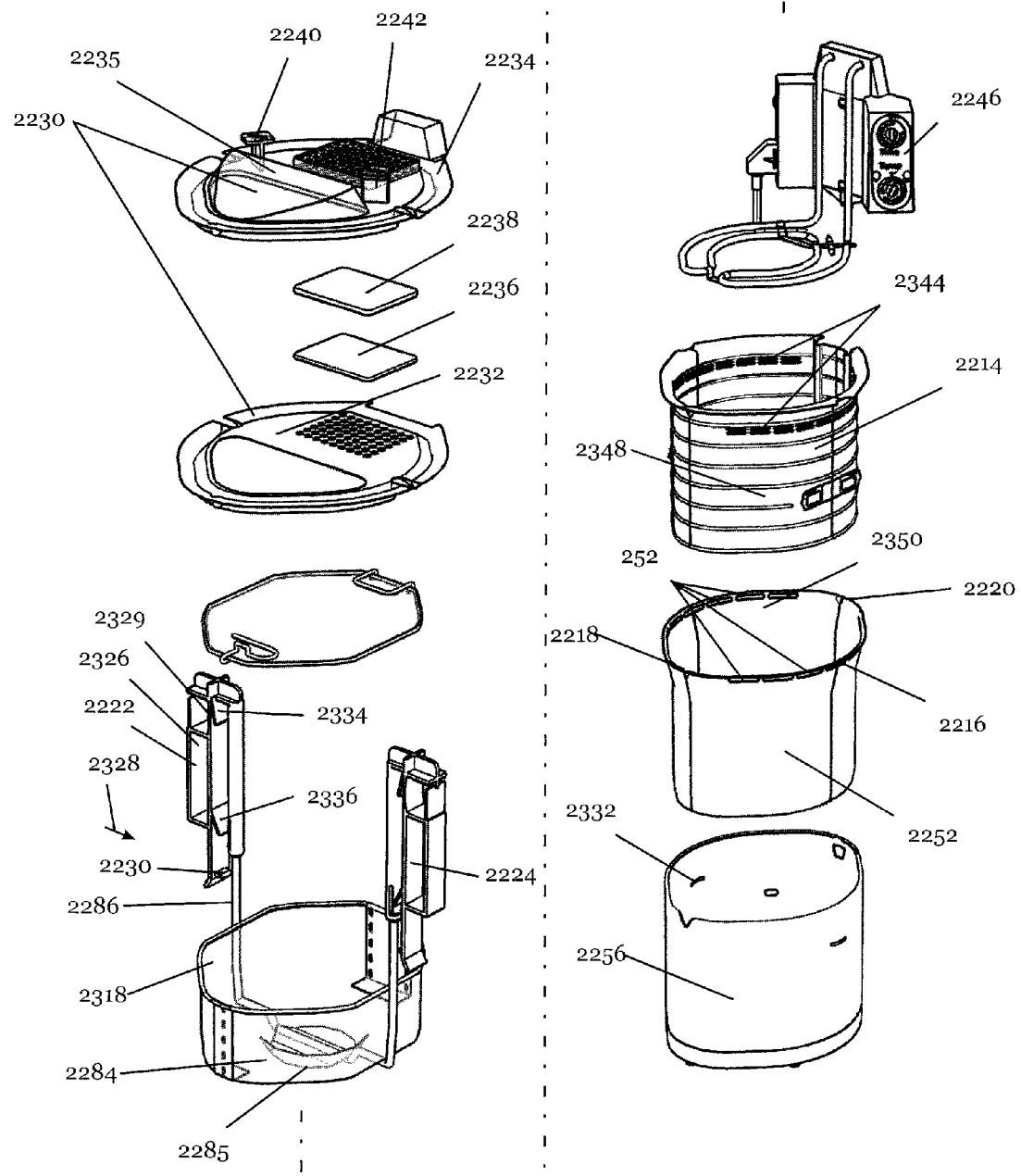

FIG. 162 is an exploded perspective view of the second preferred embodiment.

Figure 163:
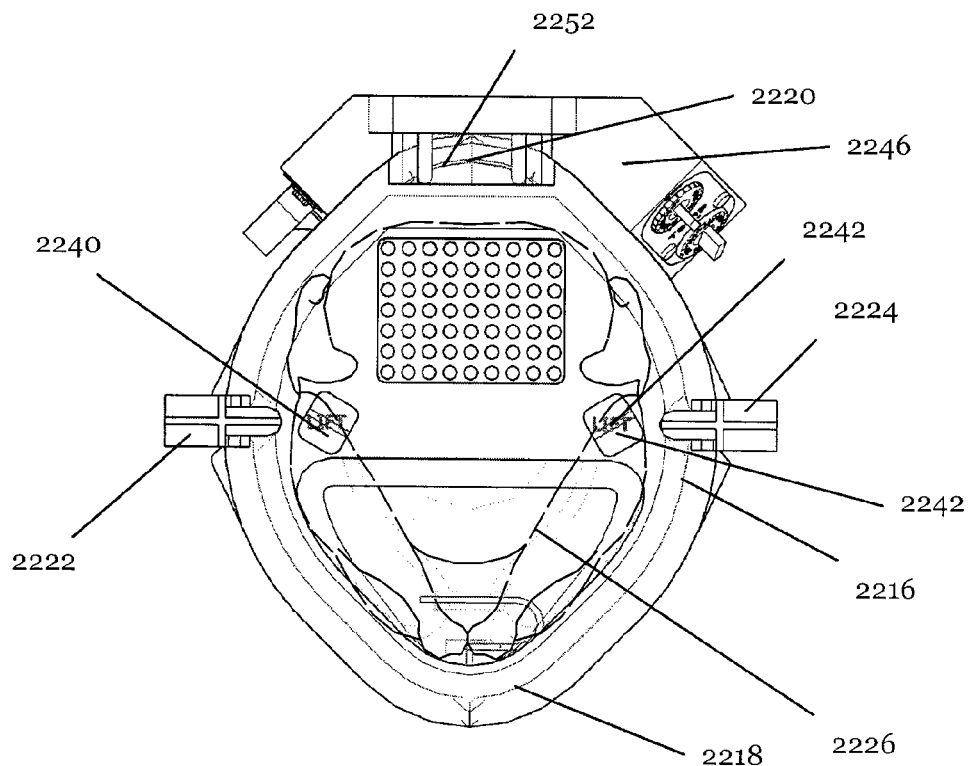
Figure 164:
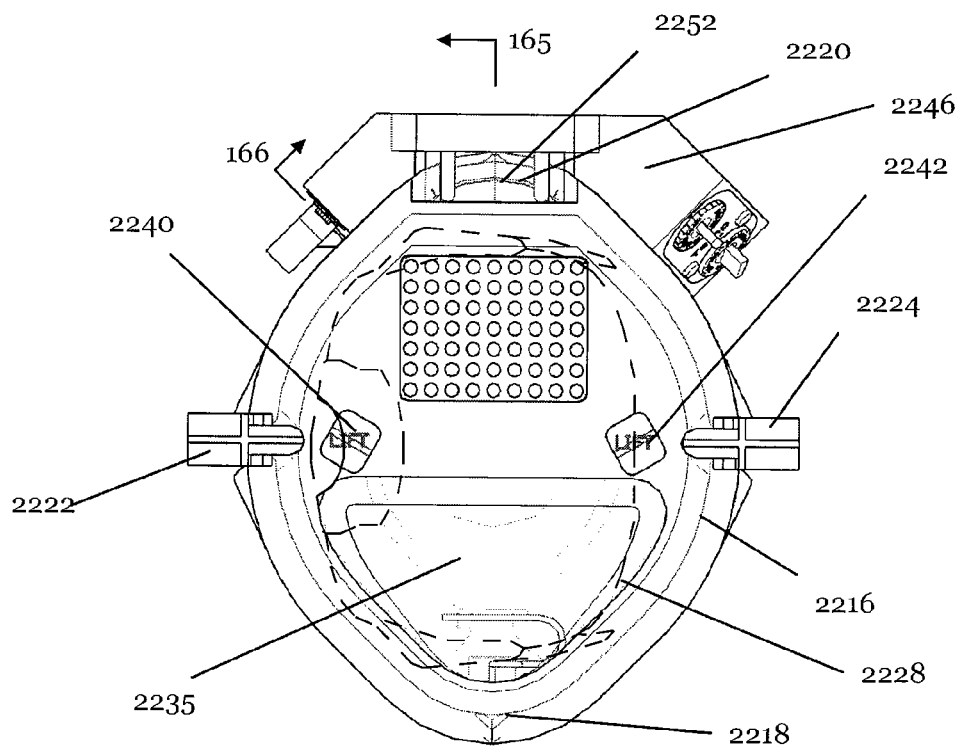

FIGS. 163 and 164 are plan views of the second preferred embodiment.

Figure 165:
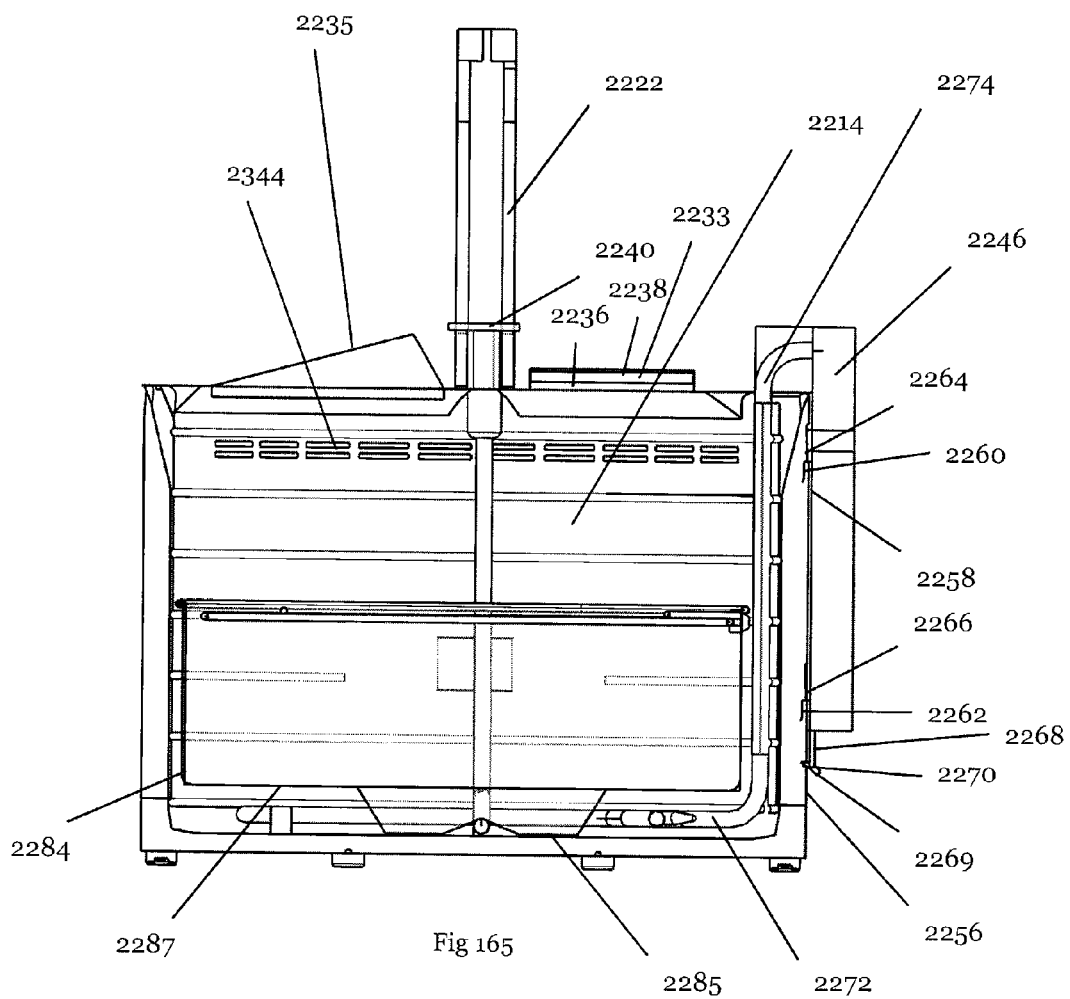

FIG. 165 is a cross-section of the second preferred embodiment as indicated in FIG. 164.

Figure 166:
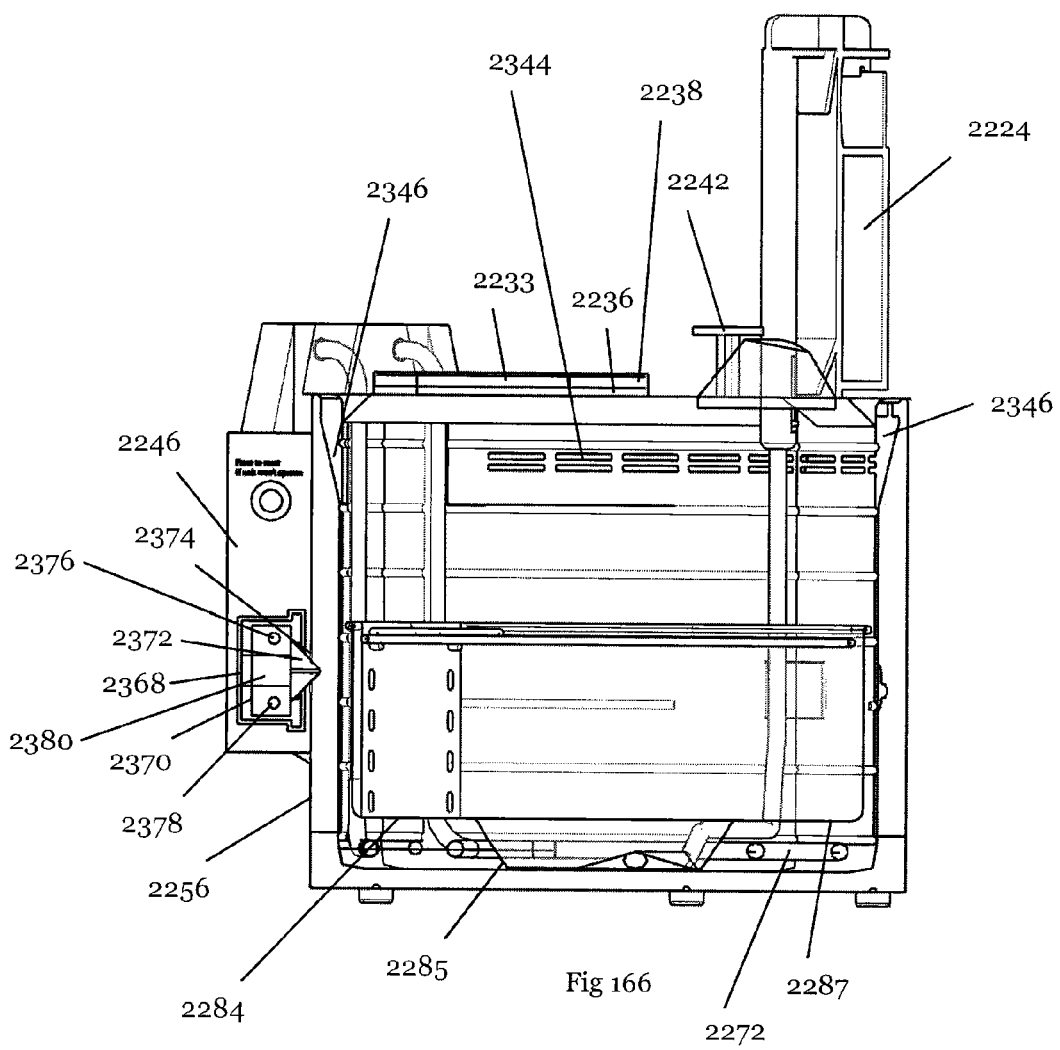

FIG. 166 is a cross-section of the second preferred embodiment as indicated in FIG. 164.

Figure 167:
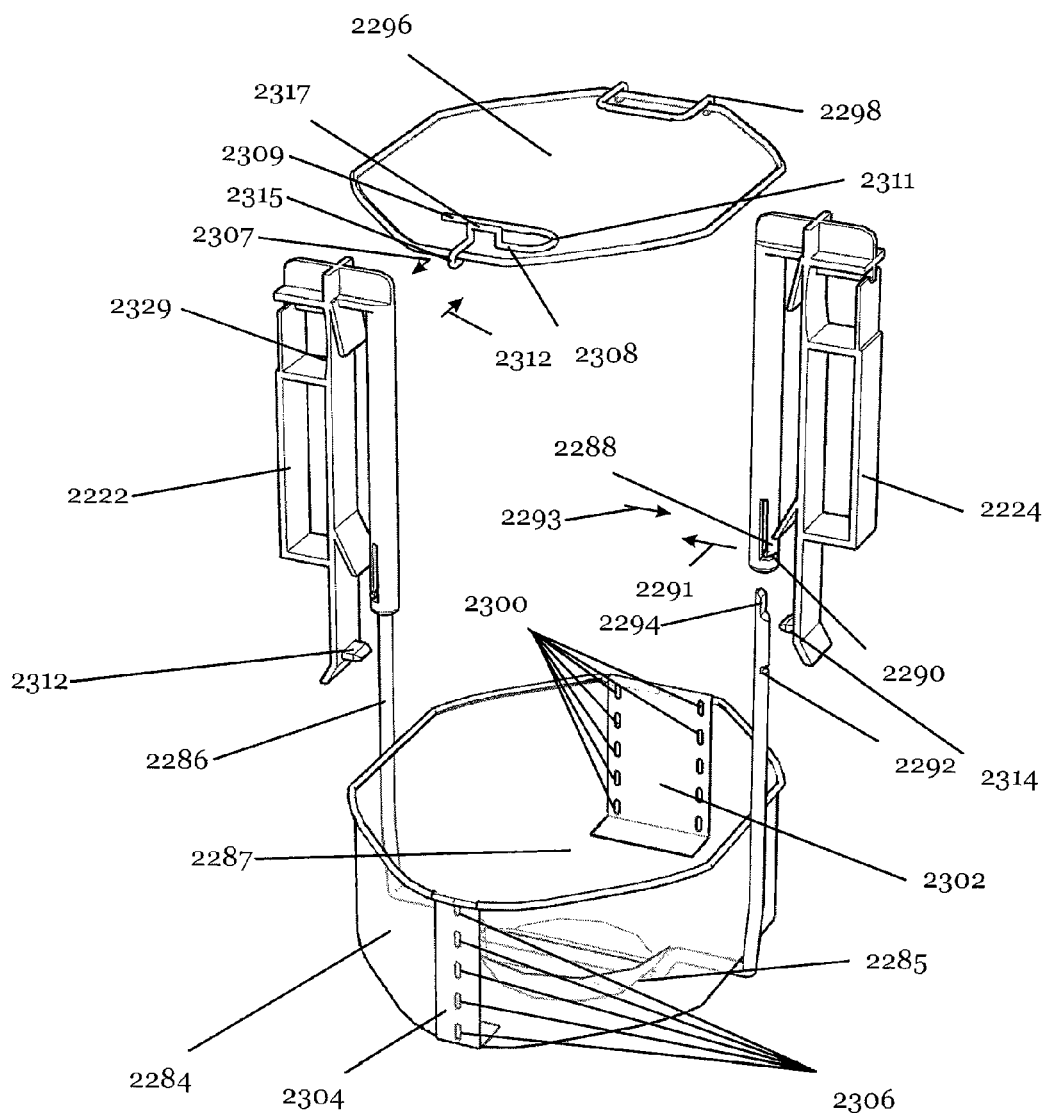

FIG. 167 is a partially exploded forward perspective view of the food support assembly 2318 of the second embodiment.

Figure 168:
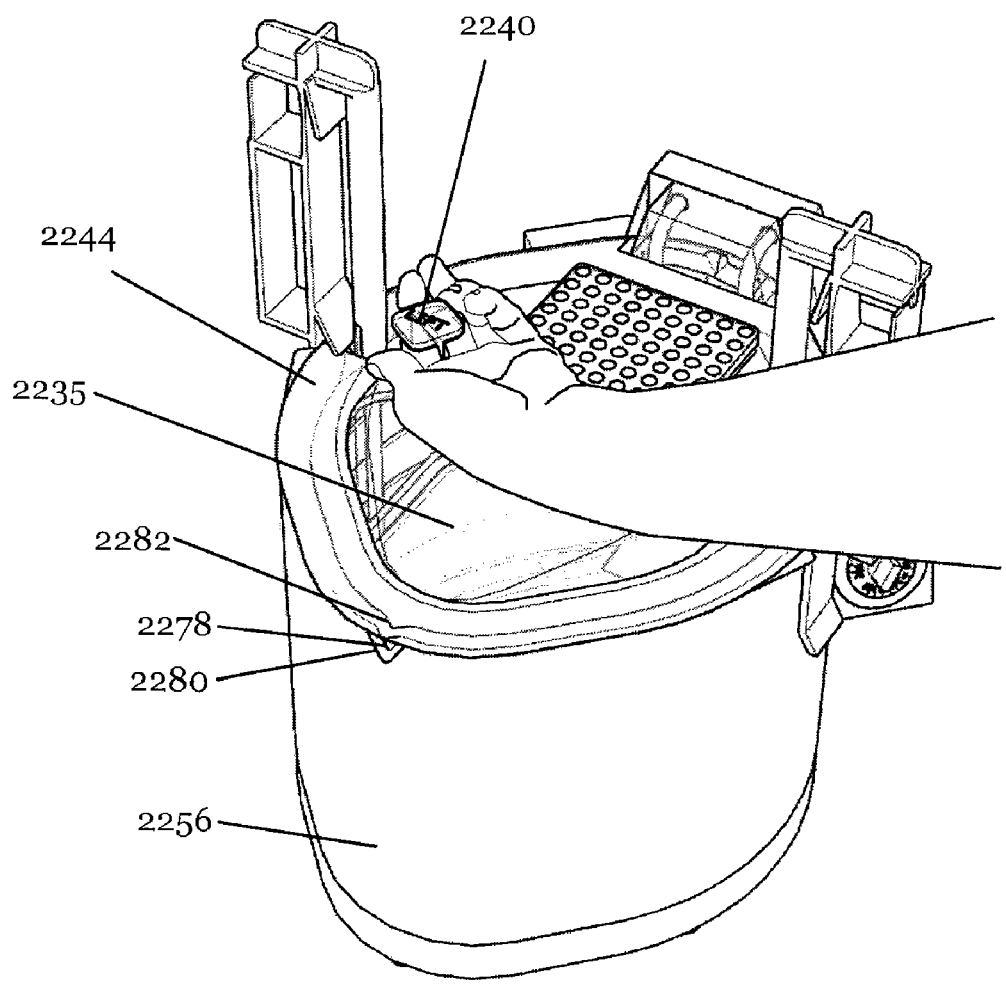

FIG. 168 is a forward perspective view of the second preferred embodiment showing how its lid handles might be gripped.

Figure 169:
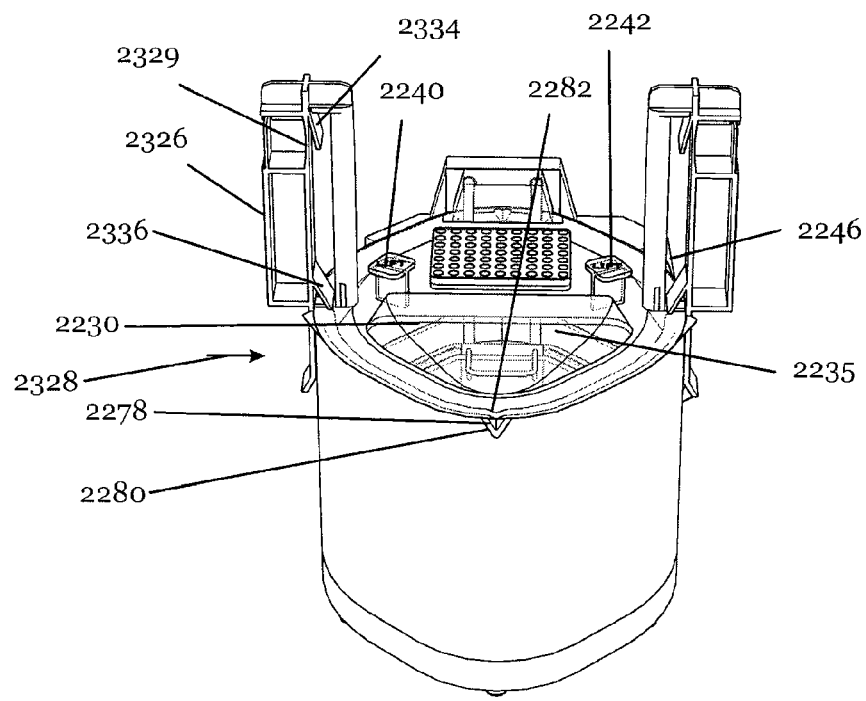

FIG. 169 is a forward head-on view of the second preferred embodiment.

Figure 170:
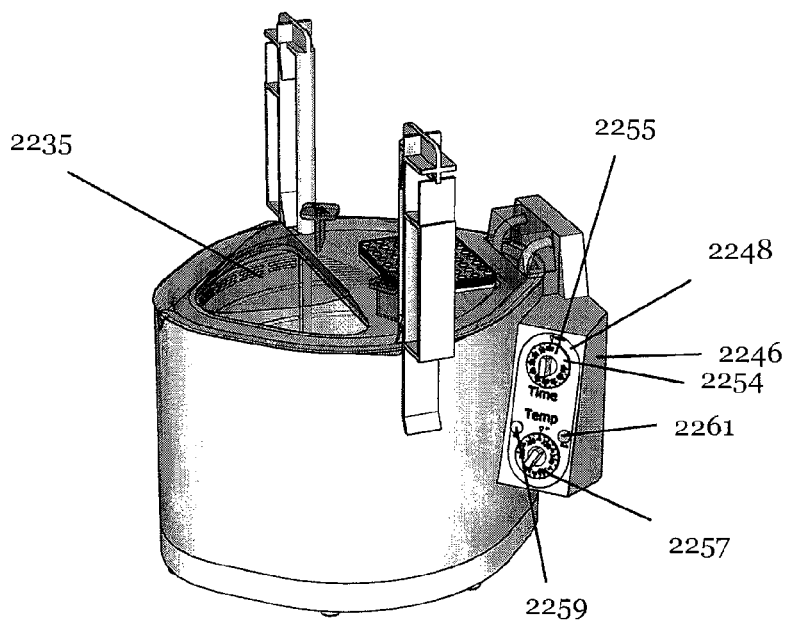

FIG. 170 is a side perspective view with shading of the second preferred embodiment.

FIGS. 171, 172, 172A, and 173 are forward perspective views of the second preferred embodiment in use.

Figures 174, 174A, 175:
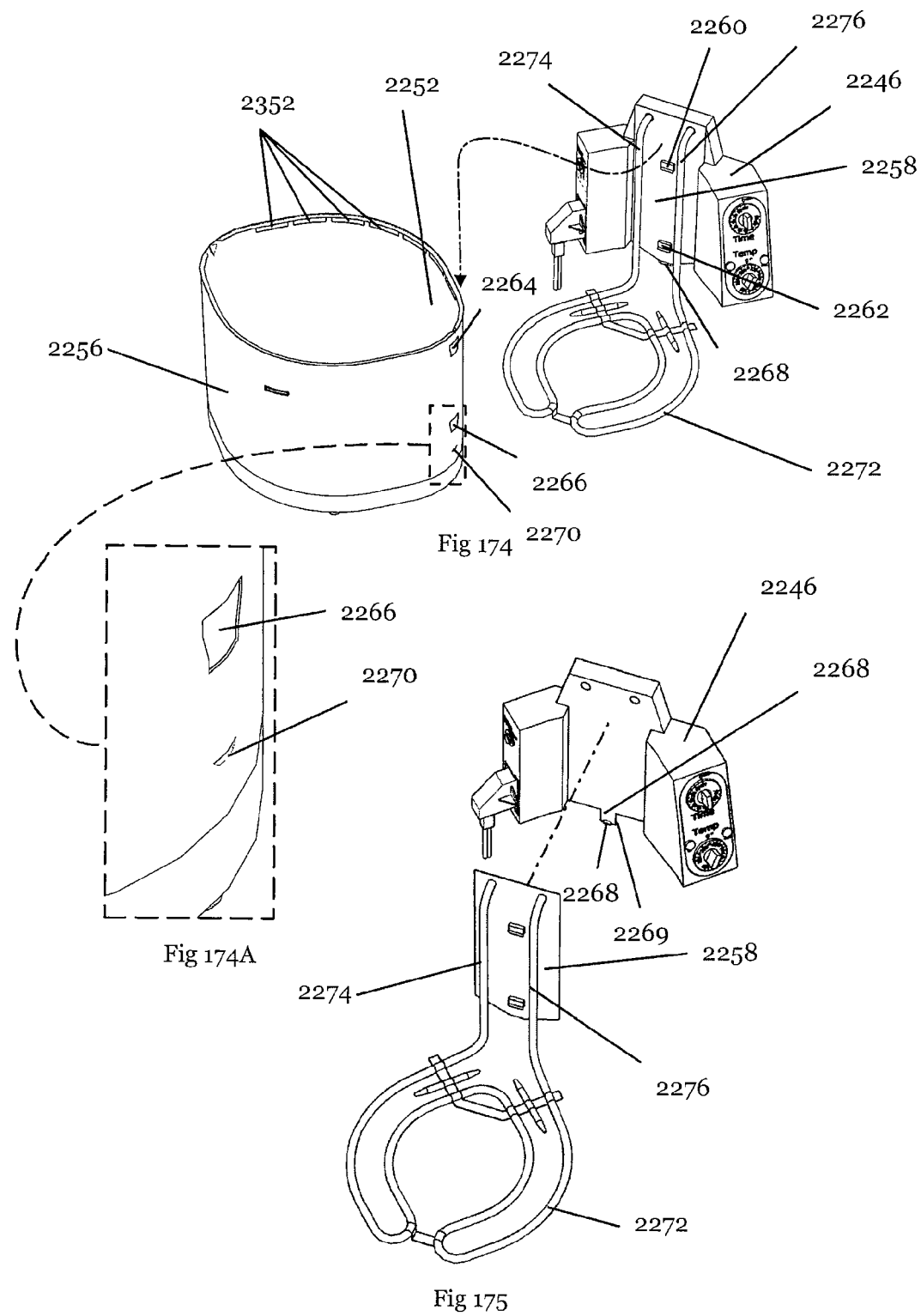

FIGS. 174 and 175 are for perspective views of control box 2246 and outer housing 2256 exemplifying how the control box might be mounted to the outer housing.

Figure 176:
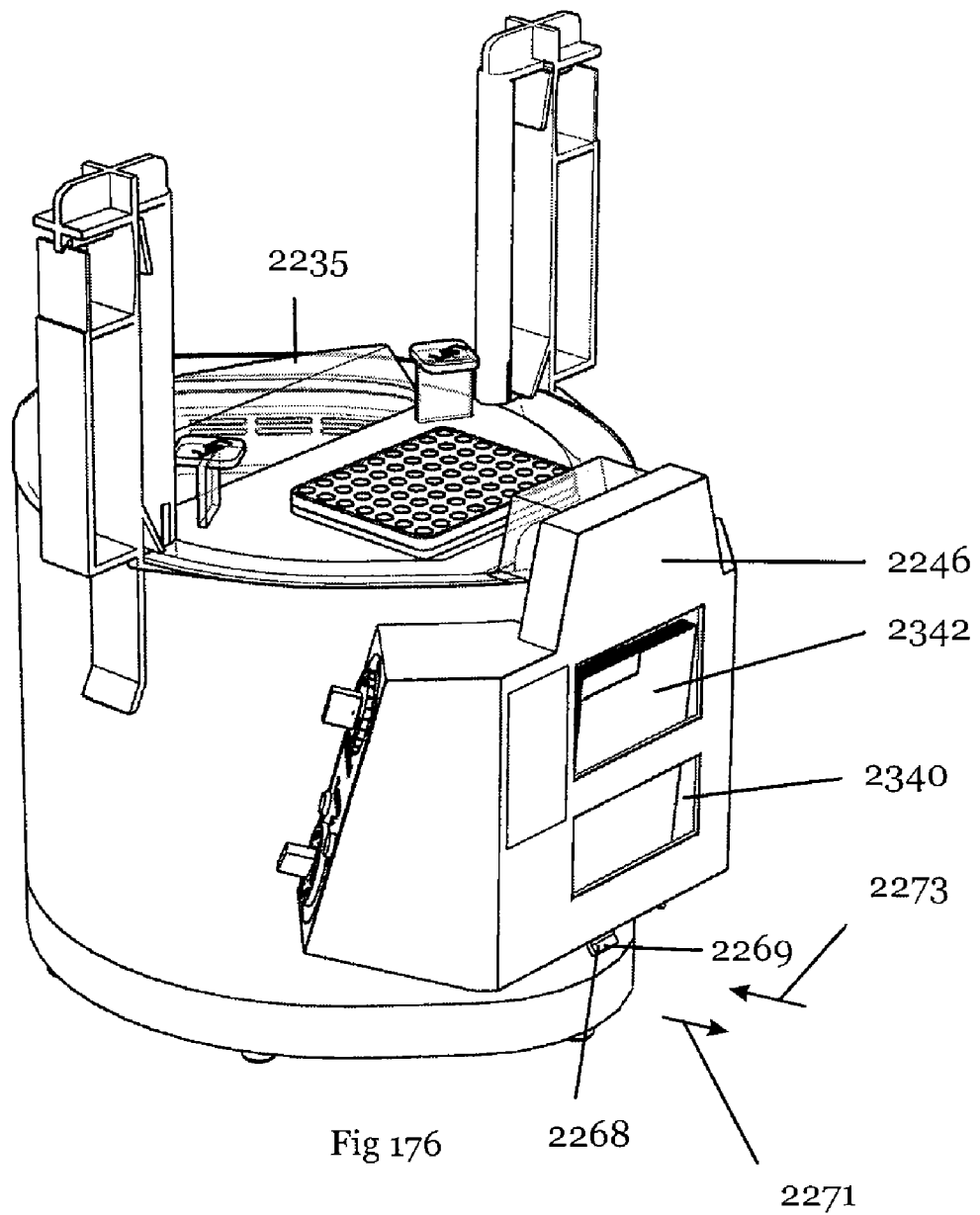

FIG. 176 is a three-quarter rear perspective view of the second preferred embodiment.

Figure 177:
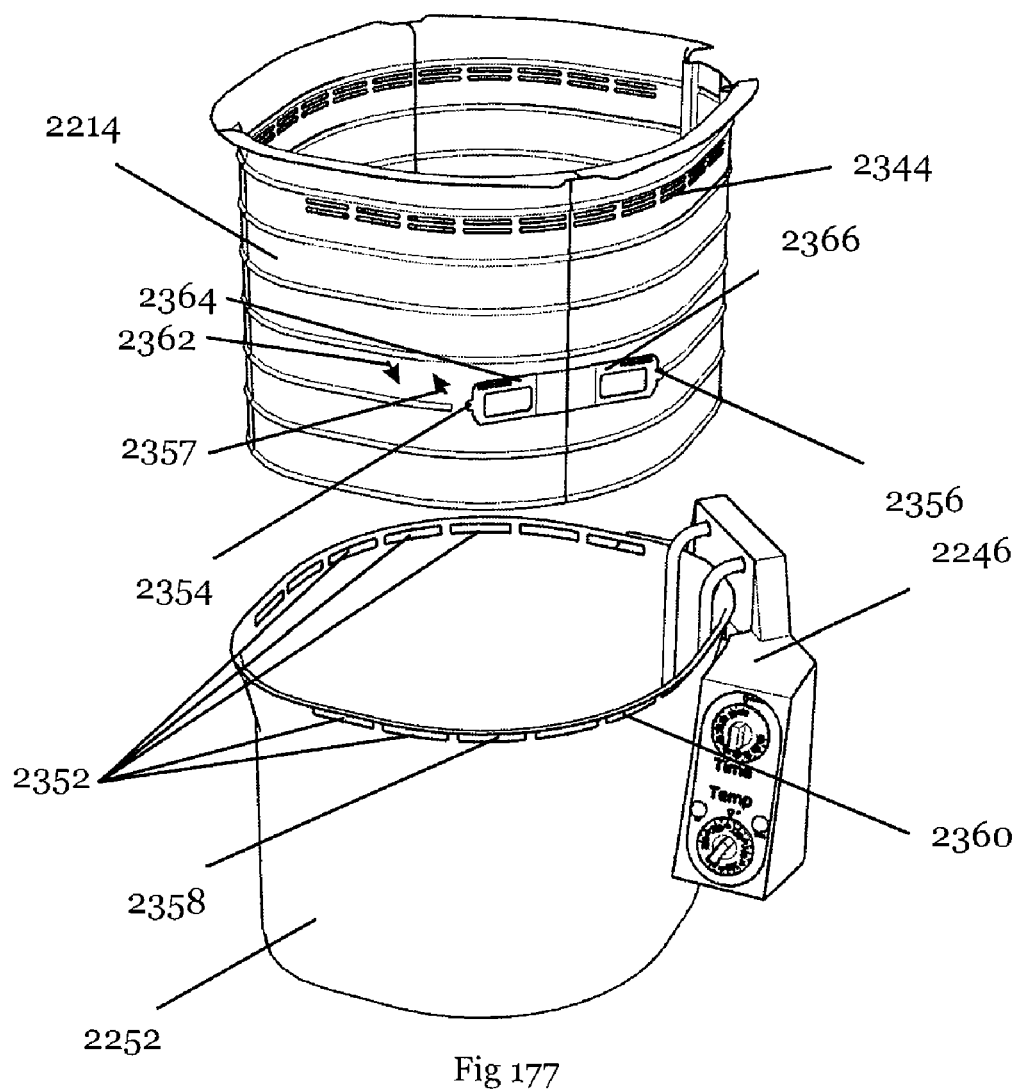

FIG. 177 is a partially exploded side perspective view of cooking vessel 2252, sleeve 2214, and control box 2246.

Figure 178:
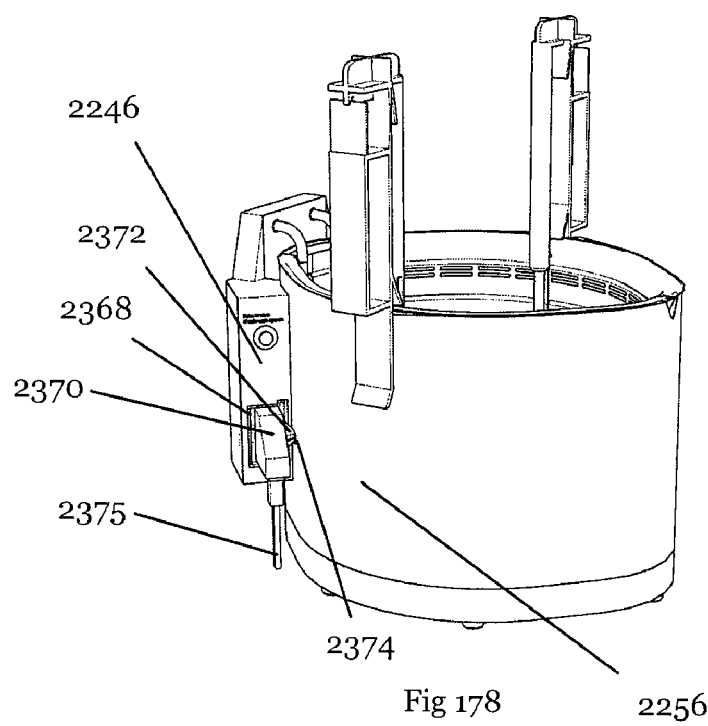
Figure 179:
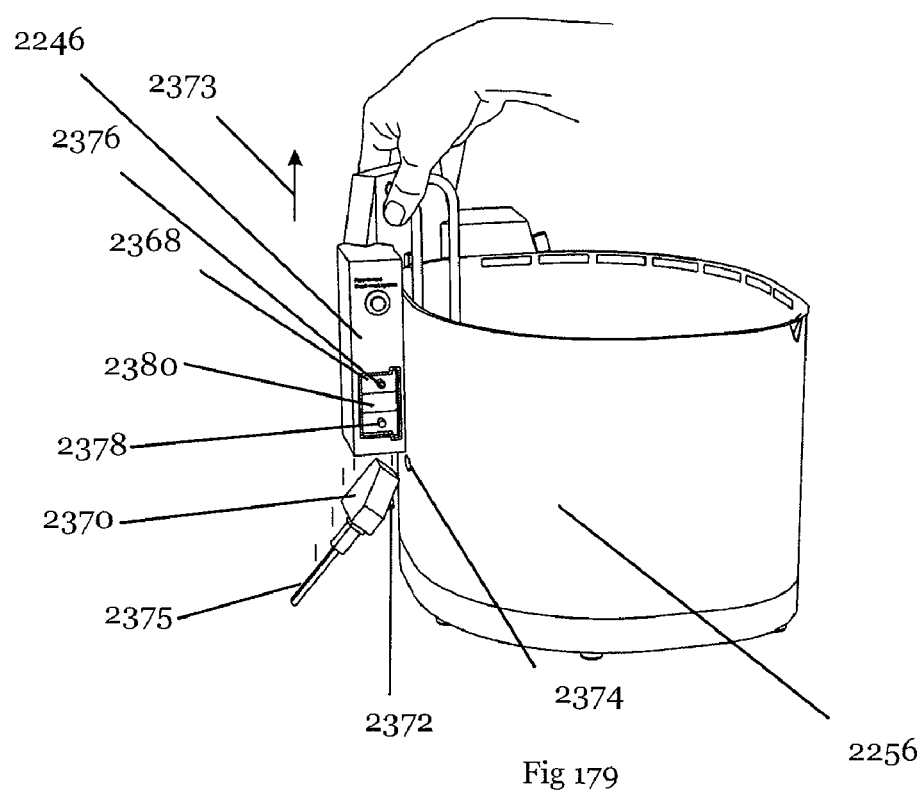

FIGS. 178 and 179 are perspective side views showing how power is disconnected to control box 146 when it is removed from outer housing 2256.

Figure 180:
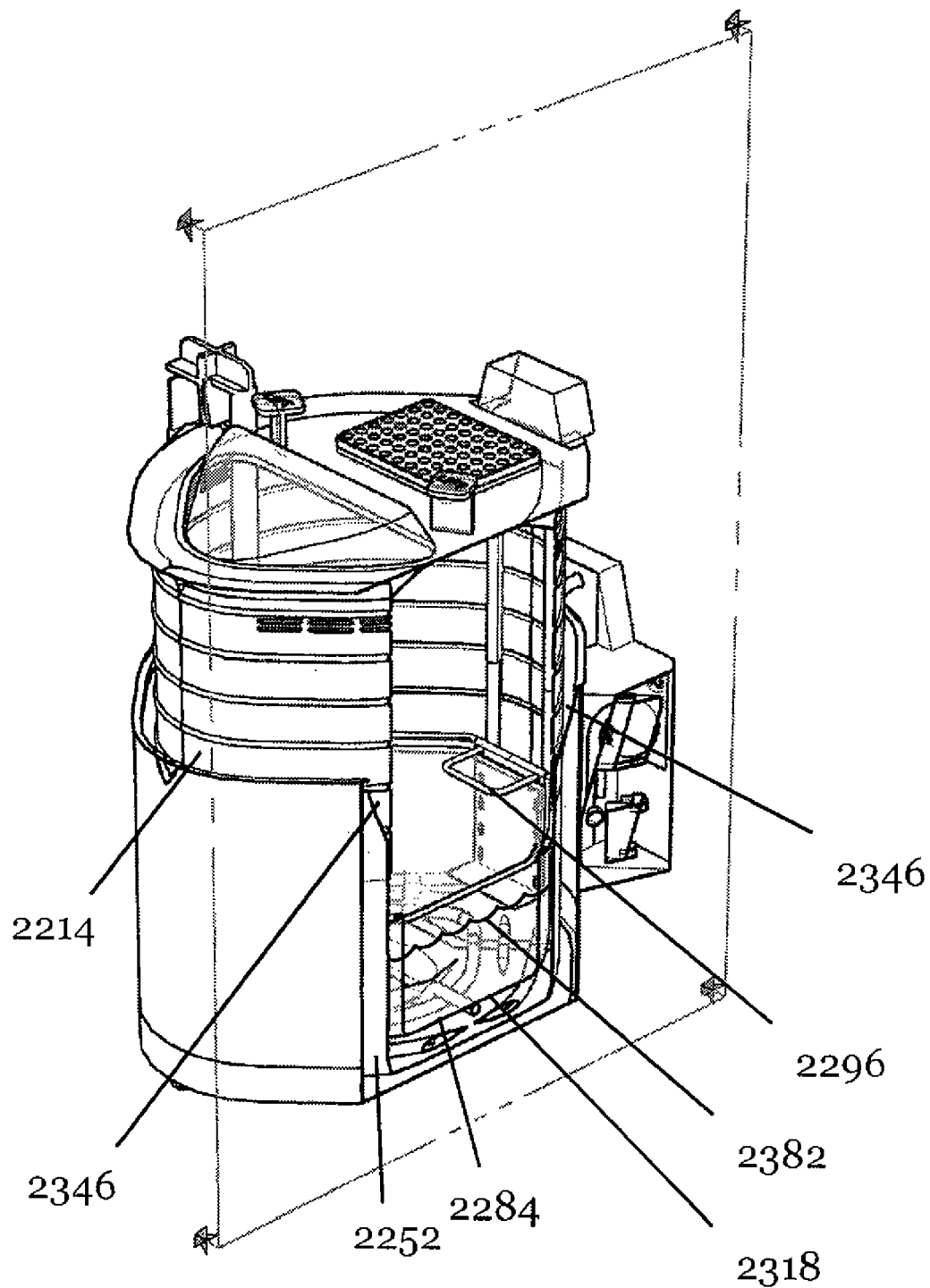

FIG. 180 is a forward perspective view with cross-section of the second embodiment while it is being used for steaming.

Figure 181:
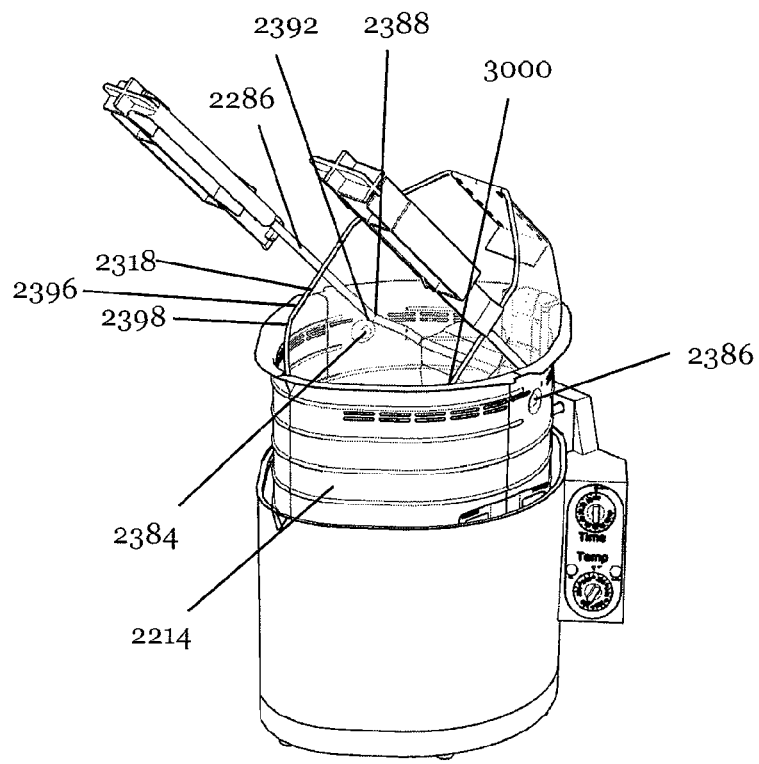
Figure 182:
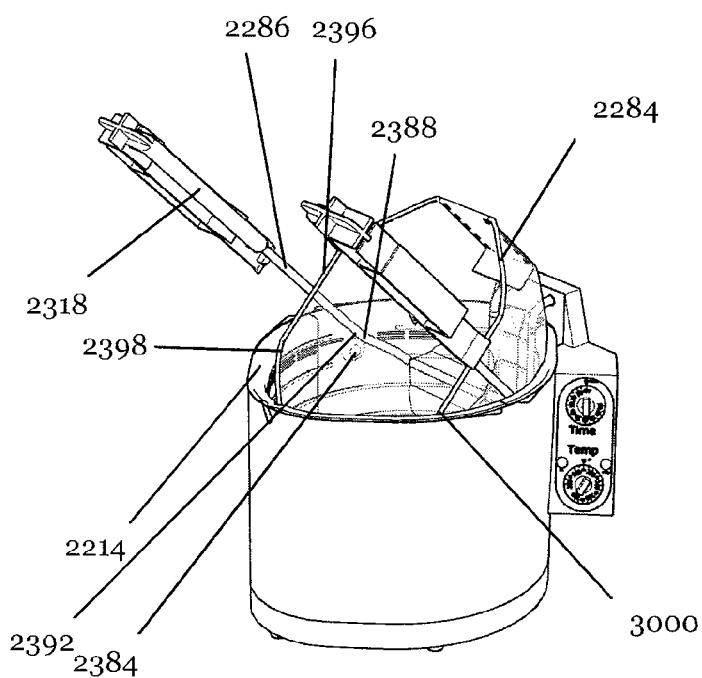

FIGS. 181 and 182 are forward perspective views of the second embodiment with food support assembly 2318 lifted and tipped forward.

Figure 183:
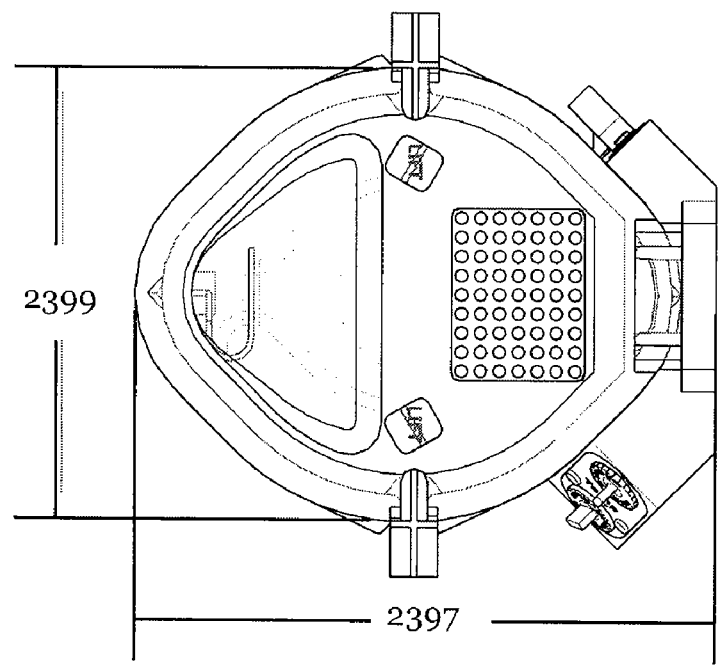

FIG. 183 is a plan view of the second preferred embodiment.

Figure 184:
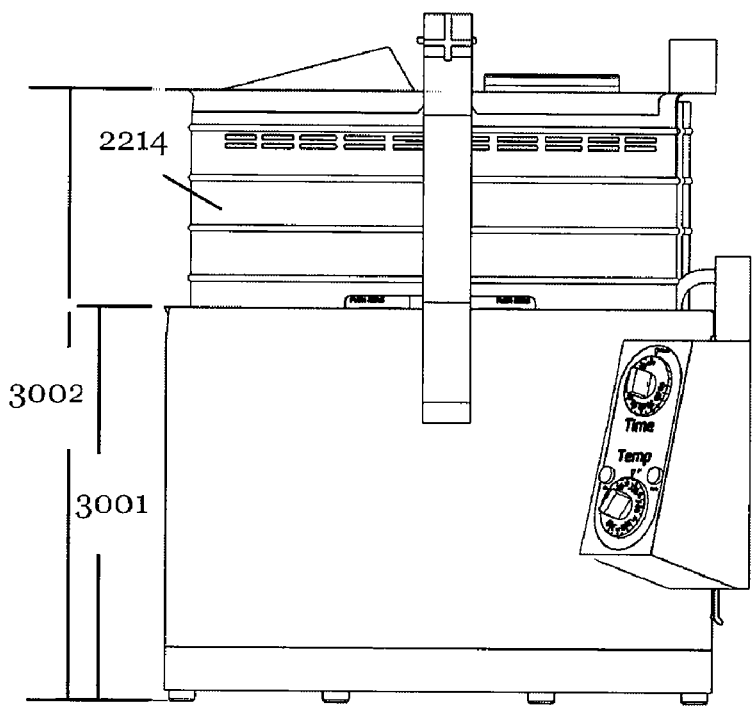

FIG. 184 is a side view of the second preferred embodiment.

Figures 185, 185A:
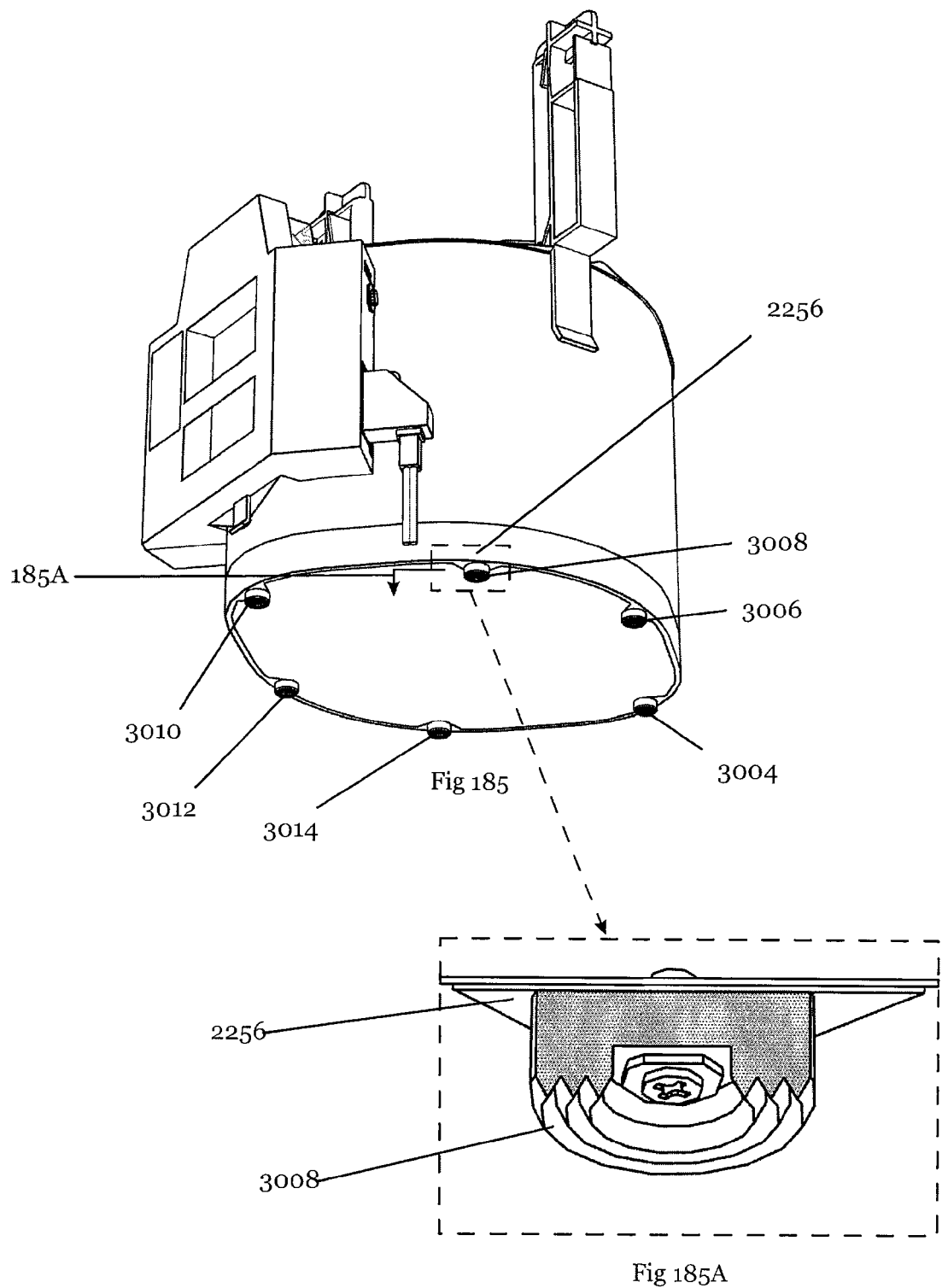

FIG. 185 is a perspective view from behind and below the second preferred embodiment.

FIG. 185A is an enlargement of a portion of FIG. 185.

FIGS. 186 through 189 are forward perspective views of a third preferred embodiment of the present inventions.

FIG. 190 is an exploded view of the third preferred embodiment.

FIG. 190A shows an enlarged view of a portion of FIG. 190.

FIG. 191 is a cross-section of lid 3020 as indicated in FIG. 190.

FIG. 191A shows an enlarged portion of FIG. 191.

FIG. 192 shows an exploded view of lid 3020 of the third preferred embodiment.

Figure 193:
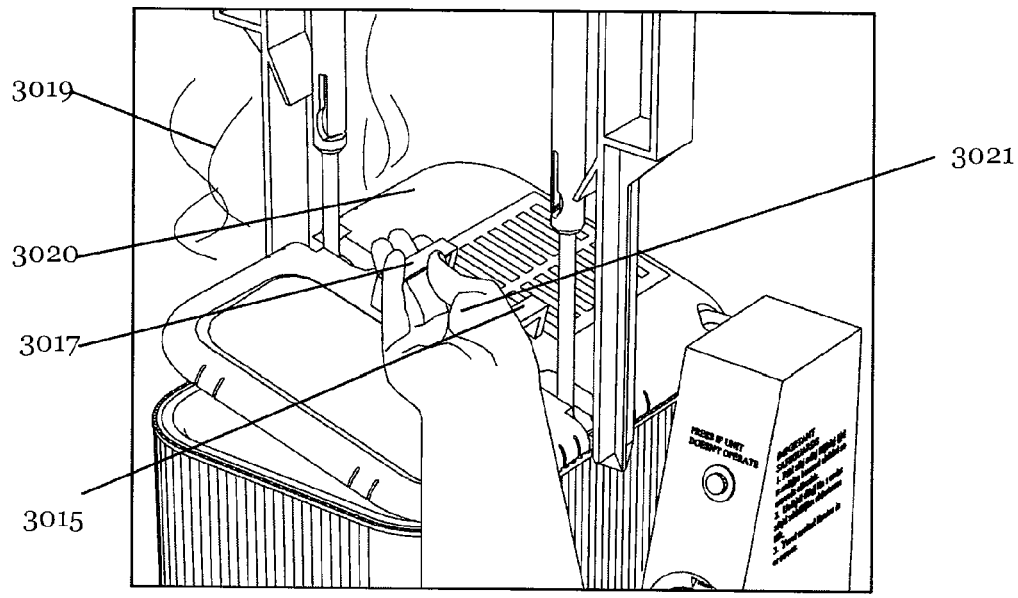

FIG. 193 demonstrates how lid handle 3017 might be gripped and used.

Figure 194:
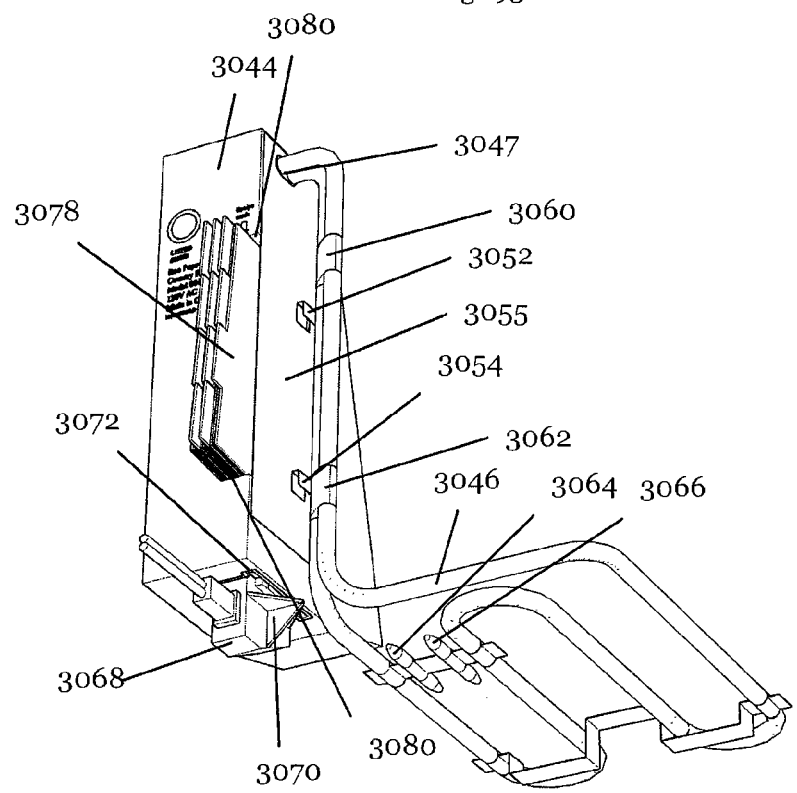

FIG. 194 is a lower rear perspective view of control box 3044.

Figure 195:
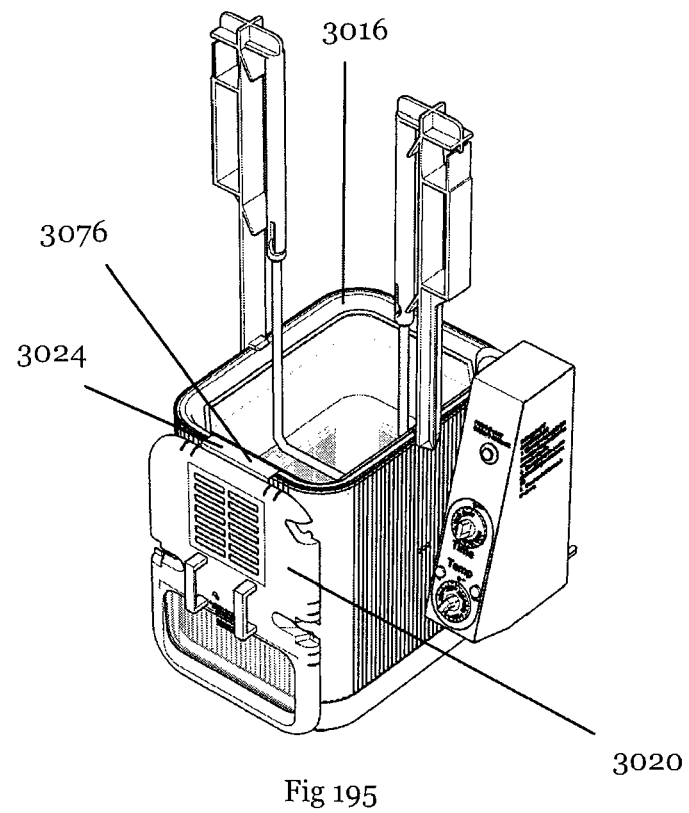
Figure 196:
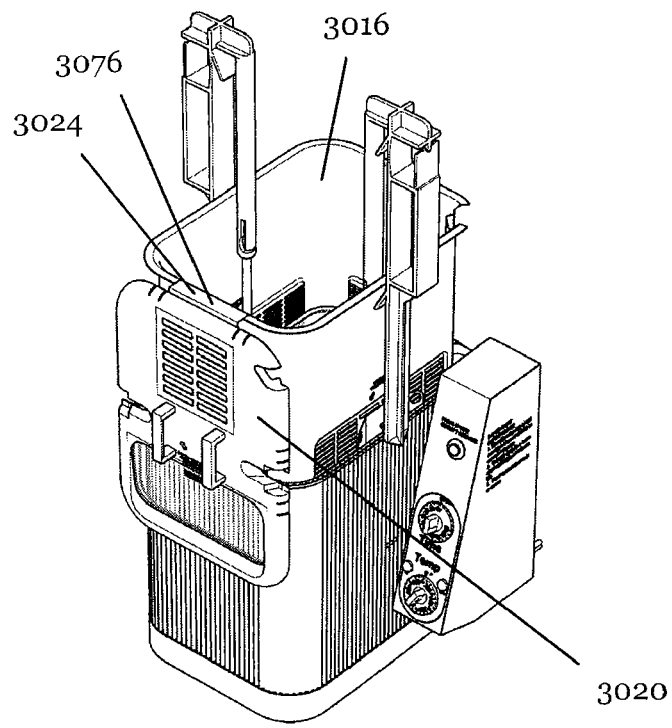

FIGS. 195 and 196 are forward perspective views of the third preferred embodiment with lid 3020 attached on its front.

Figure 197:
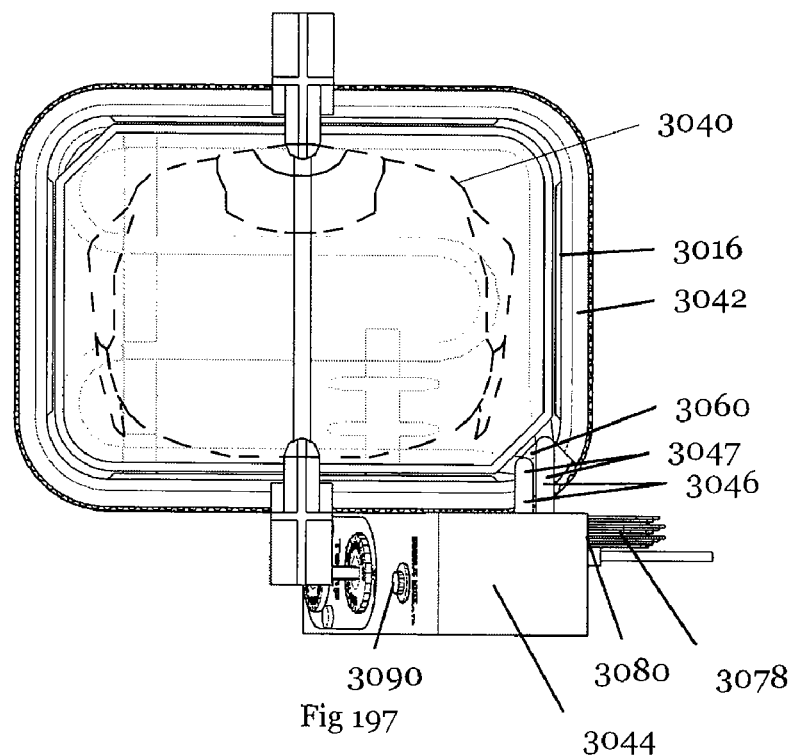

FIG. 197 is a plan view of the third preferred embodiment.

Figure 198:
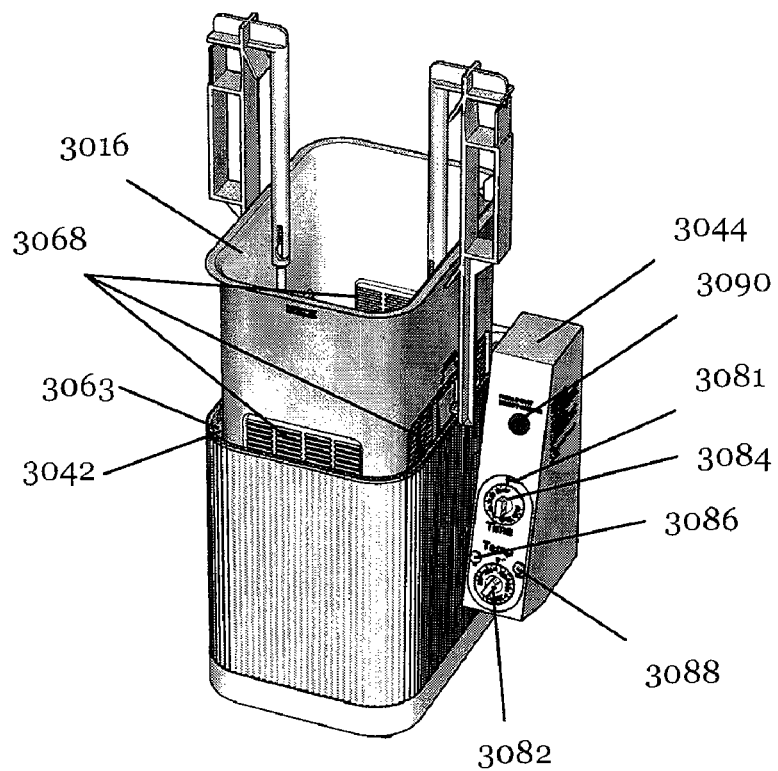

FIG. 198 is a forward perspective view with shading of the third preferred embodiment.

Figure 199:
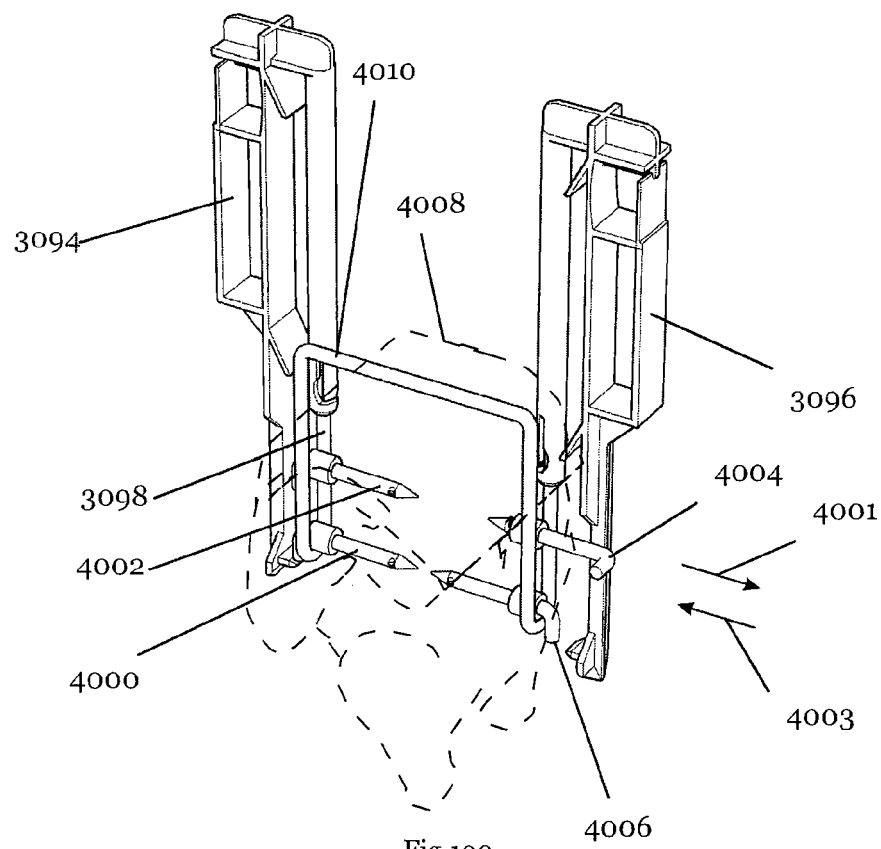

FIG. 199 is a forward perspective view of alternative spit assembly 4010.

Figure 200:
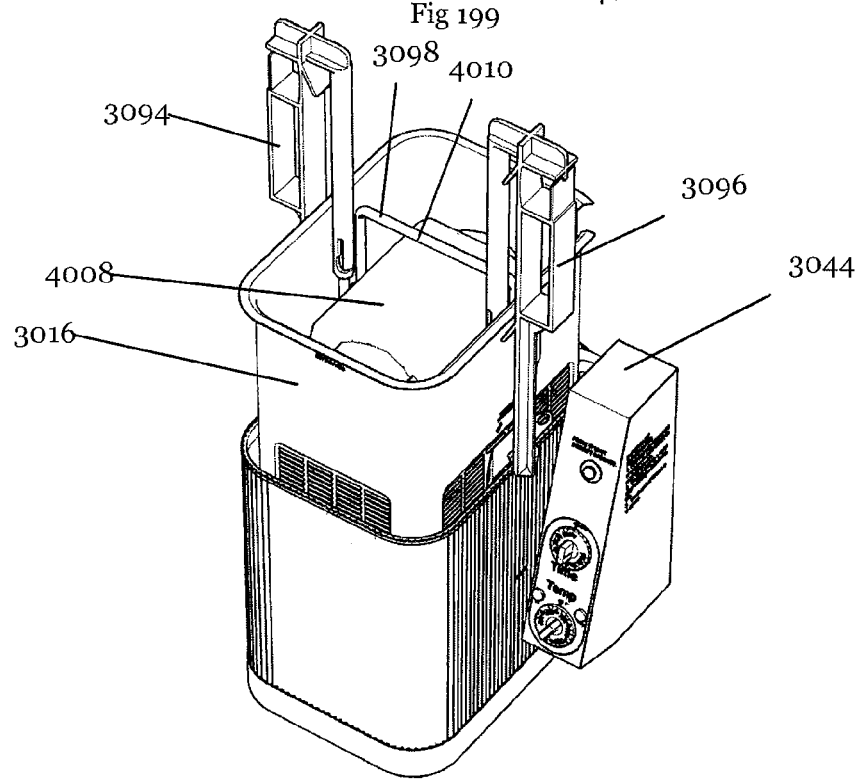

FIG. 200 is a forward perspective view of alternative spit assembly 4010 when it is lowered with food into sleeve 3016.

Figure 201:
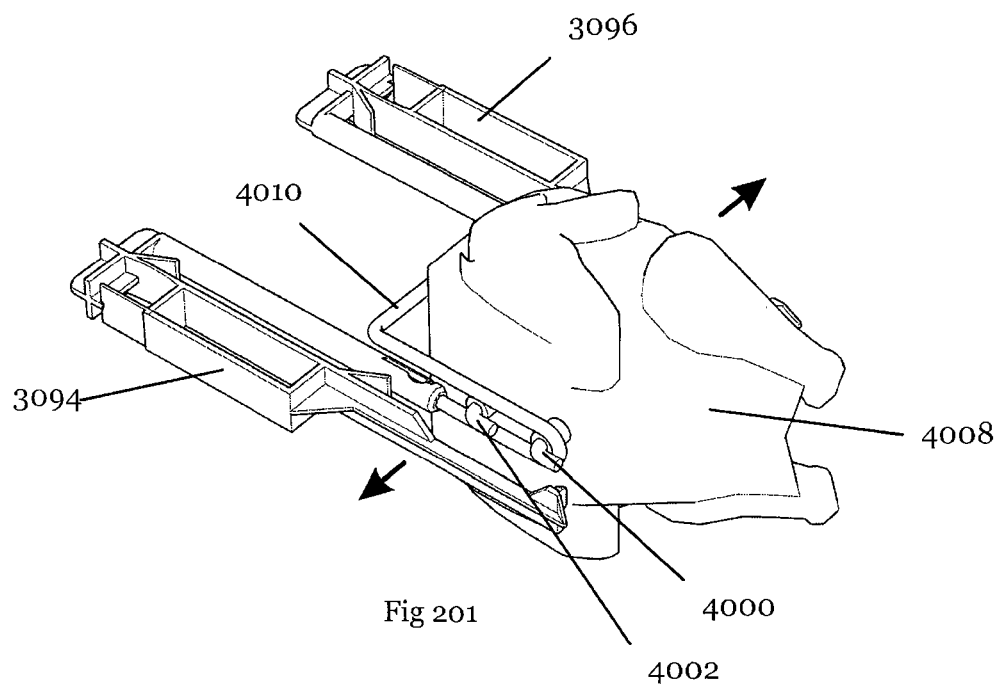
Figure 202:
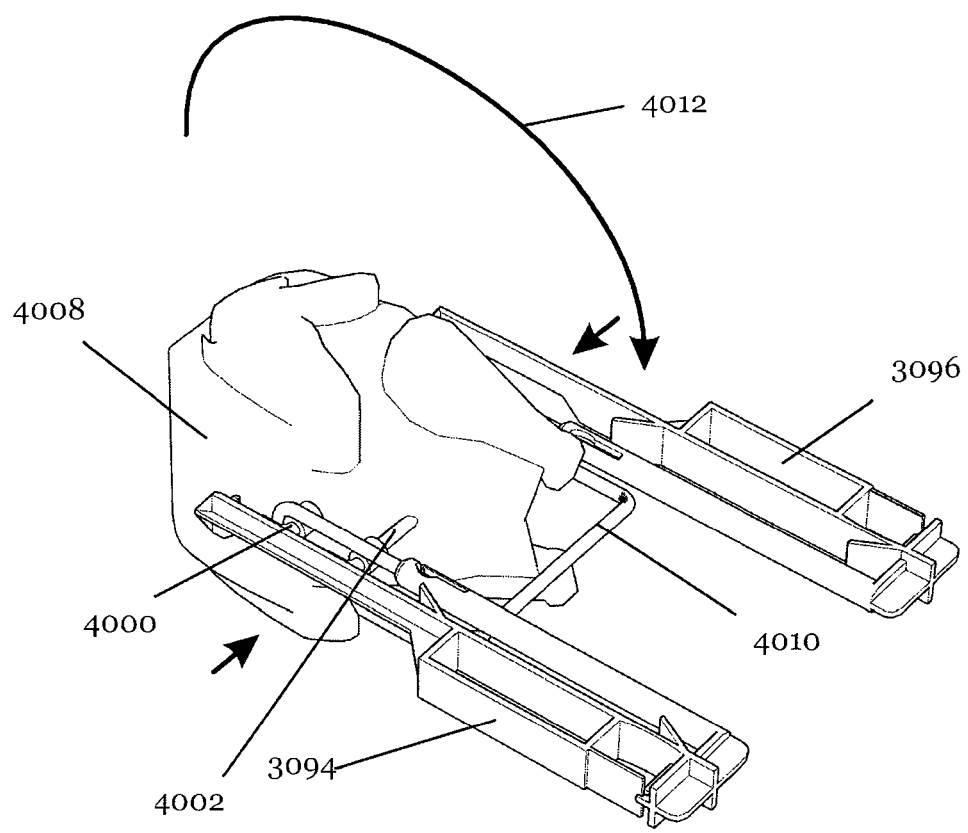

FIGS. 201 and 202 are forward perspective views of alternative spit assembly 4010 in use.

FIGS. 203 through 208 diagrammatically show a method of removing pollutants from oil.

FIG. 209 through 212 show using perspective views preferred embodiment fourteen of the present inventions.

Figure 213:
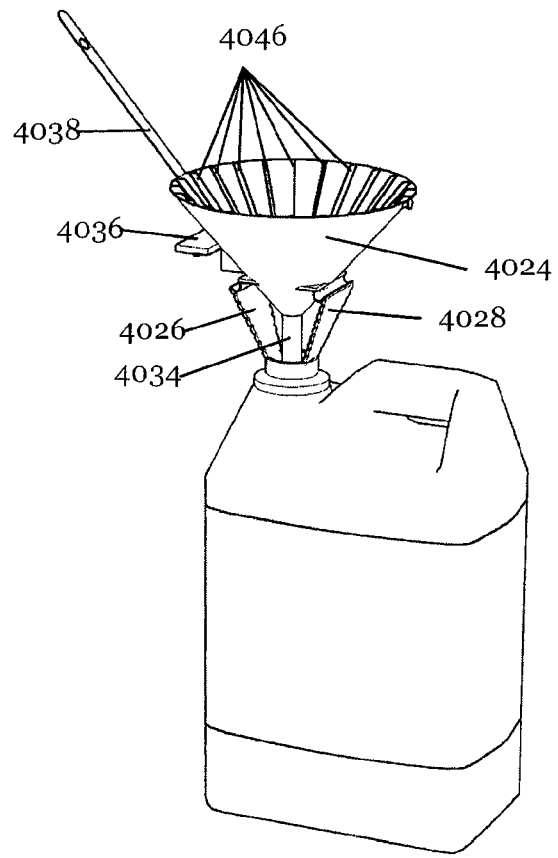
Figure 214:
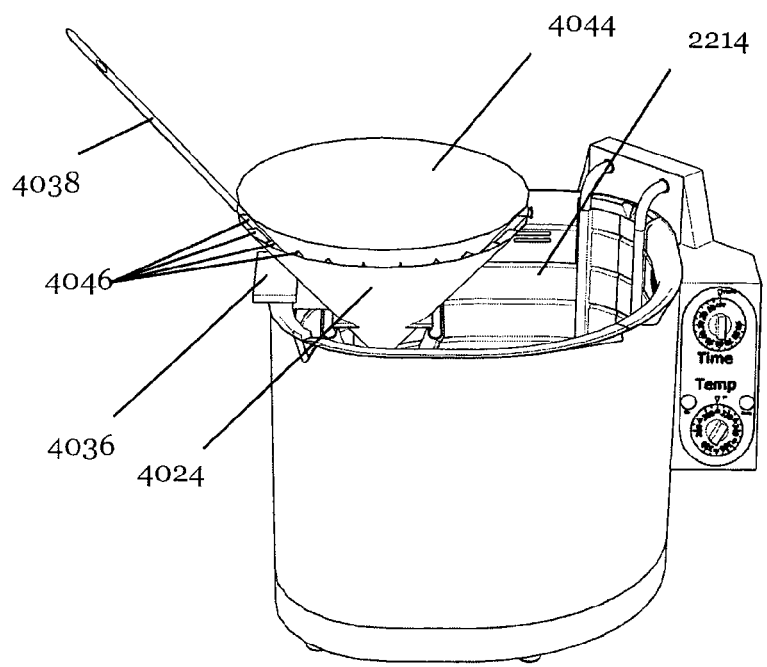

FIGS. 213 and 214 show embodiment fourteen in use.

Figure 215:
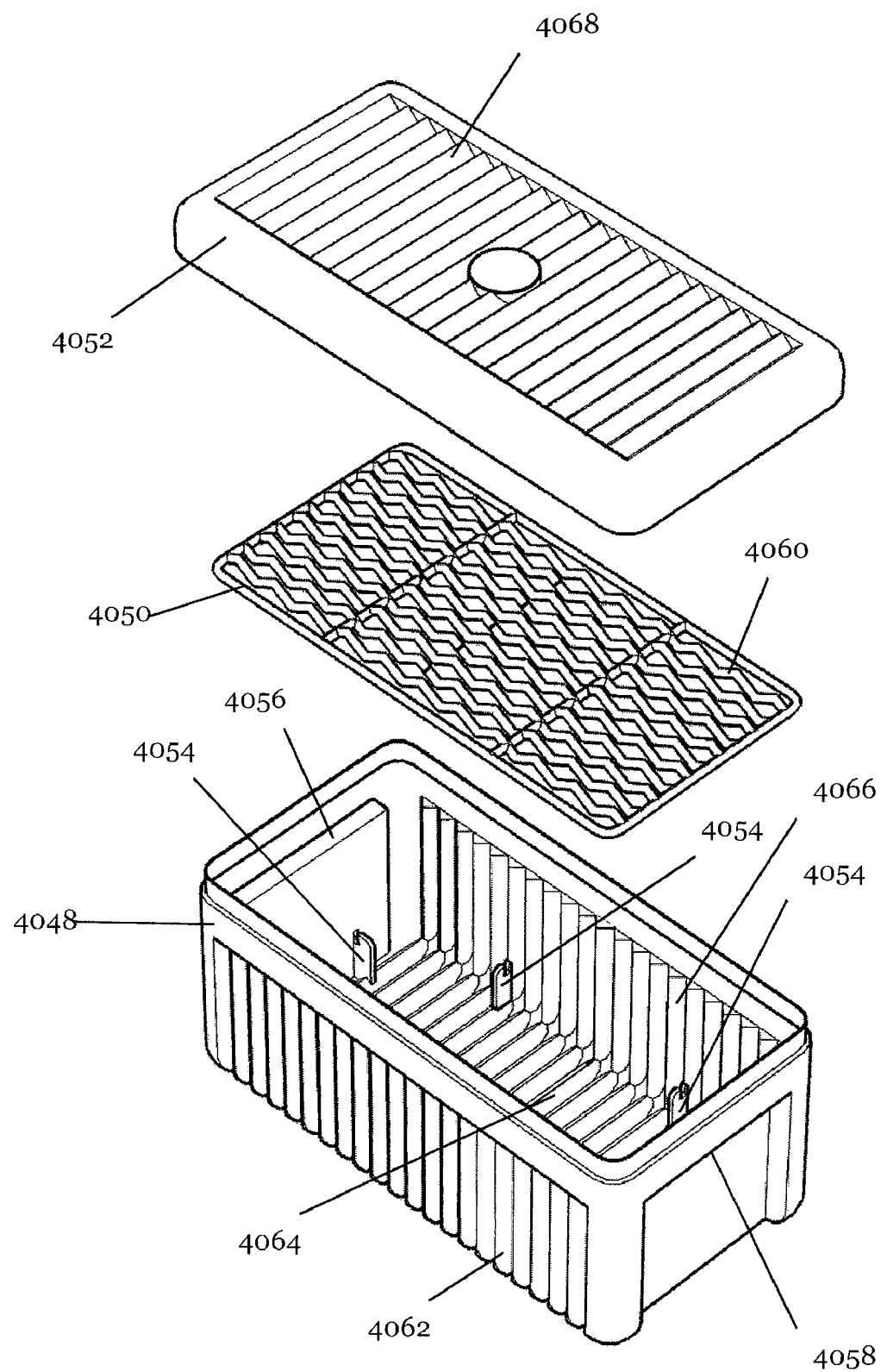

FIG. 215 shows an exploded perspective view of preferred embodiment fifteen of the present inventions.

Figure 216:
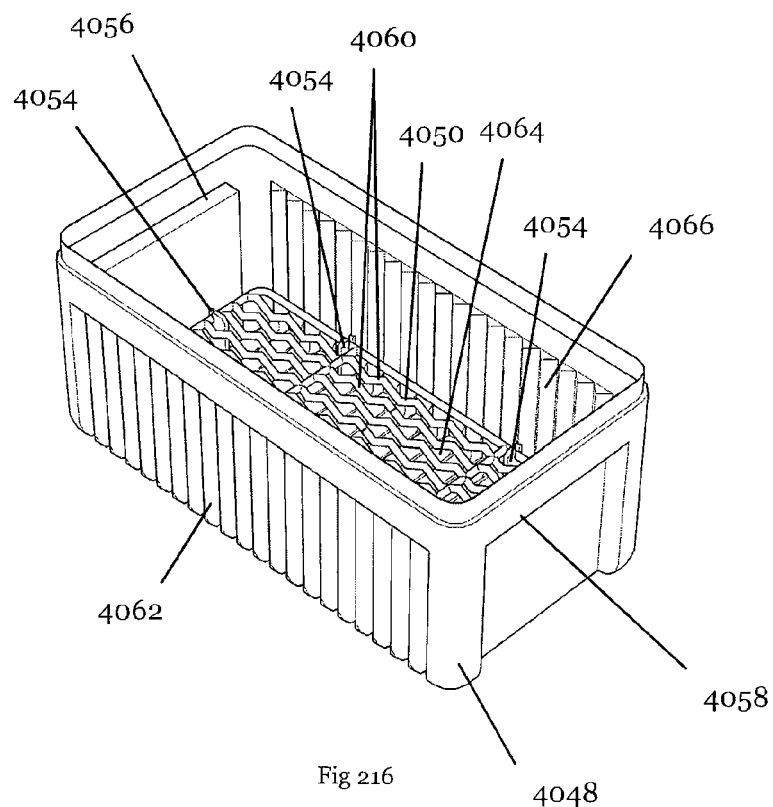
Figure 217:
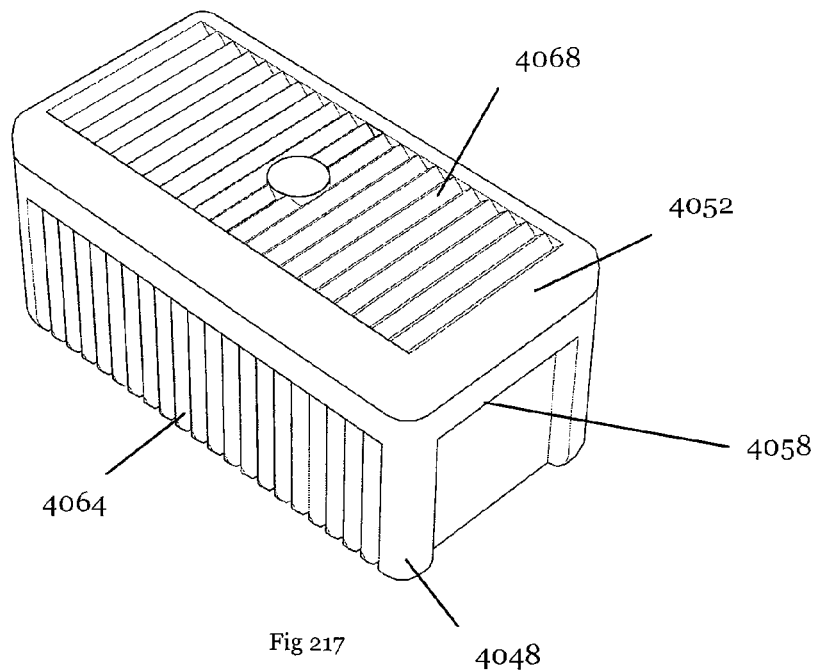

FIGS. 216 and 217 show perspective views of embodiment fifteen.

Figure 218:
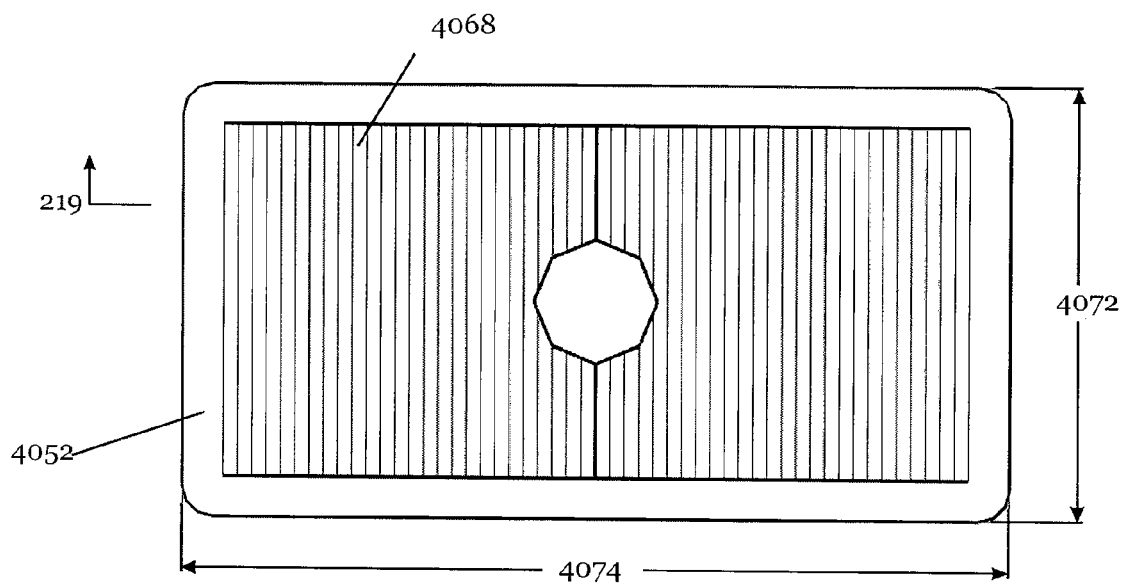

FIG. 218 is a plan view embodiment fifteen.

Figure 219:
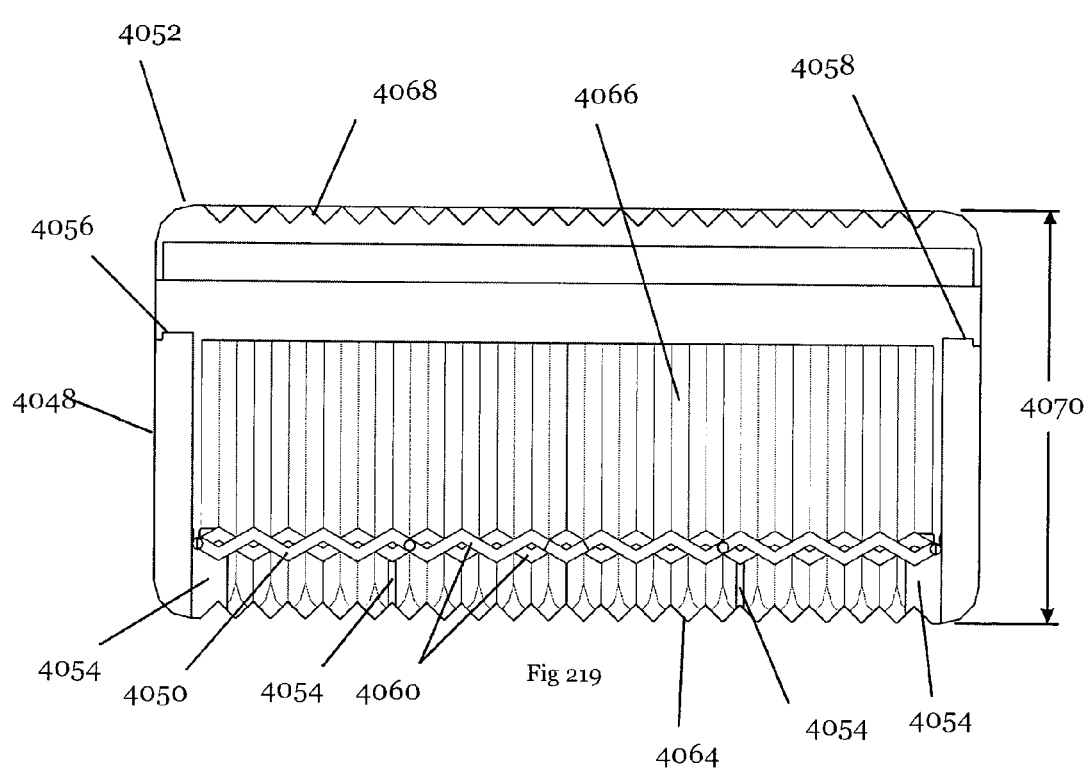

FIG. 219 is a section taken through FIG. 218 as indicated in FIG. 218.

Figure 220:
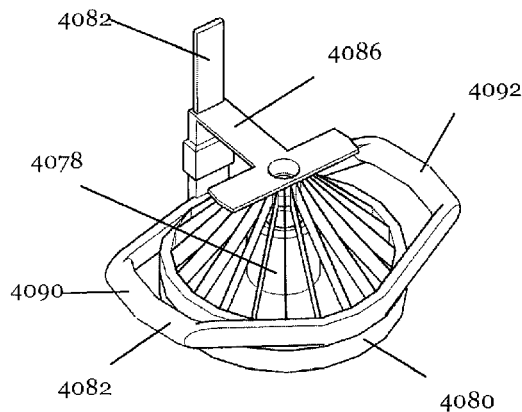
Figure 222:
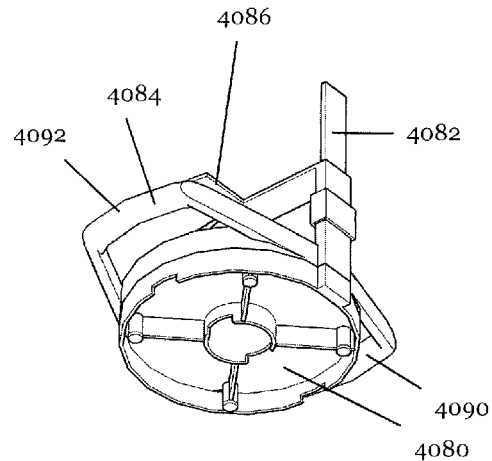
Figure 223:
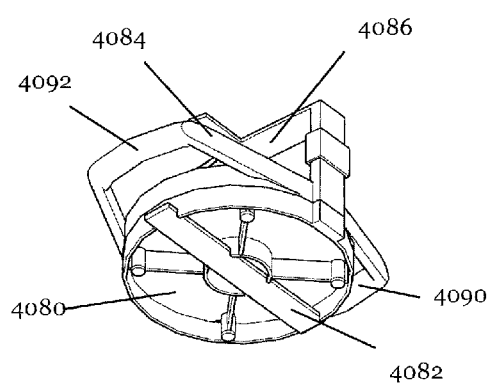

FIGS. 220, 222, and 223 are perspective views of preferred embodiment sixteen of the present inventions.

Figure 221:
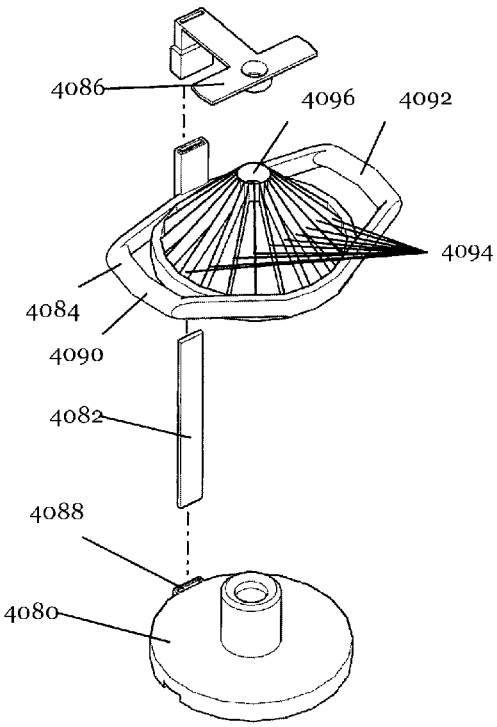

FIG. 221 is an exploded forward perspective view of embodiment sixteen.

Figure 224:
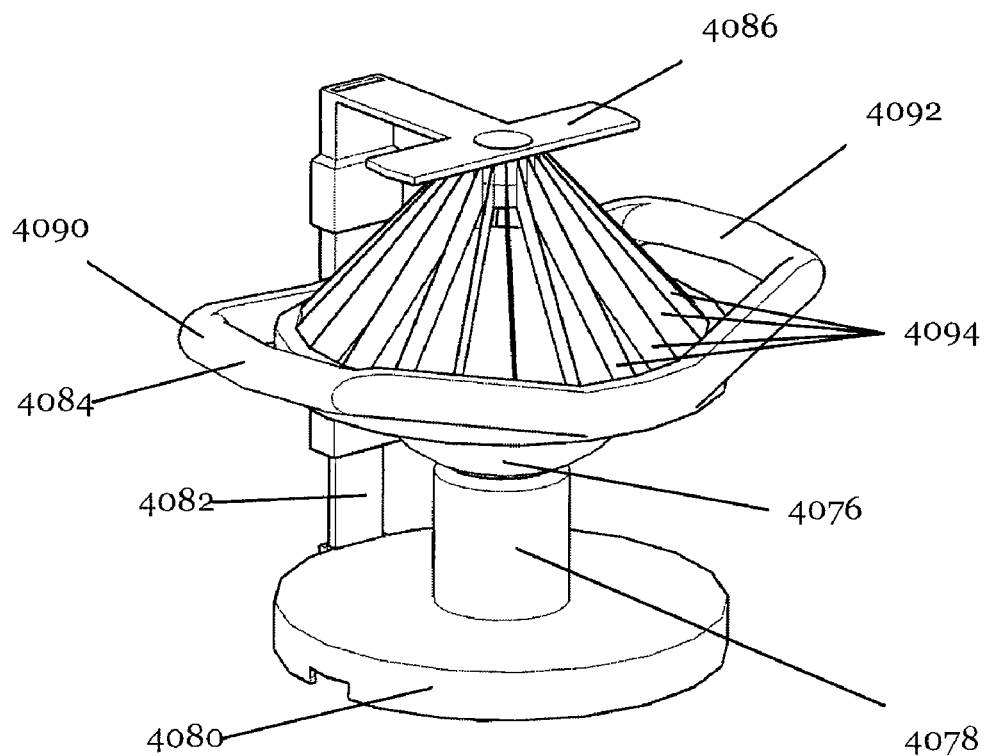
Figure 225:
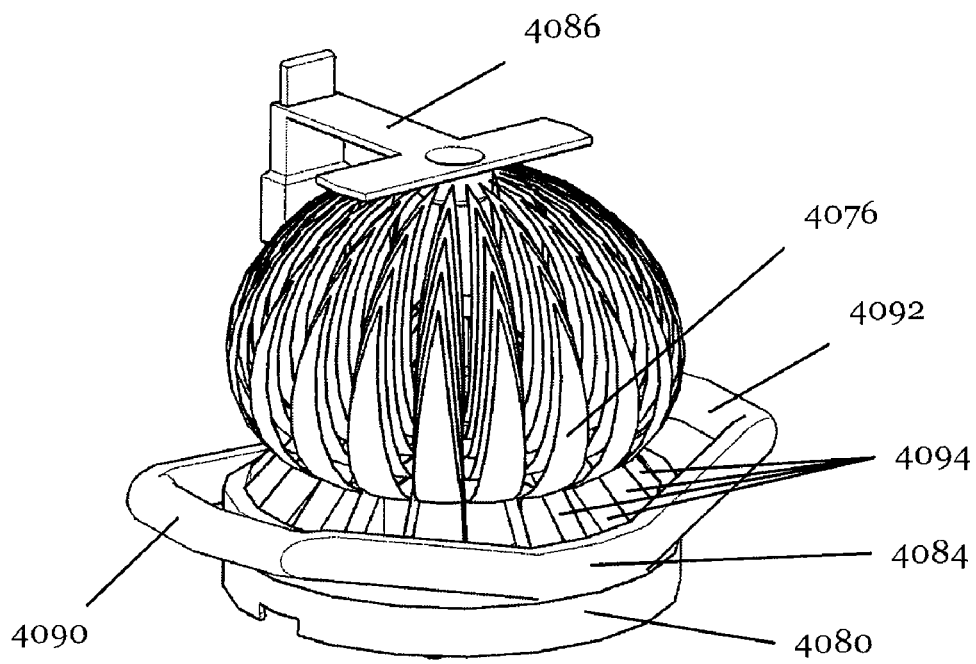

FIGS. 224 and 225 are perspective views of embodiment sixteen in use.

FIGS. 226, 228, 229, and 230 are forward perspective views of preferred embodiment seventeen of the present inventions.

Figure 226:
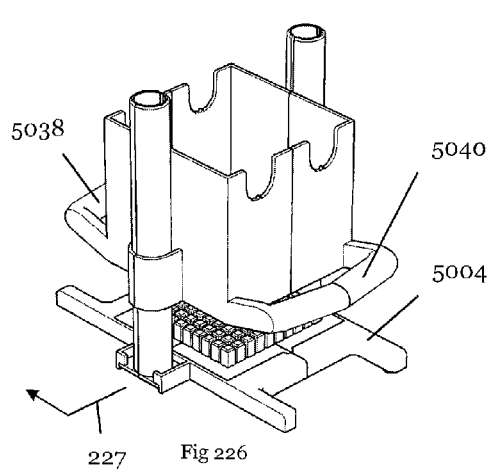
Figure 227:
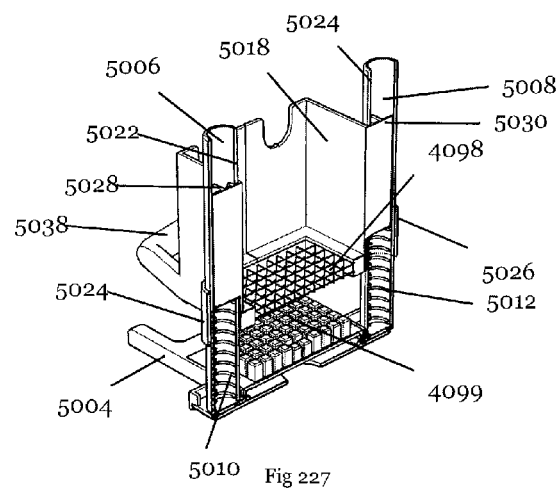

FIG. 227 is a cross-section taken through FIG. 226 as indicated in FIG. 226.

Figure 231:
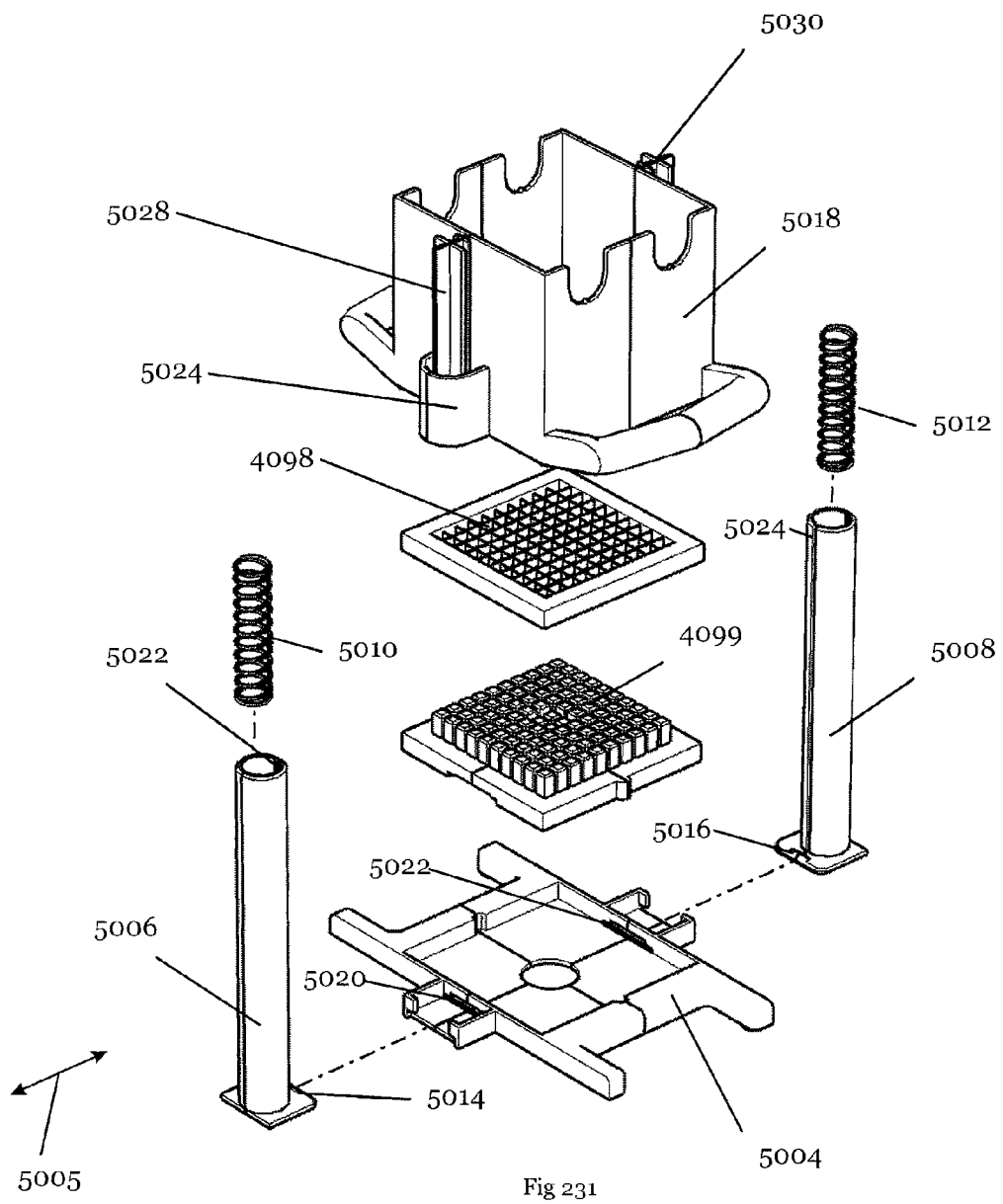

FIG. 231 is an exploded view of preferred embodiment seventeen.

Figure 232:
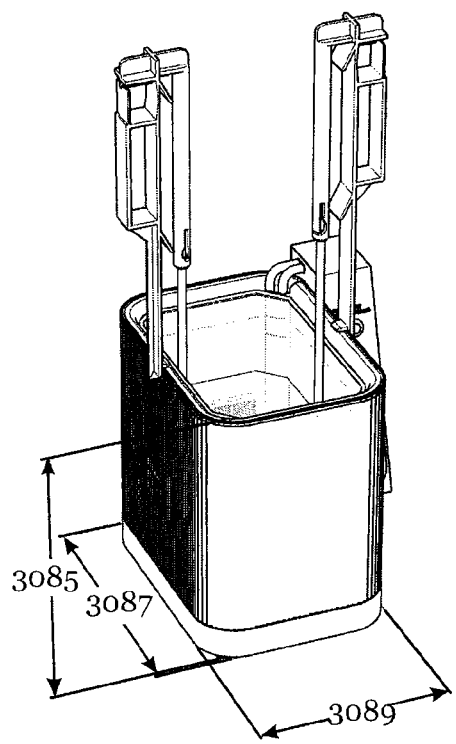
Figure 233:
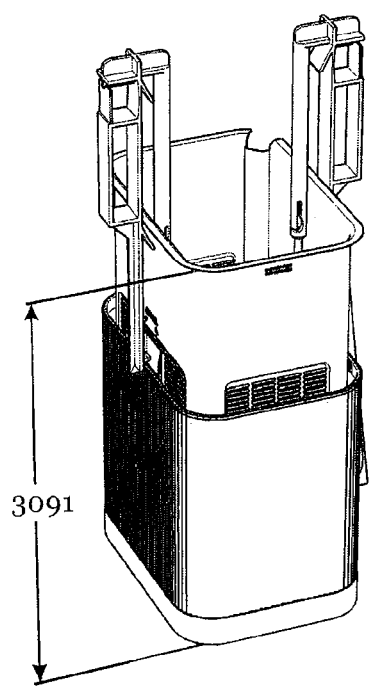

FIGS. 232 and 233 are forward perspective views of embodiment twelve of the present inventions.

Figure 234:
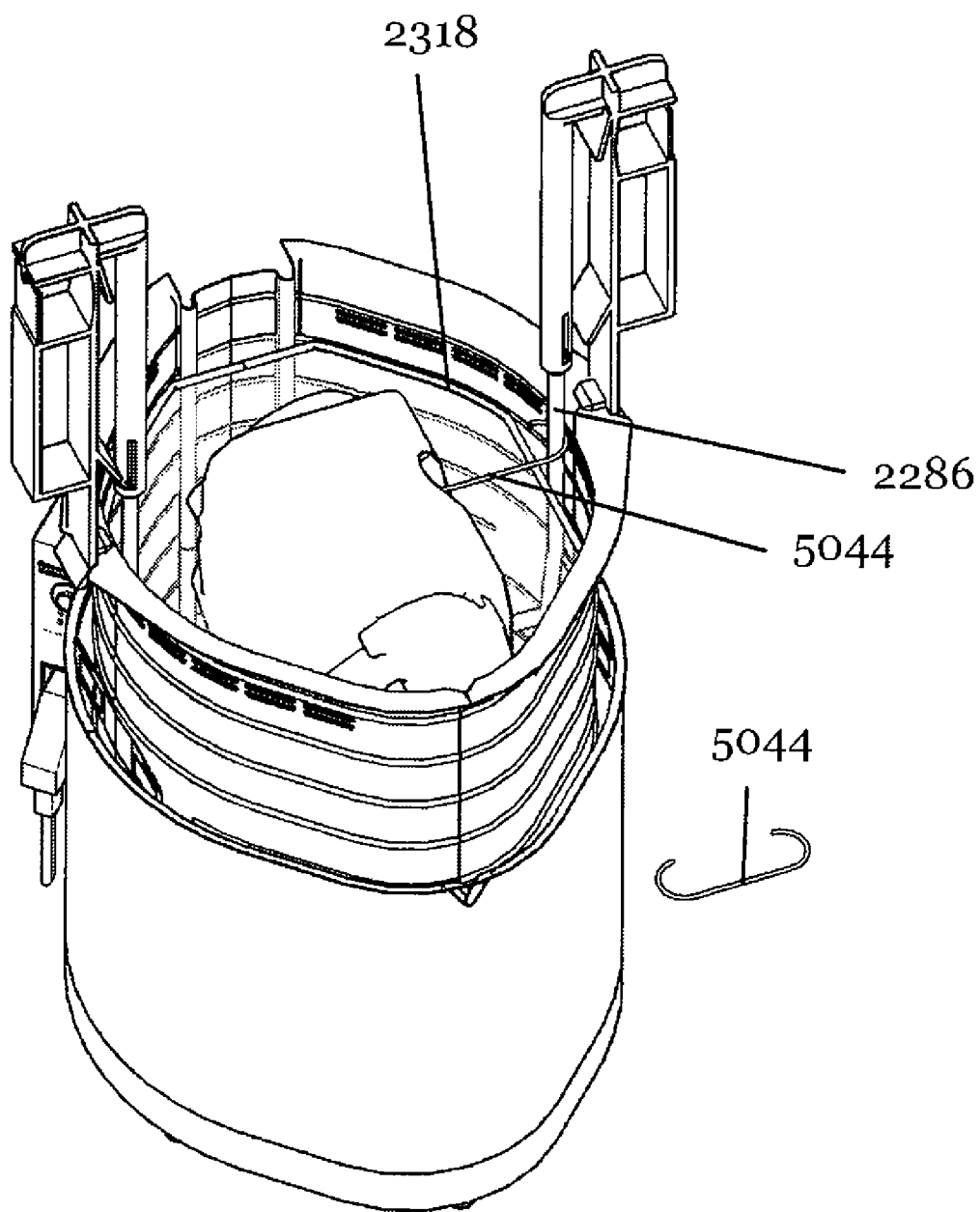

FIG. 234 is a forward perspective view of the second preferred embodiment of the present inventions with double hook 5044 shown in use to help hold unitary food upright.

Figure 235:
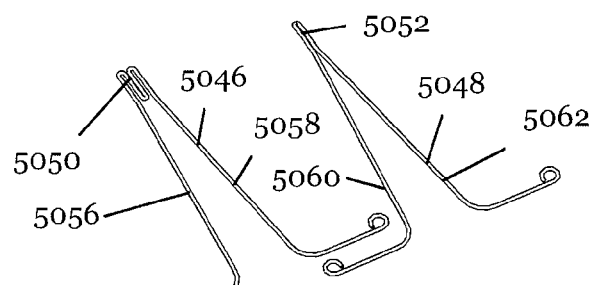
Figure 236:
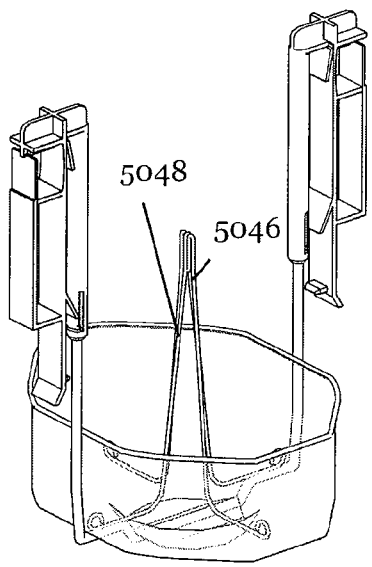
Figure 237:
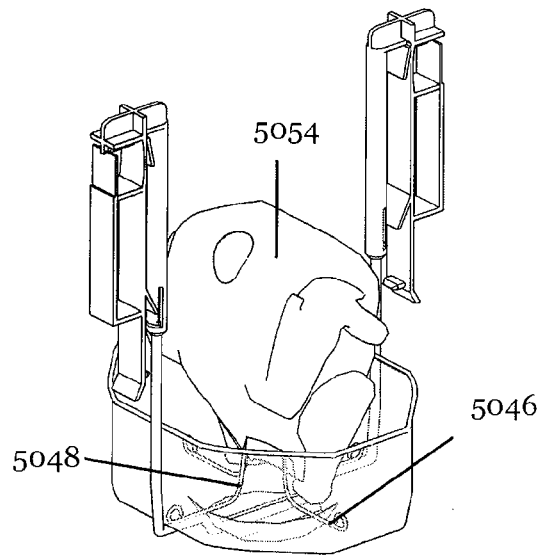

FIGS. 235 to 237 show a device, preferred embodiment nineteen, which may help steady unitary food being cooked in a vertical position.

Figure 238:
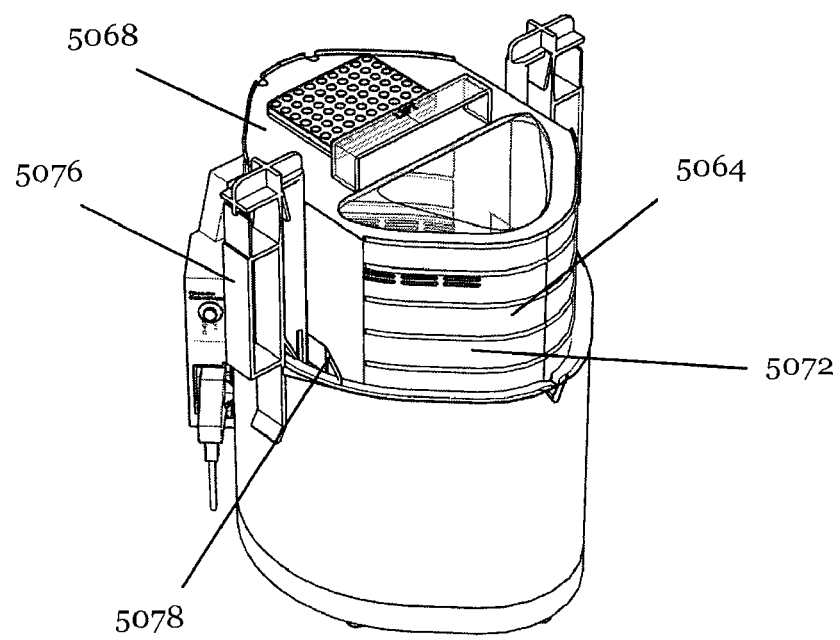

FIG. 238 is a forward perspective view of embodiment twenty.

Figure 239:
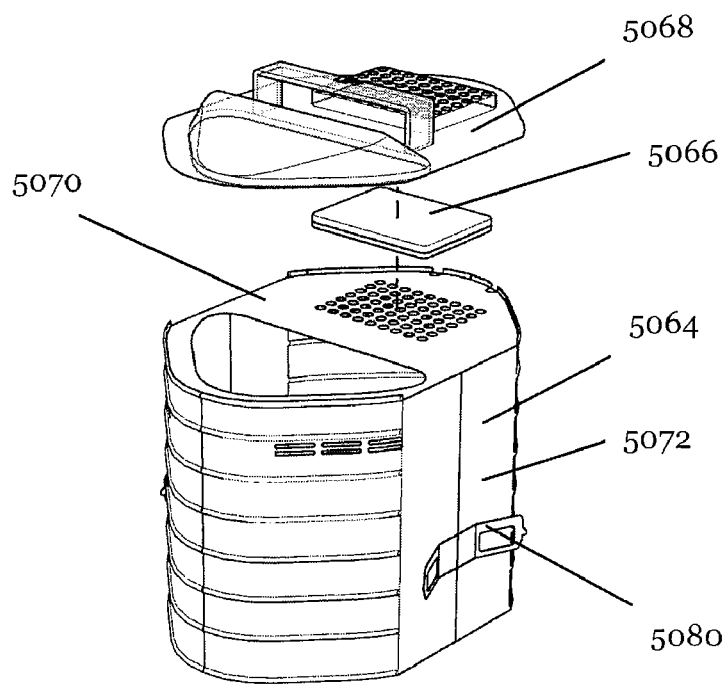

FIG. 239 is an exploded forward perspective view of integrated metal lid/sleeve 5064 including exhaust filters 5066 and snap-on plastic lid 5068.

Figure 240:
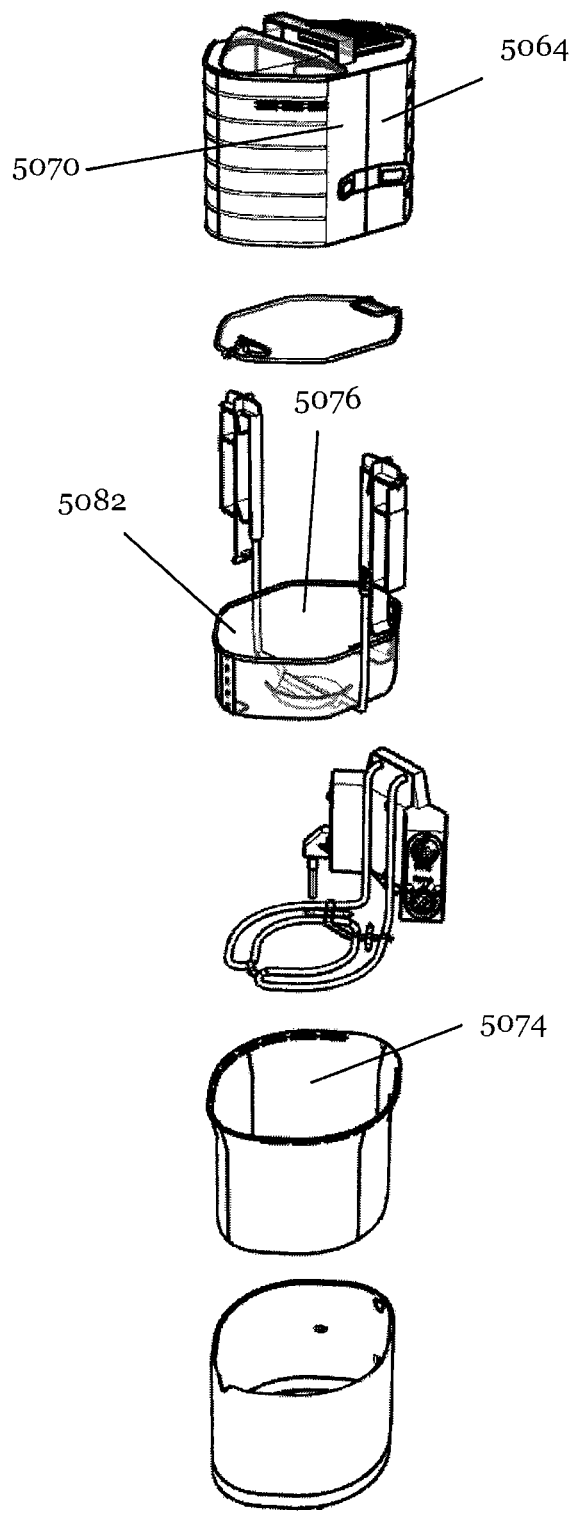

FIG. 240 is a forward perspective exploded view of embodiment twenty.

Figure 241:
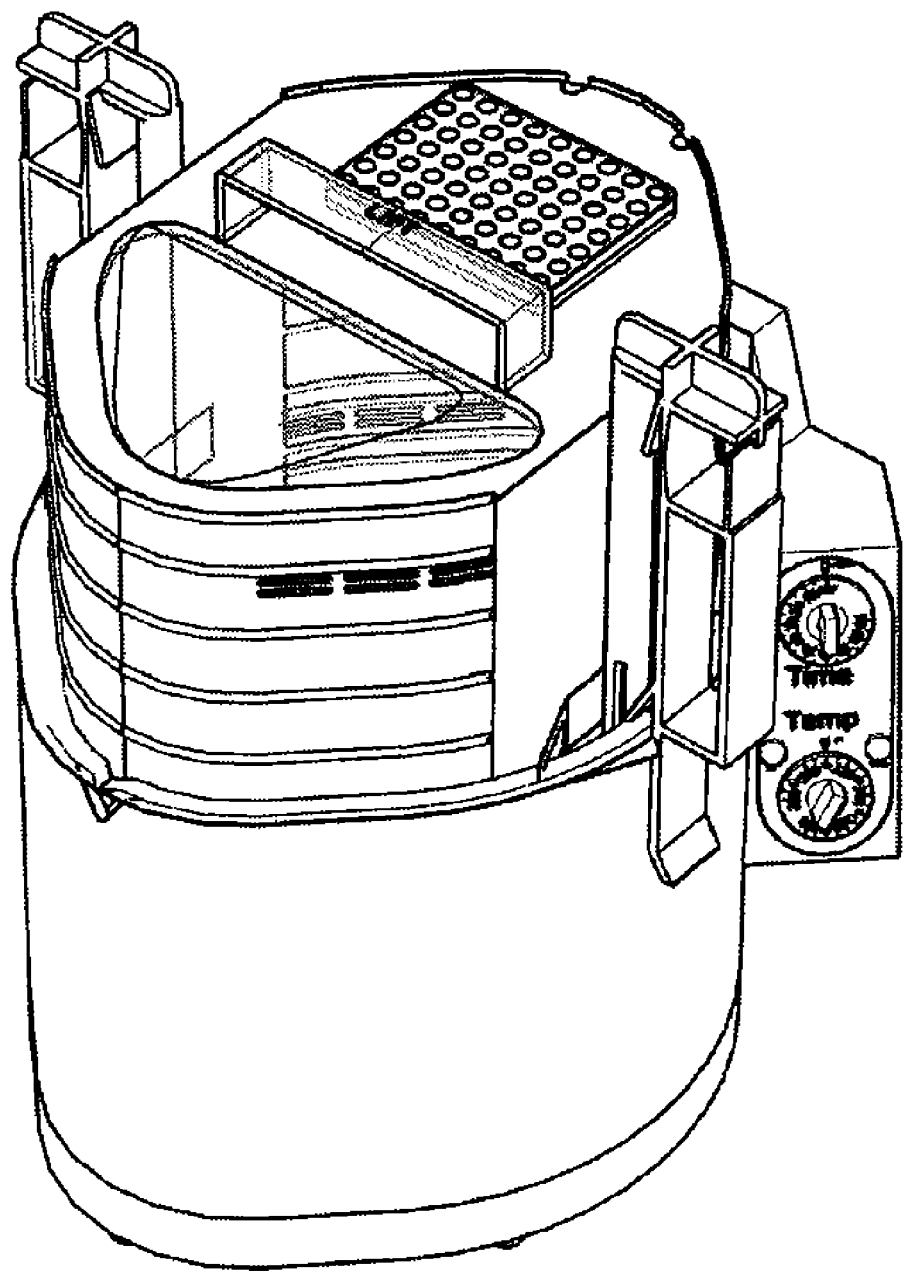

FIG. 241 shows a forward perspective view of embodiment twenty-one.

Figures 242, 243:
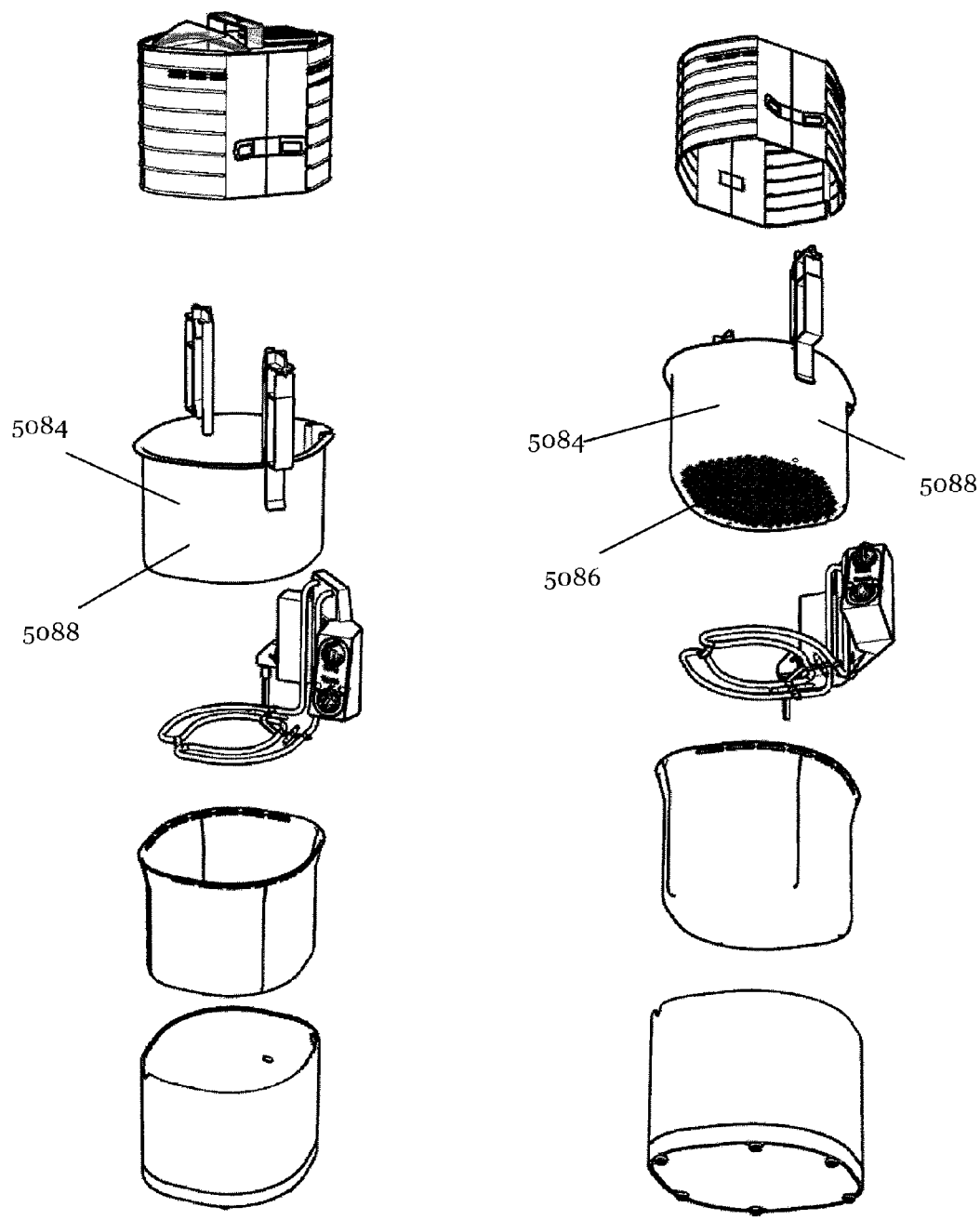

FIG. 242 shows an exploded side perspective view of embodiment twenty-one.

FIG. 243 is similar to FIG. 242 except taken from a lower vantage point.

DETAILED DESCRIPTION OF THE INVENTION

Cooking devices, constructed in accordance with the principles of this invention, are generally configured to facilitate the cooking of a food article by placing the food article into contact with a hot cooking liquid, e.g., oil or hot water. The devices are specifically constructed to facilitate this process and comprise an internal cooking cavity designed to accommodate a volume of a cooking liquid and the desired food article. A heating source is contained in the device and is positioned adjacent the cooking cavity to heat the cavity and its contents. A lid is positioned over an opening of the cooking cavity and is transparent to permit viewing of the food article being cooked.

The device can be configured having a food support vessel or food basket disposed therein that can be raised and/or lowered automatically or manually to remove the food article from the cooking liquid or place the food article into the cooking liquid, respectively. In an example embodiment, the device can be automatically controlled to provide a desired cooking temperature and/or to place and/or remove the food article into the cooking liquid to achieve a desired cooking effect.

Cooking devices, constructed in accordance with principles of the invention can be configured having a number of different embodiments. Accordingly, while a number of example embodiments of the cooking device are disclosed and illustrated herein, it is to be understood that other embodiments of cooking devices constructed according to principles of this invention not expressly disclosed or illustrated are also intended to be within the scope of this invention.

First Embodiment

Figure 12:
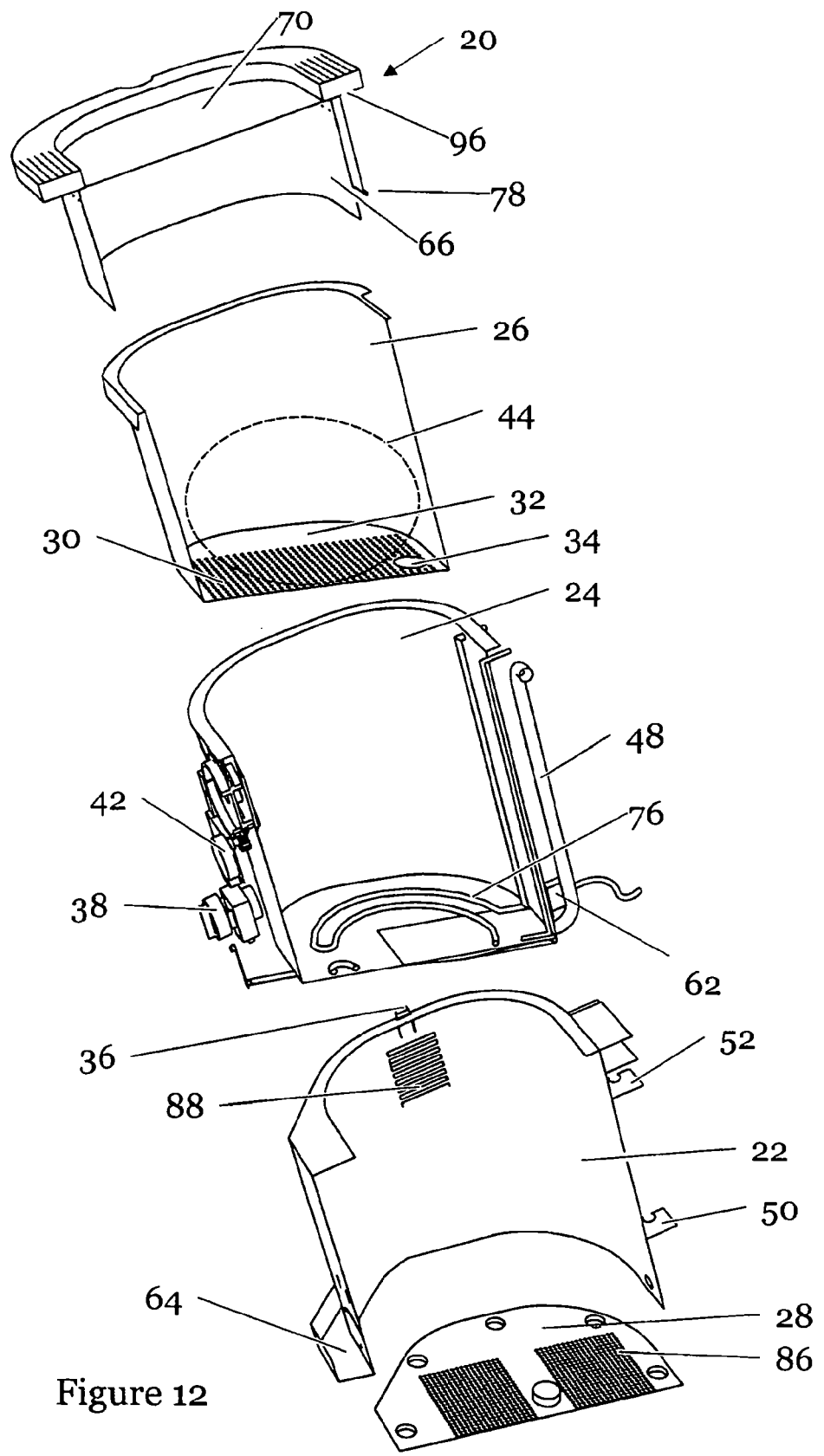
FIG. 12 is an exploded cross-sectional perspective view of the first preferred embodiment of FIG. 1 showing its elements in an unassembled state.

FIGS. 1 to 12 illustrate a first embodiment cooking device 21 constructed in accordance with the principles of this invention. The cooking device 21 generally comprises an outer or external housing 22 that is sized and shaped to provide an inner cavity to accommodate the different elements of the device. The outer housing 22 can be formed from structurally rigid materials such as metals, plastics and the like and defines an outer structure of the device. The outer housing 22 comprises a wall structure that extends upwardly from a base or bottom portion that is positioned adjacent a device supporting surface, e.g., a table or kitchen counter, and that extends axially a distance to an open end. In an example embodiment, the outer housing is capped on its bottom end by a base 28 (as best shown in FIG. 12).

The outer housing 22 can be configured including one or more vents to facilitate providing a more user-friendly cool outer surface. In an example embodiment, the outer housing 22 is constructed having convection ventilation of hot air that is disposed within the annular space that is formed between the inside surface of the outer housing and the outside surface of the cooking vessel (24 described below). Specifically, the outer housing is constructed comprising a plurality of vent openings 86 disposed through the base 28, and vents 88 disposed through the wall surface of the outer housing 22.

Figure 3:
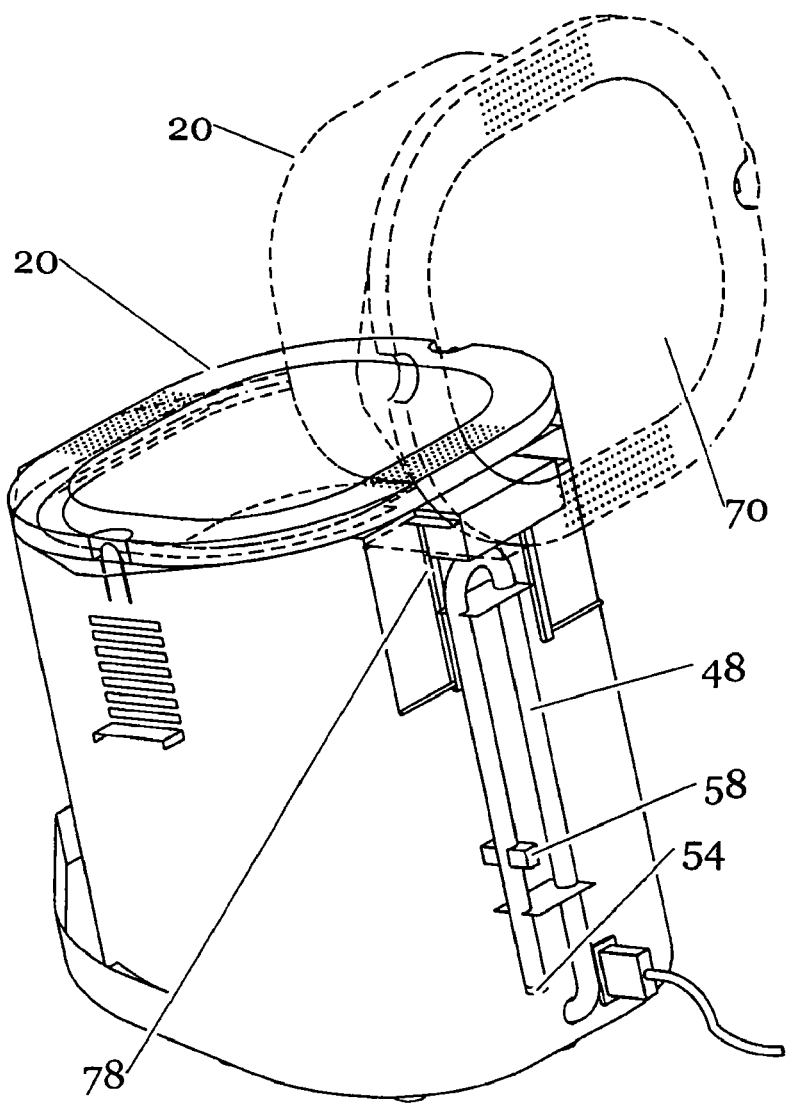
FIG. 3 is a rear upper perspective view of the first preferred embodiment of FIGS. 1 and 2.

A lid 20 is positioned over a top end of the device 21 and is located adjacent the open end of the outer housing 22. In an example embodiment, a portion of the lid is attached to the device to facilitate movement of the lid from an open to a closed position without being removed therefrom. In an example embodiment, the lid is configured to close against a cooking vessel 24 that is disposed within a cavity ## of the outer housing 22. The lid 20 is attached to the device 21 in a manner that permits it to both move axially within the device, to seal and unseal with the cooking vessel 24, and to pivot away from the open end of the outer housing 22, to permit for the loading and unloading of food into and out of the cooking device. In an example embodiment, the lid 20 is attached to the device through a slide and hinge mechanism 78 (as best shown in FIG. 3). The lid may be rested in an open position (as shown in FIG. 3) to make it more convenient to use the device.

The cooking vessel 24 is statically secured within the cavity of the outer housing and is made from a structural material such as metal, metal alloy and the like that is capable of retaining a rigid structure while containing a volume of heated cooking liquid such as oil or water. In an example embodiment, the cooking vessel is formed from a metallic material. The cooking vessel is configured having a wall surface that is sized and shaped to fit concentrically within the outer housing cavity. The cooking vessel as a closed end that is positioned adjacent the outer housing base, and has an open end that is positioned adjacent the outer housing open end.

A food support vessel 26 is disposed within the device 21 and, more specifically, is removably disposed within the cooking vessel 24. The food support vessel 26 comprises a generally continuous wall structure that is sized and shaped to fit concentrically within the cooking vessel, and that extends axially from a base or floor 32 to an open end. The food vessel floor 32 comprises a plurality of holes or perforations 30 that extend therethrough that are sized and shaped to facilitate the passage of the desired cooking liquid from the cooking vessel and into the food vessel.

The food support vessel 26 is sized to permit axial movement within the cooking vessel 24 to facilitate moving the food vessel axially upwards and downwards therein. As better described below, the food support vessel 26 is configured to contain one or more desired food articles therein while the food article is being cooked within the cooking vessel, and while the food is being lowered into a cooking position and removed from a cooking position within the cooking vessel 24.

In an example embodiment, the cooking vessel 24 and food support vessel 26 are both configured having an slightly elongate cylindrical configuration, thus being better able to accommodate and being more closely contoured to fit an exterior of a turkey. Configuring the cooking vessel and food support vessel in this manner enables the device to more efficiently accommodate a turkey without wasted space, thereby helping to maximize counter space, as well as more efficiently cook a turkey without wasted cooking liquid and the energy and time necessary to heat the same, when compared to a simple cylindrical cooking device.

The lid 20 of the device is placed into an open position to allow for the loading of one or more food articles into the food support vessel 26. The lid is designed to move from an open position by hingedly swinging over the open end of the food support vessel 26, and then sliding axially towards the food support vessel 26 to cap and seal the cooking vessel 24.

In operation, the lid 20 is opened to exposing the food support vessel 26. The desired cooking liquid, e.g., oil, poured into the open end of the food support vessel 26 and runs through the holes 30 in the food support vessel floor 32. The cooking liquid is provided until a desired cooking volume is achieved. In an example embodiment, the floor of the food support vessel includes a viewing depression 34 disposed therein that enables viewing of the cooking liquid level within the device. Viewing the depression 34, located in and projecting below the bottom of food support vessel 26, by filling with oil before the acceptable oil level is exceeded, helps to ensure a user will not overfill, or underfill, the device with water for steaming, or with cooking oil for deep fat frying. Alternatively, a light conducting material, such as glass or plastic, may be formed to perform the same purpose.

The device includes a trough 64, formed at least along a lower forward outer portion of outer housing 22 that operates to catch and contain any cooking liquid that may spill when introducing it into the device or that overflows from the device for any reason. Accordingly, the trough 64 helps to prevent the spillage of cooking liquid from the device onto and potentially causing damage to a supporting substrate surface.

Figure 5:
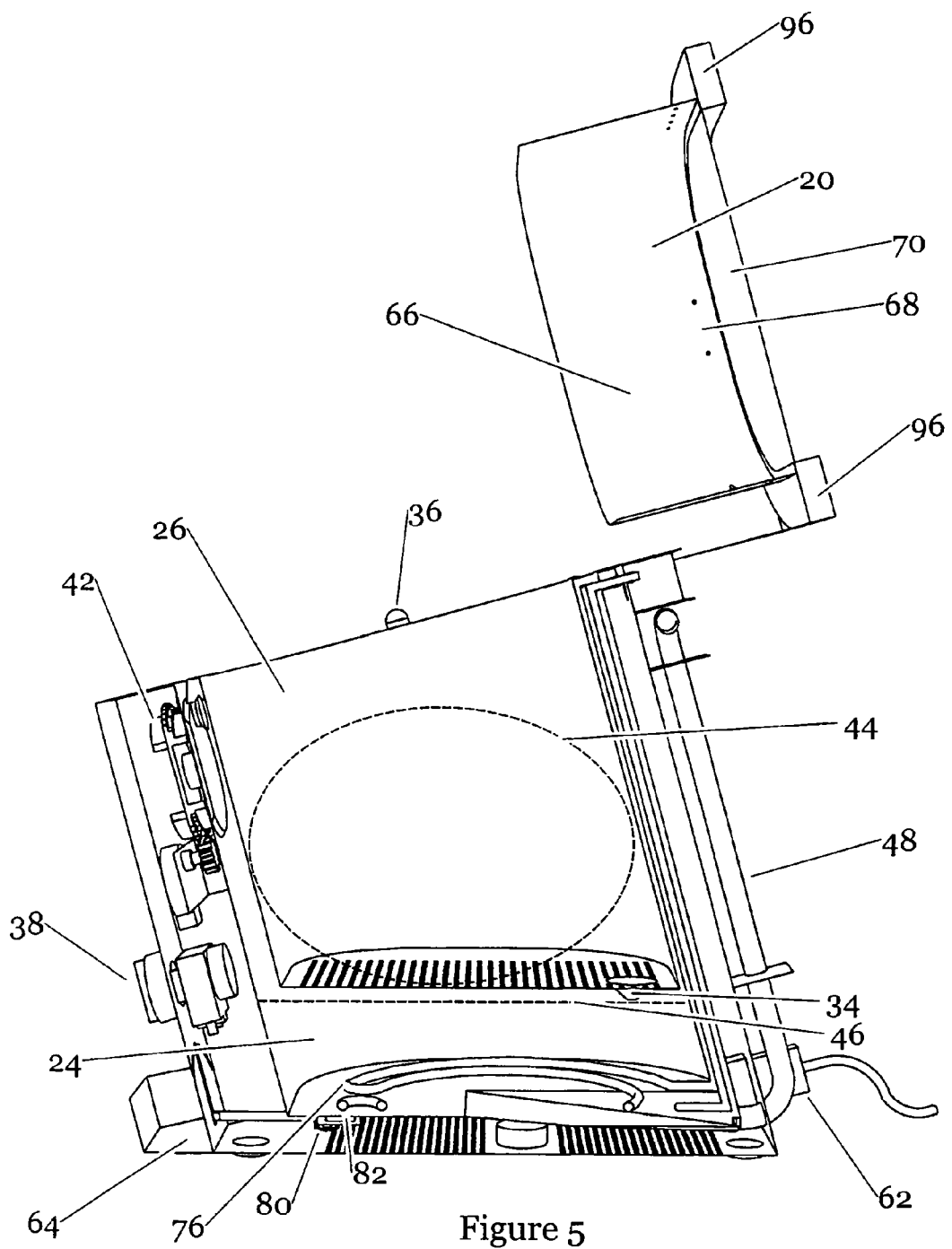
FIG. 5 is a cross-sectional side view of the first preferred embodiment taken along section 5-5 in FIG. 4, with both its lid open and its food support vessel in a raised position.
Figure 6:
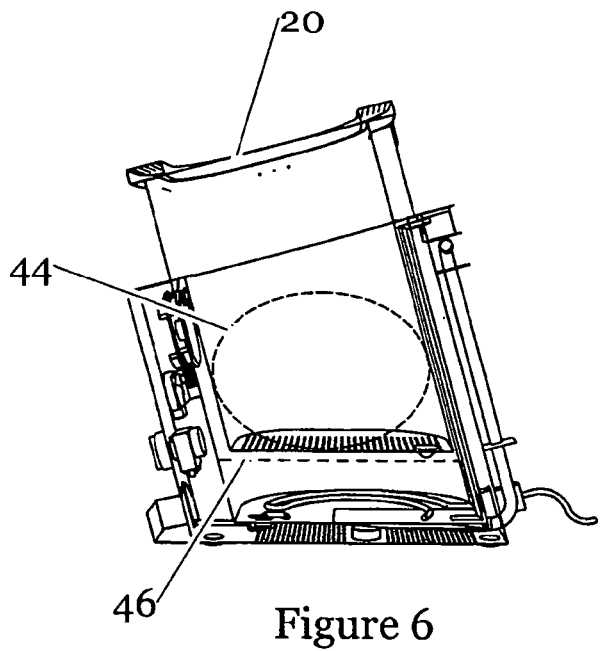
FIG. 6 is a cross-sectional side view of the first preferred embodiment as shown in FIG. 5, but with the lid in an intermediate position between being opened and closed, and with the food support vessel in a raised position.

FIG. 5 shows the device after a desired food article 44 or food articles have been placed in the food supporting vessel 26. The food supporting vessel 26 is placed in a raised position with cooking vessel 24, and the lid 20 is retracted back away from the opening of the food supporting vessel 26. Once the food article is loaded within the food supporting vessel 26, the lid 20 is pivoted towards and placed over open end of the food supporting vessel as best shown in FIG. 6. Once positioned over the open end, the lid 20 is then axially moved into the food supporting vessel 26 and is closed into position to cap the cooking vessel 24. In an example embodiment, the lid is secured into place in its closed position by the use of one or more latches. In an example embodiment, the latches 36 are positioned along the device outer housing at diametrically opposed locations along the open end, and the latches can be operated to release the lid by latch switches positioned along an outside surface outer housing.

In an example embodiment, the device can include a timer that is configured to permit a user to set a desired cooking time. In a preferred embodiment, the timer is configured so that the set cooking time includes the time necessary to preheat the cooking liquid. Timer only control, where an adjustable thermostat is not used, may be desired for the purpose of making the cooking process simpler and more convenient.

Figure 8:
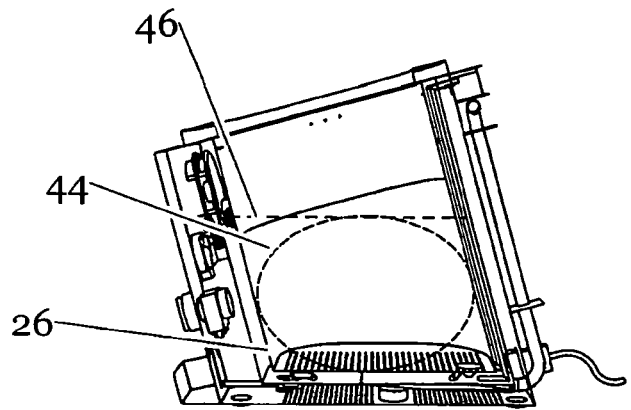
FIG. 8 is a cross-sectional side view of the first preferred embodiment as shown in FIG. 7, but with the lid in a closed position, and with the food support vessel in a raised position.
Figure 9:
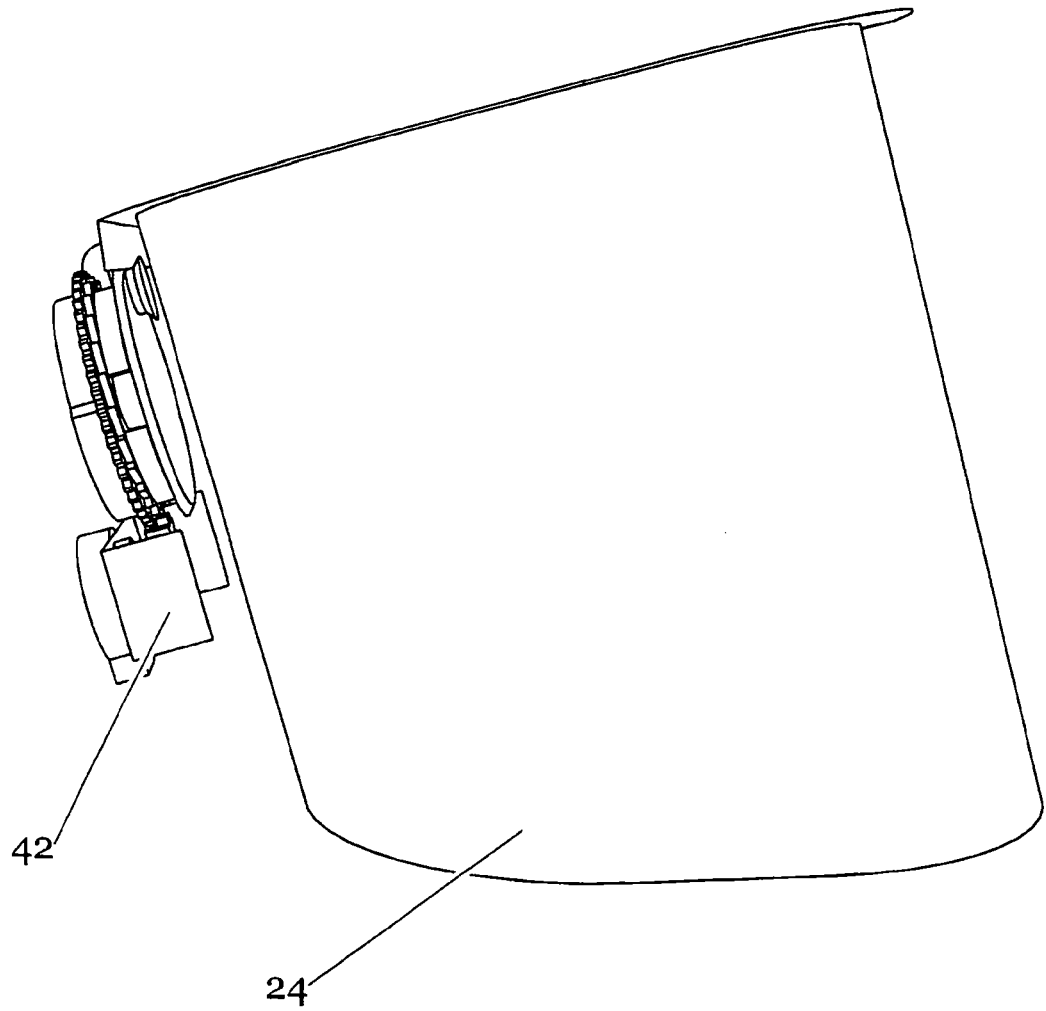
FIG. 9 is a side view of the food support vessel and a motor lifting mechanism.
Figure 10:
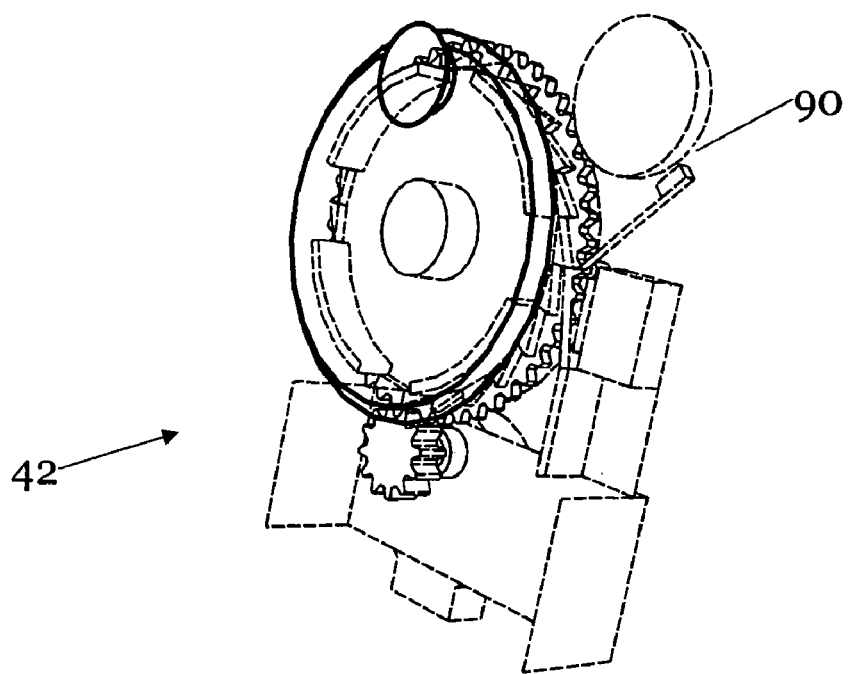
FIG. 10 is a front perspective view of the motor lifting mechanism of FIG. 9.
Figure 11:
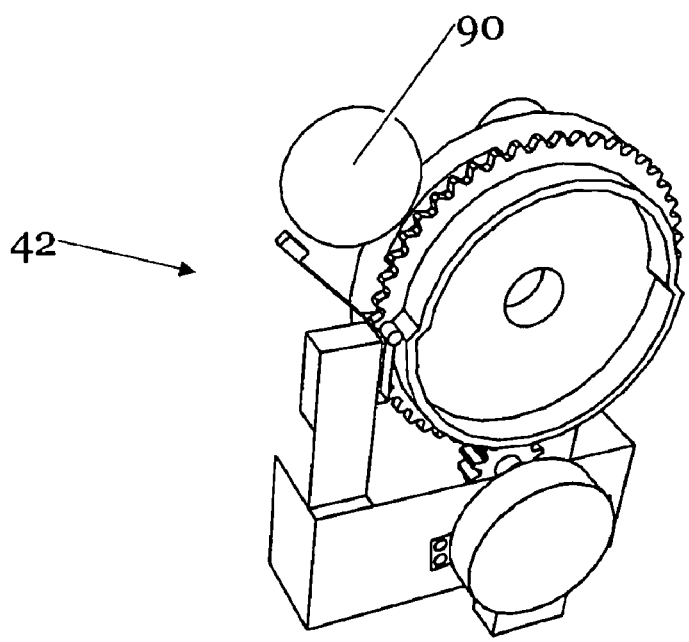
FIG. 11 is a rear perspective view of the motor lifting mechanism of FIGS. 9 and 10.

The device 21 further includes means for lowering and raising the food support vessel 26 within the cooking vessel. In an example embodiment, such lowering and raising means is provided in the form of a motor lifting and lowing mechanism 42. In an example embodiment, the motor lifting and lowering mechanism 42 is activated by an electric circuit 40, and is configured to lower the food support vessel 26 further down into cooking vessel 24 (as shown in FIG. 8). The electric circuit can be configured to operate the mechanism 42 by user input and/or in conjunction with the timer. For example, the electric circuit can be configured to operate the mechanism to lower the food article into the cooking liquid when the cooking liquid has reached the desired cooking temperature.

Figure 7:
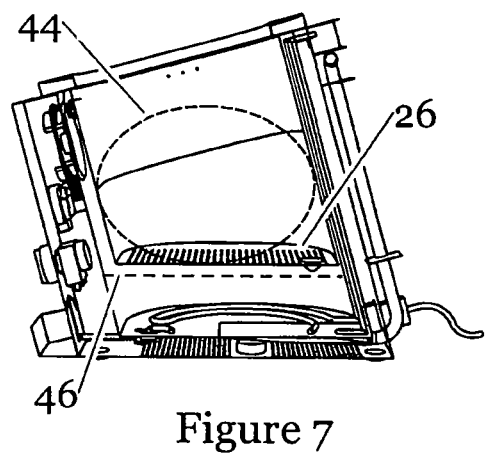
FIG. 7 is a cross-sectional side view of the first preferred embodiment as shown in FIG. 6, but with the lid in a closed position, and with the food support vessel in a raised position.

In FIGS. 7 and 8, the food article being cooked is shown as 44 and the cooking liquid surface is represented by dotted straight line 46. Accordingly, FIGS. 7 and 8 illustrate how the motor lifting and lowering mechanism 42 operates to place the food article into contact with the cooking liquid, and how the cooking liquid is displaced within both the cooking vessel and the food supporting vessel to cover the food article to enable cooking of the same.

In such example, when the timer has reached the set cooking time, it is configured with the electric circuit 40 to operate the motor lifting and lowering mechanism to raise the food support vessel 26 and remove the food article out of the cooking liquid. As shown in FIG. 7, the food is then suspended above the cooking oil where the food may drain. In an example embodiment, the lifting and lowering mechanism 42 can include a lifting bell mechanism 90 that is configured to ring when the food placed within the food support vessel is being raised or lowered in the device, thereby operating to provide an audio alert to the user to verify that these operations are carried out correctly.

Figure 13:
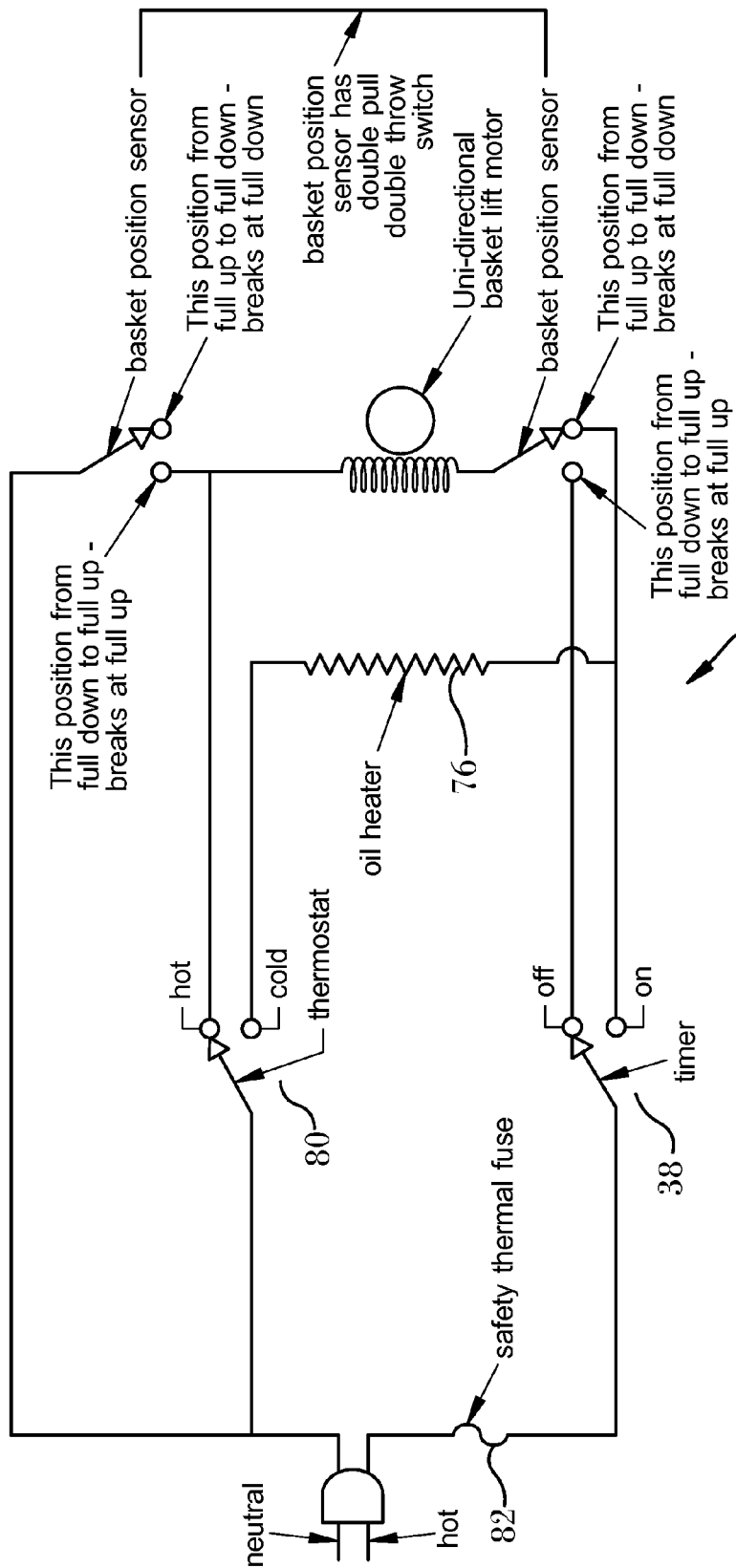
FIG. 13 is a schematic diagram of an electrical system in the first preferred embodiment.

An example electrical circuit utilizing a preset thermostat, shown as circuit 40 in FIG. 13, used in combination with food lifting and lowering 42, helps ensure that the food article is lowered into the cooking liquid immediately or soon after the cooking liquid has reached a temperature that us sufficient to cook the food. Once the fool article is placed into the device and the thermostat is set at the desired cooking temperature, the remaining steps of heating the cooking liquid to the cooking temperature, lowering the food article into the cooking liquid, cooking the food article for a desired amount of time, and removing the cooked food article from the cooking liquid, is all done automatically, and without the need for user intervention. Thus, the electrical circuit and lifting and lowering mechanism combination helps to ensure that the food properly cooked, removed from the cooking liquid, and drained, all at the proper time, as set by the user, and all again without the need for user intervention after start up.

Thus, the circuit and lifting mechanism greatly simplifies and makes safer the cooking process. Instead of having to use the four-step process described earlier, where the user must first preheat oil, then come back and put the food into the heated oil, and then return a third time to take the food out from the oil, and finally return a fourth time after the food has been drained of excess oil to serve the food; the user of the present device must only put the food and the oil into the device, activate the circuit by setting the timer 38, and then return to serve the food after the food has been automatically cooked and drained.

The cooking liquid can be left in the device 21 for repeated use or may be removed, depending upon expected usage and operator desires. In an example embodiment, the device 21 is constructed comprising a drain tube or conduit 48 (best shown in FIG. 3) that is mounted in storage brackets 50 and 52 that are positioned along an outside surface of the outer housing 22. The drain tube has a first end that extends through an opening in the outer housing and that is in communication with cooking liquid disposed within the cooking vessel 24. The opposite end of the drain tube is closed by the use of an appropriate closing member, such as a valve, plug or the like. In an example embodiment, the drain tube end opposite from the cooking vessel is sealed by a plug 54 that is pressed into the end of tube. The drain tube can be formed from conventional materials that can be flexible and that are able to withstand the temperature of the cooking liquid. Suitable materials for forming the drain tube include.

In an example embodiment, the drain tube runs upwardly a distance along the outside surface of the outer housing 22 from the opening near the base of the outer housing to a height that is above the highest surface level of the cooking liquid, i.e., as measured when the food article is lowered therein for cooking. The drain tube then has a 180 degree bend at this point along the outer housing so that its end opposite the end disposed within the outer housing opening is positioned adjacent the outer housing base. The drain tube 48 is positioned in this matter along the outer housing outside surface to prevent unwanted leakage of cooking liquid therefrom from gravity effect.

When the cooking liquid is to be removed from the device, the drain tube 48 is removed from the storage brackets 50 and 52, and the plug is removed from the tube end. The end of the tube 48 is then placed into communication with an appropriate storage or disposal device. The tube may also be configured having a pinch valve 58 positioned therealong in addition to or in place of the plug 54. The plug 54 and pinch valve 58 are optional redundant valving mechanisms, which may augment the gravity valve provided by drain tube 48 when it is stored on brackets 50 and 52. The cooking liquid is then allowed to drain from the device by gravity by moving the disposal container, and the drain tube, to a position below the surface level of the cooking liquid, e.g., by placing the disposal container onto the floor. In an example embodiment, the storage or disposal container can be configured as illustrated in FIG. 14.

Figure 14:
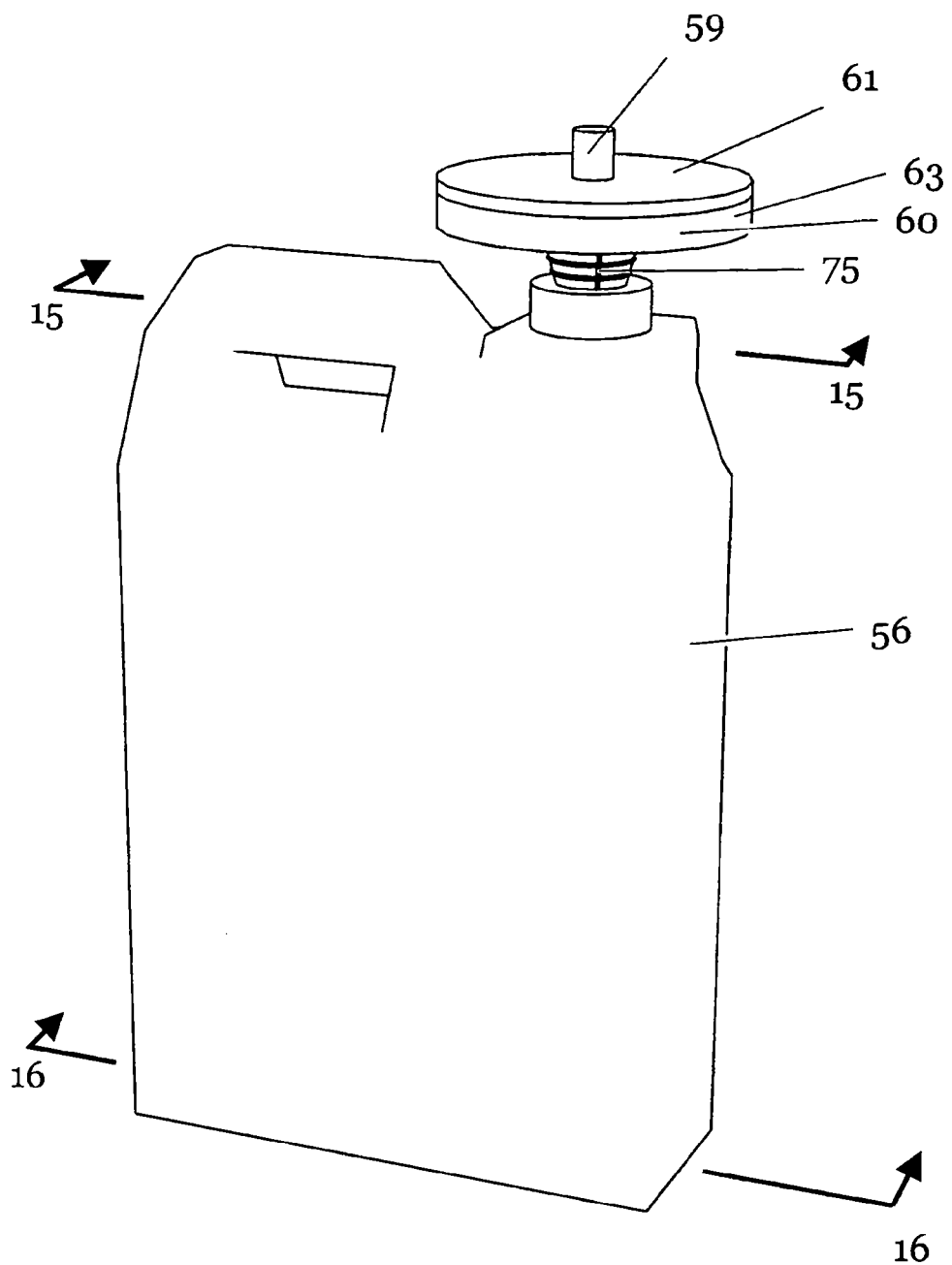
FIG. 14 is a front perspective view of a filter that may be attached to the end of a flexible drainage hose, and inserted as shown into a storage or disposal container.
Figure 15:
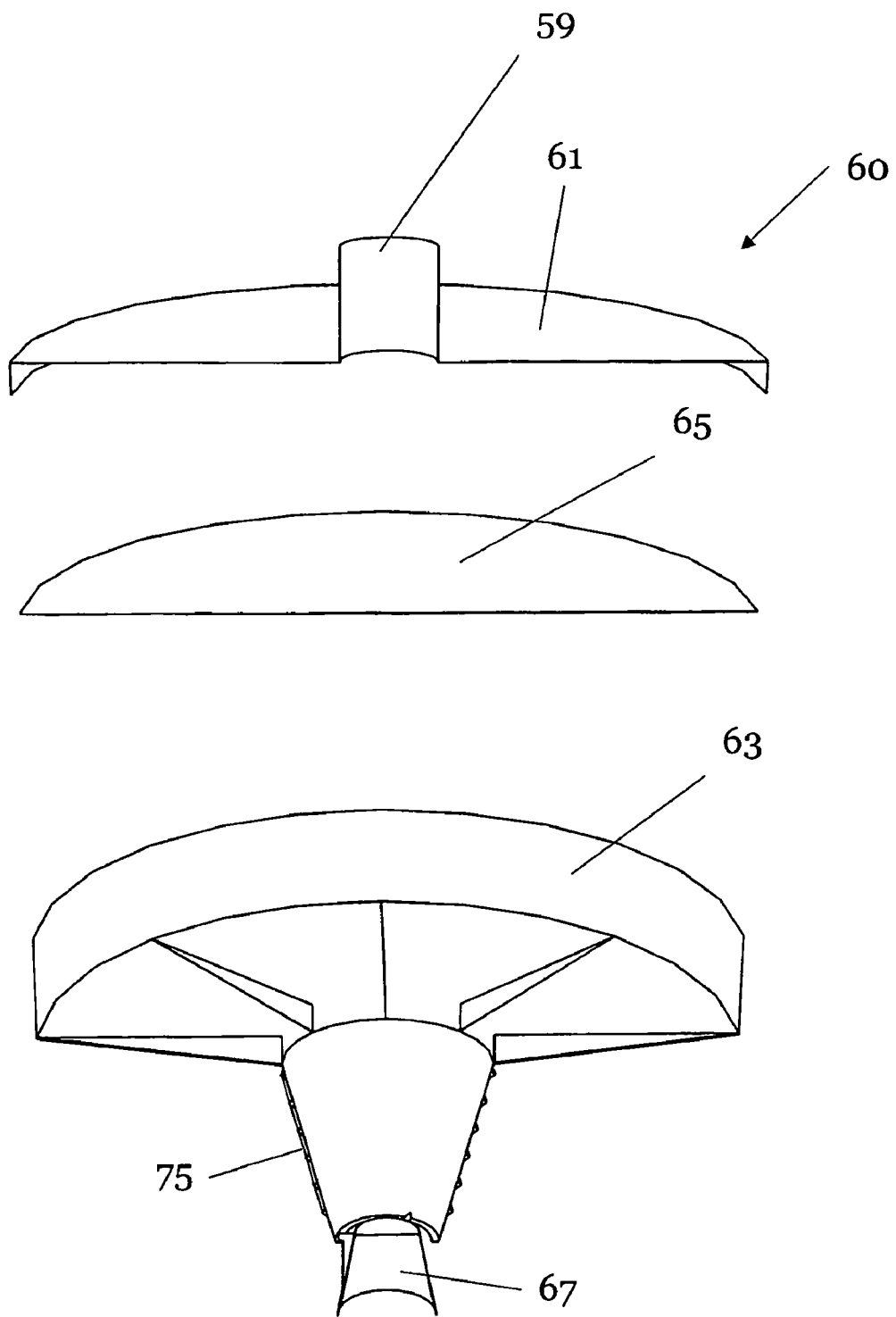
FIG. 15 is an exploded cross-sectional view through the filter shown taken along section 15-15 in FIG. 14.
Figure 16:
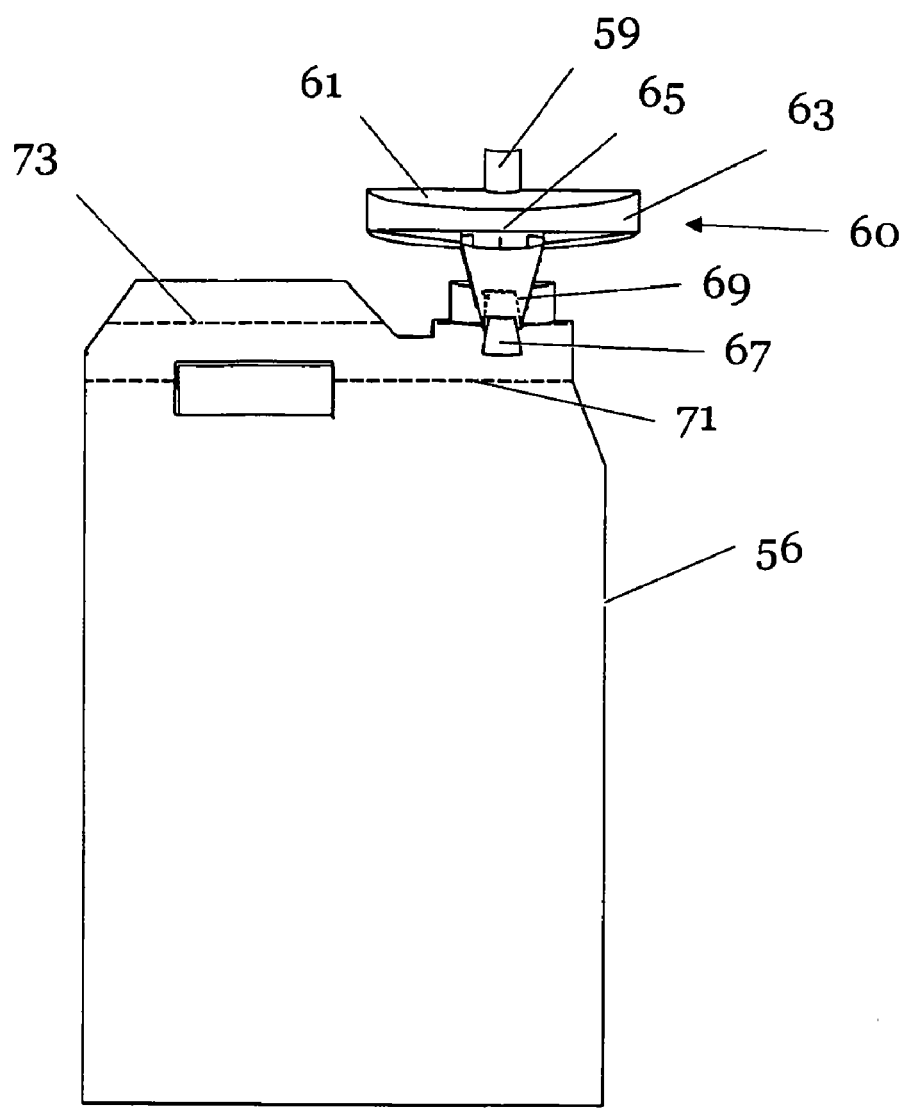
FIG. 16 is a cross-sectional perspective view taken along section 16-16 of FIG. 14.

FIGS. 14 to 16 illustrate a filtering mechanism 60 that can be used in conjunction with the device 21 for the purpose of filtering the cooking liquid removed from the device for reuse within the device or for storage. The filtering mechanism 60 comprises an upper filter housing 61 having a nipple 59 that projects outwardly therefrom, and that is sized and configured to permit connection to an end of the drain tube 48. The upper filter housing 61 is sealed to a lower filter housing 63 with the two housings forming an enclosure that contains a filter 65. All liquid entering the filter enclosure via the nipple 59 must therefore pass through the filter 65 before exiting out of the bottom of lower filter housing 63.

The lower filter housing 63 includes a plurality of surface features 75 that are configured to provide a secured fit with the storage or disposal container 56 and/or to allow air to escape from the container 56 during the cooking liquid draining process to prevent unwanted pressure build up within the container that could otherwise impair cooking liquid drainage. In a preferred embodiment, the surface features 75 are provided in the form of ribs that extend circumferentially around the lower filter housing 63.

The filtering mechanism additionally includes means for shutting off the flow of cooking liquid therethough when the level of cooking liquid in the disposal or storage container 56 reaches a predetermined maximum level. In an example embodiment, the means for shutting off flow is provided in the form of a float valve that is embodied in the form of a inverted frustum-conical shaped filter stopper 67 that normally hangs in an open position allowing liquid flow thereby when the cooking liquid level within storage or disposal container 56 is below the bottom of filter assembly 60 as exemplified by dotted line 71 (as best shown in FIG. 16).

When the cooking liquid level in the container 56 rises above filter stopper 67's lower rim (as shown by the cooking liquid level 73 in FIG. 16), further transmission of liquid through filter assembly 60 is blocked by the upward movement of the filter stopper 67, floating up on higher cooking liquid level 73, blocking the cooking liquid from passing through the filtering mechanism, as indicated by as dotted outline 69. This, therefore, operates to prevent the storage or disposal container 56 from becoming overfilled. The cooking liquid that is filtered through the filtering mechanism 60 can be reused in the device, and such filtering of the cooking liquid operates to extend the duration during which the same cooking liquid can be used without replacement.

Figure 4:
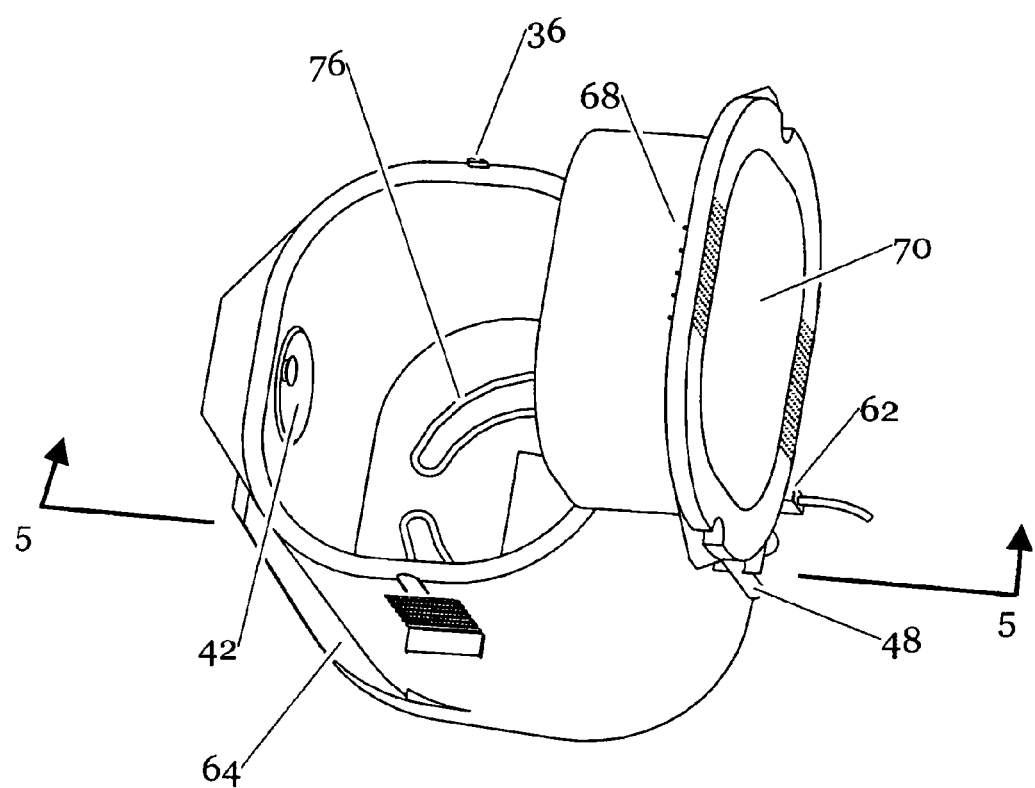
FIG. 4 is a top view of the first preferred embodiment of FIGS. 1 to 3 with a food support vessel removed.

In an example embodiment, the device 21 is configured to heat the cooking liquid contained therein by use of an electric heating element or coil 76 (as best shown in FIG. 4). In an example embodiment, a very efficient electric immersion heater, in the form of the heat coil 76, is used to bring the cooking liquid to a desired cooking temperature in minimum amount of time while simultaneously conserving electricity. This same heater can conveniently be unplugged and removed from the cooking vessel 24 to facilitate cleaning. Thereby, avoiding any potential damage or safety issue that may exist by exposing any electrical components to water during cleaning of the device.

Power can be supplied to the device by conventional household AC electricity via a conventional household electrical outlet. In a preferred embodiment, power is supplied into the device through the use of a plug 62 that is magnetically coupled to the device. The use of such a magnetically coupled plug 62 is desired for the purpose of permitting an easy release of the power supply cord from the device should the power supply cord be pulled. This feature provides an additional level of safety from the device unit being inadvertently moved or tipped due to an unintentionally stumbling or pulling on the cord.

The above-described and illustrated first embodiment cooking device has been described for cooking foods using a cooking liquid. Cooking liquids useful with the device are understood to be cooking oil and water. Thus, it is to be understood the device can be operated using either cooking oil or water using all of the same mechanisms described above to provide the same advantages noted above.

In an example embodiment, the device can be configured having an internal venting system that is engineered to reduce the possibility of foam overflowing from the cooking vessel 24. The venting system is operates to convert any cooking liquid foam formed in the device back into liquid cooking oil, and is provided in the form of a skirt 66 that extends downwardly a distance from an inside surface of the lid 20 and that is sized and configured to fit concentrically within the food support vessel 26 when the lid is in a closed position. The lid skirt 66 is basically a wall structure that extends a predetermined depth within food support vessel and that forms an annular space therebetween. In an example embodiment, the annular space is sufficient to allow for the free flow of cooking liquid therebetween.

The lid skirt 66 includes a plurality if vent holes 68 disposed therethough and that are provided adjacent a top potion of the skirt where it meets the lid. Any foam that is formed in the device during the cooking process is forced by cooking pressure through the annular space between the skirt 66 and the food support vessel 26 wall, and optionally also through lid skirt vent holes 68, and this operation operates to convert the foam back to liquid that is channeled back into the device.

As best shown in FIG. 5, in an example embodiment, the outer housing 22, cooking vessel 24, and food support vessel 26 are all configured having an inclined structure that is tilted towards a front of the device 21, and thus that is inclined towards the user. Such an inclined configuration is desired for the purpose of aiding the user in placing foods into and removing foods from the device. The inclined configuration of the outer housing 22, the cooking vessel 24, and the food support vessel 26 also makes the device easy to look into, without having to stand up directly over the device, thereby enabling a viewer to more easily view the food article being cooked.

To further facilitate this ease-of-viewing feature, the lid 20 is constructed comprising a large transparent window 70, which can be made from glass or plastic or the like.

In an example embodiment, the lid is configured to help prevent steam buildup on the inside surface of the lid glass through the inclined orientation of the lid on the device, and thus help a user to view the food being cooked. Additionally, the inclined placement of the lid and its window, by facing the user more directly than a horizontal window, also facilitates a user looking into cooking vessel 24 to view the food being cooked. In an example embodiment, the glass window 70 occupies about 80 percent of the lid upper surface, thereby also operating to provide an improved level of food viewing within the device.

In an example embodiment, a thermostat 80 is attached to the outside bottom surface of the cooking vessel 24, and its placement there may operate to facilitate cleaning of the cooking vessel as well as provide inexpensive manufacture. The thermostat 80 may be set at the factory for a fixed temperature or may be user adjustable. A thermal fuse 82 may also be attached to the exterior of the cooking vessel 24 to simplify manufacture and enhance safety.

Figure 1:
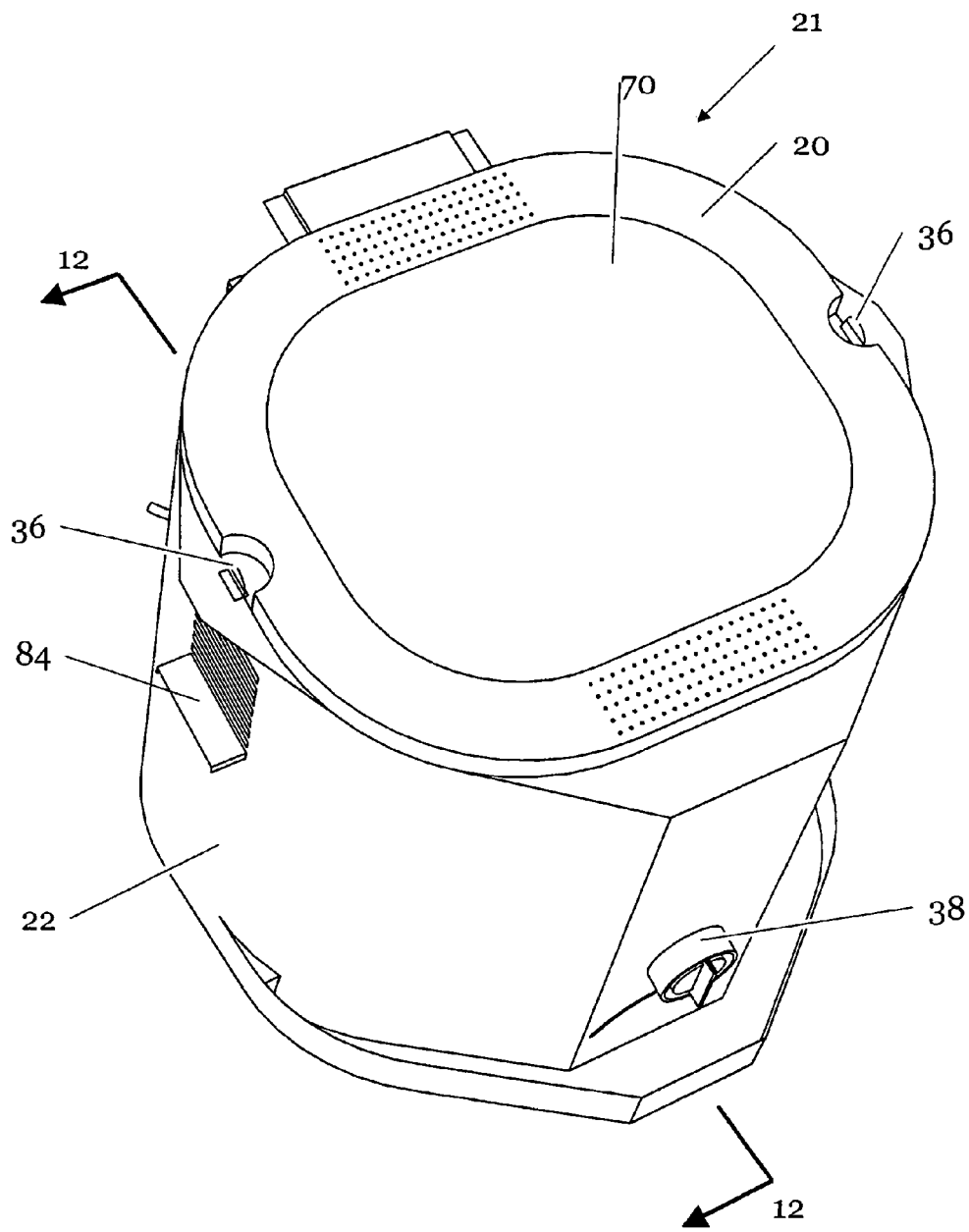
FIG. 1 is a front upper perspective view of a first preferred embodiment in a lip closed position.
Figure 2:
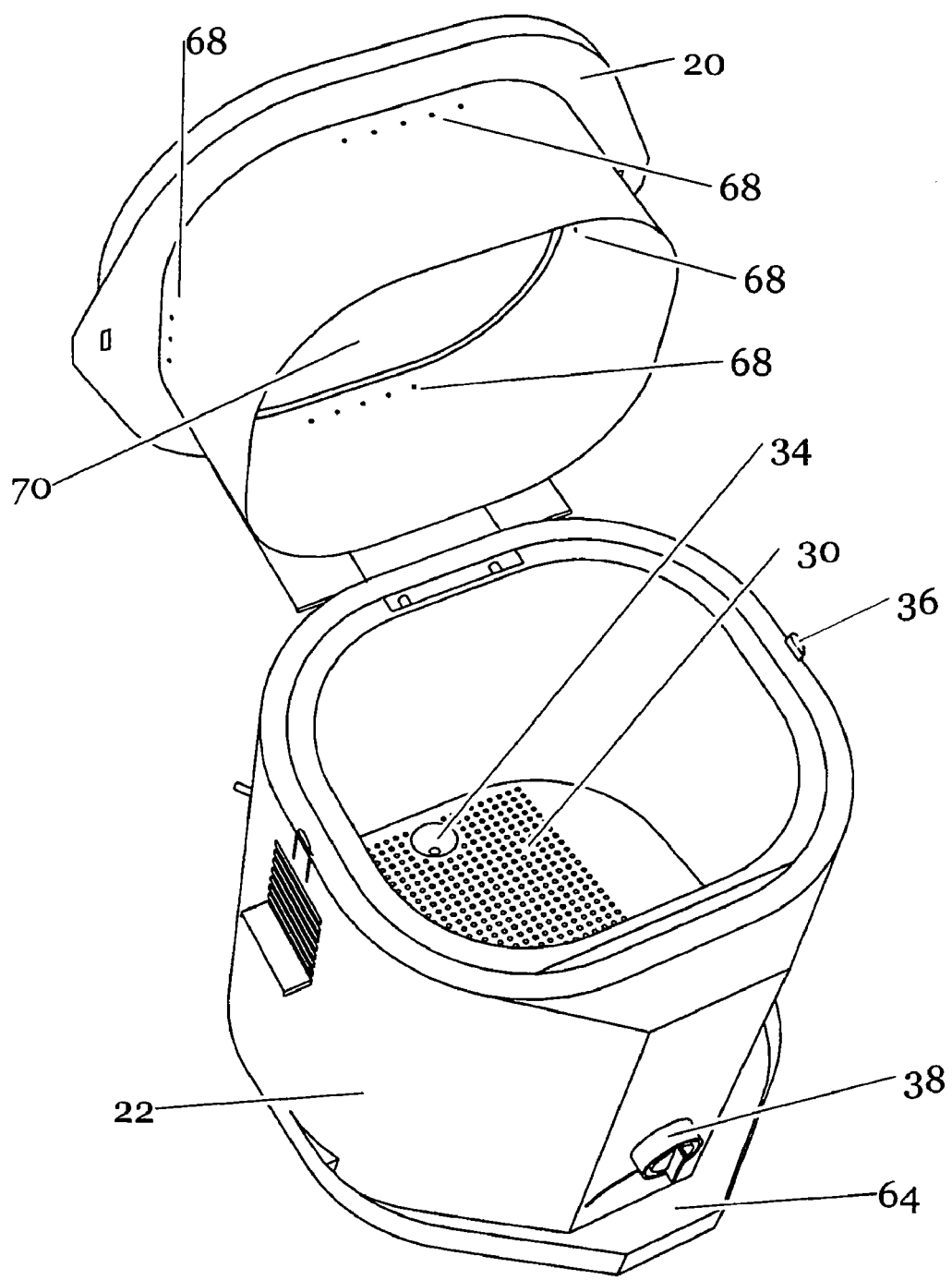
FIG. 2 is a front upper perspective view of the first preferred embodiment of FIG. 1 in a lid up position.

As best shown in FIG. 1, the device may be constructed having handles 84 located on sides of the outer housing 22, to assist the user in conveniently and safely moving the device 21.

If desired, the internal parts of the device, such as the cooking vessel 24 and foods support vessel 26, can be formed having a nonstick coating for the purpose of facilitating cleaning and to prevent the food articles from adhering thereto.

Each of the embodiments described herein has the potential to deep fat fry, or steam, or roast, or heat foods. They may also function as a roaster, similar to those made today by the company Nesco, with virtually all of the advantages that company's product line offers. This includes not only roasting and cooking solid food, including meats and vegetables, but also making soups and other liquid foods.

Second Embodiment

Figure 17:
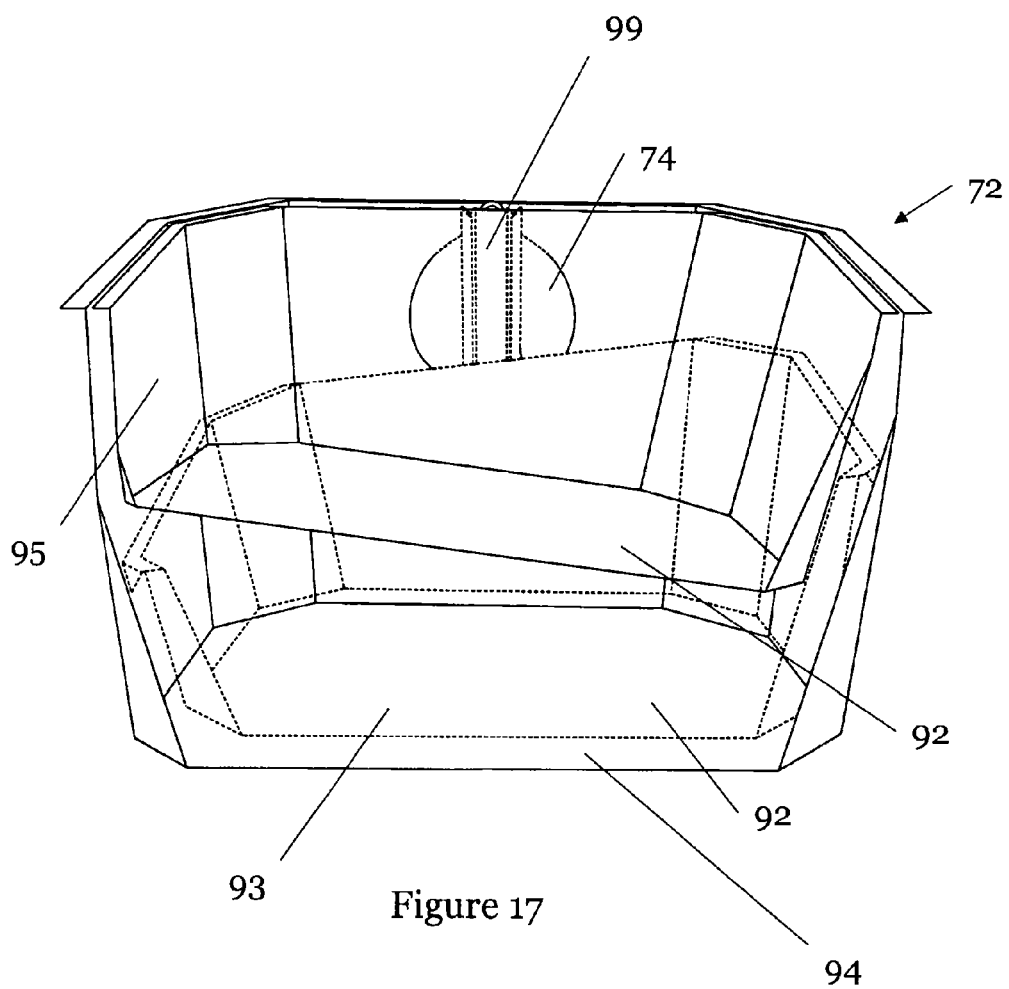
FIG. 17 is a cross-sectional perspective view taken along section 17-17 of FIG. 18 of a second preferred embodiment.
Figure 18:
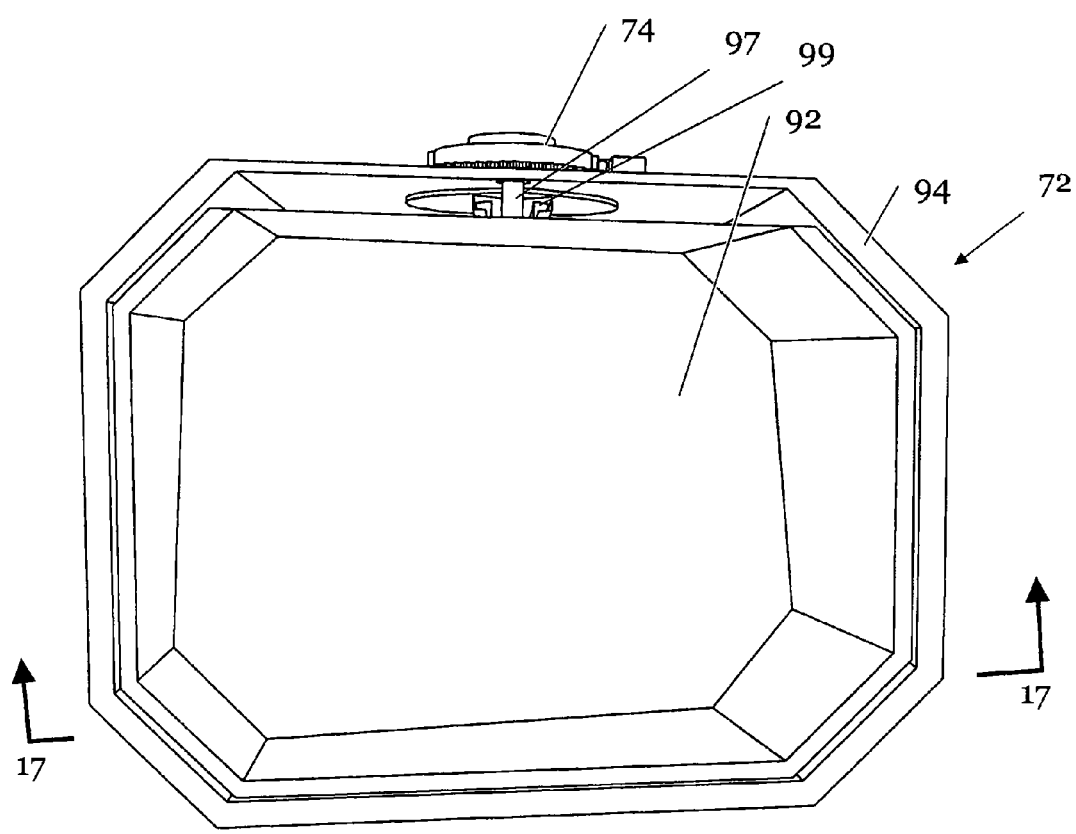
FIG. 18 is a top perspective view of a second preferred embodiment.

FIGS. 17 and 18 illustrate an alternative or second embodiment of the cooking device 72 as constructed in accordance with the principles of the invention. Some features from the first embodiment cooking device described above and illustrated in FIGS. 1 to 13 are incorporated into second alternative embodiment 72, and will be obvious to those knowledgeable in the art.

The second embodiment cooking device 72 comprises a food support vessel 92 that is disposed within a cooking vessel 94. As best shown in FIG. 18, in an example embodiment, the cooking vessel 94 and/or the food support vessel 92 are configured having one end that is slightly wider that an opposite end. In a preferred embodiment, the cooking vessel and food support vessel are each configured having one end slightly wider than an opposite end to better and more efficiently accommodate placement of a turkey therein. Configuring the cooking vessel and food support vessel in this manner helps reduce the overall size of the cooking devices, reduce countertop space usage, reduce storage space, reduce oil usage and thus oil warm-up time. In particular cooking vessel 94 and food support vessel 92, by being broad at one end to accommodate the turkey's breast when placed horizontally therein, minimizes the volume needed for cooking. Additionally, the placement of a turkey horizontally within the cooking device also helps to minimize cooking liquid usage during the cooking process, and thus reduce cooking liquid heating times.

As illustrated in FIG. 17, the food support vessel 92 is moved within the cooking vessel between a lower position 93 (shown in phantom) and an upper position 95 by a lift mechanism 74 that is similar to the lift mechanism 42 described above for the first embodiment cooking device. The lift mechanism 74 for this second embodiment includes an added track 99 that is positioned outside of the food support vessel and that is provided to restrict travel of the food support vessel and its contents to low-friction vertical linear movement only, with no side to side component. When the food support vessel 92 is in the upper position 95, it is inclined by gravity pulling on off-gravitational-center single pivot support 97 fixed on the side of food support vessel 92 to allow oil to drain from the food support vessel and its food contents.

Third Embodiment

FIGS. 19 to 36 illustrate a third embodiment cooking device 200, constructed according to principles of the invention. This third embodiment cooking device shares some of the advantages and features of the first two embodiment cooking devices disclosed above. The third embodiment cooing device 200 generally includes an outer housing 202 having a base support 210 positioned at a closed outer housing end. The closed base support 210 may comprise a plurality of holes disposed therethrough to facilitate a convective flow of air within the outer housing.

Figure 20:
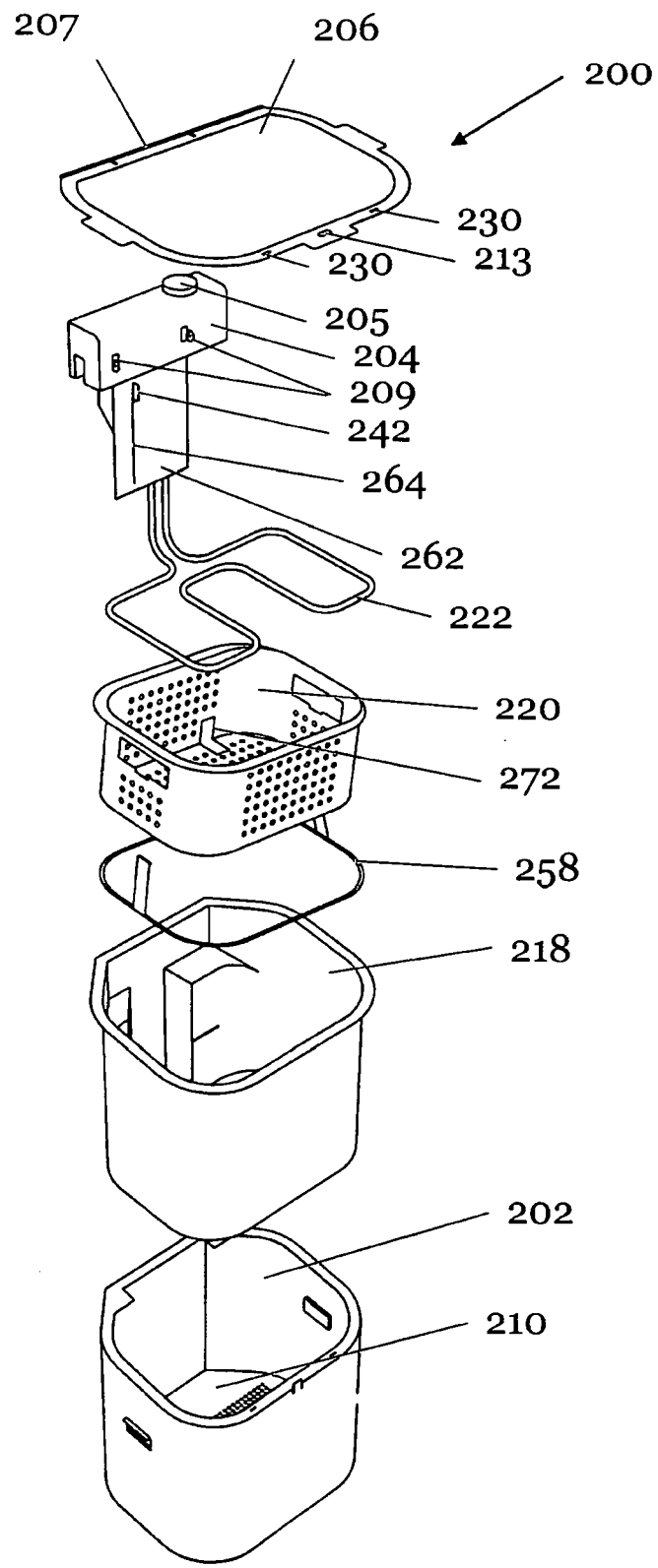
FIG. 20 is a front exploded perspective of the third preferred embodiment of FIGS. 18 and 19 showing its elements in an unassembled state.

A cooking vessel or cooking liquid bucket 218 is statically disposed within a cavity of the outer housing 202 and is sized and configured to accommodate a volume of cooking liquid therein. The cooking vessel 218 is supported by the outer housing base support 210. A food support vessel or food holding basket 220 is disposed within the cooking vessel 218, and an oil straining screen 220 is interposed between the food support vessel 218 and the cooking vessel. As shown in FIG. 20, the food support vessel 218 includes an oil level viewing port 272 disposed therethrough to help the user ascertain how much oil is in, or needs to be added to, the cooking vessel 218.

The oil straining screen 258, which is suspended below the food support vessel 220, strains out impurities in the oil, which can operate shorten its useful life. This straining process takes place every time the food support vessel 220 is raised from the oil. Impurities are easily cleaned from straining screen 258 by placing it in a dishwasher, or by washing it in a sink, or by other means. The oil straining screen 258 may include any appropriate filtering material. One particularly advantageous reusable filtering construction comprises a stainless steel screen with between 15 and 50 wires per inch.

An immersion heat coil 222 is disposed within the cooking vessel, positioned adjacent a bottom portion of the cooking vessel, and is interposed between the bottom portion of the cooking vessel 218 and the oil straining screen 220. The immersion heat coil 222 is connected to a control box 204. The control box 204, including the heat coil 222, is removably attached to a portion of a rear wall surface of the outer housing 202, positioned adjacent the open end of the outer housing and positioned generally in a central position along the rear wall surface, via a mounting bracket 262. A conventional multi-prong pin-type plug and socket can be used to electrically connect the control box 204 to the base of the cooking device, with both the plug and the socket being rigidly mounted, one to control box 204, and the other to the cooking device outer housing. Such plugs and sockets are common and thus are not illustrated herein.

When the control box 204 is lifted from the outer housing 202, the flow of electricity to the control device and its internal electrical components is cut off by the plug and socket arrangement described above being consequently disconnected. The control box 204 is configured so that it can be lifted clear of the outer housing 202 to allow for easier cleaning of the cooking vessel 218 without the presence of immersion heat coil 222 and any of the other electronic components attached to and removed with the control box 204. The control box is constructed so that most of mounting bracket 262 and the immersion heat coil 222 are disposed within the cooking vessel 218 when control box 204 is mounted to the outer housing 202.

A lid 206 is disposed over the open ends of the outer housing 202 and the cooking vessel 218. The lid can be configured to permit opening be either unlatching it and pivoting it rearwards, or by unlatching it and lifting it off and away from the cooking device. In an example embodiment, the cooking device includes a lid latch 212 that projects from the outer housing 202 that is configured to releasably hold the lid in closed position, and by a rod axle 207 that is mounted on the back of lid 206 and that engages open hooks 209 that are part of control box 204. Engagement of the lid rod axle 207 resting in the open hooks 209 permits the lid 206, when released from its closed position, to be pivoted upwards away from the outer housing open end to a stable position that is just past vertical (best shown in FIG. 35) to facilitate loading and unloading food from the cooking device, or for other purposes.

To enhance safety, in combination with the engagement between the open hooks 209 and the rod axle 207, the lid latch 212 operate to secures the lid 206 to the outer housing 202 and the cooking vessel 218 during the cooking process. This lid is latched into a closed positioned in the cooking device by placing the lid over the open end of the outer housing and cooking vessel and passing the lid latch 212 projecting from the outer base cover 202 through a latch opening 213 in the lid. The latch 212 can include a spring mechanism to bias the latch 212 into a position within the latch opening 213 that causes the latch to interface and abut against a portion of the lid to prevent its upward movement away from the outer housing.

In an example embodiment, the cooking device can include alignment pins 228 that extend from the an open end of the outer housing 202 and that cooperate with alignment holes 230 in the lid to assist ensuring proper positioning of the lid over the outer housing open end to ensure desired engagement of the latch within the latch opening. The lid is placed into position over the open end of the outer housing 202 by pulling the lid forward so that the rod axle 207 engages the hooks 209, and the alignment pins 228 pass though the alignment holes 230 to force the lid forward permitting engagement of the latch within the latch opening.

Figure 19:
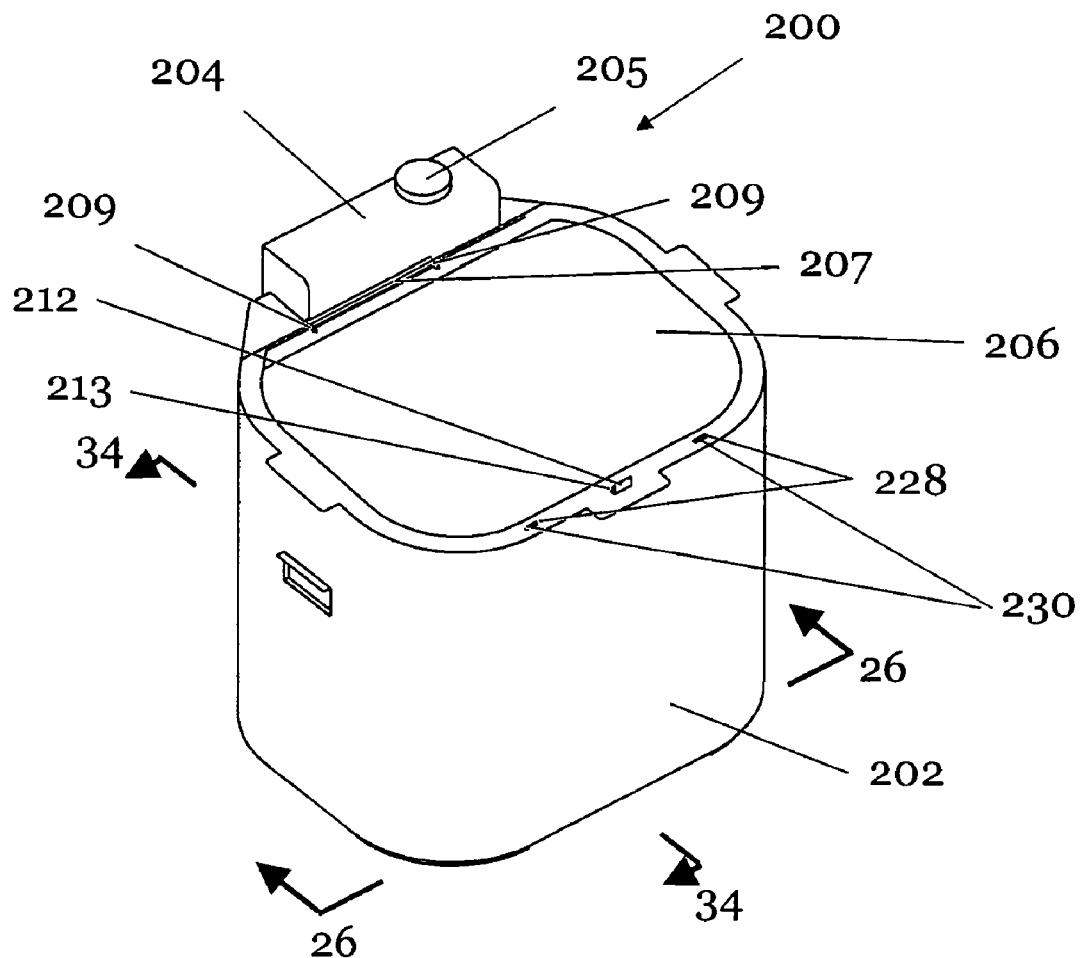
FIG. 19 is a front upper perspective view of a third preferred embodiment.

As shown in FIGS. 19 and 20, in an example embodiment, the lid 206 is constructed comprising a primary portion that is formed from a transparent material as noted above for the other cooking device embodiments of this invention, and further comprising an outer frame surrounding at least a portion of the transparent material. In an example embodiment, at least about 80 percent of the lid is formed from the transparent material. In a preferred embodiment, the lid comprises greater than about 90 percent of the transparent material. By allowing more ambient light into the cooking cavity, and by providing more viewing area, such lid comprising a large transparent portion facilitates viewing food while is cooking, and thus helps in both gauging food cooking progress, and also providing appetite appeal.

In an example embodiment, when the lid 206 is disposed over the open end of the outer housing 202 in a closed position it tilts or is inclined downwardly (moving from the rear of the lid forward). The inclined position of the lid can be provided by either the shape of the lid itself or by the shape of the outer housing open end. In an example embodiment, the outer housing open end is shaped having a front portion that is shorter than a rear portion to provide the downwardly tilted orientation. This downwardly tilted orientation makes it easier for the user to place and remove food articles into and out of the cooking assembly, and helps to keep moisture from collecting on the inside of lid 206 that could otherwise operate to obscure viewing of the food being cooked. Such downwardly tilted orientation also enables a user to have a clearer view of the interior of the cooking device and the cooking vessel where food is being cooked from a distance, i.e., without having to stand and look directly over the cooking device.

Figure 21:
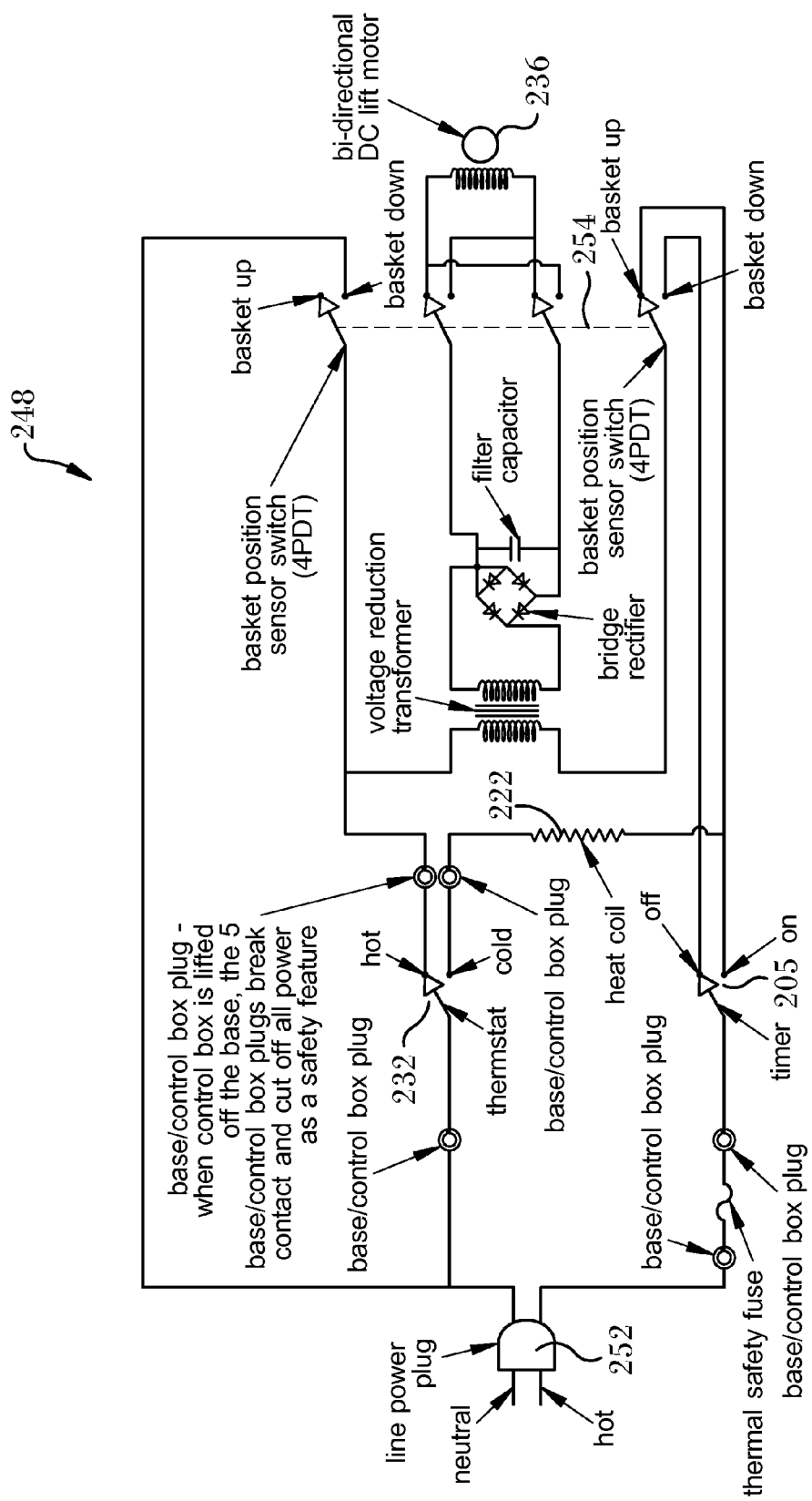
FIG. 21 is a schematic diagram of an electrical system of the third preferred embodiment of FIG. 19 utilizing a bidirectional DC lift motor.
Figure 22:
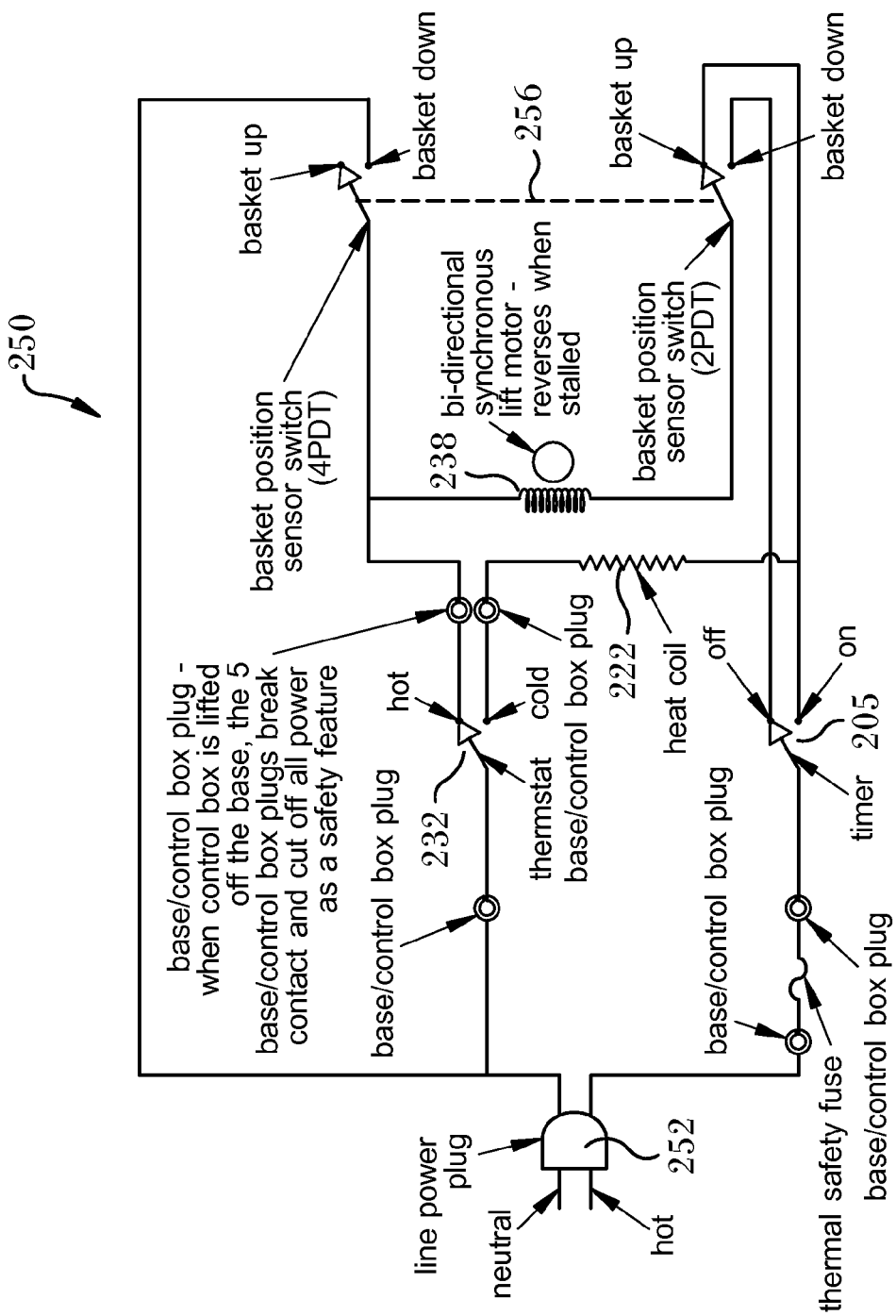
FIG. 22 is a schematic diagram of an electrical system of the third preferred embodiment of FIG. 19 utilizing a bidirectional synchronous lift motor that reverses when stalled.

FIGS. 21 and 22 illustrate two electrical circuits 248, 250 of a control system used with the cooking device of this invention that can be used to control the cooking process. One of the electrical circuits is used with a bidirectional DC motor, and the other of the electrical circuits is used with an auto-reversing when stalled synchronous motor.

In an example embodiment, a timer 205 is disposed within the control box and is part of the control system to control the cooking process. Specifically, timer and the control system are configured to raise the food from the hot cooking liquid once both a predetermined preheating of the cooking liquid and cooking of the food article has been completed. The control system is also configured to lower the food into the hot cooking liquid once the cooking liquid has been preheated to a temperature preset by thermostats 232 and 234. Thus, the control system operates to cook food in a minimum amount of time by precisely starting the cooking process immediately upon the cooking liquid being hot enough to cook.

Figure 25:
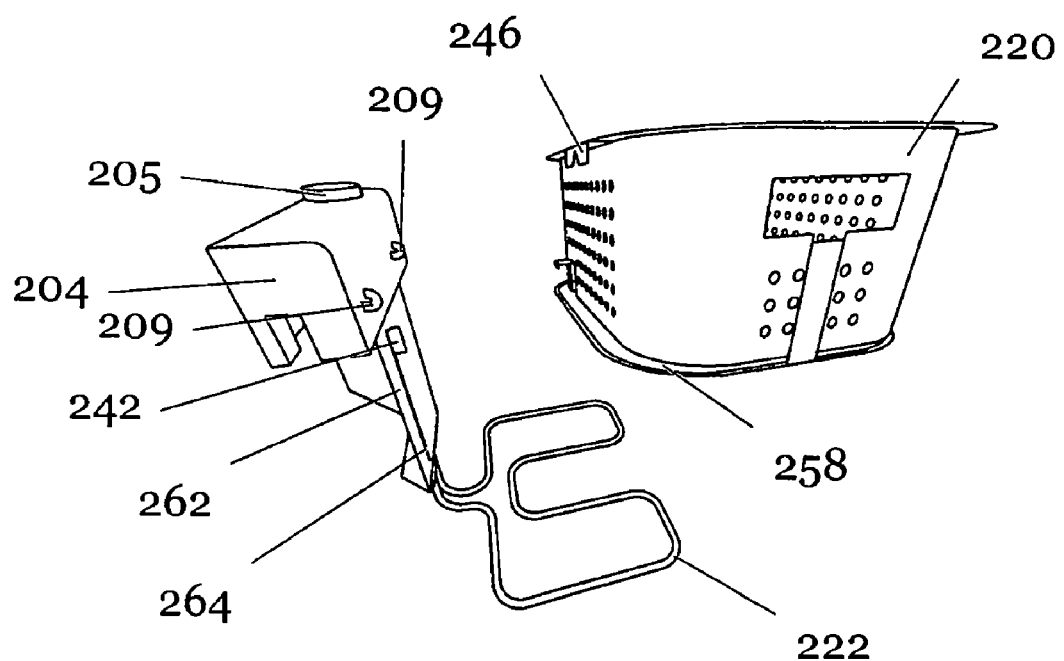
FIG. 25 is a side exploded perspective view of a food holding basket and a control box with an outer base cover and oil containment bucket 218 removed, taken from the third preferred embodiment of FIG. 19.

A food article disposed within the food support vessel 220 is raised and lowered into the cooking vessel 218 by use of a lifting mechanism that is attached to the control box. In an example embodiment, the lifting mechanism comprises a gear reduced bidirectional motor 236, 238 that is mounted in the control box 204. The bidirectional motor 236, 238 bidirectionally drives a screw threaded rod 240 that projects downwardly from the motor into the control box. The screw threaded rod 240 is threadedly engaged with a hook 242 to cause the hook to travel up and down by screw thread engagement with the threaded rod 240. The hook 242 is configured having a forward face that removably engages a bracket 246 positioned on a backside portion of an upper flange of the food support vessel 220 (as best shown in FIG. 25), and thereby enables mounting of the food support vessel 220 within the cooking vessel 218.

The electrical circuits 248, 250 control the cooking process in the following manner. Power enters through a power supply plug 252 and passes through both the thermostat 232, 234 and the timer 205. A food support vessel position sensor switch 254, 256 is provided in the form of a snap-action toggle switch that switches when the food support vessel 220 is either at its lowermost or uppermost positions.

Circuits 248, 250 start with the food support vessel 220 in its uppermost position as detected by the basket position sensor switches 254, 256. Once the cooking liquid has reached the desired cooking temperature, thermostat 232, 234 switches and causes the food support vessel 220 and the food article disposed therein to lower until it reaches its lowermost position, at which point the basket position sensor switches 254, 256 change their switching position. Cooking continues until the countdown timer 205 reaches the user preset time and then turns off. This causes motor 236, 238 to raise the food support vessel 220 until it reaches its uppermost position and the basket position sensor switches 254, 256 again switches.

A feature of this cooking device is that the control system and the lift mechanism allows automated cooking of a food article even when the user is not present. In operation, the user simply, in sequence: pours in the appropriate amount of cooking liquid oil into the cooking vessel 218; mounts the food support vessel 220 to the hook 242; inserts the food article to be cooked into the food holding vessel 220; closes the lid 206; sets the timer 205 for the combined oil warm-up and cooking time; and may then walk away with only minimal need for periodic checking to be sure everything is functioning normally. Once cooking is complete, the food is automatically lifted under control of circuits 248, 250, and without need for user interface, from the cooking oil, and is drained of oil. After oil draining, the food is ready to be removed from the cooking device and served.

This automated cooking system is much safer and more user friendly than systems that require the user to manually lower food into the cooking liquid, at least because it does not depend on the user slowly lowering the food into the hot cooking oil while using only imprecise muscle power, and because the user need not be present adjacent to the unit when food is lowered into, or is removed from, the hot cooking liquid. Also, the lid may be closed when the food is lowered into the oil, thus providing yet one more level of safety.

Figure 26:
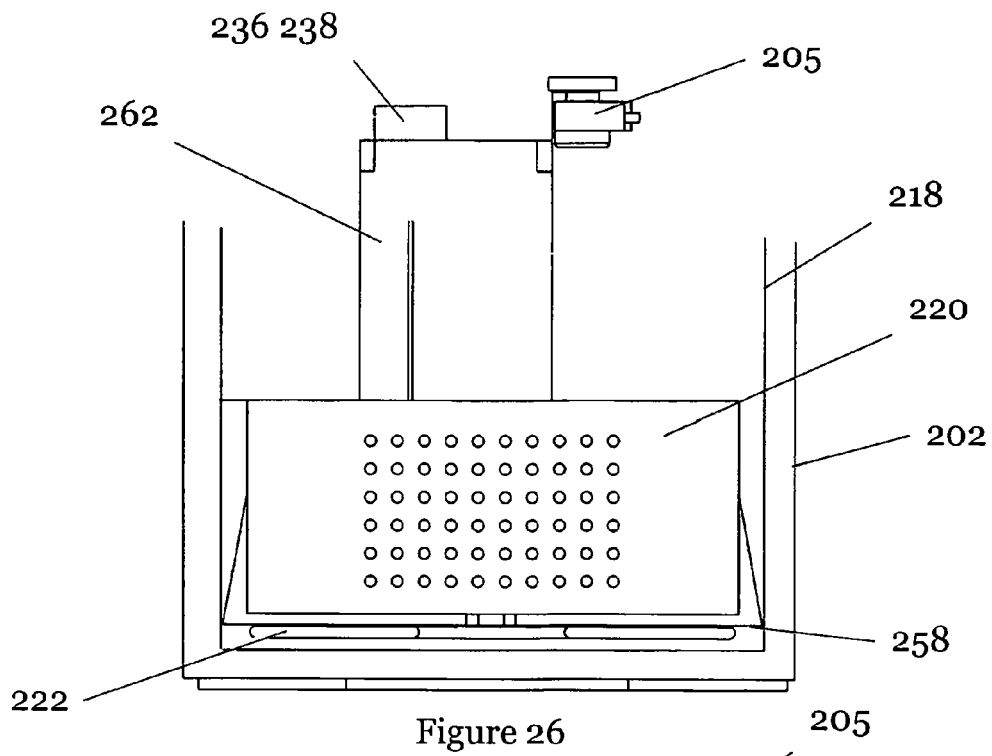
FIG. 26 is a front cross-sectional view through section 26-26 of the third preferred embodiment of FIG. 19, illustrating the food holding basket in its lower position.
Figure 27:
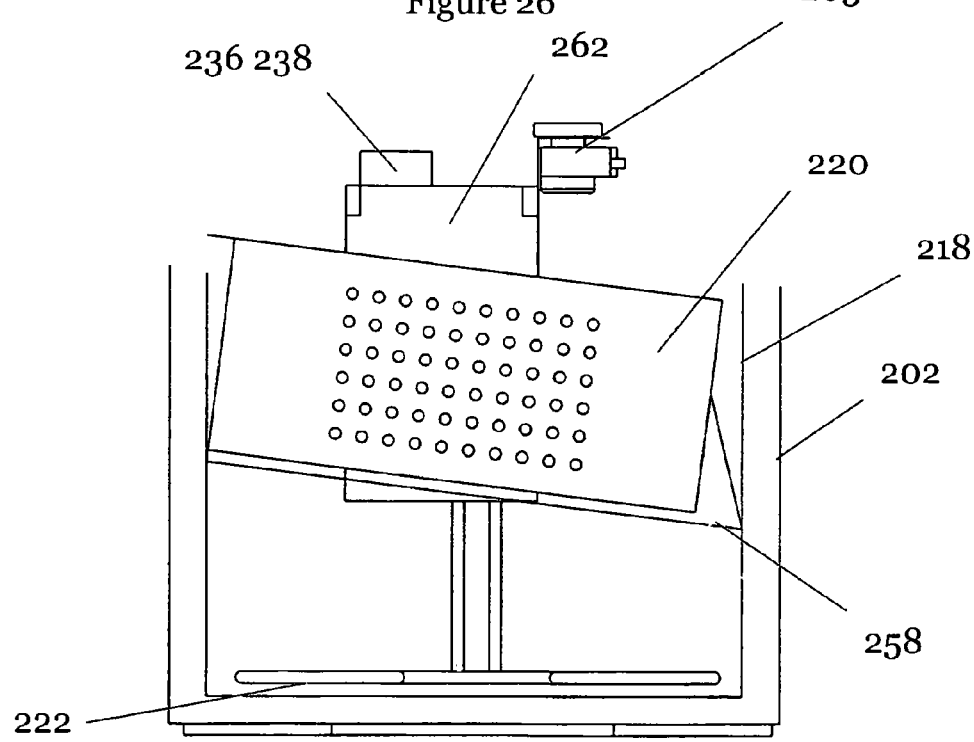
FIG. 27 is a front cross-sectional view through section 26-26 of the third preferred embodiment of FIG. 19, illustrating the food holding basket in its upper and tilted position.

FIGS. 26 and 27 illustrate how the food support vessel 220 may be configured to automatically tilt when placed into its raised position (shown in FIG. 27) by action of the food support vessel 220 pivoting under gravity on an off-center connection between the hook 242 and the bracket 246. When configured to provide such tilting operation, the tilting movement of the food support vessel 220 can be constrained or limited by action of the food support vessel contacting an adjacent side wall of the cooking vessel 218. Tilting of the food support vessel 220 helps to facilitate draining of oil from a cooked food article container therein such as a turkey or a chicken.

Figure 23:
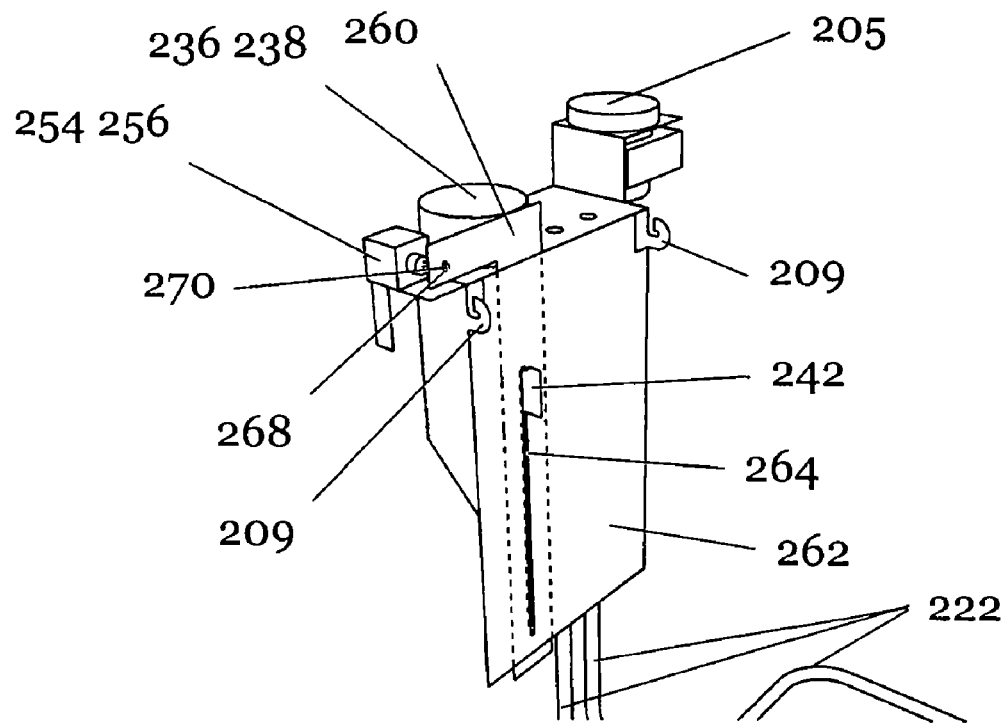
FIG. 23 is a front perspective view of a lifting mechanism from the third preferred embodiment of FIG. 19, with a basket lifting hook in an upper position.
Figure 24:
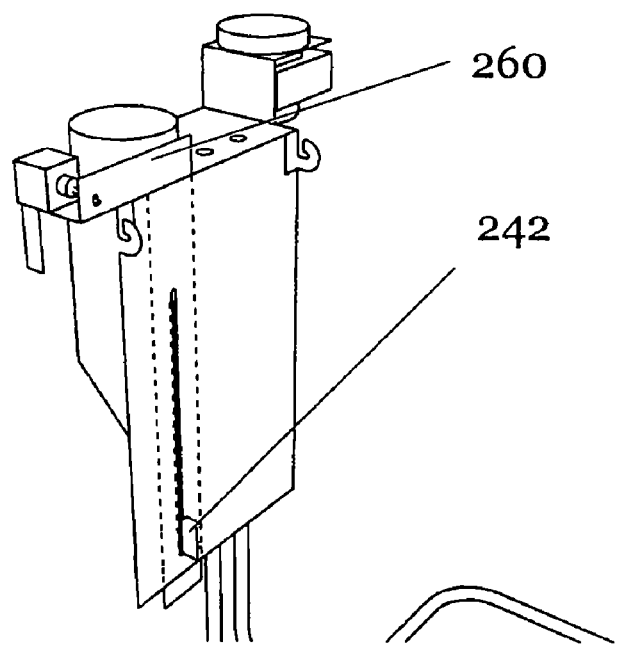
FIG. 24 is a front perspective view of the lifting mechanism of FIG. 23, with the basket lifting hook in a lower position.
Figure 28:
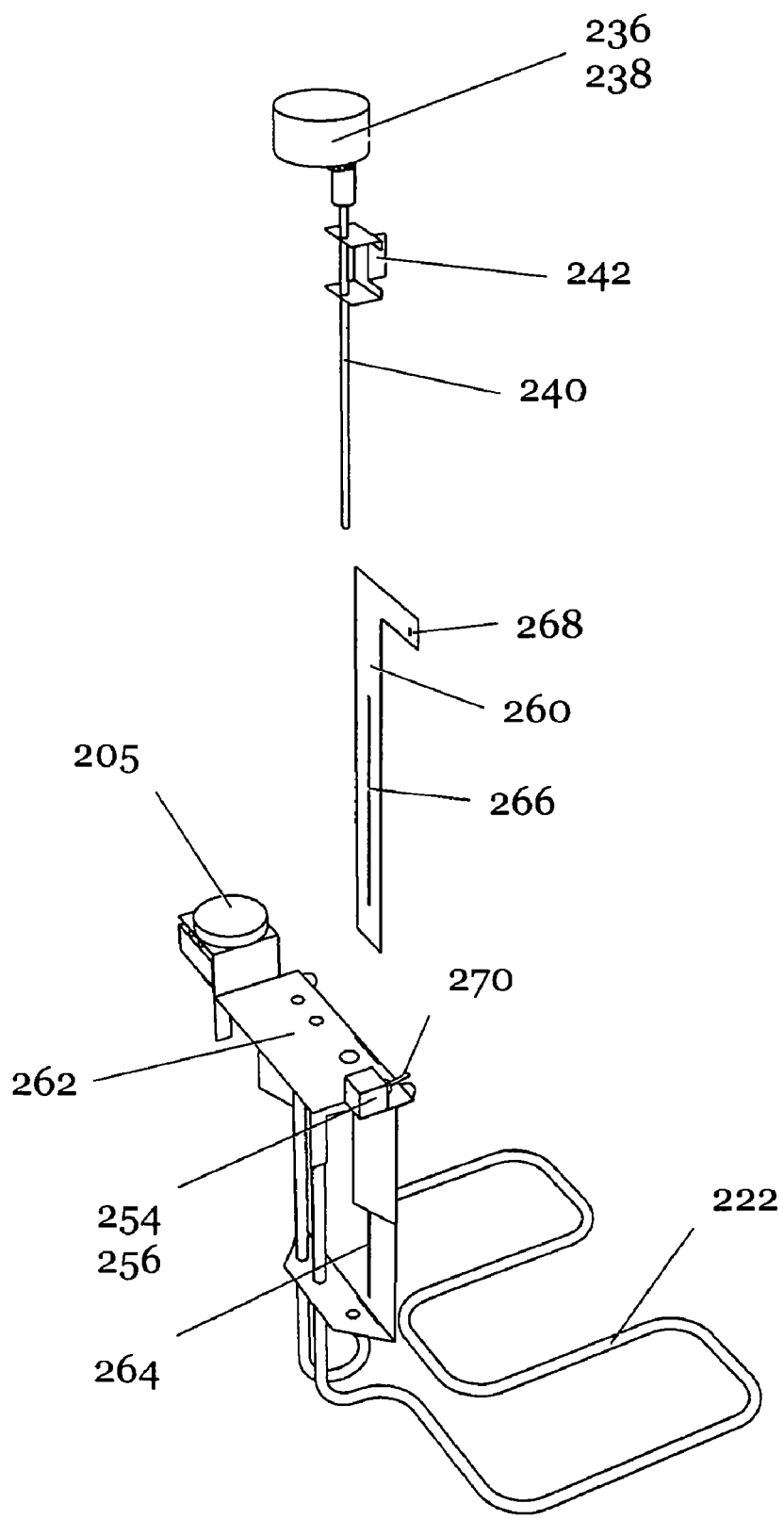
FIG. 28 is a rear exploded perspective view of the lifting mechanism of the third preferred embodiment of FIG. 19.
Figure 29:
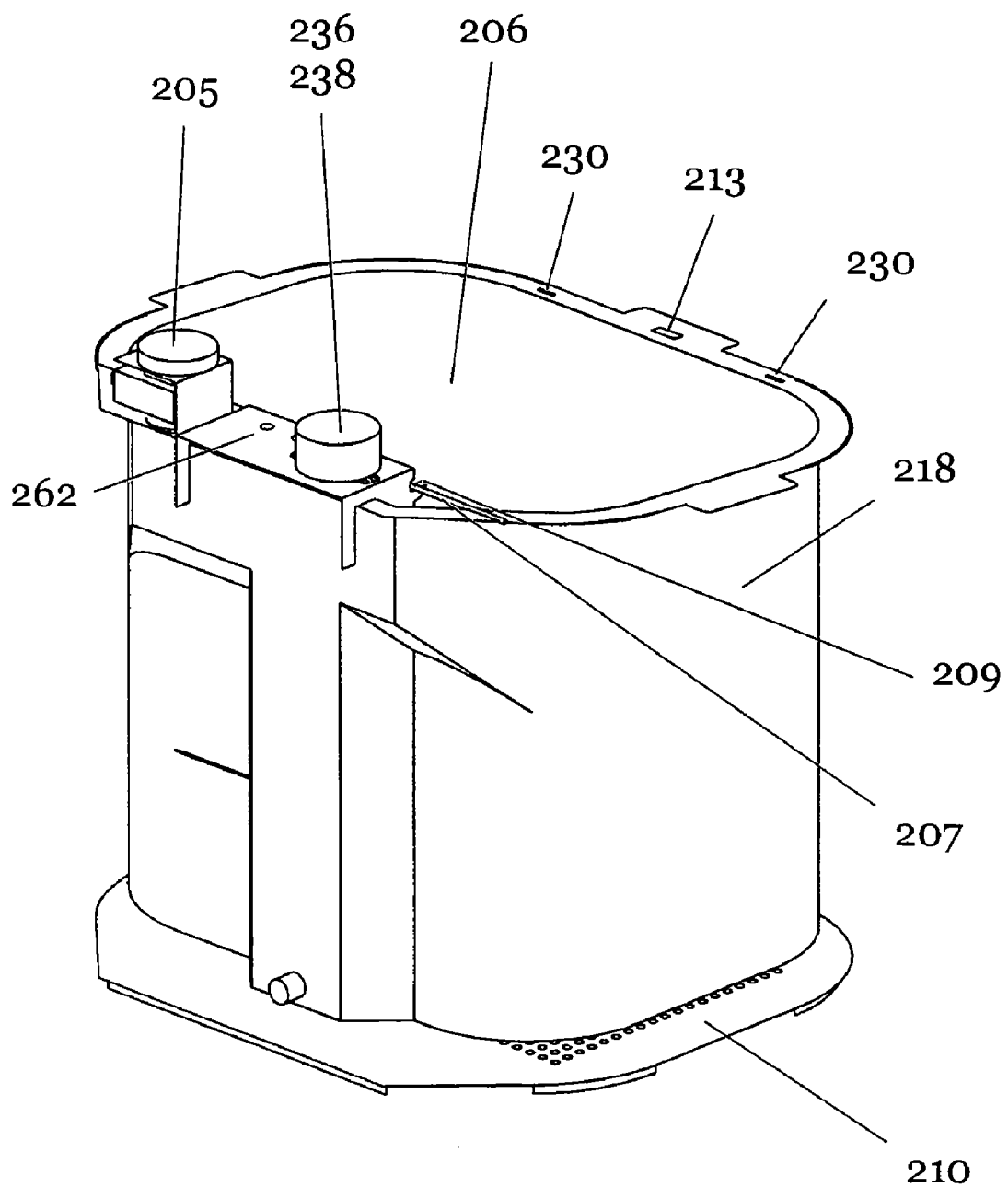
FIG. 29 is a rear perspective view of the third preferred embodiment of FIG. 19 with an outer base cover removed.

FIGS. 23, 24, and 28 illustrates how the basket position sensor switch 254, 256 operates. The hook 242 that threadedly engages the threaded rod 240 moves up and down under power from the bidirectional gear reduced motor 236, 238. The hook 242 passes through a slot 264 that extends vertically within a mounting bracket 262 of the control box. The hook 242 also passes through a slot 266 that is disposed through a slide plate 260. In an example embodiment, the slide plate 260 is movably interposed between the mounting plate 262 and the threaded rod 240 and hook assembly. The slide plate slot 266 is sized having a vertical slot length that is slightly less than that of the vertical excursion of hook 242, thereby causing causes the slide plate 260 to rise to with the hook a predetermined amount to a raised position when the hook 242 reaches its upper position (as shown in FIG. 23). This also causes slide plate 260 to fall to a lower position when the hook 242 reaches its lower position (as shown in FIG. 24).

The slide plate 260 includes an elongated switch lever that extends outwardly therefrom and that is configured to engage a toggle actuator 270 of switch 254, 256. In an example embodiment, elongated switch lever includes a hole 268 disposed therethrough that is sized to accommodate placement of the toggle actuator 270 therein. Configured in this manner, the upward and downward movement of the slide plate 260, caused by hook 242 hitting the top and bottom of slide plate slot 266 when moving to its upper and lower positions, causes switch 254, 256 to change its actuating position. In an example embodiment, the switch lever hole 268 is elongated vertically to allow space for the toggle actuator 270 to snap cleanly when changing its actuating position.

Figure 30:
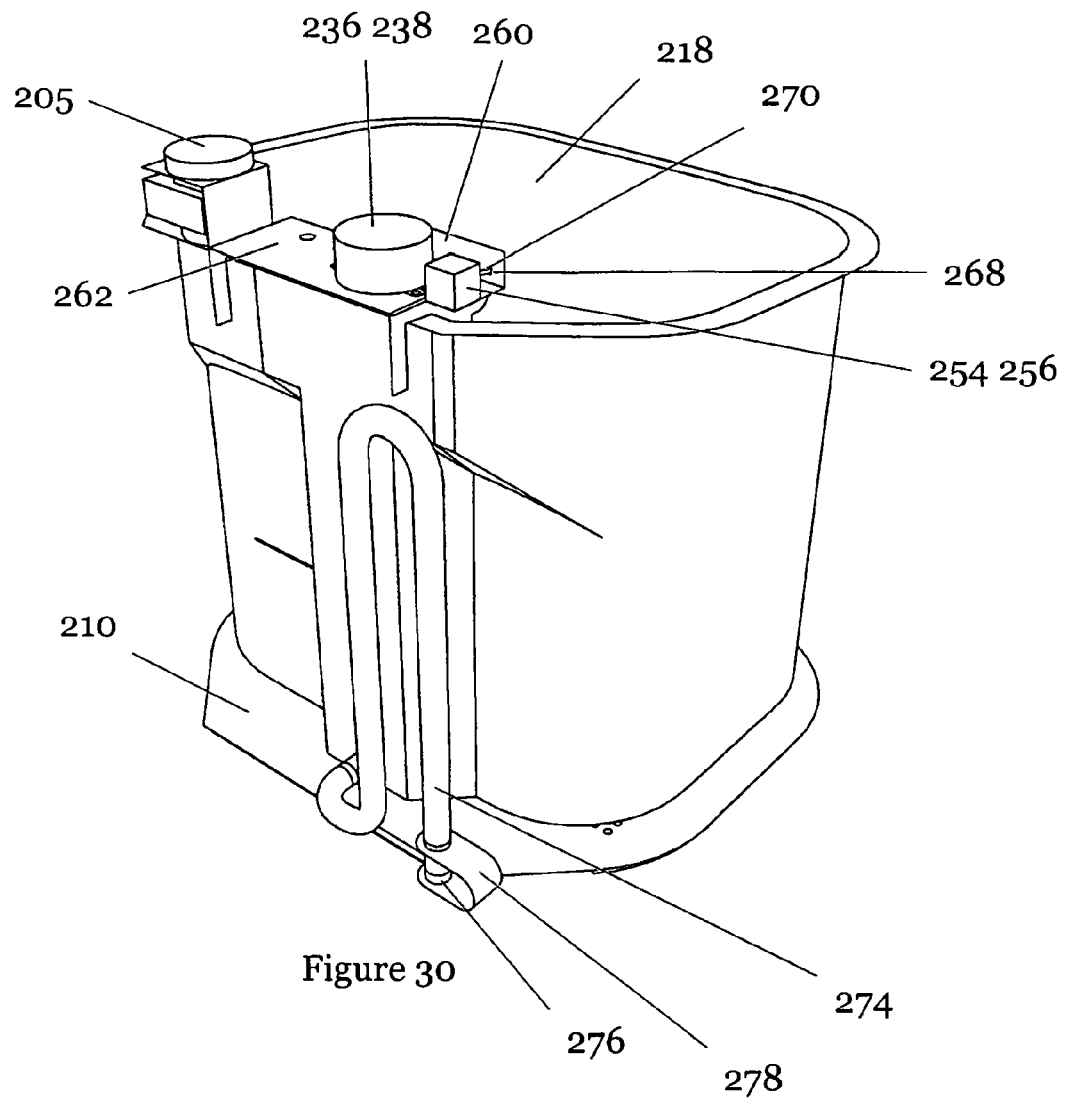
FIG. 30 is a rear perspective view of the third preferred embodiment of FIG. 19 with an outer base cover removed, and illustrating a drainage hose, hose plug, and basket position sensors switch.
Figure 31:
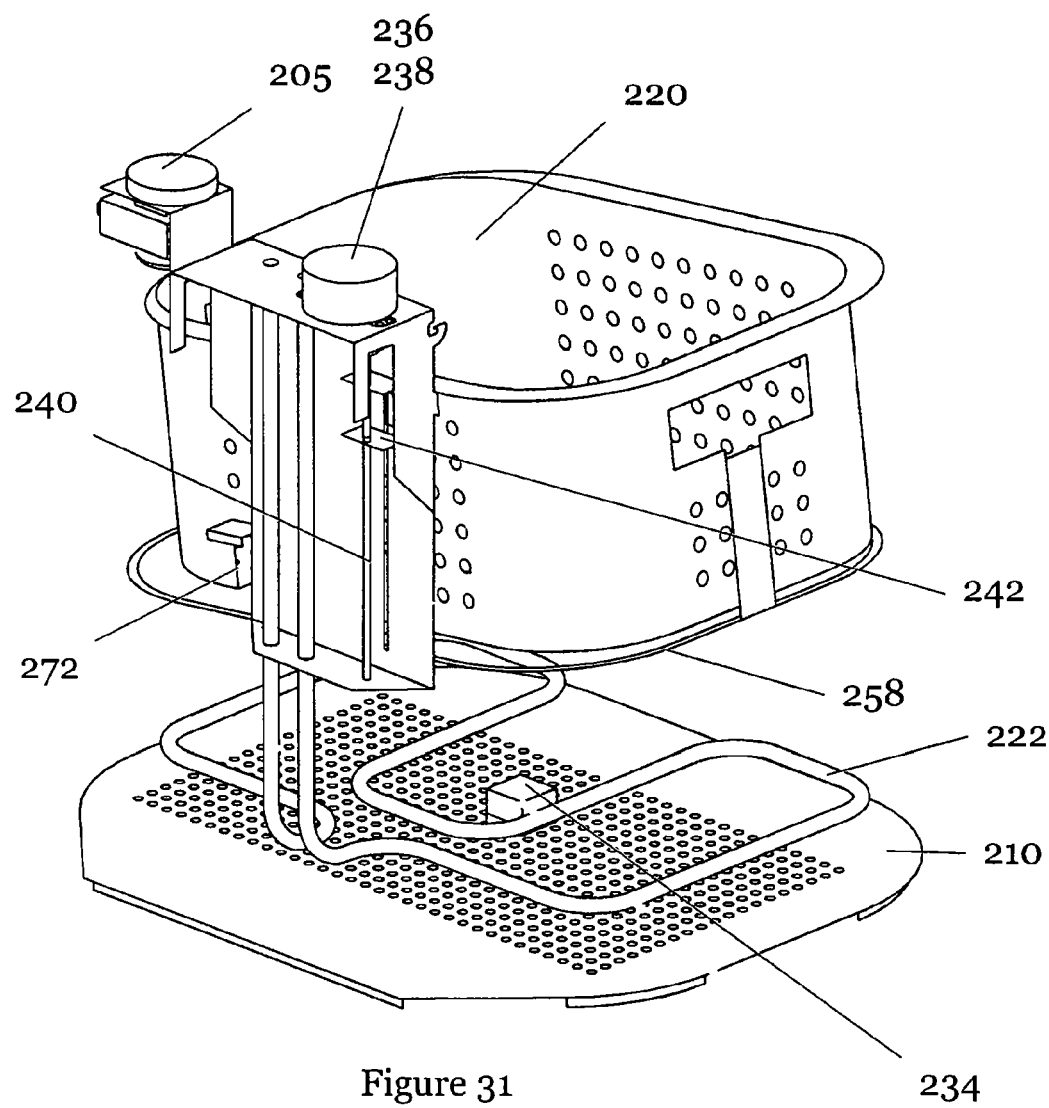
FIG. 31 is a rear perspective view of the third preferred embodiment of FIG. 19 with an oil containment bucket removed, and the food holding basket is in its upper position.
Figure 32:
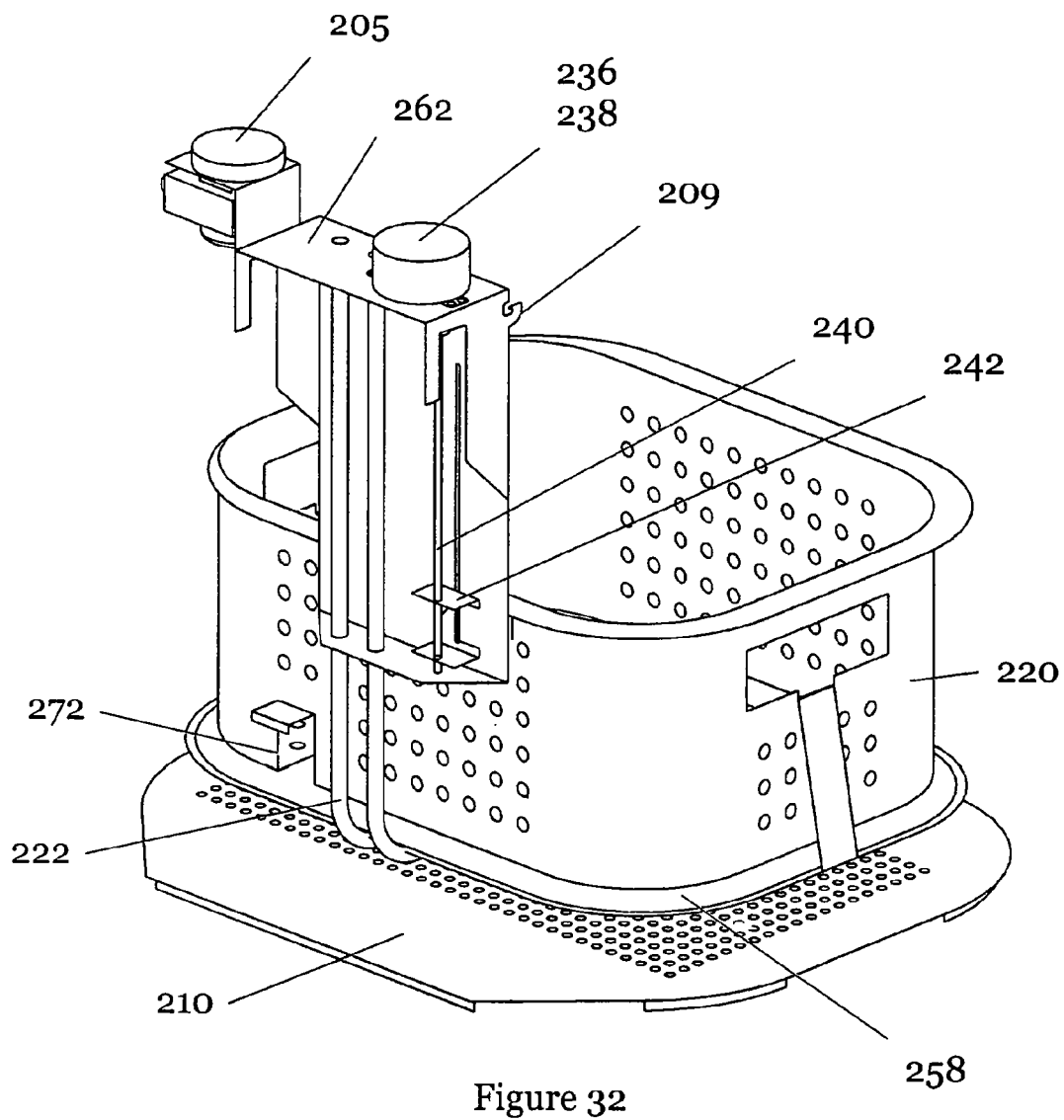
FIG. 32 is a rear perspective view of the third preferred embodiment of FIG. 19 with the oil containment bucket removed, and the food holding basket is in its lower position.
Figure 33:
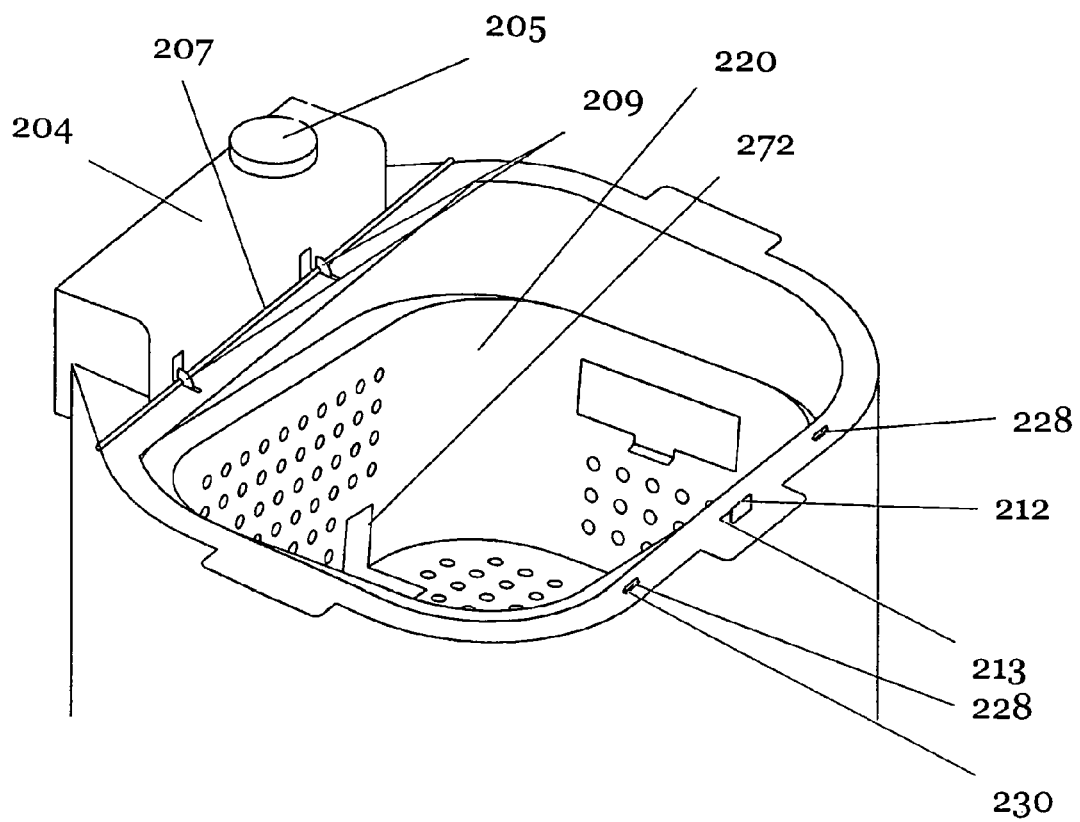
FIG. 33 is an upper perspective view looking into the third preferred embodiment of FIG. 19, with food holding basket in its upper position.
Figure 34:
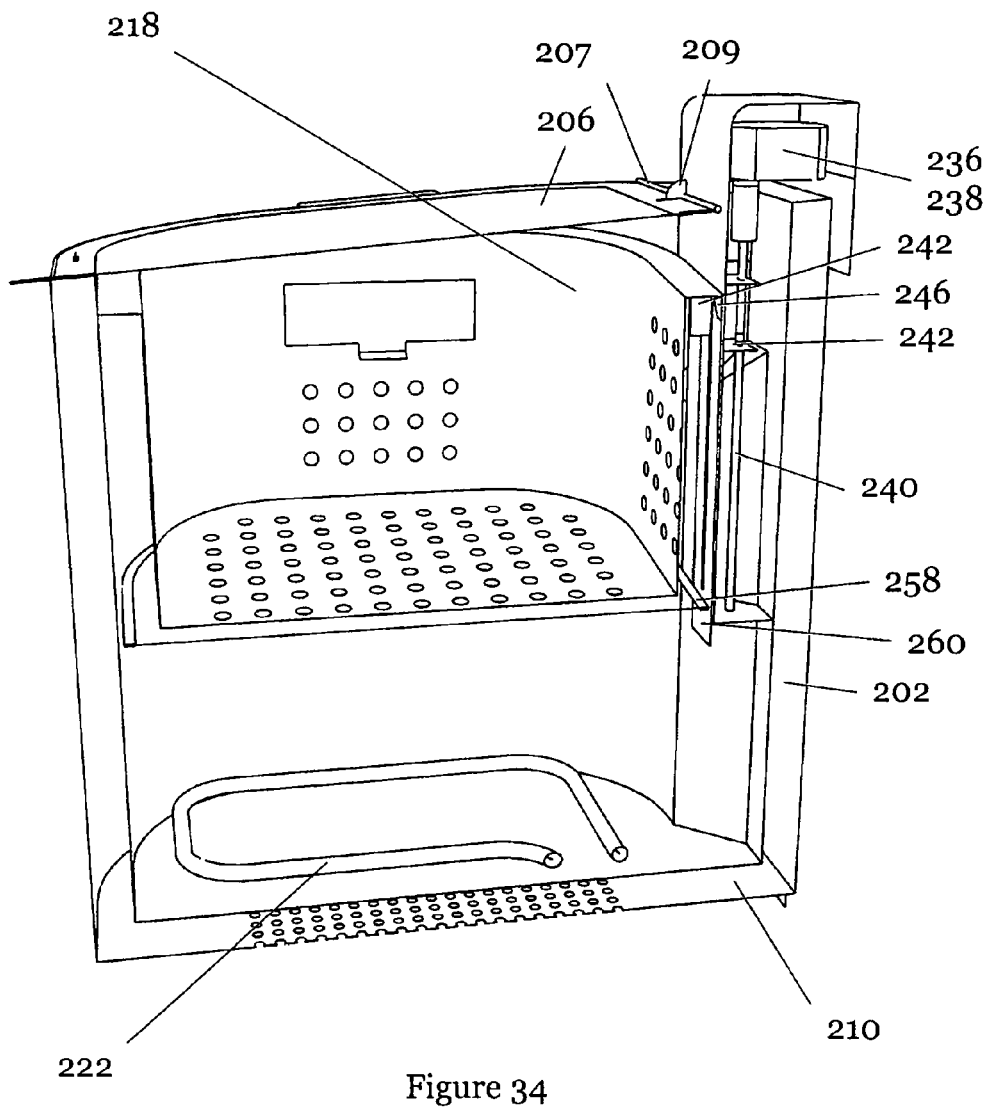
FIG. 34 is cross-sectional side view of the third preferred embodiment of FIG. 19, with the food holding basket in its upper position.
Figure 35:
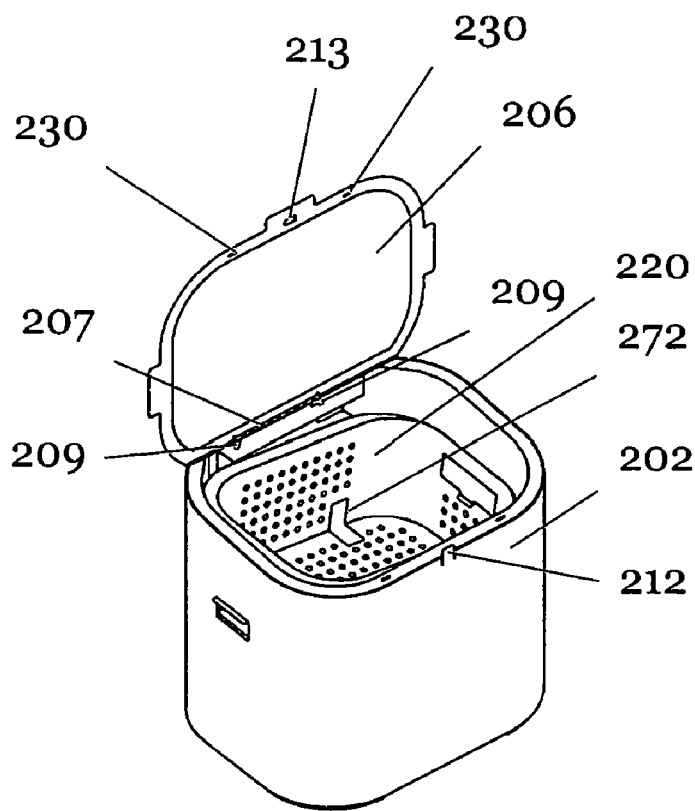
FIG. 35 is a front upper perspective view of the third preferred embodiment of FIG. 19, with a lid in a raised stable position for loading and unloading food.
Figure 36:
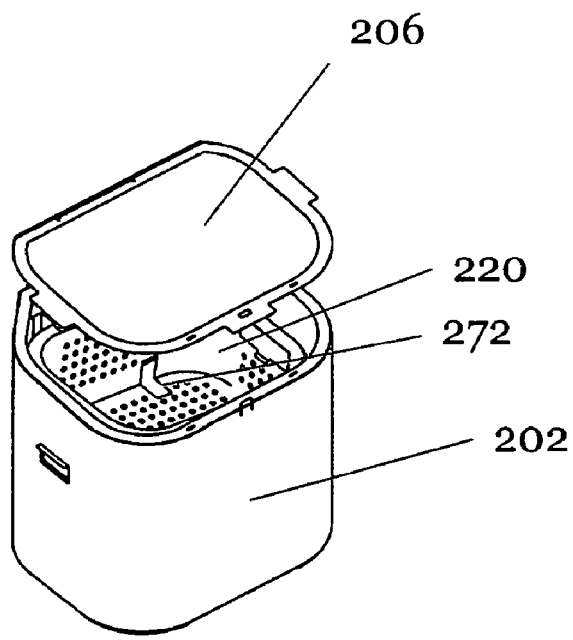
FIG. 36 is a front upper perspective view of the third preferred embodiment of FIG. 19, with the lid removed from the rest of the device.

As shown in FIG. 30, the third embodiment cooking device of this invention may also include a drain hose 274 with plug at its end 276, that is attached to the outer housing 202 and that functions in a manner similar to the flexible hose described above for the first embodiment cooking device. In an example embodiment, the plug 276 is retained on the end of drainage hose 274 by a plug retainer 278 which secures the plug it to the end of hose 274 even when the plug 276 is removed from its plugged position.

Figure 37:
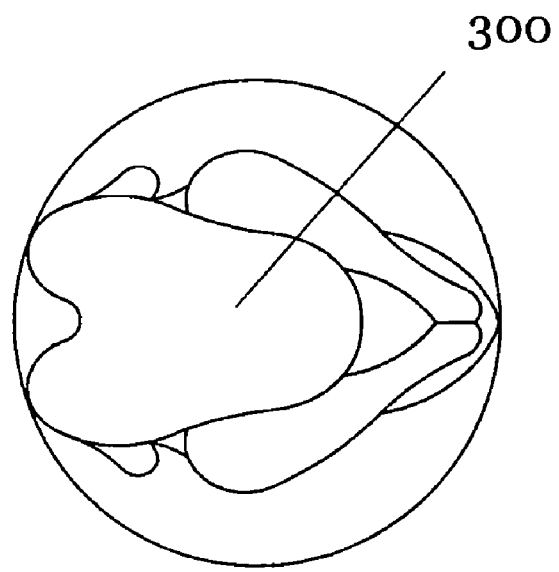
FIG. 37 is a plan view of a poultry product in a round container.
Figure 38:
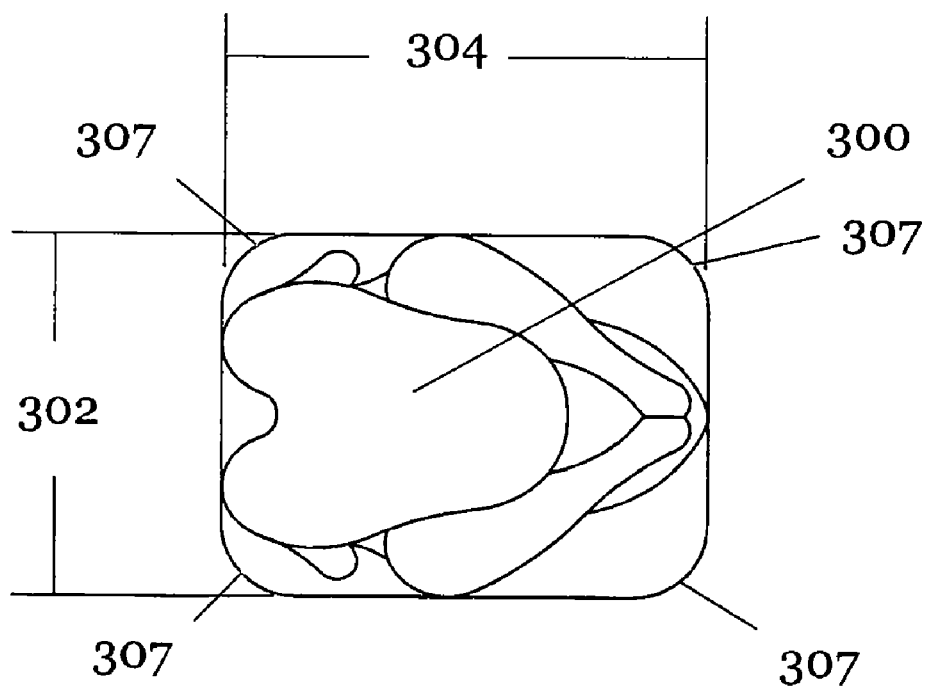
FIG. 38 is a plan view of a poultry product in a rectangular container with radiused corners.

FIGS. 37 and 38 illustrate the contrast in space efficiency between using food article containers, e.g., food support vessels, having a cylindrical cross section or circular plan view (shown in FIG. 37) versus a rectangular cross section or rectangular plan view (shown in FIG. 38) for cooking a poultry food product 300 in a horizontal position. A best efficiency for a food article food container having a rectangular plan design has been found where the ratio between length 304 and width 302 is between about 1.1 to 1.5. The improved space efficiency presented using such a rectangular food article container means that less oil may be used for cooking food, and that a cooking device comprising such food article container may take up less countertop space. The use of radiused corners 307 in such food article container further improve this efficient use of space. Best results are provided when the food article container for cooking poultry foods is rectangular as noted above, and has radiused corners 307 that are sized more than about 10% of the length 304. The above description of improved efficiencies that are gained by using a non-cylindrical food article container is understood to apply to all embodiments of the cooking device as constructed according to this invention.

Fourth Embodiment

Figure 39:
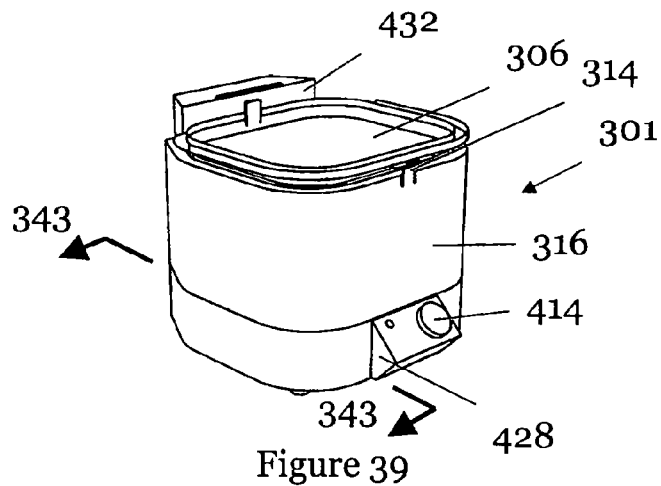
FIG. 39 is a forward upper perspective view of a fourth preferred embodiment of the present inventions, with a lid shown in its inverted storage position.
Figure 40:
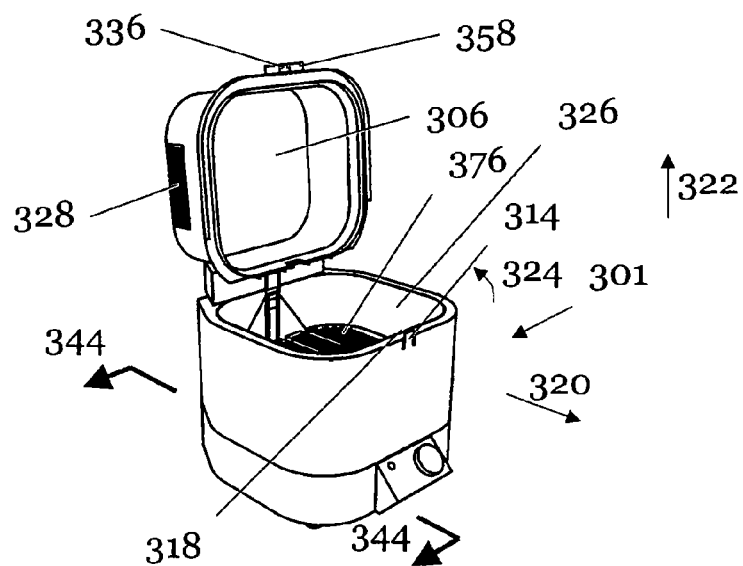
FIG. 40 is a forward upper perspective view of the fourth preferred embodiment of FIG. 39, with the lid shown in a raised stable position for loading and unloading food.
Figure 41:
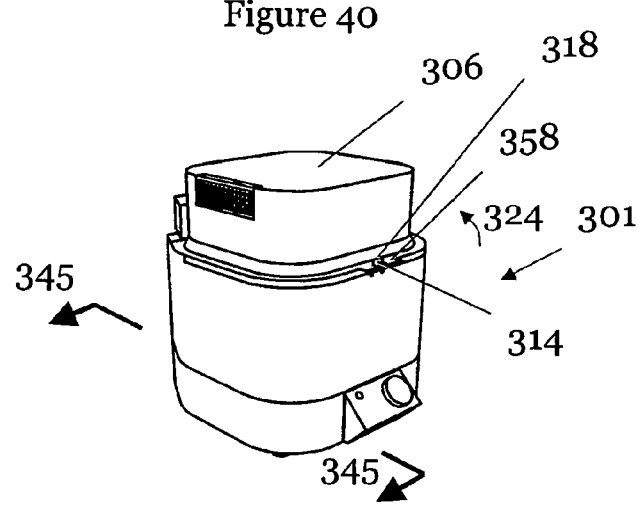
FIG. 41 is a forward upper perspective view of the fourth preferred embodiment of FIG. 39, with the lid shown in a closed position for cooking.

FIGS. 41 to 57 illustrate a fourth embodiment food cooking device 301, constructed in accordance with the principles of this invention, generally comprising an outer housing 316 and a lid 306 that is movably position over a open end of the outer housing. FIGS. 39, 40, and 41 show forward perspective views of the cooking device 301 with the lid 306 in different positions. In FIG. 39, the device 301 is shown with the lid 306 in an inverted position to minimize the space needed for storage. In FIG. 40, the device 301 is shown with the lid in a raised position for loading and unloading foods. In FIG. 41, the lid is shown in a closed position for cooking a food article. The lid 306 may also be removed completely at any time, by simply unlatching and lifting it away from the outer housing 316.

The lid 306 is specially constructed having a wall section that projects outwardly a distance from a lip that extends around a peripheral edge of the lid and that is configured to contact the open end of the outer housing 316. The wall section extends to a closed end of the lid that forms the top portion of the lid when the lid is placed in a closed position on the cooking device. Accordingly, the lid is configured having a concave inside surface defined by the wall section and top portion.

This lid configuration provides improved storage compactness (when the lid is inverted and placed within the cooking device as shown in FIG. 39), and provides exceptional food visibility is accomplished because. In an example embodiment, it is desired that the lid wall section extend a vertical depth that is greater than about 20 percent of the width of the lid as measured from right to left across the front portion of the lid. As noted above, the lid 306 may be inverted and placed inside of the cooking device for compact storage. In an example embodiment, the cooking device of this fourth embodiment is designed to be efficient in storage by having over about 70% of the lid 306 store inside of the cooking device.

The lid 306 may be made of transparent material, such as those materials described above for the lid of the other cooking device embodiments. The use of such transparent material, in combination with the unusually large area of lid 306 due to its concave shape, operates to facilitate viewing food while the food article is cooking, both because it allows more light into the food cooking vessel or compartment 326, and because it allows more viewing area to observe the food article disposed therein. The enhanced ability to view the food article being cooked has advantages of both creating appetite appeal, and helping in gauging food cooking progress.

The lid 306 may be constructed in many different ways well known in the art. In an example embodiment, the lid can be formed by injection molding from a plastic material, such as polypropylene plastic, as a single piece. Such lid construction would be both inexpensive to manufacture and very durable.

The lid 306 may be securely latched to the cooking device during the food cooking process through the engagement of a latch 314 extending from the outer housing and a latch opening 336 that is disposed within a lid lift handle 358 extending outwardly away from a forward portion of the lid lip. The latch 314 can be spring biased to provide a releasable latching attachment with the latch opening when the lid is lowered down onto the outer housing open end.

Figures 51A, 51B:
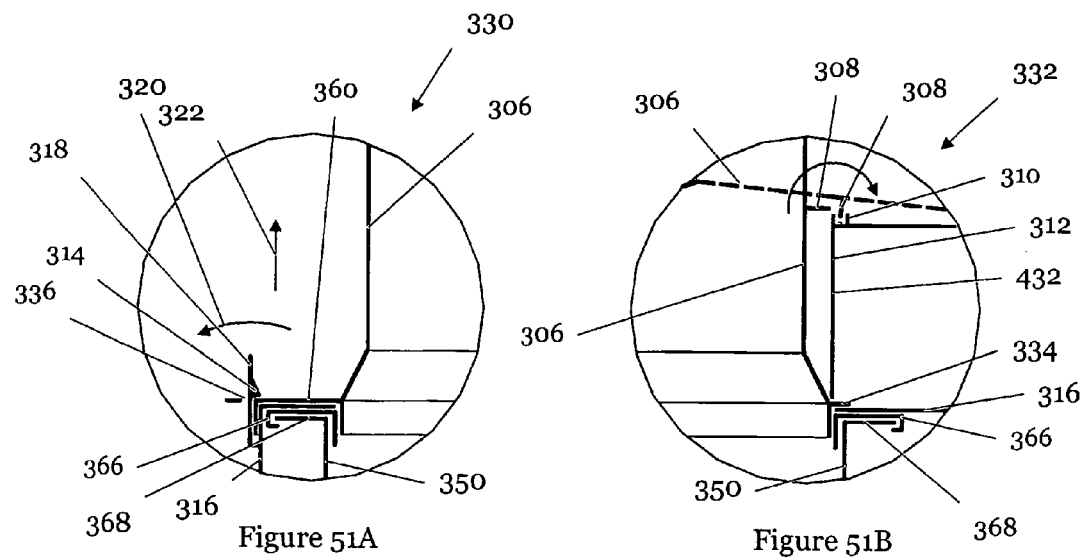
FIGS. 51A and 51B are cross-sectional views taken of detail sections 330 and 332 of FIG. 52.
Figure 52:
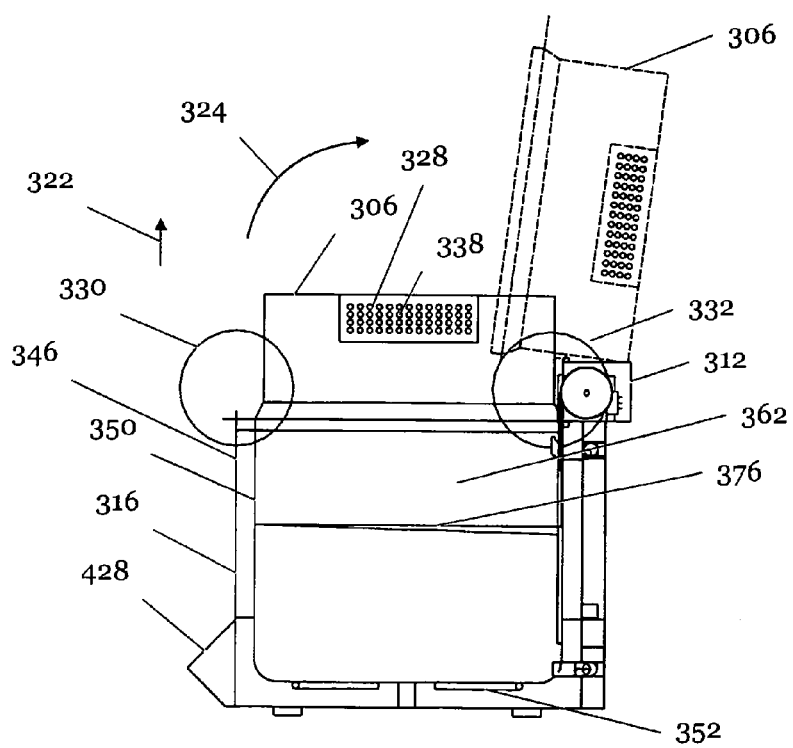
FIG. 52 is a cross-sectional side view of the fourth preferred embodiment of FIG. 39, showing the lid in both the closed position (solid lines) and in the tilted back open position (phantom)

The lid 306 rests upon an upper portion 346 of the outer housing 316 (as shown in FIGS. 51A, 51B, and 52), which may be constructed of the same types of materials described above for the other embodiments of the cooking device, such as plastic or other temperature limited material.

Figure 53:
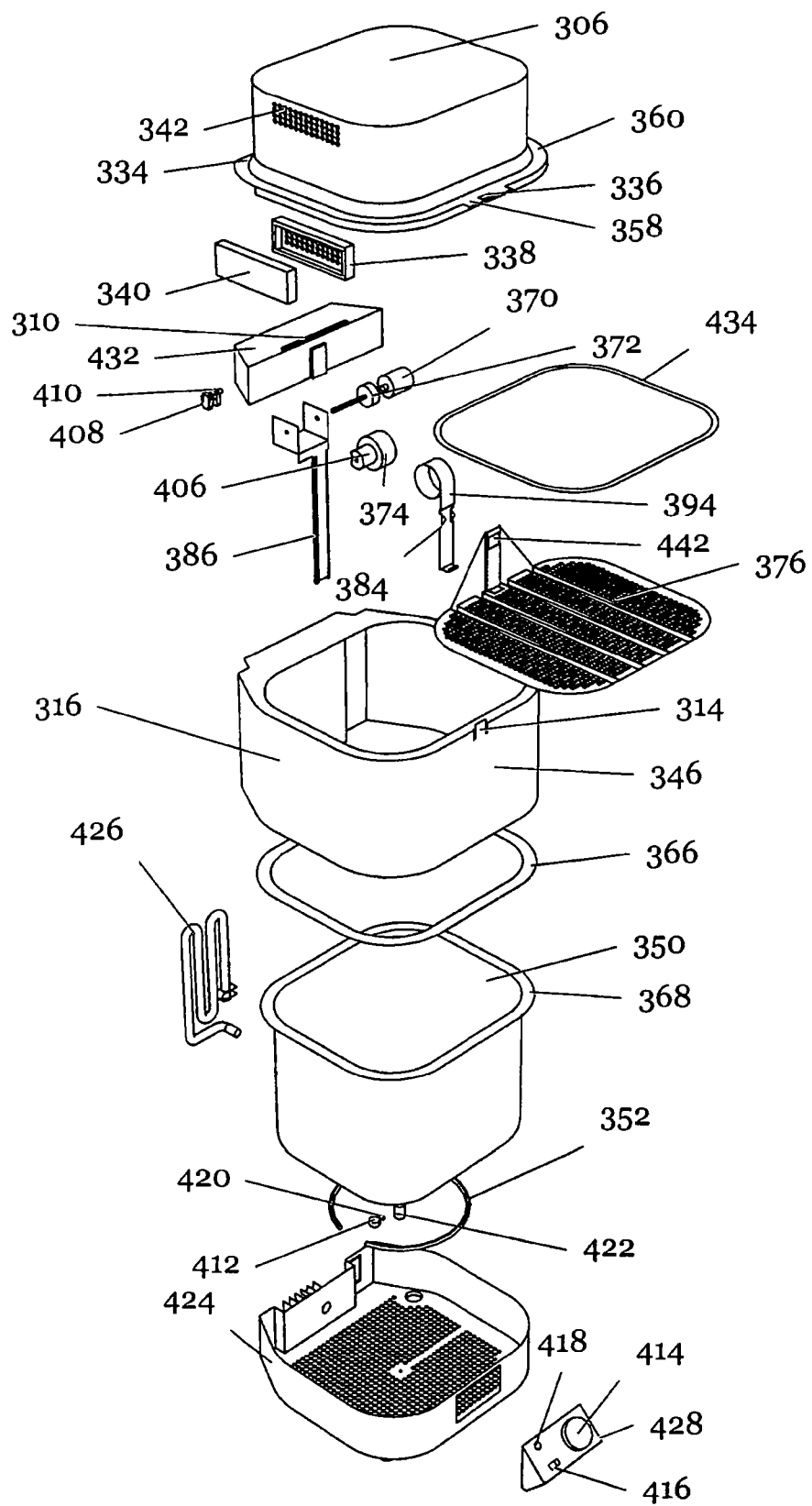
FIG. 53 is a forward upper perspective exploded view of the fourth preferred embodiment of FIG. 52 illustrating all of the elements in an unassembled state.

A cooking vessel or bucket 350 is disposed within an inner cavity of the outer housing 316 and is sized and configured to accommodate a volume of cooking fluid therein. As best shown in FIG. 53, the outer housing 316 is sized and shaped to fit over and cover a portion of the cooking vessel 350. The cooking vessel 350 is covered along its upper region by the outer housing 316, and is covered along its lower region and is supported by an outer housing base 424. Thus, the outer housing of this fourth embodiment cooking device is provided as a two part assembly.

A pliable heat resistant gasket 366 is interposed between an outwardly flanged edge 368 of the cooking vessel 350 and an inwardly flanged edge of the outer housing 346 to protect and insulate the outer housing therefrom. Insulating connectors, such as stainless steel screws or the like may be used connect the outer housing 346 to the cooking vessel 350, wherein such connectors extend through the pliable heat resistant gasket 366.

As best shown in FIGS. 51A, 51B, and 52, the pliable heat resistant gasket 366 wraps over both the inner and outer perimeters of the cooking vessel flanged edge 368. Where the gasket 366 wraps over the inner perimeter of the flanged edge 368, it spaces the lid 306 away from, and thermally insulates it from, the cooking vessel 350 when lid 306 is in a closed position closed. The gasket 366 also operates to provide a seal between the lid 306 and the cooking vessel 350. If desired, this seal can be enhanced by ribs or the use of other surface features extending from the inner perimeter of pliable heat resistant gasket 366. Wrapping the exterior perimeter of pliable heat resistant gasket 366 around, over, and back again in a "C" shape over the outer perimeter of the cooking vessel flanged end 368 (as shown in FIGS. 51A and 51B) helps to lock the gasket 366 into place.

Figure 50:
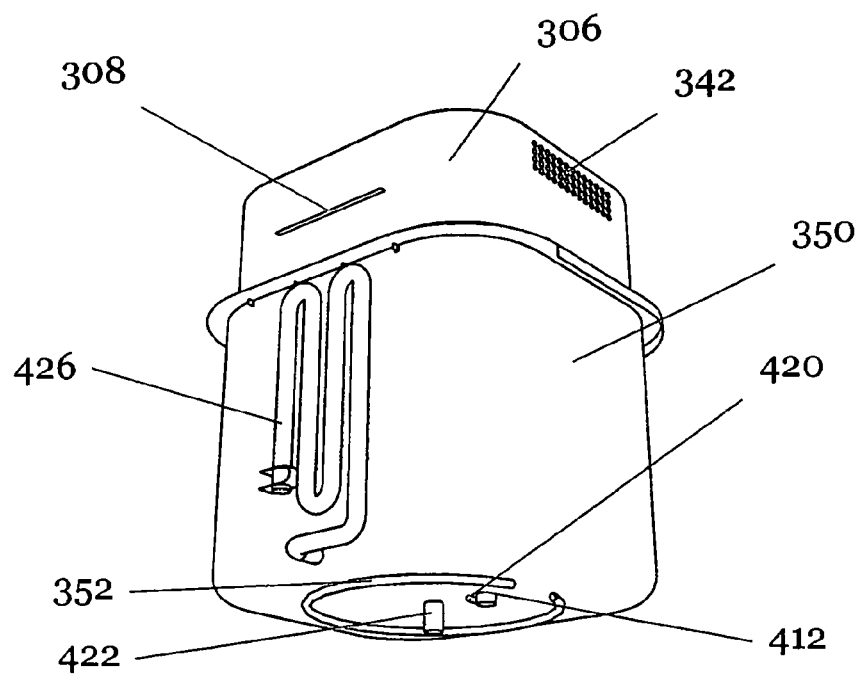
FIG. 50 is a rear lower perspective view of the fourth preferred embodiment of FIG. 39, with a lower body removed.

As best shown in FIGS. 50 and 53, an external heating element 352 is affixed to a bottom portion of the cooking vessel 350. Positioning the heating element 352 outside of bucket 350 is both less expensive to manufacture and easier to clean than a heater placed within bucket 350. The heating element can be of the same type described above for the first cooking device embodiment. In addition to the heating element, a thermostat 412 and a thermal fuse 420 are also connected with the bottom of the cooking vessel. The thermostat 412 may actually be a single preset thermostat, can be two or more switch controlled preset thermostats, or can be a user adjustable thermostat. The thermal fuse 420 cuts power going to the cooking device in the event of unacceptable heat within the embodiment.

A support 422 can be used to connect between the bottom of the cooking vessel 350 and an inside surface of the outer housing base portion 424. The support is provided to help distribute the weight of cooking vessel and its contents directly to the outer housing base 424 of the cooking device where the support feet are (see FIG. 49).

FIGS. 51A and 51B illustrate respective details 330 and 332 taken from FIG. 52 that best show the manner in which the lid is attached to the outer housing. FIG. 51A illustrates the releasable attachment that is formed between the lid and the outer housing along a forward portion of the lid, wherein the latch 314 projecting from the outer housing engages the latch opening 336 in the lip handle. FIG. 51B illustrates the attachment between a rear portion of the lid and the outer housing, that is provided by the mechanism of a rear rib 334 projecting outwardly from a rearward portion of the lid and sliding under a lower portion of a lifting mechanism enclosure 432. The lid 306 may be separated from the outer housing lower body 316 by pulling actuator lever 318 of latch 314 forward 320 and lifting lid 306 upward 322 (FIGS. 51A, 51B, and 52).

FIG. 53 illustrates all of the elements of the fourth embodiment cooking device. The lid is shown with the central lid handle 358 extending outwardly a distance from a forward portion of the lid lip or rim 360. The central handle 358 allows a user to both pull actuator lever 318 that is attached to an end of the latch, and simultaneously lift the central handle 358 rearwards 324 with one hand, in this manner enabling the user to release the lid from a locked down position and move the lid away from the cooking device opening.

Figure 57:
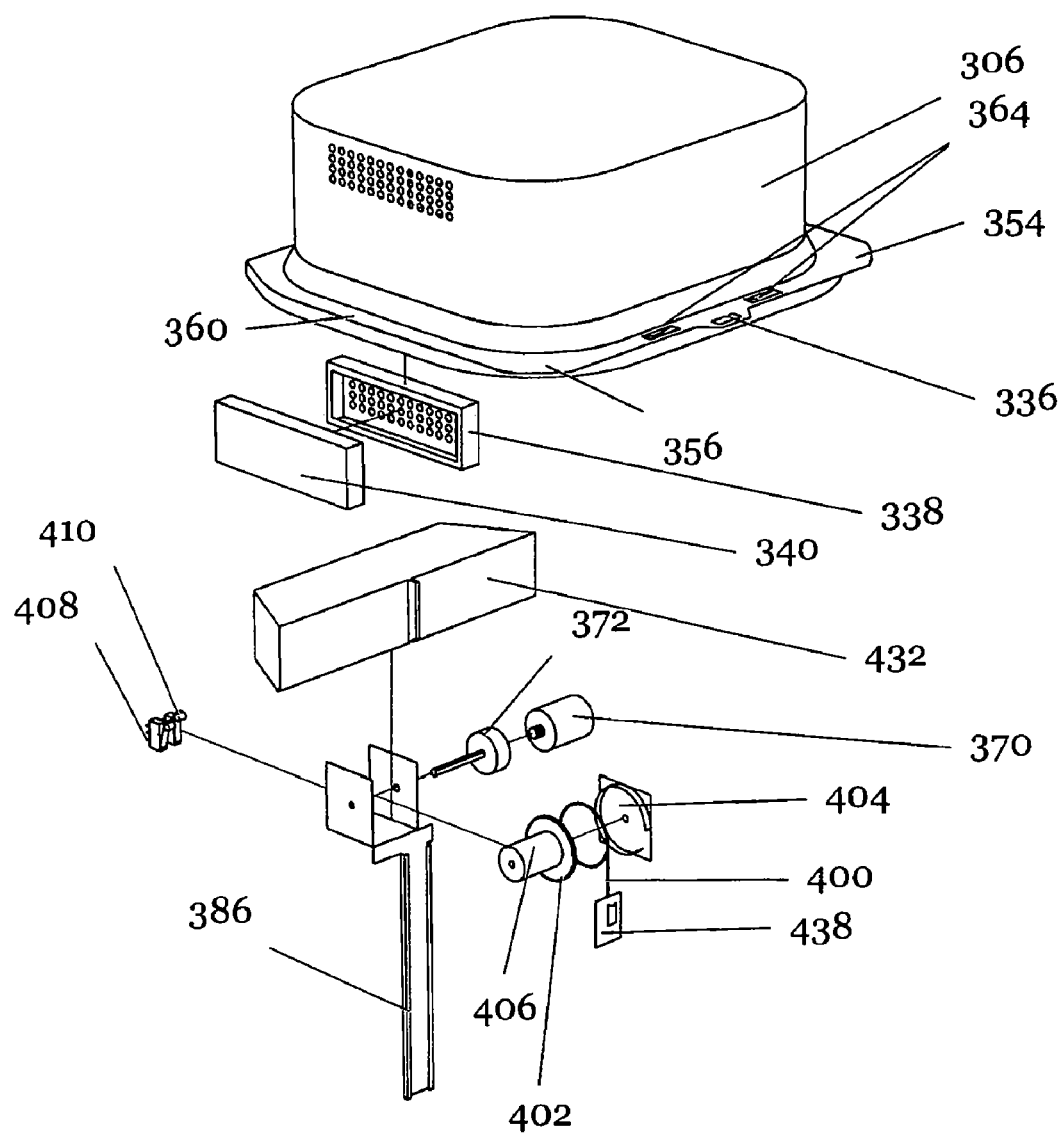
FIG. 57 is a forward upper perspective view of an alternative cable lifting mechanism for the fourth preferred embodiment of FIG. 52.
Figure 58:
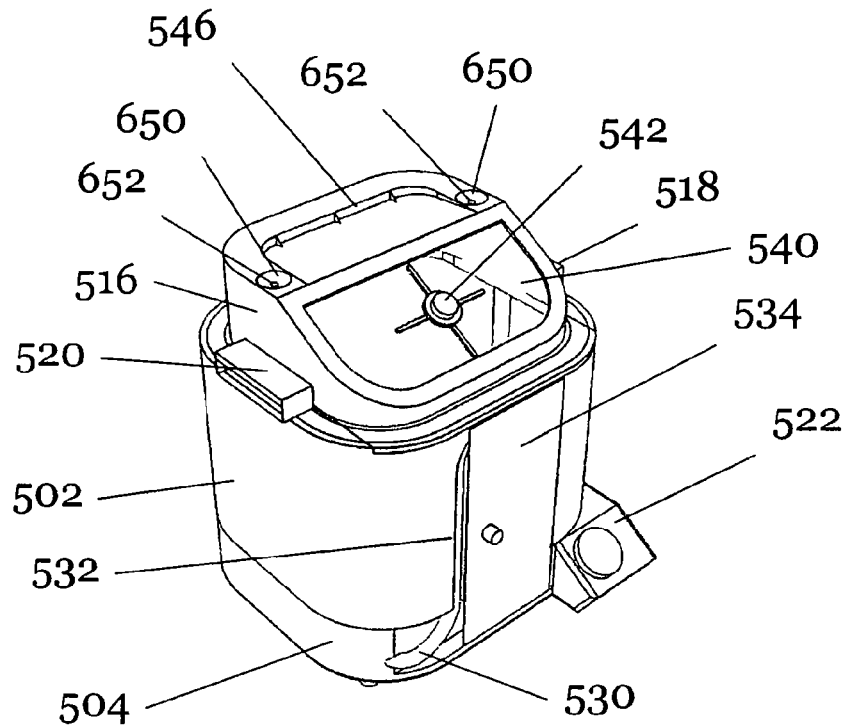
FIG. 58 is a forward perspective view of an exemplary embodiment of the present inventions with its lid on and its food support platform in its lowered cooking position.
Figure 59:
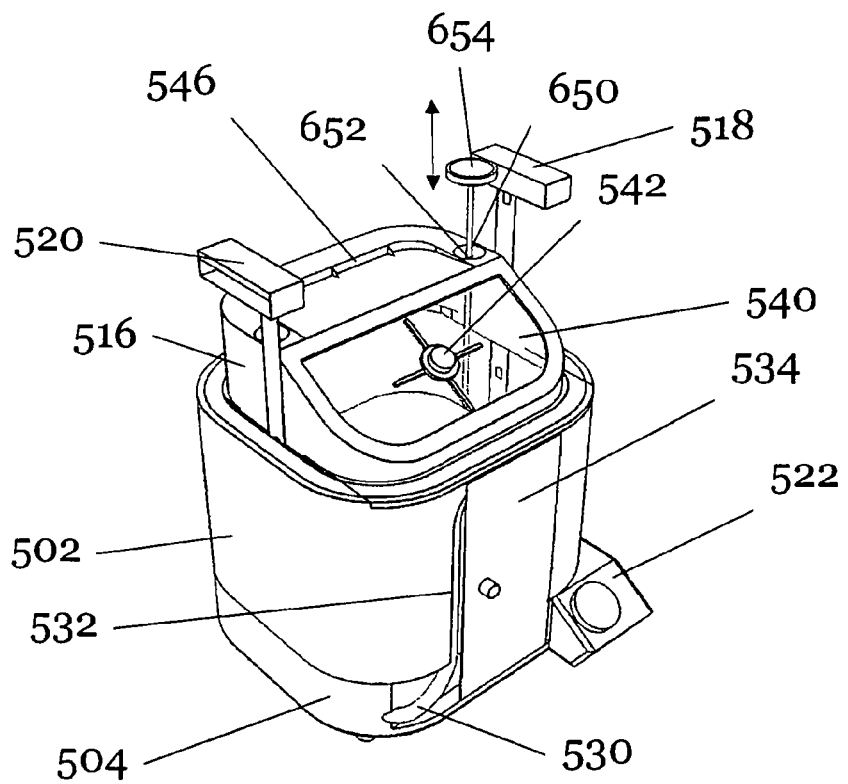
FIG. 59 is identical to FIG. 58 except that FIG. 59 shows the embodiment with its food support platform in its partially raised position.
Figure 60:
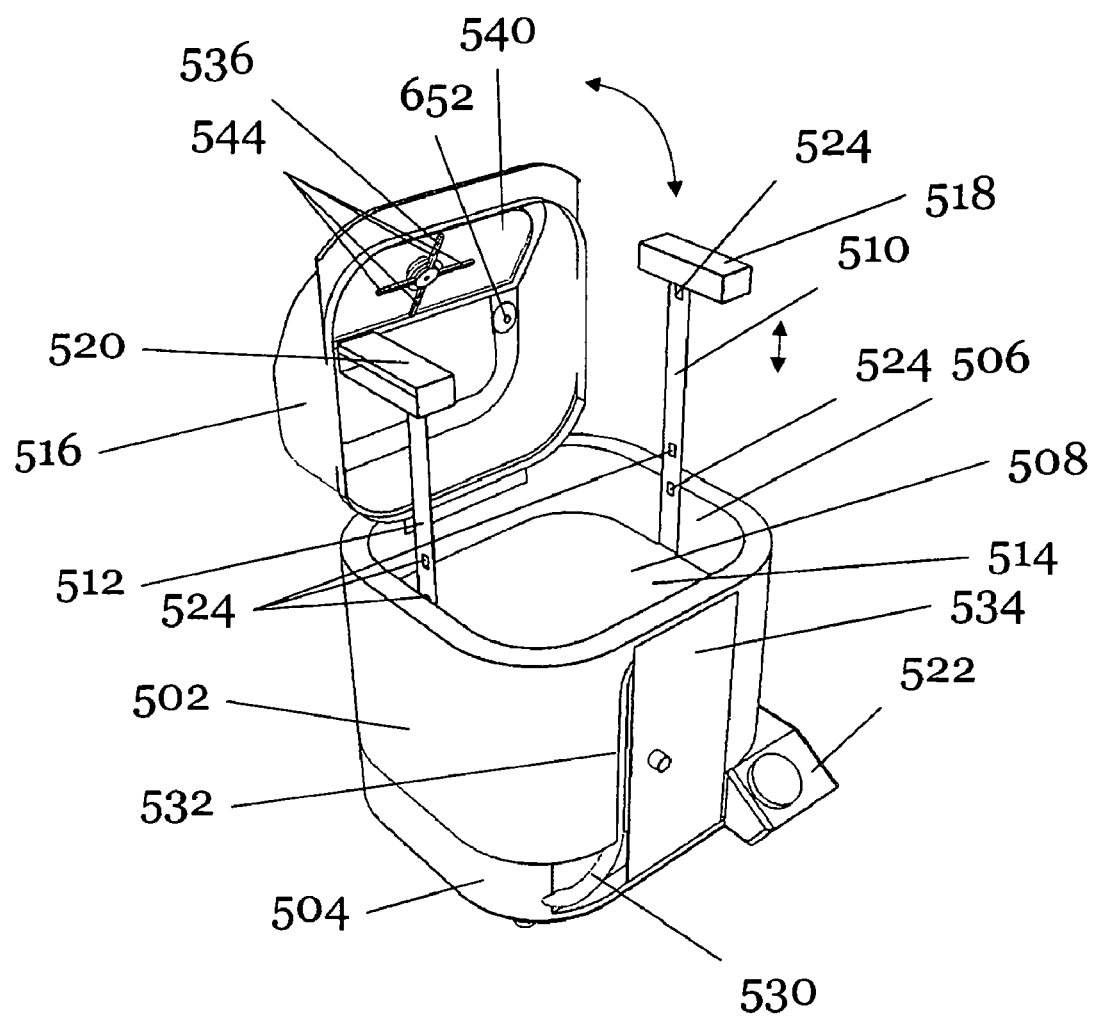
FIG. 60 is identical to FIGS. 58 and 59 except for showing the food support platform it's fully raised position and its lid raised but not removed.

FIG. 57 illustrates an alternate embodiment of the lid 306 comprising lid handles 354 and 356 that extend outwardly a distance from the forward right and left corners respectively of the lid rim 360. Locating the handles on the sides of the lid in this alternative embodiment prevents the user from having to place their hands or arms directly above cooking cavity 362 when lid 306 is opened.

Figure 44:
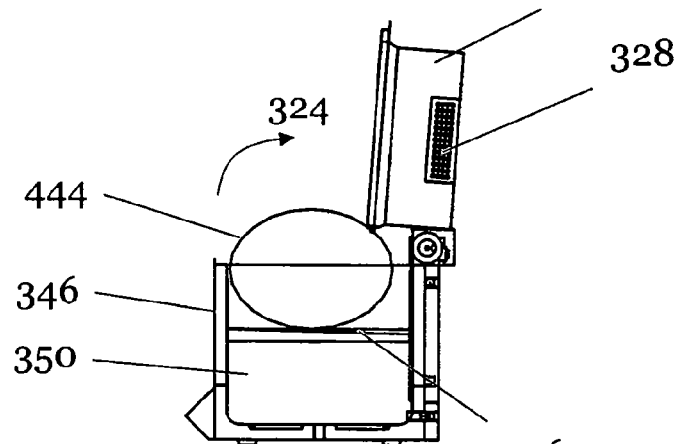
FIG. 44 is a cross-sectional side view taken along section 344-344 through the fourth preferred embodiment of FIG. 39, with the food support platform in its raised position.

As shown in FIG. 57, the lid of this embodiment comprises a biasing means 364, e.g., provided in the form of a spring member or the like, molded into the lid rim 360 and that is configured and positioned to rest against an upper horizontal flange of the outer housing 316. The spring member operates to impose a desired biasing force between the lid and the outer housing to bias the lid 306 open a short distance and uncouple latch 314 from rim 360, when latch actuator lever 318 is pulled forward in a forward direction to release it from the latch opening 336. The lid 306, after becoming unlatched, may then be lifted upwardly and rearwardly 324 (as best shown in FIG. 44) with one hand or two hands gripping the lid lifting handles 354 and/or 356. This allows the alternate embodiment of lid 306 to be unlatched and lifted with only one hand.

Figure 42:
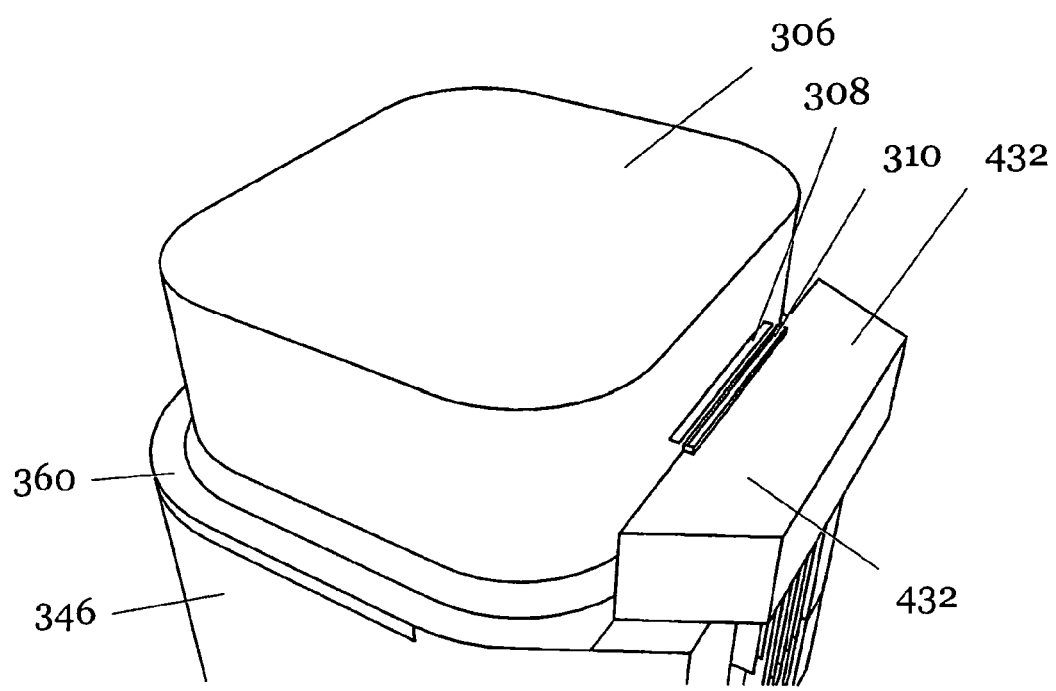
FIG. 42 is a partial rear upper perspective view of the fourth embodiment of FIG. 39.

FIG. 42 illustrates a rear right perspective view of the fourth embodiment cooking device 301. In an example embodiment, the cooking device comprises a lid that is configured to cooperate with a portion of the cooking device to facilitate moving or rotating the lid upwardly and rearwardly from a closed to an open position. In an example embodiment, the lid 306 is constructed having a pivot rib 308 that extends a predetermined distance from a rearward facing outside surface of the lid wall section. The pivot rib 308 extends horizontally a distance therealong and is sized and positioned to cooperate with a pivot groove or trough 310 that is positioned along a top surface of a control box 312 mounted to a rearward portion of the outer housing 316. The pivot rib 308 is sized and configured to fit within the pivot groove 310 when the lid is rotated back into an open position to facilitate movement and placement of the lid thereon when the lid is placed into an open position. Alternatively, the lid can configured comprising a pivot groove and the control box can be configured comprising a pivot rib, for the purpose of permitting the same type of cooperative engagement described above.

Configured in this manner, the lid 306 may be placed in its open position (as shown in FIGS. 40 and 44) by unlatching it from the outer housing 316 as described above, and tilting it rearwardly 324 (as shown in FIG. 52). During this translational movement of the lid, the pivot rib 308 is disposed within and engages the pivot groove 310, and the cooperation of these two features operate to provide a pivot axis for the lid 306 when it is being tilted rearwardly 324. After the lid is moved rearwardly in this fashion, the cooperation of the pivot rib and pivot grove also operates to locate the lid 306 in a stable position on top of control box 312 (as best shown in FIGS. 40, 44, and 52).

As best shown in FIG. 57, the cooking device 301 includes an odor filter assembly that is attached thereto. In such example embodiment, the odor filter assembly 328 is provided in the form of a filter box 338 that is removably attached to an inside surface of the lid 306. A filter media 340 is disposed within the filter box 338 and can be made from one of any of variety of different filtering materials, including, alone or in combination: metal mesh, nonwoven materials such as nonwoven polyester or metal, woven material, activated charcoal, or other known filtering materials for: condensing grease and oils, and/or for filtering odors and/or gaseous and/or particulate matter.

In an example embodiment, the filter box 338 removably snaps to the interior of lid 306 and is positioned adjacent a section of the lid that includes a plurality of exit openings 342 disposed therethrough to facilitate the passage of air from the cooking device. In an example embodiment, the exit openings 342 are disposed through a wall section of the lid, thereby allowing for the passages of cooking exhaust, steam and/or hot air from the side of the lid 306 where its will not damage countertop splash or get caught between the splash and the over-counter cabinets. Such side exhausting arrangement has advantages over many current countertop deep fat fryers that exhaust damaging steam and hot air upward towards and against over-counter cabinets. Additionally, the cooking odor filter 328 operates in combination with the pliable heat resistant gasket 366, and lid 306 latching to lower body 316 during the cooking process to helps to prevent the unwanted escape of cooking orders and directed then through the odor filter, to thereby help control and prevent such unfiltered cooking orders from contaminating room air.

Figure 43:
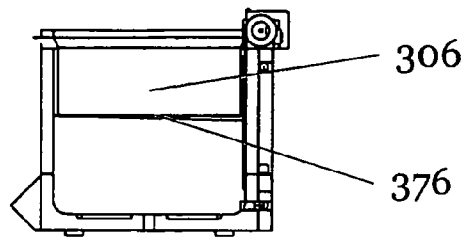
FIG. 43 is a cross-sectional side view taken along section 343-343 through the fourth preferred embodiment of FIG. 39, with a food support platform in its raised position.
Figure 45:
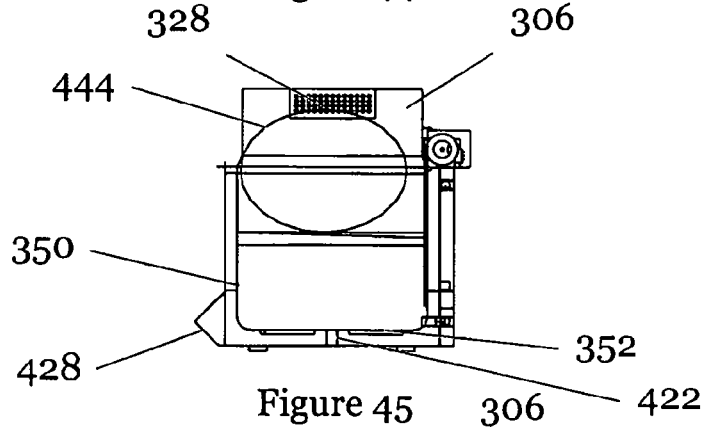
FIG. 45 is a cross-sectional side view taken along section 345-345 through the fourth preferred embodiment of FIG. 39, with the food support platform in its raised position.
Figure 46:
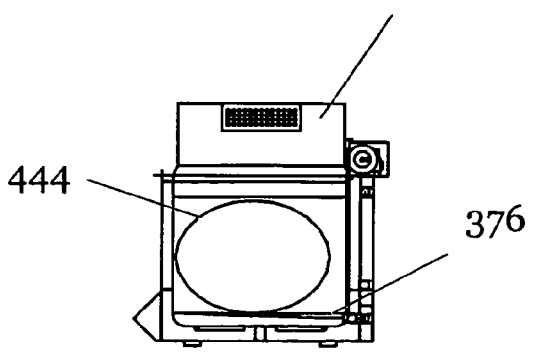
FIG. 46 is a cross-sectional side view taken along section 345-345 through the fourth preferred embodiment of FIG. 39, with the food support platform in its lowered position.

Sections 343, 344, and 345 of the cooking device set forth in FIGS. 39, 40, and 41 are more fully illustrated in respective FIGS. 43, 44, and 45. FIGS. 44 to 46 illustrate the cooking device comprising a food article disposed therein as represented by ellipse 444. FIG. 44 shows the position of the food article after it has been loaded into the device and onto a food support vessel 376 for cooking. FIG. 45 shows the position of the food article after the lid has been lowered from its open position to a closed position onto the outer housing, and while the food support vessel 376 is maintained in a raised position. In this operative position, the lid is latched closed so that during the cooking process it operates to create a safety barrier to protect users of the device from possible splattering of hot cooking liquid. The closed lid may also help prevent rapid egress of cooking liquid in the event the device is accidentally tipped over of falls off of a supporting substrate surface such as a countertop. FIG. 46 shows the position of the food article 44 within the device when the food support vessel 376 has been lowered into a cooking position.

The food support vessel 176 is sized and configured to be removably disposed within the cooking bucket 350. In an example embodiment, the food support vessel 376 is provided in the form of a planar member that, unlike the other described cooking device embodiments, does not include a surrounding wall structure. In a preferred embodiment, the food support vessel 376 is configured having a plurality if openings disposed therethrough to permit for the passage of cooking liquid during both cooking and after cooking to facilitate cooking oil draining from the food article.

In an example embodiment, the food support vessel 376 includes a number of channels extending along the surface to further facilitate the draining of cooking fluid away from the food article when raised above the cooking fluid. Such channels can be configured having an inclined or angled orientation to further facilitate the passage of cooking fluid away from the food article. In a preferred embodiment, the channels are configured having an orientation that is angled rearwardly towards a rearward portion of the cooking device so that the cooking fluid that drains from the food support vessel is channeled in a direction away from the front of the cooking device and the user.

As shown in FIG. 53, an oil filter screen 434 may be positioned to rest upon the food support vessel 376 to filter used oil when the food support vessel 376 is raised, thereby helping to extend the useful cooking life of the oil. A fine mesh screen, as described earlier, or other filtering material, may be used. The oil filter screen 434 may be easily removed from the device for easy cleaning, such as in the dishwasher, or for other reasons, simply by lifting it off from food support platform 376. In an example embodiment, the oil filter screen is sized and configured to fit within the cooking device in close proximity to the walls of the cooking vessel 350.

Figure 47:
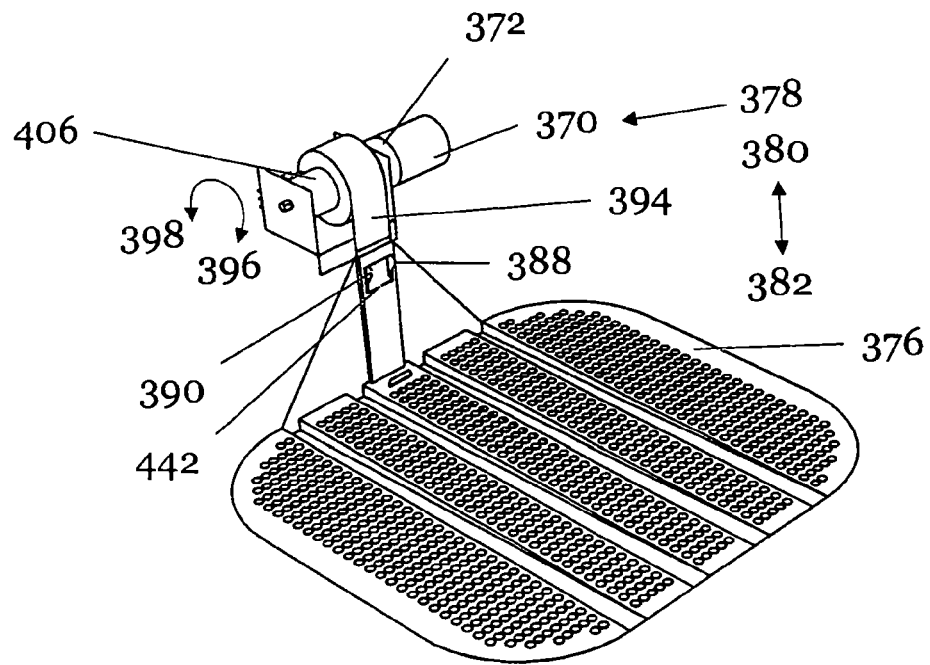
FIG. 47 is a forward perspective view of a lifting mechanism and food support platform of the fourth preferred embodiment of FIG. 39.
Figure 48:
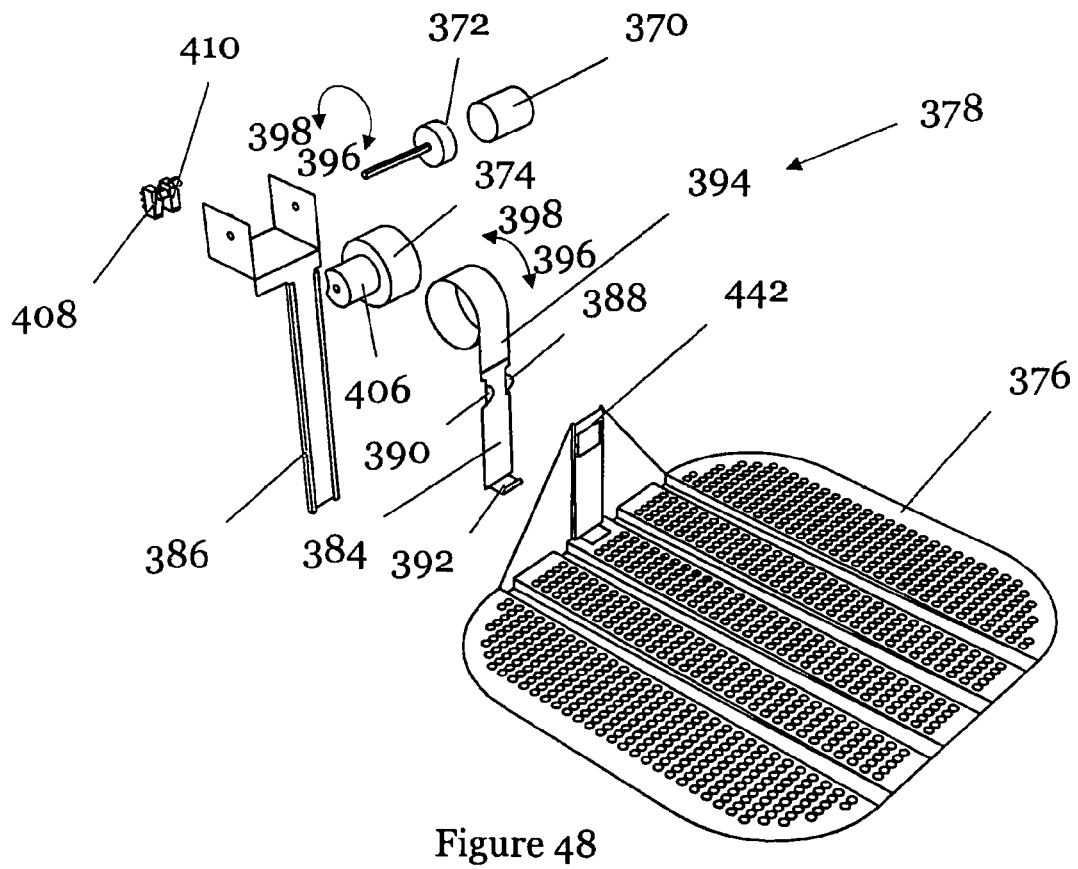
FIG. 48 is an exploded view of the lifting mechanism of FIG. 47 illustrating its elements in an unassembled state.
Figure 49:
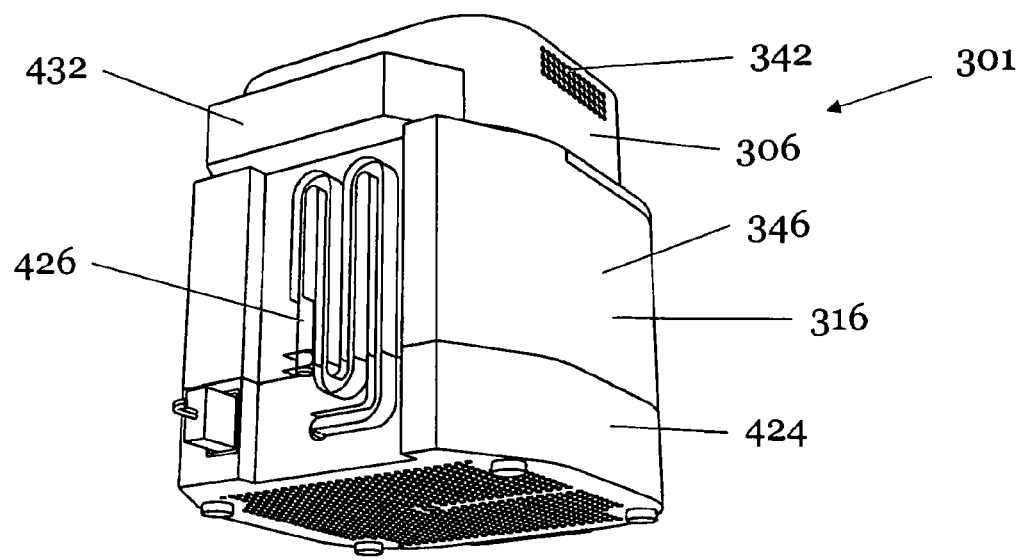
FIG. 49 is a rear lower perspective view of the fourth preferred embodiment of FIG. 39.

In an example embodiment, the food support vessel 376 is detachably coupled to a food support vessel lifting mechanism 378 that is constructed to raise 380 and lower 382 platform 376 (as shown in FIGS. 47 and 48). The lifting mechanism 378 comprises a coupling bracket 384 that couples through hooks 388, 390 and 392 to a backplate 442 attached to a rearside portion of the platform 376. The coupling bracket 384 is slidably disposed within a track member 386 that is configured to enable vertical movement of the coupling bracket up 380 and down 382 along the track member. In example embodiment, the track member includes a "C" shaped channel that is sized to slidably retain the coupling bracket therein.

A lifting member 394 is disposed within a portion of the track member 386 and is attached to the coupling member to cause the coupling member upward and downward movement. In an example embodiment, the lifting member 394 is provided in the form of a flexible lifting tape 394. The flexible lifting tape 394 is coupled to a spool 374 that is rotatably mounted to the track member. The spool 374 is driven clockwise 396 and counterclockwise 398 by a gear reduction member 372, which in turn is powered by a reversing motor 370 (as best shown in FIGS. 47 and 48). The flexible lifting tape 394 may be fabricated from a those materials capable of providing a sufficient degree of tensile strength and being rolled and unrolled, such as a coiled metallic material similar to that used for a tape measure and the like.

FIG. 57 illustrates an alternative lifting mechanism where the flexible lifting tape 394 has been replaced by a cable lift member 400 that is wound on a cable spool 402 and that is held against the cable spool 402 by a cable guard 404. In an example embodiment, the cable lift member is provided in the form of a stainless steel cable, e.g., similar to cable found on many bicycle handbrake systems or the like. The cable 400 is connected to single cable hook member 438, which in turn is removably hooked to the food support vessel backplate 442.

The single cable hook member 438 rides up and down in the track member 386 in the manner described above.

The food support vessel 376 includes a channel in its rearward facing surface, e.g., disposed along the backplate 384, that engages both sides of track member 386 so as to provide a stabilizing effect, thereby eliminating the need for any additional connection to the lifting mechanism.

The lifting mechanism according to either embodiment includes a cam 406 that is coaxial and integral with the spool 374. The cam includes two cammed surfaces that cause an upper food support vessel sensor switch 408 to turn off only when the food support vessel 376 reaches its uppermost position (as shown in FIG. 44), and that cause a lower food support vessel sensor switch 410 to turn off only when food support vessel 376 reaches its lowermost position (as shown in FIG. 46). In an example embodiment, the sensor switches 408 and 410 are mounted on the track member 386. In an example embodiment, the cam 406 can operate reliably because less than one full turn of spool 374 is required to fully raise or fully lower food support vessel 376, thus, in such example embodiment the spool 374 is sized having a circumference that is sized greater than the vertical distance traveled by the food support vessel 376. An enclosure 432 is disposed over, surrounds and protects an upper portion of food support vessel lifting mechanism 378.

Figure 56:
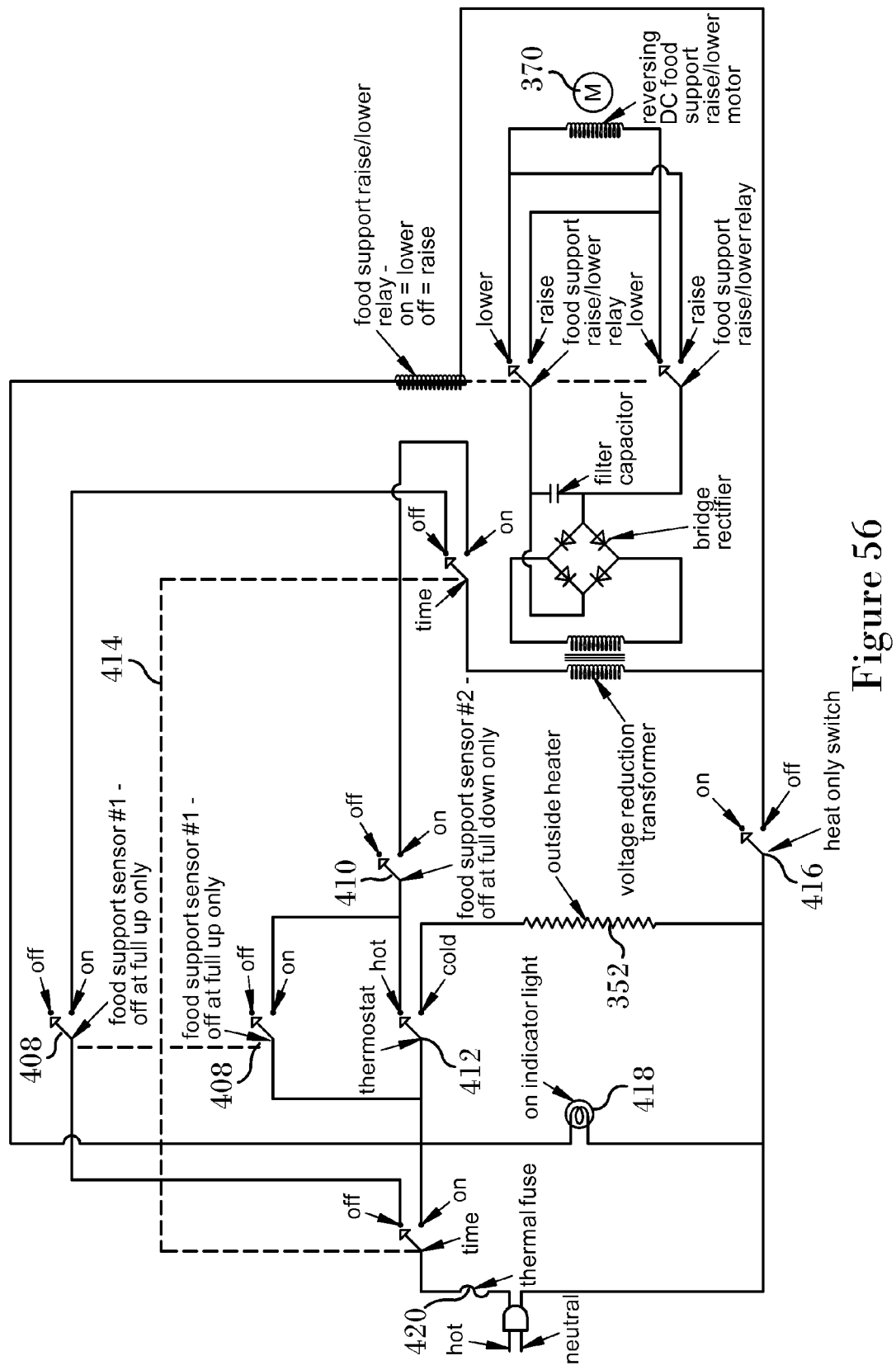
FIG. 56 is a schematic diagram of an electrical system of the fourth preferred embodiment of FIG. 52.

FIG. 56 illustrates a control circuit useful for operating the cooking device of this fourth embodiment in the following manner. In operation, a user places the cooking liquid into the cooking vessel 350, and places the food article to be cooked onto the food support vessel 376, before closing the lid 306 and setting a timer 414 that is configured with combined cooking fluid warm up and cooking times.

The outside heater 352 is activated, and the food support vessel 376 remains in its uppermost position (as shown in FIG. 44) until the thermostat 412 senses that the desired cooking liquid temperature has been reached. Once the cooking liquid temperature has been reached, the thermostat 412 is triggered to activate the motor 370 to lower 382 the food support vessel 376 to its lowermost position (as shown in FIG. 46) where it remains until the timer 414 reaches its user preset time. Once the preset time has been reached, the timer is turned off, causing activation of the motor 370 to raise 380 the food support vessel 376 to its uppermost limit (as shown in FIG. 44) where the food article is allowed to drain of liquids before being removed from the device and served.

The cooking device includes a user operable heater only switch 416 that is mounted with the timer 414 on the outer housing. The heater only switch, when on, only operates the outside heater 353 and does not operate the food support vessel lifting mechanism, thus maintains food article within the cooking device in an uppermost position to permit the food article to be steamed, roasted, or otherwise cooked without being automatically lowered on the food support vessel. For user convenience, the heater only switch 416 still allows for cooking control by timer 414 of the outside heater 352. Additionally, in the heat only mode of operation, foods may be cooked within the cooking vessel 350 without the use of food support vessel simply by removing the food support vessel 376 therefrom.

The cooking device includes a user interface enclosure 428. In an example embodiment, the user interface enclosure 428 is attached to a front portion of the outer housing, and more specifically, is mounted to a front portion of the base portion of the outer housing. The user interface enclosure is configured to accommodate an indicator light 418, the heater only switch 416, and the timer 414. In an example embodiment, the enclosure includes an upwardly angled faceplate that present each of the above-noted control elements in a manner that permits easy user control. Likewise, placement of the enclosure 428 on the outer housing base portion makes use of all controls and viewing of all indicators easier for a user. The foreword upward angled face of enclosure 428 also catches more ambient light, which further increases the visibility of the controls and indicators.

The indicator light 418 notifies the user any time the timer 414 is turned on. As noted above, the heat only switch 416 allows the user to turn off the food lifting mechanism and use the embodiment with food support vessel 376 in its raised position, or use the cooking device without use of the food support vessel 376.

As shown in FIGS. 50 and 52, the fourth embodiment cooking device 301 is also constructed comprising a drain hose 426, which is configured similarly to the above-described cooking device embodiment, to facilitate draining the cooking vessel 350.

Figure 54:
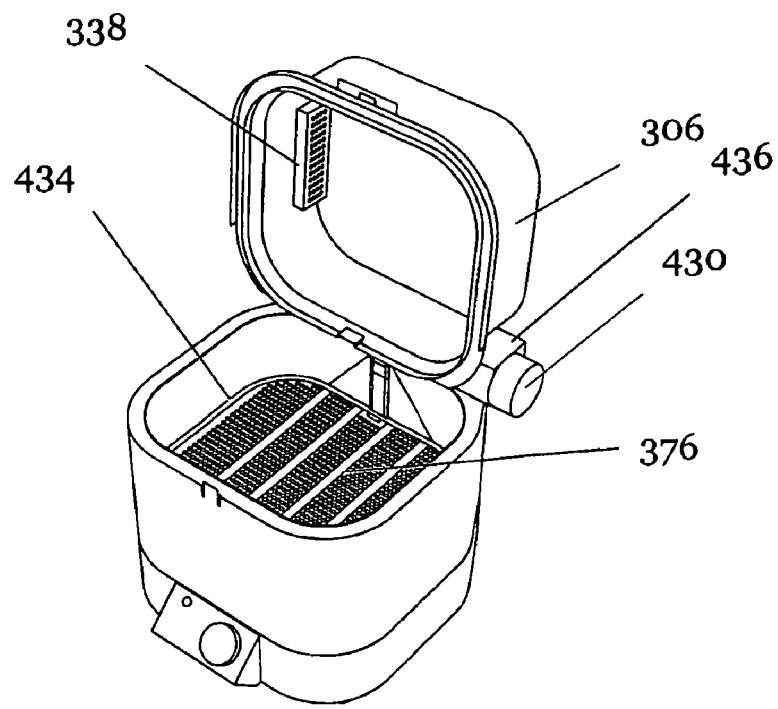
FIG. 54 is a forward upper perspective view of a hand powered version of the fourth preferred embodiment of FIG. 52.
Figure 55:
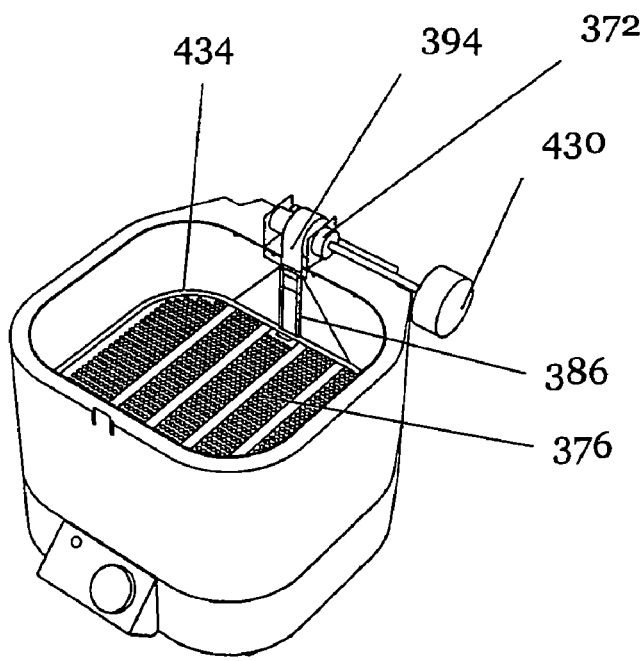
FIG. 55 is a forward upper perspective view of the hand powered version of the fourth preferred embodiment of FIG. 52, with the lid and lift mechanism removed.

FIGS. 54 and 55 illustrate an alternative fourth embodiment cooking device of this invention that is configured to use a manual method, rather than an electrically-powered motor, to raising and lowering the food support vessel. Such alternative embodiment comprises a hand grip knob 430 that is disposed adjacent the outer housing and that is connected to the lifting member 394 to permit the raising and lowering of the food support vessel by turning the knob in opposite directions. FIG. 55 illustrates the hand-powered lift mechanism with a hand-lift mechanism cover 436, and the lid 306 removed.

Each of the cooking device embodiments described above and illustrated in the various figures, depending on the scale at which it is produced, may have the potential to cook both small and large foods, ranging from a few ounces of French fries, to over a 20 pound turkey. Where the cooking device is specifically constructed to accommodate the cooking of larger types of food articles, wire baskets or other similar devices may be used in conjunction with the cooking device of this invention to facilitate cooking smaller foods. Such devices are well known in the art and hence are not illustrated herein. Such devices may also help in steaming, roasting, boiling, or otherwise cooking food articles in the cooking device of this invention.

Any and all of the cooking device embodiments described above and illustrated in the accompanying figures may be constructed in any practical scale. However, it has been found advantageous to make the height of such cooking devices with a lid on in the range of from about 14½ to 16 inches tall overall. This allows enough internal space within the cooking device to cook a 15 to 20 pound turkey and also provides sufficient clearance so that each cooking device embodiment can sit on a standard countertop and clear over-countertop cabinets.

Also it has been found practical for reasons of food cooking capacity and in-kitchen standard countertop space usage, to make each cooking device embodiment in the range of from about 14¼ to 17 inches wide (as measured left to right across the front of the cooking device), and from between about 11 to 15¼ inches deep.

Materials and method used for constructing cooking device embodiments of this invention may imitate those used by many of today's home use deep fat fryers. As an example, and not by way of any limitation, the outer housing can be formed from such materials as plastic, such as polypropylene or ABS. Alternatively, the cooking device outer housing may be constructed from metal, such as painted mild steel or aluminum, or may be constructed from a combination of metals and plastic.

The cooking device cooing vessel or cooking bucket can be formed from such materials as deep drawn aluminum or mild steel, and might be anodized, or coated with an easy-to-clean nonstick surface.

What have been described herein are several example embodiments of cooking devices constructed in accordance with principles of the invention. Those knowledgeable in the art will readily understand that many other cooking device embodiments not specifically described herein may employ the present invention. It is for this reason that the protections afforded by this document shall be limited only by the scope of claims contained herein and their legal equivalents.

Fifth Embodiment

Referring to FIGS. 58 through 61, the exemplary embodiment shown offers economies in manufacture, as well as user safety, design/engineering simplicity, and ease of cleaning and operation.

The exemplary embodiment includes two-piece outer enclosure 502, 504 comprising tubular shaped upper outer enclosure 502 attached to the upper rim of open top box shaped lower outer enclosure 504. Lower outer enclosure 504 includes in its forward right portion control box 522 which contains embodiment controls.

Outer enclosure 502, 504, which generally resembles an open top box, contains within it open top box shaped cooking vessel 506 which has vertically movable food support 508 removeably located within it.

An air gap between outer enclosure 502 504 and cooking vessel 506 helps reduce outer enclosure temperatures for user and countertop safety. An air gap, formed by feet on the bottom of outer enclosure 504, and formed between the bottom of outer enclosure 504 and the countertop on which it rests, also reduces potential damage to countertops from heat.

Cooking liquid within vessel 506 is heated by an external heater attached on the bottom of cooking vessel 506 similar to those shown in earlier exemplary embodiments contained herein (see FIGS. 50 and 53).

Right handle bracket 510 and the left handle bracket 512 provide means for manually lifting and lowering food support platform 514 within cooking vessel 506. Grips 518 and 520 are at the ends of right handle bracket 510 and left handle bracket 512 respectively to provide manual gripping locations and to reduce heat at those locations.

Figure 61:
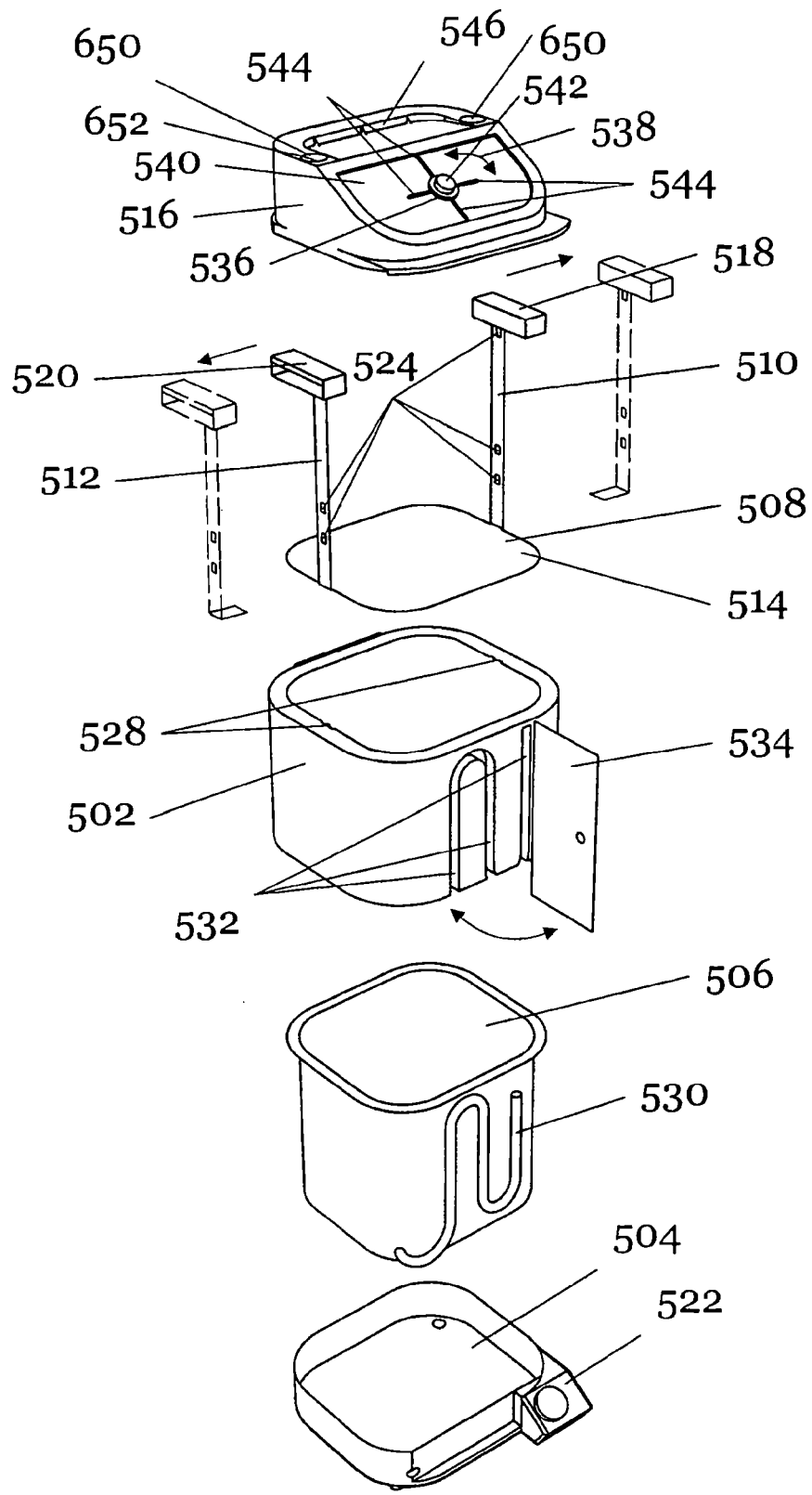
FIG. 61 shows an exploded perspective view of the exemplary embodiment shown in FIGS. 58 through 60.
Figure 62:
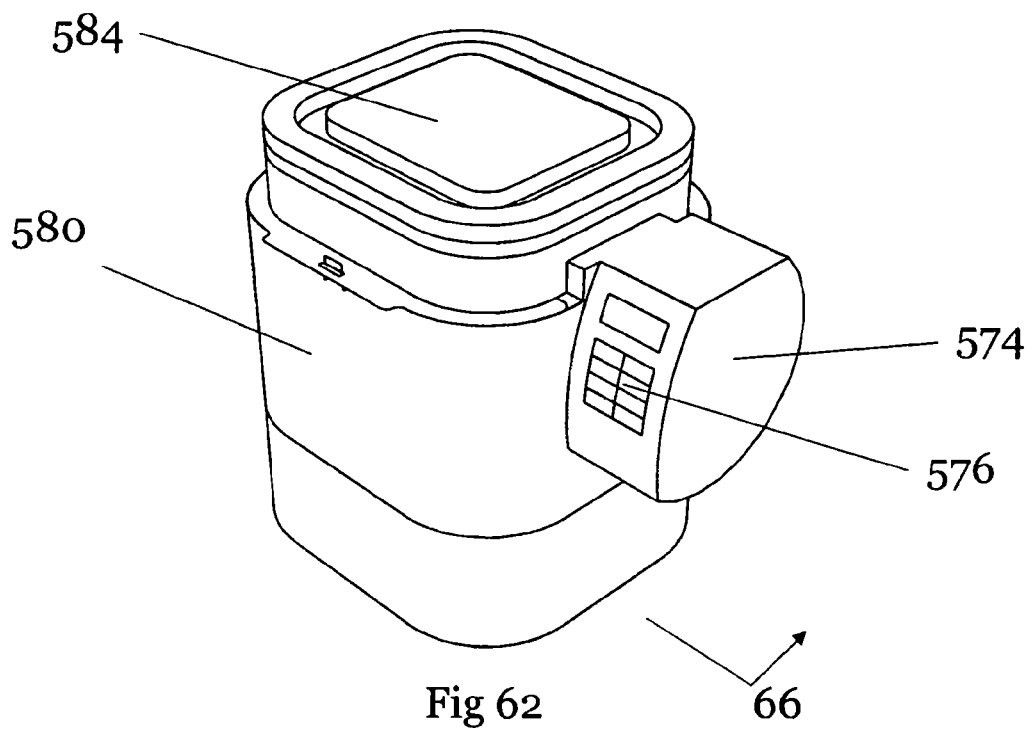
FIG. 62 shows a forward perspective view of another exemplary embodiment of the present inventions.
Figure 63:
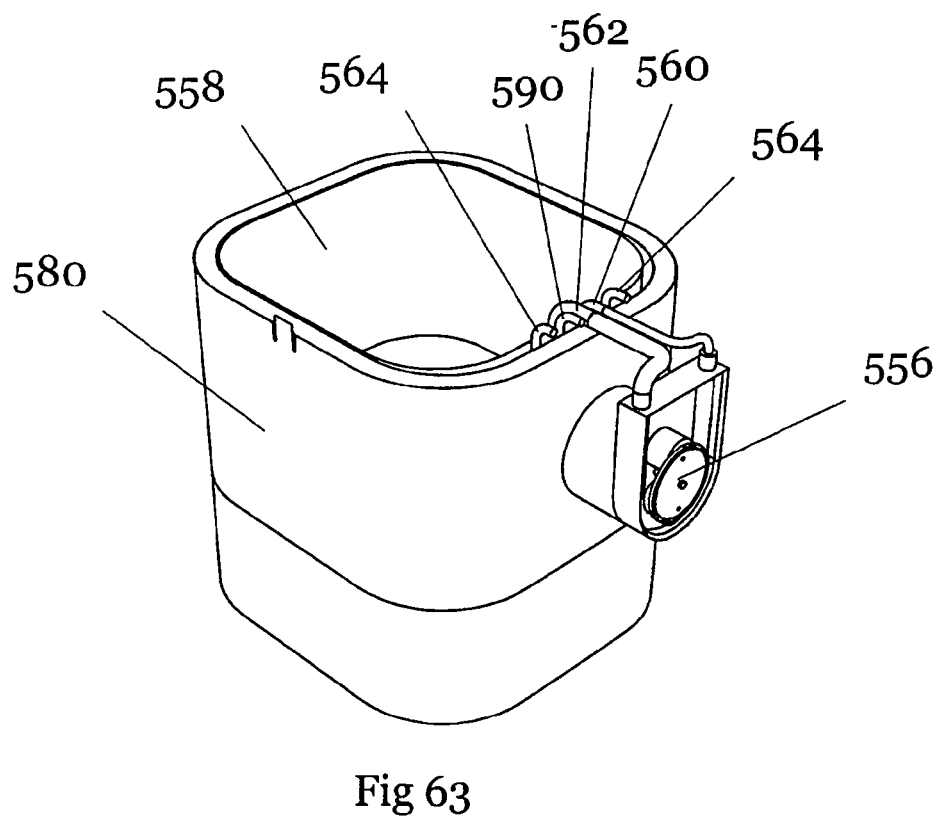
FIG. 63 shows the embodiment illustrated in FIG. 62 with its lid and control box cover removed.
Figure 64:
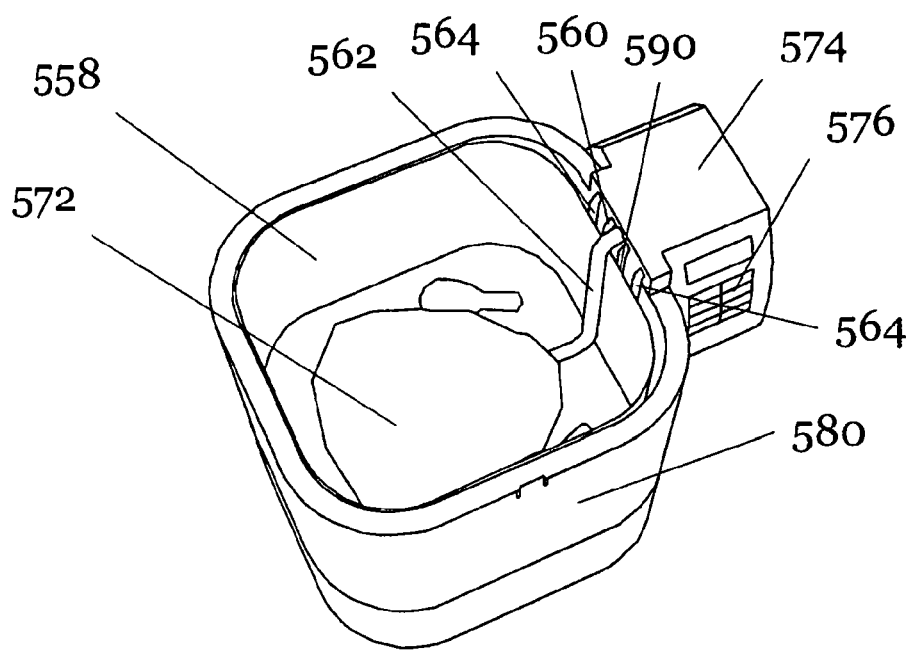
FIG. 64 shows an overhead perspective of the embodiment illustrated in FIGS. 62 and 63 with its lid removed and its food support vessel in its raised floating position.

Right handle bracket 510 and the left handle bracket 512 removeably attach to the right and left sides respectively of food support platform 514, as shown in FIG. 61, to make movable food support 508 more compact and/or less bulky, as an example during shipment, cleaning, and/or storage. The attachment of brackets 510 and 512 to food support platform 514 may be made, as an example, by threaded studs welded to platform 514 passing through holes in brackets 510 and 512 and being capped on the threaded stud ends with wing nuts.

Spaced along the length of both right handle bracket 510 and left handle bracket 512 are holes 524 which engage protrusions 526 and 528 located on the interior upper rim of upper outer enclosure 502. This in turn, by pushing grips 518 and 520 towards each other provides manually controlled engagement at various vertical levels for movable food support 508.

Holes 524 are located to provide: a low cooking position; an intermediate raised position where food can be raised out of hot cooking oil and yet not touch lid 516 when closed; and a fully raised position where food support 508 is raised to its fullest extent for food insertion and removal. This versatility enhances the ease-of-use of the exemplary embodiment.

Similar to earlier exemplary embodiments described herein (see FIGS. 51A, 51B, and 52), lid 516 may be latched in its down position to cap cooking vessel 506, or it may be rested in a vertical open position, or it may be completely removed from cooking vessel 506.

Likewise similar to exemplary embodiments earlier described herein (see FIGS. 49, 50, and 53), drainage tube 530 is flexible and attached to the bottom of cooking vessel 506, and may be dismounted from slots 532 and used to drain cooking vessel 506.

Door 534, when closed, hides all but a left-hand section of drainage tube 530 (see FIGS. 58 and 59) and prevents drainage tube 530 from being accidentally dismounted from slots 532. Thus door 534 provides both aesthetic features, by hiding most of drainage tube 530, and provides safety features, by preventing drainage tube 530 from being accidentally dismounted where it might accidentally spill hot or cold cooking liquid.

Flexible drainage tube 530 may be translucent or transparent. This in combination with allowing a portion of drainage tube 530 to be visible with door 534 closed allows drainage tube 530 to be used as an accurate indicator of liquid levels within cooking vessel 506 because the liquid level within drainage tube 530 is the same as the liquid level within cooking vessel 506. This provides an accurate, simple, and inexpensive liquid level gauge for cooking vessel 506. For added safety, a removable plug, similar to that shown in FIGS. 30, 49, 50, and 53, may be placed on the end of drainage tube 530, however an air hole must be present in the plug if drainage tube 530 is to be used to measure the liquid level in cooking vessel 506.

Wiper blades 544 are located on the interior of glass 540, and may be rotated 538, using knob 542, which is located on the exterior of glass 540, to clear condensation or other debris from the interior of glass 540 so that the contents of cooking vessel 506 may be more easily viewed when condensation or other debris is present on glass 540.

Wiper 536 has wiper blades 544 integrally connect to one end of an axle which penetrates through a hole in glass 540. Attached solidly on the other end of the axle and located on the exterior side of glass 540, is knob 542. Wiper blades 544 contact the interior surfaces of glass 540 and wipe condensation and/or debris from those surfaces when knob 542 is rotated. This device works similar to windshield wipers on a car.

Glass 540 is forward inclined to both reduce condensation and other debris build up on its interior during cooking, and to help in viewing the contents of cooking vessel 506 during the cooking process by providing a more natural viewing angle and by allowing substantial amounts of ambient light into the cooking area of the exemplary embodiment.

Vents 546 exit cooking exhaust forward during the cooking process and help prevent over counter cabinet damage by directing cooking exhaust away from such cabinets. Vents 546 may be backed by one or more filters (not shown) to reduce odors and pollution exiting from the exemplary embodiment. Vents 546 are located high and back, away from positions a user would normally touch, thus helping to prevent user injuries from hot cooking exhaust.

Frustum conical depressions 650 each have holes 652 penetrating their bases to allow insertion of long stem cooking thermometers 654 or other sensing devices through holes 652 and thus through lid 516 without opening lid 516. This advantageously allows heat measurement of cooking liquid without having to open lid 516. By having transparent glass 542 to view where foods being cooked within the exemplary embodiment might be pierced to measure their temperatures, and by using a cooking thermometer or other temperature sensing device with a rod type probe with a food piercing tip to pass through holes 652, foods being cooked may also be temperature measured without opening lid 516. Not having to open the lid 516 to take cooking liquid or food temperature measurements helps improve both embodiment usability and safety.

One example of a cooking process using the embodiment is as follows. The user partially fills cooking vessel 506 with cooking oil using direct observation and/or viewing drainage tube 532 to fill vessel 506 to the proper level. It has been found that to deep fry a 9 pound to 25 pound turkey, 2½ gallons to 6 gallons of cooking oil is most advantageously used.

Either before or after this, movable food support 508 is inserted into cooking vessel 506 and raised to its uppermost position where it is held by protrusions 526 and 528 engaging holes 524. Here food is placed on food support 508, food support 508 is lowered to its intermediate position where it is above the cooking liquid but still low enough that lid 516 can be lowered without hitting the food. Lid 516 is then latched down in its cooking vessel 506 capping position.

Using the controls contained in control box 522, the user turns on the heat and warms the oil to cooking temperature. A timer or heat sensing mechanism within control box 522 may sound an alarm to alert the user when the oil has reached cooking temperature.

Once oil cooking temperature has been obtained, using handle brackets 510 and 512, the user presses grips 518 and 520 towards each other which disengages holes 524 from protrusions 526 and 528 and allows food support 508 and the food resting on it to be lowered into the hot cooking oil where they remain until the cooking process is complete.

Once cooking is complete, the user reverses the above process, and raises movable food support 508 and the food on it from the hot cooking oil and latches them in the intermediate position, away from the hot oil, where the food can drain and cool.

After this, the user opens lid 516 and removes the food. Oil may be drained from cooking vessel 506 by opening door 534 and placing the dismounted end of flexible drainage tube 530 into a storage or disposal container and then lowering the container to below the bottom of cooking vessel 506 for drainage.

Food support 508 may be removed and possibly disassembled for cleaning in a dishwasher or sink. Nonstick coating may be used on the exterior surfaces of food support 508 and cooking vessel 506 to help in the cleaning process. Lid 516 may also be washed in a dishwasher or sink. For storage, food support 508 may be placed back within cooking vessel 506 and lid 516 turned upside down and nested into the top of cooking vessel 506 (analogous to the lid inversion shown in FIGS. 43 through 46).

This exemplary embodiment may be constructed at any advantageous size and in any advantageous proportions. To deep fat fry a 9 to 20 pound turkey, the most common turkey sizes available in the United States, it has been found that cooking vessel 506 should be between 9 inches and 14 inches in depth, 9 inches and 15 inches in width, and between 9 inches and 14 inches in height.

Various materials may be used to construct the embodiment including, by way of example only, metal: such as mild steel, stainless steel, or aluminum, each possibly coated with nonstick or plated with chromium or nickel; may be used to construct cooking vessel 506 and food support 508. Plastics; such as polypropylene, polycarbonate, SAN, Melamine, Bakelite, or ABS, may be used to construct outer enclosure 502 504 and lid 516. Lid 516 may be constructed from translucent materials, including, by example only: polypropylene, polycarbonate, or SAN, to advantageously allow in more ambient light to cooking vessel 506 to make viewing its contents easier.

Sixth Embodiment

Referring to FIGS. 62 to 69, another exemplary embodiment of the present inventions is illustrated.

This embodiment offers: economies in manufacture; design/engineering simplicity; safety; and ease of use and cleaning.

Generally described, this embodiment has inner bucket shaped food support vessel 558 nested within outer bucket shaped cooking vessel 554, with bidirectional pump 556 moving cooking liquid between the inner and outer bucket shaped vessels. Heater 564 is located inside and near the bottom of outer cooking vessel 554 and outside of inner food support vessel 558.

Figure 68:
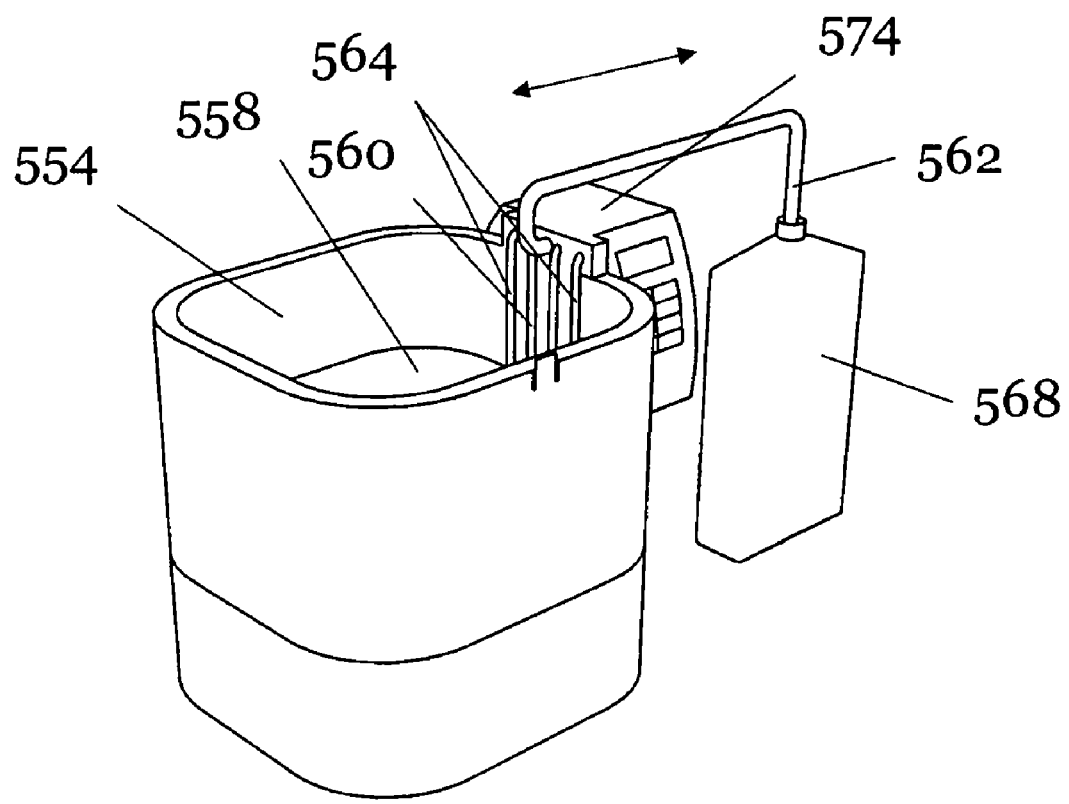
FIG. 68 is a forward perspective view of the exemplary embodiment shown in FIGS. 62 through 67 showing how the embodiment would look when draining or filling the cooking vessel with cooking liquid from an external container.
Figure 69:
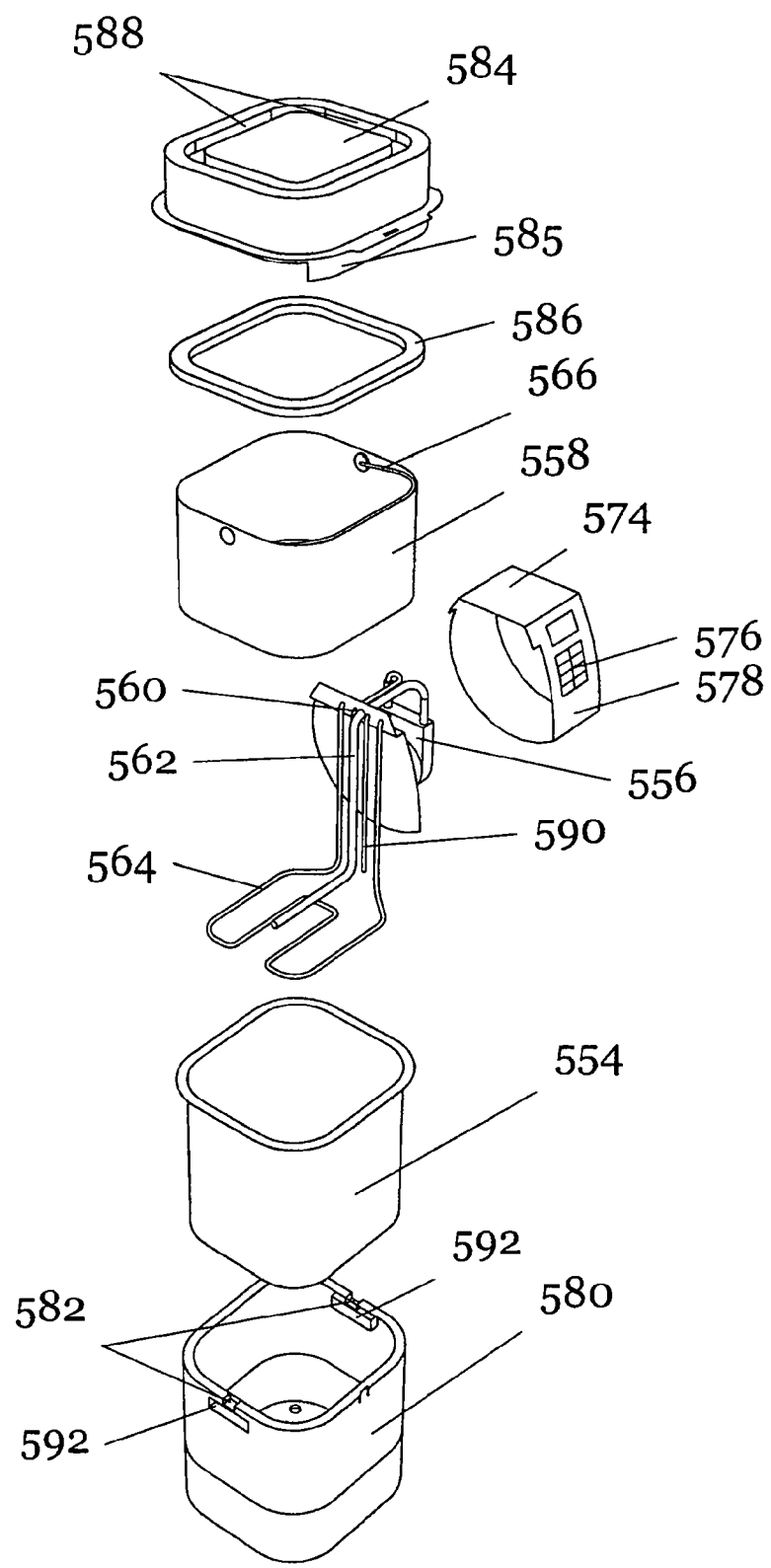
FIG. 69 is an exploded perspective view of the embodiment shown in FIGS. 62 through 68.
Figure 70:
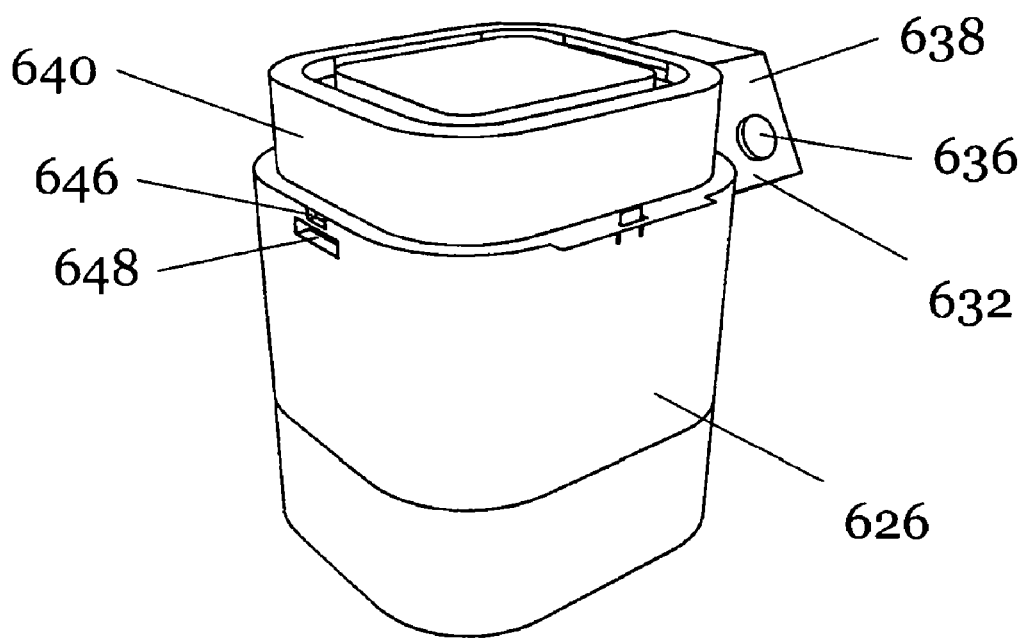
FIG. 70 is a forward perspective view of another exemplary embodiment of the present inventions.

At the start of an exemplary cooking process, inner cooking vessel 554 contains food to be cooked but no cooking liquid, and it floats on cooking liquid 570 which has been added by a user into outer vessel 554 either by pouring the cooking liquid directly into outer vessel 554, or by using bidirectional pump 556, as shown in FIG. 68. The user also places one end of flexible tube 562 into inner support vessel 558.

Once heater 564 raises the cooking liquid in outer cooking vessel 554 to cooking temperature as determined by a sensor, a logic mechanism triggers bidirectional pump 556 to move the liquid through tube 560, which has one end open near the floor of cooking vessel 554, into cooking vessel 554 through flexible tube 562 which has an open end user placed into the bottom of inner food support vessel 558.

This removes most, but not all, of the hot cooking liquid 570 from outer cooking vessel 554, and moves it into food support vessel 558, where hot cooking liquid 570 partially fills vessel 554, and immerses any food 572 contained within it with hot cooking liquid 570.

Figure 65:
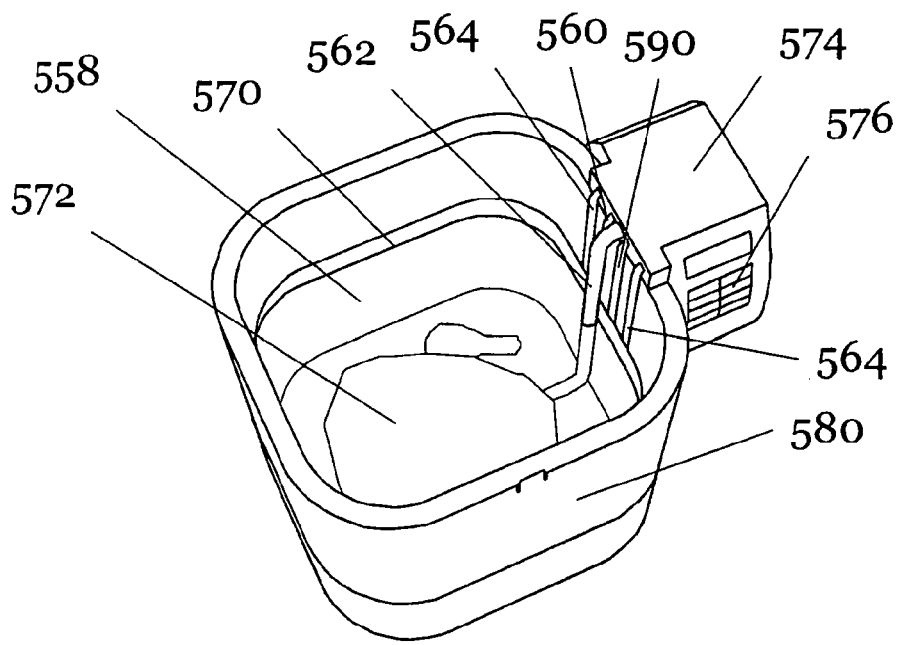
FIG. 65 is identical to FIG. 64 except showing the food support vessel mostly filled with cooking liquid and in its lowered cooking position.
Figure 66:
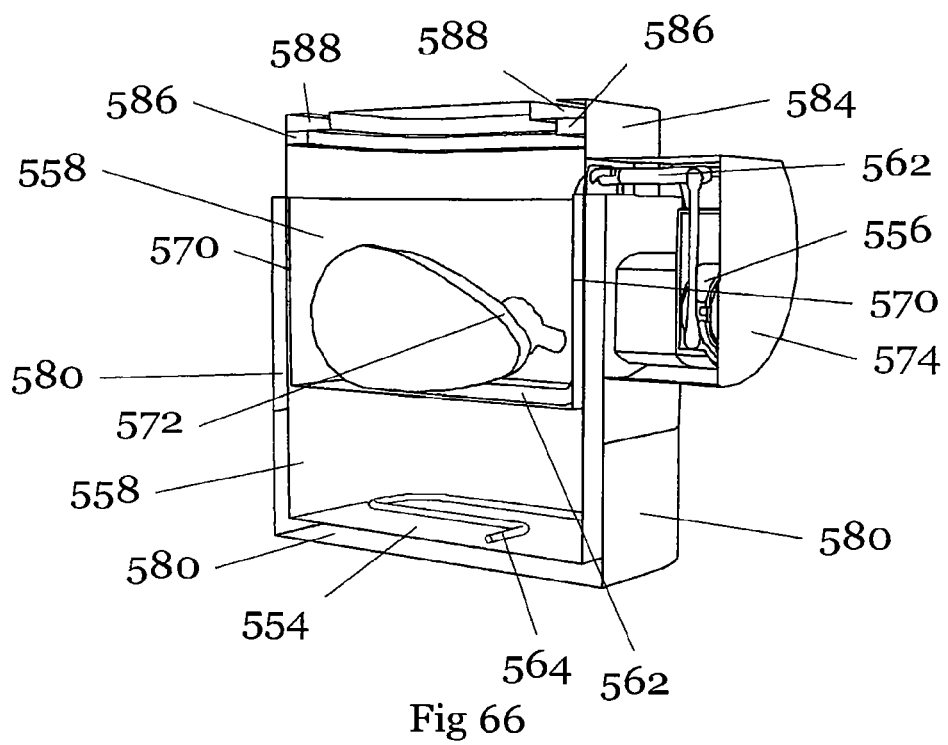
FIG. 66 is a section perspective view of the embodiment shown in FIG. 62 as indicated in FIG. 62, with cooking liquid filled into outer bucket shaped cooking vessel 554 which in turn floats upward inner food support vessel 558.
Figure 67:
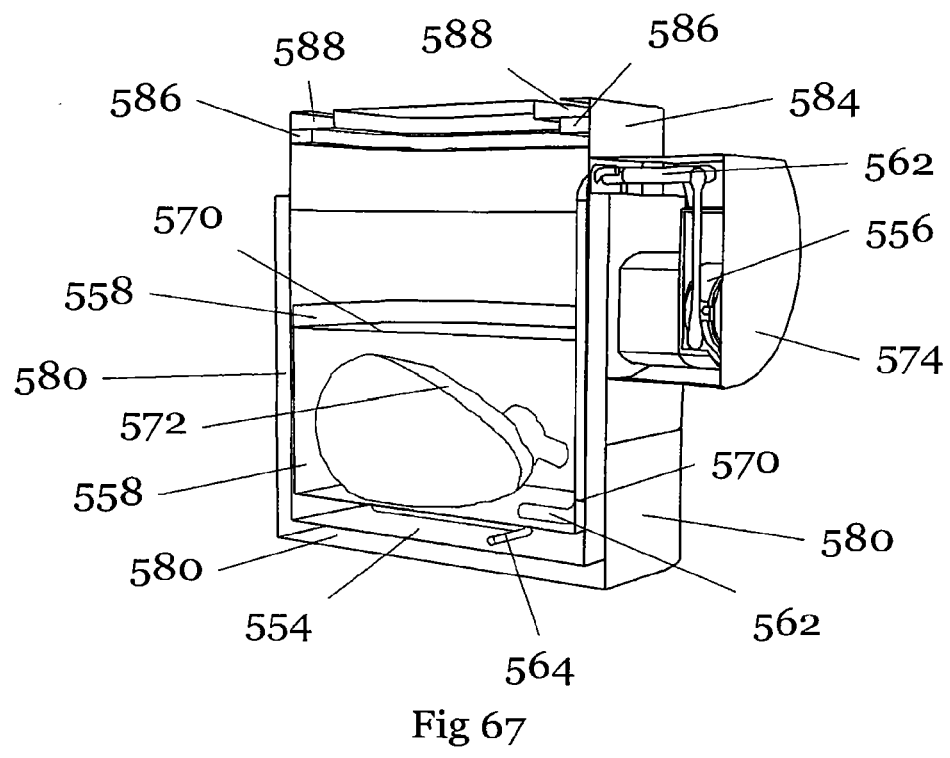
FIG. 67 is identical to FIG. 66 except showing the food support vessel mostly filled with cooking liquid and thus in its lowered cooking position.

This hot cooking liquid movement causes outer cooking vessel 554 to no longer contain substantial liquid, and causes inner food support vessel 558 to be partially or mostly filled with cooking liquid (see FIGS. 65 and 67). This in turn results in inner food support vessel 558 sinking to near the bottom of outer cooking vessel 554 as shown in FIGS. 65 and 67. The reduced amounts of cooking liquid still left in outer cooking vessel 554 convey heat from heater 564 to the cooking liquid contained in inner food support vessel 558.

The amount of cooking liquid left within cooking vessel 554 is precisely determined by how high the open end of tube 560 is above the floor of cooking vessel 554. Further, this height adjustment of tube 560 may be made to be user controlled by the user simply sliding tube 560 up or down. This, by sliding tube 560 to its fullest downward extent, may also help in more completely draining cooking liquid from outer cooking vessel 554 in the cooking vessel draining operation explained below.

Alternatively, the amount of cooking liquid moved between cooking vessel 554 and food support vessel 558 may be controlled by a timer mechanism or a flow measuring device.

Upon food contained in food support vessel 558 being immersed in hot cooking liquid by the aforementioned hot cooking liquid movement, cooking commences. The duration of this cooking may be determined by a control timer. Alternatively, in combination or as a separate alternative, food temperature, as determined by a probe inserted into the food might be used to time the cooking process.

After the cooking process is complete, the above process is reversed, with bidirectional pump 556 moving cooking liquid from inner food support vessel 558 into outer cooking vessel 554 through tubes 562 and 560. This again causes inner food support vessel 558 to float upward on liquid contained in outer cooking vessel 554 (see FIGS. 64 and 66).

Because inner food support vessel 558 no longer contains substantial amounts of cooking liquid, food within it may cool and drain. The cooling and draining time may be measured by an integrated timing mechanism with an alarm. Once the food cooling and draining is complete, food is removed and may be served.

The amount of hot cooking liquid used during any cooking process may vary depending on the quantity and type of food being cooked. In certain circumstances the amount of cooking liquid present may not be sufficient to float inner food support 558, and therefore no upward or downward movement of food support 558 will occur even though cooking liquid is being pumped between outer cooking vessel 554 and inner food support vessel 558.

The removal of food from the exemplary embodiment may be accomplished by removing the food from within inner foods support vessel 558 while it is still nested within outer cooking vessel 554, or alternatively, inner food support vessel 558 may be removed from outer cooking vessel 554, possibly using bucket handle 566 to assist, before food is removed from inner food support vessel 558.

Bucket handle 566 is mounted to the top rim of food support vessel 558 to help in removing it, and possibly food contained within it, from within cooking vessel 554.

As illustrated in FIG. 68, flexible tube 562 may be removed from within cooking vessel 554 and placed into cooking liquid container 568. Here bidirectional pump 556 may move cooking liquid either out of liquid container 568 into cooking vessel 554 to fill it in preparation for cooking; or move cooking liquid from cooking vessel 554 into cooking liquid container 568 to empty cooking vessel 554 and either store or dispose of the cooking liquid.

Bidirectional pump 556 may comprise one or more pumps of any suitable type. As examples; it may be a pair of piston pumps, or a pair of diaphragm pumps, or a peristaltic pump (as illustrated), or a gear pump, or any other suitable pump or pumps.

The peristaltic pump illustrated has two rollers which successively crush a resilient hose around a semi circular track. This pump has advantages of being: self priming, able to contain hot liquids, and bidirectional.

One or more filters may be placed between the ends of tube 560 and flexible tube 562 to help cleanse the cooking liquid during the pumping process and therefore extend the liquid's useful life.

Control box 574, including attached devices: bidirectional pump 556, flexible tube 562, heater 564, tube 560, controls 576, heat sensing tube 590, and control box cover 578, are removeably attached over the overlapping upper right hand edges of outer cooking vessel 554 and outer enclosure 580.

Removal of control box 574 from outer cooking vessel 554 and outer enclosure 580 is accomplished by the user simply lifting control box 574 vertically.

Once control box 574 is separated from outer cooking vessel 554 and outer enclosure 580, outer cooking vessel 554 may be lifted and separated from outer enclosure 580. This separation may make embodiment cleaning or other operations easier. Finger detents 582 in the upper rim of outer enclosure 580 may help in the removal of outer cooking vessel 554 from outer enclosure 580 by allowing room for fingertips to get under the upper rim of cooking vessel 554.

Lid 584 may be mounted to outer enclosure 580 and outer cooking vessel 554 in a manner similar to earlier embodiments described earlier herein (see FIG. 51, and FIGS. 51a and 51b). This affords advantages of: being latched closed onto outer cooking vessel 554, being opened in a near vertical position, and being able to be fully removed.

Like the exemplary embodiment direct the above, lid 584 may contain holes similar to those identified as 652 for use in introducing a cooking thermometer into the interior of cooking vessel 554 without having to open or remove lid 584.

Lid 584 may be constructed mostly or entirely of transparent or translucent material to aid in viewing of foods being cooked in the embodiment and to help in placement into foods within the embodiment of heat sensing probes introduced through holes in lid 584 which may be present and may be similar to those identified as 652 in the previous exemplary embodiment.

Alternatively, lid 584 may be constructed mostly or entirely of opaque material.

Steam guard rib 585 extends downward from the forward lower portion of lid 584 and helps protect the user from hot steam when lid 584 is being raised.

Filter 586 fits within the top of lid 584 and filters odors, grease and other pollutants from the exhausts of the cooking operations. These exhausts exit through inward facing annular vents 588 which are adjacent to, and are surrounded by, the outer upper perimeter of lid 584.

Heat sensing tube 590 may contain thermostats, thermal sensors, and/or thermal fuses any or all of which may be used in the control mechanism.

Handles 592, located on either side of outer enclosure 580 may aid in transporting the embodiment.

Seventh Embodiment

FIGS. 70 to 73 show an additional exemplary embodiment. This embodiment uses the rotation of parallel swing arms 596 616 to raise 606 and lower 608 a horizontal food support platform 610.

This embodiment offers: economies in manufacture; design/engineering simplicity; safety; and ease of use and cleaning.

In the embodiment, lever 594 is rigidly attached to upper swing arm 596 along rotational axis 598 of swing arm 596.

Connecting rod 600 links to crank disk 602 in such a manner as to pull 612 and push 614 the upper extent of lever 594 as crank disk 602 rotates 604 and thus pulls 612 and pushes 614 on connecting rod 600.

Figure 71:
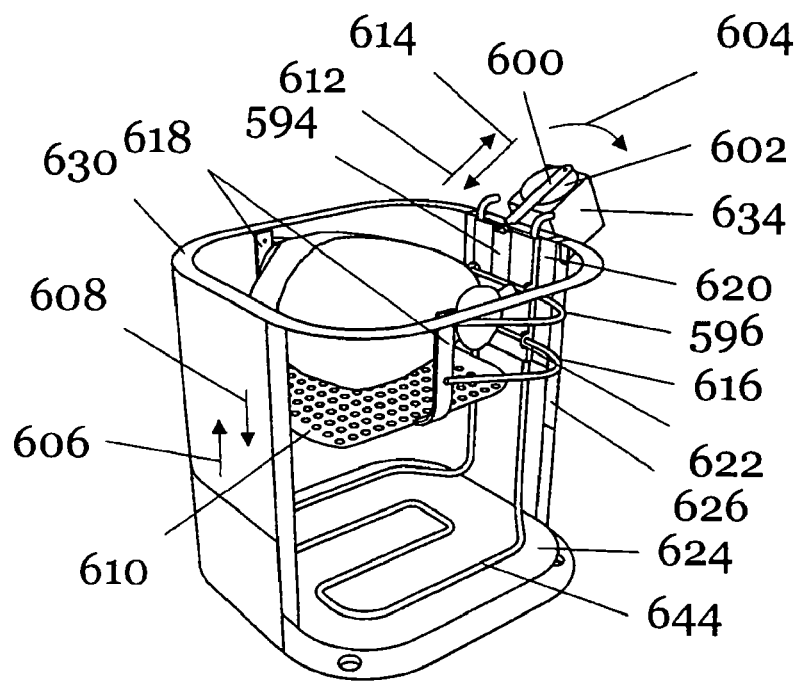
FIG. 71 is identical to FIG. 70 except the exemplary embodiment has its lid and control box cover removed and portions of the forward walls of both the inner cooking vessel as well as the outer enclosure have been removed. The food support platform is in its raised food loading/unloading position.
Figure 72:
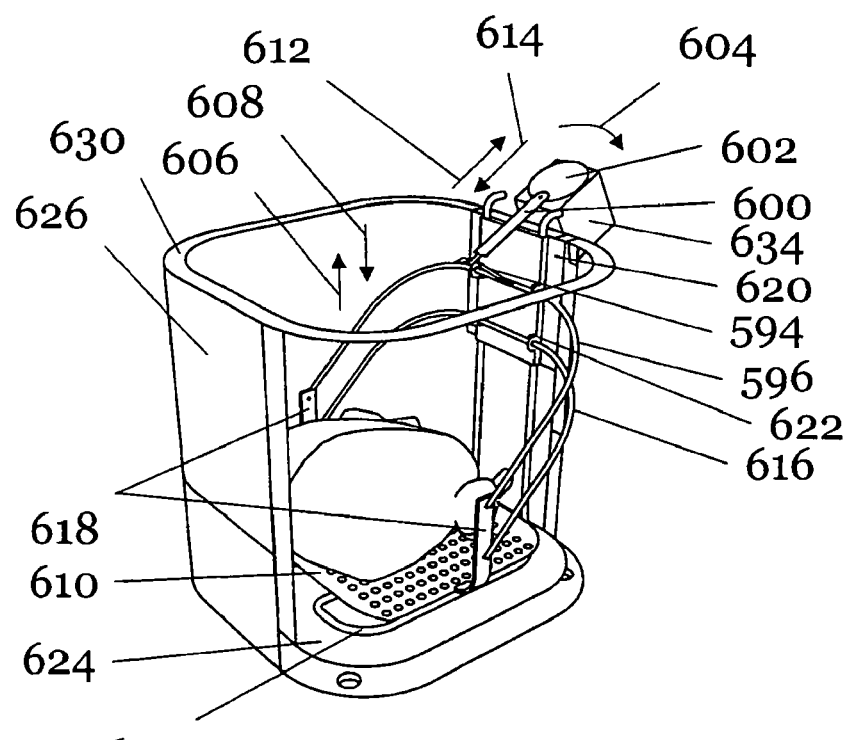
FIG. 72 is identical to FIG. 71 except that it shows the food support platform in its lowered cooking position.
Figure 73:
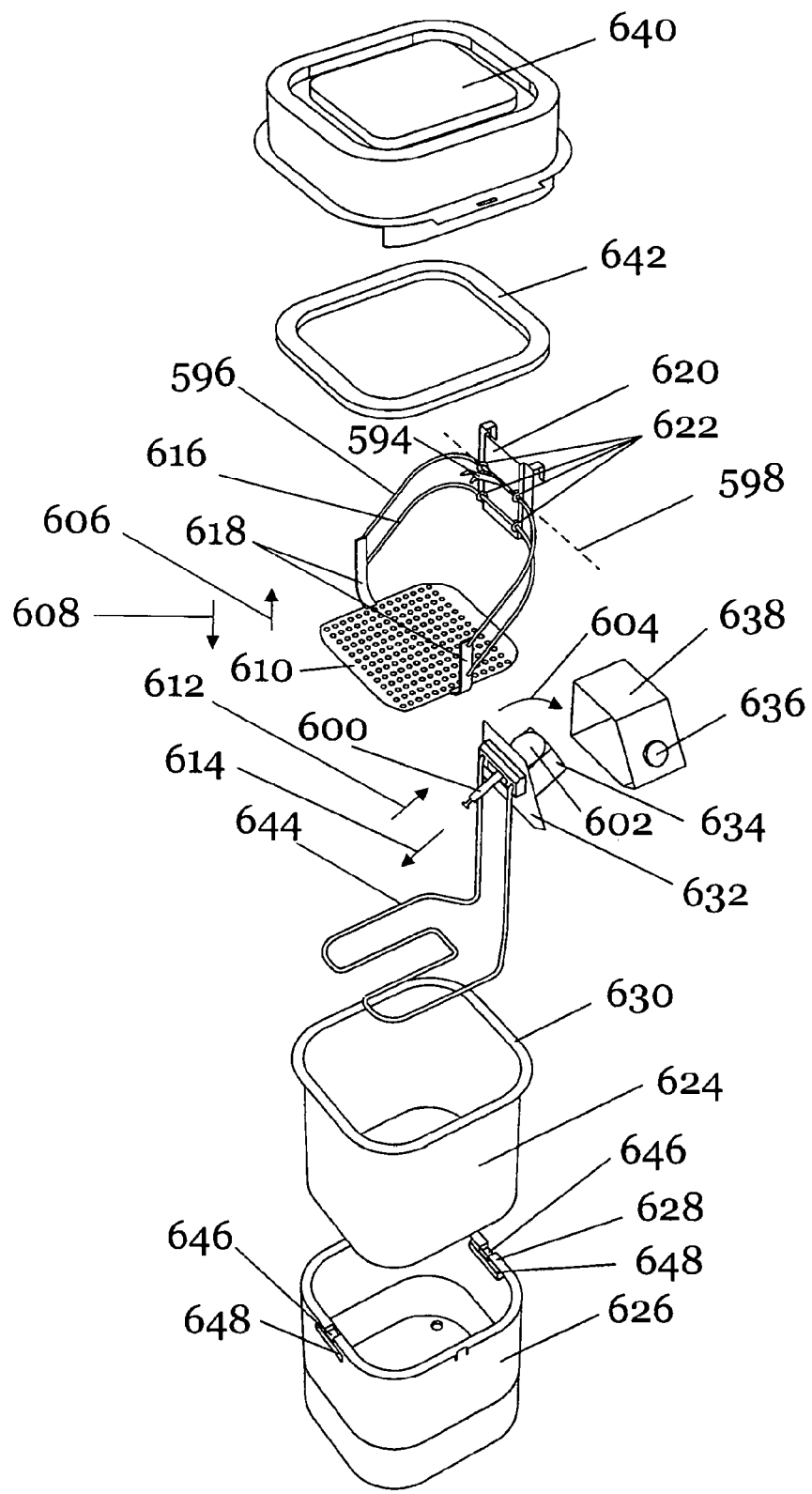
FIG. 73 is an exploded perspective view of the exemplary embodiment shown in FIGS. 70 through 72.

Crank disk 602 rotation 604 results in lever 594 being pulled 612 and pushed 614 by connecting rod 600 in such a manner as to cause swing arm 596 to rotate on axis 598 and thus raise 606 and lower 608 food support platform 610 between respectively food support platform 610's raised food loading and unloading position (FIG. 71) and lowered food cooking position (FIG. 72).

Lower parallel swing arm 616 rotationally connects to both vertical food support members 618 which are in turn attached to the floor of food support platforms 610, and lower parallel swing arms 616, along with upper swing arms 596 which also rotationally connect to both vertical support members 618, forming two parallelograms which keep food support 610 horizontal while it raises 606 and lowers 608.

Both lower swing arm 616 and upper swing arm 596 rotate at their respective bases from pivots 622 extending from food support mounting bracket 620. Food support mounting bracket 620 is essentially an inverted "U" in cross-section and mounts on outer enclosure 626 by straddling flange 630 which extends outward from the upper rim of cooking vessel 624, and by simultaneously straddling flange 628 which extends inward from the upper rim of outer enclosure 626 as illustrated in FIGS. 71 and 72.

Cooking vessels 624 nests inside of outer enclosure 626, with its flange 630 resting on top of outer enclosure 626 flange 628, but below food support mounting bracket 620 which straddles both flange 630 of cooking vessels 624 and flange 628 of outer enclosure 626.

Control box 632 also mounts to outer enclosure 626 by straddling flanges 628 and 630. Control box 632 contains crank disk drive motor 634 which powers crank disk 602 to rotate 604. Control box 632 also encloses: crank disk 602, part of connecting rod 600 as well as embodiment controls 636.

Rigidly attached to control box 632 is heating element 644 which extends downward into cooking vessel 624 when control box 632 is mounted and is straddling flanges 628 and 630.

Control box cover 638 encloses control box 632.

Lid 640 and filter 642 are similar in construction and function to lid 584 and filter 586 described herein for an earlier exemplary embodiment.

In operation, cooking vessel 624 is dropped into outer enclosure 626 and rests with flange 630 on top of flange 628. Control box 632 is then mounted over flanges 630 and 628 by dropping it in place.

Cooking liquid may then be poured into cooking vessel 624.

Food support platform 610 is next mounted into cooking vessels 624 by lowering it into place with food support mounting bracket 620 straddling flanges 630 and 628 and contacting the inside of the right side wall of cooking vessel 624 and the outside of the right side wall of outer enclosure 626.

Food support platform 610 is then manually raised 606 so that connecting rod 600 may be coupled to lever 594.

Food is next placed on top of food support platform 610. Lid 640 is then latched down to enclose cooking vessel 624.

Embodiment controls 636 are then activated causing heating element 644 to warm the cooking liquid.

Once the cooking liquid has reached cooking temperature, a heat sensor triggers embodiment controls 636 to cause crank disk motor 634 to rotate 604, which in turn causes crank disk 602 to rotate 604 and push 614 on connecting rod 600, which then results in lever 594 rotating upper swing arm 596 on axis 598 which in turn causes food support platform 610 to lower 608 to its food cooking position (FIG. 72).

Once the food is in its food cooking position (FIG. 72), cooking commences. Determination of cooking time may be done by a timer mechanism, or by other means such as, for example, a sensor placed within the food.

After cooking time is complete, as determined by time or other means, embodiment controls cause the above process to be reversed, with cranked disk motor 634 being rotated 604 causing attached crank disk 602 to rotate 604 thus pulling 612 connecting rod 600 which rotates lever 594 causing upper swing arm 596 to raise 606 food support platform 610 to its food loading and unloading position (FIG. 71).

Crank disk 602 may have one or more cams on its underside (analogous to the cam shown on FIG. 11) which may activate sensing switches which tell embodiment controls 636 when food support platform 610 is in its food loading and unloading position (FIG. 71), or in its food cooking position (FIG. 72).

Eighth Embodiment

FIGS. 74 to 88 show an additional exemplary embodiment. This embodiment uses right handle member 700 and left handle member 702 to manually raise and lower food support platform 704 within cooking vessel 714 (FIG. 89).

This embodiment offers: economies in manufacture; design/engineering simplicity; safety; and ease of use and cleaning.

Referring in general to FIGS. 74 through 88, and with particular attention to FIG. 80, this embodiment 706 is constructed as follows.

Lower outer enclosure 708 and upper outer enclosure 710 couple together to form outer enclosure 712.

Cooking vessel 714 drops into, and is mounted within, outer enclosure 712. This operation may be done by manually lowering cooking vessel 714 into outer enclosure 712. The tops of left handle track 722 and right handle track 724 undercut the upper horizontal rim of cooking vessel of 714 and provide finger holds to make manually lower cooking vessel 714 into our enclosure 712 easier. Mounting may be done using gravity, or by using other mechanical means such as: latches, magnets, mechanical engagement mechanisms, or other means.

After performing this assembly, heating and control unit 716 is manually lowered toward, and is mounted onto, forward right corner 718 of the assembly comprised of cooking vessel 714 and outer enclosure 712. By having cooking vessel 714 easily mountable and dismountable from our enclosure 712, cleaning and other operations are made easier.

Heating and control unit 760 has within it controls. These controls may be similar to control units described earlier in this document for other embodiments, including those controls which lower food into cooking liquid once the cooking liquid has reached cooking temperature, and controls which lift food from cooking liquid at a user set time 776 interval.

Heating and control unit 760 also is integrally attached to heat coil 748. A thermostatic sensor and a thermal fusing device are also attached to heating and control unit 760.

Controls may include a user adjusted temperature setting mechanism for controlling cooking liquid temperature, or the embodiment may use a single factory set cooking temperature, such as 400° F. cooking oil temperature for deep fat frying.

Food support platform 704, including attached right handle member 700, and attached left handle member 702 may then be lowered into cooking vessel 714 and mounted (FIG. 89). During this operation, left outer arm 734 of left handle member 702 is mounted within left handled track 722, and right outer arm 736 of right handle member 700 is mounted within right handle track 724 which, through arm members 734 and 736 sliding within handle tracks 722 and 724, allows food support platform 704 to vertically move within cooking vessel 714.

Figure 85:
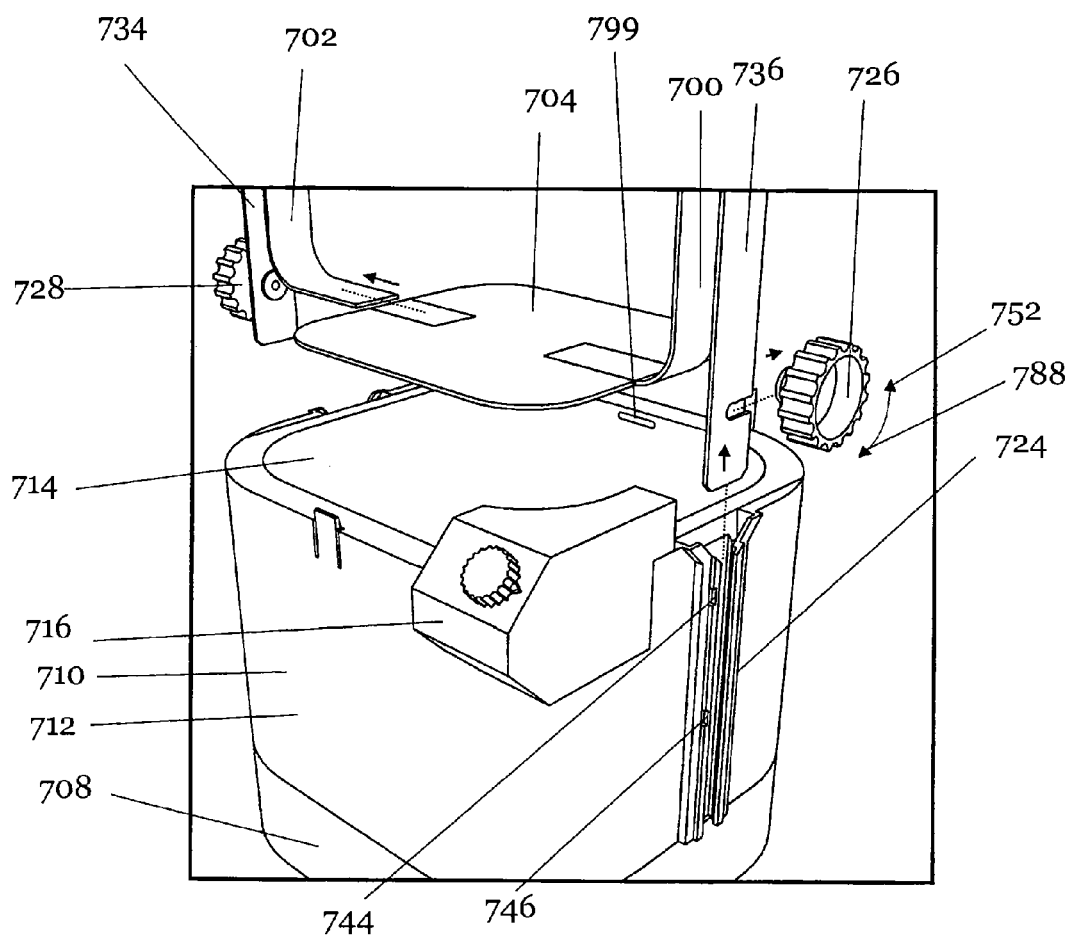
FIG. 85 is a forward perspective you have a portion of embodiment of a 06 with partial explosions of food support platform 704.
Figure 86:
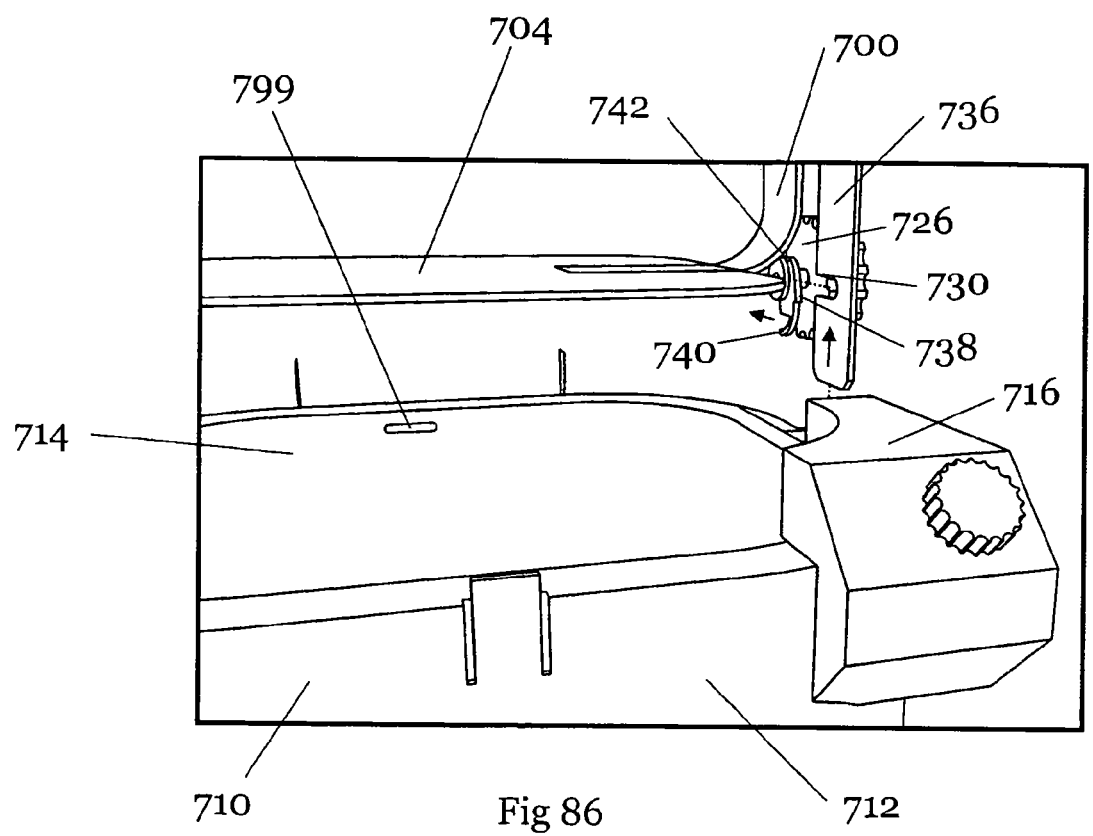
FIG. 86 is a forward perspective view of embodiment 706 with food support platform 704 removed and partially exploded.
Figure 87:
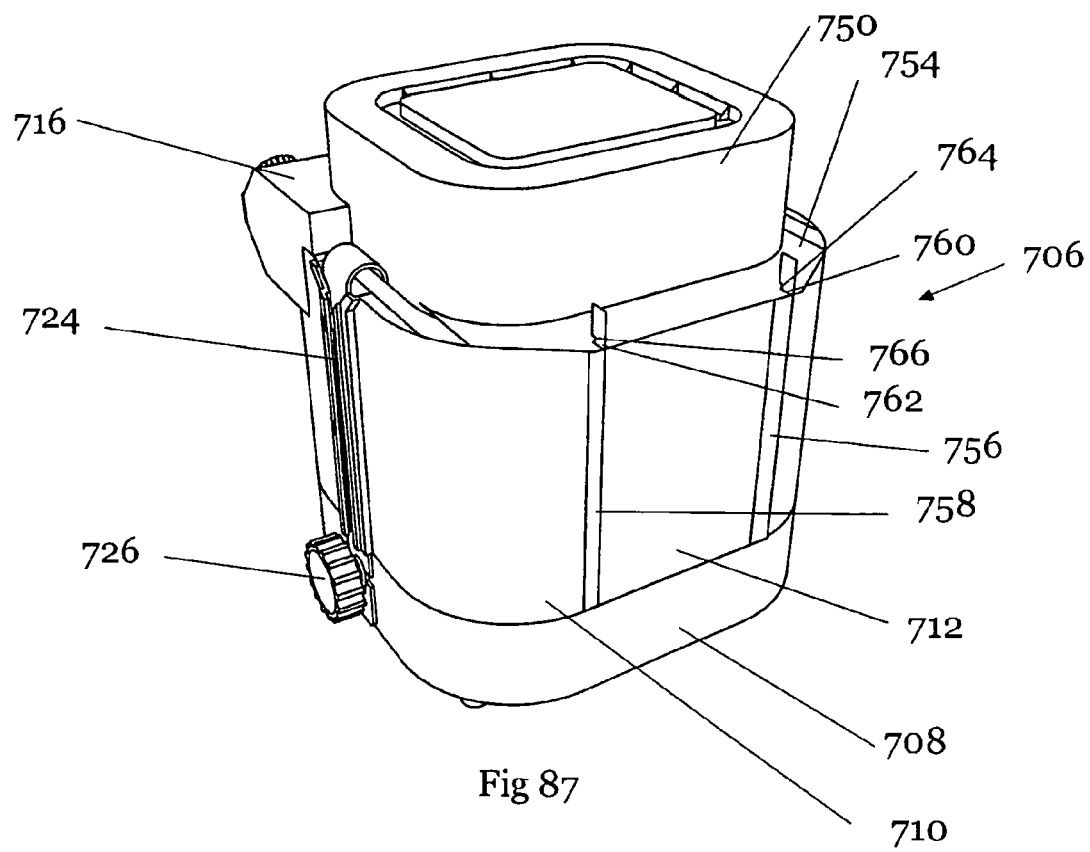
FIG. 87 is a rear perspective view of embodiment 706 with lid 750 closed and food support platform 704 in its lowermost cooking position.

Using right annular trough 742, right handle knob 726 snaps into limited rotational engagement within right knob mounting slot 730 which is located at the base of right outer arm 736 (FIG. 86). Likewise, left handle knob 728 is engaged within left knob mounting slot 732 (see FIGS. 80, 85 and 86).

Referring to FIG. 86, located on right handle knob 726, and directly adjacent and outward of right annular trough 742, are right latch spring 740 and right latching paw 738. Right latching spring 740 rotationally biases 788 right latching paw 738 into engagement with upper right latch receptacle 744, and alternatively, with right lower latch receptacle 746 (FIGS. 85 and 86) when right handle member 700 is mounted within right handle track 724.

The above handle mechanism is mirror imaged on the left side of embodiment 706 (FIG. 85).

Right handle member 700 and left handle member 702 may be detached from food support platform 704 for storage, cleaning, or other purposes. Handle members 700 and 702 may attach to food support platform 704 using: screws and wing nuts; two flat formed tunnels in food support platform 704 engaging by friction, snap fit or latches the ends of handle members 700 and 702; or other means.

Descriptions herein related to right handle member 700 and components coupled to it also apply in mirror image to left handle member 702 and components coupled to it.

Figure 76:
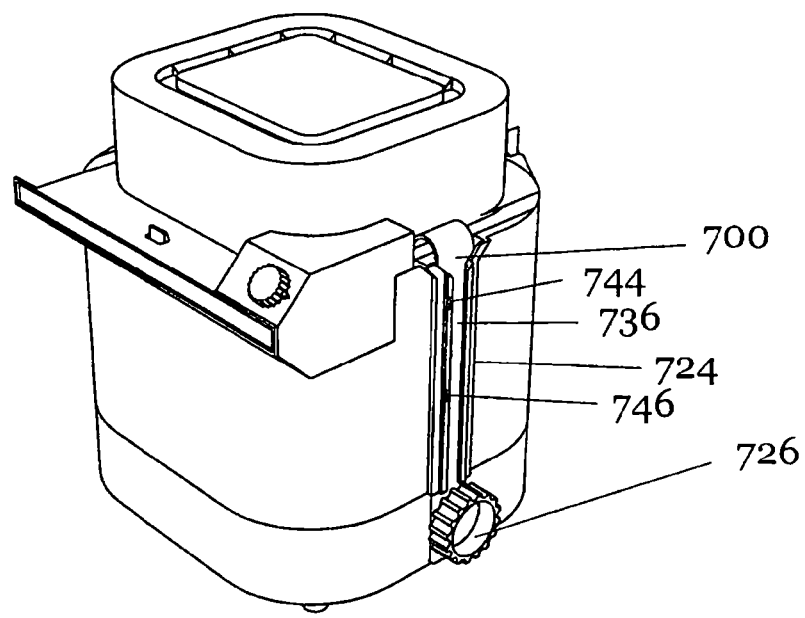
FIG. 76 is identical to FIG. 75 except food support platform 704 is in its lower most position for cooking.

Food support platform 704 may be lowered into cooking vessels 714 and secured at one of at least three positions. The upper two of these three positions are controlled by engagement between right latching paw 738, and right upper latch receptacle 744 and right lower latch receptacle 746. The third of these three positions is the lowest position and is secured by food support platform 704 bottoming out above heat coil 740. As shown in FIG. 76, this lowermost position is the cooking position where foods are fully immersed into cooking liquids.

Figure 74:
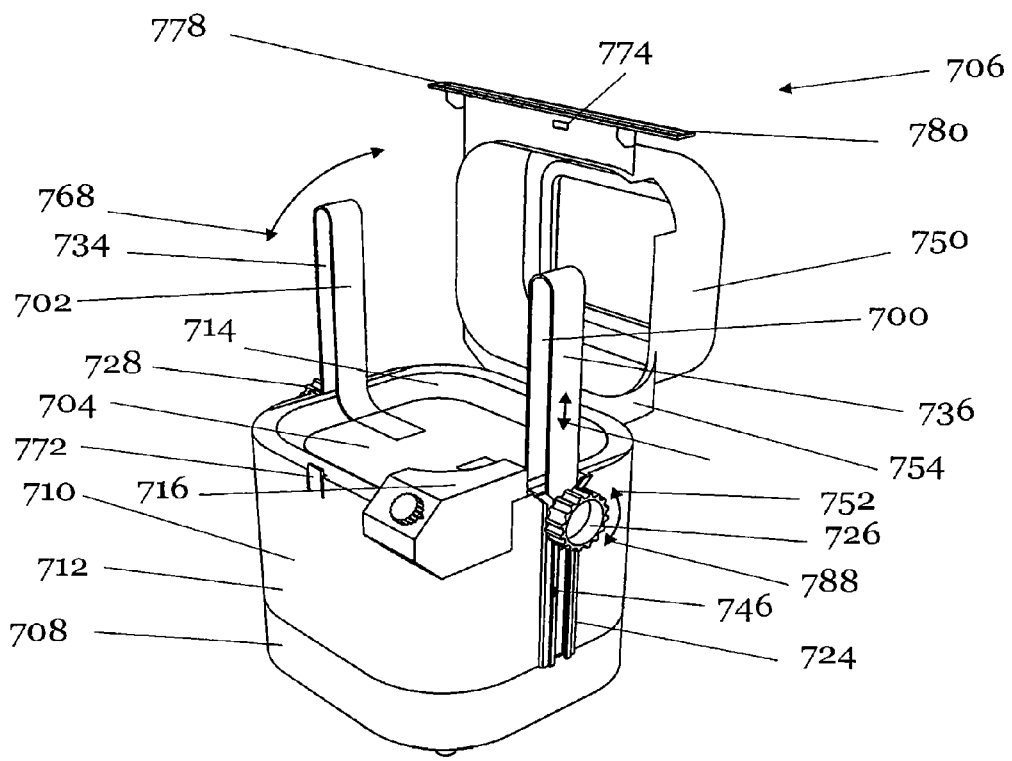
FIG. 74 is a forward perspective view of exemplary embodiment 706 with its food support platform in its uppermost position for food loading.

As shown in FIG. 74, the uppermost of the three food support platform 704 positions may be used for loading and unloading food. By mounting food support platform 704 high within cooking vessel 714 in this uppermost position, food loading and unloading is simplified and made more convenient by most of the food being exposed above or near the upper rim of cooking vessel 714 where the food can be easily gripped and manipulated.

Figure 75:
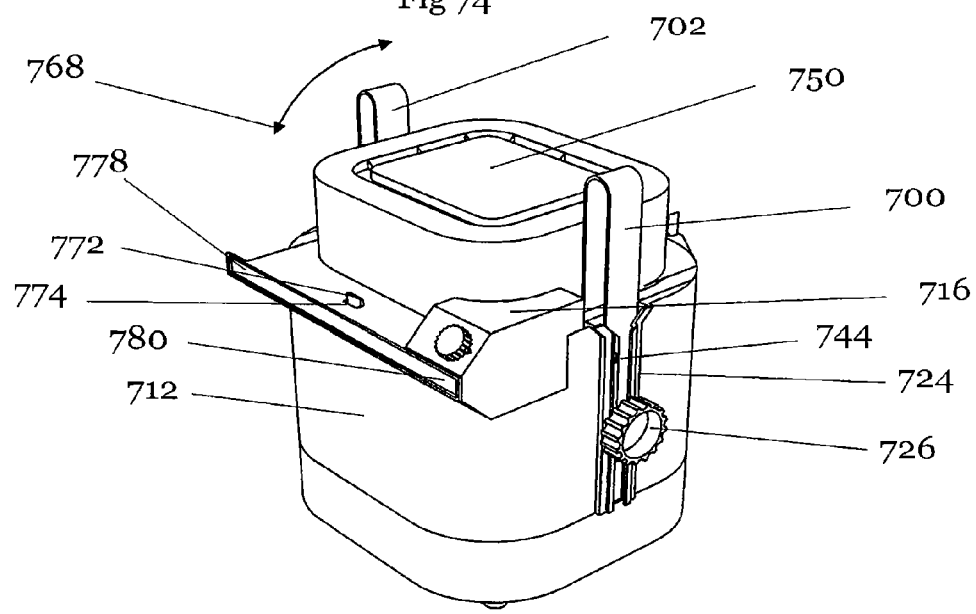
FIG. 75 is identical to FIG. 74 except lid 750 is closed and food support platform 704 is in its middle position.

As shown in FIG. 75, the middle of these three food support platform 704 positions allows foods to be suspended above cooking liquid contained in cooking vessel 714, and simultaneously allows lid 750 to be lowered and latched closed enclosing even the tallest foods able to be cooked within embodiment 706.

Food support platform 704 may be first lowered into cooking vessel 714 by gripping right handle knob 726 and left handle knob 728 (FIG. 89) and lowering them so that left outer arm 734 engages within left handled track 722 and right outer arm 736 engages within right handled track 724. Knobs 726 and 728 are then further lowered until right latching paw 738, biased by right latch spring 740, engages right upper latch receptacle 744. Simultaneously, this latching engagement occurs mirror imaged on the handle mechanism on the left-hand of embodiment 706.

Lowering food support platform 704 from its uppermost to its middle position requires turning right handle knob 726 counterclockwise 752 (FIG. 85), and likewise, in mirror image, turning left handle knob 728. This disengages right latching paw 738 from right upper latch receptacles 744, and likewise with left handle knob 728, and allows food support platform 704 to be lowered to its middle position.

This operation is repeated to lower food support platform 704 from its middle position to its lowermost position.

Raising food support platform 704 from its lowermost position to its middle position requires only gripping and lifting left handle knob 728 and right handle knob 726 until food support platform 704 is in its middle position. At this location, the right and left latching paws, biased by their respective latching springs, engage their respective lower latch receptacles.

Similarly, raising food support platform 704 from its middle position to its uppermost position, simply repeats the above process.

In all operations involving spring 740 pressure turning of handle knobs 728 and 726, biasing these knobs may be augmented through hand torsional pressure.

Dismounting food support platform 704 from within cooking vessel 714 merely requires upward lift on left handle knob 728 and right handle knob 726.

FIGS. 80 through 84 show how lid 750 attaches to cooking vessel 714 when cooking vessel 714 is assembled with outer enclosure 712.

Figure 81:
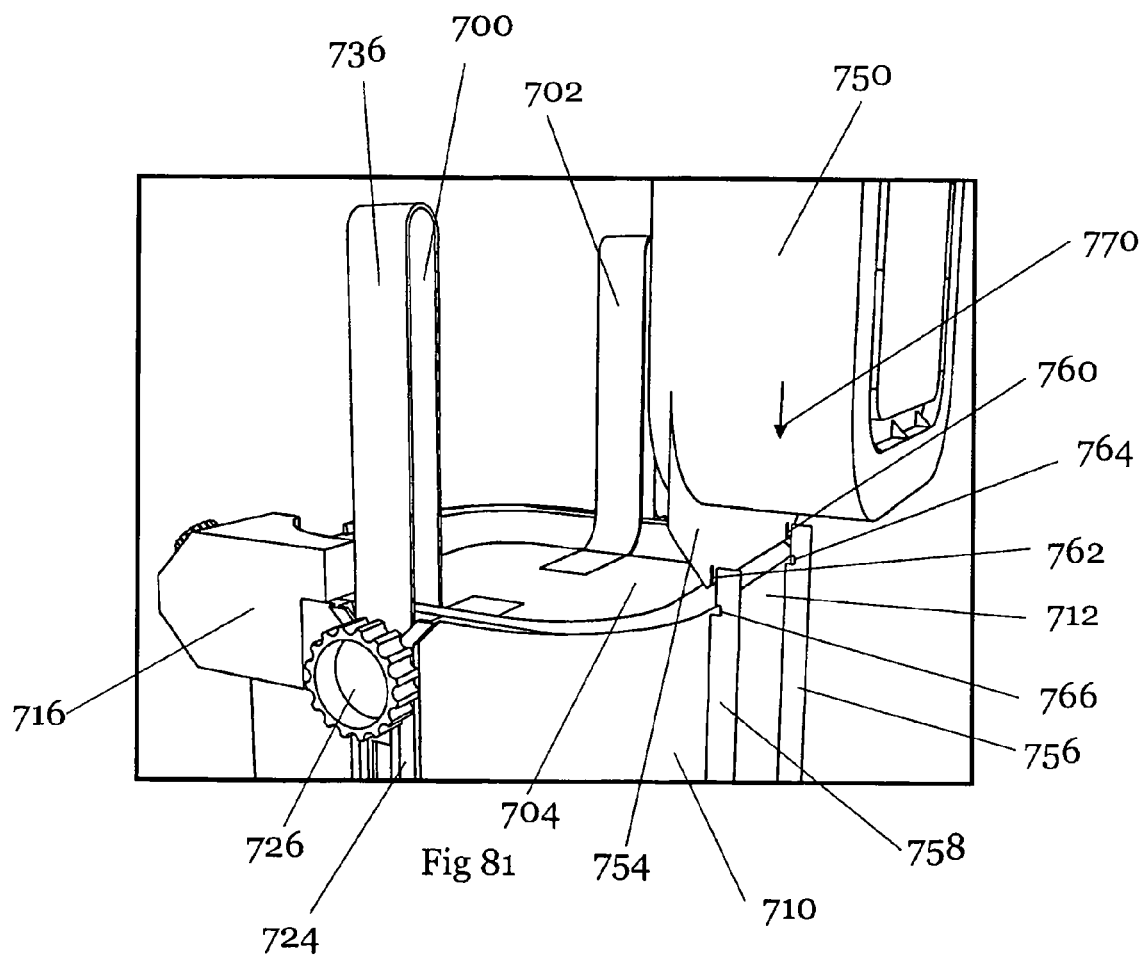
FIG. 81 is a rear perspective view of a portion of embodiment 706 with lid 750 detached from outer enclosure 712.

Lid rear flange 754 includes at its back left engagement slot 760 and right engagement slot 762. When lid 750 is lowered 770 onto outer enclosure 712, as shown in FIGS. 81 and 82, left engagement slot 760 straddles left engagement notch 764; and right engagement slot 762 straddles right engagement notch 766.

Figure 82:
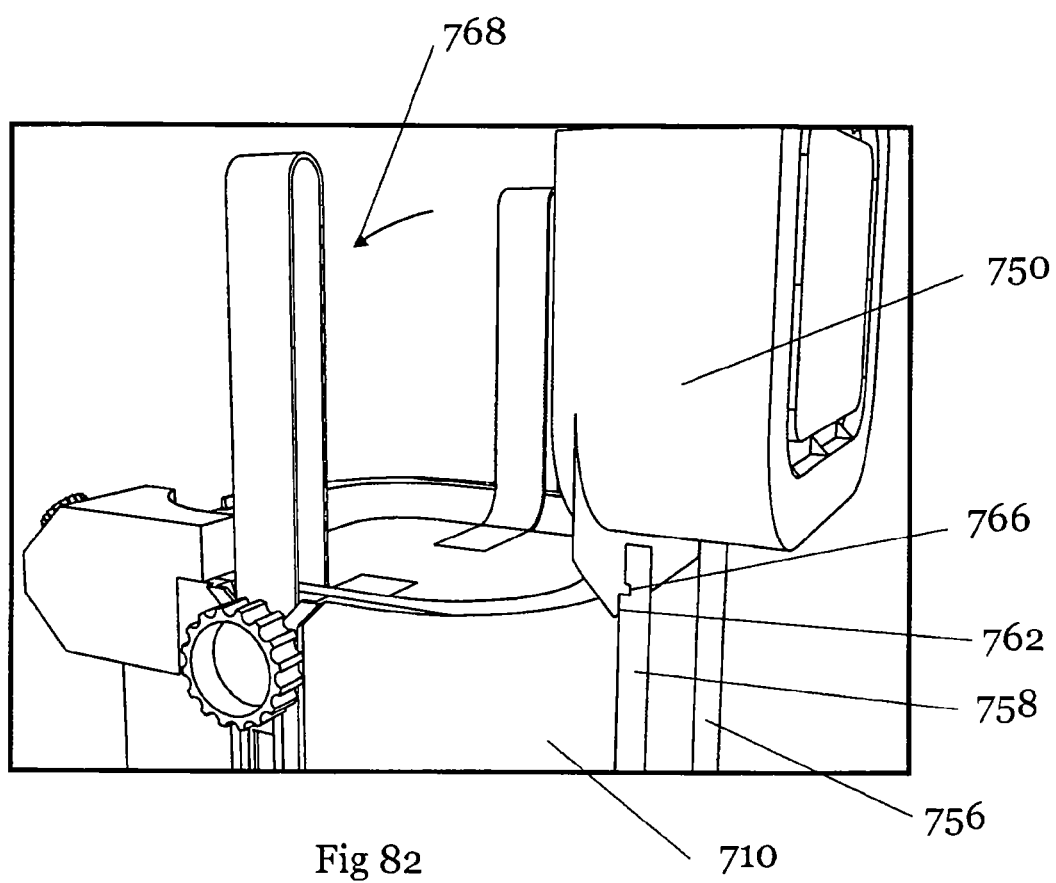
FIG. 82 is identical to FIG. 81 except lid 750 is shown in its open position and attached to outer enclosure 712.

Once lowered, lid 750 may rest in a stable open vertical position as shown in FIG. 82 supported by the upper portion of enclosure rear left flange 756 and the upper portion of enclosure rear right flange 758 (FIG. 82).

Figure 83:
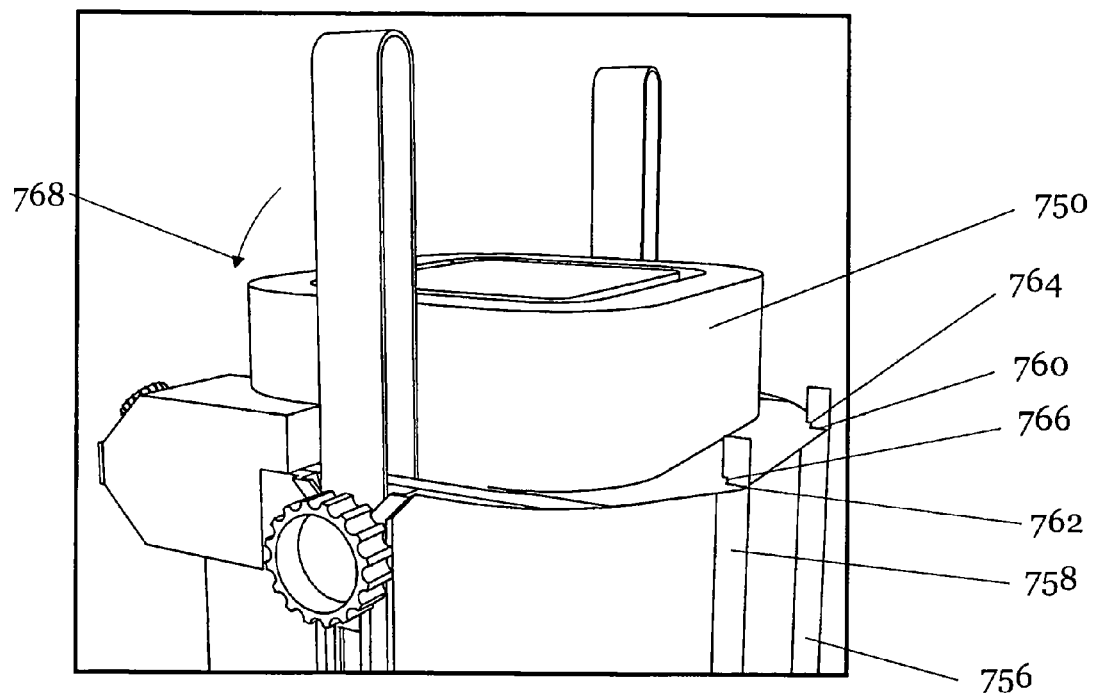
FIG. 83 is identical to FIG. 82 except lid 750 is shown in its closed position.
Figure 84:
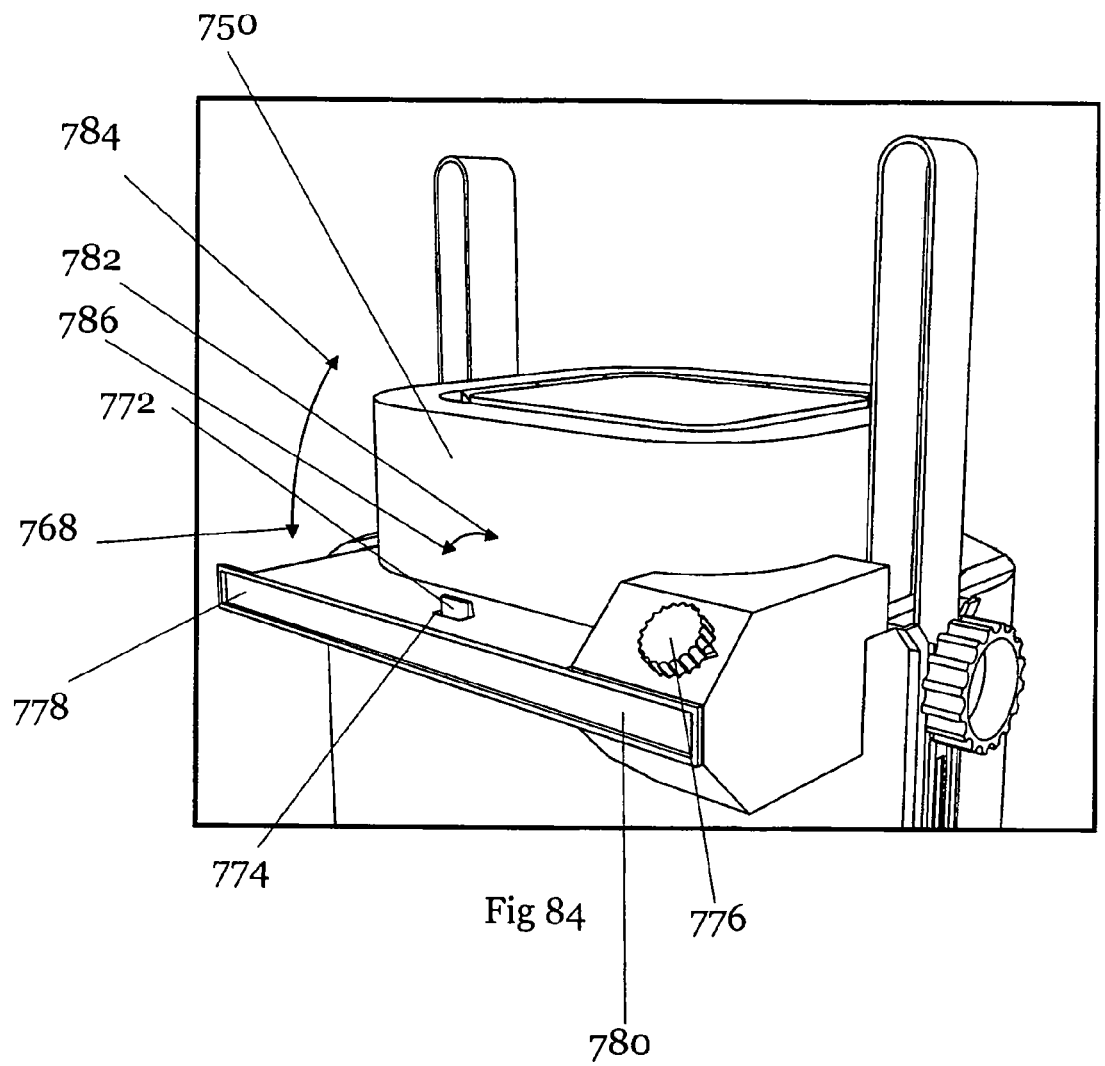
FIG. 84 is a forward perspective view of a portion of embodiment 706 with lid 750 in its closed position.

From this open position lid 750 may be rotated forward 768 to its closed position as shown in FIG. 84. Interference between left engagement slot 760 and left engagement notch 764, as well as interference between right engagement slot 762 and right engagement notch 766, hold down the rear of lid 750 when lid 750 is in its closed position (FIG. 83).

In its closed position the forward portion of the lid 750 is held in place by the engagement between lid latching member 772 and lid latch orifice 774 (FIG. 84). Lid latching member 772 comprises a flat probe with a barb undercut on its rear face. This undercut is biased rearward 782 and latches over the rear portion of lid latching orifice 774 when lid 750 is in its closed position.

To help in opening lid 750, a spring may bias 784 the lid to lift away from its fully closed position when lid latching member 772 is moved forward 786 and releases from engagement from the rear portion of lid latching orifice 774. This spring may be located on the forward portion of the upper horizontal rim of outer enclosure 712, or it may be located on the portion of lid 750 directly adjacent to this location. This may be a separate spring, such as a metal leaf spring, or it may be integrally molded into either outer enclosure 712 or into lid 750.

Such a spring biasing lid 750 makes it easier to open lid 750 by springing it into full disengagement with lid latching member 772 when lid latching number 772 is pulled away from its engagement with lid latch orifice 774.

The above lid coupling arrangement makes it easy to remove lid 750 for cleaning or other purposes. It also allows lid 750 to rest in a fully open upright position for food loading or other purposes. Further, it allows lid 750 to be removed and inverted into cooking vessel 714 for compact storage. Finally, it allows lid 750 to be solidly latched closed while food is being lowered into, or being removed from, cooking liquid, and also while food is being cooked. This is a major safety factor.

Referring to FIG. 84, left lid handle 778 and right lid handle 780 are disposed on lid 750 at its forward left-hand and right-hand corners respectively. This reduces the chance a user will be burned by escaping steam when the user opens embodiment 706 during cooking.

Lid 750 may have exhaust vents, filters, as well as other features, similar to those described earlier in this document for lids used on other exemplary embodiments.

Figure 88:
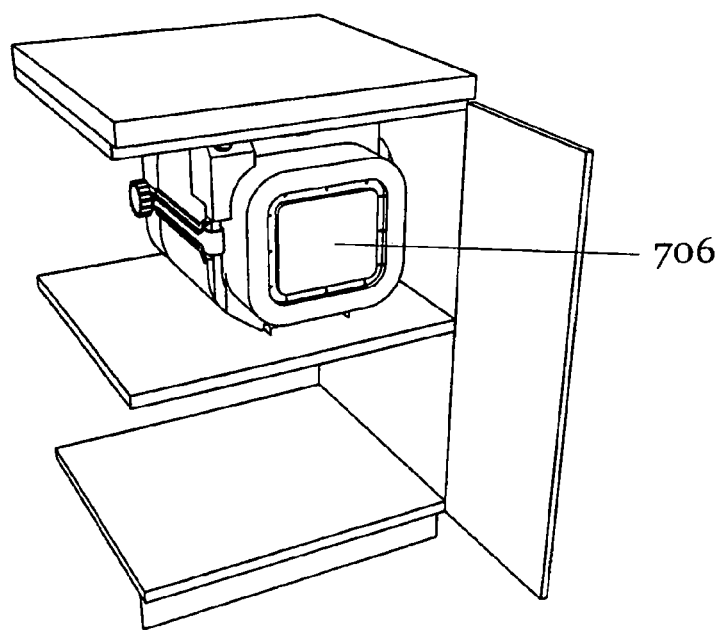
FIG. 88 is a forward perspective view showing embodiment 706 being stored in a below countertop cabinet.
Figure 89:
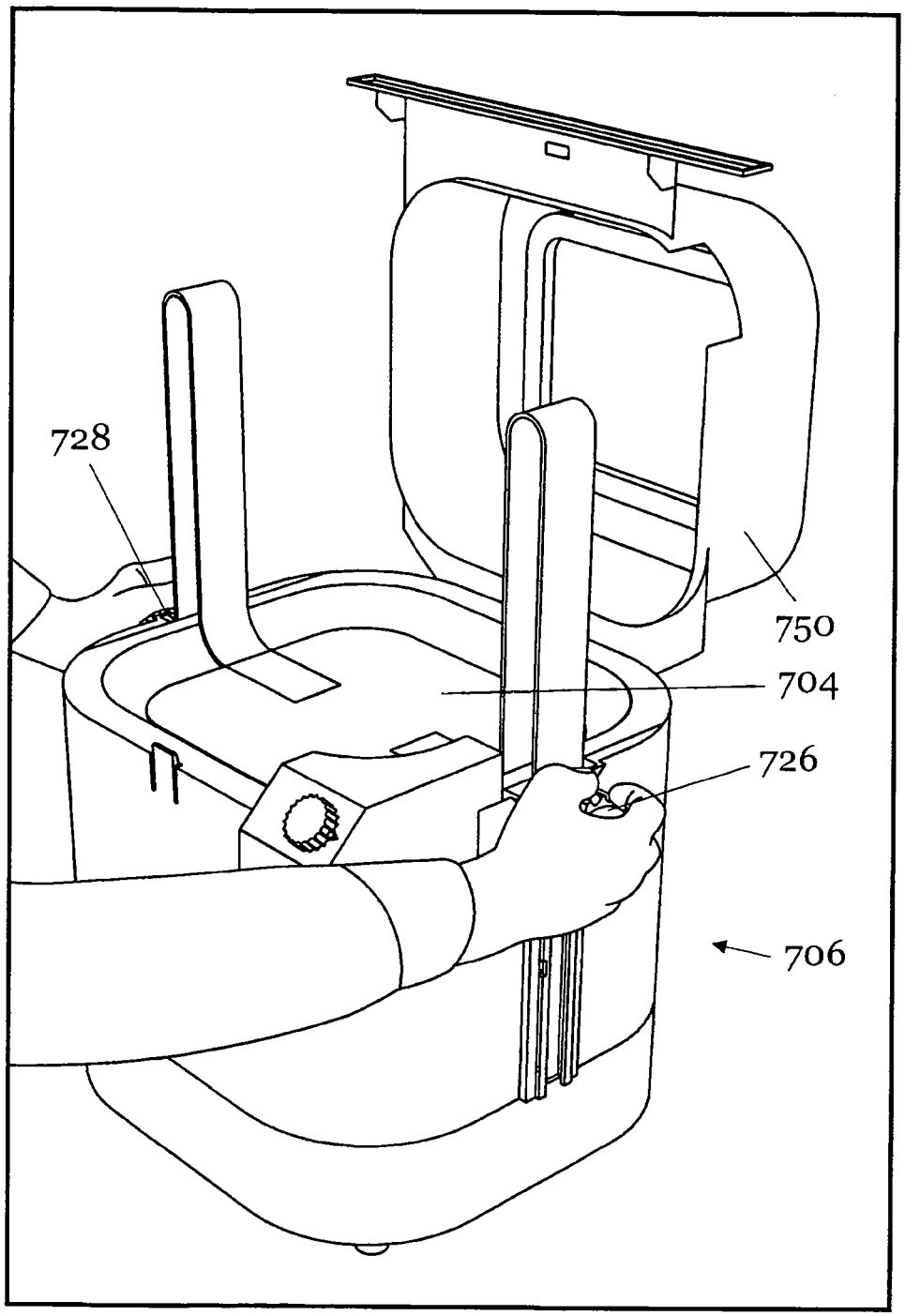
FIG. 89 is a forward perspective view of embodiment 706 in use, with a user gripping right handle knob 726 and left handle knob 728, and with food support platform 704 fully raised for food loading, and with lid 750 in its open position.

Outer enclosure 712 includes enclosure rear left flange 756 and enclosure rear right flange 758 which extend rearward from the back face of enclosure 712 and provide support for storing embodiment 706 on its back as shown in FIG. 88. This may be particularly convenient in many storage situations where storage height is limited, such as the below countertop storage illustrated in FIG. 88.

During storage, whether embodiment 706 is stored on its back, its side, or upright, lid 750 may be inverted and placed into the top of cooking vessels 714 as described for other exemplary embodiments within this document.

Figure 77:
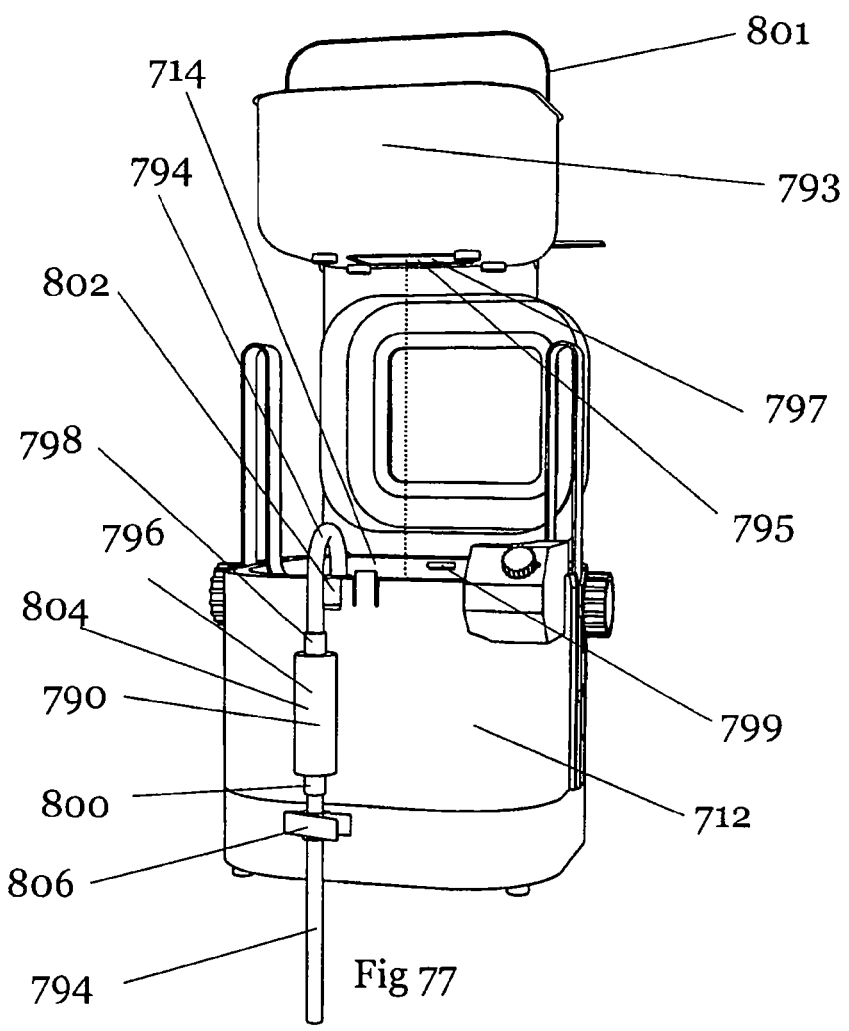
FIG. 77 is a forward perspective of the embodiment 706 showing siphon 790 used for cooking liquid drainage and showing fry pot 793 which is used for cooking smaller food articles. Fry pot 793 is shown removed and above embodiment 706.

FIG. 77 illustrates fry pot 793 which is used to cook smaller food articles such as, by way of example only: French fried potatoes, fish sticks, shrimp, onions, and other small food articles.

In embodiment 706, fry pot 793 is placed on top of food support platform 704.

Food is placed within fry pot 793, and then hot cooking liquid is introduced into fry pot 793 through fry pot entry 797 located in the bottom of pot 793. In embodiment 706 this is done by lowering food support platform 704, with fry pot 793 on top of it, into hot cooking liquid contained within cooking vessel 714, and allowing the hot cooking liquid to fill fry pot 793 through fry pot entry 797.

Filter 795 covers fry pot entry 797 and filters liquid entering or leaving fry pot 793. By filtering cooking liquid entering fry pot 793, impurities which might affect food taste are filtered out. By filtering cooking liquid leaving fry pot 793, cooking liquid useful life may be increased as explained herein.

In embodiment 706, oil is emptied from fry pot 793 by elevating food support platform 704, and fry pot 793 on top of it, above cooking liquid contained within cooking vessel 714.

Filter 795 may be reusable and/or disposable. By way of example only, it may be a fine mesh stainless steel screen. Filter 795 may be removable from fry pot 793 for cleaning or other purposes.

Filter 795 may be placed in the bottom and/or any of the sides of fry pot 793.

Fry pot 793 is functionally different than perforated metal buckets which are commonly used in deep fat frying at least because such buckets have 20% or more of their surface area penetrated by open holes which freely allow cooking liquid to flow and circulate in and out of the buckets without substantial restriction.

Likewise, fry pot 793 is functionally different from baskets which are also commonly used in deep frying at least because such baskets also allow cooking liquid to freely circulate in and out of their interiors without substantial restriction.

Fry pot 793 may also be easier to clean than commonly used frying baskets.

An alternative to filter 795 is use of restrictive filler-drain holes. Such holes would limit cooking liquid entry and exit by occupying less than 10% of the surface area of fry pot 793. Such restrictive filler-drain holes would be placed in the bottom and/or sides of fry pot 793. Such restrictive filter-drain holes may reduce the uneven cooking effects of convection currents rising from heat elements.

Fry pot 793 may be adapted for use on any of the exemplary embodiments described herein.

FIG. 77 illustrates the presence of drain hole 799. Excessive foaming is an unpredictable problem in deep fat frying. It may be caused by: overusing cooking oil, or by mixing cooking oils, or by the type of cooking oil used, or by other reasons. When cooking oil excessively foams, the surface of the foam may overflow the oil containment vessel and cause oil to flow onto the top of the surface supporting the fryer.

Drain hole 799 helps prevent this by allowing oil foam to drain out of cooking vessel 714 before the foam overflows the upper rim of cooking vessel 714. Oil foam which exits drain hole 799 falls into lower outer enclosure 708 (which must be constructed without open holes in the overflow oil reservoir area). The oil may collect in lower outer enclosure 708 until emptied by a user. This helps prevent countertop or supporting surface damage, and helps reduce the risk of a user burning themselves by trying to stop extremely hot oil from flowing onto, and potentially damaging, their countertops.

To make user cleanup of this overflow oil easier, an oil collection bucket may be placed into lower outer enclosure 708. Such a collection bucket could slide in and out of lower outer enclosure 708 like a drawer, or simply be lifted from lower outer enclosure when cooking vessels 714 is removed from outer enclosure 712.

Drain hole 799 may be adapted for use on any of the exemplary embodiments described herein, and may be particularly useful in exemplary embodiments which automatically lower food into cooking liquid without the necessity of user presence. In such automated exemplary embodiments, unwitnessed overflowing oil could cause substantial damage before anyone became aware of it.

FIG. 77 also illustrates how cooking vessel 714 may be drained using a siphon. In FIG. 77, siphon 790, including: inlet hose 792, outlet hose 794, pinch valve 806, hand pump 796 (which includes inlet one-way valve 798, siphon bulb 804, and outlet one-way valve 800); is shown mounted onto the forward upper lip of outer enclosure 712 through the use of siphon mounting clip 802.

To drain cooking liquid from cooking vessel 714, using siphon mounting clip 802, a user clips inlet hose 792 of siphon 790 to the forward rim of outer enclosure 712 (FIG. 77), and places the end of the outlet hose 794 into a containment and/or storage and/or disposal vessel. The user initiates the siphon process by repeatedly squeezing siphon bulb 804 until siphon action commences.

Should it be necessary to interrupt the siphon process to change containers or for other purposes, the user may squeeze pinch valve 806 closed.

Figure 78:
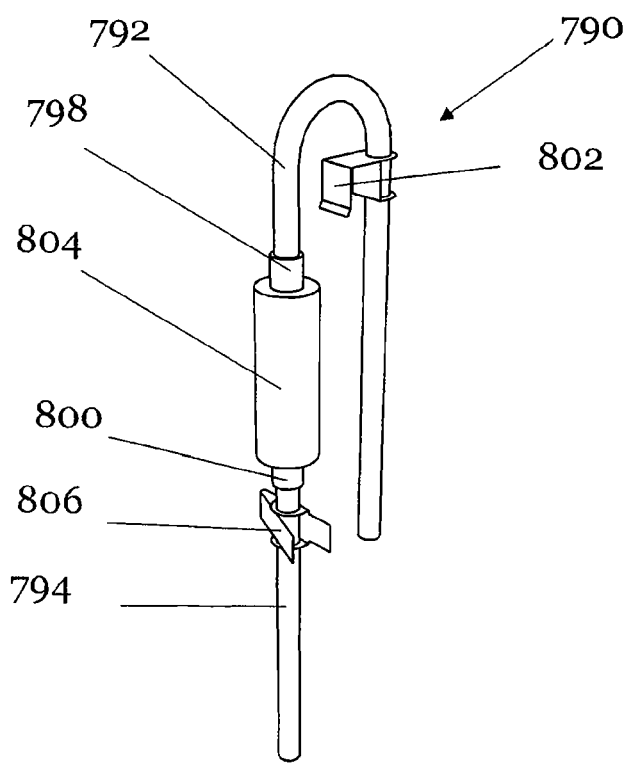
FIG. 78 is a forward perspective view of first exemplary siphon 790.

FIG. 78 shows siphon 790 when not mounted to cooking vessels 714.

Figure 79:
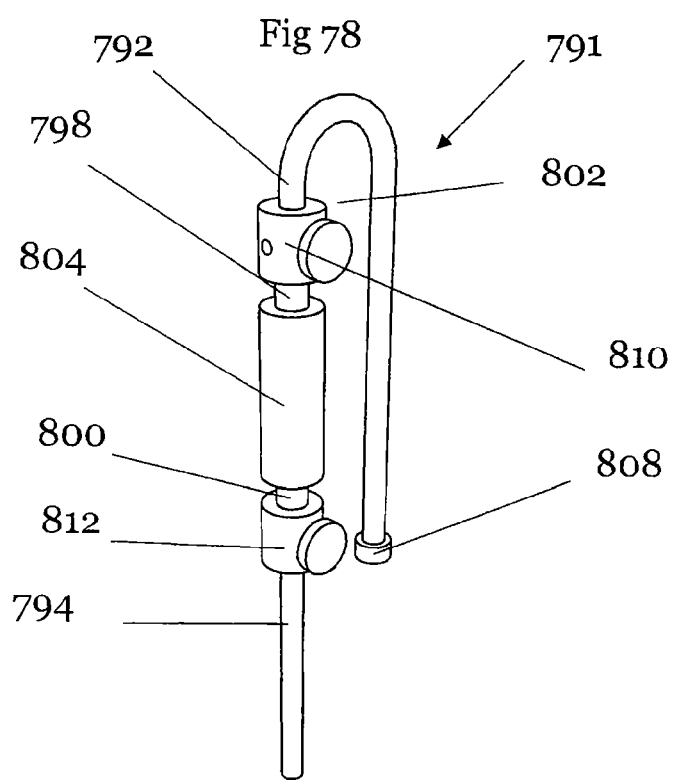
FIG. 79 is a forward prospective view of alternative siphon embodiment 791.
Figure 80:
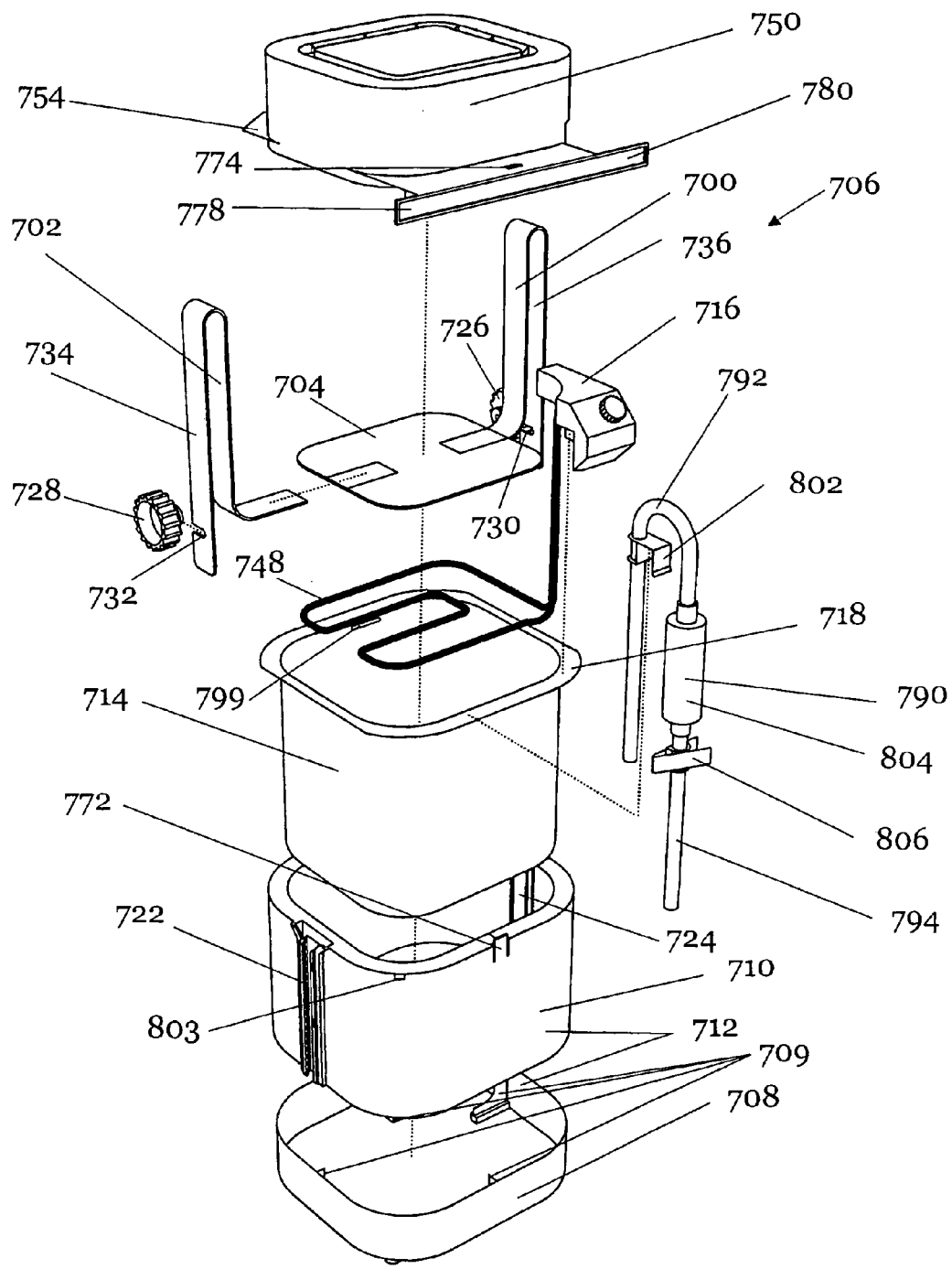
FIG. 80 is an exploded forward prospective view of embodiment 706.

FIG. 79 shows alternative siphon 791. This is identical to siphon 790 except: pinch valve 806 has been replaced by stopcock 812; weighted inlet 808 is used to hold inlet hose 792 at or near the bottom of cooking vessel 714 instead of using siphon mounting clip 802; and air bleed valve 810 is shown which may be used to break the siphon drainage at any desired point rather than using a flow restricting valve such as pinch valve 806 or stopcock 812.

Air bleed valve 810 stops the flow of liquid through siphon 790 by introducing outside air into inlet hose 792 and thus breaking the siphon action.

To break the siphon action, any one of, or all of, or combination of: pinch valve 806, stopcock 812, or air bleed valve 810, may be present and used. Alternatively, a hose soft enough to be bent or finger pinched may be used to stop the siphon action.

Likewise, positioning the intake end of inlet hose 792 near or at the bottom of cooking vessel 714 may use any one of, any combination of, or all of: siphon mounting clip 802 and/or weighted Inlet 808, and/or other means, such as, by way of example only, a hose gripping notch cut into food support platform 704.

Weighted inlet 808 positions the end of the inlet hose 792 near or at the bottom of cooking vessel 714 by placing weight near or at the end of inlet hose 792. Weighted inlet 808 may also have a particulate filter within or coupled to it to strain particulates within the cooking liquid being drained so as to lengthen the useful life of the cooking liquid. By way of an example, weighted inlet 808 may have a fine mesh screen within it. This filter may be removable for cleaning or other purposes.

Drained cooking liquid may be disposed or reused. It is possible cooking liquid may be reused several times, depending on, among other things: cooking conditions, food being cooked, and type of cooking oil or liquid being used. Between uses it may be desirable to drain the cooking liquid from cooking vessel 714 and store it in protective containers.

Siphon 790 and/or alternative siphon 791 may also be used to fill cooking vessel 714 with cooking liquid by placing inlet hose 792 into the container of the cooking liquid, and placing the end of outlet hose 794 into cooking vessel 714, and then starting the siphon action.

Numerous features, devices, methods, constructions, and designs have been taught herein. Many, if not most, may be interchanged between exemplary embodiments. As examples: handles which are on the side walls of an outer enclosure and are used to transport an embodiment which uses motor powered swing arms to raise and lower a food support platform, may also be used on an embodiment which uses handles to manually raise and lower a food support platform; a bail type handle used to lift a food support platform free from an exemplary embodiment cooking vessel which moves its food support platform up and down by pumping cooking liquid using a bidirectional pump may also be used on exemplary embodiments which use powered swing arms or hand operated handles to raise and lower their food support platforms; heat coils that are immersed into cooking liquid may be interchanged for heat coils that mount external to a cooking vessel; or a lid which has an angled glass viewing window might be replaced with a lid which is molded from transparent or translucent material; or a wiper mechanism used to clear the inside of a glass panel from condensation might equally well be use on a molded transparent or translucent lid; or a lift mechanism which uses powered swing arms might replace a manual lift mechanism; or a thermostatic tubular probe which mounts inside a cooking vessel where its end is immersed in cooking liquid might replace an externally mounted thermal sensor; or a circuit which determines cooking time through use of a timer might be replaced or used in conjunction with a circuit which gauges cooking time by the temperature of the food being cooked; etc. One knowledgeable in the art would easily understand this interchangeability and therefore would readily recognize the value of each feature, device, method, construction, and design when placed in combination with any or all of the other similar items suggested.

Likewise, one knowledgeable in the art would recognize that devices taught herein might be used for various kinds of cooking. As examples: they might be used for deep fat frying; steaming of fish, fowl, meats, and vegetables; flavored steaming of various kinds of food including imparting smoked, spiced, sweet or other kind of flavors to foods; baking, such as is common with tub roasters of the type made by Nesco; making of stews and soups; boiling of fish, fowl, meats, and vegetables; etc.

Again, one knowledgeable in the art would readily see these alternative applications.

Referring to FIGS. 90 through 99, this additional preferred embodiment includes: lid 900 which contains and mounts wire mesh filter 919 which filters debris from the exhaust of the cooking process. When closed, lid 900 rests upon upper flange 920 of cooking vessel 902 forming a cooking cavity 903. Upper flange 920 in turn engages upper rim 922 of outer enclosure 918. When cooking, cooking vessel 902 rests within outer enclosure 918.

Electric heater unit 924 is contained entirely within enclosed heatsink 914 where it is free from contact with cooking liquid contained within cooking vessel 902.

Alternatively, electric heater unit 924 may be a bare exposed rod type heat coil in direct contact with cooking liquid contained within cooking vessel 902.

Wires run within tubes 926R and 926L which are contiguous with tubes which are part of electric heater unit 924 or which are contiguous with outer rods of the rod type heat coil.

Bracket 928 is coupled to tubes 926R, 926L, and 926C and provides structural stability. Oil level indication holes 992 (FIG. 116) penetrate bracket 928 and provide a clear, difficult to obscure, indication of the height of cooking fluid levels within cooking vessel 902. This in turn provides unambiguous, easy to read indications of the volume of cooking fluid within cooking vessel 902.

Figure 116:
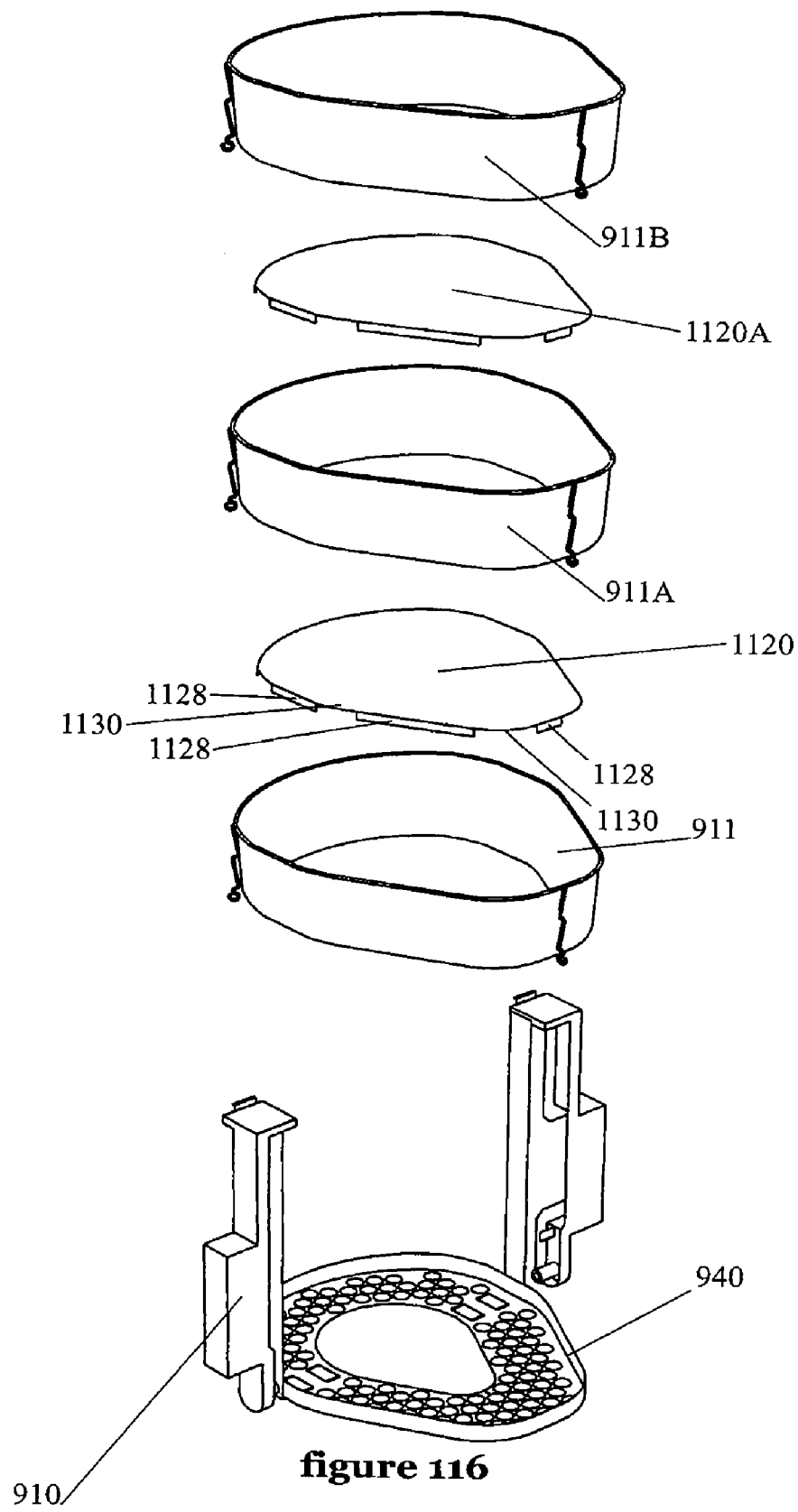

At their tops, tubes 926R, 926L, and 926C bend and couple to control box 912 (see FIG. 116). This coupling may be through a fixed rigid mounting, or it may be through a plug which can be detached to separate tubes 926R, 926L, and 926C as a unit from control box 912, for storage, shipping, cleaning, or for other purposes.

Wires within tubes 926R, 926L, and 926C connect control box 912 to respectively: the heat coil input, the thermostat and thermal fuse, and heat coil output. By connecting the thermostat and thermal fuse in series with either the heat coil input or the heat coil output, the number of connections required between the control box and the wires within tubes 926R, 926L, and 926C can be reduced to two. This means that if tubes 926R, 926L, and 926C are coupled to control box 912 through a plug, then only a two prong plug is required. Such a simplified plug, when compared with alternatives having plugs with three or more prongs, should be less expensive to produce and be more reliable.

Control box 912 and attached electric heater unit 924 may be detached from cooking vessel 902 and outer enclosure 918 simply by lifting control box 912 upward.

Power cord 932 couples to control box 912 through magnetically secured safety power socket 934, such as in use on many home deep fryers. Magnetically secured safety power socket 934 easily breaks away and disconnects power from control box 912 if tension is placed on power cord 932.

Power cord 932 may couple to a wall mounted power outlet plug, or connect to power through other means.

Rib 994 projects from the back of outer enclosure 918 (FIG. 96) and dislodges magnetically secured safety power socket 934 from power cord 932 when control box 912 and attached electric heater unit 924 are lifted and detached from cooking vessel 902 and outer enclosure 918. This provides safety by automatically disconnecting power from the control box when the control box is dismounted from the rest of the exemplary embodiment. It is also more: obvious, inexpensive, and reliable than safety switches which may provide similar type safety protection.

Figure 102:
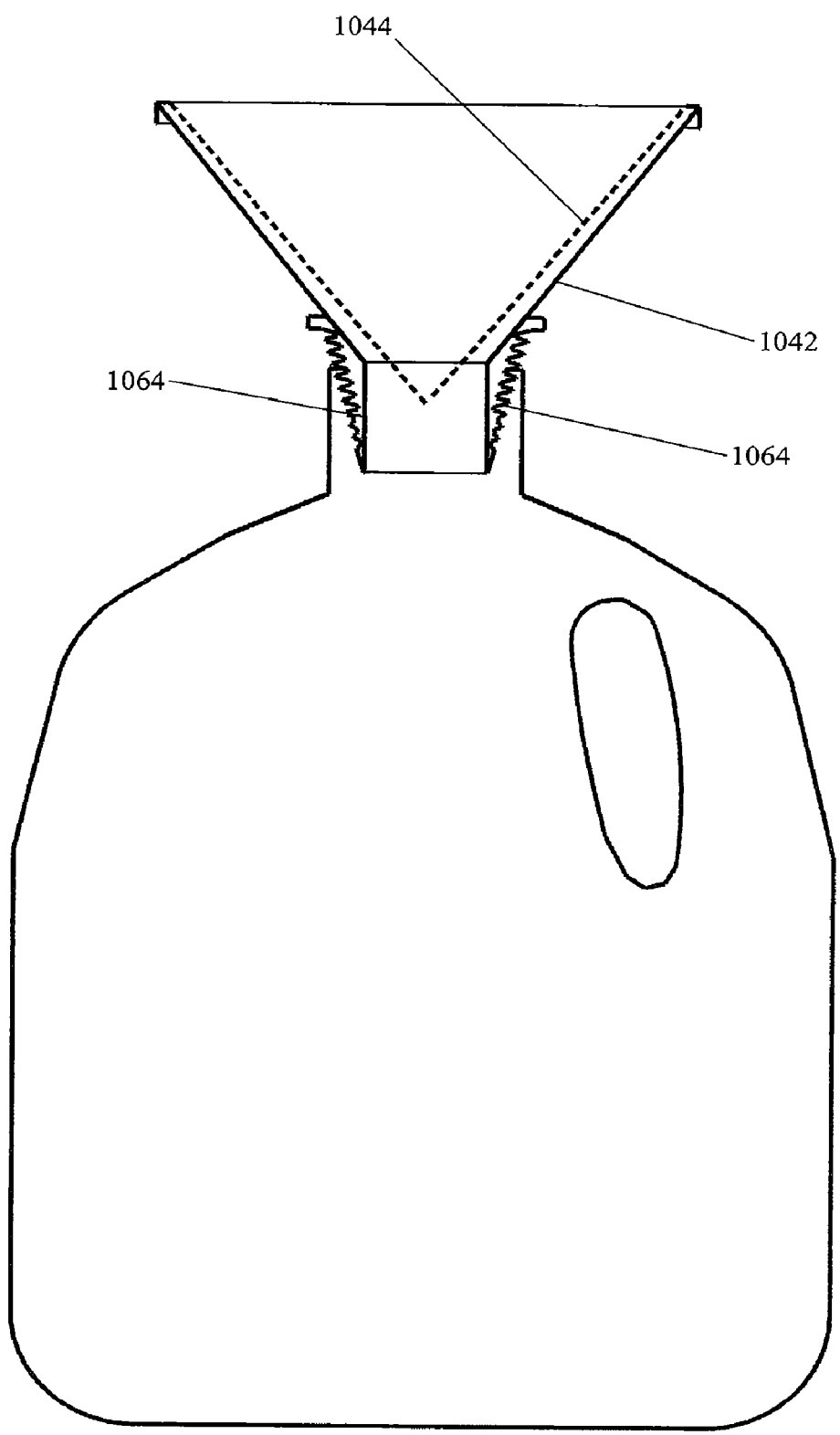
FIG. 102 is a section view taken through FIG. 101 as indicated in FIG. 101.

Handle 1074 (FIGS. 99D and 102) on the back of control box 912 provides a convenient hand grip for the removal of control box 912 from cooking vessel 902.

Figure 99A:
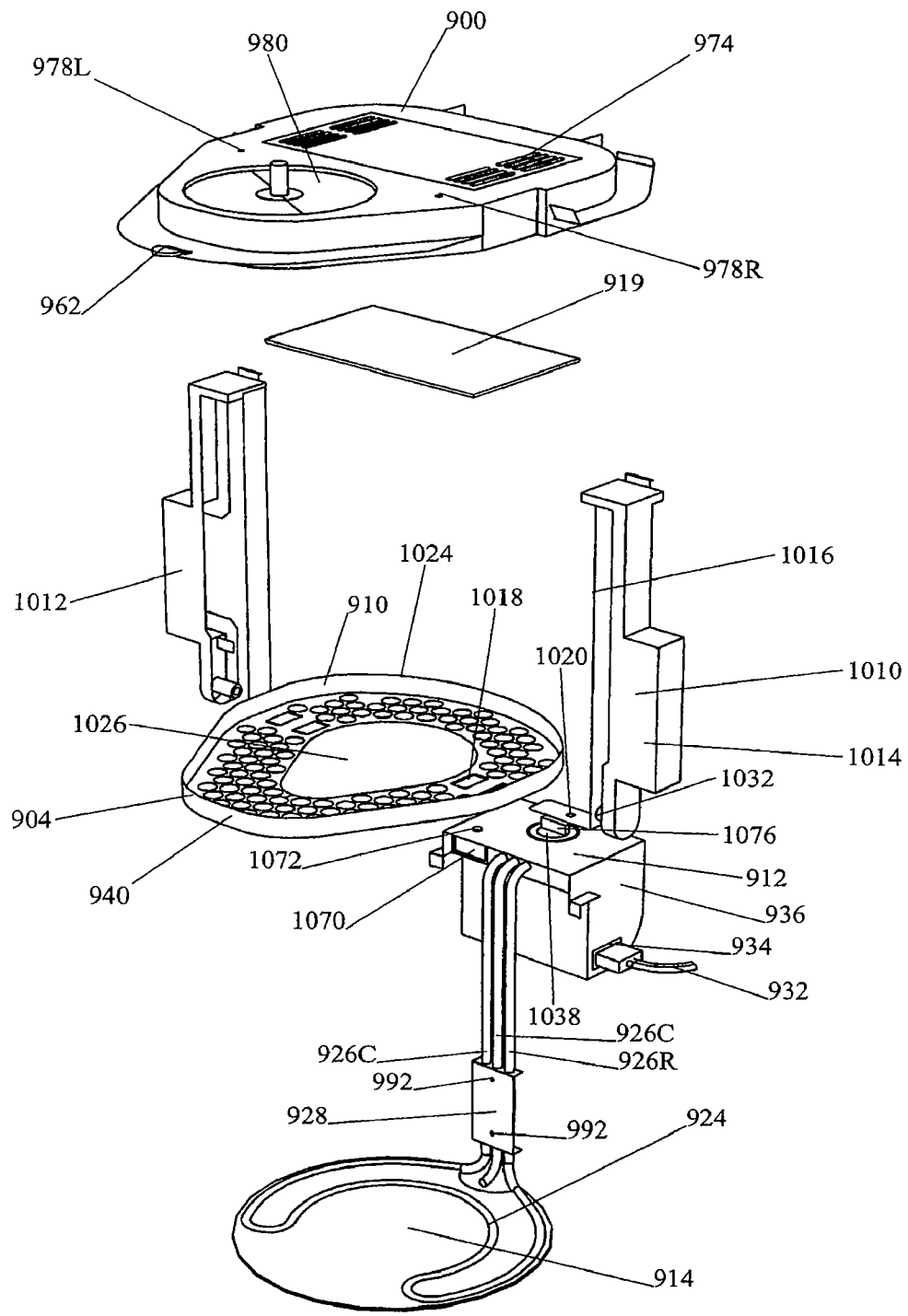
FIG. 99A, is a close-up of the upper portion of FIG. 98.
Figure 99B:
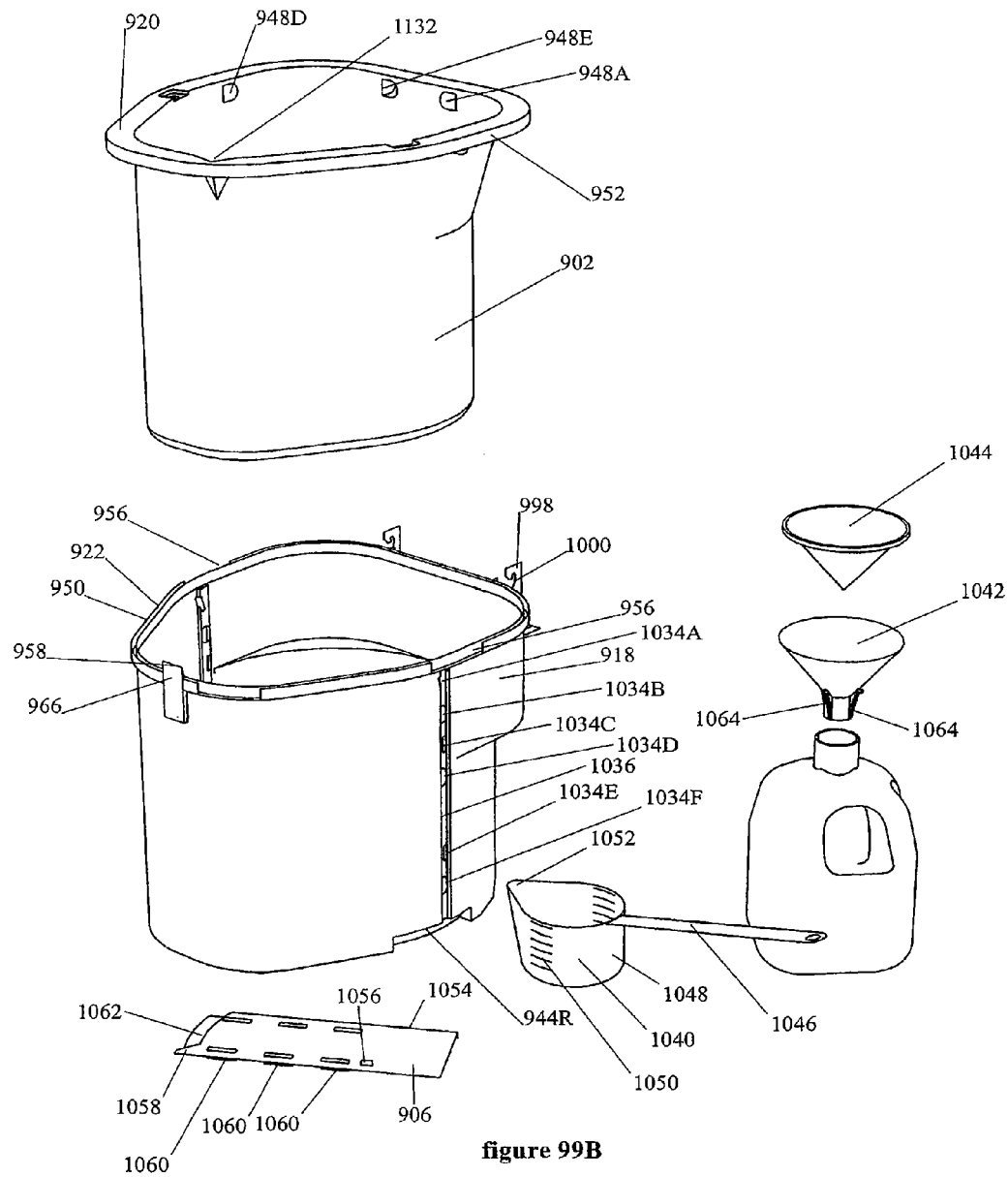
FIG. 99B, is a close-up of the lower portion of FIG. 98.
Figure 99C:
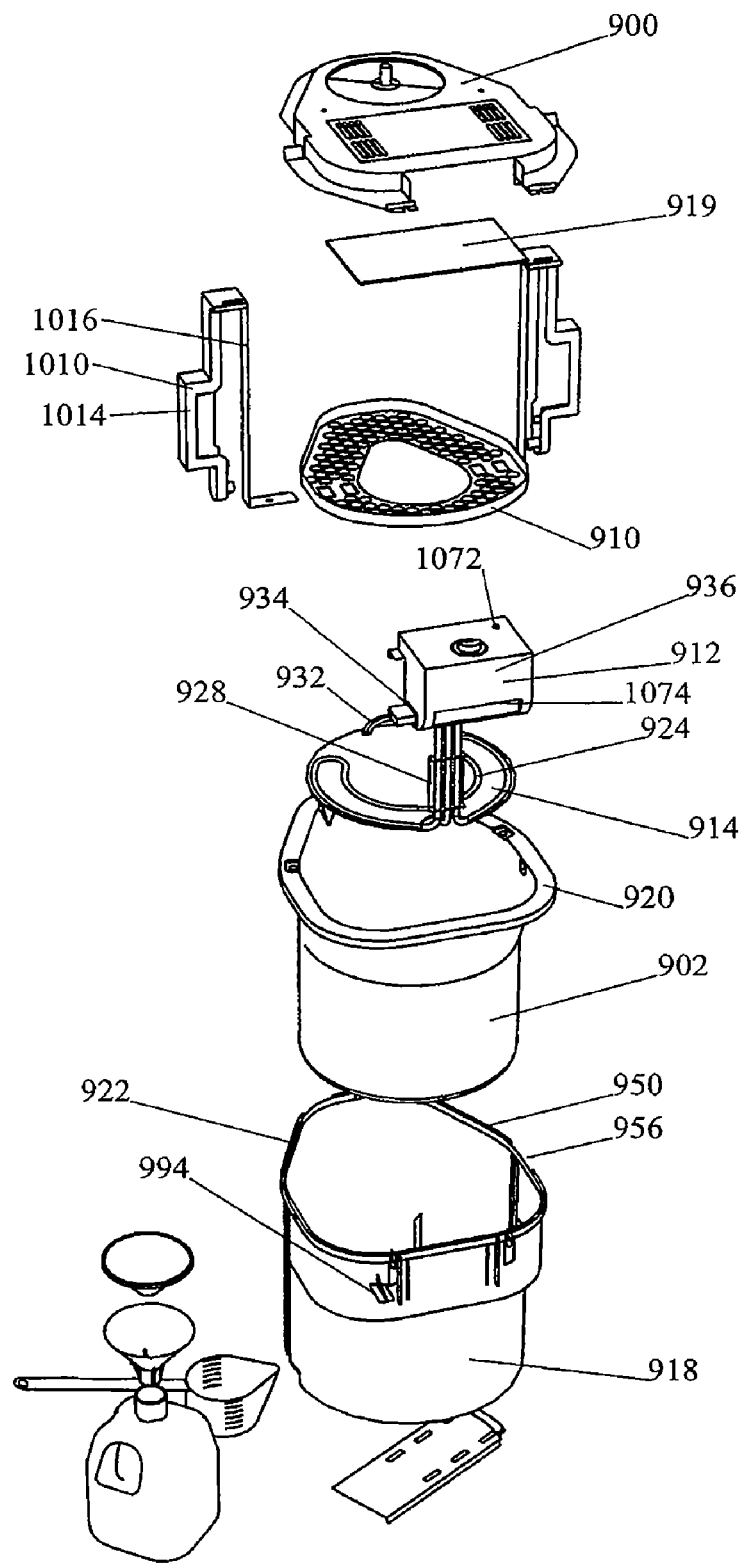
FIG. 99C is a rear exploded perspective view of the embodiment shown in FIGS. 90 through 97.

Cooking vessel light 1070 is located in the forward left vertical upper portion of control box 912 (FIG. 99A). Cooking vessel light 1070 turns on when electric heater unit 924 is activated, and may illuminate the interior of cooking vessel 902 when the exemplary embodiment is cooking. This may help in determining cooking progress as well as provide a certain level of visual interest from light emanating from the exemplary embodiment. Lens 1072 on the top of control box 912 is illuminated by the bulb in cooking vessel light 1070 and may serve as an inexpensive "on" indicator light.

Figure 96:
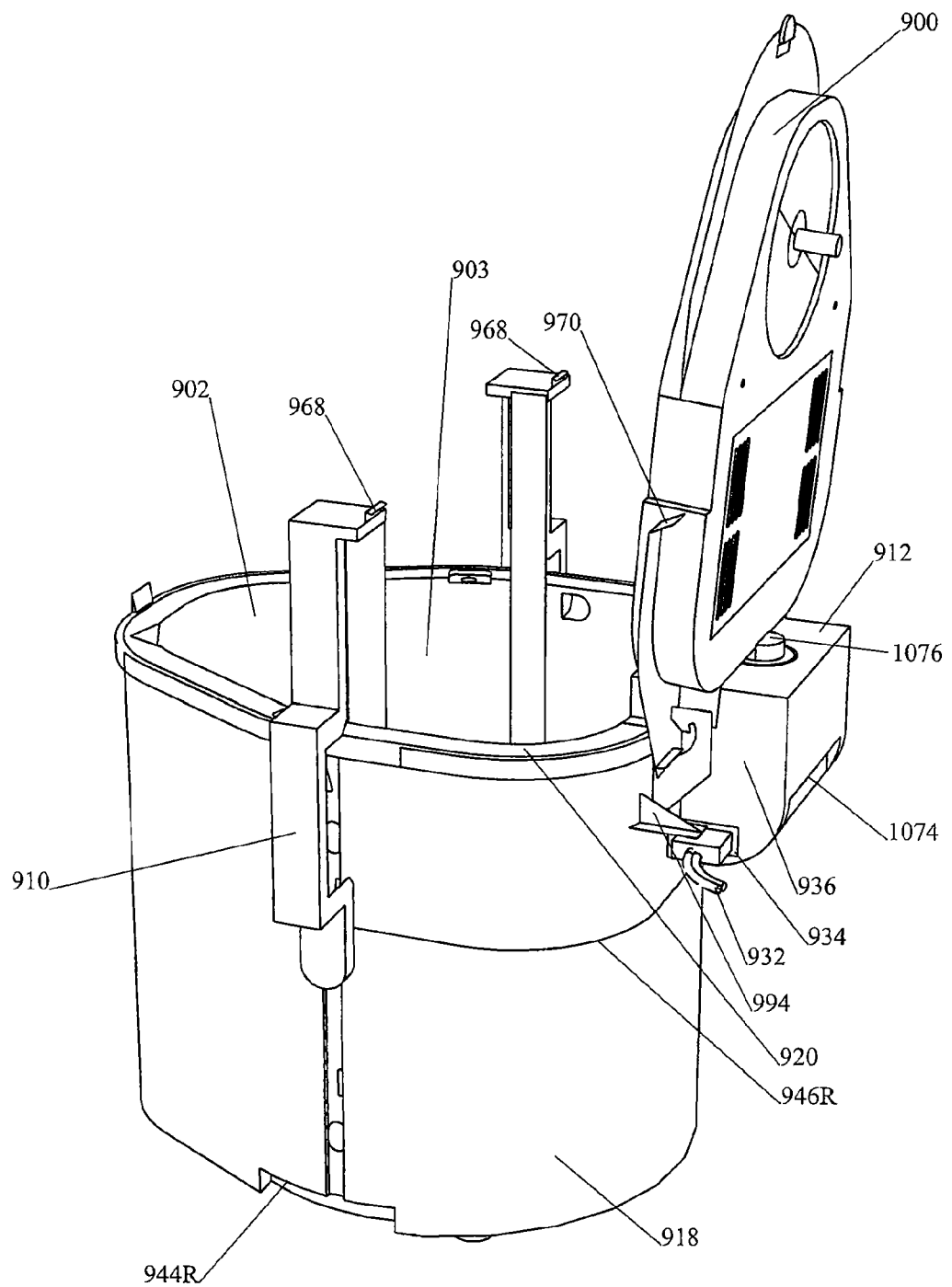
FIG. 96 is similar to FIG. 91 except the perspective view is taken from the right side.
Figure 97:
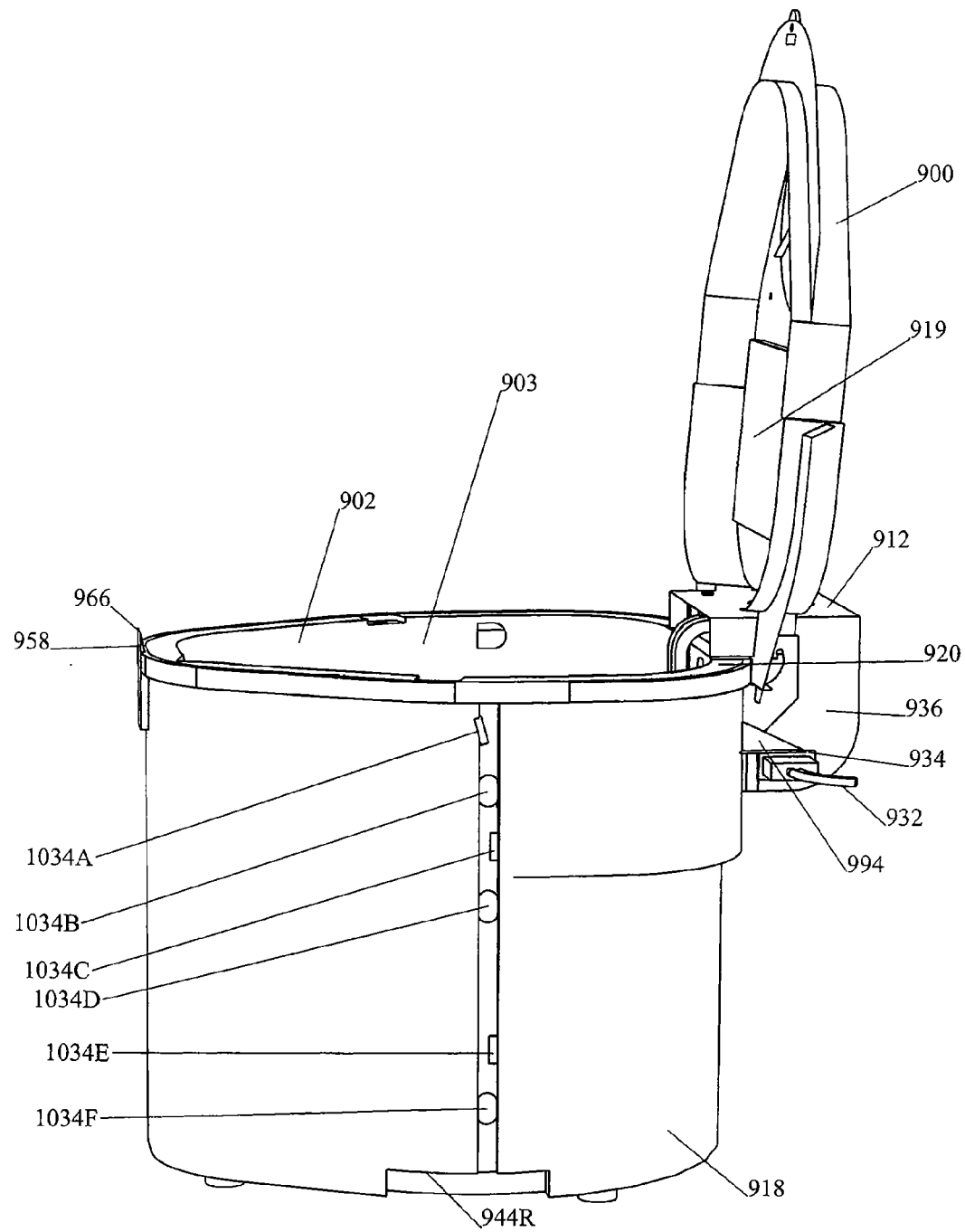
FIG. 97 is similar to FIG. 96 except food support assembly 910 is removed.
Figure 117:
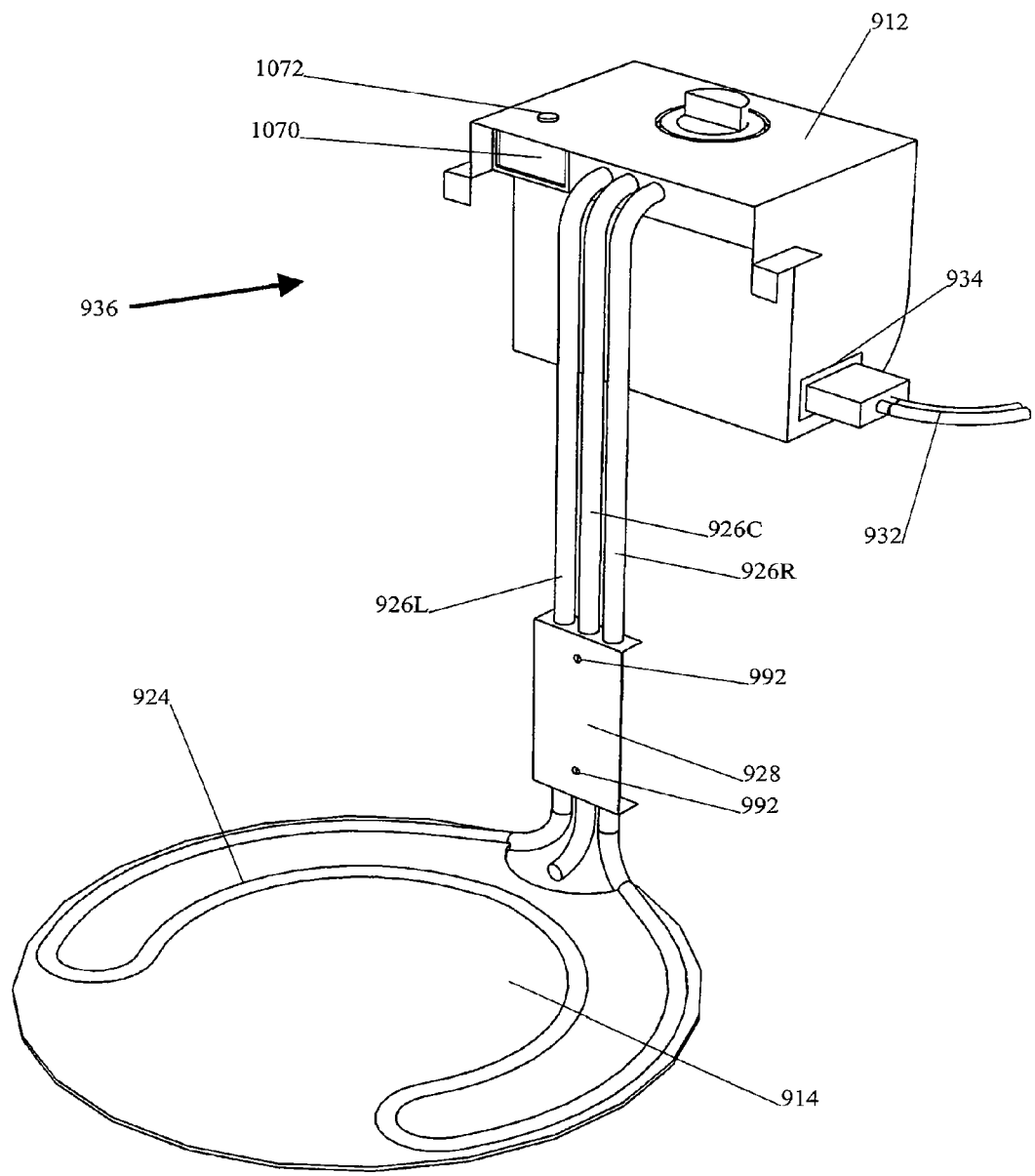

When the device is cooking, the control/heating assembly 936, which includes: control box 912, tubes 926R, 926L, and 926C, electric heater unit 924 and heatsink 914, is lowered over and mounted on to the edge of upper flange 920 by straddling it, as shown in FIGS. 96 and 97. This results in enclosed heatsink 914 being cantilevered and spaced above the floor of cooking vessel 902. A brace, extending from or part of either the floor of cooking vessel 902 or from heatsink 914 or some combination of these, may be added to give strength to cantilevered heatsink 914. As an example of such a brace, and not by way of any limitation, raised lower floor portion 915 of cooking vessel 902 (FIG. 117) may contact heatsink 914, may be added to provide strength. As stated herein, heatsink 914 may not be present in all embodiments built according to the teachings herein. Each of the above structures may be adapted to function with bare rod type heat coils. Such adaptation is easily done by one knowledgeable in the art and thus is not covered in detail herein.

Alternatively, raised lower floor portion 915 (see FIG. 117) may contact the bottom of food support platform 940 to provide structure, and to provide spacing away from heatsink 914, or an alternative rod type heat element. Raised lower floor portion 915 may be constructed to resemble a two tiered wedding cake and provides structural support and spacing to both the heating element and the food support member.

Raised lower floor portion 915 may reduce the amount of cooking liquid needed by substituting its volume for expensive cooking liquids.

Heatsink 914 contacts electric heater unit 924 to increase heat dispersion and transfer area and thus lower transfer temperatures between electric heater unit 924 and liquid contained within cooking vessel 902. High temperatures may cause cooking oil to have shortened life, and high temperatures have been alleged to generate unhealthy substances, such as cancer-causing agents, within cooking oils.

Heatsink 914 may be fabricated from any suitable heat transmitting material including, but not limited to, metals such as: aluminum, copper, and steel.

Figure 92:
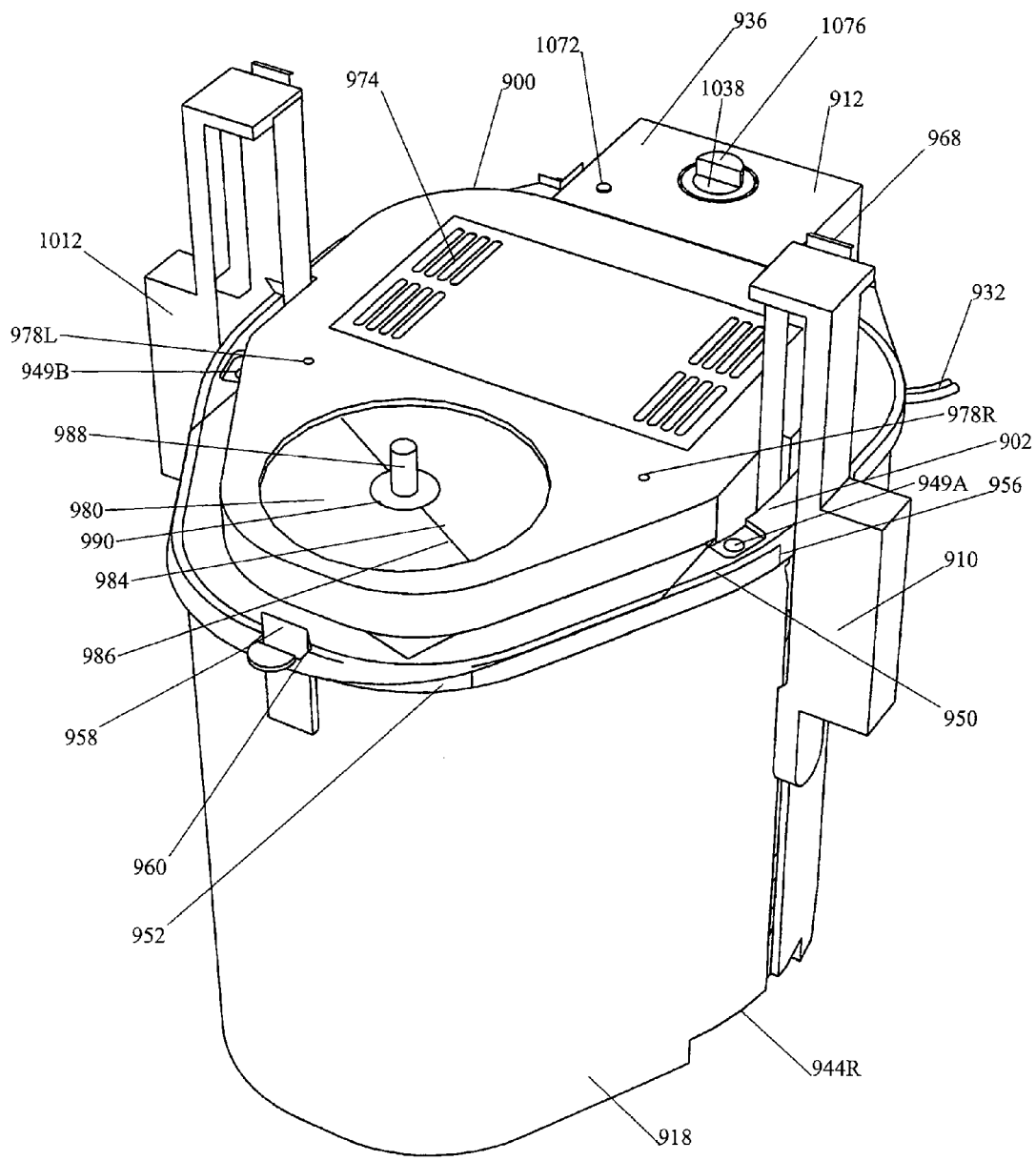
FIG. 92 is similar to FIG. 91 except lid 900 is lowered.
Figure 93:
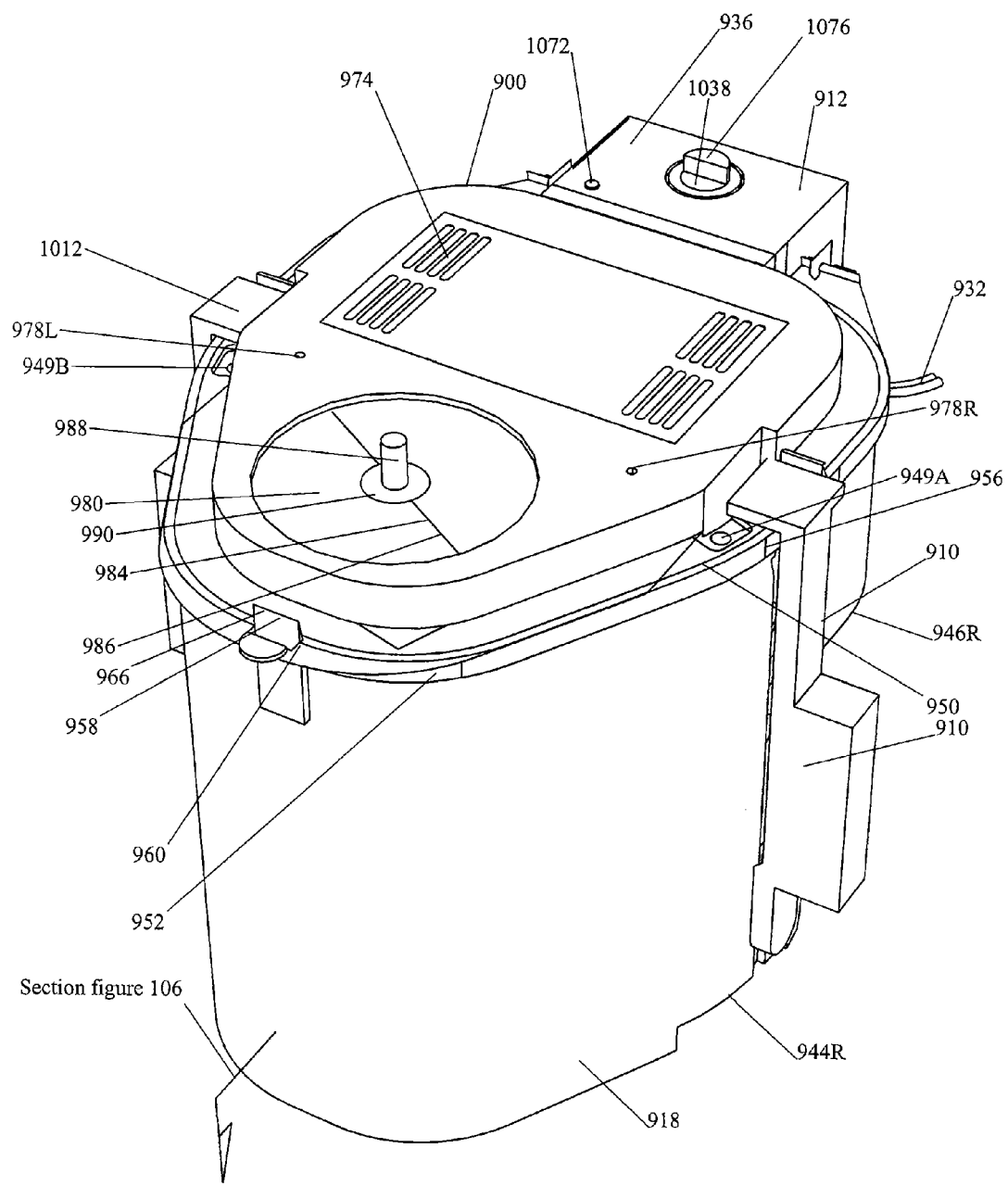
FIG. 93 is similar to FIG. 92 except food support assembly 910 is fully lowered.
Figure 95:
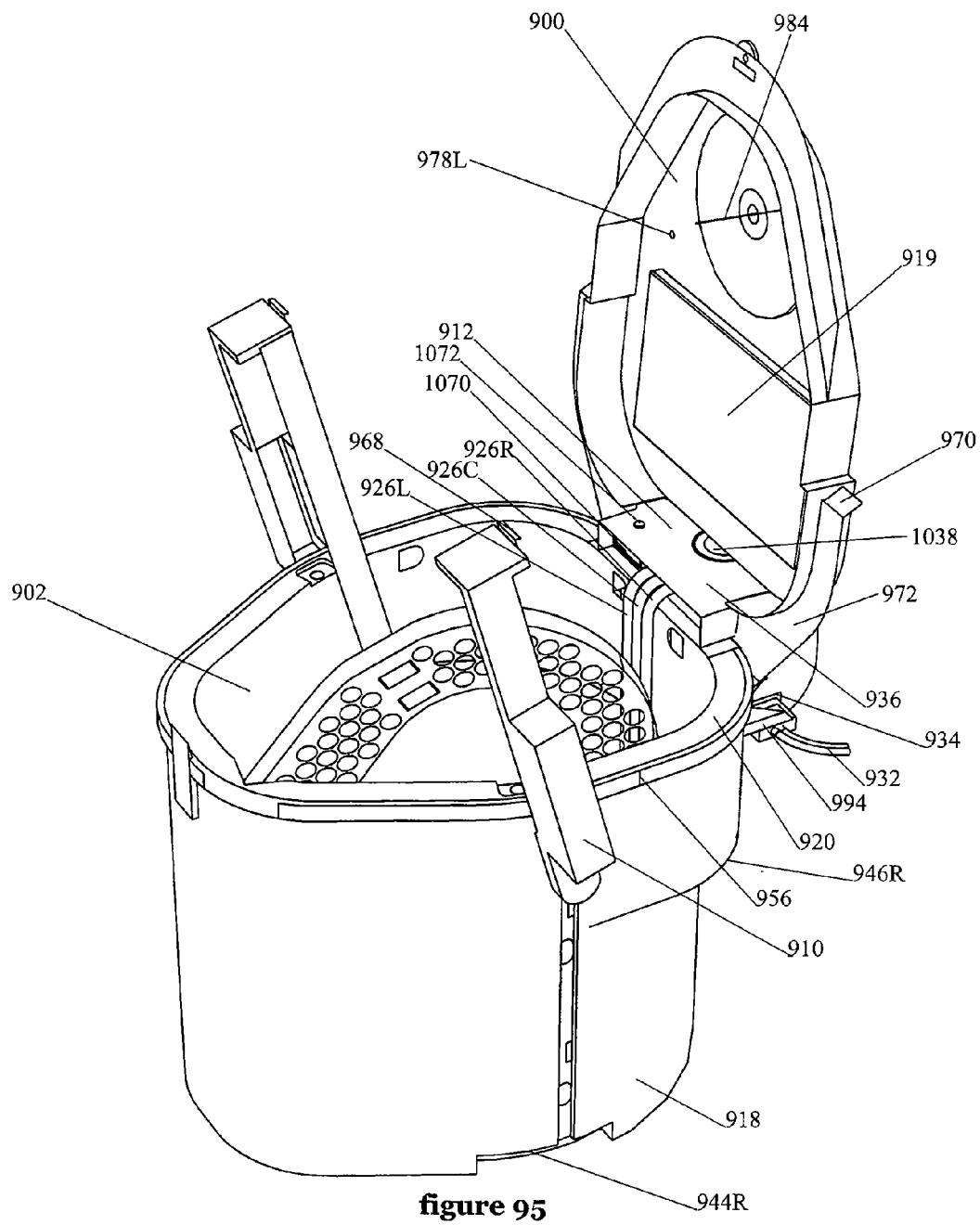
FIG. 95 is similar to FIG. 91 except food support assembly 910 is fully raised and tilted forward for food draining.

Food support assembly 910 may be mounted in one of three positions, each positioning food support assembly 910 differently with respect to cooking vessel 902. Each position in turn results in food support platform 940 being in different positions above the floor of cooking vessel 902 as shown in FIGS. 92, 93, and 95.

Figure 103:
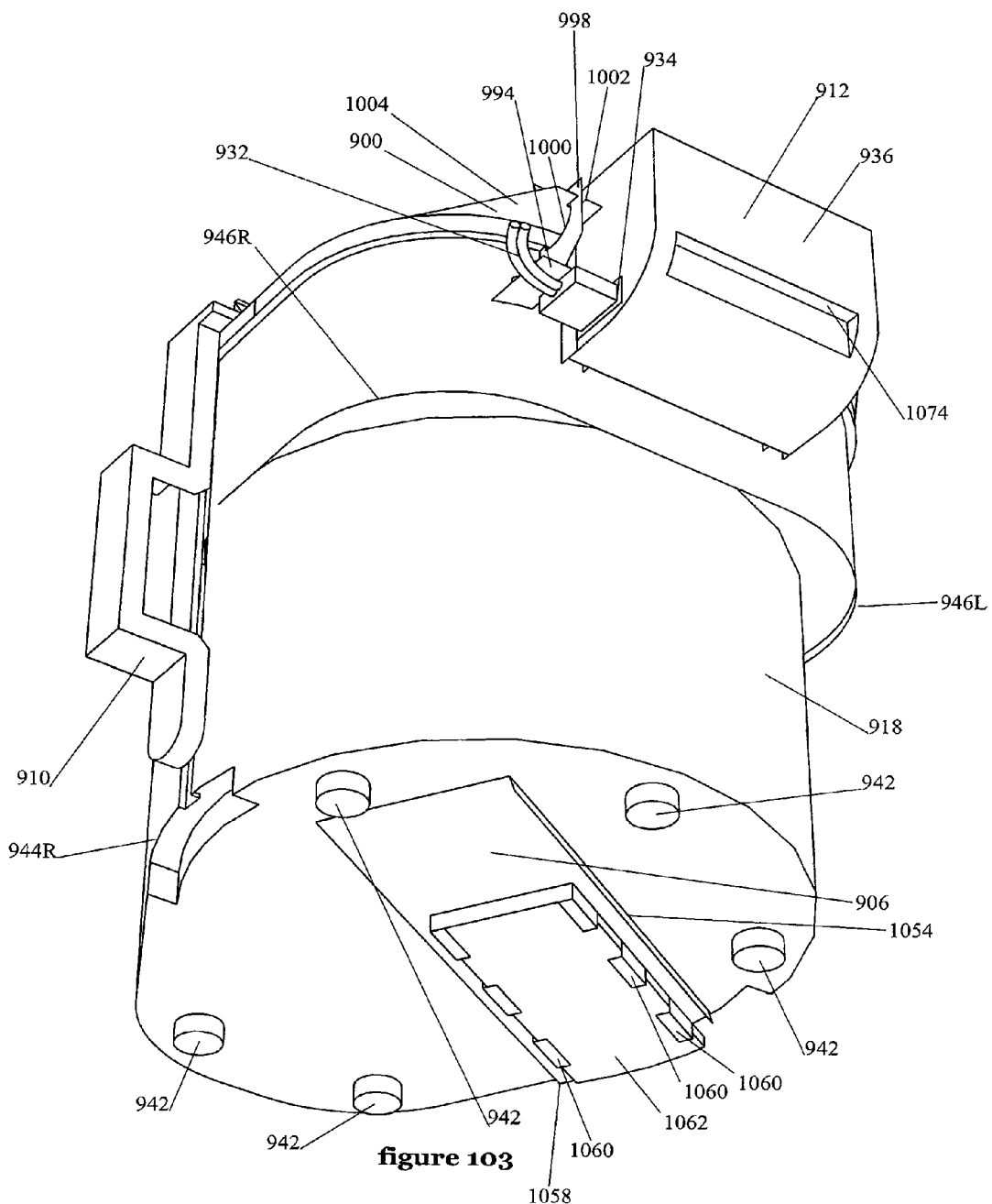
FIG. 103 is a lower rear perspective view of the embodiment shown in FIGS. 90 through 97.

Feet 942 (FIGS. 102 and 103) elevate the bottom of outer enclosure 918 from the surface on which it rests. This elevation helps prevent heat damage to countertop surfaces. Feet 942 may have pliable outwardly domed the lower surfaces. Such construction reduces embodiment rocking when the embodiment is placed on uneven surfaces.

Lower handles 944R and 944L located on the lower right and left hand perimeter of outer enclosure 918 (see FIGS. 95 and 96), and upper handles 946R and 946L located on both sides of the back of outer enclosure 918, make it much easier for the exemplary embodiment to be: lifted, tipped, carried, dumped and otherwise maneuvered.

Figure 105:
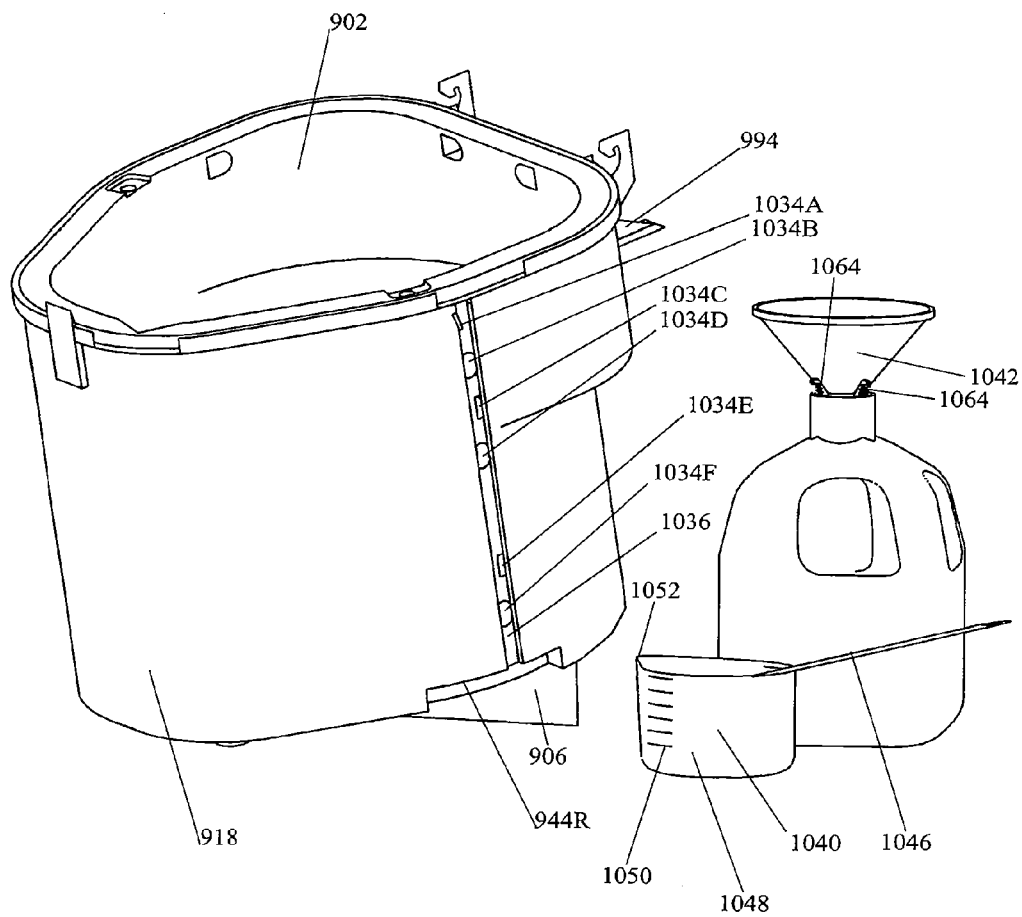
FIG. 105 is a forward perspective view of the components shown in FIG. 100 except outer enclosure 918 is tilted forward at an angle by prop member 906.

FIG. 105 illustrates how the rounded coffin shape of the lower cross section of cooking vessel 902, which is generally broad and circular at one end and tapers back and away from the generally broad and circular end to have a generally narrower opposite end, efficiently fits fowl 908, such as a chicken or a turkey, with minimal wasted space. This cross-sectional shape also is able to efficiently accommodate substantial quantities of other foods to be fried or steamed or otherwise cooked.

Other fryers have lower cooking pot cross sections which are generally symmetrical along two orthogonal horizontal axes. The exemplary embodiment as illustrated by contrast, is generally symmetrical to one horizontal axis only, while being asymmetric to any horizontal axis which is orthogonal to this first horizontal symmetrical axis.

This efficient rounded coffin shape cross-section may be used in any orientation. As nonlimiting examples: the narrow end can face toward the user, or away from the user, or be rotated to any angle in between. In combination with this, it may be generally horizontal as illustrated, or rotated up to where the narrow end is vertically above the broad and circular end, or rotated down to where the narrow and is vertically below the broad and circular end, or any angle in between. In combination with both of the above, it may be rotated so that large fowl 908 rests generally on its back, or on its breast, or on its head end, or on its tail end, or on its side, or any angle in between.

This efficiency, when frying, reduces the amount of cooking oil needed to cook fowls, and particularly to cook large ones. This in turn reduces operating costs and warmup times. This efficiency also, in all cooking situations, reduces the countertop footprint needed for the exemplary embodiment when it is compared to other fryers using alternative shaped cooking vessels to cook equal sized fowls and other foods.

As shown in FIGS. 90, 91, 98 and 99C, cooking vessel 902 has a broader cross-section at its top than in its lower portion. It is common when deep fat frying for cooking oil to foam and expand its volume. The broader cross-section in the upper portion of cooking vessel 902 reduces the chance of foaming cooking oil overflowing cooking vessel 902 by providing additional room for the expanding cooking oil to habitate. This geometry also reduces the chance that foaming cooking liquid will overflow cooking vessel 902 resulting in the loss of cooking liquid for the cooking process.

Overflow holes 948*a*, 948*d*, and 948*e* (FIGS. 90 and 91) help drain off excess cooking liquid and foam to greatly reduce the likelihood of cooking vessel 902 overflowing on to a countertop. Excess liquid and foam exiting through the drain holes drain directly into the bottom of outer enclosure 918 where they can be easily dumped or otherwise emptied. Alternatively, the drain holes may drain into a container placed in the bottom of outer enclosure 918. This container could be easily removed, dumped and cleaned. This container could also be, in yet a third alternative, located under the floor of outer enclosure 918 with outer enclosure 918 having one or more drain holes to empty into the container. In this configuration, as just one alternative, the container could hang below outer enclosure 918 and be pulled in and out like a drawer.

Overflow holes 948*a*, 948*d*, and 948*e* may be formed by punching holes into the sides of cooking vessel 902 and bending back the punched metal so that it is in close proximity or touching the inside upper perimeter wall of outer enclosure 918. This can enhance the structure of the exemplary embodiment, and help it resist damage, particularly in an accidental drop or during shipping.

Overflow drain holes 949A and 949B are shown indented into upper flange 920 of cooking vessel 902. Overflow drain holes 949A and 949B may be used in conjunction with, or instead of, overflow holes 948*a*, 948*d*, and 948*e*. Overflow drain holes 949A and 949B may drain in the same manner and into the same receptacles as overflow holes 948*a*, 948*d*, and 948*e*. Overflow drain holes 949A and 949B may penetrate through a lowered horizontal plane surface as shown, or through an angled surface which may be curved or flat, or through any other geometric configuration which will place upper flange 920 of cooking vessel 902 above drain holes 949A and 949B.

FIG. 120 shows overflow reservoir 996 which can be used in conjunction with any of the drain holes described above, simply by providing one or more passageways to reservoir 996 from the drain holes, such as, by way of a nonlimiting example, by placing one or more holes in the floor of outer enclosure 918. Overflow reservoir 996 may alternatively be used without any drain holes. By way of a nonlimiting example, upper flange 920 of cooking vessel 902 may be uniformly horizontal, angled, or may have one or more lowered sections. In each of these examples, cooking fluid would be allowed to overflow all or portions of upper flange 920 and subsequently drain into overflow reservoir 996. Outer enclosure 918 may loosely rest within overflow reservoir 996, or it may be wedge fitted, or latch fitted, or may be coupled by some other acceptable means.

Cooking vessel 902 may be constructed out of any suitable material. As an example, and not by way of any limitation, it may be constructed from: aluminum, copper, stainless steel, mild steel, or any other suitable material. This material may or may not be coated. As an example, and not by way of any limitation, it may be coated with a nonstick coating, or with a corrosion resistant coating such as chromium or nickel.

Downward facing flange 952 (FIGS. 99B and 99F) located on the upper perimeter edge of cooking vessel 902 engages into trough 950 located on the upper perimeter edge of outer enclosure 918 when cooking vessel 902 is inserted into outer enclosure 918. This helps increase the structure of the device and makes it easy to remove cooking vessel 902 from outer enclosure 918 simply by lifting cooking vessel 902 upward.

Bracing brackets 954 located in bottom inner perimeter of outer enclosure 918 (FIG. 117), directly contact, or come close to contacting cooking vessel 902. They provide additional structure both under normal use, and in the event of accidents, such as falling off a countertop, or impacts while shipping. Bracing brackets 954 may be formed as part of outer enclosure 918, or they may be additional parts. As but two examples, and not by way of limitation, outer enclosure 918 may be molded from polypropylene with bracing brackets 954 included as part of the molded part; or bracing brackets 954 could be made of metal, such as galvanized steel, and be mounted into outer enclosure 918.

Hand grip interruptions 956 cut into the outside right and left hand edges of trough 950 (FIGS. 91, 92, 93, and 95) allow the user to grasp downward facing flange 952 to help in the insertion and removal of cooking vessel 902 into and from outer enclosure 918. Overflow hole 948D and its corresponding counterpart on the right hand side of cooking vessel 902 which is not shown, may also may serve as finger/thumb grips to help in the insertion and removal of cooking vessel 902 into and from outer enclosure 918. Being able to easily insert and remove cooking vessel 902 into and from outer enclosure 918 may at least facilitate cleaning.

Latch 958 is located on the forward upper edge of outer enclosure 918. It secures lid 900 when lid 900 is lowered. Latch 958's barbed point 966 (FIGS. 119A and 119B) is resiliently biased toward the back of outer enclosure 918, causing latch 958 to catch on the backside of latch hole 960 and automatically latch lid 900 down when lid 900 is lowered.

Latch lock 962 rotates 964 (FIGS. 119A and 119B) to lock latch 958 closed (FIG. 119B) and rotates again to release the latch 958 before lid 900 can be reopened (FIG. 119A). This is both a safety feature, due to requiring two deliberate actions instead of just one to release latch 958 and open lid 900; and a structural feature to ensure latch 958 remain securely closed even when stressed, such as, by way of nonlimiting examples, during an accidental drop or during shipping.

Figure 90:
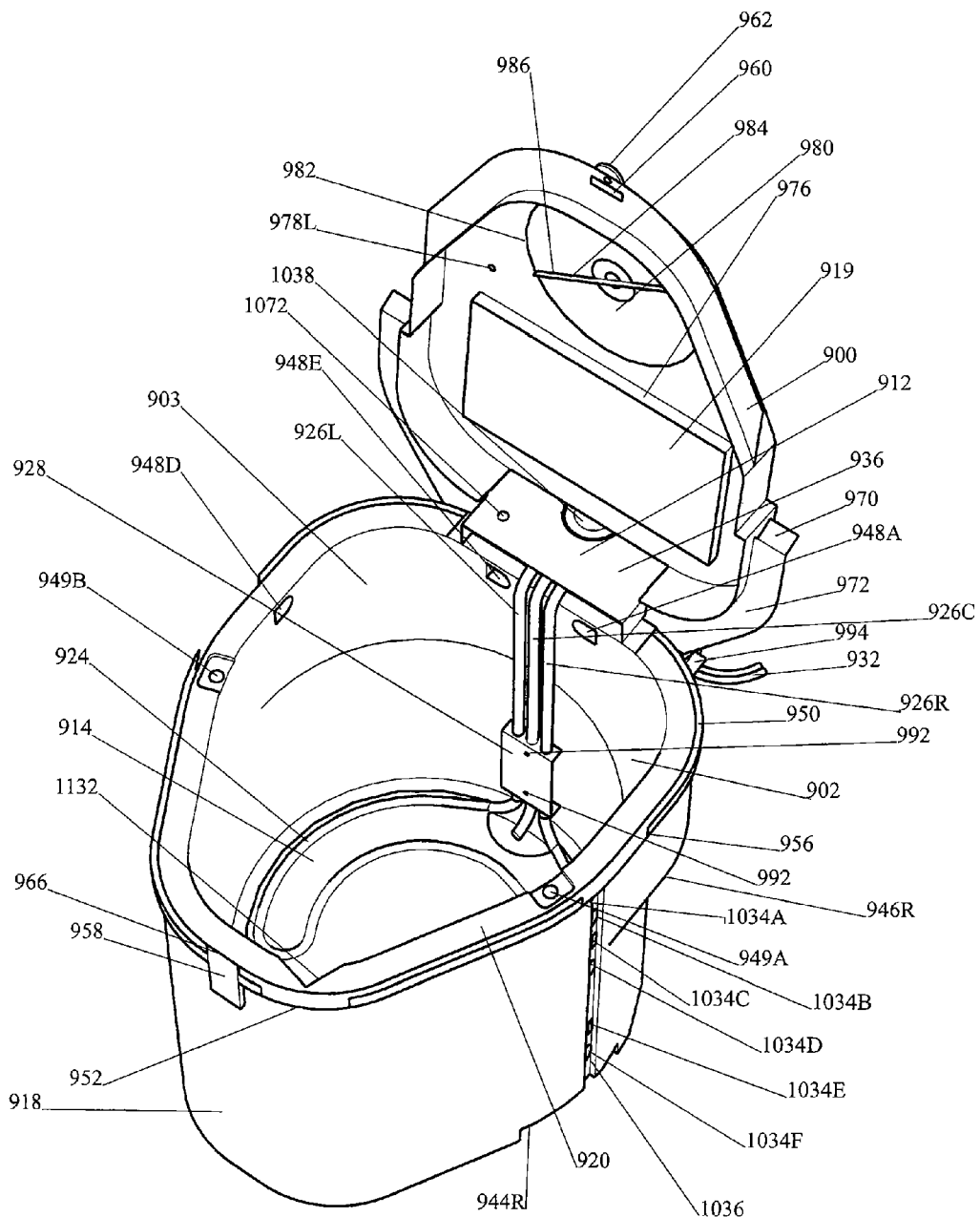
FIG. 90 is a forward perspective view of an additional exemplary embodiment with its lid 900 raised, and its food support assembly 910 removed, and the view looking down into the embodiment's cooking vessel 902.
Figure 94A:
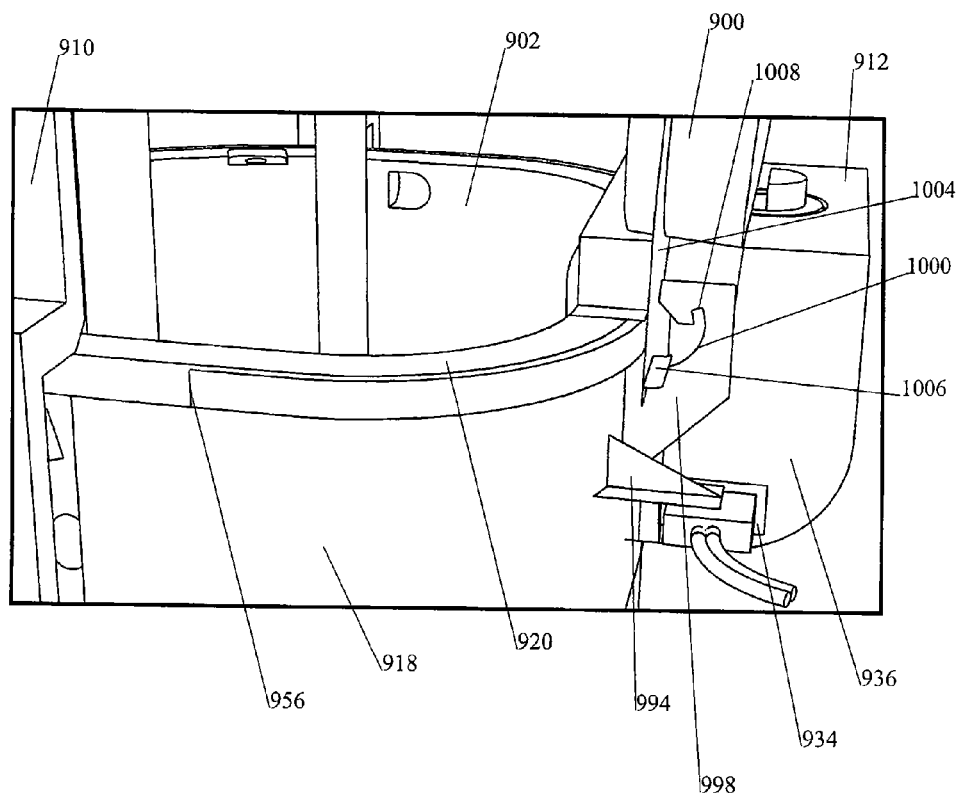
FIGS. 94A, 94B, and 94C are partial side perspective views of the exemplary embodiment shown in FIGS. 90 through 93 and showing close-ups of various embodiment details.
Figure 94B:
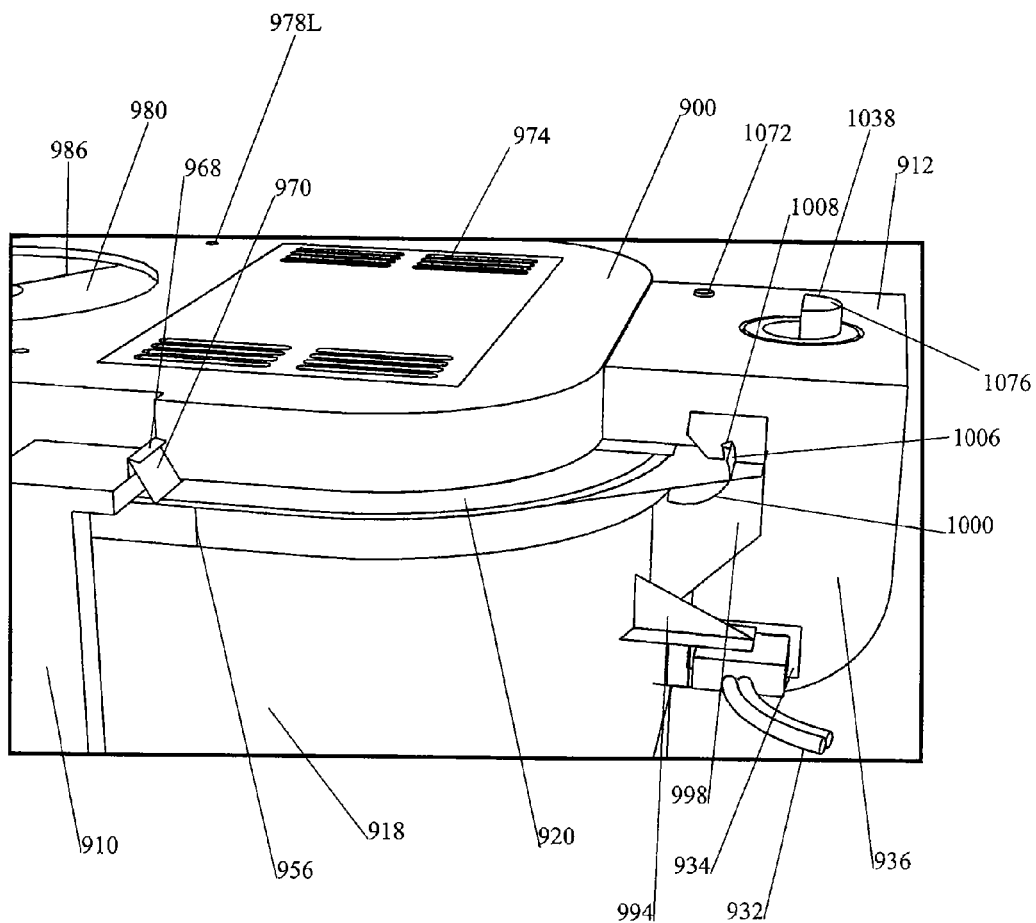
Figure 94C:
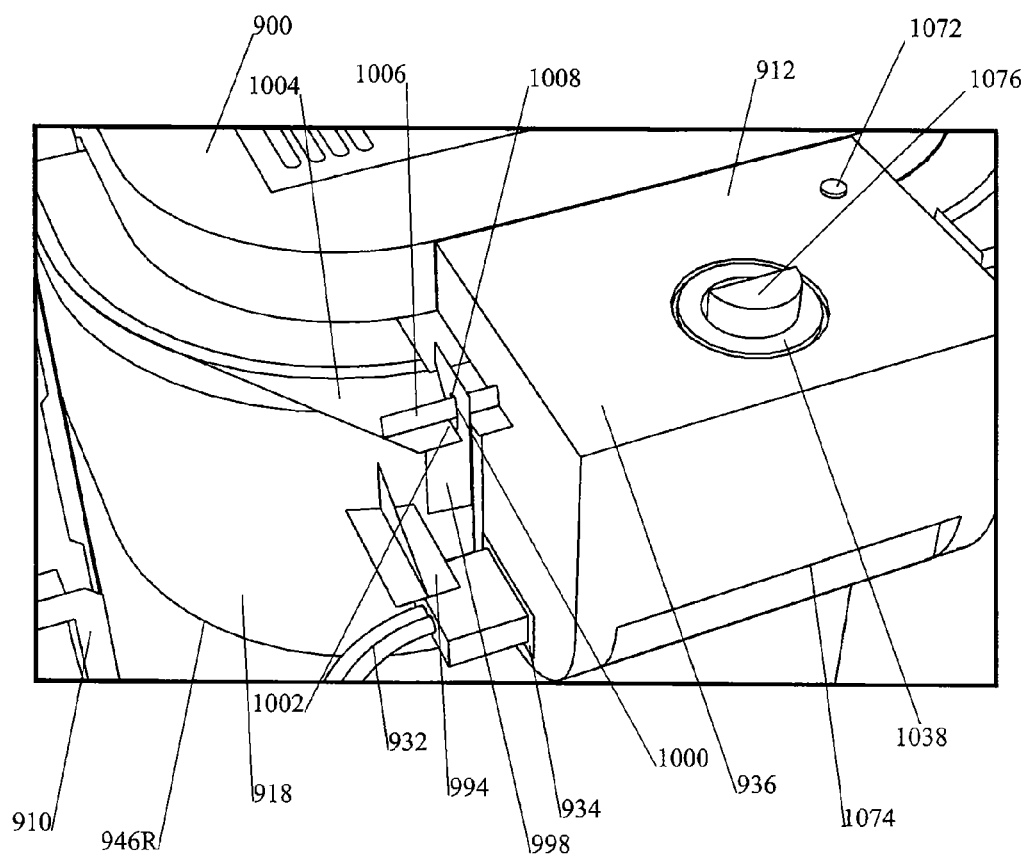

At its rear, lid 900 is coupled to the rest of the exemplary embodiment through a hand releasable hinge arrangement (FIGS. 94A, 94B, and 94C). This structure allows lid 900 to be fully closed (FIGS. 94B and 94C) or rotated open to a stable, just past vertical position (FIGS. 90, 91, and 94A). It also allows lid 900 to be easily disengaged from engagement with the rest of the exemplary embodiment simply by lifting lid 900 upward.

Referring to FIGS. 94A, 94B, and 94C, right hinge flange 998 is part of outer enclosure 918 and includes cut out 1000 which engages right slot 1002 located on the rearmost portion of horizontal outer flange 1004 of lid 900. Cut out 1000 limits the rotational travel of lid 902 to its open and close positions. When lid 900 is open (FIG. 94A), horizontal flange 1004 rests against the top of right hinge flange 998 and prevents lid 900 from falling further backward. When lid 900 is in its closed position (FIGS. 94B, and 94C), cut out 1000 limits the upward travel of the rear of lid 900 away from cooking vessel 902 by trapping lid 900's rear under the upper portion of cut out 1000 (FIGS. 94B and 94C).

When lid 900 is closed, rib 1006 is generally at right angles to and also is located on the rear of lid horizontal outer flange 1004 (FIGS. 94A, 94B, and 94C), engages into slot 1008 located on right hinge flange 998 as part of cut out 1000. This makes the engagement between lid 900 and outer enclosure 918 more secure by limiting fore and aft movement of lid 900.

The hinge arrangement described above is mirror imaged on the left-hand side of the exemplary embodiment.

Referring to FIGS. 94A, 94B and 94C, lid 900 is also held closed when food support assembly 910 is fully lowered to its cooking position (FIG. 93). Referring to FIGS. 94B, 95, 96 and 99D, hook 968 located on the rear top of food support assembly 910, latches onto resilient, cantilevered, forward angled rib 970 located on right perimeter flange 972 of lid 900 (FIG. 94B) and holds lid 900 in its closed position until food support assembly 910 is raised (FIG. 92). Similar structure is mirror imaged on the left-hand side of the exemplary embodiment. By being resilient; cantilevered, forward angled rib 970 allows lid 900 to lower and become latched under hook 968 even if food support assembly 910 is mistakenly in its lower most cooking position (FIG. 94) when lid 900 is lowered. Having lid 900 secured closed when food support assembly 910 is lowered is a safety feature which helps ensure lid 900 will not be accidentally raised when cooking is taking place.

Lid 900 secures filter 919 below filter vent holes 974 using a snap fit into rectangular vertical rib frame 976 (see FIGS. 90, 91, 95, 97, 99A, and 99D). Filter 919 is open on its lower side which faces into cooking vessel 902. Filter 919 helps to remove undesirable debris from cooking exhaust. Filter 919 is spaced away from the roof of lid 900 to allow circulation through all portions of filter 919. Filter 919 may be constructed from any of several different materials known to those knowledgeable in the art. As nonlimiting examples: filter 919 may be an open metal mesh, or an open plastic mesh, or a nonwoven substance such as nonwoven polyester, or fiberglass, or it may contain activated charcoal, or any other appropriate filtering material. Likewise, Filter 919 may be reusable or disposable. Filter 919 may work on any suitable filtering principle. As nonlimiting examples: it may condense pollutants onto cool surfaces, it may limit the size of particles, it may introduce substances to help exhaust be more benign, or it may use other advantageous principles.

Referring to FIG. 99A, probe holes 978R and 978L allow a user to insert an elongated tool or probe, such as the rod on a long stem cooking thermometer, into cooking vessel 902, as an example to test the temperature of cooked food or cooking liquid, without opening lid 900. This is a safety feature providing lid 900 as a safety barrier when such temperatures are being taken.

Lid 900 may be made of any suitable material. As an example, and not by way of any limitation, it may be formed from opaque material, such as the molded ABS or molded polypropylene. Lid 900 could also be formed from transparent or tinted transparent material, such as acrylic, polycarbonate, SAN, or other transparent material.

Alternatively, lid 900 may be molded from translucent plastic, such as polypropylene, which would allow ambient light to enter into cooking vessel 902. However, using a translucent material may not allow suitably clear observation of the contents of cooking vessel 902. Such clear observation may be useful, at least in determining the cooking progress of foods.

Circular glass 980, mounted in the forward upper portion of lid 900, allows clear observation of the contents of cooking vessel 902. Circular glass 980 is mounted with a snap fit into circular vertical rib frame 982 (see FIGS. 95 and 96). In combination with translucent material used to fabricate to lid 900, circular glass 980 (FIG. 99A) may provide unusually good observation of the contents being cooked in cooking vessel 902, particularly when compared to other deep fryers having mostly opaque lid surfaces.

Lid 900 may be virtually or totally monolithic. As an example, and not by way of any limitation, it may be molded in a single piece from clear, opaque, or translucent material without having circular glass 980. This could provide substantial cost savings and increase reliability, structure, and durability.

Being completely monolithic, as an example, being molded as a single piece without glass 980, or being almost monolithic, as shown, with the presence of glass 980, may allow lid 900 to be easily cleaned by hand or in a dishwasher.

During the cooking process, condensation and debris may collect on the inward side of circular glass 980. Referring to FIGS. 90 and 92, in order to help prevent this from obscuring clear observation of the contents of cooking vessel 902, rotary wiper 984 may be hand rotated using knob 988, causing its wiper blades 986 to rotate against the inside of glass 980 and thus to wipe and clean the inside of circular glass 980. Flange 990, located at the base of knob 988 and above the upper surface of circular glass 980 (FIG. 92) helps prevent users from getting burned on circular glass 980 when knob 988 is being hand turned.

Referring to FIG. 99A, food support assembly 910 includes right hand handle assembly 1010 and left hand handle assembly 1012 respectively which are removeably attached to food support platform 940. Right hand handle assembly 1010 includes right hand grip 1014 which is rigidly coupled to right handle support member 1016. Right handle support member 1016 at its base is bent at right angles and away from right hand grip 1014 (see FIG. 99A).

Also referring to FIG. 99A, this bent end of right handle support member 1016 slides into, and removeably mounts into right handle mounting track 1018 located on the right side of support platform 940. Referring to FIG. 99E, once fully slid into track 1018 the bent end of right handle support member 1016, engages food support platform 940 through right latch member 1020 located on the bent end latching against right resilient latch member 1022. Right hand handle assembly 1010 may be released from engagement with food support platform 940 by pulling down on the end 1021 of right resilient latch member 1022 and pulling right hand handle assembly 1010 away from food support platform 940. This structure is mirrored on the left side of the food support assembly.

Food support platform 940 has holes in its floor to facilitate draining of cooking liquid. Food support platform 940 includes solid perimeter wall 1024 which provides structure and helps support food placed upon food support platform 940 (FIG. 99E).

Figure 99D:
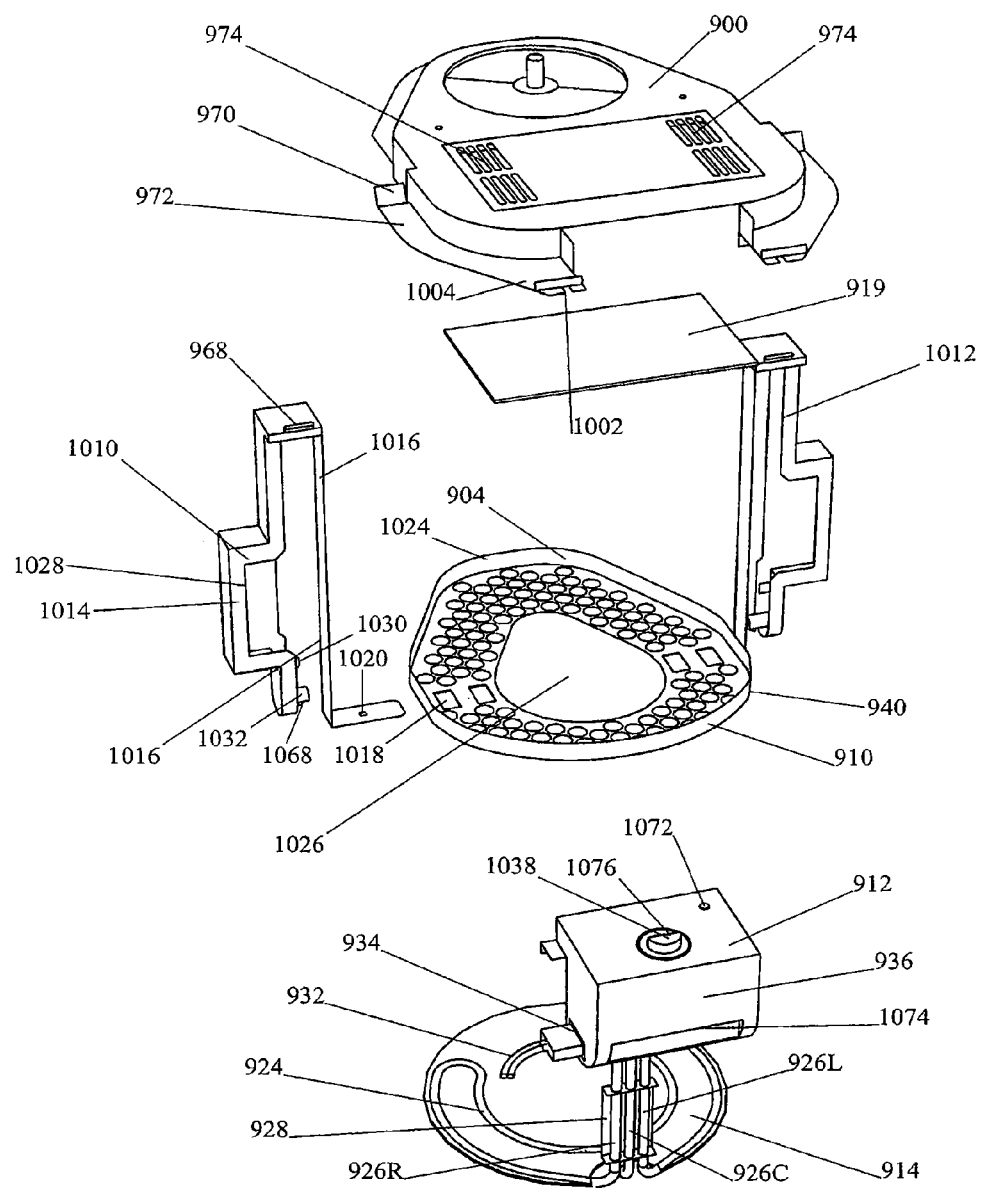
FIG. 99D, is a close-up of the upper portion of FIG. 99C.
Figure 99E:
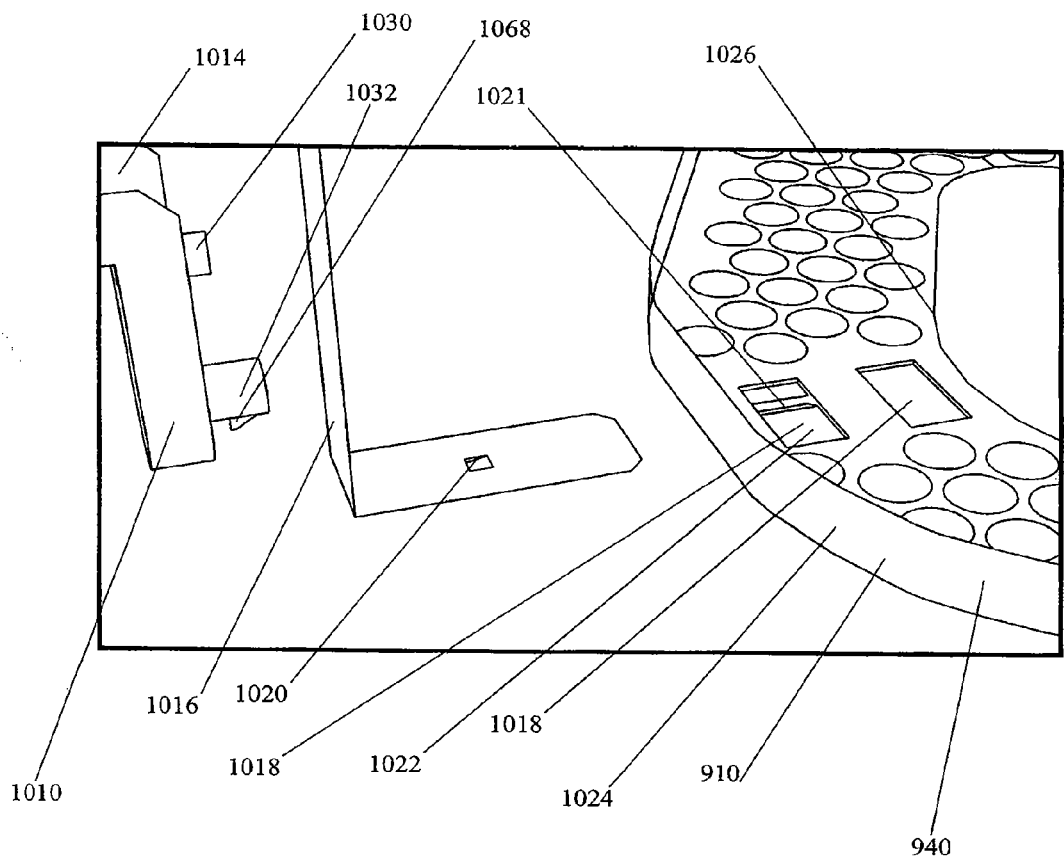
FIG. 99E, is a close-up of FIG. 99C showing a portion of the right side of the food support assembly 910.
Figure 99F:
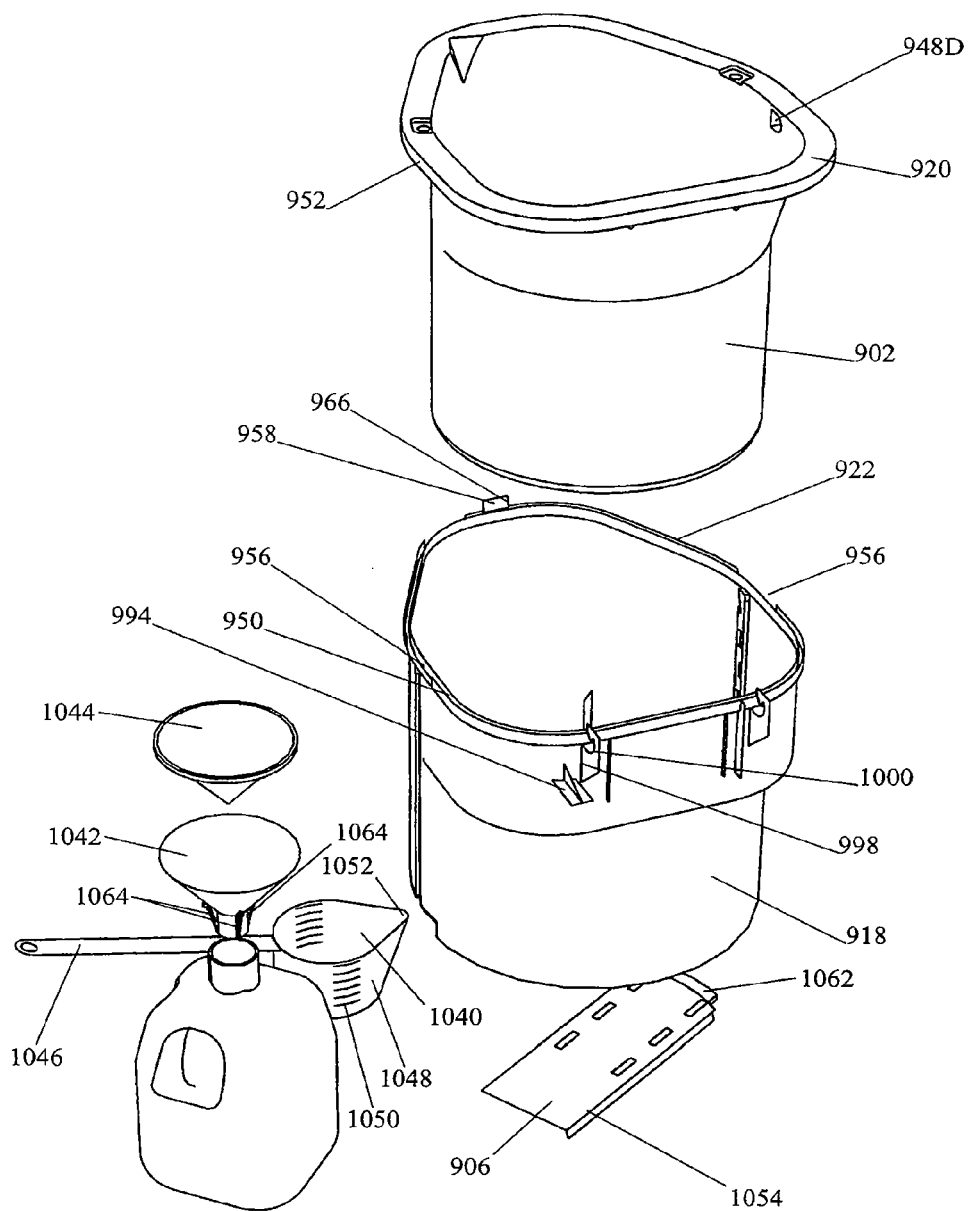
FIG. 99F, is a close-up of the lower portion of FIG. 99C.

Referring to FIGS. 99A, and 99D, large central hole 1026, located generally in the center of food support platform 940 helps steady food placed upon food support platform 940 and allows food placed upon food support platform 940 to rest as low as possible within cooking vessel 902, which, by way of example, may result in less cooking oil being needed to cover food being cooked, which in turn may result in lower operating costs and quicker warm up and overall cooking times.

Right handle support member 1016 rigidly connects at its top to right hand grip 1014. Midway down right hand grip 1014 is right handle indent 1028 which provides a grip point for the user.

Further down still on right hand grip 1014 are right upper engagement member 1030 and right lower engagement member 1032 (see FIG. 99E). Right upper engagement member 1030 and right lower engagement member 1032 cooperatively engage engagement holes 1034A and 1034B, or 1034C and 1034D, or 1034E and 1034F (FIG. 97) to mount food support assembly 910 in respectively: it's forward tilted uppermost drainage position (FIG. 95), in its horizontal middle food insertion position (FIG. 96), or in its horizontal lower most cooking position (FIG. 93). This engagement is aided by barb 1068 (FIG. 99E) located at the end of right lower engagement member 1032. Barb 1068 engages the lower portion of each appropriate engagement hole and helps prevent right lower engagement member 1032 from being accidentally disengaged.

This engagement between engagement members 1030 and 1032, and their respective engagement holes is also aided by right handle support member 1016 acting like a leaf spring which biases engagement members 1030 and 1032 against right the side of outer enclosure 918 where they may be spring loaded into their respective engagement holes. Again, this action is mirror image of the left side of outer enclosure 918.

An alternative to the essentially horizontal axis of right lower engagement member 32 is to incline right lower engagement member 32 downward 10° to 60° as it extends out and away from right hand grip 1014. This provides natural engagement which increases as weight on food support assembly 910 increases. Such a configuration may also eliminate the need for barb 1068.

Note, all structure and actions described herein for the right hand side of this exemplary embodiment for mounting food support assembly 910 to outer enclosure 918 are mirror imaged on the exemplary embodiment's left-hand side.

Also note that all referenced figures within this document are given to help in more quickly understanding the features of the exemplary embodiments. They are not intended as a substitute for reviewing all information within this document to understand the teachings herein.

To accomplish the engagement between food support assembly 910 and outer enclosure 918, a user pulls right handle indent 1028 and its mirror image counterpart on the left side away from food support platform 940. This is made possible through the ability of right handle support member 1016, and its counterpart on the left-hand side, to resiliently bend allowing outward excursion of the lower portion of right hand grip 1014.

This in turn may be possible by constructing right handle support member 1016 from any suitable resilient material. This, by way of nonlimiting examples, could include constructing it from: stainless steel, aluminum, mild steel, or other suitable material.

Right lower engagement member 1032 is inserted into right open track 1036 located on the right side of outer enclosure 918 and is slid up and down until it reaches the desired position, and then it is inserted into the appropriate engagement hole (see FIGS. 90, 99A, and. 99B). Right open track 1036 makes it easier to slide engagement members 1030 and 1032 up and down and find their respective engagement holes.

Having two engagement members, right upper engagement member 1030 and right lower engagement 1032 (FIG. 99E), helps stabilize the food support platform from tipping forward or backward.

Once again, these structures and actions are simultaneously replicated and mirrored on the exemplary embodiment's left-hand side.

Right upper engagement holes 1034A and 1034B are angled off vertical (see FIGS. 95, 97 and 104) to cause food support 904 to tilt forward to aid in draining of foods including large and small fowl, as well as other foods.

Right upper engagement member 1030 and right lower engagement member 1032 are different in shape. This difference prevents engagement member 1032 from being mistakenly placed into a hole design for engagement member 1030, as an exemplary benefit. Because of this, food support assembly 910 slides smoothly up and down guided in open track 1036 until it reaches one of its three predesignated food holding positions.

Although three food support assembly 910 positions are described, more positions can be easily added as desired simply by adding more engagement holes.

Figure 98:
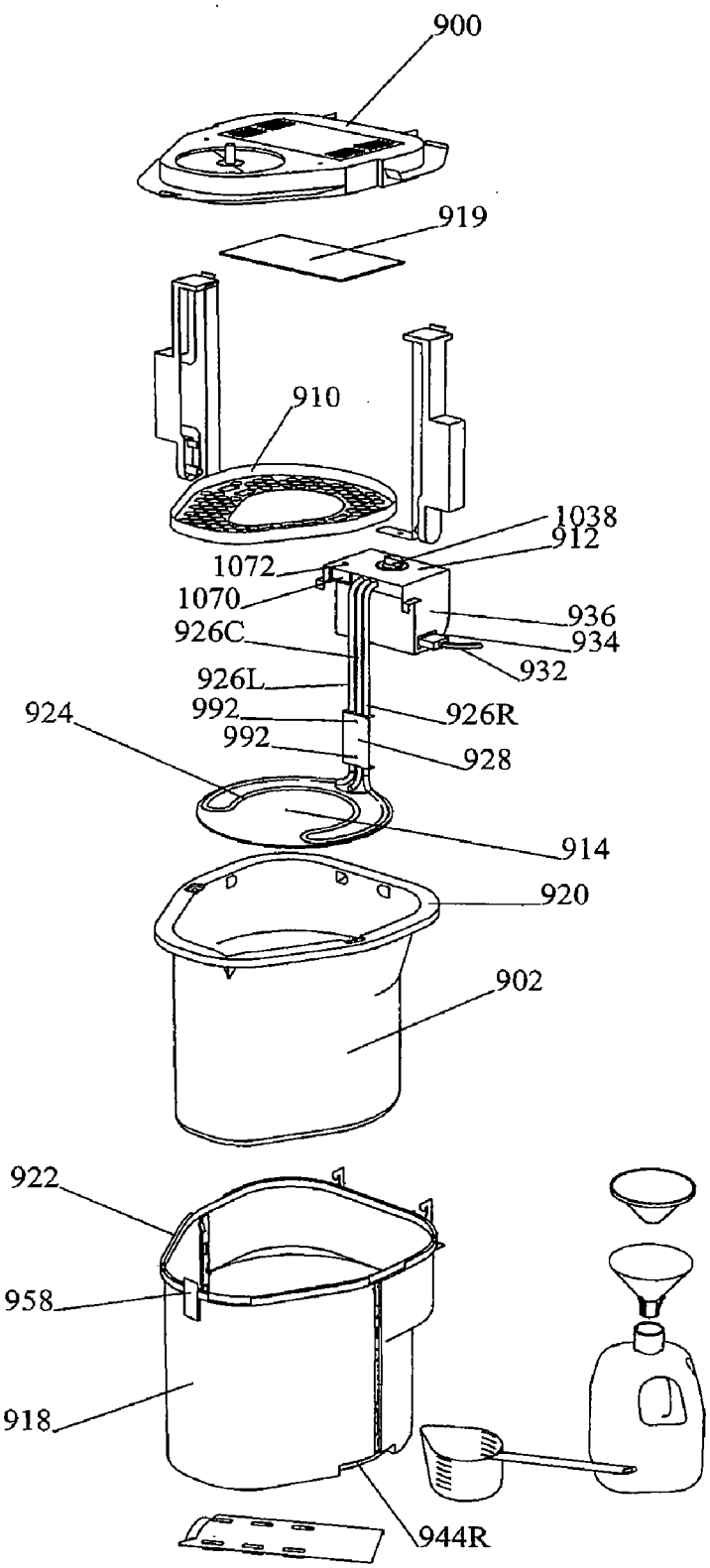
FIG. 98 is a forward exploded perspective view of the embodiment shown in FIGS. 90 through 97.

Control box 912 is mounted to cooking vessel 902 and outer enclosure 918 by control box 912 straddling the upper overlapping rear edges of both the structures (FIGS. 95, 96, and 98). Electric heater unit 924 suspends downward from control box 912 into cooking vessel 902 (FIG. 98). Control box 912 includes user set timer 1038 which turns on and off heater unit 924, and sounds an alarm simultaneously with turning off the heater (FIG. 98).

Cooking liquids can be heated to predictable desired temperatures simply by using timer 1038 to adjust the amount of time the cooking liquid is heated during warm-up.

Likewise, timer 1038 may be used to time the cooking cycle using its alarm. Timer 1038 may also be a safety feature by having no continuously on position and thus limiting to the timer limit the maximum amount of time the heater is on for.

As shown in FIGS. 91 and 96, user access to user set timer 1038 is blocked when lid 900 is in its raise position. This is a safety feature preventing the user from turning on timer 1038, and thus electric heater unit 924, until lid 900 is lowered.

Also, timer 1038 has raised half moon shaped central portion 1076 (FIGS. 94C, 96 and 99D) which serves as a finger grip and also prevents lid 900 from being fully opened until timer 1038 is in its full off position. This also is a safety feature.

Using this exemplary embodiment may include several steps. As an example of one way of using the exemplary embodiment, and not by way of any limitation, the following process may be used. Note that there are several other alternative methods for using this exemplary embodiment.

First, the user must open lid 900, remove food support platform 910, and pour in the appropriate amount of cooking liquid. This may be aided through the use of cooking fluid level indication holes 992 on bracket 928 (FIGS. 90 and 116).

Next, the user must place the food to be cooked into cooking vessel 902. This may be done by placing food support assembly 910 on a countertop and placing the food to be cooked on to it, and then lifting the food and support assembly into the cooking vessel and securing food support assembly 910 at its mid-level food insertion/removal position as described above (FIG. 91). Lid 900 is then lowered and latched closed including locking the latch using latch lock 962 (see FIGS. 119A and 119B).

Next, the user must set timer 1038 to the appropriate time for heating the cooking liquid to the desired temperature. Note, the exemplary embodiment could have an adjustable thermostat. However, for reasons at least of: ease-of-use, cost, reliability, and simplicity, the illustrated exemplary embodiment uses a single temperature preset thermostat with backup thermal fuse.

Next, after the time set on timer 1038 has been reached and the cooking liquid is at cooking temperature, the user lowers food support assembly 910, and the food that it is holding, into the hot cooking liquid.

At the end of the desired cooking time, possibly triggered by the alarm from user set timer 1038, food support assembly 910 is raised by the user to either its intermediate or uppermost positions to allow the food to cool and drain. After the food has been cooled and drained, lid 900 is raised and food support assembly 910 and the cooked food is removed by lifting food support assembly 910 and the cooked food from cooking vessel 902 and back onto the countertop.

After cooling, cooking liquid may be removed from cooking vessel 902 using bailing ladle 1040 and funnel adapter 1042 (see FIGS. 98, 99B, 99C, 99F, 100, 101, 102, and 105). Funnel filter 1044 snaps into funnel adapter 1042 (see FIGS. 99, 100 and 101) and filters cooking liquids, such as cooking oil, as they are emptied from cooking vessel 902 to extend their useful life.

Filter funnel 1044 is designed to snap into the pouring openings of various size cooking liquid containers. As an example, and not by way of any limitation, filter funnel 1044 is designed to snap into the pouring openings of blow molded 1 gallon to 3 gallon containers commonly used in grocery stores to contain cooking oils such as: corn oil, vegetable oil, and canola oil. Notched ribs 1064 engage the interior perimeter of pouring openings on common blow molded and other containers and securely hold funnel adapter 1042 in an upright position.

Figure 100:
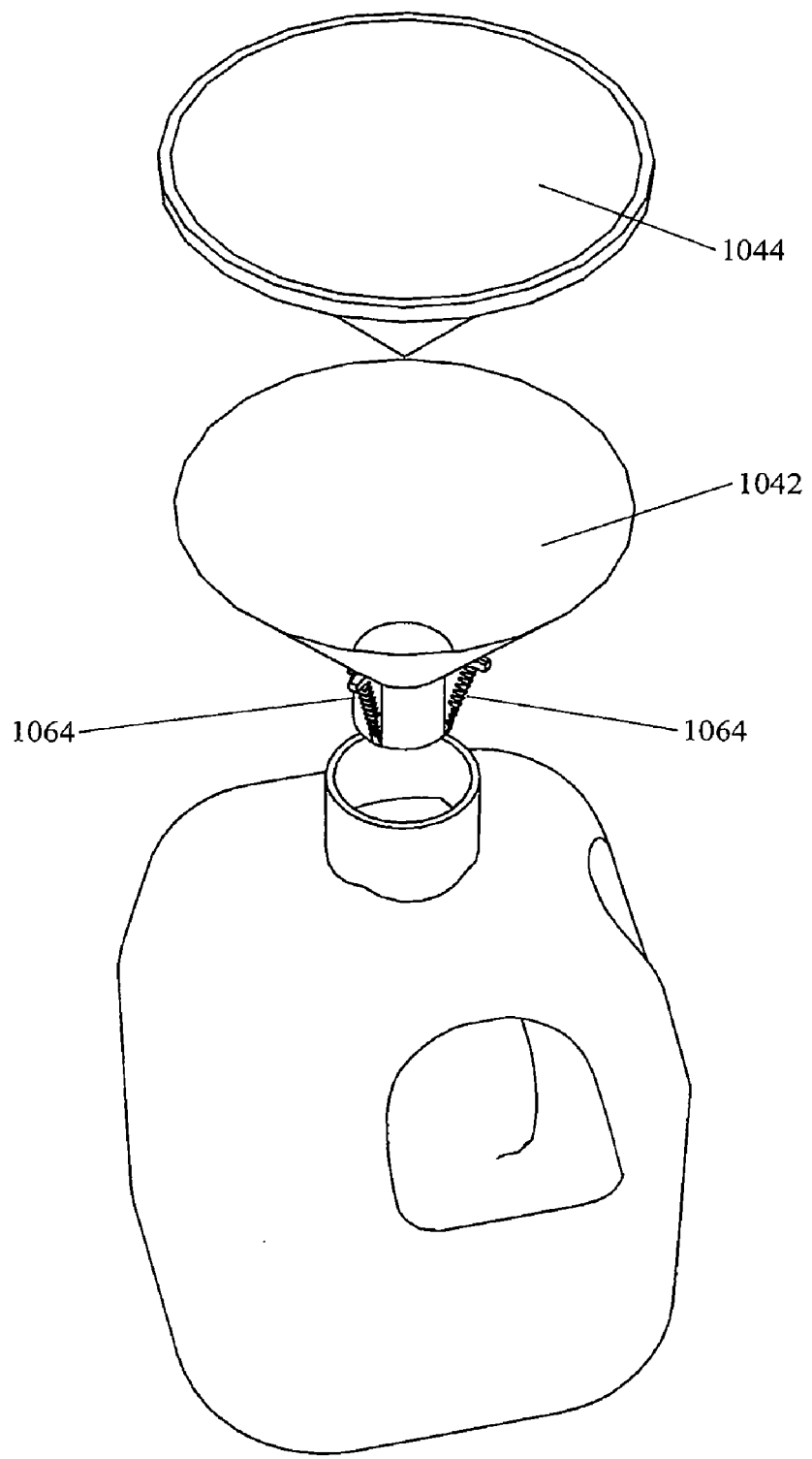
FIG. 100 is a forward exploded perspective view of components used to empty liquid from cooking vessel 902.
Figure 101:
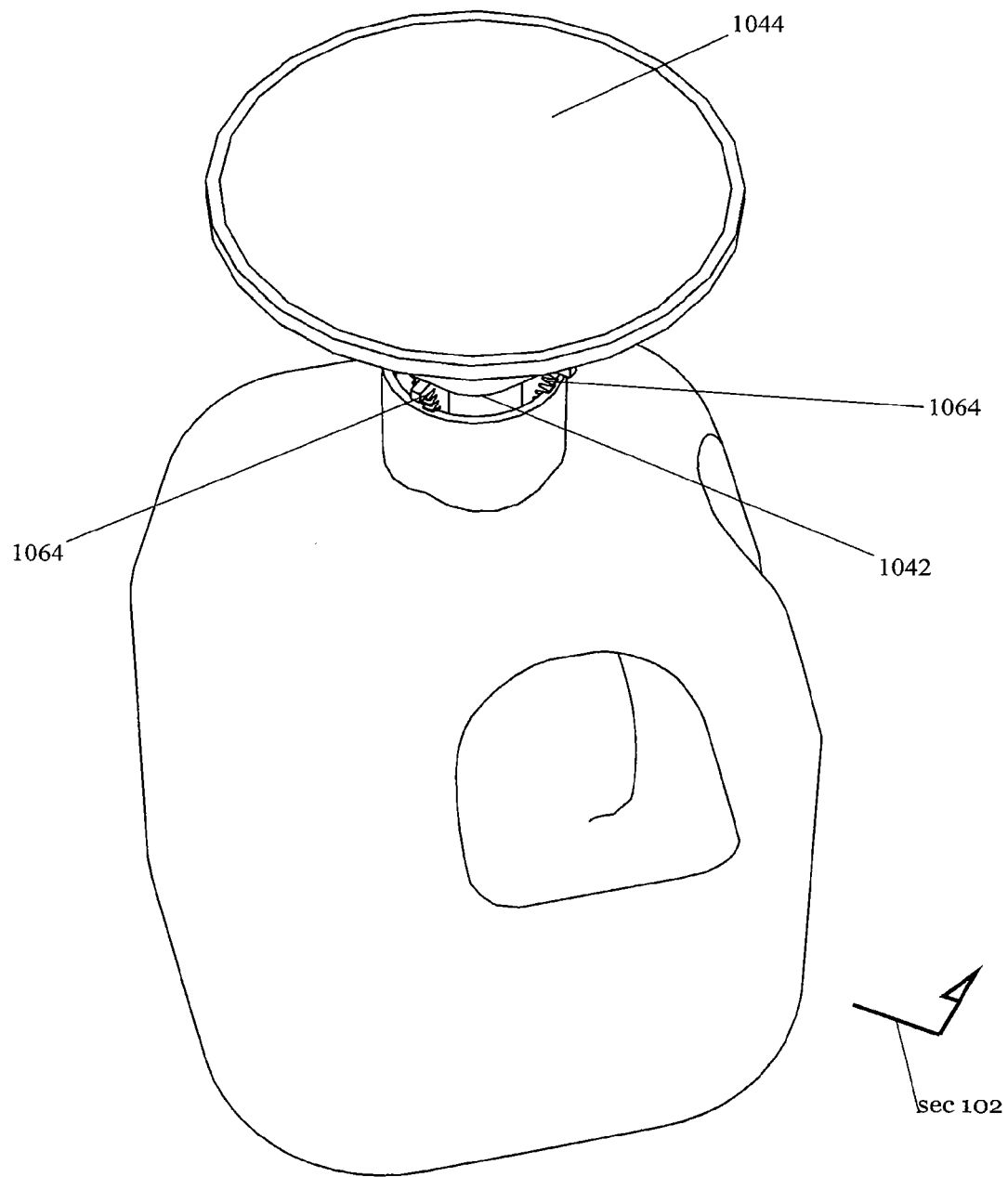
FIG. 101 is a forward perspective view of a subset of the components shown in FIG. 100.

Filter funnel 1044 is snapped into funnel adapter 1042, as a nonlimiting example, like snapping on a Tupperware® cap, as shown in FIGS. 99, 100, and 101. Filter funnel 1044 is spaced away from the interior wall of funnel adapter 1042 (FIG. 101) so that the interior wall of funnel adapter 1042 does not block cooking liquid from passing through the filter.

Filter funnel 1044 may use any of a variety of reusable or disposable filter mediums to filter out particulates, chemical impurities, grease, oil, and other impurities. By way of non-limiting examples: fine mesh screen, nonwoven polyester, activated charcoal, cloth, or any other appropriate filter mediums might be used. By way of an example which is not limiting: filter funnel 1044 could resemble conical home coffee strangers which have either permanent fine mesh screens, or use conical shaped disposable insert filters.

Emptying cooking vessel 902 of cooled down cooking fluid is accomplished by repeatedly bailing cooking vessel 902 using ladle 1040. This is most efficiently done with both food support assembly 910 and control box 912 removed from cooking vessel 902.

The bailed cooking liquid contents of cooking vessel 902 may be dumped into filter funnel 1044 which is press mounted into the pouring opening of a liquid container, such as the container which the cooking liquid may have been purchased in. This is desirable because it allows convenient storage of the cooking liquid or it allows the cooking liquid's clean disposal.

Ladle 1040 is specifically designed for bailing cooking vessel 902. Ladle handle 1046 is angled at 5° to 30° from ladle bucket 1048 so that ladle 1040 may reach deep inside cooking vessel 902. Ladle handle 1046 has a hole at one and so it may be hung.

Ladle bucket 1048 also has snout 1052 which protrudes forward off vertical 10° to 45° and is narrower at its tip than the corners of cooking vessel 902 so that ladle 1040 can fully bail out each corner of cooking vessel 902.

Ladle bucket 1048 also has markings 1050 which allow it to be used as a measuring device.

Referring to FIGS. 99F, 102, 103, and 104, outer enclosure 918 on the underside of its floor has prop member 906 which is attached to the underside of outer enclosure 918's floor by hinge 1054 and snap 1056. Snap 1056 (FIG. 99B) holds prop member 906 flat against the underside of the floor of outer enclosure 918.

Figure 104:
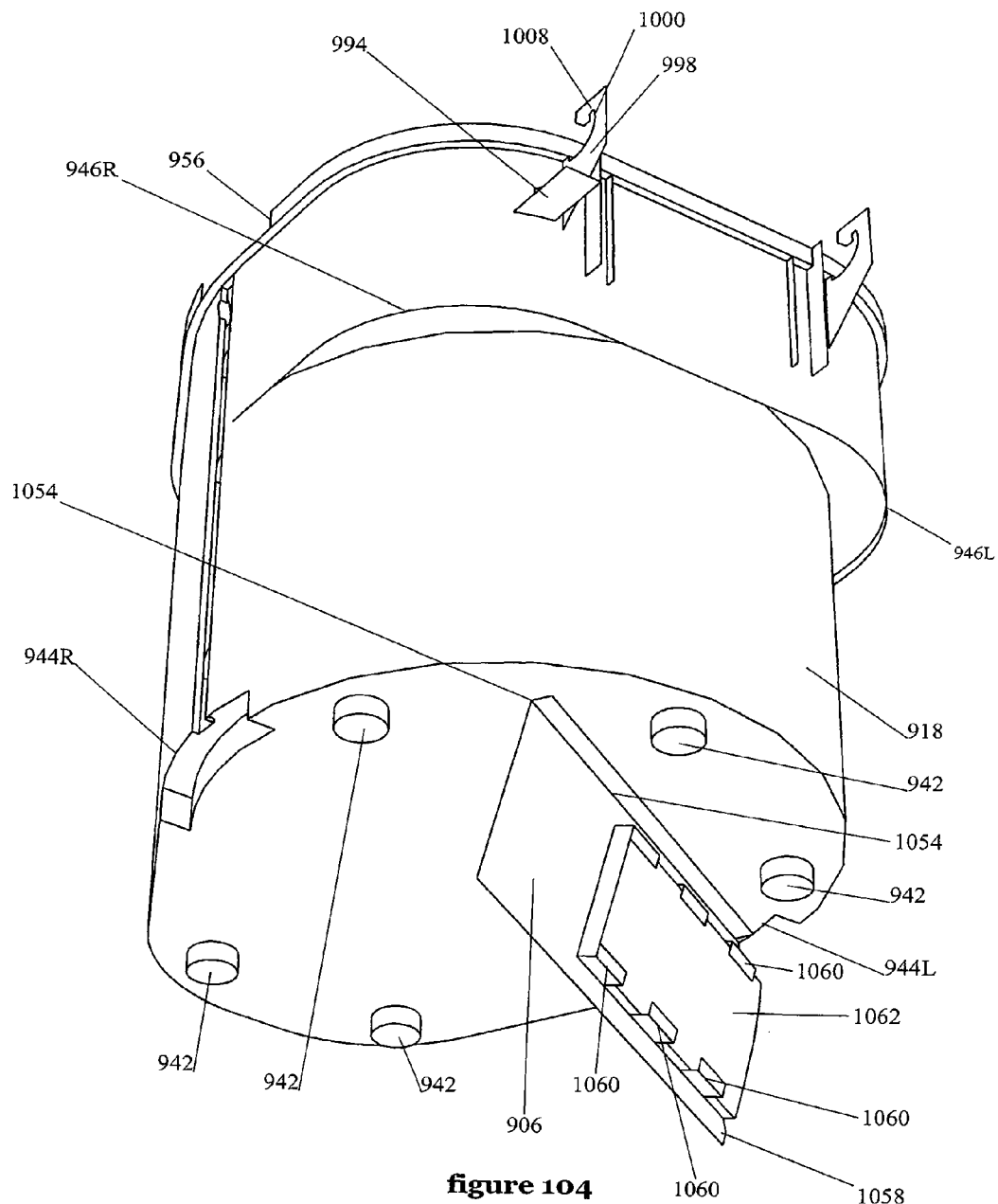
FIG. 104 is similar to FIG. 103 except prop member 906 is lowered, and lid 900, control box. 912 and food support assembly 910 are removed to facilitate emptying cooking vessel 902 of cooking liquid for cleaning for other purposes.

Prop member handle 1058 extending from the forward left hand corner of prop member 906 (see FIG. 99B) allows the user to swing prop member 906 from its position resting against the underside of the floor of outer enclosure 918 (FIG. 102) to a lowered position (FIGS. 103, and 104) where it can prop up and tilt outer enclosure 918 and cooking vessel 902 diagonally forward as shown in FIG. 104. This tilting increases the ease with which cooking vessel 902 may be bailed.

Pour spout 1132 allows cooking vessel 902 to be emptied by tipping it and pouring out its contents. This may be used instead of bailing, or to augment bailing. Tipping the exemplary embodiment and pouring out the contents of cooking vessel 902 is made much easier due to the presence of upper handles 946R and 946L and the presence of lower handles 944R and 944L which alone or in combination make lifting, tipping, and pouring easier.

The outer wall of trough 950 is interrupted directly adjacent to pour spout 1132 to prevent cooking liquid from entering into and dirtying trough 950 during the pouring process.

Brackets 1060 extending from the underside of prop member 906 (FIG. 102) hold information cards 1062 which can be pulled out at any time so that user can have information about the exemplary embodiment without having to find a recipe/instruction book. Information cards 1062 may also contain other information.

Ninth Embodiment

FIGS. 106 through 111 illustrate a variant of the just described exemplary embodiment. In this variant exemplary embodiment, control box 912 is replaced by automated control box 916.

Figure 106:
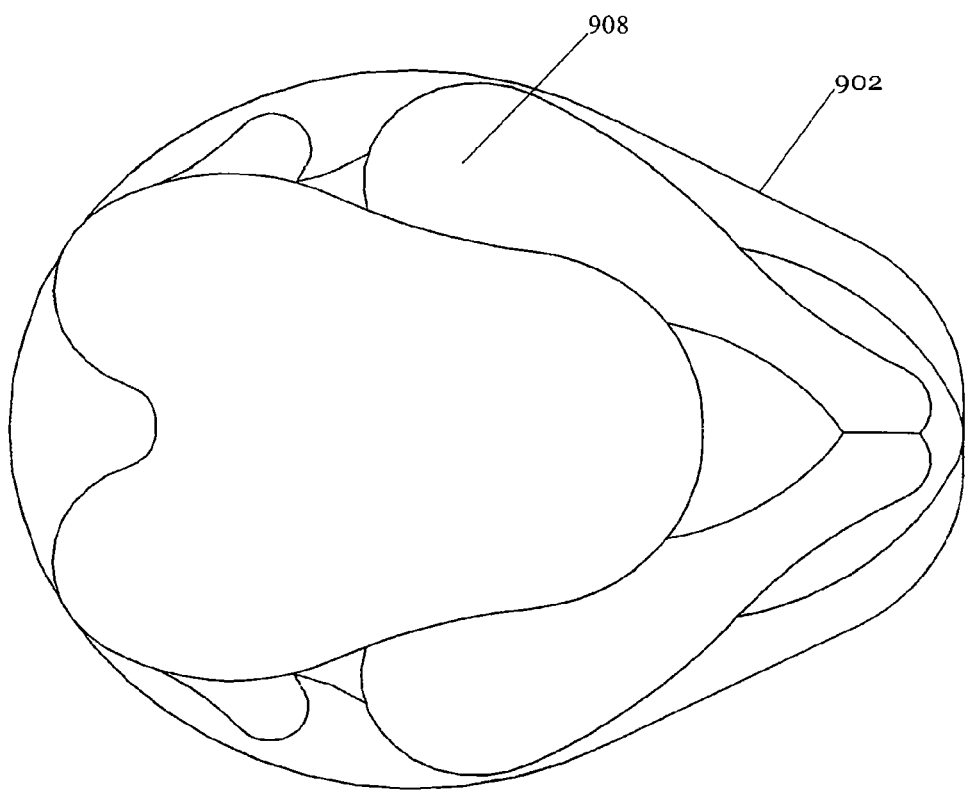
FIG. 106 is a plan section view, taken as indicated in FIG. 93, of large fowl 908 fitted within the lower portion of cooking vessel 902.

Referring to FIG. 106, automated control box 916 contains: a central portion of upper basket lift arm 1088, and a central portion of powered lower basket lift arm 1090. Powered lower basket lift arm 1090 in turn is connected through a central levered portion 1100 formed in powered lower basket lift arm 1090 to the lower end of connecting rod 1086, with the upper end of connecting rod 1086 being coupled to crank disk 1084, which in turn is connected to, and rotated 1092 by, the output shaft of gear reduced lifting motor 1080.

As seen in FIG. 106, all of the above mechanism is contained within automated control box 916. Automated control box 916 also contains electronic circuit 1082 which includes timer 1078. A microswitch (not shown), which rides on a cam (not shown) positioned on the back surface of crank disk 1084, is mounted behind crank disk 1084 and on the front face of the outer casing of gear reduced lifting motor 1080.

This microswitch/cam combination, is similar to those described earlier in this document for alternative exemplary embodiments, allows electronic circuit 1082 to sense the position of upper basket lift arm 1088 and powered lower basket lift arm 1090.

Upper basket lift arm 1088, and lower basket lift arm 1090 each protrude out both sides of automated control box 916 and extend forward to the central right and left hand sides of outer enclosure 918 (see FIG. 107) where they connect through upper pivot 1096R and upper pivot 1096L and through lower pivot 1098R and lower pivot 1098L (see FIG. 106) to right handle assembly connecting bracket 1102 and left handle assembly connecting bracket 1104 (FIG. 106).

Right handle assembly connecting bracket 1102 connects to right handle assembly 1106 through a vertical track sliding engagement. Likewise, left handle assembly connecting bracket 1104 connects to left handle assembly 1108 through a vertical track sliding engagement. Right handle assembly 1106 and left handle assembly 1108 are part of food support assembly 1110, and are slideably releasable by hand from the rest of food support assembly 1110. Right handle assembly 1106 and left handle assembly 1108, unlike for the direct previous exemplary embodiment, do not engage outer enclosure 918.

Upper basket lift arm 1088 exits automated control box 916 on its right side through right inverted "L" shaped elongated channel 1112, and exits automated control box 916's left side through left inverted "L" shaped elongated channel 1114 (FIG. 106). A user may slide, by hand, the central portion of upper basket lift arm 1088 to exit both sides of automated control box 916 through the top or bottom of both right inverted "L" shaped elongated channels 1112 and 1114.

This results in two different lifting geometries illustrated in FIGS. 108, 109, 110, and 111. When upper basket lift arm 1088 is in its lowest position exiting the elongated channels 1112 and 1114, food support assembly 1110 is horizontal in both its raised (FIG. 108) and lowered (FIG. 109). positions.

When upper basket lift arm 1088 is in its highest and most forward position exiting the elongated channels 1112 and 1114, food support assembly 1110 is horizontal in its lowered position (FIG. 111), but it is tipped forward for food drainage (FIG. 110) in its raised position.

Some foods, as a nonlimiting example, like French fries, are better cooked when they raise and lower on a horizontal food support. Some other foods, as a nonlimiting example, like turkeys, are better cooked if they are horizontal while cooking, but are tilted when they are drained and cooled at the end of the cooking cycle. The above structure advantageously provides both of these options.

Figure 107:
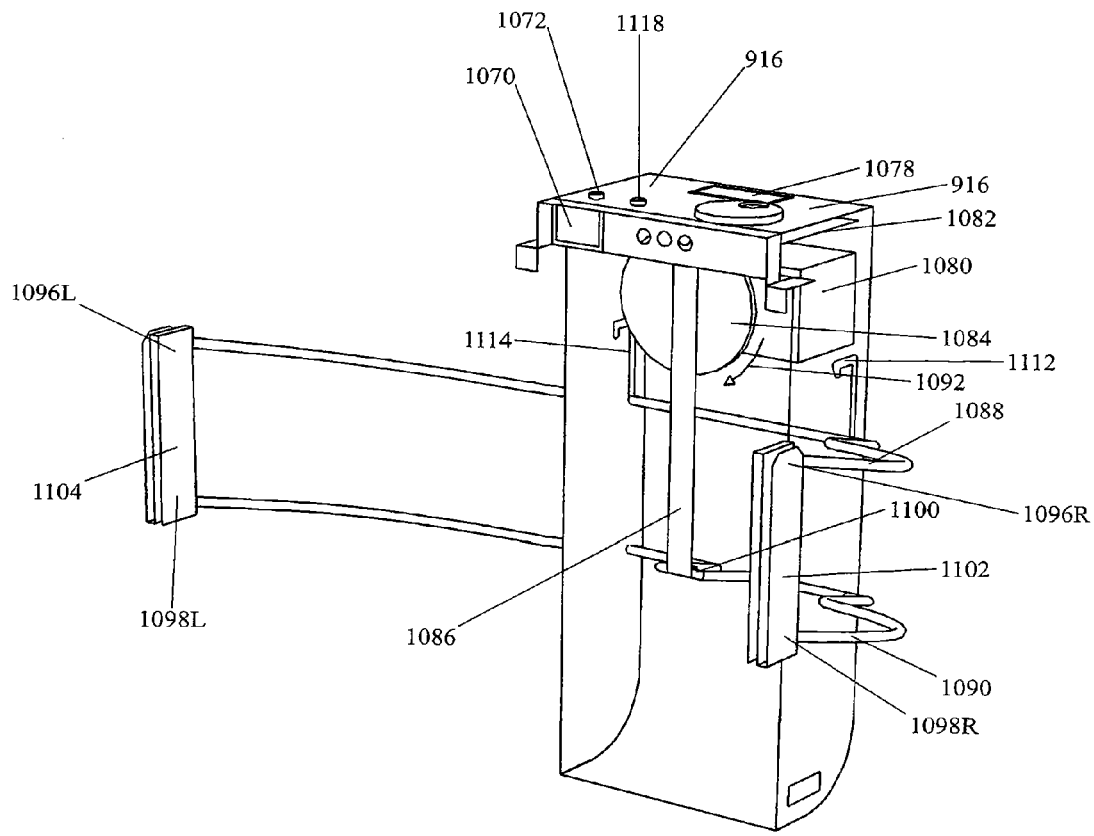
FIG. 107 is a forward perspective view of automated control box 916 with its forward walls ghosted out to reveal inner details.
Figure 108:
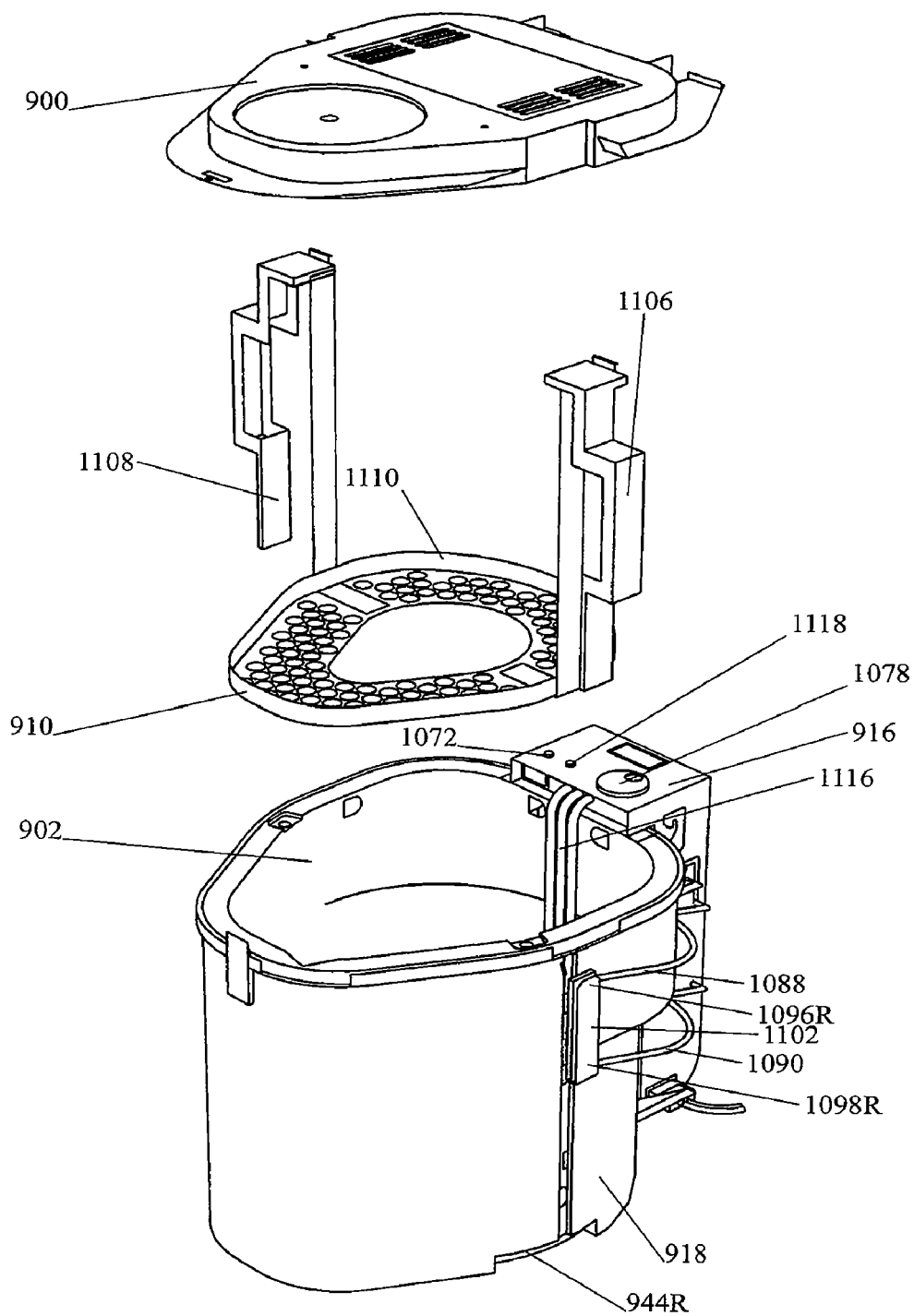
FIG. 108 is an exploded view of an exemplary automated version of the embodiment shown in FIGS. 90 through 97.
Figure 109:
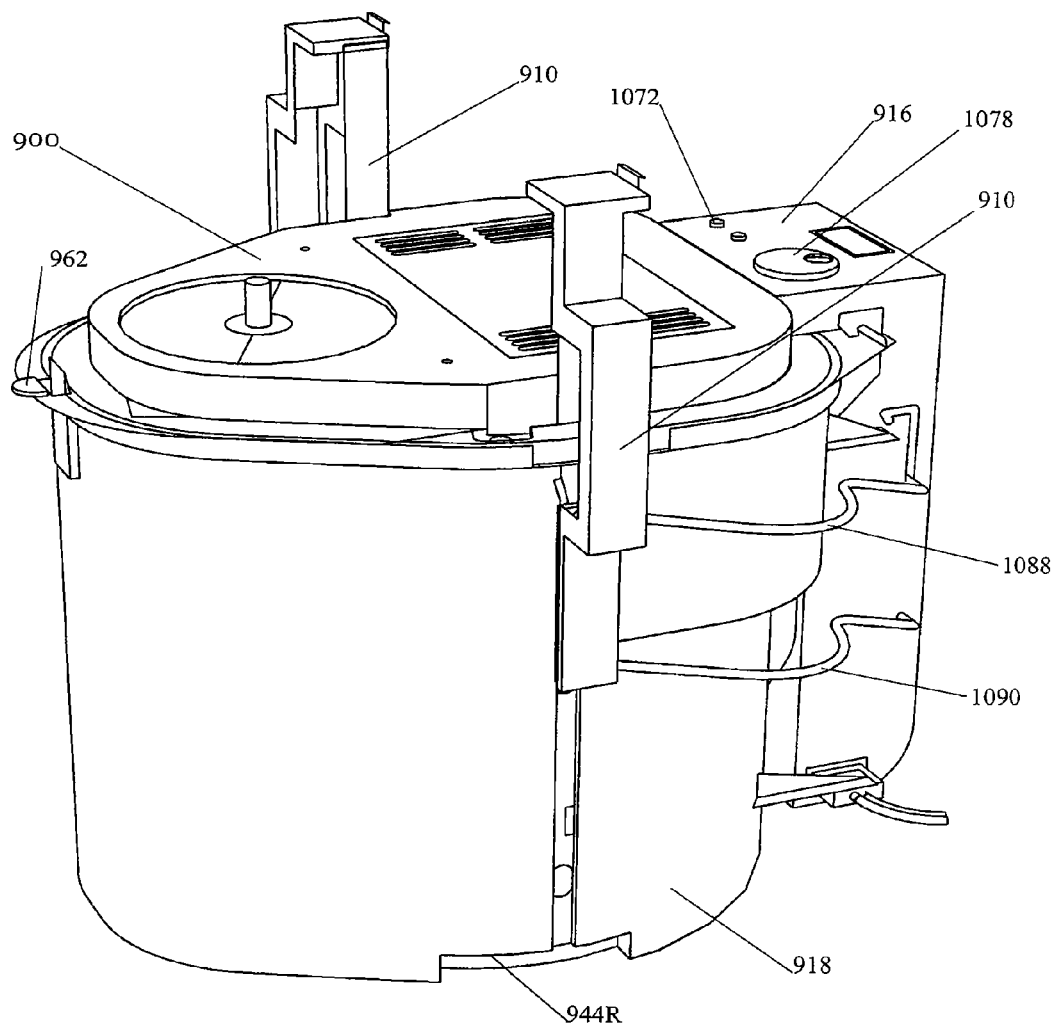
FIG. 109 is a side perspective view of the embodiment shown in FIG. 108 with food support assembly 910 raised and level.
Figure 110:
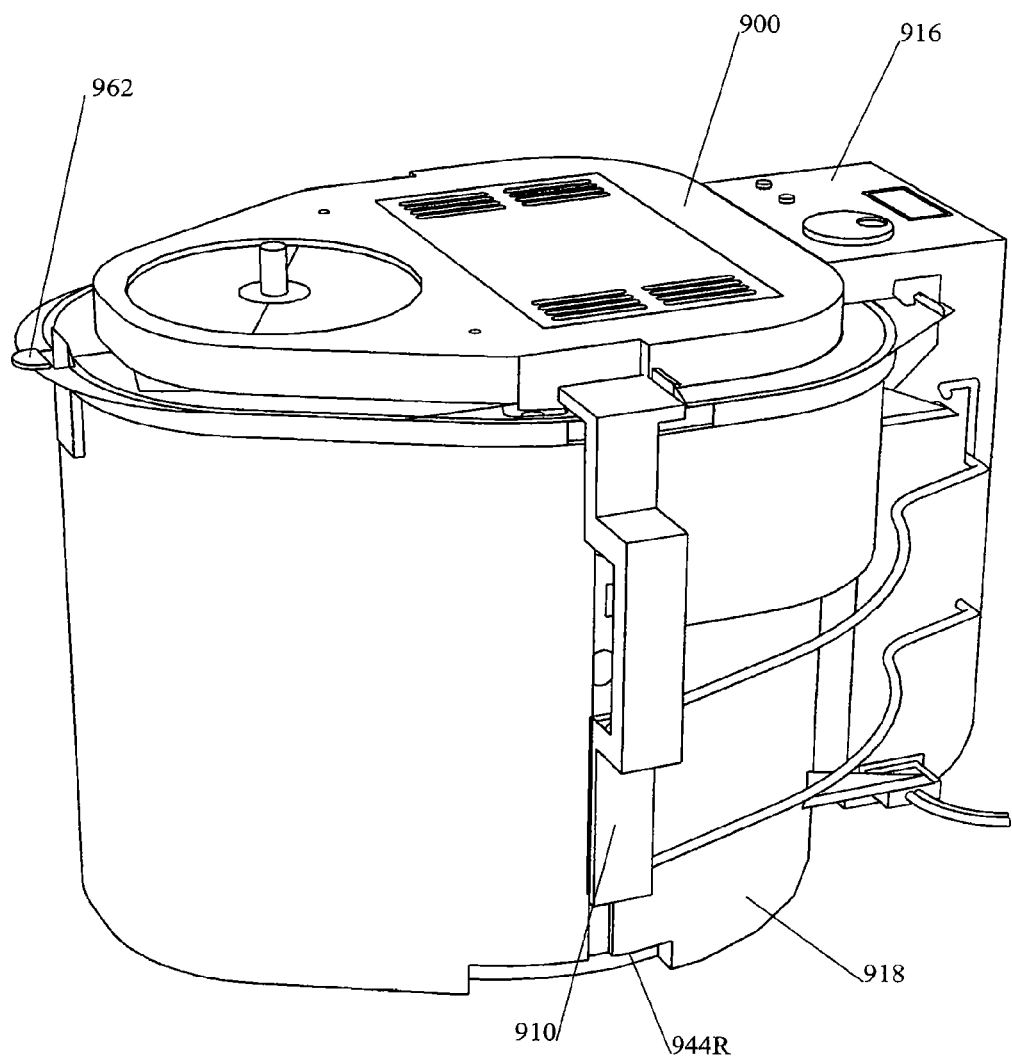
FIG. 110 is similar to FIG. 109 except that food support assembly 910 is lowered and level.
Figure 111:
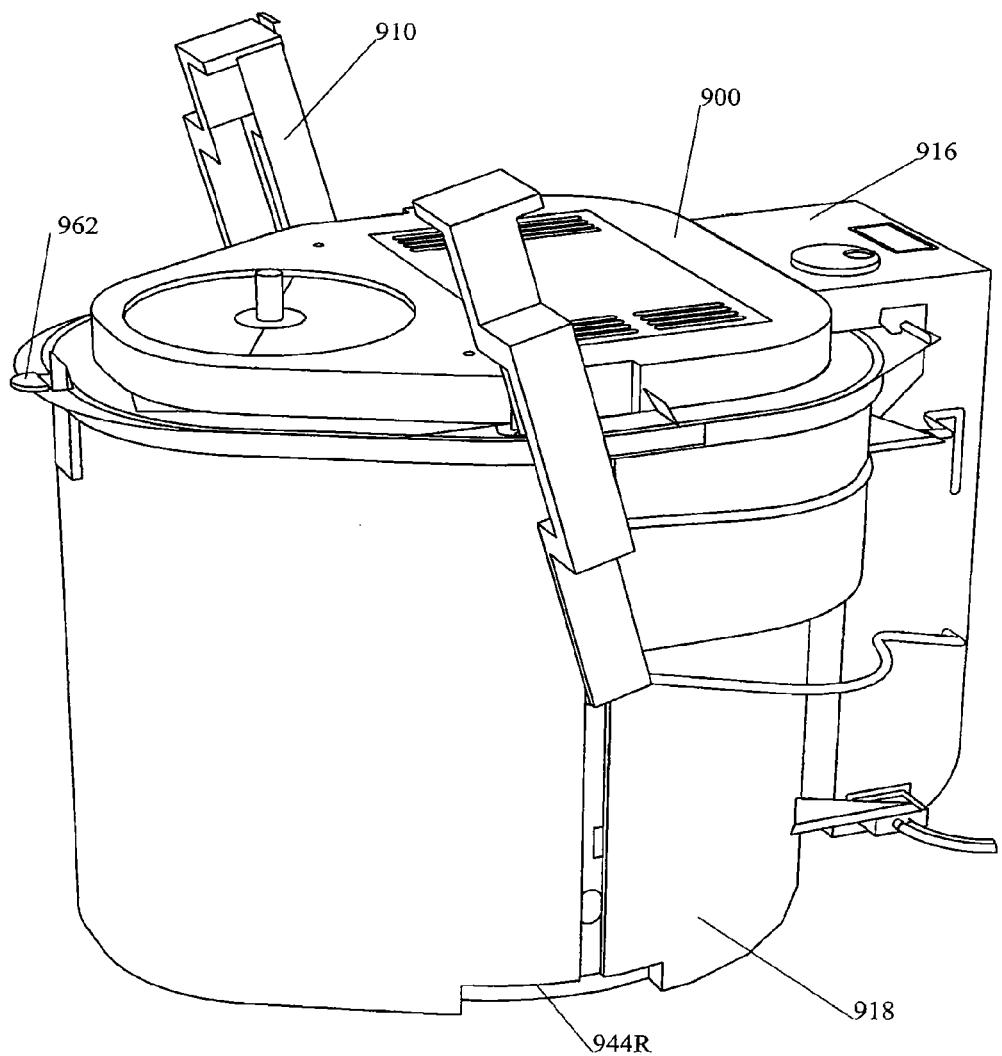
FIG. 111 is similar to FIG. 109 except that food support assembly 910 is raised and tilted forward.

Electronic circuit 1082 is connected to an electronic heat sensor located on the lower end of tube 1116 (FIG. 107). When cooking liquid temperature is above a predetermined level which might injure the user in the event of direct contact (as a nonlimiting example, above 120° F.), even if the timer 1078 has expired and the exemplary embodiment is turned off, electronic circuit 1082 activates warning light 1118 which is located on the top of automated control box 916 (FIG. 107) and warns the user of the potential hazard of hot cooking liquid. This is a safety feature.

The control mechanisms in this exemplary embodiment may function similarly to those described earlier in this document for alternative exemplary embodiments. As a nonlimiting example, the control mechanisms may employ the following process. When timer 1078 is user set for the desired cooking time, the cooking liquid heater is turned on and remains on until the desired cooking temperature is reached.

On the embodiment shown, this is a factory preset temperature. However, variant embodiments may employ a user set cooking temperature.

Either at the end of a factory set interval, or more advantageously, when the desired cooking temperature is reached, electronic circuit to 1082 activates the food lowering mechanism to lower the food into the cooking liquid. The food lowering/raising mechanism includes, but is not limited to: electronics circuit 1082, food support platform 940, lifting arms 1088 and 1090, crank disk 1084, and gear reduced lifting motor 1080.

The food remains in the cooking liquid until the end of the user set cooking time interval is reached. At this point, the food lowering/raising mechanism, activated by electronic circuit 1082, raises the food out of the cooking liquid. At this point electronic circuit 1082 turns off the heating coil and may or may not sound an alarm. Electronic circuit 1082 then delays for a preset time and sounds an alarm to indicate to the user that the food has been cooled and drained, and may be removed safely from the cooking vessel.

This exemplary embodiment may be produced using elements common with the previous exemplary embodiment, thus providing economies and flexibilities in manufacture. As a nonlimiting example, virtually all components except for the control box and handle assemblies may be commonly shared with both exemplary embodiments. A user could even interchange these components in their home, allowing for an easy way for a user to upgrade their product.

FIGS. 112, 113, 114, and 115 show a food holding basket system including: food containment baskets 911, 911A, 911B, as well as sheet food supports 1120, and 1120A. Food containment baskets 911, 911A, 911B share common construction as do sheet food supports 1120, and 1120A.

Figure 112:
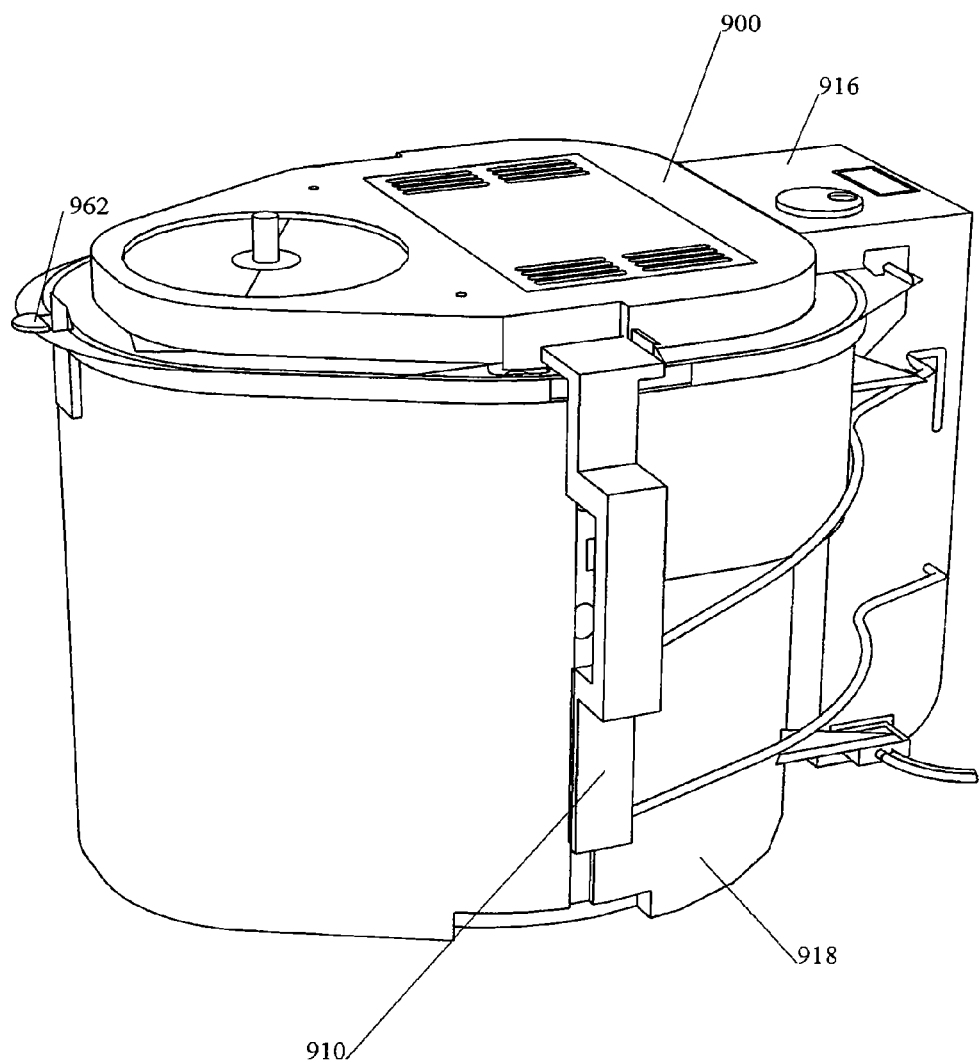
FIG. 112 is similar to FIG. 111 except that food support assembly 910 is lowered and is set to raise in a tilted position.

Referring to FIG. 112, food containment basket 911 has upper perimeter wire frame 1122 which mounts concave wire screen 1124 and springy bent rod support arms 1126, 1126A, and 1126B.

Figure 113:
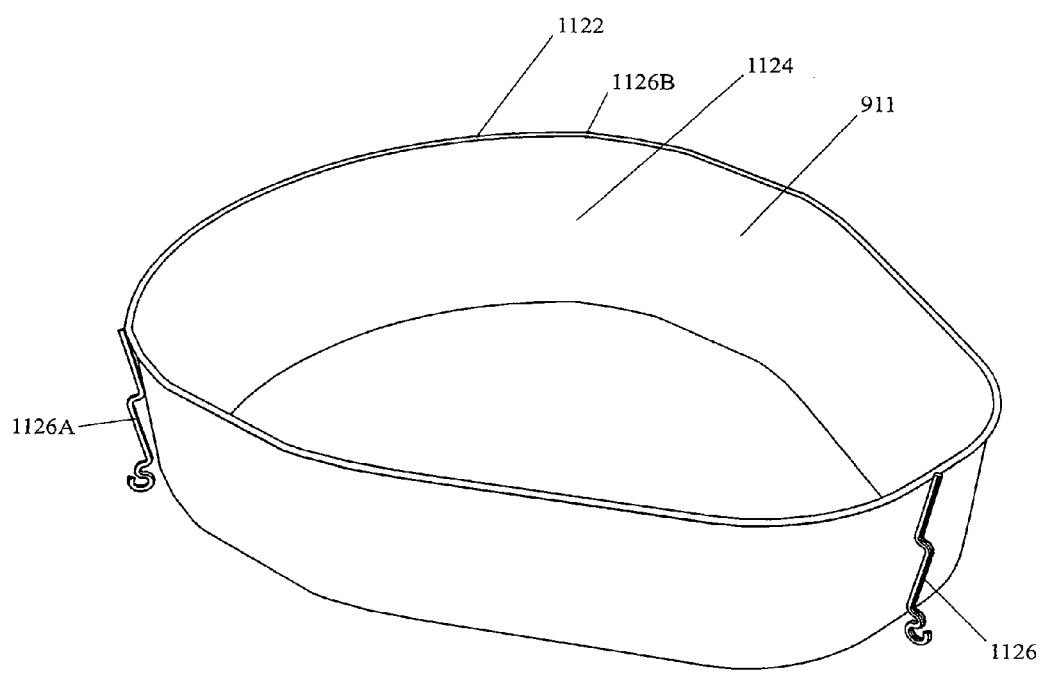
FIG. 113 is a forward perspective view of food containment basket 911.
Figure 114:
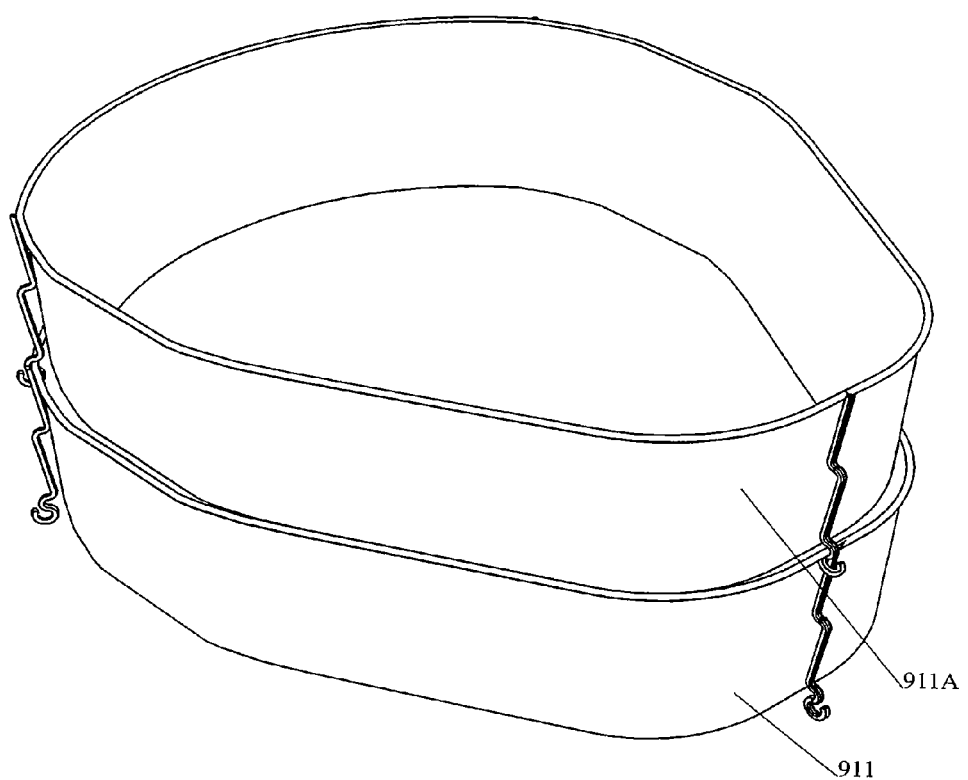

Referring to FIGS. 112, 113, 114, and 115, food containment basket 911 may rest and be supported on food support platform 940. Engagement of springy support arms 1126, 1126A, and 1126B of food containment basket 911A onto upper perimeter frame 1122 of containment basket 911, allows food containment basket 911A to mount on top of food containment basket 911 in one of two vertical positions as shown in FIGS. 113 and 114.

Figure 115:
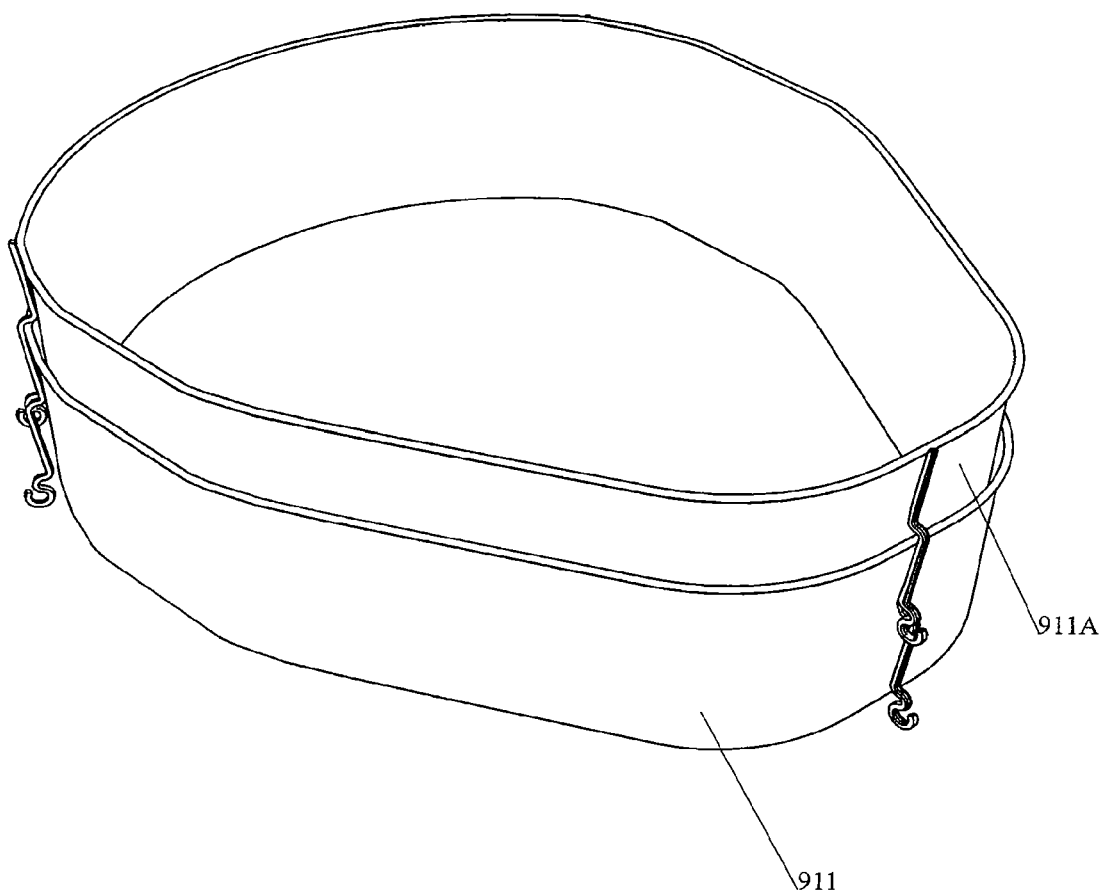

Food containment baskets 911, 911A, 911B, and sheet food supports 1120, and 1120A rest on, and generally mimic the plan view shape of, food support platform 940 (FIG. 115).

Basket 911 can be used alone in shallow cooking liquid to cook various foods such as onion rings and French fried potatoes. In these cases, as a nonlimiting example, a relatively small amount of oil is placed into cooking vessel 902 and heated, and food support platform 940, with food containing basket 911 on top of platform 940 is lowered into the cooking liquid.

Larger foods, such as, as a nonlimiting example, bigger cuts of meat, may also be cooked using just basket 911 alone and an appropriate amount of cooking liquid.

Basket 911A may also serve as just a lid for basket 911 in order to keep the content of basket 911 contained, and also possibly to keep the contents of basket 911 continuously submerged in the cooking liquid during the cooking process. To do this basket 911A may be in either its highest position (FIG. 113), or in its lowest position (FIG. 114).

Basket 911A in deeper cooking liquid may not only serve as a lid for food contained in basket 911, but it may contain food as well. In such an example, food may be placed between the floor of basket 911A and the floor of basket 911, as well as directly into basket 911A. Likewise, basket 911B may be attached to basket 911A for a three basket stack, with basket 911B either used as just a lid or as a lid and food container.

Using stacked baskets can greatly increase the amount of food the exemplary embodiment may cook.

Sheet food support 1120 fits within basket 911 and provides support for various types of food which cannot be cooked directly in a wire screen basket. As examples not to be construed as limiting, doughnuts, tempura, Hush Puppies, and many soft doughy foods bake onto wire screening during frying. Most of these foods are generally cooked by directly dropping the foods into a pool of hot oil. This, however, presents a safety hazard by exposing a user directly to an open pool of very hot cooking liquid which may sputter and boil upon food contact.

Such foods can be more safely cooked by placing them on top of sheet food support 1120, and possibly one or more additional sheet food supports stacked in baskets above sheet food support 1120 (FIG. 115), and placing the baskets on food support platform 940, and lowering the entire structure into hot cooking liquid with lid 900 closed to safely protect the user.

Sheet food support 1120 may have nonstick coating on its upper surfaces to facilitate foods not sticking to such upper surfaces.

Sheet food support 1120 has bent down edges 1128 to space it away from the wire screen floor of food containment basket 911.

During cooking, food placed on the upper surface of food support 1120 generally boils and floats away from the upper surface and is restrained from floating by contacting the undersurface of the floor of the wire basket directly above it, if such a basket is present. If such a basket is present, and if it has a sheet food support resting in it, the boiling action of the food can trap steam bubbles between the food floating against the overhead basket wire screen floor and the sheet food support resting on the wire screen floor of the overhead basket. This can cause uneven cooking of the food. To prevent this, bent down edges 1128 allows space between the wire screen floor of the overhead basket and the sheet food support resting on the wire screen floor.

Horizontal spaces 1130 between the bent down edges 1128 allow steam bubbles to exit from underneath the sheet food support without creating trapped steam bubbles which can cause uneven cooking.

It may be much safer to cook using sheet food support 1120 and having lid 900 lowered when food is: lowered into, cooked, and removed from hot cooking liquid.

All of the exemplary embodiments taught herein and in earlier documents to which this continuation in part is appended, may be constructed at any desired scale. As an example that is not to be construed as in anyway being limiting; in the exemplary embodiment directly above, it may be constructed for home kitchen countertop use. It might be particularly advantageous to construct such an exemplary embodiment so that it does not exceed 16½" in overall exterior height so that it will fit under most over countertop cabinets, at least for countertop storage. It would be even more advantageous if the height did not exceed 15½" to allow a margin of error for homes built which did not adhere strictly to accepted architectural standards.

Likewise, it is common for people to cook up to a 16 pound turkey for Christmas or Thanksgiving. To do this, it has been found advantageous to, in plan view, construct the interior of the cooking vessel to be between 10 inches and 14 inches at its widest point orthogonal to its generally symmetrical axes, and to be between 11 inches and 14½ inches along its generally symmetrical axis.

The exemplary embodiments taught herein have many features. To one knowledgeable in the art it would be obvious to combine features found in different embodiments taught herein in ways not specifically described in this document. As an example which should not be interpreted as being in anyway limiting, the system of emptying cooking oil from the cooking vessel by tipping and pouring the contents of the cooking vessel out through a pouring spout located on the upper rim of the cooking vessel, could be combined with one of the automated lift systems described at the very start of this document. Such apparent combinations should be considered as obvious and as part of the teachings herein.

FIGS. 121 through 132 illustrate another exemplary embodiment of the present inventions.

This exemplary embodiment contains many similar elements to exemplary embodiments described earlier. However, the handles and food support have been changed to offer at least, but not limited to, the following advantages.

Figure 122:
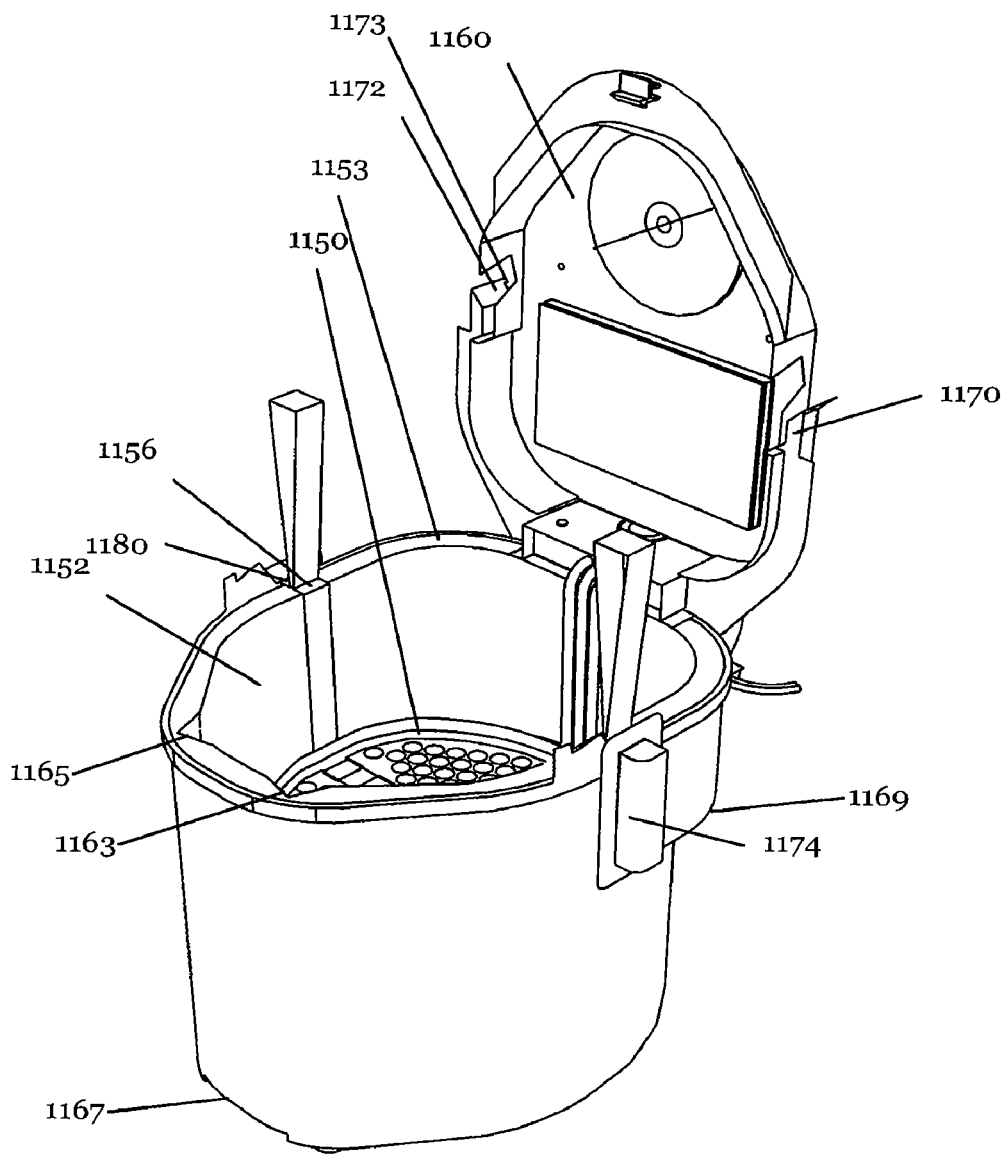
Figure 123:
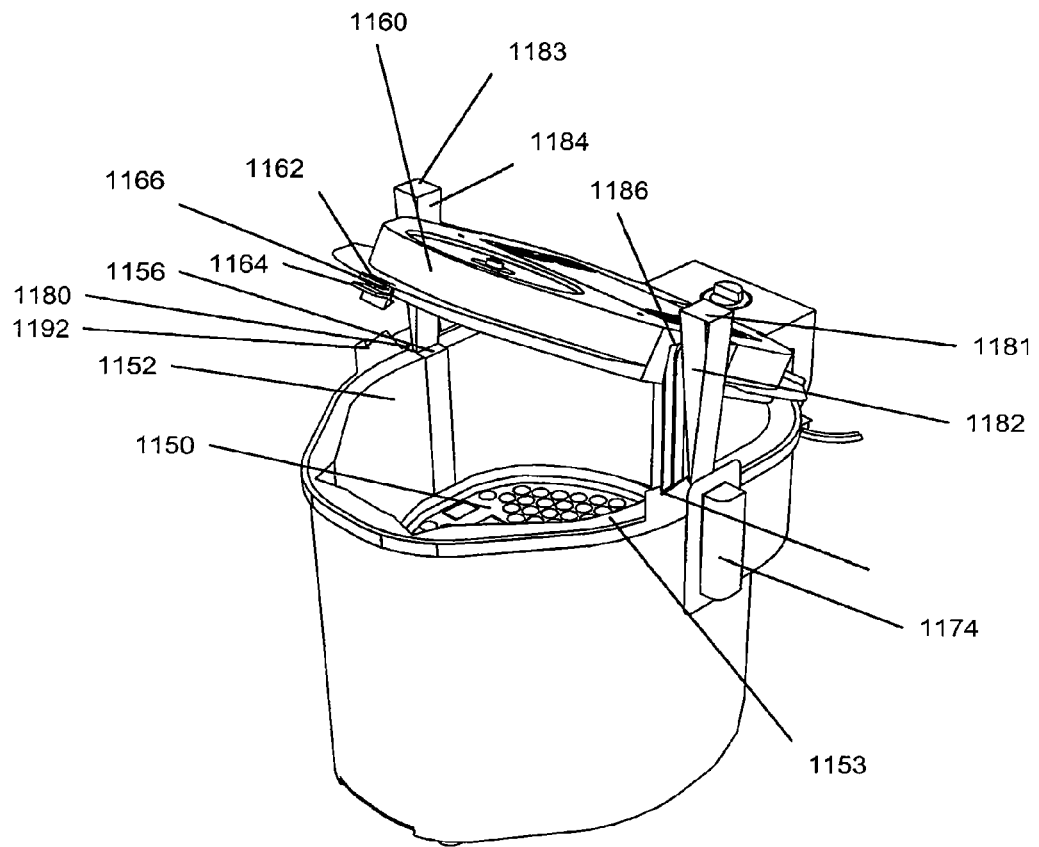

When lowering 1151 food support 1150 into cooking vessel 1152 (FIGS. 121 and 128), right inner shoulder 1154 and left inner shoulder 1156 engaging upper rim 1153 of cooking vessel 1152 prevent food support 1150 from descending 1151 directly into cooking liquid contained in the bottom of cooking vessel 1152 when lid 1160 is raised (FIGS. 122 and 129). This, by stopping food movement just before the food enters the cooking liquid, prevents cooking liquid from being splashed onto the device user from food resting on food support 1150 being directly lowered too quickly into the cooking liquid. This also prevents cooking liquid from being splashed onto the device user by insuring that lid 1160 must be lowered before the food can be fully lowered into the cooking liquid.

After food resting on food support 1150 has been initially lowered into cooking vessel 1152 and lid 1160 has been lowered (FIGS. 124 and 131), right inner shoulder 1154 and left inner shoulder 1156 are disengaged from resting on upper rim 1153 by being pushed inwardly by right disengagement member 1170 and left disengagement member 1172 located on the right and left-hand sides respectively of lid 1160. Food support 1150 is then hand lowered 1151 into cooking liquid contained in the bottom of cooking vessel 1152, by lowering and opposingly outwardly moving right handle 1174 away from left handle 1176. This opposed movement of right handle 1174 away from left handle 1176 causes right outer shoulder 1178 and left outer shoulder 1180 to be disengaged from resting on upper rim 1153 which in turn allows food support 1150 to be lowered. Again, this lowering of food support 1150 into cooking liquid is only permitted when lid 1160 has been lowered and is able to provide protection from the device user being accidentally splashed by cooking liquid contained in cooking vessel 1152.

When food support 1150 is in its lower most position (FIGS. 125 and 132), due to the resting of the upper portion 1181 of right support arm 1182 and the upper portion 1183 of left support arm 1184 on the top of right disengagement member 1170 and the top of left disengagement member 1172 respectively, lid 1160 will only rise when food support 1150 is also raised. This acts to prevent lid 1160 from being accidentally raised during cooking. Projection 1173 on the forward upper portion of left disengagement number 1172 limits the amount of upward travel for lid 1160 by binding against the inner top portion of right support arm 1182. This structure is minor imaged on the right side of the embodiment. As an alternative, projection 1173 may be replaced with a rounded cam surface which lifts food support 1150 above its uppermost resting position before disengaging when lid 1160 is being raised. This has the net result of latching food support 1150 in its upper position if lid 1160 is accidentally raised during cooking.

Figure 124:
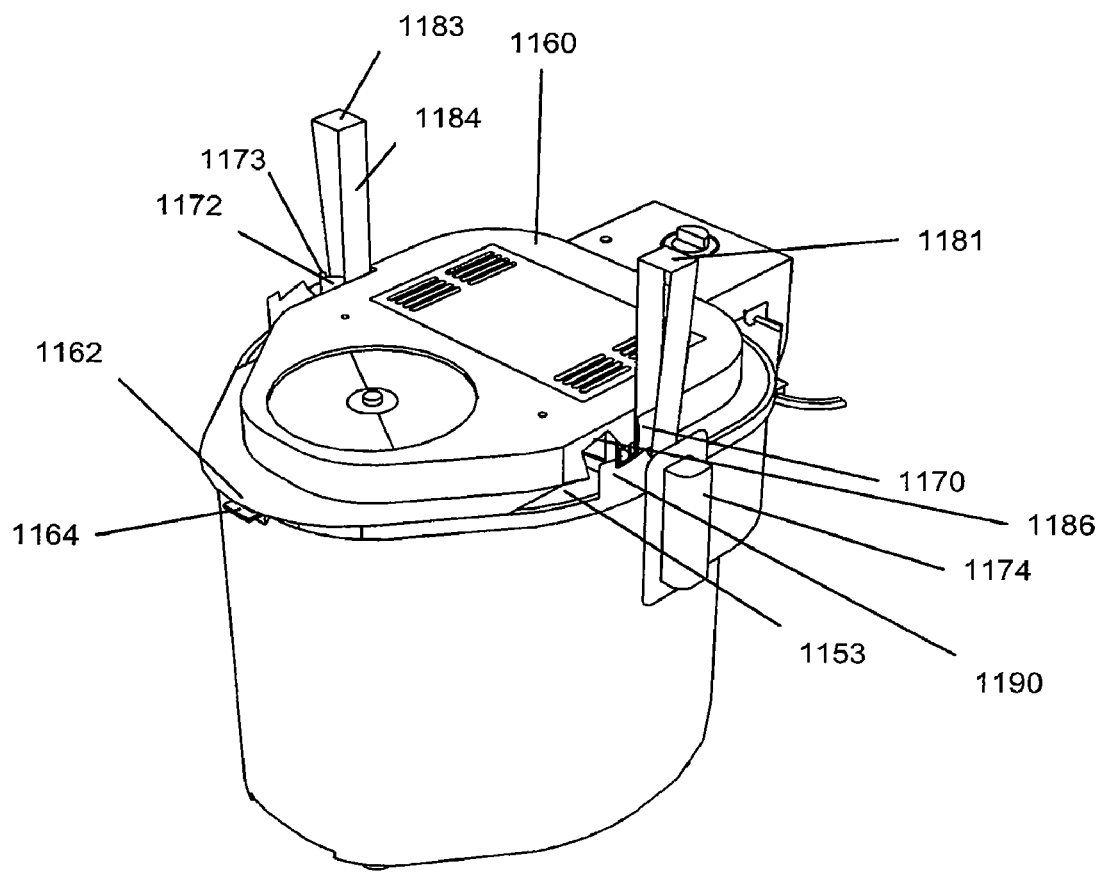
Figure 125:
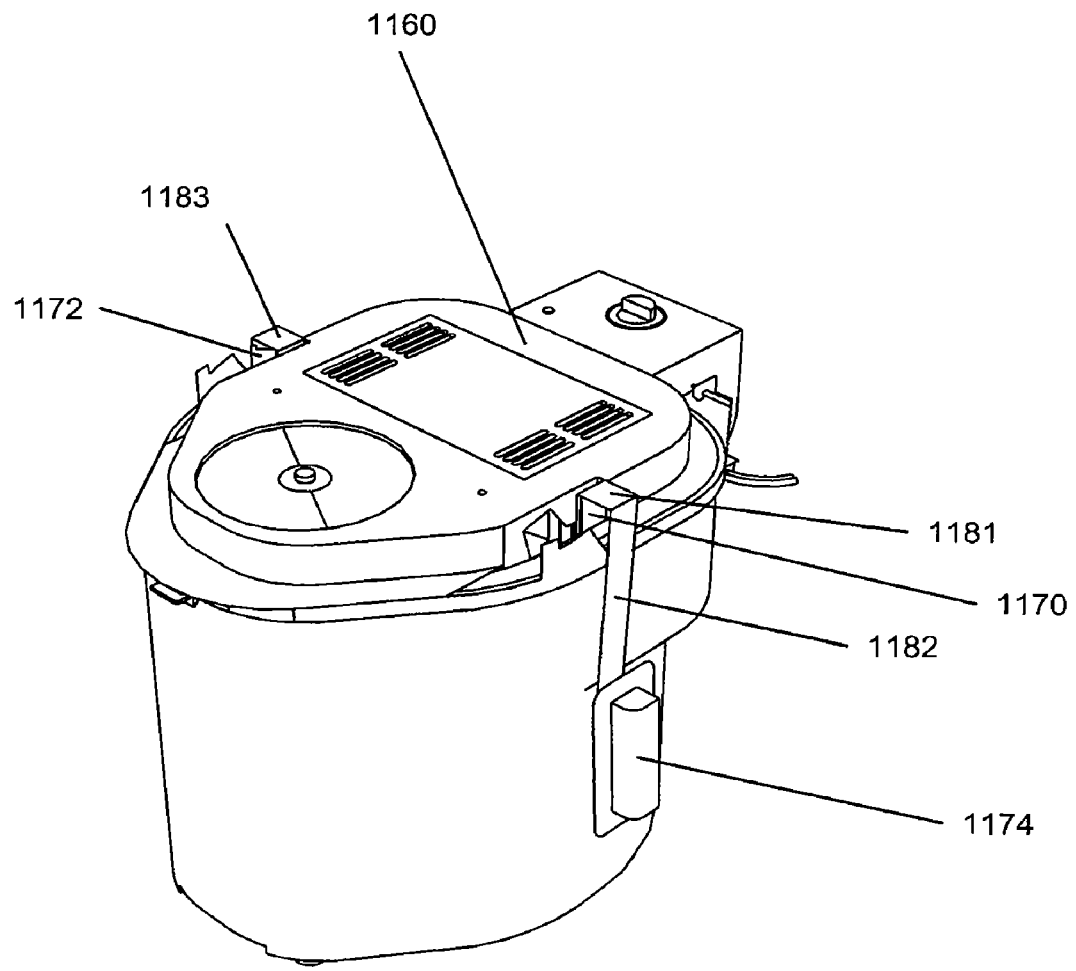

Referring specifically to FIGS. 124 and 131, due to the impacting of the inner portion of right inner shoulder 1154 and the inner portion of left inner shoulder 1156 against right lid cut out 1186 and left lid cut out 1188 respectively, when food support 1150 is raised from its lower most position (FIGS. 125 and 132), it is not allowed to raise so high as to cause food resting upon food support 1150 to touch the underside of lid 1160 where it might cause an undesired cleaning problem.

Referring specifically to FIGS. 126 and 127, when food support 1150 is raised to its upper position (FIGS. 124, 126, 127, and 129), it may be tilted forward (FIGS. 126 and 127) to facilitate draining of cooking liquid from food supported on food support 1150. Tilting forward occurs by right outer shoulder 1178 and left outer shoulder 1180 being respectively rested on right shoulder support 1190 and left shoulder support 1192.

The lid latching mechanism on this exemplary embodiment has been changed. Referring specifically to FIG. 127, to release lid 1160 from its locked down position, this exemplary embodiment has a lid latching mechanism which requires only pinching together of two forward facing ribs, upper rib 1162 which is fixed to the lid, and lower rib 1164 which is attached to lid 1160 and is biased to a downward latched position 1168 by integral springing member 1166. Like other lid locking mechanisms described herein, latching this mechanism requires only moving lid 1160 to its closed position (see FIGS. 127, 126, and others).

Referring to FIG. 122, right forward pour spout 1163 and left forward pour spout 1165 in cooperation with forward lower handle 1167 and rear right handle 1169 and its mirror image counterpart, which is not shown in FIG. 122, help in tipping the exemplary embodiment to facilitate draining of cooking liquid from cooking vessel 1152. Cooking vessel 1152 may be removed from its outer enclosure to facilitate both draining of cooking liquid and cleaning.

FIGS. 133 through 136 illustrate a variant of the exemplary embodiment just described. This embodiment replaces right inner shoulder 1154 which is formed in right support arm 1182 with self lubricating block 1194. Likewise it replaces right outer shoulder 1178 with self lubricating block 1196, and left outer shoulder 1180 with self lubricating block 1198, and left inner shoulder 1156 with self lubricating block 2000.

Self lubricating blocks, 1194, 1196, 1198, and 2000, may be formed of any of many materials including, but not limited to: Teflon, nonstick ceramics, oil impregnated sintered brass, as well as other materials having lubricating characteristics. Self lubricating blocks 1194 and 2000 may require resistance to cooking liquids at high cooking temperatures as well. Such high temperature cooking liquids may include, but are not necessarily limited to, cooking oils as well as water.

This variant exemplary embodiment may move and operate more smoothly as a result of slippery, self lubricating blocks, 1194, 1196, 1198, and 2000.

Also illustrated in this variant exemplary embodiment are right indent 2002 formed in the right hand side of upper rim 1153 of cooking vessel 1152, and left indent 2004 formed in the left hand side of upper rim 1153 of cooking vessel 1152, which cooperate respectively first with right side protrusions 2010, and 2012, and secondly with left side protrusions 2014, and 2016, formed respectively in right side self lubricating blocks 1194, and 1196, and with left side self lubricating blocks 1198, and 2000 (as shown in FIGS. 133 and 134) to provide a more positive engagement between the food support assembly and cooking vessel 1152.

Left peg 2015 and right peg 2017 protrude respectively from the inner surfaces of left support arm 1184 and right support arm 1182, and by colliding respectively with left cut out 2019 and right cut out 2021 on the underside of lid 1160, prevent food supported on food support platform 1150 from raising too high and hitting the underside of lid 1160 when food support platform 1150 is being raised and lid 1160 is in its lowered position.

FIGS. 135 and 136 show two other features of this variant exemplary embodiment. The bottom of the embodiment has L-shaped tracks 2006 and 2008 protruding downward from it which are spaced apart and dimensioned to accept by sliding in, one or more DVDs or CDs and/or printed material having similar dimensions to a DVD or CD in plan view. Such DVDs/CDs and/or printed material may include, but are not be necessarily limited to, instructions, recipes, sales materials, safety instructions or warnings, and/or other information. An edge or corner of these materials, such as corner 2018, may be exposed for easy gripping to slide them out for use. Among other purposes, having L-shaped tracks 2006 and 2008 may serve to keep recipes and operating instructions readily at hand any time the embodiment is used.

FIGS. 135 and 136 also show a prop foot 2010 which may be slid down and locked in the down position to tilt the exemplary embodiment at a forward angle when it's cooking liquid is being bailed out. This is similar to the pivoting prop described earlier which accomplished a similar purpose.

FIGS. 137 through 140 illustrate another exemplary embodiment. In this embodiment food support 2020 has right stiff support arm 2022 and left stiff support arm 2024 removably attached to its right and left sides respectively. Forward perimeter wall 2026 of food support platform 2020 is elevated to help support food resting on food support 2020, particularly when food support platform 2020 is tilted forward to help in food drainage, similar to the event illustrated in earlier FIGS. 126 and 127, and illustrated for this exemplary embodiment in FIG. 138.

This exemplary embodiment functions similarly to exemplary embodiments shown in FIGS. 121 through 136, but uses different mechanics to locate food support 2020 in its various operating positions.

FIG. 137 shows food support 2020 removed from the rest of the embodiment. Mounted at the top of right stiff support arm 2022 and left stiff support arm 2024 are respectively right handle support mechanism 2028 and left handle support mechanism 2030, which are essentially mirror images of each other.

Right handle support mechanism 2028 includes right spring-loaded handle 2032, and right spring-loaded safety member 2034. Left handle support mechanism 2030 includes left spring-loaded handle 2036 and left spring-loaded safety stop 2038.

Left spring-loaded handle 2036 is biased 2040 toward its locking position by molded-in springing flexing member 2042. This bias urges left spring-loaded handle 2036 toward the central portion of food support 2020. Hook 2044, located on the top of left handgrip 2046, engages hook 2048 which extends downward from the fixed top portion of left handle support mechanism 2030 and provides a mechanical stop to prevent spring-loaded handle 2036 from over traveling its locked position.

Likewise, this engagement provides a mechanical stop that prevents left spring-loaded handle 2036 from over traveling outwardly its open unlocked position by the top of hook 2044 contacting the underside of the uppermost portion of left handle support mechanism 2030. Similar hooks on both left spring-loaded safety stop 2038 and the rear portion of the fixed top portion of left handle support mechanism 2030 provide similar functions.

Spring bias 2040 is enhanced on both left spring loaded handle 2036 and left spring-loaded safety stop 2038 by they being molded at angles which are passed their closed positions. After they are molded they are pushed back so that 2044 and 2048 engage with increased spring biase 2040 on both left spring-loaded handle 2036 and left spring-loaded safety stop 2038.

This entire mechanism is mirror imaged on right handle support mechanism 2028.

As shown in FIG. 139 when lid 1160 is in its raised position and food support 2020 is lowered into cooking vessel 1152, food support 2020 remains in its upper position clear of cooking liquid contact. This is because left handle gripping claw 2050 on left spring-loaded handle 2036 and left safety stop gripping claw 2052 located on left spring-loaded safety stop 2038 rest downwardly against the upper rim of cooking vessel 1152 and prevent food support 2020 from descending into the cooking liquid. This is also because counterparts on the right hand side of the exemplary embodiment perform a similar function only in mirror image.

Referring to FIG. 140, once lid 1160 is lowered, it forces disengagement of left safety stop gripping claw 2052 located on left spring-loaded safety stop 2038, as well as its counterpart on the right-hand side, from resting downwardly against the upper rim of cooking vessel 1152, and thus allows food support 2020 to be lowered to its lowermost position when left handle gripping claw 2050 on left spring-loaded handle 2036, as well as its counterpart on the right-hand side, are disengaged by hand through outward movement.

The mechanics of raising and lowering food support 2020 and lid 1160 share the same principles as earlier exemplary embodiments described herein. Likewise, FIG. 138 shows food support 2020 tilted forward for draining. This is also using the same principles described herein for earlier exemplary embodiments.

FIG. 138 also shows information panel 2053 located on the forward portion of the embodiment. This information panel, through use of labels, or silkscreening, or pad printing, or engraving, or other means, may be used to display useful information such as, by way of nonlimiting examples: recipes, embodiment use instructions, embodiment features, safety warnings, or other data.

Tenth Embodiment

FIG. 156 shows a forward perspective view of a preferred embodiment of the present inventions. This embodiment herein is titled preferred embodiment ten, or simply embodiment ten. FIG. 157 shows an exploded forward perspective view of preferred embodiment ten.

Referring to FIG. 157, and starting from the top down, components of this preferred embodiment include:

There is outer translucent plastic lid 2164, and metal inner lid 2166 which snaps into translucent plastic lid 2164 and traps exhaust filters 2168 between outer lid 2164 and inner lid 2166.

Foods support 2172 includes food support basket 2174 which mounts manually vertically adjustable, generally flat, horizontal basket partition/basket lid 2170 within it. One or more copies of partition/lid 2170 may be used within basket 2174 to subdivide basket 2174 into vertically separated cooking compartments or to cap basket 2174 with a lid. Both baskets 2174 and partition/lid 2170 are of open construction, such as, by way of just one nonlimiting example, as being formed from screen and wire as is common today in many deep fryers.

Affixed to basket 2174 is handle support bracket 2176 which mounts removable handles 2178 and 2180. These handles are removable for compact shipping and storage. These handles might also be stored inside the cooking vessel. Handles 2178 and 2180 are operated in tandem to move, lock down, and raise and lower basket 2174.

Removable flexible sheet sleeve 2182 may surround basket 2174, and may be stored flat or coiled. When coiled, it may be stored inside the cooking vessel. When in use inside cooking vessel 2184, as shown in FIG. 156, sleeve 2182 is wrapped in a ring which generally conforms to the interior of cooking vessel 2184. Sleeve 2182 is secured in this ring configuration by tongue and groove connection 2186 which secures in a compressive manner sleeve 2182's right and left hand ends to each other.

Sleeve 2182 may be used as explained earlier to help accommodate tall or large foods in a safer manner.

Control box 2188 includes thermostat 2190, countdown/shut off timer 2192, and heat coil 2194 all of which in combination supply controlled heat to cooking oil contained within cooking vessel 2184.

As seen in FIG. 157 through 159, power plug 2196 magnetically couples to the rear of control box 2188. Control box 2188 may be manually lifted vertically away from cooking vessel 2184 and thus detached from cooking vessel 2184. When this occurs, plug 2196 is automatically disconnected from control box 2188 because member 2198, which is part of and projects from the side of magnetically coupled plug 2196, and non-connectedly extends into orifice 2200 located in the rear wall of outer enclosure 2202 (see FIGS. 157 through 159) when control box 2188 is mounted on cooking vessel 2184, forces plug 2196 to be twisted loose from its tenuous magnetic connection with control box 2188 whenever control box 2188 is lifted vertically free from connection with cooking vessel 2184.

Cooking vessel 2184 has upper horizontal rim 2204 which is interrupted in several locations around its entire horizontal perimeter by void indents, exemplified by indents 2206, which allow oil and foam overflow from cooking vessel 2184 to safely be channeled into open can shaped outer enclosure 2202 where it is held until enclosure 2202 is tilted and emptied by the embodiment user. This safe holding of liquid overflow helps prevent injury to embodiment users and damage to countertops, tabletops, cabinets, and/or floors from hot liquid.

FIG. 158 is an orthogonal overhead view of preferred embodiment ten. Superimposed over this plan view, and shown in dotted lines, is fowl 2206 being cooked in horizontal fashion similar to that illustrated in FIGS. 148 and 149. Cooking vessel 2184 is essentially shaped from cylindrical, or expanded central section 2208 which has horizontally protrusive extended round or blunted corner 2210 projecting horizontally outwardly and forward from it. As illustrated in FIG. 158, this shape is very efficient for accommodating horizontally disposed fowl within minimal volume.

FIG. 159 is identical to FIG. 158 except it illustrates how fowl 2212, identified in dotted lines, may be efficiently placed in minimal volume within cooking vessel 2184 while being cooked in a vertical fashion similar to that illustrated in FIGS. 142-145.

A variant in the above might be, if cooking vessel 2184 is vertically deep enough to cook in the position illustrated in FIG. 158 while fully submersing fowl 2206, and cook other, including possibly larger fowl 2212 and/or unitary food, using the partial submersion multiple cook cycle method described earlier and positioning the unitary food as illustrated in FIGS. 142 through 145.

The cooking methods described herein do not limit the preferred embodiments described herein from frying and otherwise cooking all types of food, including both small and large unitary and non-unitary foods using currently common cooking methods.

Volumetric efficiency achieved by the shape of preferred embodiment ten is independent of whether cooking is done fully submersed or partially submersed.

Advantages gained by embodiment ten may include one or more of the following. They may result in lower oil usage and smaller component sizes, including, but not limited to, smaller heat coils, cooking vessels and outer enclosures. Lower oil usage in turn may result in fewer safety issues, lower operating costs, and reduced oil disposal problems. Other advantages may include, but are not limited to, less use of valuable countertop, tabletop, and/or floor space; a smaller, lighter, easier to use, appliance; and a more versatile appliance which can be used in many locations formerly unusable by larger full immersion cooking type devices.

Eleventh Embodiment

FIGS. 160 and 161 illustrate an eleventh preferred embodiment herein titled preferred embodiment eleven or simply embodiment eleven.

FIG. 160 has sleeve 2214 retracted as schematically illustrated in FIG. 146. FIG. 161 shows the same preferred embodiment of FIG. 160 except sleeve 2214 is extended upward as schematically illustrated in FIGS. 144 and 145.

FIG. 162 shows an exploded view of embodiment eleven which it is analogous to FIG. 157 for embodiment ten. Likewise FIGS. 163 and 164 illustrate embodiment eleven from an overhead orthogonal view analogous to that shown in FIGS. 158 and 159 for FIG. 141. FIG. 165 is a section taken through embodiment eleven as indicated in FIG. 164. FIG. 166 is a section taken through embodiment eleven as indicated in FIG. 164.

Preferred embodiment eleven, shares many elements in common with preferred embodiment ten. However, as particularly shown in FIGS. 163 and 164, the plan view of preferred embodiment eleven comprises expanded curved central section 2216 with horizontally opposed protrusive rounded corners 2218 and 2220 projecting horizontally out from expanded curved central section 2216. This also may be referred to as a blunted diamond shape, or a diamond with its four points rounded off.

Although not necessary to achieve advantages from this configuration, protrusive corners 2218 and 2220 project fore and aft respectively. However, this fore to aft feature may help in increasing the functionality of the design by allowing foods support handles 2222 and 2224 to be ergonomically desirably closer together.

By placing the narrower axis side to side or left to right, such fore and aft projection may also reduce the amount of valuable left to right lateral countertop space the preferred embodiment uses. Likewise, such fore to aft projection may reduce overall size impression which can help in marketing the preferred embodiment.

Also not necessary to achieve advantages from this configuration, the plan view is symmetrical both sides to side and fore to aft. This may help in the economical manufacture of the product, particularly where metal drawing or casting is used.

FIGS. 163 and 164 illustrate how volumetrically efficient preferred embodiment eleven can be when cooking fowl, as exemplified by fowls 2226 and 2228 shown in dotted lines.

As stated earlier, such volumetric efficiency has many advantages which, as applicable, are hereby referenced.

As also stated earlier, such advantages are not necessarily dependent on foods being cooked partially or fully immersed in cooking liquid.

As with preferred embodiment ten, the plan view of preferred embodiment eleven is easily adaptable to cooking many foods efficiently, including: unitary foods such as large pieces of meat, fowl and fish; as well as divisible foods, such as French fries, shrimp, and onion rings.

Again, use of partial immersion cooking by preferred embodiments described herein does not limit their use in performing conventional full immersion cooking of food products where food sizes, device dimensions, and oil levels permit.

Lid 2230, including metal lid 2232 which snaps into plastic lid 2234 and traps open metal filter 2236 and ancillary filter 2238 between lid components 2232 and 2234, caps sleeve 2214 in cork-like fashion and may be removable through upward lifting. However, as with many devices cooking with hot liquid, during use, preferred embodiment eleven has the potential to burn its user with escaping hot sputtering droplets and with exiting heated gases, and vapors. To help prevent this, lid 2230 includes lifting handles 2240 and 2242 which are offset side to side from the fore to aft central axis of lid 2230.

FIG. 168 shows how lifting handle 2240 might be gripped to remove lid 2230. Gripping and raising lifting handle 2240 results in left side 2244 of lid 2230 being raised, which in turn causes steam, hot gases, and hot droplets, if present, to escape out the left-hand side of lid 2240 away from the users' hand and arm as is illustrated in FIG. 168. The mirror image of this occurs when lifting handle 2242 is gripped and lifted. Either handle being raised eventually can result in lid 2230 being lifted free from sleeve 2214.

As with preferred embodiment ten, the control box, control box 2246, is placed behind the front to back midpoint of preferred embodiment eleven.

Shared also with embodiment ten, front face 2248 of control box 2246, is slanted outward between 100° and 170° relative to the front to back center line of the outer housing, toward the right side of preferred embodiment eleven thus allowing for easier viewing and access of face 2248 of control box 2246 by embodiment users.

Additionally, front face 2248 is reclined materially upward, specifically meaning here 5° or more from embodiment eleven's vertical axis, toward the eyes of an embodiment user, thus also making front face 2248 more easily viewed and accessed by embodiment users. This may be particularly useful because the controls are placed near the back of embodiment eleven, away from user eyes. The combination of easy viewing, catching ambient light and facilitating user control is best accomplished by an upward angle between 5° and 70°.

This vertical upward angle of control box face 2248, as can be seen in FIG. 170, catches ambient light more readily and thus additionally makes front face 2248 even more readable. This again may be particularly useful because the controls are placed near the back of embodiment eleven, away from user eyes.

Front face 2248 is located on the right side of cooking vessel 2252. This makes it easier for access and viewing for right-handed users which constitute the majority of potential embodiment users.

Most, meaning specifically here 60% or more, of control box 2246 is located below the upper rim of cooking A device to coat the outside of foodsvessel 2252. This desirably may help lower the overall height of embodiment eleven for shipment, storage, and/or other purposes.

As can be seen in FIGS. 163 and 164, a substantial portion, meaning specifically here 20% or more, of control box 2246 is located forward of the back of cooking vessel 2252 of preferred embodiment eleven. This desirably may help in reducing the front to back size of embodiment eleven during shipping, storage, and/or other uses.

As can be seen in FIG. 169, the shape and location of control box 2246 make controls 2254 on the face of control box 2246 at least partially obscured, meaning specifically here 20% or more hidden, by elements of embodiment eleven when embodiment eleven is viewed directly from the front.

As can be seen in FIG. 170, the shape and location of control box 2246 make controls 2254 readily visible when viewed off axis to the right of embodiment eleven.

As can also be seen in FIG. 170, controls 2252 are easily accessible by hand by a user when the user is positioned off axis to the right of embodiment eleven.

Control box 2246 can be mirror imaged to the left side of embodiment eleven and still convey many advantages. However, placing control box 2246 on the right side of embodiment eleven has at least added advantages over left-hand mounting of allowing easier viewing and operation by a majority of likely users, who will probably be primarily right-handed.

Most of control box 2246 is hidden from view when embodiment eleven is viewed head-on. This may help in reducing the overall size impression of embodiment eleven.

Control box 2246 is removably mounted to the rear of outer housing 2256 by means of metal bracket 2258 which is affixed to the forward face of control box 2246 and has hooks 2260 and 2262 which downwardly engage holes 2264 and 2266 respectively which are disposed in the rear of outer housing 2256, as shown in FIGS. 165, 174, 174A and 175.

Inwardly biased latch 2268 located on the bottom of control box 2246 downwardly secures control box 2246 in its downward hooked on position to outer housing 2256 when control box 2246 is mounted to the back of outer housing 2256. Latch 2268 engages into inward protruding upward opening louver 2270 which is located on the back of outer housing 2256. This holds control box 2246 in its downwardly latched position when mounted to the back of outer housing 2256 as shown in FIGS. 165, 174 and 174A.

Using hooks fabricated from metal to mount control box 2246 to the rear of outer housing 2256 eliminates the possibility of the hooks being damaged by the heat which is inherent in deep fryers. Using an inwardly protruding upward facing louver to engage latch 2268 provides a protective face from louver 2270 to protect the engagement member from latch 168 from being damaged by heat generated within cooking vessel 2252.

Metal bracket 2258 serves at least a multiple of purposes by also strengthening the forward face of control box 2246, helping protect the Board face of control box 2246 from heat damage, and by mounting heat coil 2272. This in turn may simplify manufacture and make construction less expensive.

Stalks 2274 and 2276 extend forwardly and downwardly from control box 2246 and are an integral part of heat coil 2272. When control box 2246 is mounted to outer housing

2256 the upper portions of stalks 2274 and 2276 extend over and downwardly secure the upper rim of cooking vessel 2252 as shown in FIGS. 165, 174 and 174A. This advantageously holds cooking vessel 2252 within outer housing 2256 even when cooking vessel 2252 and outer housing 2256 are partially or fully inverted, such as during the dumping disposal of oil within cooking vessel 2252.

To help in the dumping disposal of oil within cooking vessel 2252, spout 2278 is molded into its front. Likewise, as shown in FIGS. 168 and 169, to help in the dumping disposal of oil within outer housing 2256 which may have overflowed from cooking vessel 2252 into open can shaped outer housing 2256 is indent 2280.

Also to help in the dumping disposal of oil within cooking vessel 2252 when sleeve 2214 is lowered in place is spout 2282 which is disposed in the front of sleeve 2214 as shown in FIGS. 168, 169, 171, and 172.

Spout 2278, indent 2280, and spout 2282 may be used alone or in concert. As a nonlimiting example, if cooking vessel 2252 is mounted within outer housing 2256, and the combination is inclined for dumping, spout 2278 and indent 2280 may act simultaneously in the disposal of oil from both within cooking vessel 2252 and outer housing 2256 respectively. If however cooking vessel 2252 is not mounted within outer housing 2256 and cooking vessel 2252 is inclined for dumping to dispose of oil, spout 2278 alone will assist in this. This is likewise for all independent and combined useful combinations and permutations for these elements.

Embodiment eleven, similar to embodiment ten, employs two handles to raise and lower its food support. This design has several advantages when compared to single handled designs. At least among these are:

- It provides redundant holding positions to help ensure control of the food support, even if one hand becomes accidentally disengaged. This is a significant safety advantage particularly because of the hot liquid involved in embodiment cooking.
- With both user hands gripping, it allows for more precise control of the food support. This is particularly significant to safety due to the hot liquid involved in embodiment cooking.
- With both hands gripping and dividing food weight, it requires less strength to operate embodiment eleven.
- With two handles gripping directly above the food contained in the food support, there is no extra strength required to support food in a cantilevered position, as is required by most single handle designs.

Foods support basket 2284 is integral with handle support bracket 2286 which in turn mounts food support handles 2222 and 2224 as shown in FIG. 167. Handle 2224 is manually removable from bracket 2286 using latch 2288 which is located at the lower end of handle 2224 as is also shown in FIG. 167. Latch 2288 has inwardly 2291 biased catch 2290 at its lower end which can engage slot 2292 located near the top of the right upward facing arm of support bracket 2286. Manually pulling outward 2293 on latch 2288 disengages it from slot 2292 and allows handle 2224 to be lifted upward and free of handle support bracket 2286. Flat 2294 located at the top right-hand arm of bracket 2286 engages a reciprocal void within handle 2224 and helps prevent handle 2224 from rotating around bracket 2286 when handle 2224 is mounted to bracket 2286. The mirror image of this system is used to mount and dismount handle 2222.

Handles 2222 and 2224 are removable, and further, may be small enough to be stored within cooking vessel 2252. This may provide advantages of at least reducing preferred embodiment eleven's outward size for more efficient: warehousing, shipping, storage and other uses.

Having handle 2222 or handle 2224 or both handles be removable may help in inserting food into food support basket 2284 because it opens the space directly above food support basket 2284.

Referring particularly to FIG. 167, one or more copies of food support lid/partition 2296 may be mounted within food support basket 2284 to either cap it or provide one or more partitions to divide food support basket 2284 into two or more vertically separated cooking compartments. To accomplish multiple horizontal and diagonal mounting positions, food support lid/partition 2296 includes stationary rear bracket 2298 which may engage into multiple holes 2300 which pierce bracket 2302 which is mounted at the rear of food support basket 2284.

Referring again primarily to FIG. 167, mounted at the opposite end of food support basket 2284 from rear bracket 2302 is forward bracket 2304 which has multiple holes 2306 which may engage movable latch 2308 located at the forward end of food support lid/partition 2296. Movable latch 2308 has anchored section 2309 firmly attached to the upper surface of food support lid/partition 2296 and has curved spring section 2311 which is free of fixed engagement with the upper surface of food support lid/partition 2296 and biases engagement segment 2315 forward 2307. Under finger pressure against 2312 raised member 2317, engagement segment 2315 may be pushed back 2312. While forward 2307, engagement segment 2315 may engage holes 2306. When pushed back 2312, latch 2308 may be disengaged from holes 2306, thus allowing for adjustment and/or removal of lid partition 2296 from within food support basket 2284. Lid/partition 2296 may be mounted horizontally or it may be tipped upwardly or downwardly or to the left or right, or any combination of the above, within food support basket 2284 by engaging different combinations of holes 2300 and 2306. In the alternative, brackets 2302 and 2304 might not be needed. As an example, if food support basket 2284 is constructed of open screen, holes in such an open screen might serve to replace functionality of holes 2300 and 2306. The ability to tilt lid/partition 2296 may be very useful when forming cooking compartments to hold irregular shaped foods, or to hold a plurality of different size foods.

Both food support basket 2284 and lid/partition 2296 may be of open construction. As just one nonlimiting example, they may be of conventional open screen and wire construction such as are currently widely used in many commercial and domestic deep fryer food containing baskets.

Preferred embodiment eleven may be operated in many different ways. As just one nonlimiting example, referring to FIGS. 171 through 173, the following method of operation may be used.

As shown in FIG. 171, food, illustrated by fowl 2310, may be placed into food support basket 2284 and hand lowered into the open top of upwardly extended sleeve 2214 until basket 2284's vertical descent is halted by rest/support members 2312 and 2314 located at the bottoms of handles 2222 and 2224 respectively coming to rest against horizontal upper rim 2316 of sleeve 2214. Thus it is the initial location of sleeve 2214 and its upper rim 2316 that determines where food support assembly 2318 comes to rest when it is first inserted. If sleeve 2214 is in its raised position, food support assembly 2318 will come to rest in a higher position than if sleeve 2214 is in its lowered position.

Lid 2230 is then placed on and caps sleeve 2214. Buttons 2320 and 2322 are then pushed in 2323 which allows handles 2222 and 2224 to be pulled outward 2325 which in turn allows disengagement of rest support members 2312 and 2314 from resting on horizontal upper rim 2316 of sleeve 2214.

As shown in FIG. 172, fowl 2310 along with food support assembly 2318, which includes: food support basket 2284, handle support bracket 2286, and handles 2222 and 2224; can then be lowered as shown in FIG. 173 to just above heat coil 2272 located in the bottom of cooking vessel 2252. Cooking vessel 2252 contains cooking liquid which then is used to cook fowl 2310 using either single or multiple cook cycle methods as described earlier.

The steps used to remove fowl 2310 from cooking liquid within the cooking vessel 2252 simply reverse the steps used to lower it in, as listed above.

Foods support lid/partition 2296 may also be adjusted up and down when the embodiment is used for steam cooking foods. As a nonlimiting example, lid/partition 2296 might be adjusted up or down so that it is just above the water being used to create steam. After lowering the food support assembly 2318, food would then be placed on top of lid/partition 2296 up to the point where it completely filled the embodiment cooking cavity created by sleeve 2214 and cooking vessel 2252.

As shown particularly in FIGS. 162 and 173, handle grip 2326 on left handle 2222 is biased inward (2328) by springy connecting member 2329. When food support assembly 2318 is in its lowered position and sleeve 2214 is in its raised position, both as shown in FIG. 173, locking tab 2330 which is connected to handle grip 2326 engages through both inward bias and snapping action into locking orifice 2332 which is disposed on the left side of outer housing 2256 as shown particularly in FIG. 162. To accomplish this, locking tab 2330 is both inwardly biased by springing connecting member 2329 and locking tab 2330 has an upwardly slightly raised bump near its inward tip which causes a snap action when it penetrates locking orifice 2332. Simultaneously, as shown particularly in FIG. 173, resilient locking tab 2334 presses downwardly against the upper surface of lid 2230 and locks lid 2230 down and closed. The mirror image of this occurs on the right side of embodiment eleven.

As shown particularly in FIG. 173, in combination this causes lid 2230 to be securely locked down in two central locations when sleeve 2214 is in its raised position and food support assembly 2318 is in its lowermost position.

When sleeve 2214 and food support assembly 2318 are both disposed in their lowered positions as shown in FIG. 169, resilient locking tab 2336, which is connected to handle grip 2326, presses against the upper surface of lid 2230 locking it down and closed. The mirror image of this occurs simultaneously on the opposite side of preferred embodiment eleven.

Thus, using the above examples, lid 2230 is shown to be locked down and closed onto the upper rim of sleeve 2214 whenever food support assembly 2318 is lowered, regardless of whether sleeve 2214 is raised or lowered.

Resilient locking tabs 2334 and 2336 are both ramped downwardly and are both resiliently sprung inwardly 2328, toward the center of lid 2230. The mirror image of this occurs on the opposite side of preferred embodiment eleven. This allows lid 2230 to be lowered onto and locked to the upper rim of sleeve 2214 whenever food support assembly 2318 is fully lowered, regardless of whether sleeve 2214 is in its raised or lowered position. And, either first putting lid 2230 onto the top of sleeve 2214 and then lowering food support assembly 2318, or first lowering food support assembly 2318 and then putting lid 2230 onto the top of sleeve 2214, results in lid 2230 being locked down onto the top of sleeve 2214.

Referring particularly FIG. 176 as well as other figures contained herein, control box 2246 includes at its rear recipe card holder 2340 which may hold standard recipe cards 2342 (in the United States 3 inch times 5 inch) as well as compact DVDs and/or other instructional, safety and informational (including embodiment related) materials. This may greatly increase the ease and simplicity of using embodiment eleven by making information; including information related to embodiment eleven such as safety, use, promotional, or other information; easily and simply available without having to search beyond the embodiment itself.

Sleeve 2214 telescopically slides into cooking vessel 2252 and has a perimeter 70% of which simultaneously contacts the generally vertical side walls of cooking vessel 2252. As just one example of where sleeve 2214 may not contact an upper portion of a sidewall of cooking vessel 2252, sleeve 2214 may not contact an upper portion of the side wall of cooking vessel 2252 which is adjacent to the vertically extending heat coil tubes. Advantageously, to efficiently reduce storage space and for cooking smaller foods, as well as for other reasons, sleeve 2214 may be inserted into cooking vessel 2252 leaving less than half of it exposed above the upper rim of cooking vessel 2252.

Sleeve 2214 may have at least three positions including being fully lowered into cooking vessel 2252, as shown in FIG. 169, being raised to its upper position, as shown in FIG. 171, and being fully removed, as shown in FIG. 162. Food may be cooked in embodiment eleven in either the first or the third position using one or more cook cycles as described earlier.

Removing sleeve 2214 may have many advantages among which may be allowing easy and complete cleaning.

Sleeve 2214 may include holes 2344 at any location along its side walls (FIG. 162). Sleeve 2214 in its raised position allows rising bubbling liquid and foam from cooking to safely expand within sleeve 2214. Holes 2344 allow such rising liquid and foam to safely flow out from within sleeve 2214 in a controlled manner.

After flowing out, liquid and foam may flow down the outside of sleeve 2214 into moat 2346 which is formed between exterior wall 2348 of sleeve 2214 and the upper portion of interior wall 2350 of cooking vessel 2252 (FIGS. 166 and 173).

Moat 2346 is formed regardless of whether sleeve 2214 is in its upper or lower position.

Sleeve 2214 may naturally allow leakage out the bottom of moat 2346 by having less than a liquid tight fit between exterior wall 2348 of sleeve 2214 and cooking vessel interior wall 2350. Sleeve 2214 may also have some of holes 2344 located at or near the bottom of moat 2346. Either situation allows liquid and foam which has exited from the interior of sleeve 2214 to be recycled into the cooking liquid within cooking vessel 2252.

Expanding foam occurring during cooking and rising into sleeve 2214 may be partially or fully deflated into liquid as it passes through holes 2344. This helps in recycling the foam into the cooking liquid within cooking vessel 2252.

Cooking vessel 2252 includes overflow holes 2352 which are located around the uppermost portion of cooking vessel 2252 and penetrate through interior wall 2350 (FIGS. 162, 174 and 177). Overflow holes 2352 allow excess liquid and foam, including, but not limited to, that caused by the user overfilling cooking liquid, and that caused by excessive bubbling and/or foaming during cooking, to safely exit into the bottom of open can shaped outer housing 2256 where it can be safely stored without damaging countertops, tabletops, cabinets, and/or floors. This is a major safety and use feature.

Moat 2346 serves several functions. As explained earlier it serves as a gutter for collecting foam and oil which may flow down the outside of sleeve 2214.

As also explained earlier, it may collect excessive oil. In both of the immediately above cases, oil leaving moat 2346 exits it either back into cooking vessel 2252 or into the reservoir in the bottom of outer housing 2256.

Moat 2346 also helps reduce the amount of sputtering oil coming out between the outer wall of cooking vessel 2252 and the inner wall of sleeve 2214. It accomplishes this by widening the gap between the outer wall of cooking vessel 2252 and the inner wall of sleeve 2214 through which bubbles of steam may exit. This has an effect like having water simply flow of the end of a garden house versus putting a thumb on the end and causing it to spray.

Referring particularly FIG. 177 as well as to other figures contained herein, sleeve 2214 is secured from both up and down movement when in its upper position by latching tabs 2354 and 2356, which are biased outward 2362 on the ends of bent leaf-spring-like members 2364 and 2366 respectively, and engaging overflow holes 2358 and 2360 respectively. When sleeve 2214 is in its lower position, latching tabs 2354 and 2356 rest against the outer sidewalls of sleeve 2214. The same latching arrangement as above is mirror imaged on the left side of sleeve 2214.

When in its lowest position, sleeve 2214 may be raised to its upper position simply by pulling it upward until latching tabs 2354 and 2356 as well as their left slide counterparts, engage their respective latching overflow holes and latch sleeve 2214 vertically into place.

Referencing in particular FIG. 177 as well as generally other figures contained herein, when sleeve 2214 is in its upper position, pushing in 2357 on the tops of bent members 2364 and 2366 as well as their left side counterparts unlocks sleeve 2214 and allows it to be again lowered, or it allows sleeve 2214 to be pulled upward and raised free of engagement with cooking vessel 2252.

Sleeve 2214 may be capped by lid 2230 regardless of whether sleeve 2214 is in its upper or lower position.

Placing sleeve 2214 in its upper position allows for larger foods to be loaded into embodiment eleven with the foods being above the cooking liquid in cooking vessel 2252 and with lid 2230 closed, and to have lid 2230 safely on to protect the user from steam and sputtering or splashing of hot cooking liquid when these larger foods are lowered into the cooking liquid. These are major safety advantages.

Because sleeve 2214 can be retracted to its compact lower position (FIG. 169), it does not materially increase the exterior size of embodiment eleven during shipping, warehousing, home storage and other uses. These are major advantages at least in reducing embodiment shipping and handling costs, and in using embodiment eleven within usually crowded kitchens.

FIGS. 166, 178 and 179 particularly, as well as other figures contained herein, show how the power to control box 2246 is positively, obviously, inexpensively, and simply disconnected whenever control box 2246 is lifted away from outer housing 2256. Specifically, control box 2246 includes magnetically coupled receptacle 2368 which may be connected to magnetically coupled line cord plug 2370.

Whenever control box 2246 is mounted to embodiment eleven and magnetically coupled line cord plug 2370 is connected to magnetically coupled receptacle 2368, magnetically coupled line cord plug 2370 with its integral projecting member 2372, penetrates projecting member 2372 through tripping orifice 2374 located on the side wall of outer housing 2256.

Referring particularly to FIG. 179, whenever control box 2246 is lifted upward 2373 from its mounted position to dismount it from embodiment eleven, magnetically coupled line cord plug 2370 is uncoupled from magnetically coupled receptacle 2368 due to pressure exerted on projecting member 2372 by tripping orifice 2374 which remains stationary while control box 2246 and integral magnetically coupled receptacle 2368 are moved upward.

As shown in FIG. 166, projecting member 2372 tapers sharply. Tripping orifice 2374 loosely surrounds the sharply tapered end of projecting member 2372. The combination of this loose fit and sharp taper ensure that no matter which way line cord 2375 is pulled that magnetically coupled line cord plug 2370 will disconnect without putting any pulling forces onto control box 2246 or onto embodiment eleven.

When compared with designs which incorporate safety interlock switches to disconnect power to a control box, the above design may offer many potential advantages among which may be alone or in any combination:

Less expensive manufacturing costs due to no separate switch components and no additions to wiring.

Increased reliability because there are no switches to fail or wirings to misassemble.

It's obvious and apparent that power has been disconnected from the control box unlike safety interlock switches which are often invisible and whose function may not be well understood by users.

Magnetically coupled receptacle 2368 and magnetically coupled line cord 2370 use connecting pins 2376 and 2378 to transfer line power (FIGS. 166 and 179). It may also use magnetic coupling plate 2380 to convey third lead grounding.

As mentioned earlier, lid 2230 includes metal lid 2232 which snaps into plastic lid 2234 in a manner similar to snapping a plastic lid onto a metal, plastic, or ceramic bowl or pot. Plastic lid 2234 may be translucent to allow light and viewing into cooking vessel 2252 through areas which are not covered by metal lid 2232 including viewing port 2235 (FIG. 169). In the alternative, a transparent material such as glass might be inserted into viewing port 2235 of plastic lid 2234 to allow such light admittance and viewing. The inner surface of the material covering viewing port 2235 is slanted forward as shown in FIGS. 165, 169, 170, and 173 to help reduce condensation which might obscure visibility through viewing port 2235.

Open metal filter 2236 and ancillary filter 2238 serve as exhaust filters to help reduce odors, grease, oil, moisture, humidity, and other exhaust pollutants. These filters are trapped in compartment 2233 (FIGS. 165 & 166) formed between metal lid 2232 and plastic lid 2234 when metal lid 2232 is snapped into plastic lid 2234. By having a two-piece lid without a separately accessed filter holder, manufacturing costs may be reduced, cleaning may be more thorough, and the simplicity and reliability of the design may be desirability increased.

As shown particularly in FIGS. 165, 166 and 167 as well as in other figures contained herein, food support basket 2284 has lowered central section 2285 which protrudes downward from perimeter floor 2287 of basket 2284 to a level below heat coil 2272 when food support assembly 2318 is in its lowermost position. This allows foods being cooked to be submerged below heat coil 2272 and thus allows taller foods to be cooked without increasing the height of cooking vessel 2252 or the outside dimensions of preferred embodiment eleven.

Disassembling embodiment eleven may be done in several different ways depending on circumstances. As just one non-limiting example it may involve the following steps:

Food support assembly 218 is raised to its upper position lifting handles 2222 and 2224.

Lid 2230 is then lifted and removed by lifting handle 2240 or 2242.

Food support assembly 2318 is then removed by lifting handles 2222 and 2224.

Sleeve 2214 is then removed by lifting it, and when necessary, pressing in 2357 on the tops of bent members 2364 and 2366 as well as their left side counterparts to unlock sleeve 2214 and allow it to be further lifted until it is free of engagement with cooking vessel 2252.

Referring particularly FIG. 176 as well as other figures contained herein, control box 2246 is then removed by pulling 2271 on tab 2269 which pulls inwardly 2273 biased latch 2268 out of engagement with upward facing inward protruding louver 2270 (FIGS. 174 and 174A) and allows control box 2246 to be pulled upward and removed.

Cooking vessel 2252 can then be lifted out of outer housing 2256 by lifting it upward.

Reassembling embodiment eleven may also be done in different ways. As just one nonlimiting example, it may involve the following steps:

Lowering cooking vessel 2252 into outer housing 2256.

Lowering control box 2246 onto the rear upper rim of outer housing 2256 until latch 2268 engages louver 2270.

lowering sleeve 2214 into cooking vessel 2252 and disengaging if necessary latching tabs 2354 and 2356 as well as their opposite side counterparts from engagement with their respective overflow holes by pushing on bent members 2364 and 2366 as well as their opposite side counterparts.

Lowering food support assembly 2318 into cooking vessel 2252.

Placing lid 2230 on top of sleeve 2214.

Cooking using embodiment eleven can be done in many different ways. As just one nonlimiting example, it may involve the following steps:

Sleeve 2214, if necessary, is adjusted to its upper or lower position to accommodate the food being cooked.

Cooking liquid is poured into cooking vessel 2252 and controls 2254 are adjusted so that the cooking liquid is heated inside of cooking vessel 2252.

Food is inserted into food support assembly 2318 while food support assembly 2318 is removed from being within cooking vessel 2252.

If necessary, during the insertion of food, one or more food support lid/partitions 2296 are mounted into food support basket 2284 to form vertically separated cooking compartments or to cap basket 2284.

Food support assembly 2318, along with the food it contains, are then inserted into food support assembly 2318's upper position inside cooking vessel 2252.

Lid 2230 is then placed on top of sleeve 2214.

Food support assembly 2318 is then lowered to its lowermost position by pushing in 2323 buttons 2320 and 2322 and pulling handles 2222 and 2224 outward 2325 and then lowering food support assembly 2318 using handles 2222 and 2224 into the heated cooking liquid.

The food is cooked for a predetermined amount of time.

Food support assembly 2318 is then raised to its upper position, lid 2230 is removed, and food support assembly 2318 is removed from being within cooking vessel 2252.

The food contained within food support assembly 2318 is then removed and either repositioned within food support assembly 2318 for a second cook cycle in a new cooking position, or placed on a service platter.

The above step may be repeated one or more times if necessary.

The cooking liquid is allowed to cool down.

Sleeve 2214 may then be removed (or not) and outer housing 2256 along with enclosed cooking vessel 2252 can then tipped forward and emptied of oil, including oil which may have overflowed into outer housing 2256 during the cooking.

Components may then be disassembled as described above for cleaning or for other purposes.

Components may then be stored as described above.

To minimize outward dimensions of embodiment eleven for warehousing, shipping, storage, or other purposes the following may be used either alone or in combination:

Food support assembly 2318 may be lowered.

Lifting handles 2222 and 2224 may be removed.

Lifting handles 2222 and 2224 may be stored inside the unit.

Other parts and products may also be stored inside the unit.

Embodiment eleven may be used to steam foods (as can embodiment ten and other embodiments described herein using a similar procedure to that described below for embodiment eleven). There are many ways to steam food within embodiment eleven. Referring particularly to FIG. 180 as well as other figures contained herein, as just one nonlimiting example, an easy way to steam foods is to pour water 2382 into cooking vessel 2252 and to lower food support assembly 2318 into cooking vessel 2252 to food support assembly 2318's lowest position, with food support lid/partition 2296 mounted inside food support basket 2284 at a height which is above the water level 2382 of the water which will be used for producing steam. Sleeve 2214 may be placed in either its raised or lowered positions depending on the amount of food to be cooked. Foods, such as by way of nonlimiting examples, crabs, clams, vegetables, or other foods, can then be stacked on top of food support lid/partition 2296 up to a point where both cooking vessel 2252 and sleeve 2214 are filled. Lid 2230 may then be placed on top of sleeve 2214 to cap it, and controls 2254 can then be adjusted so that the water can be brought to a boil.

Referring to FIG. 170 in particular and other figures contained herein in general, controls 2254 may include many types of indicators and controls, not necessarily including and not necessarily limited to: a countdown shutoff timer 2255, a thermostat 2257, an "on" indicator light 2259, a ready to cook light 2261, as well as potentially other indicators and controls.

FIGS. 181 and 182 in particular, as well as other figures contained herein, show how food support assembly 2318 may be inclined with either sleeve 2214 raised or lowered for purposes which may include, but are not necessarily limited to, facilitating drainage of cooking liquid from foods, including flat foods such as potato chips, or from horizontally cooked fowl, or from other foods.

To most efficiently do this, protrusions 2384 and 2386 are shown added to the left and right hand sides respectively of sleeve 2214. As just one nonlimiting example of how tilting food support assembly 2318 might work, after food support assembly 2318 has been lifted out of embodiment eleven, it is then reinserted in the forward angled positions shown in either FIG. 181 or 182. Foods support assembly 2318 is held in this position by handle support bracket 2286 resting against sleeve 2214 at handle support bracket 2286's base in location 2388, which is shown, as well as a mirror image location on the right side of embodiment eleven, which is hidden in FIGS.

181 and 182. Working in concert with this are two higher points on handle support bracket 2286, higher point 2392 which is shown, and a mirror image one on the opposite side which is hidden in FIGS. 181 and 182. These rest against protrusions 2384 and 2386 respectively. Finally, upper perimeter support wire 2396 of food support basket 2284 rests in locations 2398 and 3000 against the upper parameter rim of sleeve 2214 to help secure food support assembly 2318 in its raised inclined position.

Embodiment eleven may be constructed at any advantageous scale. As just one nonlimiting example and referring to FIGS. 183 and 184, a particular advantageous size to accommodate an 11 pound to 16 pound turkey, considered a small-medium to large size Thanksgiving day turkey in the United States, would have a front to back depth 2397 between 11.5 inches and 14 inches, a side to side width 2399 between 8 inches and 11 inches, a height 3001 without sleeve 2214 extended between 7.5 inches and 10 inches, and a height 3002 with sleeve 2214 extended between 12.5 inches and 14.5 inches.

These sizes might also provide additional benefits of being able to fit parts such as: food support assembly 2318, cooking vessel 2252, and sleeve 2214, into a dishwasher. In addition, these sizes take up little counter space and little cabinet storage space.

Referring particularly to FIGS. 185 and 185A, as well as generally to other figures contained herein, embodiment eleven rests on 6 feet, feet 3004, 3006, 3008, 3010, 3012, and 3014. This plurality of feet gives embodiment eleven good traction on a countertop, as well as very good stability. Stability is particularly critical in a deep fryer versus other appliances due to the inherent dangers of containing scalding hot oil which could accidentally be tipped over or otherwise spilled. Referring specifically FIG. 185A, each of the feet are made from resilient material which is corrugated on its lower face to provide compensation for uneven countertops or other uneven surfaces on which embodiment eleven might rests. This may help increase stability and reduce undesirable rocking.

Twelfth Embodiment

A twelfth preferred embodiment, herein referred to as embodiment twelve, shares many similarities to and advantages and features of embodiment eleven. Similar parts between embodiment twelve and previous preferred embodiments may also share similar functions and advantages, and thus all the above are explained in less detail as such would be obvious to one knowledgeable in the art.

FIG. 197 is a top view of embodiment twelve with unitary food in it (fowl 3040 shown in dotted lines and positioned as in FIG. 144). FIGS. 144 and 197 demonstrate that embodiment twelve is very efficient when cooking unitary foods vertically in a multi-cook cycle process.

Figure 186:
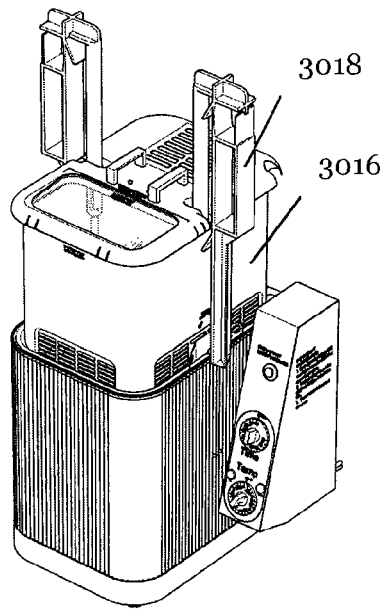
Figure 187:
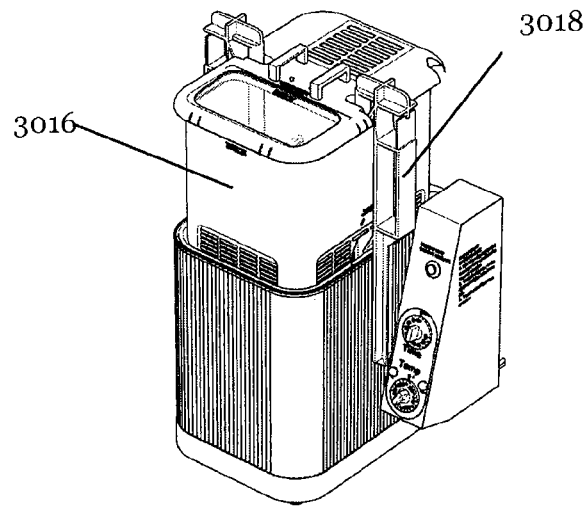
Figure 188:
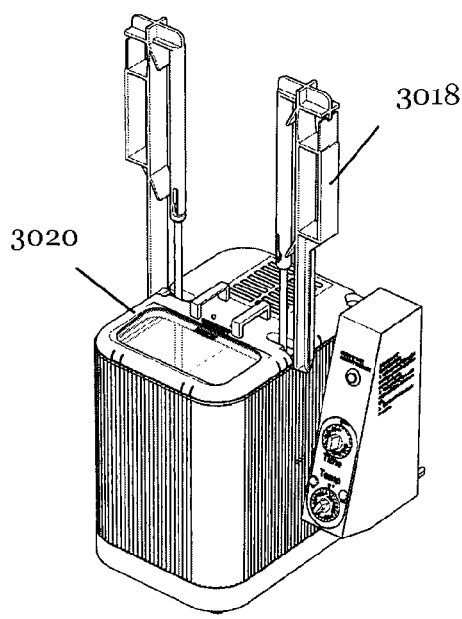
Figure 189:
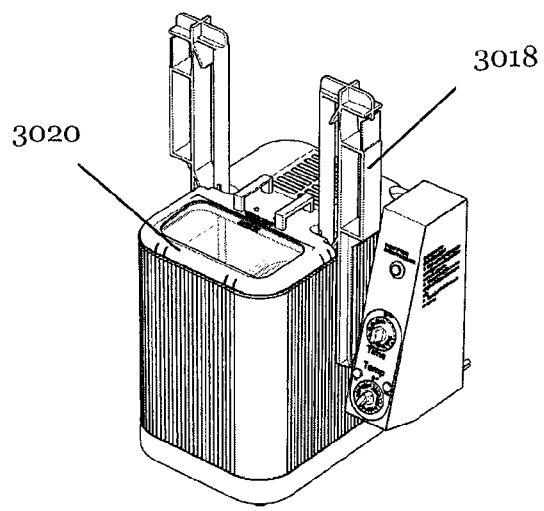

FIGS. 186 through 189 each show a forward perspective embodiment twelve. FIG. 186 shows embodiment twelve before food is lowered into cooking liquid within embodiment twelve, with sleeve 3016 extended upward to its upper position and food support assembly 3018 also in its raised upper position. FIG. 187 shows embodiment twelve after lowering food into cooking liquid within embodiment twelve, also with sleeve 3016 extended upward to its upper position but with food support assembly 3018 lowered to its lower position. FIG. 188, like FIG. 186, shows embodiment twelve before food is lowered into cooking liquid within embodiment twelve, but with sleeve 3016 in its lower position (and therefore hidden by lid 3020) and with food support assembly 3018 raised to its upper position. FIG. 189 is identical to FIG. 188 except it shows embodiment twelve after food has been lowered into cooking liquid, with food support assembly 3018 in its lower position.

FIG. 190 shows an exploded view of embodiment twelve. Starting from the upper left corner, and referencing also FIGS. 191, 191A and 192, lid 3020 is comprised of lower metal lid 3024 which snaps into upper plastic lid 3022 using resilient snaps 3023 on plastic lid 3022 which spent on to raised metal lid portions 3025 as shown in FIGS. 191, 191A and 192. Transparent viewing pane 3026 and filters 3028 and 3030 are trapped and positioned between upper plastic lid 3022 and lower metal lid 3024 when the two are snapped together.

Directly below lid 3020 in FIG. 190 is food support assembly 3018 which is comprised of: left and right handles 3032 and 3034 respectively, handle support member 3036, and food support basket 3038.

Directly below the food support assembly 3018 in FIG. 190 is open tubular sleeve 3016. Lid 3020 fits into the top open tubular sleeve 3016.

Tubular sleeve 3016 in turn telescopes into cooking vessel 3042, shown in the mid-right-hand portion of FIG. 190, and is locked in its upper position by latches 3044 and mirror image latches not shown which are on the opposite side of sleeve 3016.

Tubular sleeve 3016 is penetrated on its side walls by outward projecting, downward opening louvers 3068 (FIGS. 190 and 190A) which allow excessive cooking liquid and foam if necessary to exit tubular sleeve 3016 during cooking in a controlled manner. Exiting cooking liquid and foam may then be collected in moat 3063 formed between tubular sleeve 3016 and cooking vessel 3042 (FIG. 198). Exiting through louvers 3068 may help deflate foam. Excess liquid and foam collected in moat 3063 may exit through holes 3050 in the upper portion of cooking vessel 3042 into the reservoir formed by outer enclosure 3048.

Cooking vessel 3042 in turn fits within outer enclosure 3048 and is supported and positioned there by cooking vessel 3042's upper outer perimeter rim which overlaps and caps the upper rim of outer enclosure 3048.

Cooking vessel 3042 has liquid overflow holes 3050 located around the upper portion of its side walls.

Control box 3044 with attached heat coil 3046 is mounted on the rear right of embodiment twelve and attaches to outer enclosure 3048 using hooks 3052 and 3054 formed in metal plate 3055 (FIG. 194) which hook into holes 3056 and 3058 (FIG. 190) on the right side of outer enclosure 3048. Metal plate 3055 also mounts the upper portion of heat coil 3046 at entry point 3047 (FIG. 194).

Brackets 3060 and 3062 attached to riser tubes 3047 of heat coil 3046 (FIG. 194): help maintain the alignment of riser tubes 3047 of heat coil 3046; help direct sensor connection tubes (not shown) which traverse between thermostat/thermal overload sensors 3064 and 3066 respectively and control box entry point 3047; and, by fitting tightly within the space, help seal off the space created by heat coil 3046 between cooking vessel 3042 and tubular sleeve 3016 (FIGS. 194, 197, and others), which in turn helps control the flow of cooking liquid out of cooking vessel 3042 when cooking liquid levels are too high or foam is too plentiful or violent.

Outer enclosure 3048 serves as an overflow reservoir to assist liquid containment if and when cooking liquid exits cooking vessel 3042 through liquid overflow holes 3050 during cooking. This in turn may help reduce the potential of damage to: countertops, tabletops, cabinet faces, and/or floors.

Vertical corrugations in sidewall 3059 of the outer enclosure 3048 may help reduce potential burns to users. There use may be particularly well adapted to deep fryer settings due to the proximity of sidewalls in outer enclosures to hot sidewalls of contained cooking vessels. The reduction of potential burns to users may come for one or more of at least three reasons. First, corrugations increase the surface area to dissipate heat and thus reduce the temperature of sidewalls. Second, corrugations increase structural rigidity, which in turn results in the ability to use thinner material and thus may reduce the amount of thermal mass in the sidewalls. And finally, corrugations may reduce contact area between user's hands and sidewalls if the sidewalls are accidentally touched.

FIG. 193 is a forward perspective view of embodiment twelve with its lid 3020 being lifted by hand 3021 showing how dangerous hot exhaust gases and vapors 3019 are directed away from hand 3021 when the lid 3020 is lifted using handle 3017. The mirror image of this occurs when handle 3015 is lifted. This is a very useful safety feature.

FIG. 194 is a rear upward facing perspective of control box 3044. Magnetically coupled line cord plug 3068, with projecting tripping member 3070 is shown connected to magnetically coupled socket 3072. When control box 3044 is mounted to outer enclosure 3048 and magnetically coupled line cord plug 3068 is engaged into magnetically coupled socket 3072, tripping member 3070 penetrates through tripping orifice 3074 located on the rear side wall of outer enclosure 3048 and causes magnetically coupled line cord plug 3068 to disengage from magnetically coupled socket 3072 if and when control box 3044 is removed from engagement with outer enclosure 3048. Tripping member 3070 is loosely engaged when within tripping orifice 3074. This loose engagement combined with the high degree of taper of tripping member 3070 prevent any force being exerted on embodiment twelve if and when the line cord connected to magnetically coupled line cord plug 3068 is pulled in any direction. Such a pull would simply freely disconnect magnetically coupled line cord plug 3068 from magnetically coupled socket 3072 while exerting no force on the rest of embodiment twelve.

FIGS. 194 and 197 show information materials 3078 which may be stored in media storage orifice 3080, which is an integral part control box 3044. Informational materials 3078 may be of any nature including by way of nonlimiting examples: recipe cards (including in the United States standard 3×5 inch cards), safety information, promotional information, instructional information, DVDs, CDs, other media storage, or any other informational materials including those both related and unrelated to embodiment twelve. Such materials may make it easier for a user of embodiment twelve by being available with embodiment twelve without having to search and other locations to find such materials. By having such materials stored in control box 3044 which is removed from the rest of embodiment twelve when other parts of embodiment twelve are being normally cleaned, such materials are not exposed to, and need not be otherwise removed from, parts subjected to normal regular cleaning.

FIGS. 195 and 196 show forward perspectives of preferred embodiment twelve with lid 3020 removed to a storage position on the front of embodiment twelve, and held there in a vertical position by hook 3076 which is on the rear of and part of lower metal lid 3024 (FIG. 192). FIG. 195 shows tubular sleeve 3016 in its lower position and FIG. 196 shows tubular sleeve 3016 in its raised position. In both FIGS. 195 and 196, hook 3076 hooks over the forward upper rim of tubular sleeve 3016. Such an arrangement may reduce the use of countertop space by not requiring countertop space to store lid 3020 when it is not capping sleeve 3016. It also may make it easier for a user to use embodiment twelve by having a predetermined location to put lid 3020 when it is not capping sleeve 3016.

FIG. 197 is a plan view of embodiment twelve with fowl 3040 placed within it. FIG. 197 in combination with FIG. 142, which is a side view of a fowl placed in a similar position to fowl 3040 in FIG. 197, demonstrate how embodiment twelve may be volumetrically efficient in cooking unitary food, and in particular a fowl.

FIG. 198, as well as other figures contained herein, shows how by being upward inclined the forward face 3081 of control box 3044 both catches substantial amounts of ambient light, and exposes controls/indicators 3082, 3084, 3086, and 3088 openly to user view and use. This is particularly useful because controls/indicators 3082, 3084, 3086, and 3088 are placed substantially behind the side midpoint of embodiment twelve (substantially behind herein meaning behind the front to back centerline of outer enclosure 3048), and because controls/indicators 3082, 3084, 3086, and 3088 are below the upper rim of cooking vessel 3042. Both these locational conditions make it more difficult to see and access such controls.

Thermal reset button 3090 on forward face 3081 of control box 3044 resets the thermal overload device if overheating occurs and embodiment twelve is disabled from operation by its overload device. Having the thermal reset button directly adjacent to user controls were its existence and use are obvious, makes it more likely that in the event of a thermal overload, a user will understand that embodiment twelve can be re-enabled through pushing thermal reset button 3090. This can be very important in cutting down on product returns and unjustifiably perceived product failures. It has been reported that this is a major factor in product returns on many current deep fryers.

Embodiment twelve may be constructed at any useful scale. One particularly advantageous scale is adapted to cook up to a 14 to 19 pound fowl such as a Thanksgiving Day or Christmas Day turkey. Referring in particular to FIGS. 232 and 233, and in general to other figures contained herein, countertop to lowered sleeve 3016 upper rim height 3085 may be between 9 inches and 14 inches, countertop to raised sleeve 3016 upper rim height 3091 may be between 14 inches and 18 inches, front to back depth 3087 may be between 8 inches and 12 inches, and side to side width 3089 may be between 6 inches and 9 inches.

FIGS. 199 through 202 show an alternative form of food support for unitary pieces of food such as fowl 4008. Alternative spit assembly 4010 has left handle 3094 and right handle 3096 which are similar to, and may be identical to or substituted with, left and right handles 3032 and 3034 respectively. These connect in the manner described earlier for handles 3032 and 3034 to spit mounting bracket 3098. Spit mounting bracket 3098 in turn mounts contained movable 4001 4003 spit rods 4000, 4002, 4004, and 4006. In operation, spit rods 4004 and 4006 are first pulled outward 4001. Concurrent with this the mirror image of this occurs with spit rods 4000 and 4002. Fowl 4008 is then pierced by movable spit rods 4000, 4002, 4004, and 4006 by pushing them inward toward fowl 4008. Spit rods 4000 and 4006 are directed to penetrate fowl 4008 near its midpoint as shown in FIGS. 199 and 201. Unitary food 4008 is then lowered into hot cooking liquid and cooked. Unitary food 4008 is then removed from cooking vessel 3042 and spit rods 4002 and 4004 are then pulled away from fowl 4008 allowing spit assembly 4010 to be rotated 4012 into a new position as shown in FIG. 202 and spit rods 4002 and 4004 are reinserted into fowl 4008. Spit assembly 4010 and fowl 4008 are then lowered back into hot cooking liquid within cooking vessel 3042 and cooked in a manner described earlier herein. After all cook cycles are complete, spit assembly 4010 and its held unitary food, as exemplified by fowl 4008, are removed from cooking vessel 3042 and movable spit rods 4000 4002 4004 and 4006 are removed from fowl 4008 by pulling them away from fowl 4008. Fowl 4008 is not ready to be served.

By eliminating space taken up by a wire basket, alternative spit assembly 4010 may allow larger unitary food to be cooked within embodiment twelve. Versus a wire basket food support, spit assembly 4010 may allow unitary food to touch, and even be fully supported by the floor of the cooking vessel. Further, versus a wire basket food support, spit assembly 4010 may also make it easier to flip food over between cooking cycles, as may be required by use of a multiple cooking cycle method for cooking. Spit assembly 4010 may also immerse less cold metal into hot cooking liquid than comparable wire basket food supports. This in turn may have the desirable result of less initial temperature drop in such cooking liquid when food and its food support are first immersed into the hot cooking oil. The above advantages may also be true if alternative spit assembly 4010 is used with embodiments one or two herein or with other devices in the marketplace.

Thirteenth Embodiment

FIG. 203 through 208 show a method of eliminating various pollutants from cooking liquid such as is used in preferred embodiments ten, eleven, and twelve. Specifically, by way of a nonlimiting example, odors and other pollutants, such as those odors and pollutants created by deep frying fish or other seafood, may be reduced or eliminated from frying oil through use of this method so that cooking oil might be reused and have a longer useful life without contaminating other foods with fishy odors and other fishy pollutants. This is true of other foods besides fish and seafoods as well.

Figure 203:
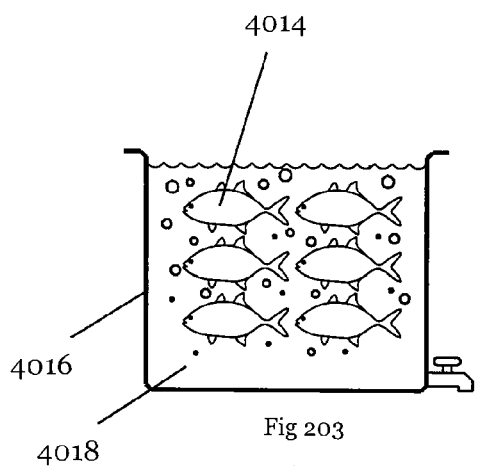
Figure 204:
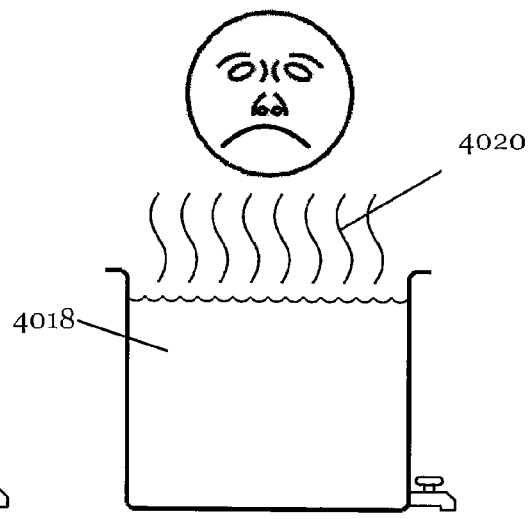
Figure 205:
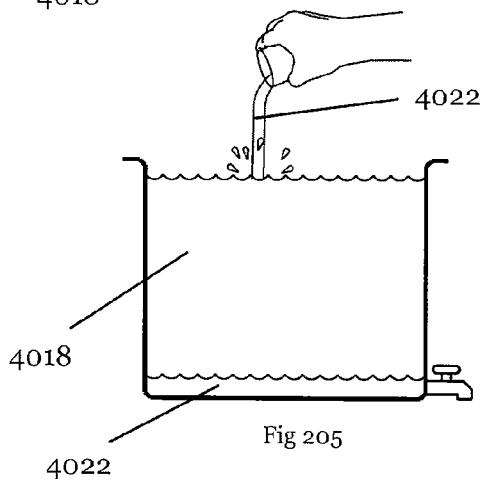
Figure 206:
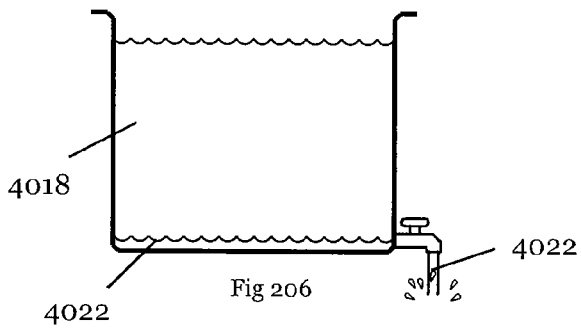
Figure 207:
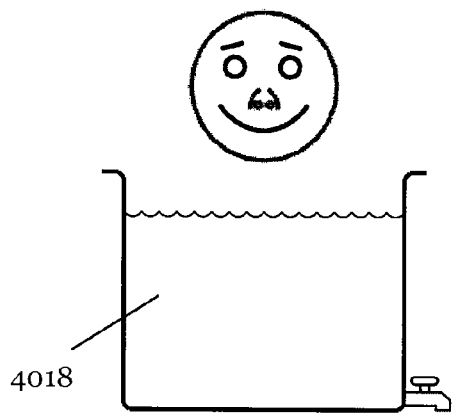

FIG. 203 shows fish 4014 being deep fried within cooking vessel 4016. FIG. 204 shows that this may impart an undesirable fishy odor 4020 as well as other undesirable pollutants to cooking oil 4018. FIG. 205 shows adding hot, warm, or cool water 4022 to cooking oil 4018 while oil 4018 is either warm at less than boiling temperature, or after it has cooled down to room temperature or below. Higher oil temperatures within this range may improve the efficiency of the pollutant removal. The combination of cooking oil 4018 and water 4022 may then optionally be agitated using any number of different means, such as, by way of nonlimiting examples: using a whisk, or spoon, or electric mixer, or immersion blender, or other means. As shown in FIG. 206, water 4022 is then drained off along with the pollutants in now contains. FIG. 207 shows the now less polluted oil ready for use to fry other foods. This method of purification may also be useful in reducing residual pollutants when used oils are used for bio fuel.

Figure 208:
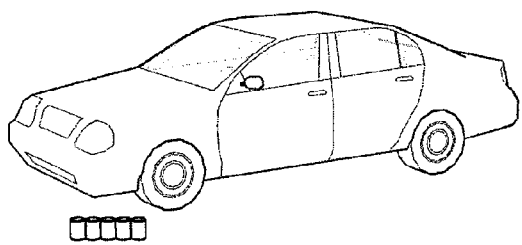

FIG. 208 shows that pollutants may be reduced in used motor oil using a similar method of adding water to used oil, allowing interaction, and then removing the water and the pollutant it contains.

Fourteenth Embodiment

Filtering cooking liquids such as frying oil may extend such liquids useful life. FIGS. 209 through 214 show a device to aid in the transfer and/or filter purification of liquids, including, but not limited to, oil used in deep frying such as the type of oil which may be used in preferred embodiments ten through eleven described herein. FIG. 209 shows a front perspective view of embodiment fourteen. FIG. 210 shows an upward facing rear perspective view of embodiment fourteen. FIG. 211 shows a front perspective view of embodiment fourteen in its compact flattened storage configuration. FIG. 212 is a forward perspective view demonstrating the use of this configuration for storage within a confined storage area. FIG. 213 is a forward perspective view showing embodiment fourteen being used to facilitate pouring liquid into a container. FIG. 214 is a forward perspective view showing embodiment fourteen being used to filter liquid while transferring the liquid into an open container.

Embodiment fourteen comprises funnel shaped upper section 4024 coupled to and draining into egress tube 4034. Lower outwardly 4030 and 4032 biased pliable notched wedge shaped members 4026 and 4028 are flexibly coupled to both the bottom of egress tube 4034 and the sides of funnel shaped upper section 4024. Open container rim mounting hook 4036 is also attached to the side of funnel shaped upper section 4024. Flexible storage configuration strap 4038 is connected to the upper rim of funnel shaped upper section 4024.

As a nonlimiting example, embodiment fourteen may be molded in a pliable plastic such as poly propylene as a single piece which might have desirable effects of reducing manufacturing costs and simplifying construction.

As shown in FIGS. 211 and 212, embodiment fourteen may be compacted for storage by connecting hole 4042 located at the end of flexible storage configuration strap 4038 to coupling pin 4040 located on the upper rim of funnel shaped upper section 4024. This draws together and warps the pliable sides of funnel shaped upper section 4024 to a flatter geometry which may allow embodiment fourteen to fit into drawers, cabinets and other confined areas more easily. In crowded kitchens this can be a major user advantage.

As shown in FIG. 213, embodiment fourteen may be useful in transferring liquids into containers. Lower outwardly 4030 and 4032 biased pliable notched wedge shaped members 4026 and 4028 may be wedged into a wide variety of different containers including those having different: sizes, materials, and neck openings. Once wedged in, wedge shaped members 4026 and 4028 support and secure embodiment fourteen in a generally vertical disposition as exemplified in FIG. 213. Wedge-shaped members 4026 and 4028 provide space on either side of egress tube 4034 for air to leave containers while liquid is being filled into containers through egress tube 4034. This allows more rapid filling of such containers.

A conical shaped filter similar to filter 4044 shown in FIG. 214 may be used or not use at any time embodiment fourteen is in use to filter out particulate and other contaminants during the transfer of liquid through embodiment fourteen. Spacing ribs 4046 allow liquids to freely flow through the conical filter 4044 and drain into the top of egress tube 4034.

Embodiment fourteen may be useful in transferring liquids from any source into bottles. As a nonlimiting example, it could be used for transferring liquid contained in embodiments one through three described herein back into the containers the liquid was purchased in. This could be useful for: liquid storage, liquid reuse, and/or for liquid disposal.

FIG. 214 portrays a nonlimiting example showing embodiment fourteen being used to filter liquid being poured into embodiment eleven described herein. Open container rim mounting hook 4036 hooks over the upper peripheral rim of sleeve 2214 and secures embodiment fourteen in a generally vertical disposition. Conical filter 4044 is dropped into funnel shaped upper section 4024, in a manner similar to that used in many home coffeemakers. Spacing ribs 4046 allow liquid to freely flow through conical filter 4044.

Embodiment fourteen may be constructed at any useful scale. As a nonlimiting example, a particularly useful scale for refilling liquid containers and filtering transferring liquids would be to have the upper perimeter of funnel shaped upper section 4024 be 3 to 9 inches in diameter. This is small enough to be stored practically in an average kitchen, while being large enough to provide true utility when accepting poured liquids.

Fifteenth Embodiment

FIG. 215 through 219 show a device which may be used in conjunction with any of embodiments one through three described herein as well as other devices available in the marketplace. It may be used to coat the outside of foods with powder and particulate matter, such as, by way of nonlimiting examples, to coat foods such as chicken, fish, and vegetables, with breadcrumbs, spices, and/or flour.

Such coating of foods is best accomplished using three properties. First, powders or particles should be kept agitated so that they don't clump together. Second, there should be a high degree of turbulence of such powders and/or particles so that all portions of the food are coated evenly. And finally, there should be minimum contact area of the food to the surface which is supporting the food so that coating is given maximum food surface to adhere to.

Referring specifically to FIGS. 215 through 219, embodiment fifteen comprises three basic components: open box shaped base 4048, food support rack 4050, and lid 4052. Food support rack 4050 snaps into open shaped box base 4048 utilizing snap members 4054 located in the bottom of open box shaped base 4048. Lid 4052 caps open box shaped base 4048 powder-tight when placed on top of it. Handles 4056 and 4058 located at either end of open box shaped base 4048, allow two-hand gripping.

One of the commonly currently used methods of coating foods to be deep fried is to dip the foods into a batter such as an egg batter, and then place the foods onto a preparation surface where powder or particulate ingredients are dropped onto the foods repeatedly as the foods are rotated or flipped. This can be very messy and time-consuming to clean up afterwards. It can also result in uneven or incomplete coating of the foods.

Using embodiment fifteen may improve upon the results of the above process and may simplify cleanup. Embodiment fifteen may be used by following any of several methods. As a non-limiting example, food support rack 4050 is snapped into open shaped box base 4048 utilizing snap members 4054, powder or particulate ingredients to be used as coating are poured into open shaped box base 4048 where they come to rest below food support rack 4050. After being prepared if necessary, such as by dipping it into batter, the food to be coated is placed on the upper surface of food support rack 4050. Lid 4052 is then placed on top of and caps open box shaped base 4048.

Embodiment fifteen is then gripped using handles 4056 and 4058 and shaken. Handles 4056 and 4058 allow lid 4052 to be held down by the handle gripping hands when the handles are gripped. After shaking, lid 4052 is removed and the now coated food is taken out of open shaped box base 4048.

Cleanup consists of dumping any unused ingredients out of open shaped box base 4048 and washing it, along with food support rack 4050 and lid 4052. Washing may be done by hand or by a dishwasher.

Food support rack 4050 comprises wavy rod shaped foods support members 4060 which advantageously minimize food surface area contacted by food support rack 4050, and thus maximize food surface which can be coated.

Open box shaped base 4048 has corrugations 4062, 4064, and 4066 on the inside surfaces of its front, bottom and back respectively. Lid 4052 has corrugations 4068 on the interior surfaces of its top. Corrugations 4062, 4064, 4066, and 4068 help keep both powder and particulate ingredients from clumping when embodiment fifteen is being shaken. Also, these corrugations increase agitation of both powder and particulate ingredients and thus help in more completely and evenly coating foods.

Handles 4056 and 4058 may be configured as shown to be integrally molded into open box shaped base 4048 in a one-piece design, thus potentially simplifying and making less expensive manufacture. Food support rack 4050 is of generally flat construction making both its molds and its manufacturing potentially less expensive.

Embodiment fifteen may be constructed at any useful scale. As just one nonlimiting example, for use in common kitchens with foods such as chicken parts, shrimp, and vegetables, a particularly useful scale would be to have height 4070 (FIG. 219) be between 3 and 9 inches tall, depth 4072 be between 3 and 9 inches, and width 4074 be between 5 and 16 inches.

Embodiment fifteen may be constructed out of any of many materials or combination of materials. As just one nonlimiting example, all three of its component parts might be injection molded from polypropylene which is generally: durable, washable, inexpensive and commonly approved for being used in direct food contact.

Also, embodiment fifteen may be formed of transparent or translucent material, such as, by way of a nonlimiting example, natural polypropylene, which would allow viewing of foods to determine when they are fully coated.

Sixteenth Embodiment

FIGS. 220 through 225 show preferred embodiment sixteen, herein also referred to as embodiment sixteen, which may be used in conjunction with embodiments ten through twelve contained herein, or with other devices in the marketplace. Preferred embodiment sixteen cuts onions into connected wedge-shaped sections which may be deep-fried after being bread coated to create a dish commonly called a blooming onion.

FIG. 220 is a forward perspective view of embodiment sixteen set up for operation but without an onion in position to be cut. FIG. 221 shows a forward perspective exploded view of embodiment sixteen. FIG. 222, like FIG. 220, shows embodiment sixteen setup for operation without an onion in position to be cut, except FIG. 222 is taken from a lower rear perspective view. FIG. 223 is taken from the same vantage point as FIG. 222 and shows embodiment sixteen in its storage configuration.

FIG. 224 is a forward perspective view of embodiment sixteen with onion 4076 on top of food support 4078 and thus in position to be sliced.

FIG. 225 is a forward perspective showing onion 4076 directly after it has been sliced.

Embodiment sixteen comprises four principal pieces: base 4080, alignment/support column 4082, cutter blade/handle assembly 4084, and onion ejector 4086.

When configured for storage, alignment/support column 4082 is snap fitted into base 4080 as shown in FIG. 223.

When ready for slicing, embodiment sixteen has the lower end of alignment/support column 4082 securely forced fitted into receptacle slot 4088 disposed in base 4080 (FIG. 221). Simultaneously with this, both cutter blade/handle assembly 4084 and ejector 4086 are slideably mounted above base 4080 on alignment/support column 4082 as shown in FIGS. 220, 222, 224, and 225.

Cutter blade/handle assembly 4084 includes left handle 4090 and right handle 4092. Cutter blade/handle assembly 4084 also includes twenty vertically aligned upward inclined cutter blades 4094 which are both serrated and sharpened on their lower inward facing edges. Cutter blades 4094 connect at their upper ends to annular core cutter blade 4096. Taken as a unit, cutter blades 4094 form an upward protruding cone with annular core cutter blade 4096 at its apex.

In operation, onion 4076 is placed stem end down on food support 4078 with cutter blade/handle assembly 4084 directly above and contacting upper surfaces of onion 4076. Two-hand pressure is then brought to bear on handles 4090 and 4092, resulting in onion 4076 being sliced into twenty wedge shaped sections as shown in FIG. 225.

Cutter blades 4094 are then ejected from onion 4076 by placing downward pressure on onion ejector 4086, as a non-limiting example, using thumb pressure, and simultaneously pulling upward on handles 4090 and 4092, as a nonlimiting example, using fingers to simultaneously pull the handles 4090 and 4092 upward. Having onion ejector 4086, versus compared to its absence, makes it much easier to extricate onion 4076 from cutter blades 4094.

Embodiment sixteen can be constructed out of any of a variety of materials. As just one nonlimiting example, base 4080, cutter blade/handle assembly 4084, and onion ejector 4086 might be injection molded from ABS plastic. Cutter blades 4094 and annular core cutter blade 4096 might be made from stainless steel. This combination would be: utilitarian, use commonly known manufacturing materials and techniques, and be economical to produce.

Embodiment sixteen can be made at any usable scale. As just one nonlimiting example, to cut onions normally available in US food stores, base 4080 might be between 4 inches and 9 inches in diameter, and alignment/support column 4082 might be between 6 and 10 inches tall.

Seventeenth Embodiment

Figure 229:
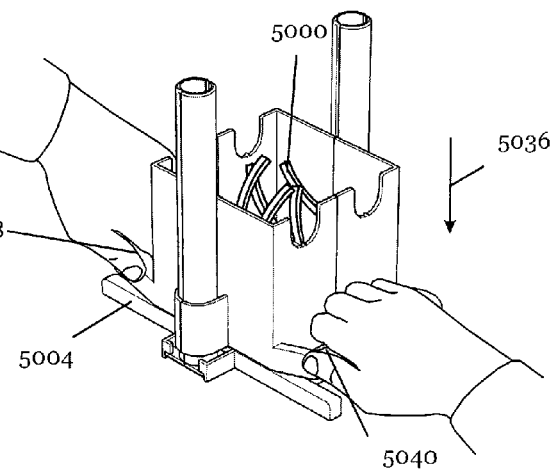

Figure is 226 through 231 illustrate a device which may be used in conjunction with preferred embodiments one through three described herein as well as other devices available in the marketplace. Using blades 4098 and blade receptacle 4099 as shown, embodiment seventeen may cut potatoes 5002 into French fry shapes 5000 (FIG. 229).

As shown in FIG. 231, embodiment seventeen is comprised of eight prime components. Base 5004 slideably (5005 in FIG. 231) accepts forward support/guide column 5006, including forward rebound spring 5010, and rear support/guide column 5008, including the rear rebound spring 5012.

Also attached to base 5004 is blade receptacle 4099 which drops into base 5004 and secures forward support/guide column 5006 and rear support/guide column 5008 using wedge shaped latching protrusions 5014 and 5016 respectively (FIG. 231).

Figure 230:
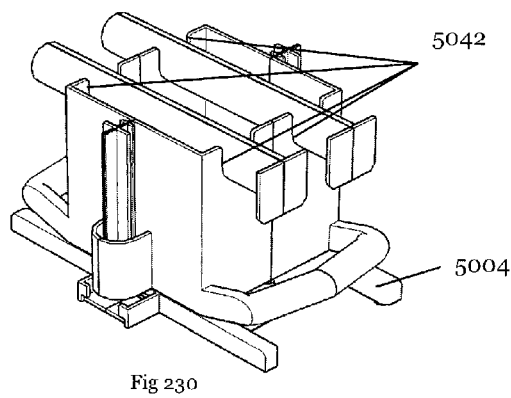

Blades 4098 latch into the bottom of food hopper/blade holder 5018. Blades 4098 mesh into blade receptacle 4099 when food hopper/blade holder 5018 is in storage, as shown in FIG. 230, and also when blade receptacle 4099 is in its lowest use position as shown in FIG. 229.

Blades 4098 are laid out in a square grid with vertical side faces and are open at their top and bottom. Individual blades within blades 498 are both sharpened and serrated on their lower edges.

As a non-limiting example, in use, forward rebound spring 5010 is dropped into the bottom of forward support/guide column 5006, rear rebound spring 5012 is dropped into the bottom of rear support/guide column 5008, forward support/guide column 5006 and rear support/guide column 5008 are then slid into slots 5020 and 5022 respectively (FIG. 231) and columns 5006 and 5008 are securely attached to base 5004 by blade receptacle 4099 which is lowered into base 5004 and thus latches, as explained earlier, columns 5006 and 5008 in place. Rebound springs 5010 and 5012 are held by wedge fit into the bottoms of columns 5006 and 5008 respectively and thus need not be regularly removed.

Food hopper/blade holder 5018 is then lowered down onto columns 5006 and 5008. Alignment rings 5024 and 5026 (FIG. 227) which are part of food hopper/blade holder 5018 help align holder 5018 to column 5006 and column 5008 respectively.

After an initial alignment using alignment rings 5024 and 5026, track riders 5028 and 5030, which are both integral with food hopper/blade holder 5018, are lowered down into columns 5006 and 5008 respectively. Track riders 5028 and 5030 include ribs which connect to the food hopper/blade holder 5018 through column slots 5022 and 5024 located in columns 5006 and 5008 respectively.

After lowering, track riders 5028 and 5030 come to rest on top of forward rebound spring 5010 and rear rebound spring 5012 respectively holding food hopper/blade holder 5018 above base 5004 as shown in FIGS. 226 and 227.

Figure 228:
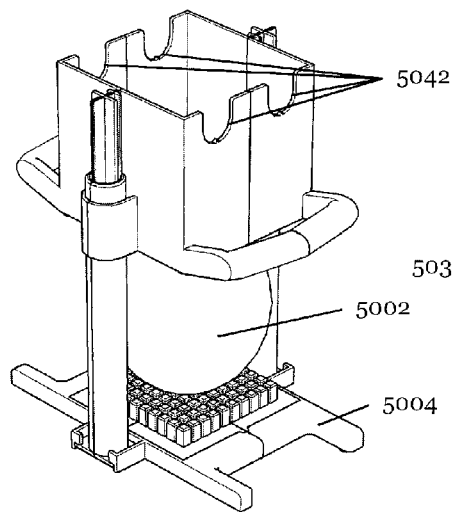

Food hopper/blade holder 5018 is then lifted and potato 5002 is inserted as shown in FIG. 228 between blades 5098 mounted inside holder 5018, and blade receptacle 4099 which is mounted into base 5004. Potato 5002 is held in its inserted position by the weight of food hopper/blade holder 5018 pressing on blades 5098.

As shown in FIG. 229, hand pressure is then exerted downward (5036) on left handle 5038 and right handle 5040 which causes blades 4098 to slice potato 5002 into French fries shapes 5000.

Additional potatoes may be sliced (or not) in a similar manner up to the point where food hopper/blade holder 5018 is full. After such cutting, holder 5018 is then lifted off from columns 5006 and 5008 and emptied.

As shown in FIG. 230, storage is accomplished by removing columns 5006 and 5008 from base 5004 and snapping columns 5006 and 5008 into recesses 5042 located on the upper portion of the right and left side walls of holder 5018. Holder 5018 is then simply lowered onto base 5004 and the entire unit then stored. Such an arrangement reduces the amount of space needed for storage.

The entire unit can be made from any of a wide variety of materials. As just one nonlimiting example, base 5004, columns 5006 and 5008 and holder 5018 could all be molded from ABS plastic. Alternatively, holder 5018 could be molded from a clear plastic such as clear acrylic which would allow viewing and easy measurement of holder 5018 contents. Markings could be added to the side walls of over 5018 to facilitate measurement of food cut.

Springs 5010 and 5012 as well as blades 4098 could be made from stainless steel. The above combination would be durable, inexpensive, and would utilize well-known production techniques.

Other blade and blade receptacles could be substituted for blades 4098 and blade receptacle 4099 in embodiment seventeen to produce larger or smaller French fries as well as to be used for slicing, wedge sectioning, or other types of cuts into fruits, cheeses, eggs, meats, pastries, vegetables, etc.

Embodiment seventeen can be built at any useful scale. As just one nonlimiting example, to cut potatoes are commonly available in US supermarkets, food hopper/blade holder 5018 could be between 3 inches and 6 inches side to side and between 3 inches and 6 inches front to back. Forward support/guide column 5006 and rear support/guide column 5008 could each be between 6 inches and 10 inches in height.

Eighteenth Embodiment

FIG. 234 shows a device, embodiment eighteen, which may be used with preferred embodiments ten through twelve herein as well as with other devices in the marketplace. Double hook 5044 may be used to help steady a fowl when it is being cooked in a vertical position such as is diagrammed in FIGS. 142 and 143. As shown in FIG. 234, double hook 5044 hooks onto both handle support bracket 2286 as well as fowl 5045 to provide support in holding fowl 5045 in a generally vertical cooking position. Double hook 5044 may be sharpened at each of its ends so that, if necessary, it can more easily pierce meat in order to hold onto food. In place of hooking onto handle support bracket 2286, embodiment eighteen may hook onto other portions of food support assembly 2318. A ratcheting hook (not shown) may be used in place of double hook 5044, as is known in the art.

Nineteenth Embodiment

FIGS. 235 through 237 show a device, embodiment nineteen, which also may be used with embodiments ten through twelve herein, as well as other devices in the marketplace, and embodiment nineteen also may help steady fowl being cooked in a vertical position.

Embodiment nineteen comprises bent wire 5046 and bent wire 5048 (FIG. 235). Bent wires 5046 and 5048 are essentially flat in profile. Upward facing slot 5050 is formed in the top of bent wire 5046. Downward facing slot 5052 is formed in the top of bent wire 5048. The essentially flat profiles of both bent wire 5046 and 5048 may allow them to be stored compactly.

Embodiment nineteen is assembled, as shown in FIG. 236, by sliding the two slots, 5050 and 5052, together. Embodiment nineteen is then inserted into fowl 5054 through either its neck or tail cavity. Left near vertical wire 5056 and right near vertical wire 5058 of bent wire 5046 are biased away from each other, as are forward near vertical wire 5060 and rear near vertical wire 5062 of bent wire 5048. This causes embodiment nineteen to fit snugly into either fowl 5054's tail or neck opening.

When embodiment nineteen is fitted into the neck opening of a fowl, it serves an independent additional useful function beyond stabilizing the fowl of allowing cooking liquid to circulate within, and drain from, the internal cavity of the fowl. This in turn reduces cooking time, and desirably increases cooking temperature, and makes it much easier to drain and remove a fowl quickly from the cooking vessel when the fowl is positioned neck down.

Twentieth Embodiment

FIGS. 238 through 240 show yet another preferred embodiment of the present inventions. This preferred embodiment, herein referred to as preferred embodiment twenty or simply embodiment twenty, may share most elements with preferred embodiment eleven. However, embodiment twenty combines embodiment eleven elements upper metals lid 2232 and sleeve 2214 to create integrated metal lid/sleeve 5064 of embodiment twenty.

FIG. 238 is a forward perspective view of embodiment twenty. FIG. 239 is an exploded forward perspective view of integrated metal lid/sleeve 5064 including exhaust filters 5066 and snap-on plastic lid 5068. FIG. 240 is an exploded forward perspective view of embodiment twenty.

Combining the metal lid 5070 with the sleeve 5072 may provide several advantages including, but not limited to: increased structure, especially at the top of sleeve 5072 where lid 5070 connects to and buttresses the top of sleeve 5072; easier loading and unloading of food into and out of the cooking vessel 5074 at least because the sleeve need not be raised during the loading and unloading operation; and simplified operation at least because the sleeve is put in place as part of putting on the lid.

Construction of embodiment twenty may be very similar to construction of embodiment eleven including plastic lid 5068 snapping on by hand to metal lid 5070.

Embodiment twenty may be used in many different ways. As just one non-limiting example, food support 5076 may be placed on a countertop and loaded with food after which it is loaded into cooking vessel 5074 in a manner similar to the use description for embodiment eleven. Integrated metal lid/sleeve 5064 is then placed over the food and lowered to its raised position as shown in FIG. 238. Left and right leaf spring-like latching tabs 5078 and 5080 respectively are analogous to the latching tabs shown for embodiment eleven. Working cooperatively they stop the downward travel of lid/sleeve 5064 at its raised position as shown in FIG. 238. Pushing latching tabs 5078 and 5080 in allows lid/sleeve 5064 to be lowered to where its uppermost portion is just above the upper rim of cooking vessel 5074. This lower position may be used for cooking smaller foods or used during storage or for other purposes.

Unloading food from within embodiment twenty simply involves reversing the above procedure. This may be done two or more times where food is not completely cooked during the first cooking cycle.

Twenty-First Embodiment

FIGS. 241 to 243 illustrate another preferred embodiment of the present inventions, herein referred to as preferred embodiment twenty-one or simply embodiment twenty-one. It may be constructed similar to embodiment twenty. However, in place of food support 5076, which uses basket 5082 which may have an open construction, embodiment twenty-one utilizes solid wall bucket 5084 which has perforations 5086 in its floor.

FIG. 241 shows a forward perspective view of embodiment twenty-one. FIG. 242 shows an exploded side perspective view of embodiment twenty-one. FIG. 243 is similar to FIG. 242 except taken from a lower vantage point.

Solid wall bucket 5084 is used in a virtually identical manner to basket 5082 except sidewalls 0588 traverse most of the depth of the cooking vessel and thus may provide easier loading of and more support for food loaded with it. Easier loading may be accomplished at least because foods such as a large fowl may tend to splay out while being loaded and having higher parameter sidewalls may help to contain this expansion.

Inferred Disclosure

Regarding all embodiments presented herein, many features not explicitly shown and/or described would be obvious to one knowledgeable in the art. The following are just a few examples.

Embodiment twelve does not show a lid/partition for its food support basket, nor does it explain how such a lid/partition might be used to create multiple cooking compartments or explain how such a lid/partition might be used in steaming various foods such as, by way of nonlimiting, non-exhaustive examples, fish and vegetables. However, one knowledgeable in the art would readily recognize that the lid/partition and its construction details, attributes, features and functions could readily be adapted to embodiment twelve.

In general, similar parts in the different embodiments presented, can be adapted from one embodiment to the others provide similar features and benefits, and in many cases can use similar construction details and manufacturing techniques. This all would be obvious to one knowledgeable in the art.

Likewise, embodiments ten through twelve show units adapted to operating on a countertop or tabletop. It would be obvious to one knowledgeable in the art to make versions of these embodiments which can operate on a floor or be built into a manufacturing or other type of setting.

Informative apparatus or directions may include, but is not limited to: printed matter, packaging, written instructions, audio tapes, audio discs, video discs, and information stored on media of all types.

The tilting foods support shown in FIGS. 181 and 182 could readily be adapted to embodiments ten and twelve as well as other devices currently in the market place.

The corrugated plural foot design of FIGS. 185 and 185A may also be used on embodiments ten and twelve as well as on other devices herein or currently in the marketplace.

The corrugated side walls used on the outer enclosure of embodiment twelve could be easily adapted to also be used on the side walls of the outer enclosures of embodiments herein, or other devices in the marketplace.

Such adaptations, modifications, and utilizations would be obvious to one knowledgeable in the art and thus are inferred to be part of the disclosures contained herein.

We claim:

1. A method for cooking unitary foods in liquid utilizing an associated food support member and an associated pool of hot liquid, and the method comprising the steps of:
    positioning a unitary article of food so that it is supported by the associated food support member as a supported unitary article of food;
    extending a vertically extensible wall from a vertical wall associated with a liquid vessel;
    lowering, from a relatively raised position, the food support member while it is supporting the unitary article of food in a first orientation into a pool of hot liquid disposed in the liquid vessel to a depth where a first part of, but not all of, the supported unitary article of food is immersed in the liquid;
    leaving the food support member and the supported unitary article of food stationary in the hot liquid in the first orientation for a selected time period long enough for cooking to occur in the first part of the supported unitary article of food;
    repositioning the supported unitary article of food relative to the food support member to a second orientation such that a second part of the supported unitary article of food including a portion not previously submersed in the pool of hot liquid, becomes immersed in the pool of hot liquid; and,
    leaving the food support member and the supported unitary article of food stationary in the hot liquid in the second orientation long enough for cooking to occur in the second part of the supported unitary article of food, wherein the first and second parts of the supported unitary article of food mutually overlap and wherein the cooking operation is substantially completed in connection with disposition of the unitary article of food a single time in the first and second orientations.

2. The method of claim 1 further including that the hot liquid is a frying liquid.

3. The method of claim 2 further including that the frying liquid is hot oil.

4. The method of claim 1 further including that the unitary article of food is a whole fowl.

5. The method of claim 4 further including that the whole fowl is a turkey.

6. A method for cooking a whole fowl comprising the steps of:
    associating a whole fowl with a food positioning and support member;
    placing a first part of, but not all of, a whole fowl in an environment hot enough to cook by lowering, from a relatively raised position, the food positioning and support member and associated whole fowl into the environment;
    leaving the first part of the whole fowl in the environment hot enough to cook long enough for substantially complete cooking of a first portion of the whole fowl to occur;
    repositioning, by raising food positioning support member from the environment and inverting the whole fowl relative to the environment hot enough to cook such that after repositioning by lowering the food positioning support member, a second part of the whole fowl including a portion which was not exposed to the environment hot enough to cook, becomes exposed, and wherein the first part of the whole fowl and the second part of the whole fowl overlap one another; and,
    leaving the second part of the whole fowl in the environment hot enough to cook long enough for substantially complete cooking of a complementary second portion of the whole fowl to occur.

7. The method of claim 6 wherein the whole fowl is a turkey.

8. The method of claim 6 further including that the placing of a first part, but not all of, the whole fowl in an environment hot enough to cook, includes immersing the first part into hot frying liquid.

9. The method of claim 6 further including that the first part includes the front half of the fowl including its neck and a portion of its midsection.

10. The method of claim 6 further including that the first part includes the back half of the fowl including a portion of its midsection and the ends of its legs.

11. The method of claim 6 wherein:
    the leaving the first part of the whole fowl in the environment hot enough to cook includes leaving the first part of the whole fowl in the environment hot enough to cook long enough for cooking to occur in the first part of the whole fowl; and,
    the leaving the second part of the whole fowl in the environment hot enough to cook includes leaving the second part of the whole fowl in the environment hot enough to cook long enough for cooking to occur in the second part of the whole fowl.

12. The method of claim 6 wherein the whole fowl is held by a food support member when being placed into the environment hot enough to cook.

13. The method of claim 6 wherein the environment hot enough to cook includes a vessel containing hot frying liquid.

14. The method of claim 6 wherein the environment hot enough to cook is activated and deactivated by a timer.

15. The method of claim 6 wherein the environment hot enough to cook is regulated by the thermostat.

* * * * *